US012385181B2

(12) United States Patent
Altman et al.

(10) Patent No.: US 12,385,181 B2
(45) **Date of Patent: *Aug. 12, 2025**

(54) SILK PERFORMANCE APPAREL AND PRODUCTS AND METHODS OF PREPARING THE SAME

(71) Applicant: Evolved by Nature, Inc., Medford, MA (US)

(72) Inventors: Gregory H. Altman, Providence, RI (US); Enrico Mortarino, Hickory, NC (US)

(73) Assignee: EVOLVED BY NATURE, INC., Needham, MA (US)

(*) Notice: Subject to any disclaimer, the term of this patent is extended or adjusted under 35 U.S.C. 154(b) by 160 days.

This patent is subject to a terminal disclaimer.

(21) Appl. No.: 17/938,594

(22) Filed: Oct. 6, 2022

(65) Prior Publication Data

US 2023/0175199 A1 Jun. 8, 2023

Related U.S. Application Data

(63) Continuation of application No. 15/744,566, filed as application No. PCT/US2016/042316 on Jul. 14,
(Continued)

(51) Int. Cl.
*D06M 15/15* (2006.01)
*B29C 48/15* (2019.01)
(Continued)

(52) U.S. Cl.
CPC .............. *D06M 15/15* (2013.01); *C08H 1/00* (2013.01); *C08J 7/0427* (2020.01); *C08L 89/00* (2013.01);
(Continued)

(58) Field of Classification Search
None
See application file for complete search history.

(56) References Cited

U.S. PATENT DOCUMENTS

| | | | |
|---|---|---|---|
| 3,424,164 | A | 1/1969 | Bloch et al. |
| 4,233,211 | A | 11/1980 | Ohtomo et al. |

(Continued)

FOREIGN PATENT DOCUMENTS

| | | | |
|---|---|---|---|
| AU | 2015358537 | A1 | 7/2017 |
| BR | 112017011641 | A2 | 3/2018 |

(Continued)

OTHER PUBLICATIONS

US 8,979,992 B2, 03/2015, Sugahara et al. (withdrawn)

(Continued)

*Primary Examiner* — Shawn Mckinnon
(74) *Attorney, Agent, or Firm* — Morgan, Lewis & Bockius LLP

(57) ABSTRACT

Silk infused performance apparel and methods of preparing the same are disclosed herein. In some embodiments, silk performance apparel includes textiles, fabrics, consumer products, leather, and other materials that are coated with aqueous solutions of pure silk fibroin based protein fragments. In some embodiments, coated apparel products, textiles, and upholstery, as well as other materials, exhibit surprisingly improved moisture management properties, resistance to microbial growth, increased abrasion resistance, and flame resistance.

17 Claims, 403 Drawing Sheets

Related U.S. Application Data

2016, now Pat. No. 11,512,425, which is a continuation-in-part of application No. PCT/US2015/063545, filed on Dec. 2, 2015.

(60) Provisional application No. 62/344,273, filed on Jun. 1, 2016, provisional application No. 62/297,929, filed on Feb. 21, 2016, provisional application No. 62/245,221, filed on Oct. 22, 2015, provisional application No. 62/192,477, filed on Jul. 14, 2015.

(51) Int. Cl.

| | |
|---|---|
| ***B29C 48/78*** | (2019.01) |
| ***C08H 1/00*** | (2006.01) |
| ***C08J 7/04*** | (2020.01) |
| ***C08L 89/00*** | (2006.01) |
| ***C09D 5/14*** | (2006.01) |
| ***C09D 189/00*** | (2006.01) |
| ***C14C 11/00*** | (2006.01) |
| ***D06B 19/00*** | (2006.01) |
| ***D06M 15/643*** | (2006.01) |
| ***D06M 101/06*** | (2006.01) |
| ***D06M 101/14*** | (2006.01) |
| ***D06M 101/32*** | (2006.01) |

(52) U.S. Cl.

CPC ............ *C09D 5/14* (2013.01); *C09D 189/00* (2013.01); *C14C 11/00* (2013.01); *D06B 19/0011* (2013.01); *D06B 19/0029* (2013.01); *D06M 15/643* (2013.01); *B29C 48/15* (2019.02); *B29C 48/78* (2019.02); *C08J 2489/00* (2013.01); *D06M 2101/06* (2013.01); *D06M 2101/14* (2013.01); *D06M 2101/32* (2013.01); *D06M 2200/10* (2013.01); *D06M 2200/30* (2013.01); *D06M 2200/35* (2013.01); *D10B 2201/02* (2013.01); *D10B 2211/06* (2013.01); *D10B 2331/02* (2013.01); *D10B 2331/04* (2013.01); *D10B 2401/022* (2013.01); *D10B 2401/13* (2013.01)

(56) References Cited

U.S. PATENT DOCUMENTS

| | | | |
|---|---|---|---|
| 4,521,458 | A | 6/1985 | Nelson |
| 5,089,395 | A | 2/1992 | Snyder et al. |
| 5,142,292 | A | 8/1992 | Chang |
| 5,143,724 | A | 9/1992 | Leshchiner et al. |
| 5,246,698 | A | 9/1993 | Leshchiner et al. |
| 5,399,351 | A | 3/1995 | Leshchiner et al. |
| 5,432,910 | A | 7/1995 | Barker et al. |
| 5,527,530 | A | 6/1996 | Simmons et al. |
| 5,820,928 | A | 10/1998 | Groshens |
| 5,968,762 | A | 10/1999 | Jadamec et al. |
| 5,984,974 | A | 11/1999 | Shibata et al. |
| 6,034,220 | A | 3/2000 | Stedronsky |
| 6,110,590 | A | 8/2000 | Zarkoob et al. |
| 6,217,890 | B1 | 4/2001 | Paul et al. |
| 6,228,132 | B1 | 5/2001 | Prince et al. |
| 6,303,136 | B1 | 10/2001 | Li et al. |
| 6,303,150 | B1 | 10/2001 | Perrier et al. |
| 6,482,420 | B2 | 11/2002 | Ozeki et al. |
| 6,491,931 | B1 | 12/2002 | Collin |
| 6,497,893 | B1 | 12/2002 | Everhart et al. |
| 6,565,863 | B1 | 5/2003 | Guillou et al. |
| 6,607,714 | B1 | 8/2003 | Dupuis et al. |
| 6,607,734 | B1 | 8/2003 | Afriat |
| 6,627,422 | B1 | 9/2003 | Li et al. |
| 6,733,859 | B2 | 5/2004 | Yoneda et al. |
| 6,815,427 | B2 | 11/2004 | Tsubouchi et al. |
| 6,858,168 | B1 | 2/2005 | Vollrath et al. |
| 6,902,932 | B2 | 6/2005 | Altman et al. |
| 6,997,960 | B1 | 2/2006 | Sano et al. |
| 7,014,807 | B2 | 3/2006 | O'Brien |
| 7,057,023 | B2 | 6/2006 | Islam et al. |
| 7,060,260 | B2 | 6/2006 | Fahnestock et al. |
| 7,115,388 | B2 | 10/2006 | Tsubouchi |
| 7,335,739 | B2 | 2/2008 | Mello et al. |
| 7,632,873 | B2 | 12/2009 | Mougin |
| 7,635,755 | B2 | 12/2009 | Kaplan et al. |
| 7,662,409 | B2 | 2/2010 | Masters |
| 7,674,882 | B2 | 3/2010 | Kaplan et al. |
| 7,682,539 | B1 | 3/2010 | Phillips et al. |
| 7,727,542 | B2 | 6/2010 | DiBenedetto et al. |
| 7,785,617 | B2 | 8/2010 | Shakesheff et al. |
| 7,868,146 | B2 | 1/2011 | Scheibel et al. |
| 7,901,668 | B2 | 3/2011 | Tsubouchi et al. |
| 7,922,929 | B2 | 4/2011 | Li et al. |
| 8,071,722 | B2 | 12/2011 | Kaplan et al. |
| 8,153,591 | B2 | 4/2012 | Masters et al. |
| 8,187,616 | B2 | 5/2012 | Wang et al. |
| 8,192,760 | B2 | 6/2012 | Hossainy et al. |
| 8,288,347 | B2 | 10/2012 | Collette et al. |
| 8,348,974 | B2 | 1/2013 | Asakura |
| 8,354,501 | B2 | 1/2013 | Kaplan et al. |
| 8,357,795 | B2 | 1/2013 | Lebreton |
| 8,372,436 | B2 | 2/2013 | Scheibel et al. |
| 8,420,077 | B2 | 4/2013 | Altman et al. |
| 8,450,475 | B2 | 5/2013 | Lebreton |
| 8,465,772 | B2 | 6/2013 | Hossainy et al. |
| 8,465,773 | B2 | 6/2013 | Hoissainy et al. |
| 8,501,172 | B2 | 8/2013 | Kaplan et al. |
| 8,551,538 | B2 | 10/2013 | Qian |
| 8,614,293 | B2 | 12/2013 | Kaplan et al. |
| 8,623,398 | B2 | 1/2014 | Altman et al. |
| 8,628,791 | B2 | 1/2014 | Altman et al. |
| 8,633,027 | B2 | 1/2014 | Altman et al. |
| 8,642,734 | B2 | 2/2014 | Johansson et al. |
| 8,674,077 | B2 | 3/2014 | Sutherland et al. |
| 8,685,426 | B2 | 4/2014 | Altman et al. |
| 8,697,056 | B2 | 4/2014 | Van Epps et al. |
| 8,715,740 | B2 | 5/2014 | Wang et al. |
| 8,721,991 | B2 | 5/2014 | Scheibel et al. |
| 8,728,498 | B2 | 5/2014 | Zhang et al. |
| 8,741,281 | B2 | 6/2014 | Van Epps et al. |
| 8,742,069 | B2 | 6/2014 | Kaplan et al. |
| 8,822,676 | B2 | 9/2014 | Lebreton |
| 8,828,436 | B2 | 9/2014 | Hossainy et al. |
| 8,871,267 | B2 | 10/2014 | Masters |
| 8,894,992 | B2 | 11/2014 | Van Epps et al. |
| 8,900,571 | B2 | 12/2014 | Van Epps et al. |
| 8,926,963 | B2 | 1/2015 | Van Epps et al. |
| 9,051,453 | B2 | 6/2015 | Sugahara et al. |
| 9,074,302 | B2 | 7/2015 | Lo et al. |
| 9,084,840 | B2 | 7/2015 | Kaplan et al. |
| 9,089,518 | B2 | 7/2015 | Lebreton |
| 9,089,519 | B2 | 7/2015 | Lebreton |
| 9,089,594 | B2 | 7/2015 | Dyer et al. |
| 9,090,703 | B2 | 7/2015 | Kobayashi et al. |
| 9,187,538 | B2 | 11/2015 | Altman et al. |
| 9,217,017 | B2 | 12/2015 | Leimer et al. |
| 10,166,177 | B2 | 1/2019 | Altman et al. |
| 10,253,213 | B2 | 4/2019 | Leimer et al. |
| 10,287,728 | B2 | 5/2019 | Altman et al. |
| 2001/0002417 | A1 | 5/2001 | Akkara et al. |
| 2001/0051815 | A1 | 12/2001 | Esplin |
| 2001/0053931 | A1 | 12/2001 | Hess et al. |
| 2002/0077629 | A1 | 6/2002 | Hoffman et al. |
| 2002/0082220 | A1 | 6/2002 | Hoffman et al. |
| 2002/0111591 | A1 | 8/2002 | McKinnon et al. |
| 2002/0114919 | A1 | 8/2002 | Yoneda et al. |
| 2003/0022361 | A1 | 1/2003 | Houston |
| 2003/0099630 | A1 | 5/2003 | DiBenedetto et al. |
| 2003/0139752 | A1 | 7/2003 | Pasricha et al. |
| 2003/0206897 | A1 | 11/2003 | O'Prey et al. |
| 2003/0208209 | A1 | 11/2003 | Gambale et al. |
| 2003/0220646 | A1 | 11/2003 | Thelen et al. |
| 2003/0236555 | A1 | 12/2003 | Thornes |
| 2004/0005363 | A1 | 1/2004 | Tsukada et al. |
| 2004/0063616 | A1 | 4/2004 | Patt |
| 2004/0073176 | A1 | 4/2004 | Utterberg |

(56) References Cited

U.S. PATENT DOCUMENTS

| | | | |
|---|---|---|---|
| 2004/0127907 | A1 | 7/2004 | Dakin et al. |
| 2004/0191199 | A1 | 9/2004 | Mougin |
| 2004/0199241 | A1 | 10/2004 | Gravett et al. |
| 2004/0219630 | A1 | 11/2004 | Tsubouchi et al. |
| 2004/0224406 | A1 | 11/2004 | Altman et al. |
| 2004/0234609 | A1 | 11/2004 | Collier et al. |
| 2004/0265260 | A1 | 12/2004 | Tsubouchi et al. |
| 2004/0267317 | A1 | 12/2004 | Higgins et al. |
| 2005/0004670 | A1 | 1/2005 | Gebhardt et al. |
| 2005/0021148 | A1 | 1/2005 | Gibbs et al. |
| 2005/0049598 | A1 | 3/2005 | West, Jr. et al. |
| 2005/0090827 | A1 | 4/2005 | Gedebou |
| 2005/0107882 | A1 | 5/2005 | Stone et al. |
| 2005/0130301 | A1 | 6/2005 | McKay et al. |
| 2005/0147690 | A1 | 7/2005 | Masters et al. |
| 2005/0149118 | A1 | 7/2005 | Koyfman et al. |
| 2005/0171604 | A1 | 8/2005 | Michalow |
| 2005/0177237 | A1 | 8/2005 | Shappley et al. |
| 2005/0251153 | A1 | 11/2005 | Sakamoto et al. |
| 2005/0251209 | A1 | 11/2005 | Saadat et al. |
| 2005/0261642 | A1 | 11/2005 | Weston |
| 2006/0004364 | A1 | 1/2006 | Green et al. |
| 2006/0029676 | A1 | 2/2006 | Sun |
| 2006/0178743 | A1 | 8/2006 | Carter |
| 2006/0195106 | A1 | 8/2006 | Jones et al. |
| 2006/0022962 | A1 | 10/2006 | Bonutti et al. |
| 2006/0241776 | A1 | 10/2006 | Brown et al. |
| 2006/0241781 | A1 | 10/2006 | Brown et al. |
| 2008/0188152 | A1 | 8/2008 | Tsai et al. |
| 2008/0188416 | A1 | 8/2008 | Bernstein |
| 2009/0162439 | A1 | 6/2009 | Gobin |
| 2009/0188152 | A1 | 7/2009 | Davin |
| 2009/0209456 | A1 | 8/2009 | Sweis |
| 2009/0234026 | A1 | 9/2009 | Kaplan et al. |
| 2010/0172853 | A1 | 7/2010 | Pavel et al. |
| 2011/0008406 | A1 | 1/2011 | Altman et al. |
| 2011/0008436 | A1 | 1/2011 | Altman et al. |
| 2011/0014287 | A1 | 1/2011 | Altman et al. |
| 2011/0020409 | A1 | 1/2011 | Altman et al. |
| 2011/0076384 | A1 | 3/2011 | Cannizzaro et al. |
| 2011/0105402 | A1 | 5/2011 | Kim et al. |
| 2011/0136669 | A1 | 6/2011 | Liebmann et al. |
| 2011/0189292 | A1 | 8/2011 | Lebreton et al. |
| 2011/0223153 | A1 | 9/2011 | Lu et al. |
| 2011/0240054 | A1 | 10/2011 | Pratt et al. |
| 2012/0040907 | A1 | 2/2012 | DiBenedetto et al. |
| 2012/0070427 | A1 | 3/2012 | Kaplan et al. |
| 2012/0076771 | A1 | 3/2012 | Vepari et al. |
| 2012/0123519 | A1 | 5/2012 | Lovett et al. |
| 2012/0171770 | A1 | 7/2012 | Numata et al. |
| 2012/0172317 | A1 | 7/2012 | Altman et al. |
| 2012/0187591 | A1 | 7/2012 | Wang et al. |
| 2012/0244143 | A1 | 9/2012 | Lo et al. |
| 2012/0252294 | A1 | 10/2012 | Leimer et al. |
| 2012/0265297 | A1 | 10/2012 | Altman et al. |
| 2013/0045278 | A1 | 2/2013 | Qian |
| 2013/0109762 | A1 | 5/2013 | Lammel et al. |
| 2013/0165004 | A1 | 6/2013 | Kaplan et al. |
| 2013/0240251 | A1 | 9/2013 | Kaplan et al. |
| 2013/0243693 | A1 | 9/2013 | Omenetto et al. |
| 2013/0287742 | A1 | 10/2013 | Kaplan et al. |
| 2013/0287835 | A1 | 10/2013 | Kaplan et al. |
| 2014/0058066 | A1 | 2/2014 | Sekiyama et al. |
| 2014/0105995 | A1 | 4/2014 | Kaplan et al. |
| 2014/0134240 | A1 | 5/2014 | Kaplan et al. |
| 2014/0194025 | A1 | 7/2014 | Klimov et al. |
| 2014/0206839 | A1 | 7/2014 | Altman et al. |
| 2014/0222152 | A1 | 8/2014 | Kaplan et al. |
| 2014/0264985 | A1 | 9/2014 | Sutti et al. |
| 2014/0308362 | A1 | 10/2014 | Bellas et al. |
| 2014/0315828 | A1 | 10/2014 | Pavlovic et al. |
| 2014/0378661 | A1 | 12/2014 | Lo et al. |
| 2015/0038043 | A1 | 2/2015 | Kaplan et al. |
| 2015/0038456 | A1 | 2/2015 | Gousse et al. |
| 2015/0045764 | A1 | 2/2015 | Kaplan et al. |
| 2015/0047532 | A1 | 2/2015 | Lewis et al. |
| 2015/0056256 | A1 | 2/2015 | Essaidi |
| 2015/0056261 | A1 | 2/2015 | Serban |
| 2015/0056293 | A1 | 2/2015 | Wang et al. |
| 2015/0056294 | A1 | 2/2015 | Kaplan et al. |
| 2015/0065686 | A1 | 3/2015 | Stylios |
| 2015/0079012 | A1 | 3/2015 | Bellas et al. |
| 2015/0093340 | A1 | 4/2015 | Altman et al. |
| 2015/0094269 | A1 | 4/2015 | Altman et al. |
| 2015/0164117 | A1 | 6/2015 | Kaplan et al. |
| 2015/0165092 | A1 | 6/2015 | Kaplan et al. |
| 2015/0183841 | A1 | 7/2015 | Lo et al. |
| 2015/0202304 | A1 | 7/2015 | Kaplan et al. |
| 2015/0238617 | A1 | 8/2015 | Kaplan et al. |
| 2015/0273021 | A1 | 10/2015 | Kaplan et al. |
| 2015/0284565 | A1 | 10/2015 | Scheibel et al. |
| 2015/0307728 | A1 | 10/2015 | Omenetto et al. |
| 2016/0022559 | A1 | 1/2016 | Altman et al. |
| 2016/0022560 | A1 | 1/2016 | Altman et al. |
| 2016/0022561 | A1 | 1/2016 | Altman et al. |
| 2016/0022562 | A1 | 1/2016 | Altman et al. |
| 2016/0022563 | A1 | 1/2016 | Altman et al. |
| 2016/0046679 | A1 | 2/2016 | Kluge et al. |
| 2016/0058685 | A1 | 3/2016 | Dyer |
| 2016/0193130 | A1 | 7/2016 | Altman et al. |
| 2016/0193293 | A1 | 7/2016 | Nishi et al. |
| 2016/0222579 | A1 | 8/2016 | Altman et al. |
| 2016/0235889 | A1 | 8/2016 | Pallotta et al. |
| 2016/0237128 | A1 | 8/2016 | Omenetto et al. |
| 2016/0256604 | A1 | 9/2016 | Hanna et al. |
| 2016/0263046 | A1 | 9/2016 | Kaplan et al. |
| 2016/0263228 | A1 | 9/2016 | Kluge et al. |
| 2019/0003113 | A1 | 1/2019 | Altman et al. |
| 2020/0188269 | A1 | 6/2020 | Altman et al. |
| 2020/0256009 | A1 | 8/2020 | Altman et al. |

FOREIGN PATENT DOCUMENTS

| | | | |
|---|---|---|---|
| CA | 69563 | A1 | 6/2016 |
| CL | 2017001404 | A1 | 2/2018 |
| CN | 1285379 | A | 2/2001 |
| CN | 1589764 | A | 3/2005 |
| CN | 1732022 | A | 2/2006 |
| CN | 1277584 | C | 10/2006 |
| CN | 1920162 | A | 2/2007 |
| CN | 101321777 | A | 12/2008 |
| CN | 102605619 | A | 7/2012 |
| CN | 102965934 | A | 3/2013 |
| CN | 103041440 | A | 4/2013 |
| CN | 107405277 | A | 11/2017 |
| CO | 2017006672 | A2 | 1/2018 |
| EA | 201791221 | A1 | 12/2017 |
| EP | 1118705 | A2 | 7/2001 |
| EP | 1446169 | | 5/2003 |
| EP | 1915436 | | 2/2004 |
| EP | 2099509 | | 6/2008 |
| EP | 2211876 | | 12/2008 |
| EP | 2349366 | | 4/2010 |
| EP | 2421549 | | 10/2010 |
| EP | 2421550 | | 10/2010 |
| EP | 2421551 | | 10/2010 |
| EP | 3052203 | | 8/2016 |
| EP | 8226835 | A1 | 10/2017 |
| GB | 1182153 | A | 2/1970 |
| IN | 201617014277 | | 8/2016 |
| JP | H04100795 | A | 4/1992 |
| JP | H04100975 | A | 4/1992 |
| JP | H05-005275 | A | 1/1993 |
| JP | H08-27186 | B2 | 1/1996 |
| JP | H0816309 | B2 | 2/1996 |
| JP | H07300772 | A | 11/1996 |
| JP | 9-188972 | A | 7/1997 |
| JP | H09188972 | A | 7/1997 |
| JP | H10-212456 | A | 8/1998 |
| JP | H10212456 | | 8/1998 |
| JP | 2000143472 | A | 5/2000 |
| JP | 2000-328455 | A | 11/2000 |
| JP | 2001-262470 | A | 9/2001 |
| JP | 2002080498 | A | 3/2002 |

(56) References Cited

FOREIGN PATENT DOCUMENTS

| | | | |
|---|---|---|---|
| JP | 2002-302874 | A | 10/2002 |
| JP | 2002-363861 | A | 12/2002 |
| JP | 2003-171874 | A | 6/2003 |
| JP | 2003-171875 | A | 6/2003 |
| JP | 2003-171876 | A | 6/2003 |
| JP | 2005510268 | A | 4/2005 |
| JP | 2009-074201 | A | 4/2009 |
| JP | 2010513266 | A | 4/2010 |
| JP | 2011-153389 | A | 8/2011 |
| JP | 2013-512773 | A | 4/2013 |
| JP | 2013-245427 | A | 12/2013 |
| JP | 2014518557 | A | 7/2014 |
| JP | 2016-531943 | A | 10/2016 |
| JP | 2016531943 | | 10/2016 |
| JP | 2018500470 | A | 1/2018 |
| KR | 10-2005-0091040 | A | 9/2005 |
| KR | 20170099920 | | 9/2017 |
| PE | 20171791 | | 12/2017 |
| RU | 2415938 | C2 | 4/2011 |
| SG | 11201704494 | S | 6/2017 |
| WO | 2003/035124 | A2 | 5/2003 |
| WO | 03035124 | A2 | 5/2003 |
| WO | 2004/060424 | A2 | 7/2004 |
| WO | 2004073644 | A2 | 9/2004 |
| WO | 2006008163 | A2 | 1/2006 |
| WO | 2006033473 | A1 | 3/2006 |
| WO | 2007016524 | A2 | 2/2007 |
| WO | 2007/038837 | A1 | 4/2007 |
| WO | 2008083908 | A1 | 1/2008 |
| WO | 2008069919 | A2 | 6/2008 |
| WO | 2008150861 | A1 | 12/2008 |
| WO | 12014145002 | A2 | 2/2009 |
| WO | 2009031620 | A1 | 3/2009 |
| WO | 2010036992 | A2 | 4/2010 |
| WO | 2010123945 | A2 | 10/2010 |
| WO | 2010123946 | A2 | 10/2010 |
| WO | 2010123947 | A2 | 10/2010 |
| WO | 2011008842 | | 1/2011 |
| WO | 2011038401 | | 3/2011 |
| WO | 2011063990 | A2 | 6/2011 |
| WO | 2011069643 | A2 | 6/2011 |
| WO | 2011160098 | A2 | 12/2011 |
| WO | 2012145739 | | 10/2012 |
| WO | 2012145739 | A2 | 10/2012 |
| WO | 2014037453 | | 3/2013 |
| WO | 2013150258 | | 10/2013 |
| WO | 2014011644 | | 1/2014 |
| WO | 2014012099 | A1 | 1/2014 |
| WO | 2014145002 | | 9/2014 |
| WO | 2014145002 | A2 | 9/2014 |
| WO | 2014183053 | | 11/2014 |
| WO | 2015/023789 | A1 | 2/2015 |
| WO | 2015023798 | | 2/2015 |
| WO | 2015048805 | | 4/2015 |
| WO | 2015070108 | | 5/2015 |
| WO | 2015095407 | | 6/2015 |
| WO | 2015110656 | A1 | 7/2015 |
| WO | 2015190292 | A1 | 12/2015 |
| WO | 2016090055 | | 6/2016 |
| WO | 2016090055 | A1 | 6/2016 |
| WO | 2016110873 | A1 | 7/2016 |

OTHER PUBLICATIONS

Notice of Reasons for Rejection, dated Dec. 6, 2022, in Japanese Patent Application No. 2021-150136, 9 pages.
Technical Examination Report and Written Opinion for Brazilian Patent Application No. BR 11 2018 000699-8 dated Dec. 11, 2022.
Technical Examination Report and Written Opinion for Brazilian Patent Application No. BR 12 2022 018222-4 dated Jan. 30, 2023.
Office Action for Chilean PCT National Phase Application N° 201701404 dated Feb. 15, 2023.
Office Action and Search Report for Chinese Patent Application No. 202110835544.X dated Jan. 3, 2023.
Technical Examination Report and Written Opinion for Brazilian Patent Application No. BR 11 2018 000699-8 dated Mar. 30, 2023.
Office Action for Canadian Patent Application No. 2,992,462 dated Mar. 20, 2023.
Office Action for Costa Rica Patent Application No. 2017-000302 dated Feb. 24, 2023.
Search Report for Eurasian Patent Application No. 202390054 dated Apr. 19, 2023.
Office Action for Indonesian Patent Application No. P00202000535 dated Apr. 13, 2023.
Office Action for Canadian Patent Application No. 2,969,563 dated May 8, 2023.
Third Party Pre-Issuance Submission Under 37 CFR 1.290 for U.S. Appl. No. 17/884,341.
Rockwood et al., Materials Fabrication from Bombyx mori Silk Fibroin. Nat Protoc. 6(10) (2011).
Office Action for European Patent Application No. 15 864 424.5 dated Apr. 4, 2023.
Office Action issued in the corresponding Australian Application No. 2022241483 dated Aug. 30, 2023.
Opposition filed in the corresponding Japanese Application No. 2021-113298 dated May 15, 2023.
Opposition Information Statement filed in the corresponding Japanese Application No. 2021-150136.
Decision on Rejection issued in the corresponding Chinese Application No. 202110835544.X dated Sep. 16, 2023.
Japanese Office Action issued in the corresponding Japanese Application No. 2021-150136 dated Oct. 3, 2023.
Notification of Reasons for Revocation issued in corresponding Japanese Patent Application No. 2021-113298 dated Sep. 19, 2023.
Search Report issued in corresponding Singapore Patent Application No. 11201800272U dated Feb. 4, 2019.
Office Action issued in corresponding Eurasian Patent Application No. 201791221/28, dated Jul. 17, 2019, w/ English Translation.
Arai et al.; "Biodegradation of Bombyx mori Silk Fibroin Fibers and Films"; Journal of Applied Polymer Science, vol. 91, 2383-2390 (2004).
Chilean Patent Application No. 1404-2017 Office Action dated Nov. 5, 2018.
English translation of Chilean Patent Application No. 1404-2017 Office Action dated Nov. 5, 2018.
European Patent Application No. 941 Search Report and Written Opinion dated Dec. 10, 2018.
Eurasian Patent Application No. 201791221 Office Action dated Dec. 12, 2018.
English translation of Eurasian Patent Application No. 201791221 Office Action dated Dec. 12, 2018.
Eurasian Patent Application No. 201890289 Office Action dated Dec. 21, 2018.
English translation of Eurasian Patent Application No. 201890289 Office Action dated Dec. 21, 2018.
Columbian Patent Application No. NC2017/0006672 Office Action dated Nov. 5, 2018.
English translation of Columbian Patent Application No. NC2017/0006672 Office Action dated Nov. 5, 2018.
Singapore Patent Application No. 11201800272U Search Report and Written Opinion dated Apr. 2, 2019.
Nakazawa et al.; "Development of Amall-Diameter Vascular Grafts Based on Silk Fibroin Fibers from Bombys mori for Vascular Regeneration"; Journal of Biomaterials Science 22 (2011) 195-206.
Hardy et al.; "Polymerio materials based on silk proteins"; Polymer 49 (2008) 4309-4327.
Hoffman et al.; "Silk fibroin as an organic polymer for controlled drug delivery"; Journal of Controlled Release 111 (2006) 219-227.
Sielc, "Separation of Potassium, Reverse Elution Order in Separation of Alkali Cation" (2012).
Singapore Patent Application No. 11201704494S Search Report and Written Opinion dated Apr. 23, 2018.
European Patent Application No. 15864424.5 Supplemental Search Report dated Aug. 23, 2018.
Celinkaya et al.; "Silk Fiber Mechanics from Multiscale Force Distribution Analysis", Biophysical Journal, vol. 100, Mar. 2011, 1298-1305.

(56) References Cited

OTHER PUBLICATIONS

Cho et al.; "Molecular weight distribution and solution properties of silk fibroins with different dissolution conditions"; International Journal of Biological Macromolecules, 51 (2012) 336-341.
Fan et al.; "Vitamin C-reinforcing silk fibroin nanofibrous matrices for skin care application"; RSC Advances, 2012, 2, 4110-4119.
Fournier; "Quantitative data on the *Bombyx mori* L. silkworm: a review"; Biochimie, 1979, 61, 293-320.
Gilbert et al.; "Dispersity in Polymer Science", Pure Appl. Chem., vol. 1, No. 2, pp. 351-353, 2009.
Hyde et al.; "Molecular Weight of Silk Fibroin"; Journal of Polymer Science, vol. 58, pp. 1082-1088 (1962).
Molla et al.; "Stabilization of Bombyx mori silk fibroin/sericin films by crosslinking with PEG-DE 600 and genipin", Journal of Bioactive and Compatible Polymers, 26(2) 130-143 (2011).
Pandit et al.; "Studies on Silk Fibroin, I. molecular Weight, Sedimentation Coefficient, Viscosity and Optical Rotation of Silk Fibroin from Carbonate-Extracted Silk Fiber", Archives of Biochemistry and Biophysics 149, 259-268 (1972).
Paula's Choice; "Jar Packaging: A Waste of Good Antioxidents & Money"; The Cosmetics Cop; 3 pages (2012).
Preda et al.; "Bioengineered Silk Proteins to Control Cell and Tissue Functions", Protein Nanotechnology: Protocols, Instrumentation, and Applications, Methods in Molecular Biology, vol. 996, (2013) DOI 10.1007/978-1-62703-354-1_2.
Rockwood et al.; "Materials fabrication from Bombyx mori silk fibroin", Nature Prolocols, vol. 6, No. 10, 2011, pp. 1612-1631.
Sah et al.; "Regenerated Silk Fibroin from B. mori Silk Cocoon for Tissue Engineering Applications"; International Journal of Environmental Science and Development, vol. 1, No. 5. Dec. 2010.
Wang et al.; "Design and engineering of silk fibroin scaffolds with biometric hierarchical structures"; Chem Commun, 2013. 49, 1431.
Wang et al.; "Effect of Various Dissolution Systems on the Molecular Weigl at of Regenerated Silk Fibroin"; American Chemical Society, BioMacromolecules 2013, 14, 285-289.
Wray et al.; "Effect of Processing on Silk-Based Biomaterials: Reproducibility and Biocompatibility"; J. Biomed Mater Res B Appl Biomater. Oct. 2011; 99(1): 89-101.
Zhang et al.; "Stabilization of vaccines and antibiotics in silk and eliminating the cold chain"; PNAS, Jul. 24, 2012, vol. 109, No. 30, 11981-11988.
International Patent Application No. PCT/US14/58462, International Search Report, dated Mar. 2, 2015.
International Patent Application No. PCT/US2015/063545 IPRP dated 2016.
International Patent Application No. PCT/US15/63545, International Search Report, dated Jan. 28, 2016.
International Patent Aplication No. PCT/US2016/042316 IPRP dated Aug. 16, 2017.
International Patent Application No. PCT/US2016/042316 ISR and WO dated Dec. 15, 2016.
European Patent Application No. 15864424.5 Search opinion daled Aug. 23, 2018.
European Patent Application No. 16825194 supplemental search report and written opinion dated Dec. 10, 2018.
European Patent Application No 16825194 supplemental search report dated Nov. 30, 2018.
European Patent Application No. 201791221 office action dated May 28, 2018.
English translation of European Patent Application No. 201791221 office action dated May 28, 2018.
Eurasian Patent Application No. 201890289 Office Action date Sep. 6, 2019.
English translation of Eurasian Patent Application No. 201890289 Office Action dated Sep. 6, 2019.
Brazil Patent Application No. 112017011641 Office Action dated Aug. 27, 2019.
English translation of Brazil Patent Application No. 112017011641 Office Action dated Aug. 27, 2019.
Singapore Patent Application No. 11201704494S Search Report and Written Opinion dated Feb. 18, 2019.
Singapore Patent Application No. 11201704494S Search Report dated Apr. 23, 2018.
Singapore Patent Application No. 11201800272SRNT daled Apr. 2, 2019.
Yamada et al., "AFM Observation of Silk Fibroin on mica substrates: Morphologies Reflecting the Structures," Thin Solid Films, 440 (2003), 208-216.
Wang et al., "Nanolayer Biomaterial Coatings of Silk Fibroin for Controlled Release," J. Control Aug. 28, 2007; 121(3): 190-199.
Notification of Provisional Rejection for corresponding Korean Patent Application No. 10-2018-7004352 dated Sep. 24, 2022, 9 pages.
Office Action for related Canadian Patent Application No. 2,992,462 dated Aug. 10, 2022, 4 pages.
Office Action dated Jul. 8, 2022 for Chilean Patent Application No. 2017-001404.
Office Action dated Jul. 29, 2022 for Saudi Arabian Patent Application No. 521420956.
Technical Examination Report for corresponding Application No. BR 11 2018 000699-8 dated Jun. 6, 2022, 6 pages.
Rabotyagova, O.S. et al. Protein based Block Copolymers. Biomacromolecules, 12(2): 269-289 (2011).
Office Action dated Mar. 16, 2022 for related Chinese Patent Application No. 201680053476.9 (w/ English translation).
Office Action dated Mar. 25, 2022 for related Korean Patent Application No. 10-2017-7018225 (w/ English translation).
Office Action dated Apr. 28, 2022 for related Eurasian Patent Application No. 202090772 (w/ English translation).
David N. Breslauer, Susan J. Muller, and Luke P. Lee: "Generation of Monodisperse Silk Microspheres Prepared with Microfluidics", Biomacromolecules 2010 11 (3), 643-647.
Office Action for corresponding Canadian Patent Application No. 2,969,563 dated Feb. 2, 2022, 4 pages.
Office Action for corresponding European Patent Application No. 15 864 424.5 dated Mar. 17, 2022, 9 pages.
Office Action for corresponding Costa Rica Patent Application No. 2017-0000302 dated Feb. 11, 2022, 9 pages.
Office Action, dated Dec. 21, 2021, for Eurasian Patent Application No. 201890289 (w/ translation).
Office Action, dated Dec. 30, 2021, for Saudi Arabian Patent Application No. 518390735.
Office Action, dated Dec. 24, 2021, for Indonesian Patent Application No. P00201801017.
Office Action, dated Sep. 3, 2021, for Chinese Patent Application No. 201680053476.9 (w/ translation).
Examination Report, mailed Jul. 2, 2021, for Indian Patent Application No. 201817005205.
Examination Report, mailed Jul. 16, 2021, for Peruvian Patent Application No. 000958-2017 (w/ partial translation).
Examination Report, mailed Aug. 31, 2021, for Australian Patent Application No. 2016294611.
Examination Report, mailed Jun. 18, 2021, for Singapore Patent Application No. 11201704494S.
Examination Report, mailed Jun. 18, 2021, for Singapore Patent Application No. 11201800272U.
Office Action dated Jan. 11, 2021 for Chinese Patent Application No. 201680053476.9 (w/ translation).
Xu Yunhui et al. "Preparation and controlled release effect of soybean protein/multicarboxylic acids modified cotton fabric." Chinese Journal of Textile Research, vol. 34, No. 6, pp. 73-78, Jun. 2013 (w/ English abstract).
Wu Huiying. "Study on Modification of Silk Fibroin Solution to Cotton Fabric." Cotton Textile Technology, vol. 42, No. 3, pp. 1-4, Mar. 2014 (w/ English abstract).
Office Action dated Nov. 2, 2020 for Chinese Patent Application No. 201580075200.6 (English translation).
Office Action dated Nov. 9, 2020 for Brazilian Patent Application No. BR112018000699-8 (English translation).
Office Action dated Nov. 24, 2020 for Indonesian Patent Application No. P00201801017 (with partial English summary).

(56) References Cited

OTHER PUBLICATIONS

Office Action dated Dec. 29, 2020 for Eurasian Patent Application No. 201890289 (with English translation).
Office Action dated Nov. 18, 2020 for Costa Rican Patent Application No. 2017-0000302 (with English translation).
Examination Report dated Aug. 10, 2020 for Australian Patent Application No. 2015358537.
Examination Report dated Aug. 21, 2020 for Indian Patent Application No. 201717022753.
Search Report dated Sep. 11, 2020 for Eurasian Patent Application No. 202090772.
Examination Report dated Sep. 17, 2020 for Saudi Arabian Patent Application No. 517381633 (with partial English summary).
Notice of Reasons for Rejection dated Oct. 20, 2020 for Japanese Patent Application No. 2017-529648 (with English translation).
Machine translation of JPH04100975 (Year: 1992).
Yamada et al., "AFM observation of silk fibroin on mica substrates: morphologies refelecting the secondary structure", Thin Solid Films, 440, 2003, pp. 208-216 (Year: 2003).
Machine translation of WO2008083908 (Year: 2008).
Behera et al., "Size recipes for low-humidity weaving of cotton yarn", In J Fibre Textile Res 19:67-70, 1994.
Mizutani et al., "A New Apparatus for the Study of Fabric Drape", Textile Res J 75(1):81-87, 2005.
Oxford Dictionary (https://en.oxforddictionaries.com/definition/adsorb, page visited on Apr. 3, 2017).
Eurasia Patent Application No. 21791221/28 Official Action, dated May 29, 2018, 4 pages.
European Patent Application No. 15864424.5, Extended European Search Report dated Aug. 23, 2018, 30 pages.
Nguyen et al. Biological, Chemical, and Electrical Applications of Nanofibers. Macromol. Mater. Eng. 298:822-867 (2013).
Office Action issued in corresponding Eurasian Application No. 202390054, dated Jun. 28, 2024, 8 pages, with English translation.
Third Party Observations issued in corresponding European Application No. 15864424.5, dated May 13, 2024, 6 pages.
Wang, et al., "Effect of various dissolution systems on the molecular weight of regenerated silk fibroin", ACS Publication, Dec. 6, 2012, pp. 285 to 289.
Written Opinion dated Dec. 20, 2019 for Singapore Patent Application No. 11201704494S.
Yasumoto Nakazawa et al. "Development of Small-Diameter Vascular Grafts Based on Silk Fibroin Fibers from Bombyx mori for Vascular Regeneration." Journal of Biomaterials Science 22 (2011) 195-206.
Office Action dated May 28, 2019 for Indonesian Patent Application No. P-00201704289.
Notice of Reasons for Rejection dated Dec. 24, 2019 for Japanese Patent Application No. 2017-529648.
Office Action dated Dec. 17, 2019 for Chinese Patent Application No. 201580075200.6.
Search Report and Written Opinion dated Aug. 27, 2019 for Brazilian Patent Application No. BR112017011641-3.
First Office Action for Colombian Patent Application No. NC2017/0006672.
Second Office Action for Colombian Patent Application No. NC2017/0006672.
Takayuki Arai et al. "Biodegredation of Bombyx mori Silk Fibroin Fibers and Films." Journal of Applied Polymer Science, vol. 91, 2383-2390 (2004).
Office Action dated Sep. 6, 2019 for Eurasian Patent Application No. 201890289.
Office Action dated Apr. 29, 2020 for Eurasian Patent Application No. 201890289.
Office Action dated Jun. 3, 2019 for Chilean Patent Application No. 2017-001404.
CL 198200371-AKZO NV. Pub. Feb. 4, 1983 (registro 33669).
Third Party Observations filed Jun. 10, 2020 in European Patent Application No. 15864424.5.
Third Party Observations filed Jun. 10, 2020 in European Patent Application No. 16825194.0.
Notice of Reasons for Rejection dated Jul. 28, 2020 for Japanese Patent Application No. 2018-501372.
Office Action for corresponding Korean Patent Application No. 10-2017-7018225 dated Jan. 31, 2024 with translation, 13 pages.
Office Action for corresponding European Patent Application No. 15 864 424.5 dated Dec. 5, 2023, 4 pages.
Office Action for corresponding Canadian Patent Application No. 2,992,462 dated Jan. 19, 2024, 4 pages.
Office Action for corresponding European Patent Application No. 16 825 194.0 dated Sep. 21, 2023, 3 pages.
Hearing Notice for corresponding Indian Patent Application No. 201817005205 dated Dec. 23, 2023, 4 pages.
Office Action for corresponding Korean Patent Application No. 10-2018-7004352 dated Jan. 29, 2024 with translation, 9 pages.
Office Action for corresponding Brazilian Patent Application No. BR 12 2022 018222-4 dated Oct. 26, 2023, 4 pages.
English translation of Office Action for corresponding Japanese Patent Application No. 2022-175910 dated Dec. 25, 2023, 3 pages.
Office Action for corresponding Indonesian Patent Application No. P00202206632 dated Dec. 21, 2023 with translation, 4 pages.
Office Action for corresponding Indonesian Patent Application No. P00202206637 dated Dec. 21, 2023, with translation, 4 pages.
Office Action for corresponding Indonesian Patent Application No. P00202206638 dated Dec. 21, 2023, with translation, 4 pages.
Office Action issued in corresponding Indian Patent Application No. 20187005205, dated Nov. 13, 2024, 2 pages.
Decision of Rejection issued in corresponding Japanese Patent Application No. JP 2022-175910, dated Oct. 21, 2024, 6 pages.

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | Some undissolved silk  | Some undissolved silk  | Significant amount of undissolved silk  | Significant amount of undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | Some undissolved silk  | Small amount of undissolved silk  | Small amount of undissolved silk  | Some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 8 Hours | Small amount of undissolved silk  | Little to no undissolved silk  | Significant amount of undissolved silk  | Some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 12 Hours | Small amount of undissolved silk 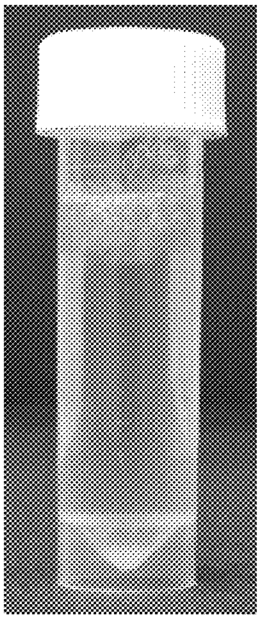 | Little to no undissolved silk 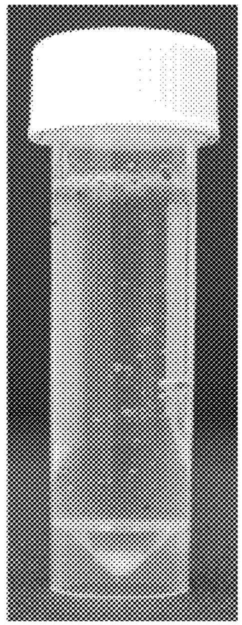 | Some undissolved silk 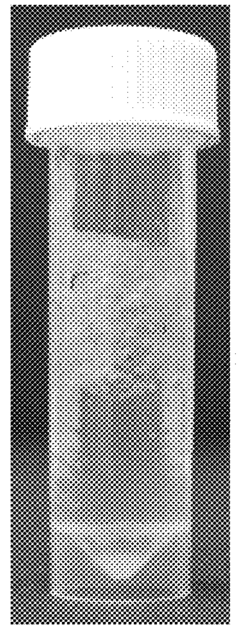 | All but small amount of silk undissolved 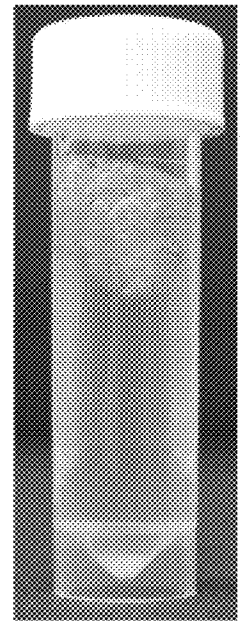 |
| | FIG. 8A | FIG. 8B | FIG. 8C | FIG. 8D |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 24 Hours | Small amount of undissolved silk  | Little to no undissolved silk  | Some undissolved silk  | All but small amount of silk undissolved  |

| Time Point | 1<br>Sericin was extracted at 100°C, 30 min | 2<br>Sericin was extracted at 100°C, 30 min | 3<br>Sericin was extracted at 90°C, 30 min | 4<br>Sericin was extracted at 90°C, 60 min |
|---|---|---|---|---|
| 168 Hours (1&2)<br>192 Hours (3&4) | No undissolved silk, only slightly cloudy<br> | No undissolved silk, completely clear<br> | Some undissolved silk<br> | Slight amount of undissolved silk<br> |

| Sericin was extracted at 100°C, 60 min | | |
|---|---|---|
| Hour 1 | Hour 4 | Hour 6 |
| Large amount of undissolved silk  | Small amounts of undissolved silk and debris  | Small amounts of floating debris  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | Significant amount of undissolved silk  | Significant amount of undissolved silk and debris  | Significant amount of undissolved silk, highly viscous  | Significant amount of undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | Some undissolved silk  | Some undissolved silk  | Significant amount of undissolved silk, highly viscous  | Some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | Small amount of undissolved silk  | Small amount of silk undissolved  | Some undissolved silk  | Some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | Very small amount of undissolved silk, quire viscous, precipitate formed from bubbles  | Less viscous than set 1, no undissolved silk  | Highly viscous, some undissolved silk  | Less viscous than set 3, some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | Extremely small amount of undissolved silk  | No undissolved silk  | Highly viscous, some undissolved silk  | Some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | Extremely small amount of undissolved silk  | No undissolved silk  | Highly viscous, some undissolved silk  | Almost no undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | Small amount of undissolved silk, some precipitate from bubbles 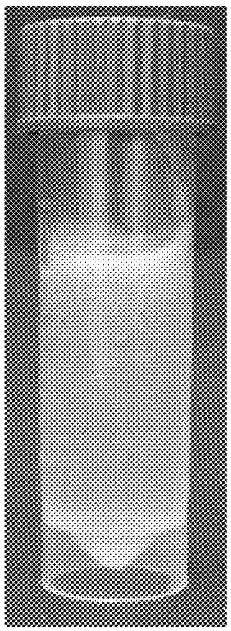 | All silk dissolved, some precipitate from bubbles 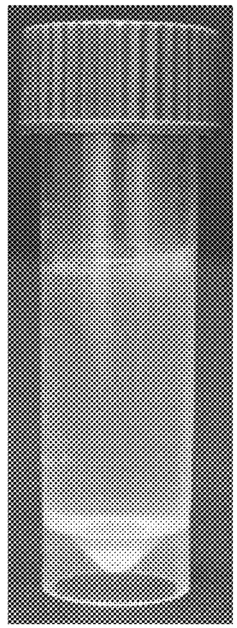 | Some precipitate from bubbles and undissolved silk 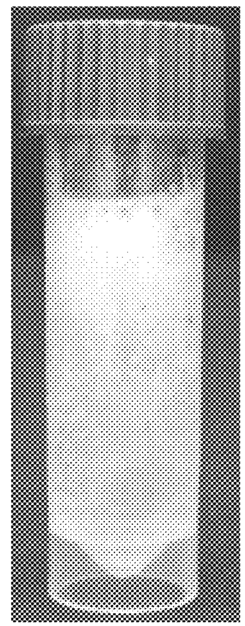 | Some precipitate from bubbles and undissolved silk 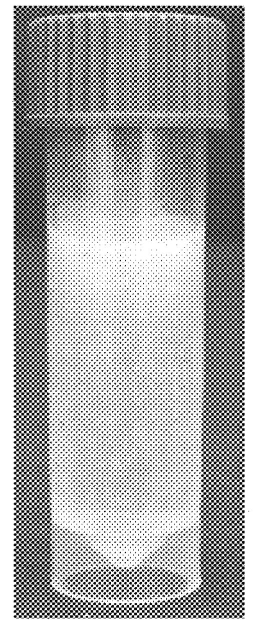 |

FIG. 18A FIG. 18B FIG. 18C FIG. 18D

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | All silk dissolved, some precipitate from bubbles  | Completely clear with no precipitate  | Some undissolved silk  | Some precipitate from bubbles, mostly clear solution  |

| Time Point | Sericin was extracted at 100°C, 30 min | Sericin was extracted at 100°C, 60 min | Sericin was extracted at 90°C, 30 min | Sericin was extracted at 90°C, 60 min |
| --- | --- | --- | --- | --- |
| 6 Hours | Some precipitate from bubbles, no undissolved silk 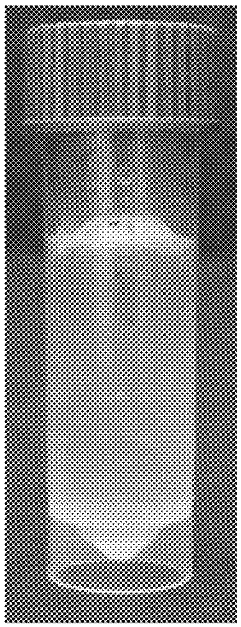 | Clear with no precipitate or silk 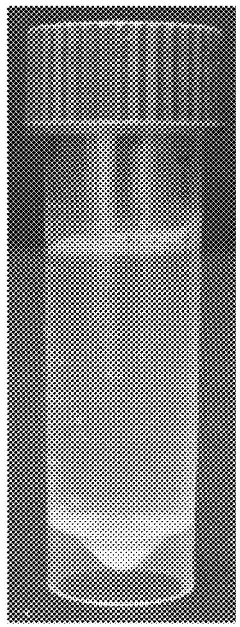 | Some undissolved silk 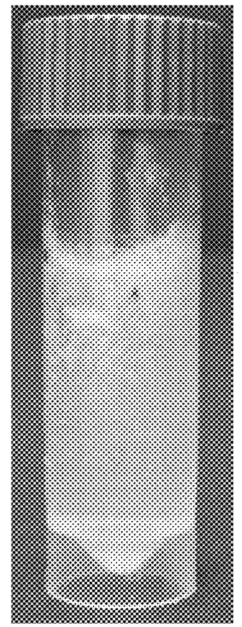 | Clear and no undissolved silk 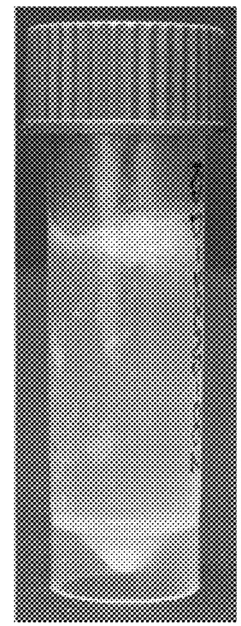 |
FIG. 20A
FIG. 20B
FIG. 20C
FIG. 20D

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | Most silk dissolved, some precipitate from bubbles 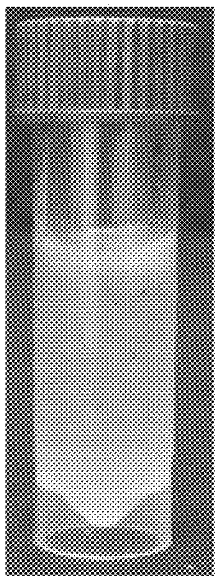 | Most silk dissolved, some slight precipitate from bubbles 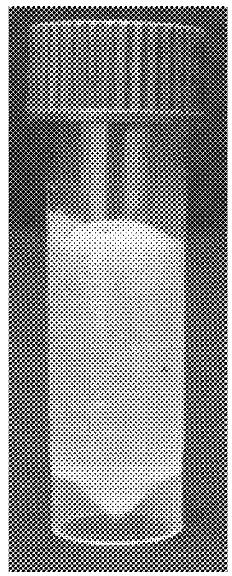 | Some precipitate from bubbles and significant amount of dissolved silk 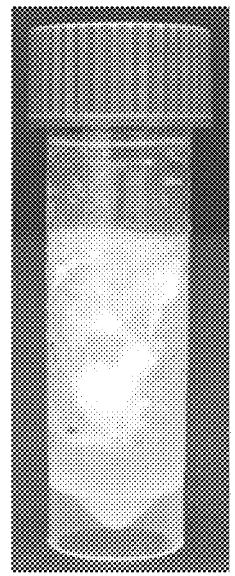 | Significant amount of undissolved silk 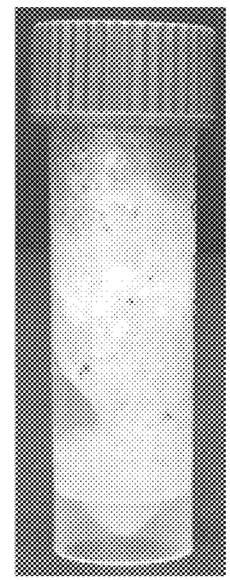 |

FIG. 21A FIG. 21B FIG. 21C FIG. 21D

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | Completely clear, no silk or precipitate  | Some precipitate from bubbles  | Cloudy with some undissolved silk  | Very viscous with some undissolved silk  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | Slightly cloudy with silk particles on top  | Cloudy with precipitate from bubbles  | Highly viscous, cloudy, almost solid  | Highly viscous, cloudy, almost solid  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | Some undissolved silk, viscosity slightly highter than set 2 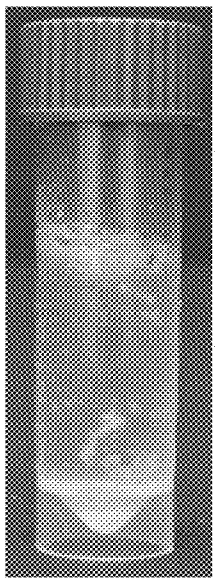 | Viscosity similar to water, nearly all silk completely dissolved and no precipitate, clear orange/yellow 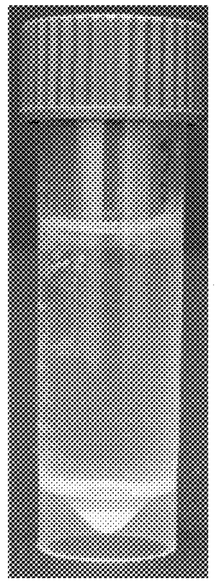 | Highly viscous, some undissolved silk and bubbles 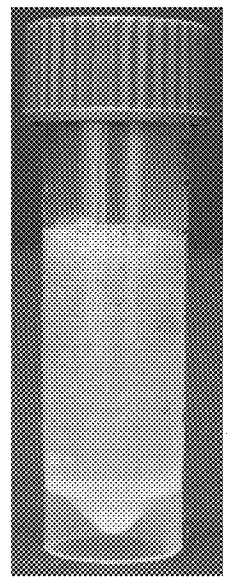 | Some undissolved silk but not too viscous 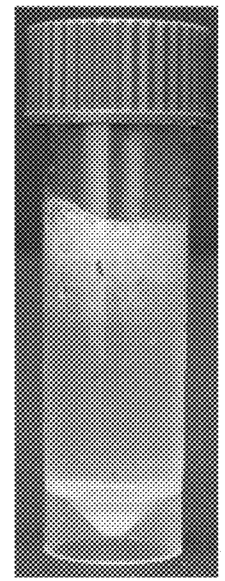 |

FIG. 24A FIG. 24B FIG. 24C FIG. 24D

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | Some undissolved silk, cloudy, slightly viscous  | Very slight amount of silk undissolved, clear with darker color  | Some undissolved silk, highly viscous  | Small amount of undissolved silk, not too viscous  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | Slightly cloudy with some undissolved silk  | Clear with darker color  | Some undissolved silk, viscous  | Darker color, some undissolved silk, slightly cloudy  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | Somewhat cloudy with darker color, some silk particles 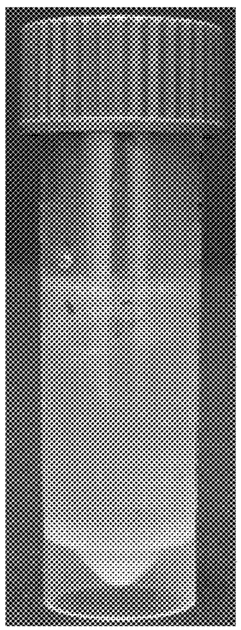 | Completely clear with dark color, slight amount of silk particles 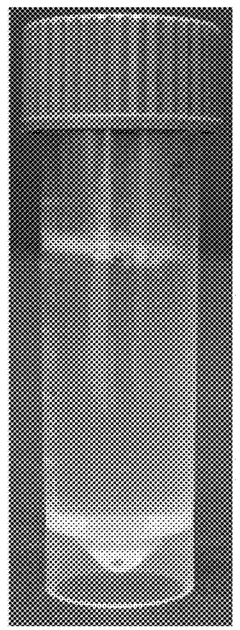 | Cloudy, some undissolved silk, highly viscous 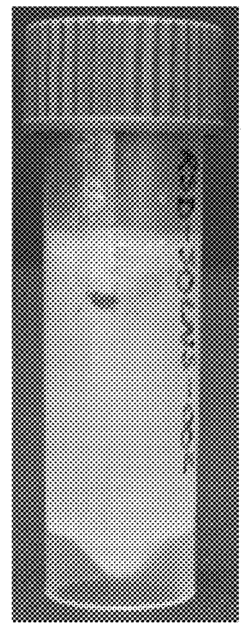 | Small amount of undissolved silk, partially cloudy, darker color 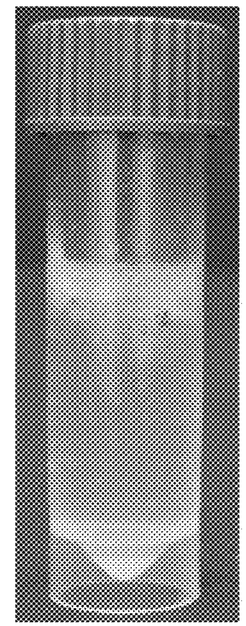 |

FIG. 27A FIG. 27B FIG. 27C FIG. 27D

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | Small amount of undissolved silk, highly cloudy  | Little to no undissolved silk, deep auburn color  | Some undissolved silk, highly cloudy  | Slight amount of silk particles, dark color, less viscous  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | Slightly cloudy, slight amount of dissolved silk  | No undissolved silk, completely clear, dark auburn  | Cloudy, viscous, some undissolved silk  | Slight amount of undissolved silk, slightly cloudy  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 1 Hour | All silk dissolved, cloudy  | All silk dissolved, clear  | All silk dissolved, viscous, cloudy  | All silk dissolved, viscous, cloudy  |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 4 Hours | All silk dissolved, slightly cloudy but mostly clear<br> | All silk dissolved, clear, dark<br> | All silk dissolved, cloudy<br> | All silk dissolved, cloudy<br> |

| Time Point | Sericin was extracted at 100°C, 30 min | Sericin was extracted at 100°C, 60 min | Sericin was extracted at 90°C, 30 min | Sericin was extracted at 90°C, 60 min |
|---|---|---|---|---|
| 6 Hours | All silk dissolved, cloudy  | All silk dissolved, clear  | All silk dissolved, cloudy  | All silk dissolved, only slightly cloudy  |

Lithium Bromide and Sodium Carbonate Concentration in Silk Protein Solution

| Sample ID | Sample Description | Average Concentration of Na2CO3 (ppm) | Average Concentration of LiBr (ppm) |
|---|---|---|---|
| A | TFF 5kDa | 32.13 | 90.85 |
| B | TFF 10 kDa | 42.91 | 107 |
| C | TFF 10 kDa | 49.06 | 78.55 |
| D | STI 1(TFF-10-0019) | 2.17 | 129.07 |
| E | STI 2(TFF-10-0033) | 2.63 | 196.2 |
| F | STI 3(TFF-10-0034) | 4.18 | 248.93 |

Method: 100C extraction for 60 min, 60C rinse, 100C LiBr in 100C oven for 60 min. Note that TFF could be run for longer and/or at different flow rates (as varied between A-C and D-F) to alter ppm of Na2C2O3 and LiBr.

FIG. 34

Lithium Bromide and Sodium Carbonate content in Silk Protein Solution

| Sample ID | Solution Volume Equivalent to (X) Films | Sample Weight (mg) | Concentration | |
|---|---|---|---|---|
| | | | Na2CO3 | LiBr |
| 1 | 6 | 0.171 | ND | ND |
| 2 | 8 | 0.228 | ND | ND |
| 3 | 10 | 0.285 | ND | ND |
| 4 | 12 | 0.342 | ND | ND |
| 5 | Neat | - | ND | ND |

*ND = None Detected

Method: 100C boil for 60 min, 60C rinse, LiBr in 60C oven for 4-6 hours

FIG. 35

Stability to Vitamin C in Solution

| Sample ID | Time (hour) | Actual Conc. (µg/mL) | Area | Concentration Vit C (µg/mL) | Recovered (%) | Stability (%) After 24 hrs. |
|---|---|---|---|---|---|---|
| A | 0 | 82.4 | 4277.9 | 80.53 | 97.73 | |
| B | 26 | 82.4 | 4088.94 | 77.62 | 94.2 | |
| Average = | | | 4183.42 | 79.07 | 95.96 | 96.39 |
| Std. Dev. = | | | 133.62 | 2.06 | 2.49 | |
| % Error | | | 3% | 3% | 3% | |

Method: Vitamin C solution (no silk)

FIG. 36

Molecular Weights of Silk Protein Solutions

| Sample ID | Sample Description | Mn | Mw | Polydispersity (PD) (Mw/Mn) |
|---|---|---|---|---|
| A | TFF 5kDa | 14,497 | 33,874 | 2.3366 |
| B | TFF 10 kDa | 14,542 | 33,455 | 2.3006 |
| C | TFF 10 kDa | 14,972 | 34,026 | 2.2726 |
| D | Silk protein solution in water | 12,055 | 26,531 | 2.2008 |

Method:
TFF: 100C extraction for 60 min, 60C rinse, 100C LiBr in 100C oven for 60 min.
Silk Protein: 100C extraction for 20 min, RT rinse, LiBr in 60C oven for 4-6 hours

FIG. 37

| Sample | LiBr (M) | Avg MW | PD |
|---|---|---|---|
| STI 1(TFF-10-0019) | 9.3 | 15727 | 2.033 |
| STI 2(TFF-10-0033) | 9.3 | 24587 | 2.3669 |
| STI 3(TFF-10-0034) | 9.3 | 25273 | 2.338 |
| STI 9.3 M avg | | 21862 | 2.25 |
| STI 1(TFF-10-0031) | ~7.5 | 29645 | 3.0868 |
| STI 2(TFF-10-0030) | ~7.5 | 26856 | 2.9748 |
| STI 7.5M avg | | 28250.5 | 3.0308 |

* TFF-10-0019 from 2 25g extraction/ 35g dissolution
* TFF-10-0034 from 100g extraction/ 17-35 g dissolution

* TFF-10-0033 from 100g extraction/ 100 g dissolution

FIG. 39

| | Testing Results: | | | | | | | | | | |
|---|---|---|---|---|---|---|---|---|---|---|---|
| | | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
| **16040101** | Mean | 6.2062 | 7.2188 | 8.7689 | 5.1279 | 5 | 5 | 0.8888 | 0.7830 | 599.4741 | 0.5028 |
| **16040102** | Mean | | | | | | | | | | |
| **16040103** | Mean | 4.5005 | 6.6565 | 6.4329 | 5.6507 | 5 | 5 | 1.0684 | 0.8066 | 613.2260 | 0.5019 |
| **16040106** | Mean | 4.2000 | 5.4564 | 12.7828 | 8.5878 | 5 | 5 | 1.1428 | 0.9071 | 374.3193 | 0.4723 |
| **16040105** | Mean | 4.3310 | 4.8936 | 11.8091 | 10.4725 | 5 | 5 | 1.1096 | 0.9923 | 364.2011 | 0.4650 |
| **16040104** | Mean | 4.9498 | 4.1248 | 14.0804 | 17.1970 | 5 | 5 | 1.1247 | 1.2175 | 287.8853 | 0.4207 |
| **15042001** | Mean | 6.103 | 4.2124 | 8.6855 | 15.8154 | 5 | 5 | 0.8041 | 1.1509 | 88.4355 | 0.1827 |

FIG. 327

| | Testing Results: | | | | | | | | | | |
|---|---|---|---|---|---|---|---|---|---|---|---|
| | | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
| 16040101 | Grade | 3 | 3 | 1 | 1 | 1 | 1 | 1 | 1 | 5 | 3 |
| 16040102 | | | | | | | | | | | |
| 16040103 | | 4 | 3 | 1 | 1 | 1 | 1 | 2 | 1 | 5 | 3 |
| 16040104 | | 4 | 4 | 2 | 2 | 1 | 1 | 2 | 2 | 4 | 3 |
| 16040105 | | 4 | 4 | 2 | 2 | 1 | 1 | 2 | 1 | 4 | 3 |
| 16040106 | | 4 | 3 | 2 | 1 | 1 | 1 | 2 | 1 | 4 | 3 |
| 15042001 | | 3 | 4 | 1 | 2 | 1 | 1 | 1 | 2 | 2 | 1 |

FIG. 328

| | Testing Results: | | | | | | | | | | |
|---|---|---|---|---|---|---|---|---|---|---|---|
| | | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
| 16040801 | Mean | 32.5310 | 6.5620 | 3.8394 | 2.8465 | 5 | 5 | 0.1528 | 0.7407 | 461.1657 | 0.5000 |
| 16040802 | Mean | 4.5652 | 4.8466 | 8.201 | 5.7837 | 5 | 5 | 1.0535 | 0.9992 | 437.2409 | 0.5028 |
| 16040803 | Mean | 3.9938 | 4.6312 | 13.3611 | 9.2254 | 5 | 7 | 1.1942 | 1.0736 | 433.6376 | 0.5097 |
| 16040804 | Mean | 4.2 | 4.5754 | 12.5656 | 7.9578 | 5 | 5 | 1.1412 | 1.0528 | 432.1879 | 0.5052 |
| 16040805 | Mean | 4.3310 | 4.8936 | 11.8091 | 10.4725 | 5 | 5 | 1.1096 | 0.9923 | 364.2011 | 0.4650 |
| 16040806 | Mean | 4.2936 | 4.425 | 10.4676 | 11.8023 | 5 | 5 | 1.1238 | 1.0855 | 443.8888 | 0.5125 |
| 16040807 | Mean | 4.406 | 4.5936 | 10.4972 | 8.7678 | 5 | 5 | 1.1101 | 1.0603 | 436.9568 | 0.5097 |
| 16040808 | Mean | 5.6434 | 4.256 | 9.4582 | 11.9617 | 5 | 5 | 1.0143 | 1.1318 | 437.3739 | 0.5201 |
| 15042001 | Mean | 6.103 | 4.2124 | 8.6855 | 15.8154 | 5 | 5 | 0.8041 | 1.1509 | 88.4355 | 0.1827 |

FIG. 329

| | Testing Results: | | | | | | | | | | |
|---|---|---|---|---|---|---|---|---|---|---|---|
| | | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
| 16040801 | Grade | 2 | 1 | 1 | 1 | 1 | 1 | 1 | 1 | 5 | 3 |
| 16040802 | | 4 | 4 | 1 | 1 | 1 | 1 | 2 | 1 | 5 | 3 |
| 16040803 | | 4 | 4 | 2 | 1 | 1 | 1 | 2 | 2 | 5 | 3 |
| 16040804 | | 4 | 4 | 2 | 1 | 1 | 1 | 2 | 2 | 5 | 3 |
| 16040805 | | 2 | 2 | 1 | 1 | 1 | 1 | 1 | 1 | 5 | 3 |
| 16040806 | | 4 | 4 | 2 | 4 | 1 | 1 | 2 | 2 | 5 | 3 |
| 16040807 | | 4 | 4 | 2 | 4 | 1 | 1 | 2 | 2 | 5 | 3 |
| 16040808 | | 3 | 4 | 1 | 2 | 1 | 1 | 2 | 2 | 5 | 3 |
| 15042001 | | 3 | 4 | 1 | 2 | 1 | 1 | 1 | 2 | 2 | 1 |

FIG. 330

Testing Results:

| | Mean Values | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
|---|---|---|---|---|---|---|---|---|---|---|---|
| 16041201 | 1% low mw, 150C, 10 min | 4.9498 | 5.381 | 10.1284 | 7.8688 | 5 | 5 | 0.9978 | 0.9255 | 244.6475 | 0.3296 |
| 16041202 | 1% low mw, 200C, 10 min | 14.6560 | 15.8747 | 6.8175 | 3.3093 | 5 | 5 | 0.3982 | 0.3609 | 256.3562 | 0.3404 |
| 16041302 | 1% low mw, 150C, 5 min | 4.9594 | 4.65 | 8.9505 | 12.7455 | 5 | 5 | 1.117 | 1.1924 | 170.7486 | 0.2834 |
| 16041303 | 1% low mw, 200C, 3 min | 4.822 | 5.1782 | 11.3758 | 6.8097 | 5 | 5 | 1.0106 | 0.9397 | 250.1812 | 0.3364 |
| 16041203 | 1% medium mw, 200C, 10 min | 36.4377 | 48.9377 | 4.4255 | 3.0289 | 5 | 5 | 0.1758 | 0.1077 | 163.9531 | 0.2377 |
| 16041204 | 1% medium mw, 150C, 10 min | 7.0122 | 6.8058 | 12.668 | 12.0749 | 5 | 5 | 0.8715 | 0.9216 | 90.3758 | 0.1858 |
| 16041305 | 1% medium mw, 200C, 3 min | 6.469 | 63.703 | 7.32785 | 3.18745 | 5 | 2.5 | 0.87815 | 0.2614 | 561.1452 | 0.5 |
| 16041306 | 1% medium mw, 150C, 5 min | 15.1498 | 11.2872 | 12.8199 | 5.54318 | 10 | 6 | 0.67668 | 0.782 | 151.81352 | 0.23198 |
| 16041301 | no coating, 150C, 5 min | 4.1906 | 4.0594 | 13.16422 | 9.1083 | 5 | 5 | 1.1456 | 0.9716 | 219.342 | 0.30542 |
| 16041304 | no coating, 200C, 3 min | 5.4375 | 2.64825 | 7.775525 | 10.8061 | 5 | 5 | 0.922975 | 1.021225 | 219.26975 | 0.391575 |

FIG. 331

Testing Results:

| | | Wetting Time Top | Wetting Time Bottom | Top Absorption Rate | Bottom Absorption Rate | Top Max Wetted Radius | Bottom Max Wetted Radius | Top Spreading Speed | Bottom Spreading Speed | Accumulative One-Way Transport | Over all Moisture Management Capability |
|---|---|---|---|---|---|---|---|---|---|---|---|
| | | (sec) | (sec) | (%/sec) | (%/sec) | (mm) | (mm) | (mm/sec) | (mm/sec) | index(%) | OMMC |
| 16041201 | Grade | 3 | 3 | 2 | 1 | 1 | 1 | 1 | 1 | 4 | 2 |
| 16041202 | | 3 | 3 | 1 | 1 | 1 | 1 | 1 | 1 | 4 | 2 |
| 16041302 | | 4 | 4 | 1 | 2 | 1 | 1 | 2 | 2 | 3 | 2 |
| 16041303 | | 4 | 3 | 2 | 1 | 1 | 1 | 2 | 1 | 4 | 2 |
| 16041203 | | 2 | 2 | 1 | 1 | 1 | 1 | 1 | 1 | 3 | 2 |
| 16041204 | | 3 | 3 | 2 | 2 | 1 | 1 | 1 | 1 | 2 | 1 |
| 16041305 | | 3 | 2 | 1 | 1 | 1 | 1 | 1 | 1 | 5 | 3 |
| 16041306 | | 3 | 3 | 2 | 1 | 2 | 1 | 1 | 1 | 4 | 2 |
| 16041301 | | 4 | 4 | 2 | 1 | 1 | 1 | 2 | 1 | 4 | 2 |
| 16041304 | | 3 | 5 | 1 | 2 | 1 | 1 | 1 | 1 | 4 | 2 |

FIG. 332

| | Testing Results: | | | | | | | | | | |
|---|---|---|---|---|---|---|---|---|---|---|---|
| | | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
| 16041301 | Mean | 4.1906 | 4.0594 | 13.16422 | 9.1083 | 5 | 5 | 1.1456 | 0.9716 | 219.342 | 0.30542 |
| 16041302 | Mean | 4.9594 | 4.65 | 8.9505 | 12.7455 | 5 | 5 | 1.117 | 1.1924 | 170.7486 | 0.2834 |
| 16041303 | Mean | 4.822 | 5.1782 | 11.3758 | 6.8097 | 5 | 5 | 1.0106 | 0.9397 | 250.1812 | 0.3364 |
| 16041304 | Mean | 5.4375 | 2.6483 | 7.7755 | 10.8061 | 5 | 5 | 0.9230 | 1.0212 | 291.2698 | 0.3916 |
| 16041305 | Mean | 6.4690 | 63.7030 | 7.3279 | 3.1875 | 5 | 3 | 0.8782 | 0.2614 | 561.1452 | 0.5000 |
| 16041306 | Mean | 15.1498 | 11.2872 | 12.8199 | 5.5432 | 10 | 6 | 0.6767 | 0.7820 | 151.8135 | 0.2320 |
| 15042001 | Mean | 6.103 | 4.2124 | 8.6855 | 15.8154 | 5 | 5 | 0.8041 | 1.1509 | 88.4355 | 0.1827 |
| 16040101 | Mean | 6.2062 | 7.2188 | 8.7689 | 5.1279 | 5 | 5 | 0.8888 | 0.7830 | 599.4741 | 0.5028 |
| 16040106 | Mean | 4.2 | 5.4564 | 12.7828 | 8.5878 | 5 | 5 | 1.1428 | 0.9071 | 374.3193 | 0.4723 |

FIG. 333

| | Testing Results: | | | | | | | | | | |
|---|---|---|---|---|---|---|---|---|---|---|---|
| | | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
| 16041301 | Grade | 4 | 4 | 2 | 1 | 1 | 1 | 2 | 1 | 4 | 2 |
| 16041302 | | 4 | 4 | 1 | 2 | 1 | 1 | 2 | 2 | 3 | 2 |
| 16041303 | | 4 | 3 | 2 | 1 | 1 | 1 | 2 | 1 | 4 | 2 |
| 16041304 | | 3 | 5 | 1 | 2 | 1 | 1 | 1 | 1 | 4 | 2 |
| 16041305 | | 3 | 2 | 1 | 1 | 1 | 1 | 1 | 1 | 5 | 3 |
| 16041306 | | 3 | 3 | 2 | 1 | 2 | 1 | 1 | 1 | 4 | 2 |
| 15042001 | | 3 | 4 | 1 | 2 | 1 | 1 | 1 | 2 | 2 | 1 |
| 16040101 | | 3 | 3 | 1 | 1 | 1 | 1 | 1 | 1 | 5 | 3 |
| 16040106 | | 4 | 3 | 2 | 1 | 1 | 1 | 2 | 1 | 4 | 3 |

FIG. 334

| | Low Molecular Weight (MW) Silk | | | | | | | Medium Molecular Weight (MW) Silk | | | | | | |
|---|---|---|---|---|---|---|---|---|---|---|---|---|---|---|
| | 65C | 150C | | | 200C (385F = 196C) | | | 65C | 150C | | | 200C (385F = 196C) | | |
| Silk conc (%) | 10min | 3min | 5min | 10min | 3min | 5min | 10 | 10 | 3 | 5 | 10 | 3 | 5 | 10 |
| 1.000 | 599.5, 0.5028 | | 151.8, 0.2319 | 90.4, 0.1858 | 613.2, 0.5019 | | 250.2, 0.3364 | 374.3, 0.4723 | | 364.2, 0.4650 | 244.6, 0.3296 | 287.9, 0.4207 | | 256.4, 0.3404 |
| 0.750 | | | 461.2, 0.500 | | | | | | | | | | | |
| 0.500 | | | | | | | | | | 364.2, 0.4650 | | | | |
| 0.250 | 40.6, 0.1327 | | 437.3, 0.5028 | | 188.0, 0.2805 | | | 97.0, 0.1635 | | 106.3, 0.1778 | | 141.6, 0.2236 | | |
| 0.100 | 138.0, 0.2532 | | 112.9, 0.2116 | | 63.4, 0.1260 | | | 134.9, 0.2250 | | 443.9, 0.5125 | | 91.2, 0.1599 | | |
| 0.075 | | | 456.3, 0.5052 | | | | | | | | | | | |
| 0.050 | | | | | | | | | | 436.9, 0.5097 | | | | |
| 0.025 | | | 432.2, 0.5052 | | | | | | | | | | | |
| 0.001 | | | | | | | | | | 437.4, 0.5201 | | | | |
| Fabric Controls (no heat setting) | | non-finished | 88.4, 0.1827 | semi-finished | (-) 6.8, 0.1038 | finished | 62.4, 0.2854 | | | | | | | |

FIG. 335

| test group | description | percentage change |
|---|---|---|
| 160511 | medium mw 0.1% | -0.29% |
| | medium mw 0.25% | -0.21% |
| | low mw 0.1% | -0.23% |
| | low mw 0.25% | -0.42% |
| 160520 | medium mw 1% - SI 2.2% | -0.36% |
| | medium mw 1% - SI 2.2% - acetic acid 0.05% | 0.16% |
| | medium mw 1% - CSP 5% - acetic acid 0.1% | -0.24% |
| | medium mw 1% - CSP 5% - acetic acid 0.1% | -0.29% |
| | medium mw 1% - citric acid 0.1% | -1.88% |
| | medium mw 15% - citric acid 0.05% | 0.61% |
| 160525 | 2.2% SI | -0.34% |
| | 2.2% SI - 0.05% acetic acid | -0.20% |
| | 5% CSP | -0.51% |
| | 5% CSP - 0.1% acetic acid | -0.38% |

FIG. 338

| sample # | variables | mass before coating | mass post coating | mass post 24hrs coating | coating mass % |
|---|---|---|---|---|---|
| 16050401 | 0.1%, medium mw, 65C 10min | 27.8998 | 27.8441 | 27.8797 | -0.07% |
| 16050402 | 0.1%, medium mw, 150C 5min | 27.4518 | 27.3692 | 27.4133 | -0.14% |
| 16050403 | 0.1%, medium mw, 200C 3min | 27.4786 | 27.3371 | 27.3965 | -0.30% |
| 16050404 | 0.25%, medium mw, 65C 10min | 27.4948 | 27.3842 | 27.4556 | -0.14% |
| 16050405 | 0.25%, medium mw, 150C 5min | 27.3981 | 27.3046 | 27.3693 | -0.11% |
| 16050406 | 0.25%, medium mw, 200C 3min | 27.5101 | 27.4633 | 27.5152 | 0.02% |
| 16050407 | 0.1%, low mw, 65C 10min | 27.4390 | 27.3486 | 27.3890 | -0.18% |
| 16050408 | 0.1%, low mw, 150C 5min | 27.7413 | 27.6189 | 27.6738 | -0.24% |
| 16050409 | 0.1%, low mw, 200C 3min | 28.4868 | 28.2885 | 28.3568 | -0.46% |
| 16050410 | 0.25%, low mw, 65C 10min | 27.7291 | 27.6048 | 27.6583 | -0.26% |
| 16050411 | 0.25%, low mw, 150C 5min | 27.7296 | 27.6167 | 27.6878 | -0.15% |
| 16050412 | 0.25%, low mw, 200C 3min | 27.6659 | 27.6153 | 27.6237 | -0.15% |
| 15042001 | no coating | | | | |

FIG. 339

| mean | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability index(%) |
|---|---|---|---|---|---|---|---|---|---|---|
| 16050401 | 3.6562 | 3.9002 | 21.1783 | 19.132 | 5 | 5 | 1.3021 | 1.226 | 138.0962 | 0.2532 |
| 16050402 | 3.7876 | 3.994 | 19.1555 | 15.0486 | 5 | 5 | 1.2542 | 1.1981 | 112.9818 | 0.2116 |
| 16050403 | 4.5562 | 5.4936 | 7.5662 | 6.5758 | 5 | 5 | 1.0592 | 0.8944 | 63.4438 | 0.126 |
| 16050404 | 4.7814 | 5.2688 | 9.5862 | 13.4556 | 5 | 5 | 1.0693 | 1.0128 | 40.5577 | 0.1327 |
| 16050405 | 4.1436 | 4.7154 | 14.1859 | 9.356 | 5 | 5 | 1.1598 | 1.033 | 171.9273 | 0.2539 |
| 16050406 | 4.0502 | 4.481 | 15.0691 | 11.1372 | 5 | 5 | 1.1817 | 1.0909 | 188.01 | 0.2805 |
| 16050407 | 4.03876 | 4.51684 | 15.431 | 12.24992 | 5 | 5 | 1.1914 | 1.08848 | 134.89182 | 0.22504 |
| 16050408 | 4.05 | 4.8188 | 14.7362 | 11.2181 | 5 | 5 | 1.2453 | 1.1026 | 119.3349 | 0.2133 |
| 16050409 | 4.6122 | 5.625 | 14.8515 | 9.1391 | 5 | 5 | 1.0401 | 0.8718 | 91.2189 | 0.1599 |
| 16050410 | 4.3312 | 6.45 | 9.3714 | 7.5046 | 5 | 5 | 1.1074 | 0.7927 | 97.0366 | 0.1635 |
| 16050411 | 4.2002 | 5.0626 | 13.4135 | 8.2152 | 5 | 5 | 1.1403 | 0.9616 | 106.3481 | 0.1778 |
| 16050412 | 4.1436 | 4.6874 | 14.1363 | 11.1217 | 5 | 5 | 1.1583 | 1.0408 | 141.6139 | 0.2236 |
| 15042001 | 6.103 | 4.2124 | 8.6855 | 15.8154 | 5 | 5 | 0.8041 | 1.1509 | 88.4355 | 0.1827 |

FIG. 340

| sample # | variables | mass before coating | mass post coating | mass post 24hrs coating | coating mass % |
|---|---|---|---|---|---|
| 16051101 | no coating, 65C, 10min | 27.7959 | 27.7209 | 27.7958 | 0.00% |
| 16051102 | no coating, 150C, 5min | 27.5591 | 27.4186 | 27.5361 | -0.08% |
| 16051103 | no coating, 200C, 3min | 27.5610 | 27.3764 | 27.5184 | -0.15% |
| 16051104 | 0.1%, medium mw, 200C 3min | 27.6831 | 27.5328 | 27.6529 | -0.11% |
| 16051105 | 0.1%, medium mw, 150C 5min | 27.5614 | 27.4813 | 27.5808 | 0.07% |
| 16051106 | 0.1%, medium mw, 65C 10min | 27.7428 | 27.6970 | 27.7638 | 0.08% |
| 16051107 | 0.25%, medium mw, 65C 10min | 27.4758 | 27.4524 | 27.5281 | 0.19% |
| 16051108 | 0.25%, medium mw, 150C 5min | 28.0202 | 27.9299 | 28.0444 | 0.09% |
| 16051109 | 0.25%, medium mw, 200C 3min | 26.8532 | 26.7314 | 26.8612 | 0.03% |
| 16051110 | 0.1%, low mw, 200C 3min | 27.2731 | 27.1462 | 27.2458 | -0.10% |
| 16051111 | 0.1%, low mw, 150C 5min | 27.2532 | 27.1622 | 27.2574 | 0.02% |
| 16051112 | 0.1%, low mw, 65C 10min | 27.9193 | 27.8521 | 27.9375 | 0.07% |
| 16051113 | 0.25%, low mw, 65C 10min | 27.5451 | 27.5295 | 27.5999 | 0.20% |
| 16051114 | 0.25%, low mw, 150C 5min | 27.5025 | 27.4405 | 27.5743 | 0.26% |
| 16051115 | 0.25%, low mw, 200C 3min | 27.6829 | 27.5671 | 27.6922 | 0.03% |

FIG. 341

| mean | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
|---|---|---|---|---|---|---|---|---|---|---|
| 16051101 | 3.9376 | 4.2564 | 13.2112 | 18.2272 | 5 | 5 | 1.2169 | 1.1411 | 103.023 | 0.2051 |
| 16051102 | 4.1526 | 4.5748 | 14.7715 | 16.11604 | 5 | 5 | 1.17186 | 1.0658 | 59.44466 | 0.14638 |
| 16051103 | 4.5128 | 5.7314 | 12.3379 | 10.5193 | 5 | 5 | 1.0869 | 0.8947 | 83.235 | 0.156 |
| 16051104 | 7.444 | 28.8754 | 6.5736 | 6.9355 | 5 | 5 | 0.8685 | 0.4821 | 72.883 | 0.1365 |
| 16051105 | 4.6498 | 4.6312 | 10.4792 | 11.2174 | 5 | 5 | 1.0467 | 1.0495 | 47.9845 | 0.1206 |
| 16051106 | 4.0688 | 4.5376 | 16.2767 | 17.2449 | 5 | 5 | 1.1941 | 1.1597 | 52.839 | 0.1533 |
| 16051107 | 19.6124 | 13.8564 | 6.996 | 7.9745 | 5 | 7 | 0.82 | 0.7765 | 127.3957 | 0.201 |
| 16051108 | 11.9688 | 26.2188 | 7.1779 | 5.1517 | 5 | 5 | 0.7964 | 0.8926 | 242.7475 | 0.3466 |
| 16051109 | 5.3816 | 10.425 | 8.4204 | 4.1142 | 5 | 5 | 0.9135 | 0.5415 | 223.8266 | 0.3043 |
| 16051110 | 4.4628 | 8.4376 | 7.849 | 4.4341 | 5 | 5 | 1.0764 | 0.6062 | 226.5862 | 0.3073 |
| 16051111 | 3.9752 | 5.2502 | 15.2155 | 11.2055 | 5 | 5 | 1.2513 | 1.1286 | 115.8167 | 0.2153 |
| 16051112 | 4.3346 | 4.5596 | 11.2951 | 12.7915 | 5 | 5 | 1.1111 | 1.0635 | 123.1502 | 0.207 |
| 16051113 | 4.2938 | 4.5376 | 10.8059 | 8.5425 | 5 | 5 | 1.1225 | 1.0614 | 107.2899 | 0.1815 |
| 16051114 | 4.5408 | 4.8404 | 8.6481 | 12.9761 | 5 | 8 | 1.0668 | 1.0496 | 124.2615 | 0.2094 |
| 16051115 | 5.328 | 7.6656 | 7.5532 | 4.8861 | 5 | 5 | 0.9082 | 0.6484 | 113.2722 | 0.1814 |

FIG. 342

| sample number | description | mass before coating | mass 24hrs after coating | coating mass % |
|---|---|---|---|---|
| 16052001 | 1% medium mw, + 2.2% SI | 16.7936 | 16.9149 | 0.72% |
| 16052002 | 1% medium mw, + 2.2% SI + acetic acid 0.5% | 16.0038 | 16.1727 | 1.06% |
| 16052003 | 1% medium mw, + 5% CSP | 17.2366 | 17.4209 | 1.07% |
| 16052004 | 1%, medium mw, + 5% CSP + acetic acid 1% | 16.0087 | 16.1993 | 1.19% |
| 16052005 | 1% medium mw, + 0.1% citric acid | 17.3912 | 17.5276 | 0.78% |
| 16052006 | 1% medium mw, + 0.05% citric acid | 15.4389 | 15.5261 | 0.56% |
| 16052501 | 2.2% SI | 16.5019 | 16.5885 | 0.52% |
| 16052502 | 2.2% SI + acetic acid 0.5% | 18.6291 | 18.7321 | 0.55% |
| 16052503 | 5% CSP | 17.0946 | 17.1797 | 0.50% |
| 16052504 | 5% CSP + acetic acid 1% | 15.2729 | 15.336 | 0.41% |

FIG. 343

| Raw Data: | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index(%) | Over all Moisture Management Capability OMMC |
|---|---|---|---|---|---|---|---|---|---|---|
| 16052001 | 120 | 32.6251 | 0 | 11.4019 | 0 | 4.375 | 0 | 1.4944 | 396.8843 | 0.4432 |
| 16052002 | 120 | 25.0664 | 0 | 9.5604 | 0 | 6.875 | 0 | 2.5826 | 1084.6953 | 0.6414 |
| 16052003 | 120 | 20.5548 | 0 | 11.5085 | 0 | 6.25 | 0 | 2.4735 | 1157.5399 | 0.6303 |
| 16052004 | 120 | 6.4103 | 0 | 12.6385 | 0 | 5.625 | 0 | 2.1531 | 1182.457 | 0.6057 |
| 16052005 | 66.0589 | 34.5352 | 2.8804 | 5.0824 | 3.75 | 3.75 | 0.1023 | 1.7183 | 1165.2373 | 0.5832 |
| 16052006 | 107.4843 | 75.8671 | 1.0243 | 1.3469 | 1.25 | 1.875 | 0.0323 | 0.5417 | 1121.1284 | 0.5243 |
| 16052501 | 120 | 17.5666 | 0 | 12.0892 | 0 | 3.75 | 0 | 1.2849 | 639.587 | 0.56 |
| 16052502 | 120 | 17.1211 | 0 | 25.1403 | 0 | 5.625 | 0 | 2.1137 | 709.6938 | 0.6477 |
| 16052503 | 120 | 105.3281 | 0 | 3.6746 | 0 | 0.625 | 0 | 0.2222 | 845.16 | 0.5148 |
| 16052504 | 120 | 90.7149 | 0 | 3.4472 | 0 | 1.25 | 0 | 0.4365 | 865.4872 | 0.5198 |

FIG. 344

| sample # | variables | mass before coating (gr) | mass post coating (gr) | mass post coating 24 hrs (gr) | coating mass variation (%) |
|---|---|---|---|---|---|
| 16050301 | 1% low mw, 200C 3min | 27.3448 | 27.3546 | 27.4811 | 0.50% |
| 16050302 | 0.1% low mw, 200C, 3min | 27.2618 | 27.0759 | 27.2113 | -0.19% |
| 16050303 | 1% medium mw, 200C 3min | 27.6729 | 27.7292 | 27.8732 | 0.72% |
| 16050304 | 1% medium mw, 200C 3min | 27.3121 | 27.3775 | 27.5029 | 0.70% |
| 16050305 | 1% medium mw, 200C 3min | 27.5503 | 27.6099 | 27.7419 | 0.70% |
| 16050306 | 0.1% medium mw, 200C, 3min | 27.8158 | 27.6649 | 27.7825 | -0.12% |
| 16050307 | 15042001 non wicking finished, 200C, 3 min | 27.7029 | 27.5171 | 27.6341 | -0.25% |
| 16050308 | 15042001 non wicking finished, 200C, 3 min | 27.5277 | 27.3671 | 27.4566 | -0.26% |
| 16050309 | 15042001 non wicking finished, 200C, 3 min | 27.5404 | 27.4003 | 27.4746 | -0.24% |
| 16050310 | 15042001 non wicking finished, 150C, 5 min | 27.5235 | 27.3960 | 27.4786 | -0.16% |
| 16050311 | 15042001 non wicking finished, 150C, 5 min | 27.6228 | 27.5090 | 27.5840 | -0.14% |
| 16050312 | 15042001 non wicking finished, 150C, 5 min | 27.8506 | 27.7355 | 27.8059 | -0.16% |

FIG. 345

| sample # | bacteria | Results: cfu/sample Zero Contact Time | 24hr Contact Time | Percent Reduction |
|---|---|---|---|---|
| 16050301 1% low mw, 200C 3min | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050302 0.1% low mw, 200C, 3min | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050303 | Staphylococus aureus ATCC 6538 | 1.10E+05 | 3.10E+06 | -2718.18% |
| | Klebsiella pneumoniae ATCC 4352 | 2.20E+05 | 5.00E+06 | -2172.73% |
| 16050304 | Staphylococus aureus ATCC 6538 | 1.10E+05 | 3.50E+06 | -3081.82% |
| | Klebsiella pneumoniae ATCC 4352 | 2.20E+05 | 5.00E+06 | -2172.73% |
| 16050305 | Staphylococus aureus ATCC 6538 | 1.10E+05 | 2.90E+06 | -2536.37% |
| | Klebsiella pneumoniae ATCC 4352 | 2.20E+05 | 5.00E+06 | -2172.73% |
| 1% medium mw, 200C 3min | Staphylococus aureus ATCC 6538 | 1.10E+05 | 3.17E+06 | -2778.8% |
| | Klebsiella pneumoniae ATCC 4352 | 2.20E+05 | 5.00E+06 | -2172.73% |
| 16050306 0.1% medium mw, 200C, 3min | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050307 | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050308 | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050309 | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 15042001 non wicking finished, 200C, 3min | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050310 | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050311 | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 16050312 | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |
| 15042001 non wicking finished, 150C, 5min | Staphylococus aureus ATCC 6538 | 1.10E+05 | 5.00E+06 | -4445.45% |
| | Klebsiella pneumoniae ATCC 4352 | 2.20E+05 | 5.00E+06 | -2172.73% |

FIG. 346

| Sample # | Coating Silk Solution Concentration | Bacteria Inoculation | Washing Cycle | Bacteria Enumeration |
|---|---|---|---|---|
| 16060903 | 0.5% | yes | Yes | Yes (at 0, 1 and 10 washing cycle) |
| 16060901 | no | yes | Yes | Yes (at 0, 1 and 10 washing cycle) |
| 16060904 | 0.5% | no | Yes | Yes (at 0, 1 and 10 washing cycle) |
| 16060902 | no | no | Yes | Yes (at 0, 1 and 10 washing cycle) |

FIG. 349

| Washing cycle # | Bacteria load per area group 1 | Areas | Total bacteria load group 1 | Bacteria load per area group 2 | Areas | Total bacteria load | Bacteria enumeration | Tested samples per group |
|---|---|---|---|---|---|---|---|---|
| 0 | 1.00E+07 | 8 | 8.00E+07 | 1.00E+07 | 8 | 8.00E+07 | Yes | 2 |
| 1 | 1.00E+07 | 6 | 6.00E+07 | 1.00E+07 | 6 | 6.00E+07 | Yes | 2 |
| 2 | 1.00E+07 | 4 | 4.00E+07 | 1.00E+07 | 4 | 4.00E+07 | No | |
| 3 | 1.00E+07 | 4 | 4.00E+07 | 1.00E+07 | 4 | 4.00E+07 | No | |
| 4 | 1.00E+07 | 4 | 4.00E+07 | 1.00E+07 | 4 | 4.00E+07 | No | |
| 5 | 1.00E+07 | 4 | 4.00E+07 | 1.00E+07 | 4 | 4.00E+07 | No | |
| 6 | 1.00E+07 | 4 | 4.00E+07 | 1.00E+07 | 4 | 4.00E+07 | No | |
| 7 | 1.00E+07 | 4 | 4.00E+07 | 1.00E+07 | 4 | 4.00E+07 | No | |
| 8 | 1.00E+07 | 4 | 4.00E+07 | 1.00E+07 | 4 | 4.00E+07 | No | |
| 9 | 1.00E+07 | 4 | 4.00E+07 | 1.00E+07 | 4 | 4.00E+07 | No | |
| 10 | 1.00E+07 | 4 | 4.00E+07 | 1.00E+07 | 4 | 4.00E+07 | Yes | 2 |
| 11 | 1.00E+07 | 2 | 2.00E+07 | 1.00E+07 | 2 | 2.00E+07 | No | |
| 12 | 1.00E+07 | 2 | 2.00E+07 | 1.00E+07 | 2 | 2.00E+07 | No | |
| 13 | 1.00E+07 | 2 | 2.00E+07 | 1.00E+07 | 2 | 2.00E+07 | No | |
| 14 | 1.00E+07 | 2 | 2.00E+07 | 1.00E+07 | 2 | 2.00E+07 | No | |
| 15 | 1.00E+07 | 2 | 2.00E+07 | 1.00E+07 | 2 | 2.00E+07 | No | |
| 16 | 1.00E+07 | 2 | 2.00E+07 | 1.00E+07 | 2 | 2.00E+07 | No | |
| 17 | 1.00E+07 | 2 | 2.00E+07 | 1.00E+07 | 2 | 2.00E+07 | No | |
| 18 | 1.00E+07 | 2 | 2.00E+07 | 1.00E+07 | 2 | 2.00E+07 | No | |
| 19 | 1.00E+07 | 2 | 2.00E+07 | 1.00E+07 | 2 | 2.00E+07 | No | |
| 20 | 1.00E+07 | 2 | 2.00E+07 | 1.00E+07 | 2 | 2.00E+07 | No | |
| 21 | 1.00E+07 | 2 | 2.00E+07 | 1.00E+07 | 2 | 2.00E+07 | No | |
| 22 | 1.00E+07 | 2 | 2.00E+07 | 1.00E+07 | 2 | 2.00E+07 | No | |
| 23 | 1.00E+07 | 2 | 2.00E+07 | 1.00E+07 | 2 | 2.00E+07 | No | |
| 24 | 1.00E+07 | 2 | 2.00E+07 | 1.00E+07 | 2 | 2.00E+07 | No | |
| 25 | 1.00E+07 | 2 | 2.00E+07 | 1.00E+07 | 2 | 2.00E+07 | Yes | 2 |

FIG. 350

| Bacteria inoculation | Washing cycle # | Bacteria load |
|---|---|---|
| No | 0 | 0 |
| No | 1 | 0 |
| Yes | 2 | 4.00E+07 |
| Yes | 3 | 4.00E+07 |
| Yes | 4 | 4.00E+07 |
| Yes | 5 | 4.00E+07 |
| Yes | 6 | 4.00E+07 |
| Yes | 7 | 4.00E+07 |
| Yes | 8 | 4.00E+07 |
| Yes | 9 | 4.00E+07 |
| Yes | 10 | 4.00E+07 |
| Yes | 11 | 8.00E+07 |
| Yes | 12 | 8.00E+07 |
| Yes | 13 | 8.00E+07 |
| Yes | 14 | 8.00E+07 |
| Yes | 15 | 8.00E+07 |
| Yes | 16 | 8.00E+07 |
| Yes | 17 | 8.00E+07 |
| Yes | 18 | 8.00E+07 |
| Yes | 19 | 8.00E+07 |
| Yes | 20 | 8.00E+07 |
| Yes | 21 | 8.00E+07 |
| Yes | 22 | 8.00E+07 |
| Yes | 23 | 8.00E+07 |
| Yes | 24 | 8.00E+07 |
| Yes | 25 | 8.00E+07 |

FIG. 351

| Number of Wash | Total Innoculation per Wash Cycle | Swatches Enumeration 16060901 | Swatches Enumeration 16060902 | Swatches Enumeration 16060903 | Swatches Enumeration 16060904 |
|---|---|---|---|---|---|
| 0 | 2.48E+07 | 2.55E+07 | 1.00E+03 | 1.80E+07 | 1.00E+03 |
| 1 | 4.30E+07 | 1.00E+03 | 2.10E+03 | 2.70E+03 | 1.55E+03 |
| 2 | 2.35E+07 | | | | |
| 3 | 2.60E+07 | | | | |
| 4 | 1.85E+07 | | | | |
| 5 | 2.75E+07 | | | | |
| 6 | 1.85E+07 | | | | |
| 7 | 3.00E+07 | | | | |
| 8 | 4.60E+07 | | | | |
| 9 | 3.05E+07 | | | | |
| 10 | 1.21E+07 | 9.99E+02 | 1.00E+03 | 9.99E+02 | 9.99E+02 |

FIG. 352A

| Sample # | Odor Test at t=0 | Comments | Odor Test After 1 Wash | Comments2 | Odor Test After 10 Washes | Comments3 |
|---|---|---|---|---|---|---|
| 16060903 | 1 | very weak scent of dye product | 1 | very weak scent of detergent | 1 | very weak scent of detergent |
| 16060901 | 1 | very weak scent of dye product | 1 | very weak scent of detergent | 1 | very weak scent of detergent |
| 16060904 | 1 | very weak scent of dye product | 1 | very weak scent of detergent | 1 | very weak scent of detergent |
| 16060902 | 1 | very weak scent of dye product | 1 | very weak scent of detergent | 1 | very weak scent of detergent |

| Scale | Comments |
|---|---|
| 0 | no odor |
| 1 | very weak (odor threshold) |
| 2 | weak |
| 3 | distinct |
| 4 | strong |
| 5 | very strong |
| 6 | intolerable |

FIG. 352B

| Figure # | Magnification | Score | Sample # | Coated | Inoculation | Wash Cycle |
|---|---|---|---|---|---|---|
| 359A | 350X | 1 | 16060901 | no | yes | 0 |
| 359B | 1050X | 1 | | | | |
| 359C | 3500X | 1 | | | | |
| 360A | 350X | 1 | 16060902 | no | no | 0 |
| 360B | 1050X | 1 | | | | |
| 360C | 3500X | 1 | | | | |
| 361A | 350X | 1 | 16060903 | yes | yes | 0 |
| 361B | 1050X | 1 | | | | |
| 361C | 3500X | 1 | | | | |
| 362A | 350X | 1 | 16060904 | yes | no | 0 |
| 362B | 1050X | 1 | | | | |
| 362C | 3500X | 1 | | | | |
| 363A | 350X | 1 | 16060901 | no | yes | 1 |
| 363B | 1050X | 1 | | | | |
| 363C | 3500X | 1 | | | | |
| 364A | 350X | 1 | 16060902 | no | yes | 1 |
| 364B | 1050X | 1 | | | | |
| 364C | 3500X | 1 | | | | |
| 365A | 350X | 1 | 16060903 | yes | yes | 1 |
| 365B | 1050X | 1 | | | | |
| 365C | 3500X | 1 | | | | |
| 366A | 350X | 1 | 16060904 | yes | no | 1 |
| 366B | 1050X | 1 | | | | |
| 366C | 3500X | 1 | | | | |
| 367A | 350X | 1 | 16060901 | no | yes | 10 |
| 367B | 1050X | 1 | | | | |
| 367C | 3500X | 1 | | | | |
| 368A | 350X | 1 | 16060902 | no | yes | 10 |
| 368B | 1050X | 1 | | | | |
| 368C | 3500X | 1 | | | | |
| 369A | 350X | 1 | 16060903 | yes | yes | 10 |
| 369B | 1050X | 1 | | | | |
| 369C | 3500X | 1 | | | | |
| 370A | 350X | 1 | 16060904 | yes | no | 10 |
| 370B | 1050X | 1 | | | | |
| 370C | 3500X | 1 | | | | |

| **Description** (% Foreign matter coverage area) | **Score** |
|---|---|
| 0 | 0 |
| < 5% | 1 |
| >5% - <25% | 2 |
| >25% - <50% | 3 |
| >50% - <75% | 4 |
| >75% - <100% | 5 |

FIG. 371

SILK PERFORMANCE APPAREL AND PRODUCTS AND METHODS OF PREPARING THE SAME

CROSS-REFERENCE TO RELATED APPLICATIONS

This Application is a continuation of U.S. application Ser. No. 15/744,566 filed Jan. 12, 2018, which is a 371 of PCT/US2016/042316 filed Jul. 7, 2016, which is a continuation-in-part of International Patent Application No. PCT/US2015/063545, filed Dec. 2, 2015, and further claims the benefit of U.S. Provisional Application No. 62/344,273, filed Jun. 1, 2016, and U.S. Provisional Application No. 62/297,929, filed Feb. 21, 2016, and U.S. Provisional Application No. 62/245,221, filed Oct. 22, 2015, and U.S. Provisional Application No. 62/192,477, filed Jul. 14, 2015. The contents of each of these applications are incorporated herein by reference in their entireties.

FIELD OF THE INVENTION

In some embodiments, the invention relates to silk-coated performance apparel and products for use in home and automotive applications, such as fabrics or leather coated with pure silk fibroin-based proteins or protein fragments thereof.

BACKGROUND OF THE INVENTION

Silk is a natural polymer produced by a variety of insects and spiders, and comprises a filament core protein, silk fibroin, and a glue-like coating consisting of a non-filamentous protein, sericin. Silk fibers are light weight, breathable, and hypoallergenic. Silk is comfortable when worn next to the skin and insulates very well; keeping the wearer warm in cold temperatures and is cooler than many other fabrics in warm temperatures.

SUMMARY OF THE INVENTION

Silk performance apparel and methods of preparing the same are disclosed herein. According to aspects illustrated herein, the present disclosure relates to a product, including, but not limited to, apparel, padding, shoes, gloves, luggage, furs, jewelry and bags, configured to be worn or carried on the body, that is at least partially surface treated with a solution of pure silk fibroin-based protein fragments of the present disclosure so as to result in a silk coating on the product. In some embodiments, the solutions of silk fibroin-based proteins or fragments thereof may be aqueous solutions, organic solutions, or emulsions. In an embodiment, the product is manufactured from a textile material. In an embodiment, the product is manufactured from a non-textile material. In an embodiment, desired additives can be added to an aqueous solution of pure silk fibroin-based protein fragments of the present disclosure so as to result in a silk coating having desired additives.

In an embodiment, a method is provided for coating a material with silk fibroin that may include silk-based proteins or fragments thereof to provide a silk fibroin coated material, wherein the silk fibroin coated upon the silk fibroin coated material may be heat resistant to a selected temperature. In some embodiments, the method may include preparing a silk fibroin solution that may include a concentration of one or more of low molecular weight silk fibroin, medium molecular weight silk fibroin, and high molecular weight silk fibroin at less than about 1% by volume (v/v), or less than about 0.1% by volume (v/v), or less than about 0.01% by volume (v/v), or less than about 0.001% by volume (v/v). In some embodiments, the method may include, coating a surface of the material with the silk fibroin solution. In some embodiments, the method may include drying the surface of the material that has been coated with the silk fibroin solution to provide the silk fibroin coated material, wherein drying the surface of the material comprises heating the surface of the material without substantially decreasing silk fibroin coating performance.

In an embodiment, a method is provided for coating a textile with a silk fibroin solution that may include silk-based proteins or fragments thereof to provide a silk fibroin coated article, wherein the silk fibroin coated upon the silk fibroin coated article may be heat resistant to a selected temperature. In some embodiments, the method may include preparing the silk fibroin solution with one or more of low molecular weight silk fibroin, medium molecular weight silk fibroin, and high molecular weight silk fibroin. In some embodiments, the method may include acidically adjusting the pH of the silk fibroin solution with an acidic agent. In some embodiments, the method may include coating a surface of the textile with the silk fibroin solution. In some embodiments, the method may include drying the surface of the textile that has been coated with the silk fibroin solution to provide the silk fibroin coated article, wherein drying the surface of the textile comprises heating the surface of the textile without substantially decreasing silk fibroin coating performance.

In some embodiments, a method is provided for manufacturing a silk fibroin coated textile that may include selected fabric properties. In some embodiments, the method may include admixing silk-based proteins or fragments thereof with one or more chemical agents to provide a coating solution, wherein the one or more chemical agents may be selected to modify one or more of a first selected property and second selected property of the silk fibroin coated textile. In some embodiments, the method may include providing the coating solution to a textile to be coated with one or more of a bath coating process, a kiss rolling process, a spray process, and a two-sided rolling process. In some embodiments, the method may include removing excess coating solution from the silk fibroin coated textile. In some embodiments, the method may include heating the silk fibroin coated textile to modify a third selected property of the silk fibroin coated textile. In some embodiments, the first selected property may include one or more of an antimicrobial property, a water repellant property, an oil repellant property, a flame retardant property, a coloring property, a fabric softening property, a stain repellant property, a pH adjusting property, an anticrocking property, an antipilling property, and an antifelting property. In some embodiments, the second selected property may include one or more of wetting time, absorption rate, spreading speed, accumulative one-way transport, and overall moisture management capability. In some embodiments, the third selected property may include one or more of fabric hand, fabric stretch, and drapability.

In an embodiment, the silk fibroin coated materials of the invention may be coated with one or more of low molecular weight silk, medium molecular weight silk, and high molecular weight silk to provide resulting coated materials having enhanced hydrophobic or hydrophilic properties.

In and embodiment, materials coated by silk fibroin coatings described herein may include one or more of textiles, woven materials, non-woven materials, knit materials, crochet materials, and leather materials.

In an embodiment, the invention provides an article comprising a fiber or yarn having a coating, wherein the coating comprises silk based proteins or fragments thereof having a weight average molecular weight range of about 5 kDa to about 144 kDa.

In an embodiment, the invention provides an article comprising a fiber or yarn having a coating, wherein the coating comprises silk based proteins or fragments thereof having an average number of amino acid residues of about 1 to 400 residues, or 1 to 300 residues, or 1 to 200 residues, or 1 to 100 residues, or 1 to 50 residues, or 5 to 25 residues, or 10 to 20 residues.

In an embodiment, the invention provides an article comprising a fiber or yarn having a coating, wherein the coating comprises silk based proteins or fragments thereof having a weight average molecular weight range of about 5 kDa to about 144 kDa, and wherein the article is a fabric.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and wherein the proteins or protein fragments, prior to coating the fabric, do not spontaneously or gradually gelate and do not visibly change in color or turbidity when in a solution for at least 10 days.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits an improved property, wherein the improved property is an accumulative one-way moisture transport index selected from the group consisting of greater than 40%, greater than 60%, greater than 80%, greater than 100%, greater than 120%, greater than 140%, greater than 160%, and greater than 180%. In an embodiment, the foregoing improved property is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits an improved property, wherein the improved property is an accumulative one way transport capability increase relative to uncoated fabric selected from the group consisting of 1.2 fold, 1.5 fold, 2.0 fold, 3.0 fold, 4.0 fold, 5.0 fold, and 10 fold. In an embodiment, the foregoing improved property is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits an improved property, wherein the improved property is an overall moisture management capability selected from the group consisting of greater than 0.05, greater than 0.10, greater than 0.15, greater than 0.20, greater than 0.25, greater than 0.30, greater than 0.35, greater than 0.40, greater than 0.50, greater than 0.60, greater than 0.70, and greater than 0.80. In an embodiment, the foregoing improved property is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric exhibits substantially no increase in microbial growth after a number of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits substantially no increase in microbial growth after a number of machine washing cycles selected from the group consisting of 5 cycles, 10 cycles, 25 cycles, and 50 cycles, and wherein the microbial growth is microbial growth of a microbe selected from the group consisting of *Staphylococcus aureus, Klebisiella pneumoniae*, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits substantially no increase in microbial growth after a number of machine washing cycles selected from the group consisting of 5 cycles, 10 cycles, 25 cycles, and 50 cycles, wherein the microbial growth is microbial growth of a microbe selected from the group consisting of *Staphylococcus aureus, Klebisiella pneumoniae*, and combinations thereof, wherein the microbial growth is reduced by a percentage selected from the group consisting of 50%, 100%, 500%, 1000%, 2000%, and 3000% compared to an uncoated fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is applied to the fabric at the fiber level prior to forming the fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is applied to the fabric at the fabric level.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the fabric is bath coated.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the fabric is spray coated.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the fabric is coated with a stencil.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, wherein the coating is applied to at least one side of the fabric using a method selected from the group consisting of a bath coating process, a spray coating process, a stencil process, a silk-foam based process, and a roller-based process.

In an embodiment, the invention provides an article comprising a fiber or yarn having a coating, wherein the coating comprises silk based proteins or fragments thereof having a weight average molecular weight range of about 5 kDa to about 144 kDa, and wherein the coating has a thickness of about one nanolayer.

In an embodiment, the invention provides an article comprising a fiber or yarn having a coating, wherein the coating comprises silk based proteins or fragments thereof having a weight average molecular weight range of about 5 kDa to about 144 kDa, and wherein the coating has a thickness selected from the group consisting of about 5 nm, about 10 nm, about 15 nm, about 20 nm, about 25 nm, about 50 nm, about 100 nm, about 200 nm, about 500 nm, about 1 μm, about 5 μm, about 10 μm, and about 20 μm.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is adsorbed on the fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is attached to the fabric through chemical, enzymatic, thermal, or irradiative cross-linking.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the hand of the coated fabric is improved relative to an uncoated fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the hand of the coated fabric is improved relative to an uncoated fabric, wherein the hand of the coated fabric that is improved is selected from the group consisting of softness, crispness, dryness, silkiness, and combinations thereof.

According to aspects illustrated herein, an aqueous solution of pure silk fibroin-based protein fragments of the present disclosure is available for application to a product, including, but not limited to, apparel, padding, shoes, gloves, luggage, furs, jewelry and bags, or for directly spraying on the body of a consumer, to impart desired properties to the product. In an embodiment, the product is manufactured from a textile material. In an embodiment, the product is manufactured from a non-textile material. In an embodiment, desired additives can be added to an aqueous solution of pure silk fibroin-based protein fragments of the present disclosure so as to result in a silk coating having desired additives.

In an embodiment, a textile comprising a silk coating of the present disclosure is sold to a consumer. In an embodiment, a textile of the present disclosure is used in constructing action sportswear apparel. In an embodiment, a textile of the present disclosure is used in constructing fitness apparel. In an embodiment, a textile of the present disclosure is used in constructing performance apparel. In an embodiment, a textile of the present disclosure is used in constructing golf apparel. In an embodiment, a textile of the present disclosure is used in constructing lingerie. In an embodiment, a silk coating of the present disclosure is positioned on the underlining of action sportswear/apparel. In an embodiment, a silk coating of the present disclosure is positioned on the shell, the lining, or the interlining of action sportswear/apparel. In an embodiment, action sportswear/apparel is partially made from a silk coated textile of the present disclosure and partially made from an uncoated textile. In an embodiment, action sportswear/apparel partially made from a silk coated textile and partially made from an uncoated textile combines an uncoated inert synthetic material with a silk coated inert synthetic material. Examples of inert synthetic material include, but are not limited to, polyester, polyamide, polyaramid, polytetrafluorethylene, polyethylene, polypropylene, polyurethane, silicone, mixtures of polyurethane and polyethylenglycol, ultrahigh molecular weight polyethylene, high-performance polyethylene, nylon, LYCRA (polyester-polyurethane copolymer, also known as SPANDEX and elastomer), and mixtures thereof. In an embodiment, action sportswear/apparel partially made from a silk coated textile and partially made from an uncoated textile combines an elastomeric material at least partially covered with a silk coating of the present disclosure. In an embodiment, the percentage of silk to elastomeric material can be varied to achieve desired shrink or wrinkle resistant properties and desired moisture content against the skin surface. In an embodiment, a silk coating of the present disclosure is positioned on an internal layer of a shoe (textile or non-textile based). In an embodiment, a silk coating of the present disclosure positioned on an internal layer of a shoe helps maintain optimal feet microenvironment, such as temperature and humidity while reducing any excessive perspiration.

In an embodiment, a silk coating of the present disclosure is visible. In an embodiment, a silk coating of the present disclosure is transparent. In an embodiment, a silk coating of the present disclosure positioned on action sportswear/apparel helps control skin temperature of a person wearing the apparel. In an embodiment, a silk coating of the present disclosure positioned on action sportswear/apparel helps control fluid transfer away from the skin of a person wearing the apparel. In an embodiment, a silk coating of the present disclosure positioned on action sportswear/apparel has a soft feel against the skin decreasing abrasions from fabric on the skin. In an embodiment, a silk coating of the present disclosure positioned on a textile has properties that confer at least one of wrinkle resistance, shrinkage resistance, or machine washability to the textile. In an embodiment, a silk coated textile of the present disclosure is 100% machine washable and dry cleanable. In an embodiment, a silk coated textile of the present disclosure is 100% waterproof. In an embodiment, a silk coated textile of the present disclosure is wrinkle resistant. In an embodiment, a silk coated textile of the present disclosure is shrink resistant. In an embodiment, a silk coated fabric improves the health of the skin. In an embodiment, healthy skin can be determined by visibly seeing an even skin tone. In an embodiment, healthy skin can be determined by visibly seeing a smooth, glowing complexion. In an embodiment, a silk coated fabric decreases irritation of the skin. In an embodiment, a decrease in irritation of the skin can result in a decrease in skin bumps or sores. In an embodiment, a decrease in irritation of the skin can result in a decrease in scaly or red skin. In an embodiment, a decrease in irritation of the skin can result in a decrease in itchiness or burning. In an embodiment, a silk coated fabric decreases inflammation of the skin. In an embodiment, a silk coated textile of the present disclosure has the qualities of being waterproof, breathable, and elastic and possess a number of other qualities which are highly desirable in action sportswear. In an embodiment, a silk coated textile of the present disclosure manufactured from a silk fabric of the present disclosure further includes LYCRA brand spandex fibers (polyester-polyurethane copolymer).

In an embodiment, a textile at least partially coated with an aqueous solution of pure silk fibroin-based protein fragments of the present disclosure is a breathable fabric. In an embodiment, a textile at least partially coated with an aqueous solution of pure silk fibroin-based protein fragments of the present disclosure is a water-resistant fabric. In an embodiment, a textile at least partially coated with an aqueous solution of pure silk fibroin-based protein fragments of the present disclosure is a shrink-resistant fabric. In an embodiment, a textile at least partially coated with an aqueous solution of pure silk fibroin-based protein fragments of the present disclosure is a machine-washable fabric. In an embodiment, a textile at least partially coated with an aqueous solution of pure silk fibroin-based protein fragments of the present disclosure is a wrinkle resistant fabric. In an embodiment, textile at least partially coated with an aqueous solution of pure silk fibroin-based protein fragments of the present disclosure provides moisture and vitamins to the skin.

In an embodiment, the textile at least partially coated with an aqueous solution of pure silk fibroin-based protein fragments of the present disclosure has an accumulative one-way transport index of greater than 140. In an embodiment, the textile at least partially coated with an aqueous solution of pure silk fibroin-based protein fragments of the present disclosure has an accumulative one-way transport index of greater than 120. In an embodiment, the textile at least partially coated with an aqueous solution of pure silk fibroin-based protein fragments of the present disclosure has an accumulative one-way transport index of greater than 100. In an embodiment, the textile at least partially coated with an aqueous solution of pure silk fibroin-based protein fragments of the present disclosure has an accumulative one-way transport index of greater than 80.

In an embodiment, the textile at least partially coated with an aqueous solution of pure silk fibroin-based protein fragments of the present disclosure has an overall moisture management capability of greater than 0.4. In an embodiment, the textile at least partially coated with an aqueous solution of pure silk fibroin-based protein fragments of the present disclosure has an overall moisture management capability of greater than 0.35. In an embodiment, the textile at least partially coated with an aqueous solution of pure silk fibroin-based protein fragments of the present disclosure has an overall moisture management capability of greater than 0.3. In an embodiment, the textile at least partially coated with an aqueous solution of pure silk fibroin-based protein fragments of the present disclosure has an overall moisture management capability of greater than 0.25.

In an embodiment, the textile at least partially coated with an aqueous solution of pure silk fibroin-based protein fragments of the present disclosure has a wetting time of at least 3 seconds. In an embodiment, the textile at least partially coated with an aqueous solution of pure silk fibroin-based protein fragments of the present disclosure has a wetting time of at least 2.5 seconds. In an embodiment, the textile at least partially coated with an aqueous solution of pure silk fibroin-based protein fragments of the present disclosure has a wetting time of at least 2 seconds. In an embodiment, the textile at least partially coated with an aqueous solution of pure silk fibroin-based protein fragments of the present disclosure has a wetting time of at least 1.5 seconds.

In an embodiment, the textile at least partially coated with an aqueous solution of pure silk fibroin-based protein fragments of the present disclosure has a top absorption time of at least 50 seconds. In an embodiment, the textile at least partially coated with an aqueous solution of pure silk fibroin-based protein fragments of the present disclosure has a top absorption time of at least 40 seconds. In an embodiment, the textile at least partially coated with an aqueous solution of pure silk fibroin-based protein fragments of the present disclosure has a top absorption time of at least 30 seconds.

In an embodiment, the textile at least partially coated with an aqueous solution of pure silk fibroin-based protein fragments of the present disclosure has a bottom absorption time of at least 80 seconds. In an embodiment, the textile at least partially coated with an aqueous solution of pure silk fibroin-based protein fragments of the present disclosure has a bottom absorption time of at least 70 seconds. In an embodiment, the textile at least partially coated with an aqueous solution of pure silk fibroin-based protein fragments of the present disclosure has a bottom absorption time of at least 60 seconds. In an embodiment, the textile at least partially coated with an aqueous solution of pure silk fibroin-based protein fragments of the present disclosure has a bottom absorption time of at least 50 seconds. In an embodiment, the textile at least partially coated with an aqueous solution of pure silk fibroin-based protein fragments of the present disclosure has a bottom absorption time of at least 40 seconds.

In an embodiment, the textile at least partially coated with an aqueous solution of pure silk fibroin-based protein fragments of the present disclosure has a spreading speed of at least 1.6 mm/second. In an embodiment, the textile at least partially coated with an aqueous solution of pure silk fibroin-based protein fragments of the present disclosure has a spreading speed of at least 1.4 mm/second. In an embodiment, the textile at least partially coated with an aqueous solution of pure silk fibroin-based protein fragments of the present disclosure has a spreading speed of at least 1.2 mm/second. In an embodiment, the textile at least partially coated with an aqueous solution of pure silk fibroin-based protein fragments of the present disclosure has a spreading speed of at least 1.0 mm/second. In an embodiment, the textile at least partially coated with an aqueous solution of pure silk fibroin-based protein fragments of the present disclosure has a spreading speed of at least 0.8 mm/second.

In an embodiment, the textile at least partially coated with an aqueous solution of pure silk fibroin-based protein fragments of the present disclosure shows less than 2000% microbial growth over 24 hours. In an embodiment, the textile at least partially coated with an aqueous solution of pure silk fibroin-based protein fragments of the present disclosure shows less than 1000% microbial growth over 24 hours. In an embodiment, the textile at least partially coated with an aqueous solution of pure silk fibroin-based protein fragments of the present disclosure shows less than 500% microbial growth over 24 hours. In an embodiment, the textile at least partially coated with an aqueous solution of pure silk fibroin-based protein fragments of the present disclosure shows less than 400% microbial growth over 24 hours. In an embodiment, the textile at least partially coated with an aqueous solution of pure silk fibroin-based protein fragments of the present disclosure shows less than 300% microbial growth over 24 hours. In an embodiment, the textile at least partially coated with an aqueous solution of pure silk fibroin-based protein fragments of the present disclosure shows less than 200% microbial growth over 24 hours. In some embodiments, as described herein, the reduction in microbial growth may be measured and provided after one or more wash cycles in non-chlorine bleach. In some embodiments, solutions that include silk fibroin-based protein fragments may include an additional chemical agent, as described herein, that may provide antimicrobrial (e.g., antifungal and/or antibacterial) properties.

In an embodiment, the textile at least partially coated with an aqueous solution of pure silk fibroin-based protein fragments of the present disclosure shows less than 2000% bacterial growth over 24 hours. In an embodiment, the textile at least partially coated with an aqueous solution of pure silk fibroin-based protein fragments of the present disclosure shows less than 1000% bacterial growth over 24 hours. In an embodiment, the textile at least partially coated with an aqueous solution of pure silk fibroin-based protein fragments of the present disclosure shows less than 500% bacterial growth over 24 hours. In an embodiment, the textile at least partially coated with an aqueous solution of pure silk fibroin-based protein fragments of the present disclosure shows less than 400% bacterial growth over 24 hours. In an embodiment, the textile at least partially coated with an aqueous solution of pure silk fibroin-based protein fragments of the present disclosure shows less than 300% bacterial growth over 24 hours. In an embodiment, the textile at least partially coated with an aqueous solution of pure silk fibroin-based protein fragments of the present disclosure shows less than 200% bacterial growth over 24 hours.

In an embodiment, the textile at least partially coated with an aqueous solution of pure silk fibroin-based protein fragments of the present disclosure shows less than 2000% fungal growth over 24 hours. In an embodiment, the textile at least partially coated with an aqueous solution of pure silk fibroin-based protein fragments of the present disclosure shows less than 1000% fungal growth over 24 hours. In an embodiment, the textile at least partially coated with an aqueous solution of pure silk fibroin-based protein fragments of the present disclosure shows less than 500% fungal growth over 24 hours. In an embodiment, the textile at least partially coated with an aqueous solution of pure silk fibroin-based protein fragments of the present disclosure shows less than 400% fungal growth over 24 hours. In an embodiment, the textile at least partially coated with an aqueous solution of pure silk fibroin-based protein fragments of the present disclosure shows less than 300% fungal growth over 24 hours. In an embodiment, the textile at least partially coated with an aqueous solution of pure silk fibroin-based protein fragments of the present disclosure shows less than 200% fungal growth over 24 hours.

In an embodiment, the textile at least partially coated with an aqueous solution of pure silk fibroin-based protein fragments of the present disclosure shows less than 2000% growth of *Staphylococcus aureus* over 24 hours. In an embodiment, the textile at least partially coated with an aqueous solution of pure silk fibroin-based protein fragments of the present disclosure shows less than 1000% growth of *Staphylococcus aureus* over 24 hours. In an embodiment, the textile at least partially coated with an aqueous solution of pure silk fibroin-based protein fragments of the present disclosure shows less than 500% growth of *Staphylococcus aureus* over 24 hours. In an embodiment, the textile at least partially coated with an aqueous solution of pure silk fibroin-based protein fragments of the present disclosure shows less than 400% growth of *Staphylococcus aureus* over 24 hours. In an embodiment, the textile at least partially coated with an aqueous solution of pure silk fibroin-based protein fragments of the present disclosure shows less than 300% growth of *Staphylococcus aureus* over 24 hours. In an embodiment, the textile at least partially coated with an aqueous solution of pure silk fibroin-based protein fragments of the present disclosure shows less than 200% growth of *Staphylococcus aureus over* 24 hours.

In an embodiment, the textile at least partially coated with an aqueous solution of pure silk fibroin-based protein fragments of the present disclosure shows less than 2000% growth of *Klebsiella pneumoniae* over 24 hours. In an embodiment, the textile at least partially coated with an aqueous solution of pure silk fibroin-based protein fragments of the present disclosure shows less than 1000% growth of *Klebsiella pneumoniae* over 24 hours. In an embodiment, the textile at least partially coated with an aqueous solution of pure silk fibroin-based protein fragments of the present disclosure shows less than 500% growth of *Klebsiella pneumoniae* over 24 hours. In an embodiment, the textile at least partially coated with an aqueous solution of pure silk fibroin-based protein fragments of the present disclosure shows less than 400% growth of *Klebsiella pneumoniae* over 24 hours. In an embodiment, the textile at least partially coated with an aqueous solution of pure silk fibroin-based protein fragments of the present disclosure shows less than 300% growth of *Klebsiella pneumoniae* over 24 hours. In an embodiment, the textile at least partially coated with an aqueous solution of pure silk fibroin-based protein fragments of the present disclosure shows less than 200% growth of *Klebsiella pneumoniae* over 24 hours.

In an embodiment, an aqueous solution of pure silk fibroin-based protein fragments of the present disclosure is used to coat a textile. In an embodiment, the concentration of silk in the solution ranges from about 0.001% to about 20.0%. In an embodiment, the concentration of silk in the solution ranges from about 0.01% to about 15.0%. In an embodiment, the concentration of silk in the solution ranges from about 0.5% to about 10.0%. In an embodiment, the concentration of silk in the solution ranges from about 1.0% to about 5.0%. In an embodiment, an aqueous solution of pure silk fibroin-based protein fragments of the present disclosure is applied directly to a fabric. Alternatively, silk microsphere and any additives may be used for coating a fabric. In an embodiment, additives can be added to an aqueous solution of pure silk fibroin-based protein fragments of the present disclosure before coating (e.g., alcohols) to further enhance material properties. In an embodiment, a silk coating of the present disclosure can have a pattern to optimize properties of the silk on the fabric. In an embodiment, a coating is applied to a fabric under tension and/or lax to vary penetration in to the fabric.

In an embodiment, a silk coating of the present disclosure can be applied at the yarn level, followed by creation of a fabric once the yarn is coated. In an embodiment, an aqueous solution of pure silk fibroin-based protein fragments of the present disclosure can be spun into fibers to make a silk fabric and/or silk fabric blend with other materials known in the apparel industry.

In an embodiment, a method for silk coating a fabric includes immersion of the fabric in any of the aqueous solutions of pure silk fibroin-based protein fragments of the present disclosure. In an embodiment, a method for silk coating a fabric includes spraying. In an embodiment, a method for silk coating a fabric includes chemical vapor deposition. In an embodiment, a method for silk coating a fabric includes electrochemical coating. In an embodiment, a method for silk coating a fabric includes knife coating to spread any of the aqueous solutions of pure silk fibroin-based protein fragments of the present disclosure onto the fabric. The coated fabric may then be air dried, dried under heat/air flow, or cross-linked to the fabric surface. In an embodiment, a drying process includes curing with additives and/or ambient condition.

According to aspects illustrated herein, methods for preparing aqueous solutions of pure silk fibroin-based protein fragments are disclosed. In an embodiment, at least one pure silk fibroin-based protein fragment (SPF) mixture solution having a specific average weight average molecular weight (MW) range and polydispersity is created. In an embodiment, at least SPF mixture solution having a MW range between about 6 kDa and 16 kDa and a polydispersity range between about 1.5 and about 3.0 is created. In an embodiment, at least one SPF mixture solution having a MW between about 17 kDa and 38 kDa and a polydispersity range between about 1.5 and about 3.0 is created. In an embodiment, at least one SPF mixture solution having a MW range between about 39 kDa and 80 kDa and a polydispersity range between about 1.5 and about 3.0 is created.

According to aspects illustrated herein, there is disclosed a composition that includes pure silk fibroin-based protein fragments that are substantially devoid of sericin, wherein the composition has an average weight average molecular weight ranging from about 6 kDa to about 16 kDa, wherein the composition has a polydispersity of between about 1.5 and about 3.0, wherein the composition is substantially homogenous, wherein the composition includes between 0 ppm and about 500 ppm of inorganic residuals, and wherein the composition includes between 0 ppm and about 500 ppm of organic residuals. In an embodiment, the pure silk fibroin-based protein fragments have between about 10 ppm and about 300 ppm of lithium bromide residuals and between about 10 ppm and about 100 ppm of sodium carbonate residuals. In an embodiment, the lithium bromide residuals are measurable using a high-performance liquid chromatography lithium bromide assay, and the sodium carbonate residuals are measurable using a high-performance liquid chromatography sodium carbonate assay. In an embodiment, the composition further includes less than 10% water. In an embodiment, the composition is in the form of a solution. In an embodiment, the composition includes from about 0.01 wt % to about 30.0 wt % pure silk fibroin-based protein fragments. The pure silk fibroin-based protein fragments are stable in the solution for at least 30 days. In an embodiment, the term "stable" refers to the absence of spontaneous or gradual gelation, with no visible change in the color or turbidity of the solution. In an embodiment, the term "stable" refers to no aggregation of fragments and therefore no increase in molecular weight over time. In an embodiment, the composition is in the form of an aqueous solution. In an embodiment, the composition is in the form of an organic solution. The composition may be provided in a sealed container. In some embodiments, the composition further includes one or more molecules selected from the group consisting of therapeutic agents, growth factors, antioxidants, proteins, vitamins, carbohydrates, polymers, nucleic acids, salts, acids, bases, biomolecules, glycosamino glycans, polysaccharides, extracellular matrix molecules, metals, metal ion, metal oxide, synthetic molecules, polyanhydrides, cells, fatty acids, fragrance, minerals, plants, plant extracts, preservatives and essential oils. In an embodiment, the added molecule or molecules are stable (i.e., retain activity over time) within the composition and can be released at a desired rate. In an embodiment, the one or more molecules is vitamin C or a derivative thereof. In an embodiment, the composition further includes an alpha hydroxy acid selected from the group consisting of glycolic acid, lactic acid, tartaric acid and citric acid. In an embodiment, the composition further includes hyaluronic acid or its salt form at a concentration of about 0.5% to about 10.0%. In an embodiment, the composition further includes at least one of zinc oxide or titanium dioxide. In an embodiment, the pure silk fibroin-based protein fragments in the composition are hypoallergenic. In an embodiment, the pure silk fibroin-based protein fragments are biocompatible, non-sensitizing, and non-immunogenic.

According to aspects illustrated herein, there is disclosed a composition that includes pure silk fibroin-based protein fragments that are substantially devoid of sericin, wherein the composition has an average weight average molecular weight ranging from about 17 kDa to about 38 kDa, wherein the composition has a polydispersity of between about 1.5 and about 3.0, wherein the composition is substantially homogenous, wherein the composition includes between 0 ppm and about 500 ppm of inorganic residuals, and wherein the composition includes between 0 ppm and about 500 ppm of organic residuals. In an embodiment, the pure silk fibroin-based protein fragments have between about 10 ppm and about 300 ppm of lithium bromide residuals and between about 10 ppm and about 100 ppm of sodium carbonate residuals. In an embodiment, the lithium bromide residuals are measurable using a high-performance liquid chromatography lithium bromide assay, and the sodium carbonate residuals are measurable using a high-performance liquid chromatography sodium carbonate assay. In an embodiment, the composition further includes less than 10% water. In an embodiment, the composition is in the form of a solution. In an embodiment, the composition includes from about 0.01 wt % to about 30.0 wt % pure silk fibroin-based protein fragments. The pure silk fibroin-based protein fragments are stable in the solution for at least 30 days. In an embodiment, the term "stable" refers to the absence of spontaneous or gradual gelation, with no visible change in the color or turbidity of the solution. In an embodiment, the term "stable" refers to no aggregation of fragments and therefore no increase in molecular weight over time. In an embodiment, the composition is in the form of an aqueous solution. In an embodiment, the composition is in the form of an organic solution. The composition may be provided in a sealed container. In some embodiments, the composition further includes one or more molecules selected from the group consisting of therapeutic agents, growth factors, antioxidants, proteins, vitamins, carbohydrates, polymers, nucleic acids, salts, acids, bases, biomolecules, glycosamino glycans, polysaccharides, extracellular matrix molecules, metals, metal ion, metal oxide, synthetic molecules, polyanhydrides, cells, fatty acids, fragrance, minerals, plants, plant extracts, preservatives and essential oils. In an embodiment, the added molecule or molecules are stable (i.e., retain activity over time) within the composition and can be released at a desired rate. In an embodiment, the one or more molecules is vitamin C or a derivative thereof. In an embodiment, the composition further includes an alpha hydroxy acid selected from the group consisting of glycolic acid, lactic acid, tartaric acid and citric acid. In an embodiment, the composition further includes hyaluronic acid or its salt form at a concentration of about 0.5% to about 10.0%. In an embodiment, the composition further includes at least one of zinc oxide or titanium dioxide. In an embodiment, the pure silk fibroin-based protein fragments in the composition are hypoallergenic. In an embodiment, the pure silk fibroin-based protein fragments are biocompatible, non-sensitizing, and non-immunogenic.

According to aspects illustrated herein, there is disclosed a composition that includes pure silk fibroin-based protein fragments that are substantially devoid of sericin, wherein the composition has an average weight average molecular weight ranging from about 39 kDa to about 80 kDa, wherein the composition has a polydispersity of between about 1.5 and about 3.0, wherein the composition is substantially homogenous, wherein the composition includes between 0 ppm and about 500 ppm of inorganic residuals, and wherein the composition includes between 0 ppm and about 500 ppm of organic residuals. In an embodiment, the pure silk fibroin-based protein fragments have between about 10 ppm and about 300 ppm of lithium bromide residuals and between about 10 ppm and about 100 ppm of sodium carbonate residuals. In an embodiment, the lithium bromide residuals are measurable using a high-performance liquid chromatography lithium bromide assay, and the sodium carbonate residuals are measurable using a high-performance liquid chromatography sodium carbonate assay. In an embodiment, the composition further includes less than 10% water. In an embodiment, the composition is in the form of a solution. In an embodiment, the composition includes from about 0.01 wt % to about 30.0 wt % pure silk fibroin-based protein fragments. The pure silk fibroin-based protein fragments are stable in the solution for at least 30 days. In an embodiment, the term "stable" refers to the absence of spontaneous or gradual gelation, with no visible change in the color or turbidity of the solution. In an embodiment, the term "stable" refers to no aggregation of fragments and therefore no increase in molecular weight over time. In an embodiment, the composition is in the form of an aqueous solution. In an embodiment, the composition is in the form of an organic solution. The composition may be provided in a sealed container. In some embodiments, the composition further includes one or more molecules selected from the group consisting of therapeutic agents, growth factors, antioxidants, proteins, vitamins, carbohydrates, polymers, nucleic acids, salts, acids, bases, biomolecules, glycosamino glycans, polysaccharides, extracellular matrix molecules, metals, metal ion, metal oxide, synthetic molecules, polyanhydrides, cells, fatty acids, fragrance, minerals, plants, plant extracts, preservatives and essential oils. In an embodiment, the added molecule or molecules are stable (i.e., retain activity over time) within the composition and can be released at a desired rate. In an embodiment, the one or more molecules is vitamin C or a derivative thereof. In an embodiment, the composition further includes an alpha hydroxy acid selected from the group consisting of glycolic acid, lactic acid, tartaric acid and citric acid. In an embodiment, the composition further includes hyaluronic acid or its salt form at a concentration of about 0.5% to about 10.0%. In an embodiment, the composition further includes at least one of zinc oxide or titanium dioxide. In an embodiment, the pure silk fibroin-based protein fragments in the composition are hypoallergenic. In an embodiment, the pure silk fibroin-based protein fragments are biocompatible, non-sensitizing, and non-immunogenic.

According to aspects illustrated herein, there is disclosed a gel that includes pure silk fibroin-based protein fragments substantially devoid of sericin and comprising: an average weight average molecular weight ranging from about 17 kDa to about 38 kDa; and a polydispersity of between about 1.5 and about 3.0; and water from about 20 wt. % to about 99.9 wt. %, wherein the gel includes between 0 ppm and 500 ppm of inorganic residuals, and wherein the gel includes between 0 ppm and 500 ppm of organic residuals. In an embodiment, the gel includes between about 1.0% and about 50.0% crystalline protein domains. In an embodiment, the gel includes from about 0.1 wt. % to about 6.0 wt. % of pure silk fibroin-based protein fragments. In an embodiment, the gel has a pH from about 1.0 to about 7.0. In an embodiment, the gel further includes from about 0.5 wt. % to about 20.0 wt. % of vitamin C or a derivative thereof. In an embodiment, the vitamin C or a derivative thereof remains stable within the gel for a period of from about 5 days to about 5 years. In an embodiment, the vitamin C or a derivative thereof is stable within the gel so as to result in release of the vitamin C in a biologically active form. In an embodiment, the gel further includes an additive selected from the group consisting of vitamin E, rosemary oil, rose oil, lemon juice, lemon grass oil and caffeine. In an embodiment, the gel is packaged in an airtight container. In an embodiment, the pure silk fibroin-based protein fragments are hypoallergenic. In an embodiment, the gel has less than 10 colony forming units per milliliter.

According to aspects illustrated herein, there is disclosed a method for preparing an aqueous solution of pure silk fibroin-based protein fragments having an average weight average molecular weight ranging from about 6 kDa to about 16 kDa, the method including the steps of: degumming a silk source by adding the silk source to a boiling (100° C.) aqueous solution of sodium carbonate for a treatment time of between about 30 minutes to about 60 minutes; removing sericin from the solution to produce a silk fibroin extract comprising non-detectable levels of sericin; draining the solution from the silk fibroin extract; dissolving the silk fibroin extract in a solution of lithium bromide having a starting temperature upon placement of the silk fibroin extract in the lithium bromide solution that ranges from about 60° C. to about 140° C.; maintaining the solution of silk fibroin-lithium bromide in an oven having a temperature of about 140° C. for a period of at least 1 hour; removing the lithium bromide from the silk fibroin extract; and producing an aqueous solution of silk protein fragments, the aqueous solution comprising: fragments having an average weight average molecular weight ranging from about 6 kDa to about 16 kDa, and wherein the aqueous solution of pure silk fibroin-based protein fragments comprises a polydispersity of between about 1.5 and about 3.0. In an embodiment, the method includes the step of drying the silk fibroin extract prior to the dissolving step. In an embodiment, the amount of lithium bromide residuals in the aqueous solution can be measured using a high-performance liquid chromatography lithium bromide assay. In an embodiment, the amount of sodium carbonate residuals in the aqueous solution can be measured using a high-performance liquid chromatography sodium carbonate assay. In an embodiment, the method includes the step of adding a therapeutic agent to the aqueous solution of pure silk fibroin-based protein fragments. In an embodiment, the method includes the step of adding a molecule selected from one of an antioxidant or an enzyme to the aqueous solution of pure silk fibroin-based protein fragments. In an embodiment, the method includes the step of adding a vitamin to the aqueous solution of pure silk fibroin-based protein fragments. In an embodiment, the vitamin is selected from one of vitamin C or a derivative thereof. In an embodiment, the method further includes the step of adding an alpha hydroxy acid to the aqueous solution of pure silk fibroin-based protein fragments. In an embodiment, the alpha hydroxy acid is selected from the group consisting of glycolic acid, lactic acid, tartaric acid and citric acid. In an embodiment, the method further includes the step of adding hyaluronic acid at a concentration of about 0.5% to about 10.0% to the aqueous solution of pure silk fibroin-based protein fragments. In an embodiment, the method further includes the step of adding at least one of zinc oxide or titanium dioxide to the aqueous solution of pure silk fibroin-based protein fragments.

According to aspects illustrated herein, there is disclosed a method for preparing an aqueous solution of pure silk fibroin-based protein fragments having an average weight average molecular weight ranging from about 17 kDa to about 38 kDa, the method including the steps of: adding a silk source to a boiling (100° C.) aqueous solution of sodium carbonate for a treatment time of between about 30 minutes to about 60 minutes so as to result in degumming; removing sericin from the solution to produce a silk fibroin extract comprising non-detectable levels of sericin; draining the solution from the silk fibroin extract; dissolving the silk fibroin extract in a solution of lithium bromide having a starting temperature upon placement of the silk fibroin extract in the lithium bromide solution that ranges from about 80° C. to about 140° C.; maintaining the solution of silk fibroin-lithium bromide in a dry oven having a temperature in the range between about 60° C. to about 100° C. for a period of at least 1 hour; removing the lithium bromide from the silk fibroin extract; and producing an aqueous solution of pure silk fibroin-based protein fragments, wherein the aqueous solution of pure silk fibroin-based protein fragments comprises lithium bromide residuals of between about 10 ppm and about 300 ppm, wherein the aqueous solution of silk protein fragments comprises sodium carbonate residuals of between about 10 ppm and about 100 ppm, wherein the aqueous solution of pure silk fibroin-based protein fragments comprises fragments having an average weight average molecular weight ranging from about 17 kDa to about 38 kDa, and wherein the aqueous solution of pure silk fibroin-based protein fragments comprises a polydispersity of between about 1.5 and about 3.0. In an embodiment, the method includes the step of drying the silk fibroin extract prior to the dissolving step. In an embodiment, the amount of lithium bromide residuals in the aqueous solution can be measured using a high-performance liquid chromatography lithium bromide assay. In an embodiment, the amount of sodium carbonate residuals in the aqueous solution can be measured using a high-performance liquid chromatography sodium carbonate assay. In an embodiment, the method includes the step of adding a therapeutic agent to the aqueous solution of pure silk fibroin-based protein fragments. In an embodiment, the method includes the step of adding a molecule selected from one of an antioxidant or an enzyme to the aqueous solution of pure silk fibroin-based protein fragments. In an embodiment, the method includes the step of adding a vitamin to the aqueous solution of pure silk fibroin-based protein fragments. In an embodiment, the vitamin is selected from one of vitamin C or a derivative thereof. In an embodiment, the method further includes the step of adding an alpha hydroxy acid to the aqueous solution of pure silk fibroin-based protein fragments. In an embodiment, the alpha hydroxy acid is selected from the group consisting of glycolic acid, lactic acid, tartaric acid and citric acid. In an embodiment, the method further includes the step of adding hyaluronic acid at a concentration of about 0.5% to about 10.0% to the aqueous solution of pure silk fibroin-based protein fragments. In an embodiment, the method further includes the step of adding at least one of zinc oxide or titanium dioxide to the aqueous solution of pure silk fibroin-based protein fragments.

According to aspects illustrated herein, there is disclosed a method for preparing an aqueous solution of pure silk fibroin-based protein fragments having an average weight average molecular weight ranging from about 39 kDa to about 80 kDa, the method including the steps of: adding a silk source to a boiling (100° C.) aqueous solution of sodium carbonate for a treatment time of about 30 minutes so as to result in degumming; removing sericin from the solution to produce a silk fibroin extract comprising non-detectable levels of sericin; draining the solution from the silk fibroin extract; dissolving the silk fibroin extract in a solution of lithium bromide having a starting temperature upon placement of the silk fibroin extract in the lithium bromide solution that ranges from about 80° C. to about 140° C.; maintaining the solution of silk fibroin-lithium bromide in a dry oven having a temperature in the range between about 60° C. to about 100° C. for a period of at least 1 hour; removing the lithium bromide from the silk fibroin extract; and producing an aqueous solution of pure silk fibroin-based protein fragments, wherein the aqueous solution of pure silk fibroin-based protein fragments comprises lithium bromide residuals of between about 10 ppm and about 300 ppm, sodium carbonate residuals of between about 10 ppm and about 100 ppm, fragments having an average weight average molecular weight ranging from about 40 kDa to about 65 kDa, and wherein the aqueous solution of pure silk fibroin-based protein fragments comprises a polydispersity of between about 1.5 and about 3.0. In an embodiment, the method includes the step of drying the silk fibroin extract prior to the dissolving step. In an embodiment, the amount of lithium bromide residuals in the aqueous solution can be measured using a high-performance liquid chromatography lithium bromide assay. In an embodiment, the amount of sodium carbonate residuals in the aqueous solution can be measured using a high-performance liquid chromatography sodium carbonate assay. In an embodiment, the method includes the step of adding a therapeutic agent to the aqueous solution of pure silk fibroin-based protein fragments. In an embodiment, the method includes the step of adding a molecule selected from one of an antioxidant or an enzyme to the aqueous solution of pure silk fibroin-based protein fragments. In an embodiment, the method includes the step of adding a vitamin to the aqueous solution of pure silk fibroin-based protein fragments. In an embodiment, the vitamin is selected from one of vitamin C or a derivative thereof. In an embodiment, the method further includes the step of adding an alpha hydroxy acid to the aqueous solution of pure silk fibroin-based protein fragments. In an embodiment, the alpha hydroxy acid is selected from the group consisting of glycolic acid, lactic acid, tartaric acid and citric acid. In an embodiment, the method further includes the step of adding hyaluronic acid at a concentration of about 0.5% to about 10.0% to the aqueous solution of pure silk fibroin-based protein fragments. In an embodiment, the method further includes the step of adding at least one of zinc oxide or titanium dioxide to the aqueous solution of pure silk fibroin-based protein fragments.

According to aspects illustrated herein, a method is disclosed for producing silk gels having entrapped molecules or therapeutic agents such as those listed in the following paragraphs. In an embodiment, at least one molecule or therapeutic agent of interest is physically entrapped into a SPF mixture solution of the present disclosure during processing into aqueous gels. An aqueous silk gel of the present disclosure can be used to release at least one molecule or therapeutic agent of interest.

According to aspects illustrated herein, pure silk fibroin-based protein fragments from aqueous solutions of the present disclosure can be formed into yarns and fabrics including for example, woven or weaved fabrics, and these fabrics can be used in textiles, as described above.

According to aspects illustrated herein, silk fabric manufactured from SPF mixture solutions of the present disclosure are disclosed. In an embodiment, at least one molecule or therapeutic agent of interest is physically entrapped into a SPF mixture solution of the present disclosure. A silk film of the present disclosure can be used to release at least one molecule or therapeutic agent of interest.

In some embodiments, the invention may include an article having a fiber or yarn having a coating, wherein the coating may include silk based proteins or fragments thereof having a weight average molecular weight range of about 5 kDa to about 144 kDa. In some embodiments, the article may be a fabric. In some embodiments, the silk based proteins or fragments thereof may include silk fibroin-based proteins or protein fragments having about 0.01% (w/w) to about 10% (w/w) sericin.

In some embodiments, the silk based proteins or fragments thereof may be selected from the group consisting of natural silk based proteins or fragments thereof, recombinant silk based proteins or fragments thereof, and combinations thereof.

In some embodiments, the silk based proteins or fragments thereof may be natural silk based proteins or fragments thereof that may be selected from the group consisting of spider silk based proteins or fragments thereof, silkworm silk based proteins or fragments thereof, and combinations thereof.

In some embodiments, the natural silk based proteins or fragments may be silkworm silk based proteins or fragments thereof, and the silkworm silk based proteins or fragments thereof may be *Bombyx mori* silk based proteins or fragments thereof.

In some embodiments, the silk based proteins or fragments may include silk and a copolymer.

In some embodiments, the silk based proteins or protein fragments thereof may have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof may have a polydispersity of between about 1.5 and about 3.0, and wherein the proteins or protein fragments, prior to coating the fabric, do not spontaneously or gradually gelate and do not visibly change in color or turbidity when in a solution for at least 10 days.

In some embodiments, the fiber or yarn may be selected from the group consisting of natural fiber or yarn, synthetic fiber or yarn, or combinations thereof.

In some embodiments, the fiber or yarn may be natural fiber or yarn selected from the group consisting of cotton, alpaca fleece, alpaca wool, lama fleece, lama wool, cotton, cashmere, sheep fleece, sheep wool, and combinations thereof.

In some embodiments, the fiber or yarn may be synthetic fiber or yarn selected from the group consisting of polyester, nylon, polyester-polyurethane copolymer, and combinations thereof.

In some embodiments, the fabric may exhibit an improved property, wherein the improved property may be an accumulative one-way moisture transport index selected from the group consisting of greater than 40%, greater than 60%, greater than 80%, greater than 100%, greater than 120%, greater than 140%, greater than 160%, and greater than 180%.

In some embodiments, the fabric may exhibit an improved property, wherein the improved property may be an accumulative one way transport capability increase relative to uncoated fabric selected from the group consisting of 1.2 fold, 1.5 fold, 2.0 fold, 3.0 fold, 4.0 fold, 5.0 fold, and 10 fold.

In some embodiments, the fabric may exhibit an improved property, wherein the improved property may be an overall moisture management capability selected from the group consisting of greater than 0.05, greater than 0.10, greater than 0.15, greater than 0.20, greater than 0.25, greater than 0.30, greater than 0.35, greater than 0.40, greater than 0.50, greater than 0.60, greater than 0.70, and greater than 0.80. In some embodiments, the improved property may be determined after a period of machine washing cycles selected from the group consisting of 5 cycles, 10 cycles, 25 cycles, and 50 cycles.

In some embodiments, the fabric may exhibit substantially no increase in microbial growth after a number of machine washing cycles selected from the group consisting of 5 cycles, 10 cycles, 25 cycles, and 50 cycles. In some embodiments, the microbial growth may be microbial growth of a microbe selected from the group consisting of *Staphylococcus aureus, Klebisiella pneumoniae*, and combinations thereof. In some embodiments, the microbial growth may be reduced by a percentage selected from the group consisting of 50%, 100%, 500%, 1000%, 2000%, and 3000% compared to an uncoated fabric.

In some embodiments, the coating may be applied to the fabric at the fiber level prior to forming the fabric.

In some embodiments, the coating may be applied to the fabric at the fabric level. In some embodiments, the fabric may be bath coated. In some embodiments, the fabric may be spray coated. In some embodiments, the fabric may be coated with a stencil. In some embodiments, the coating may be applied to at least one side of the fabric using a method selected from the group consisting of a bath coating process, a spray coating process, a stencil process, a silk-foam based process, and a roller-based process.

In some embodiments, the coating may have a thickness of about one nanolayer.

In some embodiments, the coating may have a thickness selected from the group consisting of about 5 nm, about 10 nm, about 15 nm, about 20 nm, about 25 nm, about 50 nm, about 100 nm, about 200 nm, about 500 nm, about 1 μm, about 5 μm, about 10 μm, and about 20 μm.

In some embodiments, the coating may be adsorbed on the fabric.

In some embodiments, the coating may be attached to the fabric through chemical, enzymatic, thermal, or irradiative cross-linking.

In some embodiments, the hand of the coated fabric may be improved relative to an uncoated fabric.

In some embodiments, the hand of the coated fabric that may be improved may be selected from the group consisting of softness, crispness, dryness, silkiness, and combinations thereof.

In some embodiments, a flame retardation property of the coated fabric may be improved relative to an uncoated fabric.

In some embodiments, a flame retardation property of an uncoated fabric may not be adversely affected by the coating.

In some embodiments, the abrasion resistance may be improved relative to an uncoated fabric.

In an embodiment, the invention may include an article comprising a textile or leather having a coating, wherein the coating comprises silk based proteins or fragments thereof having a weight average molecular weight range of about 5 kDa to about 144 kDa.

In some embodiments, the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and wherein the proteins or protein fragments, prior to coating the fabric, do not spontaneously or gradually gelate and do not visibly change in color or turbidity when in a solution for at least 10 days.

In some embodiments, at least one property of the article may be improved, wherein the property that may be improved may be selected from the group consisting of color retention, resistance to microbial growth, resistance to bacterial growth, resistance to fungal growth, resistance to the buildup of static electrical charge, resistance to the growth of mildew, transparency of the coating, resistance to freeze-thaw cycle damage, resistance from abrasion, blocking of ultraviolet (UV) radiation, regulation of the body temperature of a wearer, resistance to tearing, elasticity of the article, rebound dampening, tendency to cause itching in the wearer, thermal insulation of the wearer, wrinkle resistance, stain resistance, stickiness to skin, and flame resistance.

In some embodiments, the article may be a textile used for apparel.

In some embodiments, the article may be fabricated as an item selected from the group consisting of an item of athletic apparel, an item of outdoor gear, a jacket, an overcoat, a shoe, a sneaker, a glove, an umbrella, a chair, a blanket, a towel, a surgical drape, a surgical gown, a laboratory coat, a wound dressing, a sterilization wrap, a surgical face mask, a surgical sleeve, a laboratory sleeve, a retention bandage, a support device, a compression bandage, a shoe cover, and a surgical blanket.

In some embodiments, the article may be a textile, leather, or foam used to fabricate an automotive product.

In some embodiments, the article may be fabricated as an item selected from the group consisting of an upholstery, a foam cushion, a fabric cushion, a floor mat, a vehicle carpet, an automotive trim, a children's car seat, a seat belt, a safety harness, a headrest, an armrest, a dashboard, a sunvisor, a seat, an interior panel, an airbag, an airbag cover, a wiring harness, or an insulation.

In an embodiment, the invention may include a method of coating a fabric that may include the step of optionally applying a pretreatment selected from the group consisting of a wetting agent, a detergent, a sequestering or dispersing agent, an enzyme, a bleaching agent, an antifoaming agent, an anti-creasing agent, a dye dispersing agent, a dye leveling agent, a dye fixing agent, a dye special resin agent, a dye anti-reducing agent, a pigment dye system anti-migrating agent, a pigment dye system binder, a delave agent, a wrinkle free treatment, a softener, a handle modifier, a waterborne polyurethane dispersion, a finishing resin, an oil or water repellant, a flame retardant, a crosslinker, a thickener for technical finishing, or any combination thereof. In an embodiment, the method may include the step of applying a coating that may include a solution of silk based proteins or fragments thereof that may have an average molecular weight range of about 5 kDa to about 144 kDa, using a process selected from the group consisting of a continuous spray process, a continuous screen or stencil process, a continuous bath process, a batch spray process, a batch screen or stencil process, and a batch bath process. In an embodiment, the method may include the step of drying and optionally curing the coating.

In an embodiment, the silk based proteins or protein fragments thereof may have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof may have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIGS. 8A-8D are photographs showing dissolved silk in room temperature LiBr solutions dissolved in a 60° C. oven for 12 hours (sericin extraction temperature and time were varied).

FIGS. 18A-18D are photographs showing dissolved silk in 100° C. LiBr solutions dissolved in a 60° C. oven for 1 hour (sericin extraction temperature and time were varied).

FIGS. 20A-20D are photographs showing dissolved silk in 100° C. LiBr solutions dissolved in a 60° C. oven for 6 hours (sericin extraction temperature and time were varied).

FIGS. 21A-21D are photographs showing dissolved silk in 140° C. (boiling point for LiBr) LiBr solutions dissolved in a 60° C. oven for 1 hour (sericin extraction temperature and time were varied time).

FIGS. 24A-24D are photographs showing dissolved silk in 80° C. LiBr solutions dissolved in a 80° C. oven for 1 hour (sericin extraction temperature and time were varied).

FIGS. 27A-27D are photographs showing dissolved silk in 100° C. LiBr solutions dissolved in a 100° C. oven for 1 hour (sericin extraction temperature and time were varied).

FIG. 33 shows peaks from (1) a chemically stabilized sample of vitamin C at ambient conditions and (2) a sample of vitamin C taken after 1 hour at ambient conditions without chemical stabilization to prevent oxidation, where degradation products are visible.

FIG. 34 is a table summarizing the LiBr and Sodium Carbonate ($Na_2CO_3$) concentration in silk protein solutions of the present disclosure.

FIG. 35 is a table summarizing the LiBr and $Na_2CO_3$ concentration in silk protein solutions of the present disclosure.

FIG. 36 is a table summarizing the stability of vitamin C in chemically stabilized solutions.

FIG. 37 is a table summarizing the Molecular Weights of silk protein solutions of the present disclosure.

FIG. 39 is a table summarizing the Molecular Weights of silk dissolved from different concentrations of LiBr and from different extraction and dissolution sizes.

FIG. 80B is a graph illustrating accumulative one way transport index with 0.1% SFS.

FIG. 81A is a graph illustrating overall moisture management capability with 1% SFS.

FIG. 81B is a graph illustrating overall moisture management capability with 0.1% SFS.

FIG. 82A is a graph illustrating summary of wetting time top.

FIG. 82B is a graph illustrating summary of wetting time bottom.

FIG. 83A is a graph illustrating summary of top absorption rate.

FIG. 83B is a graph illustrating summary of bottom absorption rate.

FIG. 84A is a graph illustrating summary of top max wetted radius.

FIG. 84B is a graph illustrating summary of bottom wetted radius.

FIG. 85A is a graph illustrating summary of top spreading speed.

FIG. 85B is a graph illustrating summary of bottom spreading speed.

FIG. 86A is a graph illustrating summary of accumulative one-way transport index.

Figure 86A:
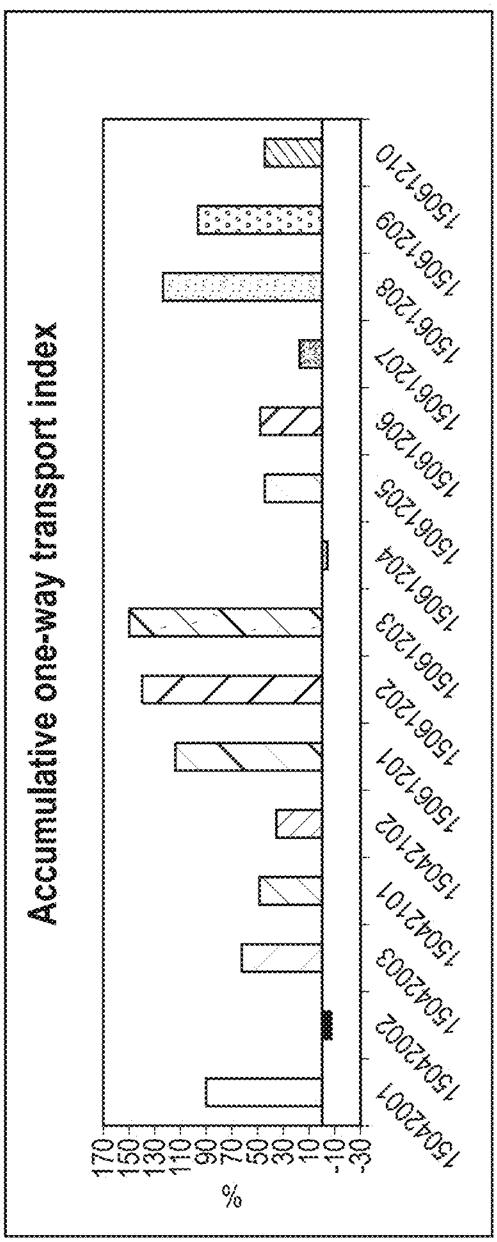
Figure 86B:
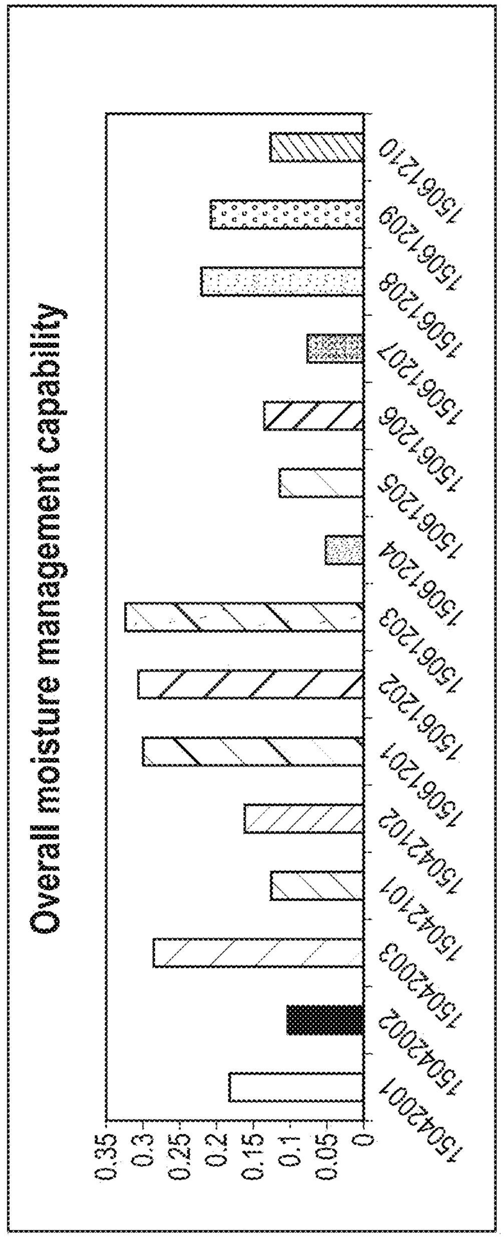

FIG. 86B is a graph illustrating summary of overall moisture management capability.

Figure 87:
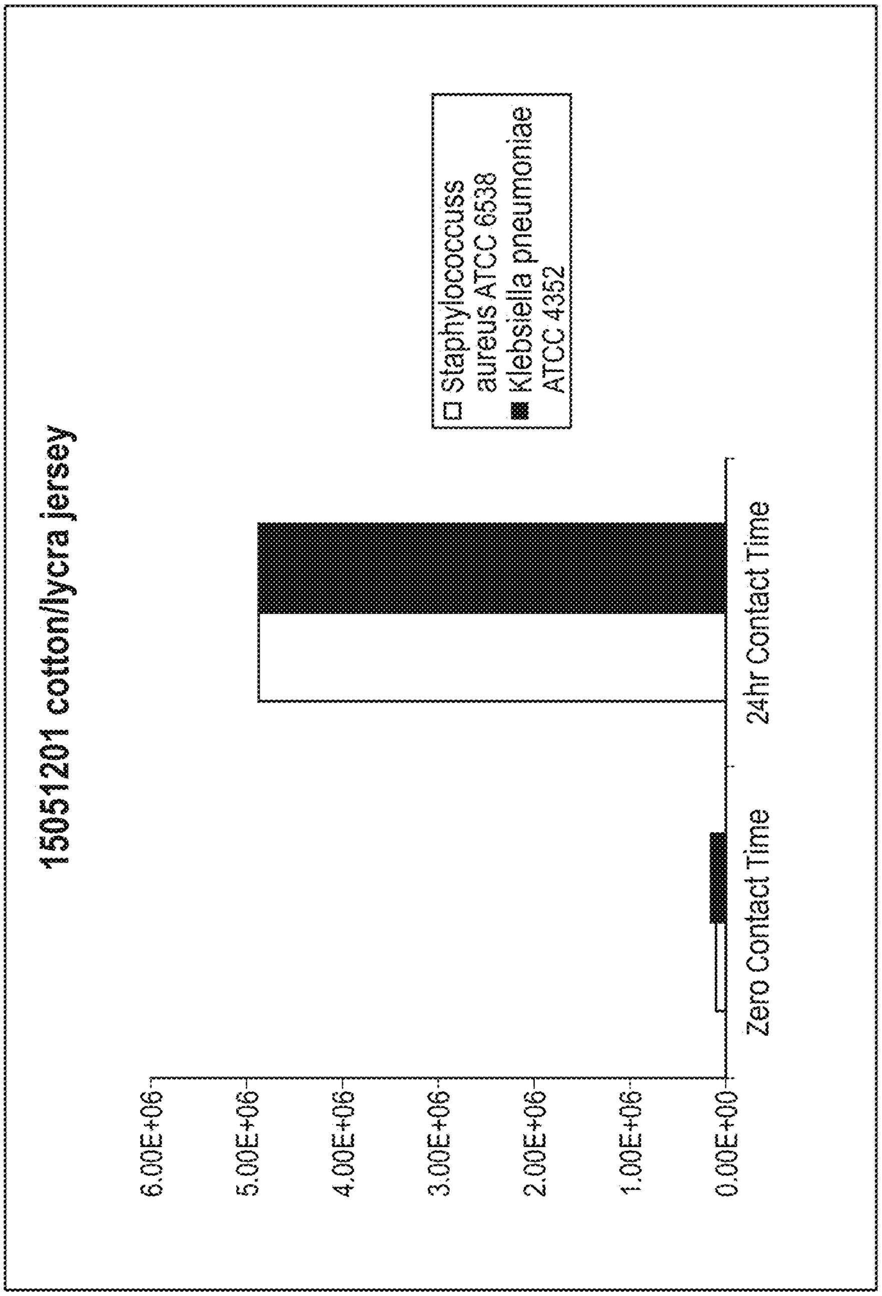

FIG. 87 illustrates bacterial growth results.

Figure 88:
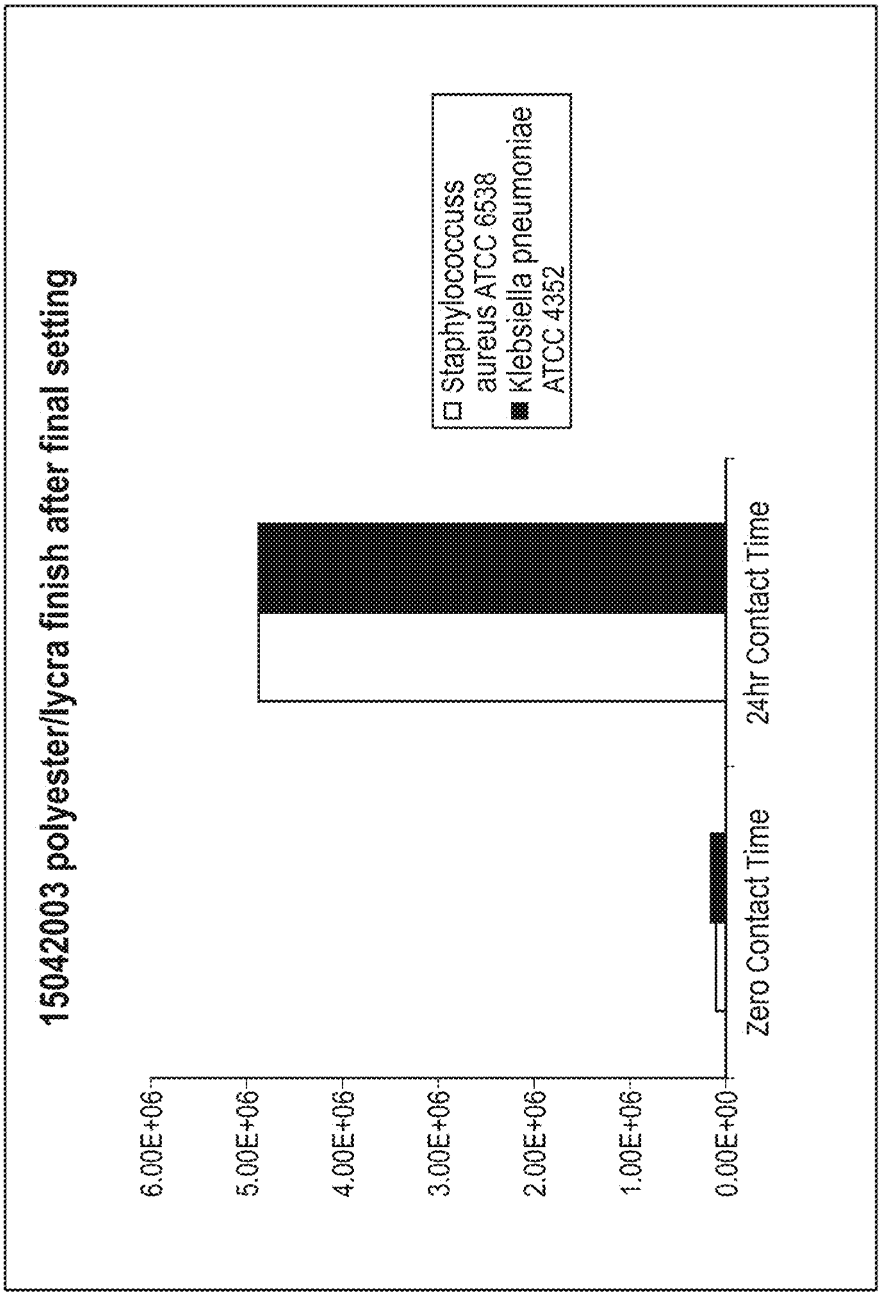

FIG. 88 illustrates bacterial growth results.

Figure 89:
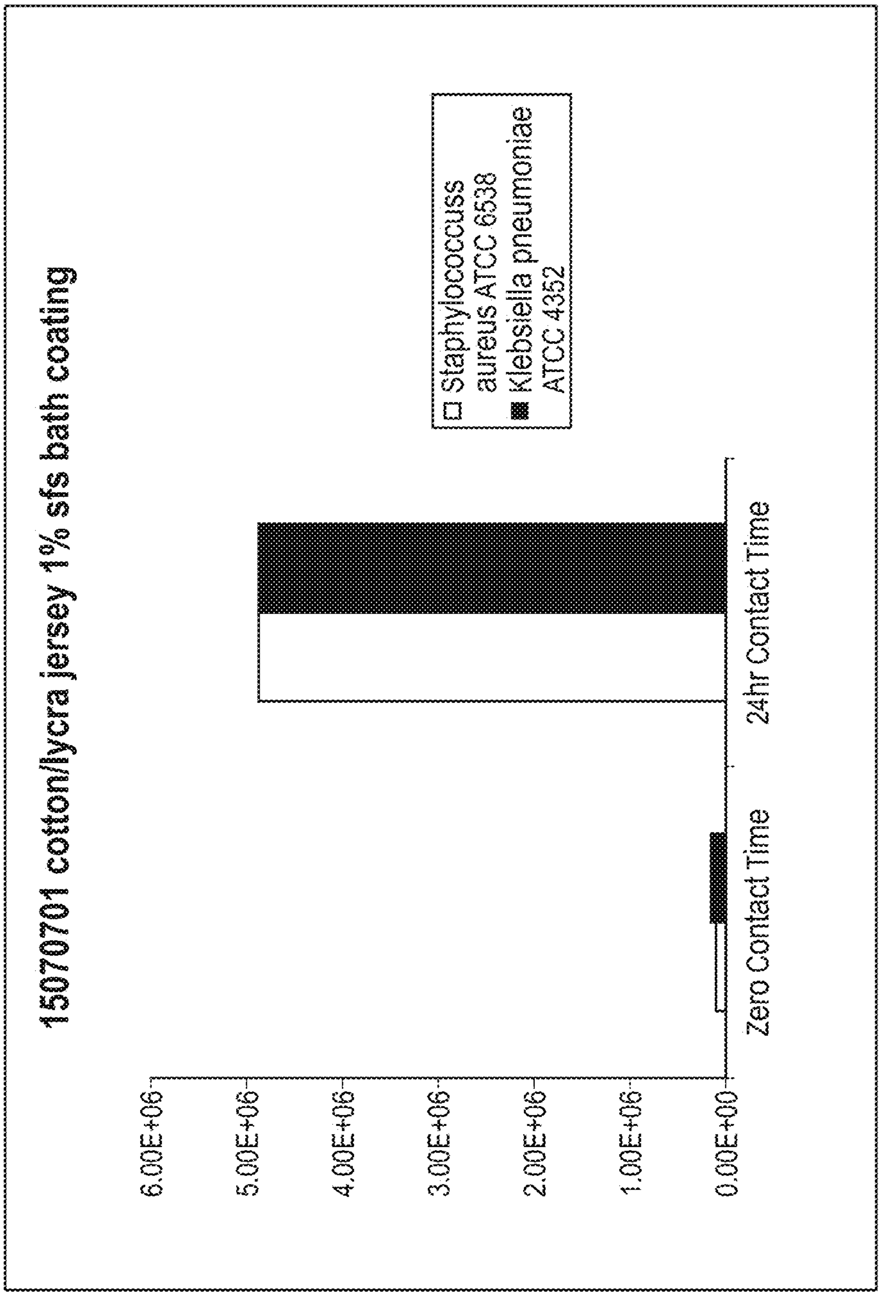

FIG. 89 illustrates bacterial growth results.

Figure 90:
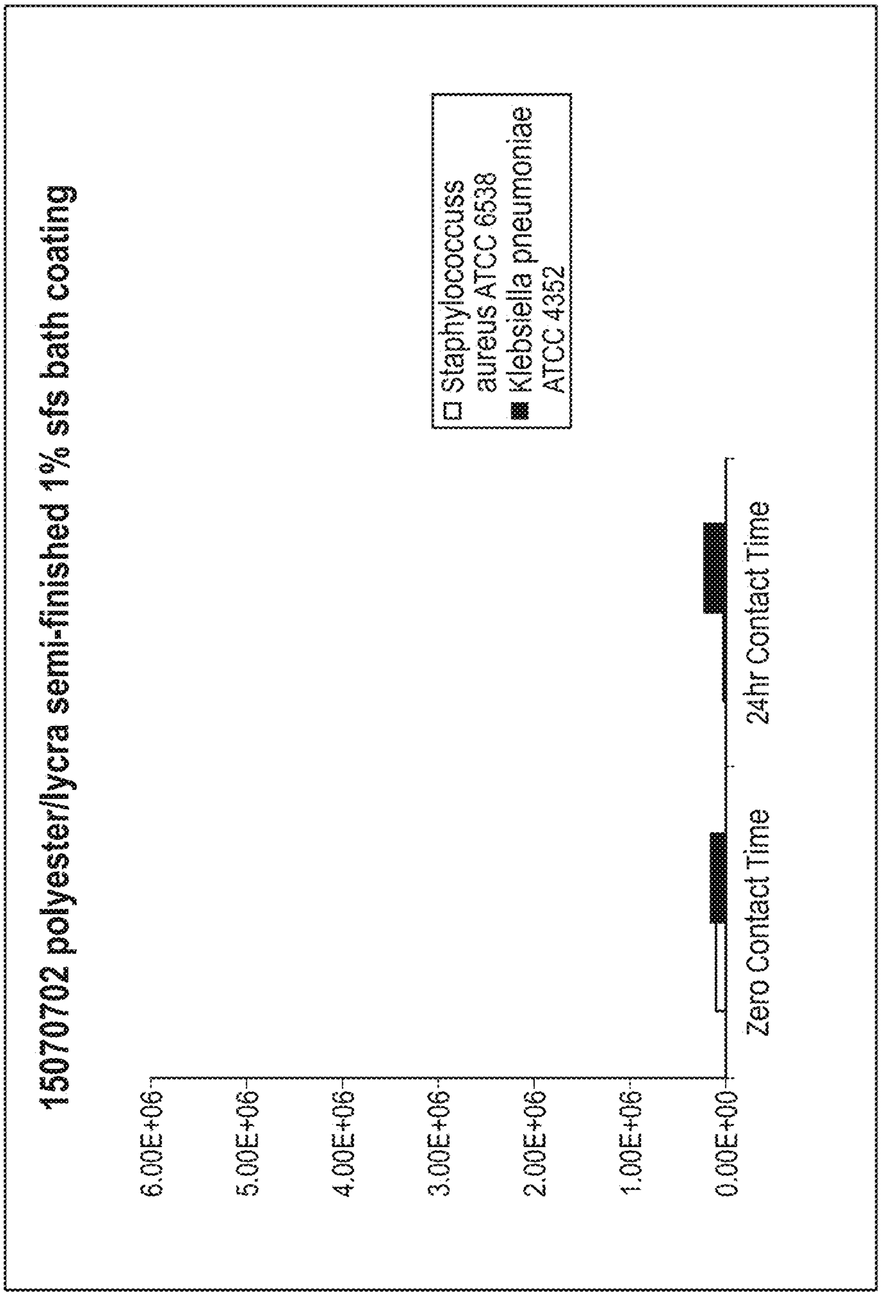

FIG. 90 illustrates bacterial growth results.

Figure 91:
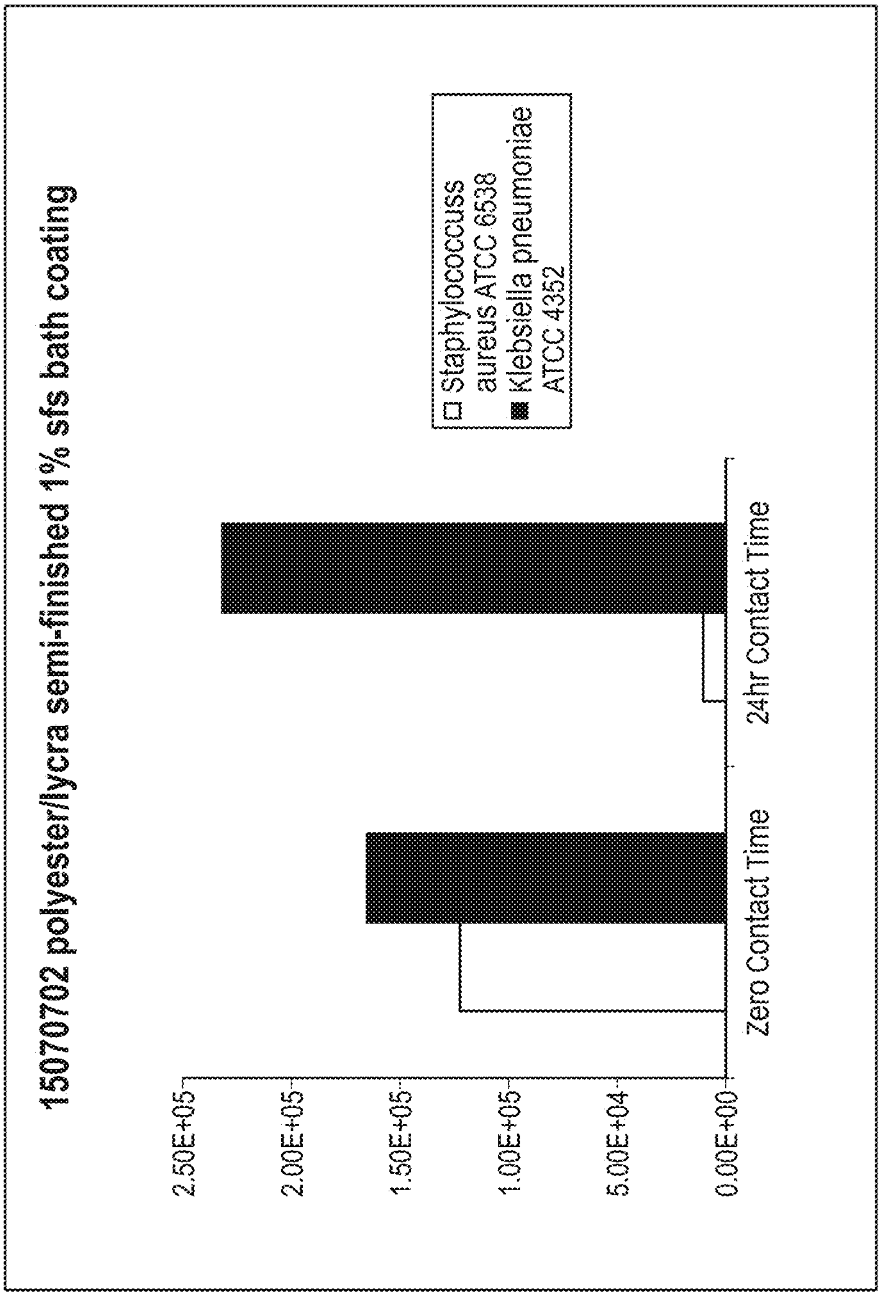

FIG. 91 illustrates bacterial growth results.

Figure 92:
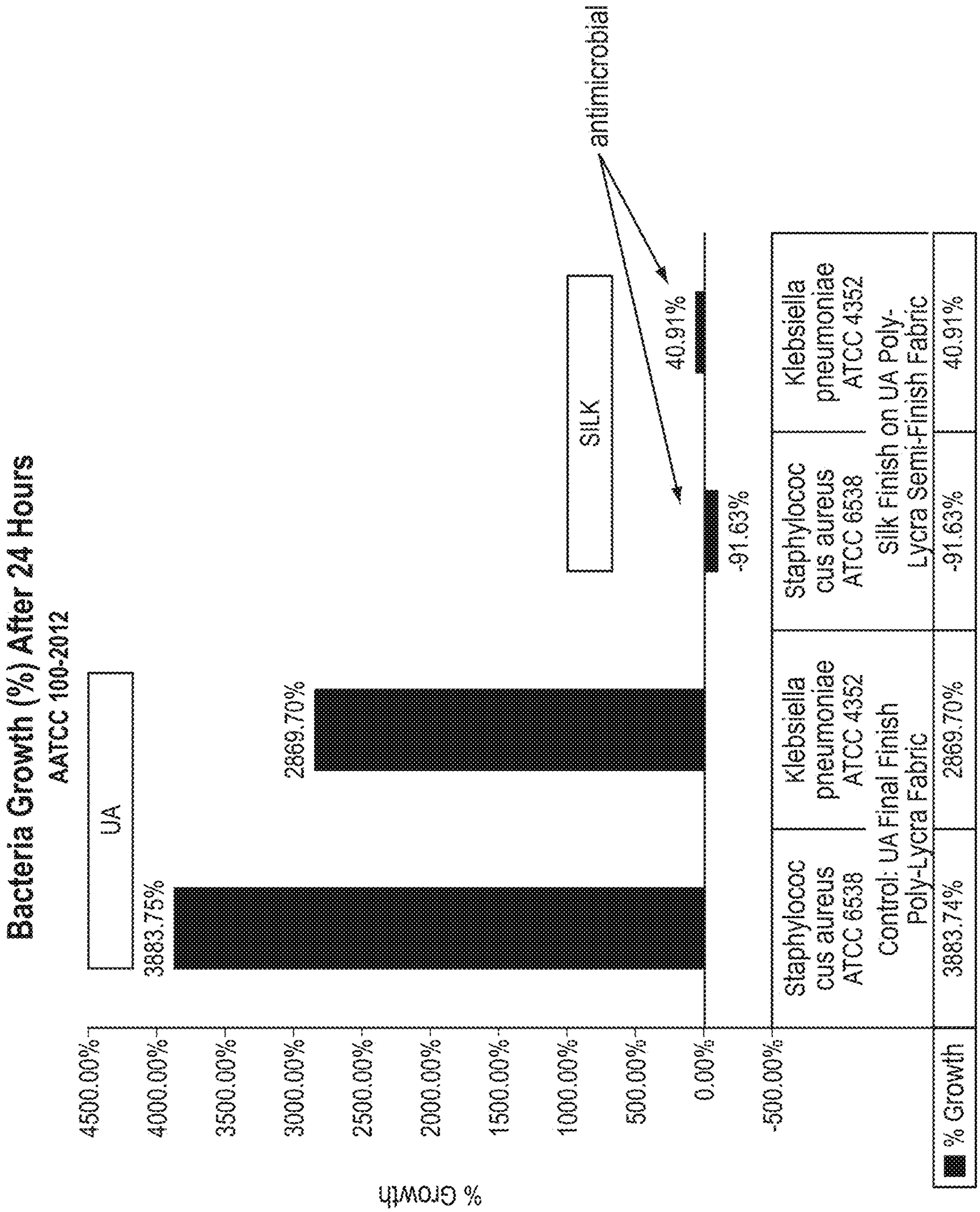

FIG. 92 illustrates bacterial growth results.

Figure 93:
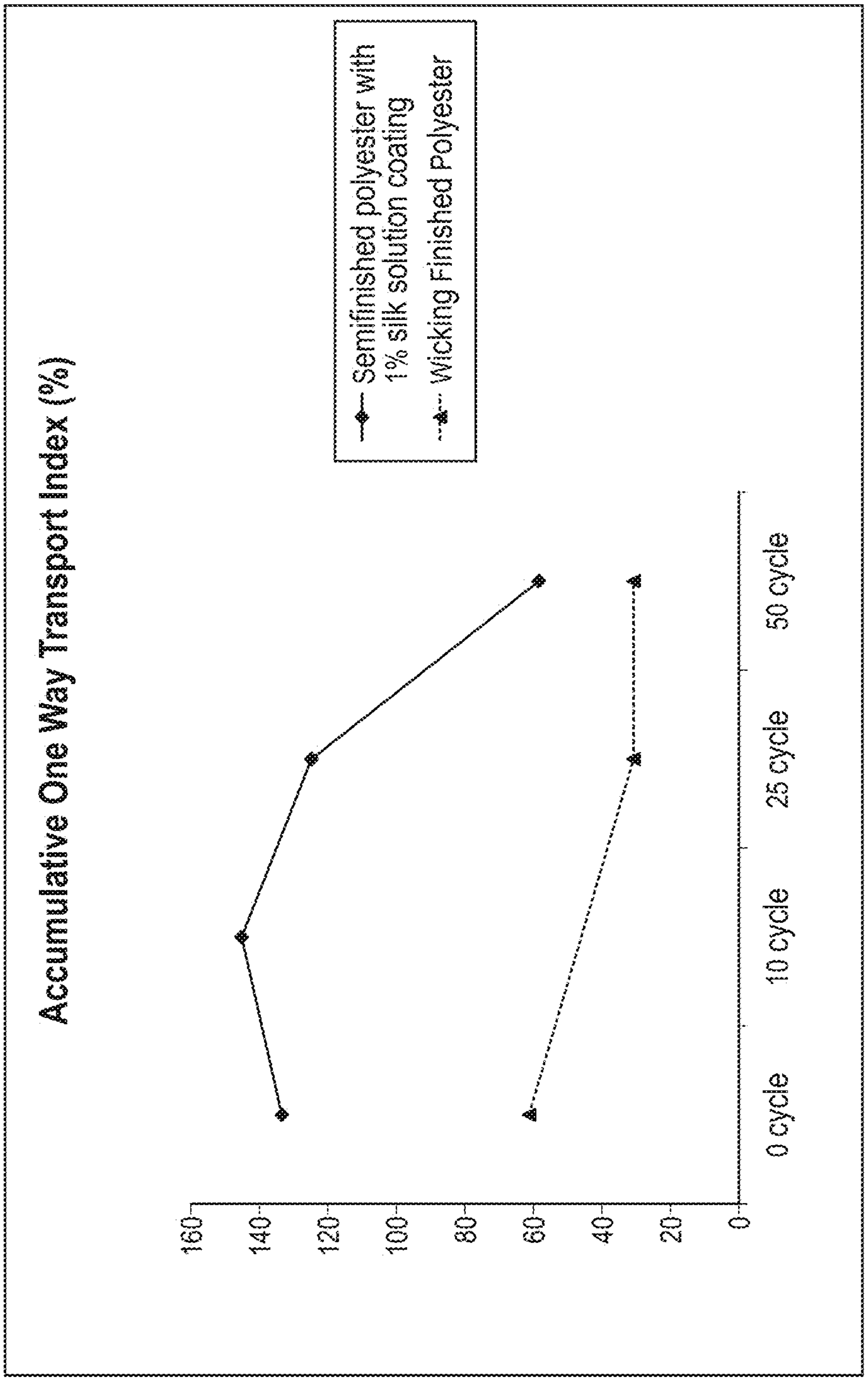

FIG. 93 illustrates accumulative one-way transport index versus fabric washing cycles.

Figure 94:
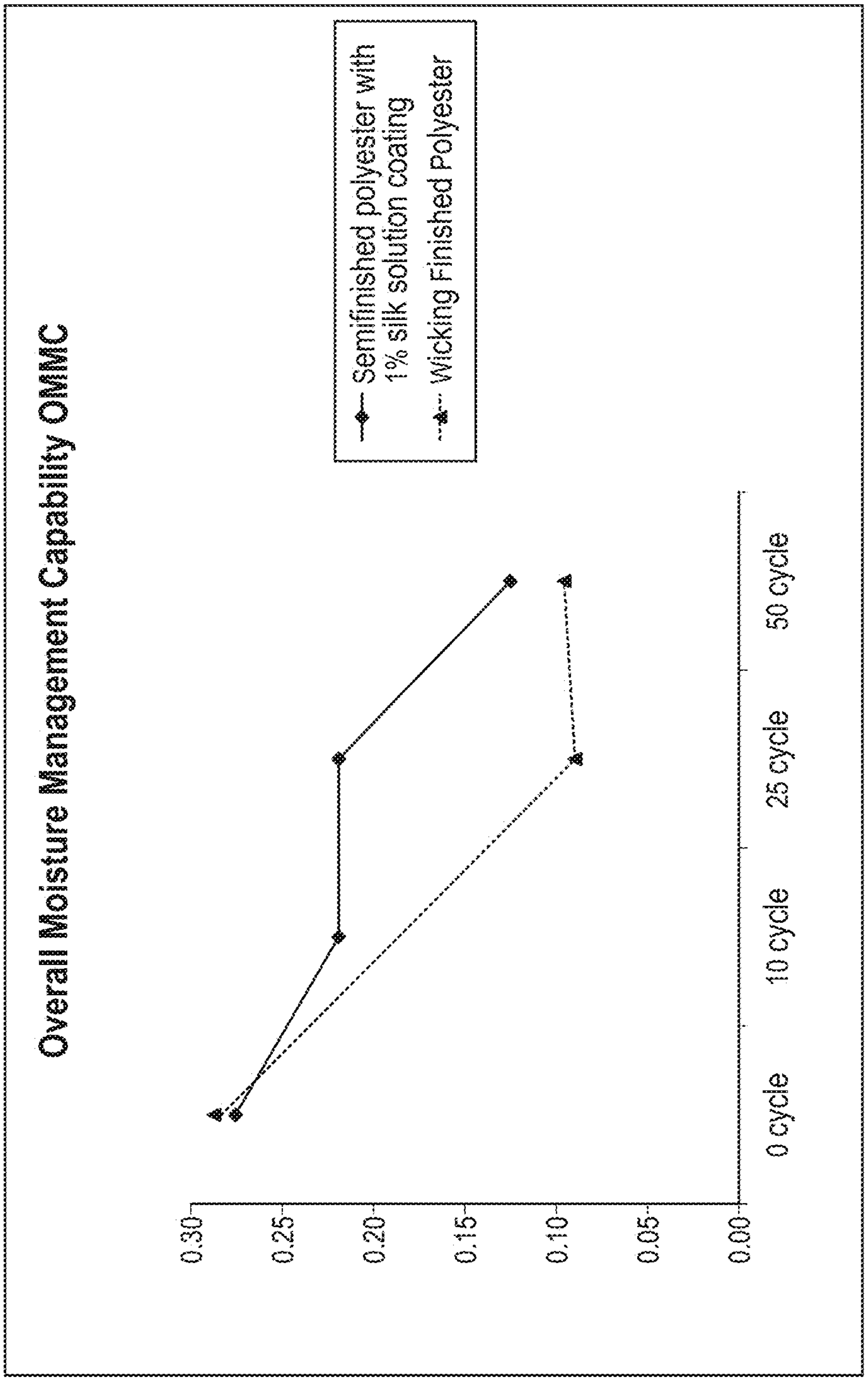

FIG. 94 illustrates overall moisture management capability (OMMC) versus fabric washing cycles.

Figure 95:
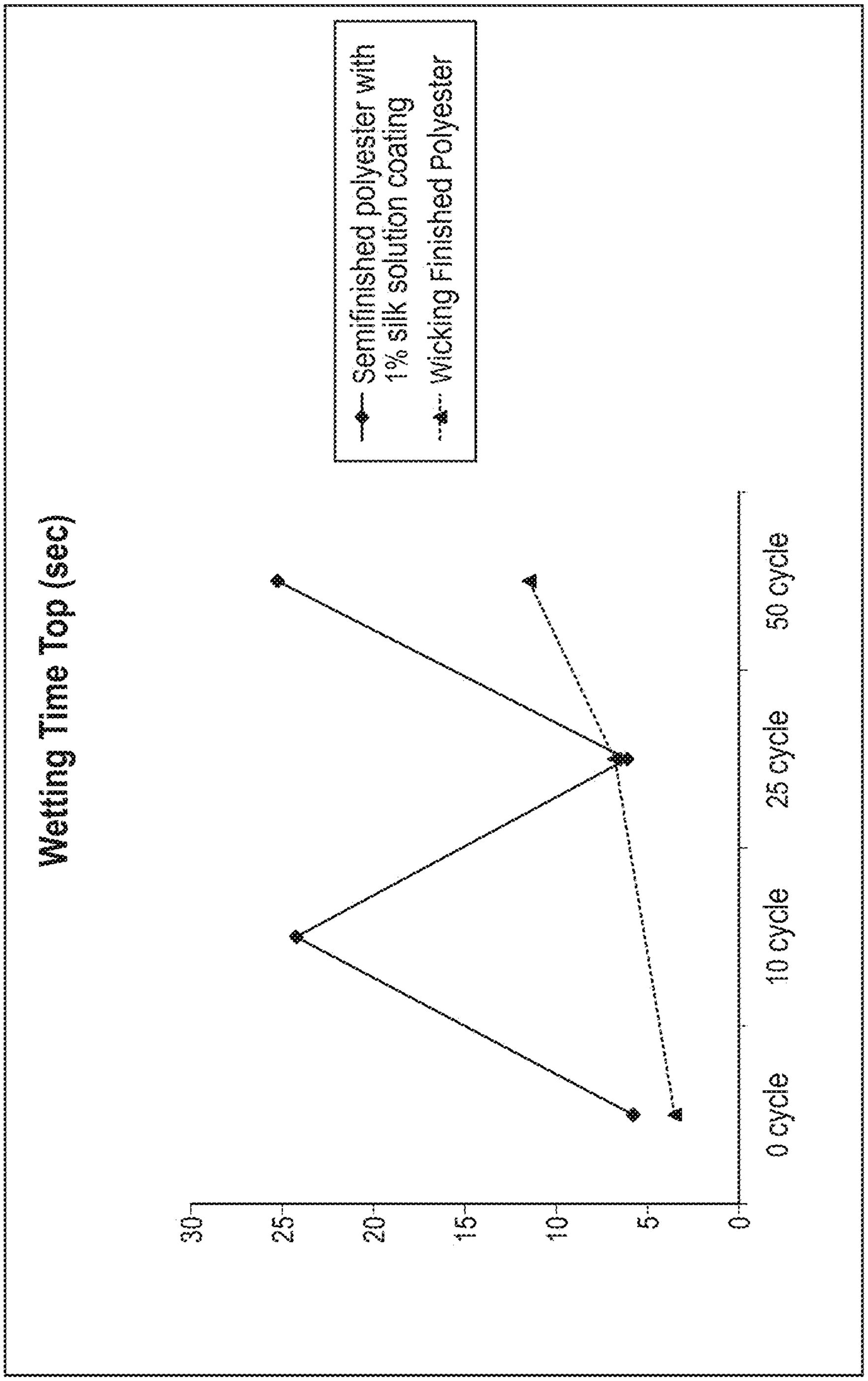

FIG. 95 illustrates wetting time at the top of the fabric versus fabric washing cycles.

Figure 96:
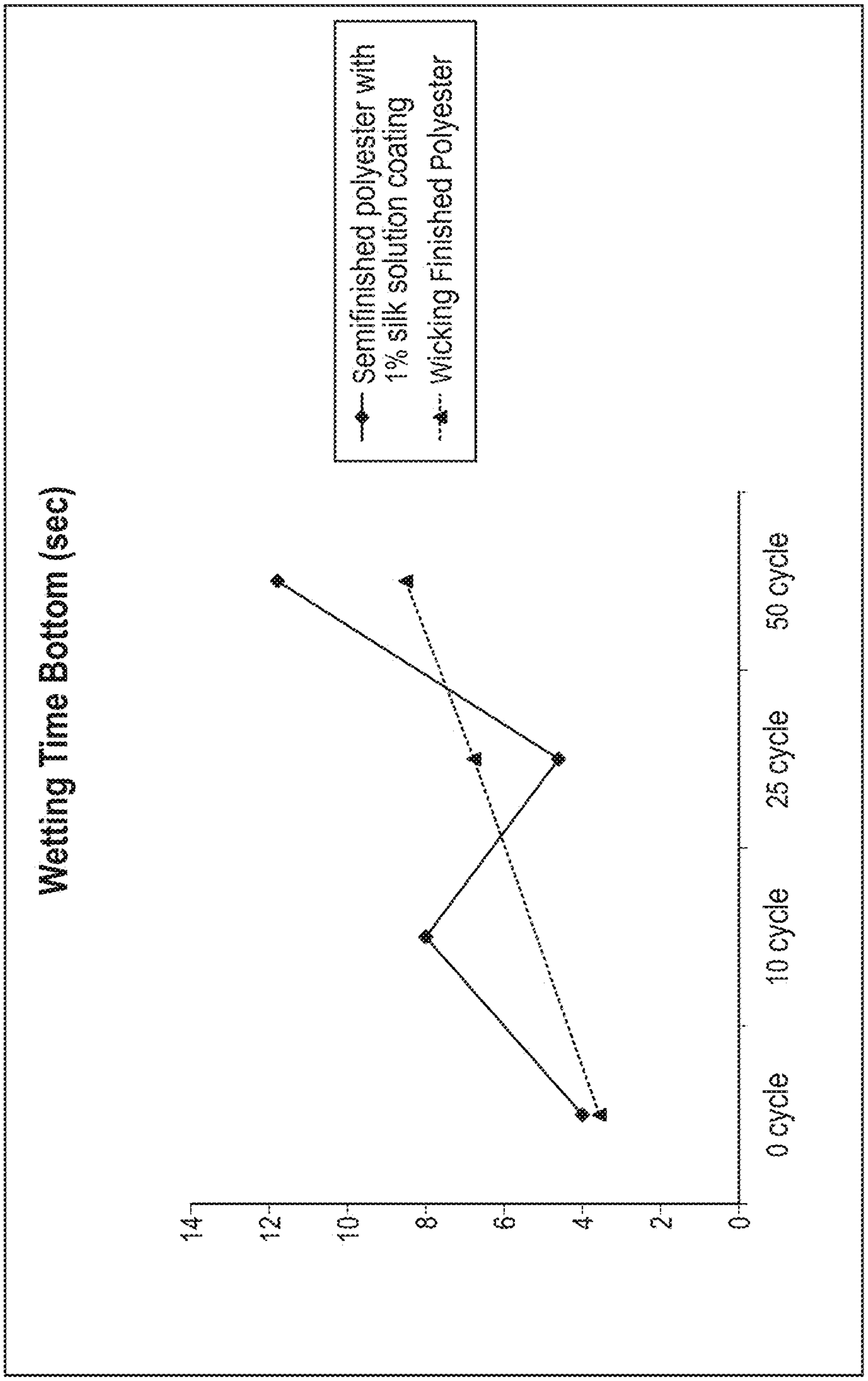

FIG. 96 illustrates wetting time at the bottom of the fabric versus fabric washing cycles.

Figure 97:
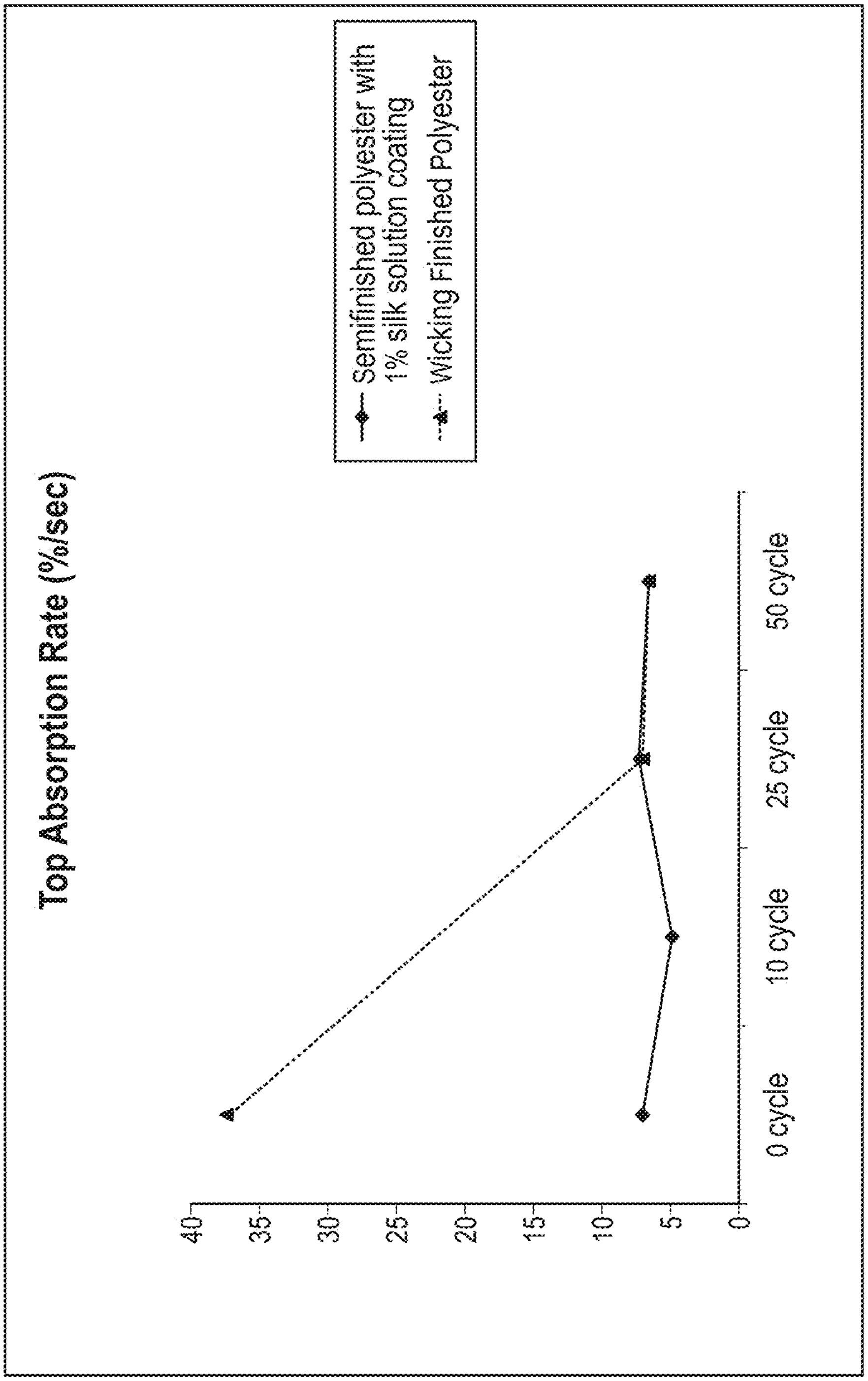

FIG. 97 illustrates absorption rate at the top of the fabric versus fabric washing cycles.

Figure 98:
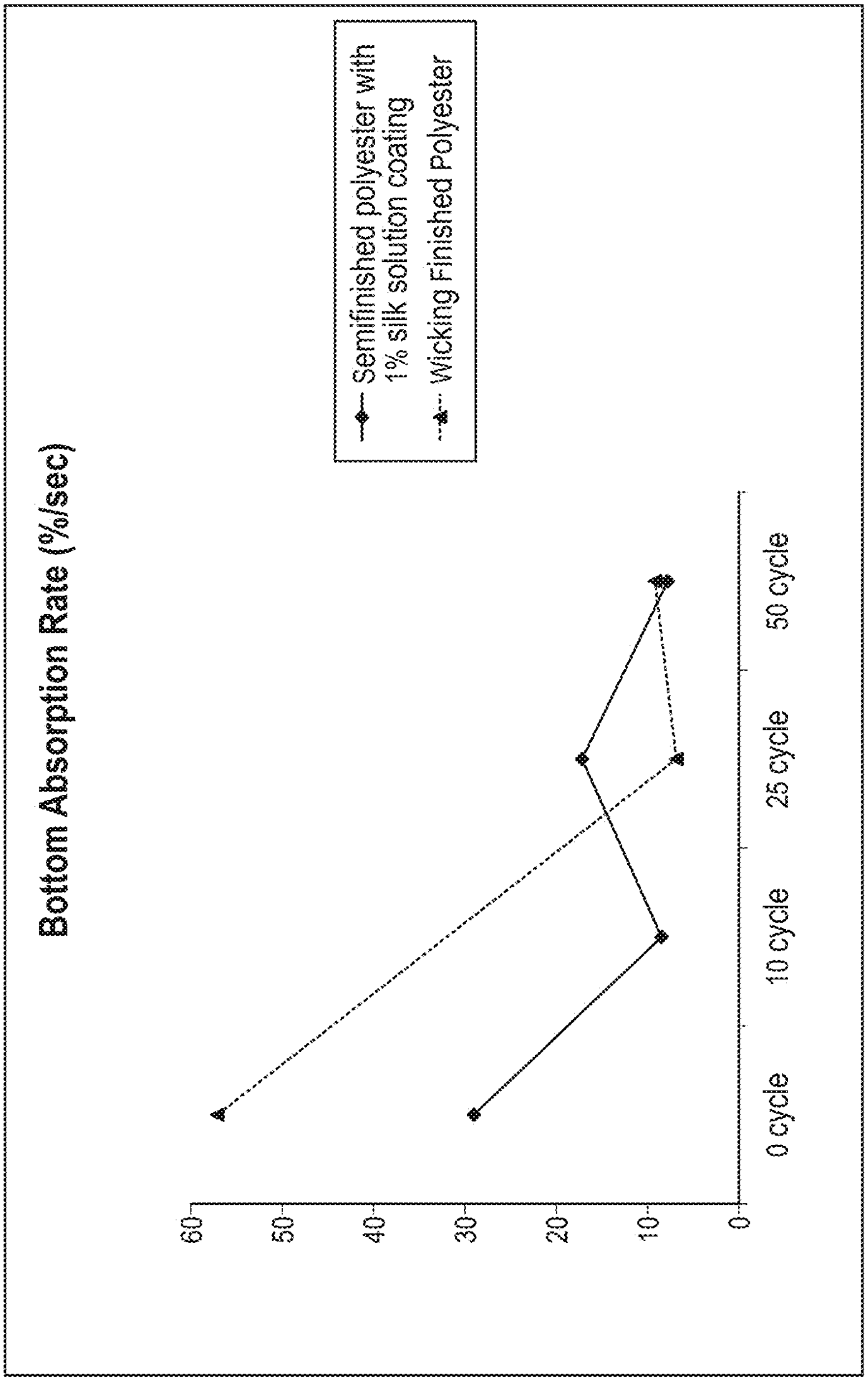

FIG. 98 illustrates absorption rate at the bottom of the fabric versus fabric washing cycles.

Figure 99:
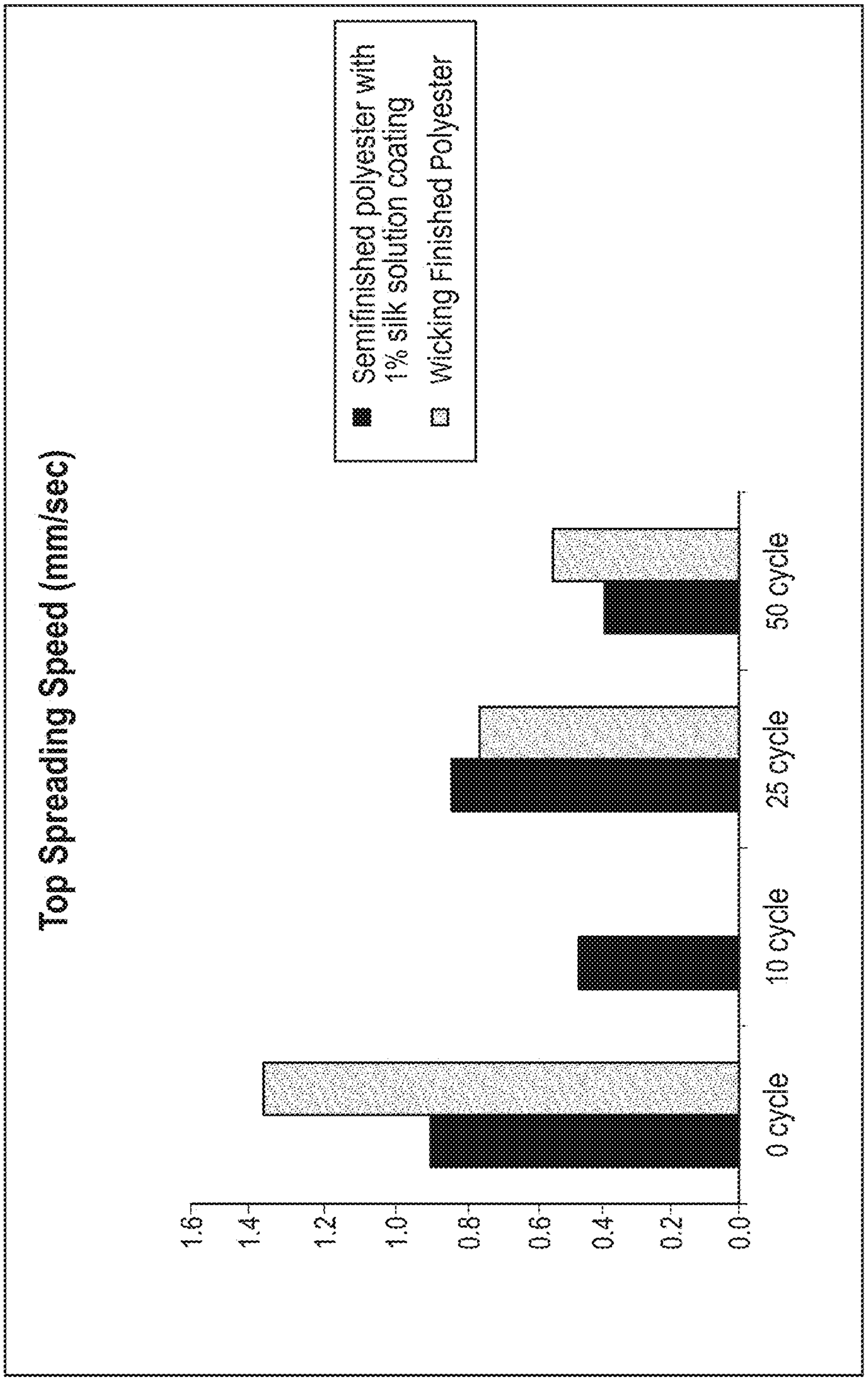

FIG. 99 illustrates spreading speed at the top of the fabric versus fabric washing cycles.

Figure 100:
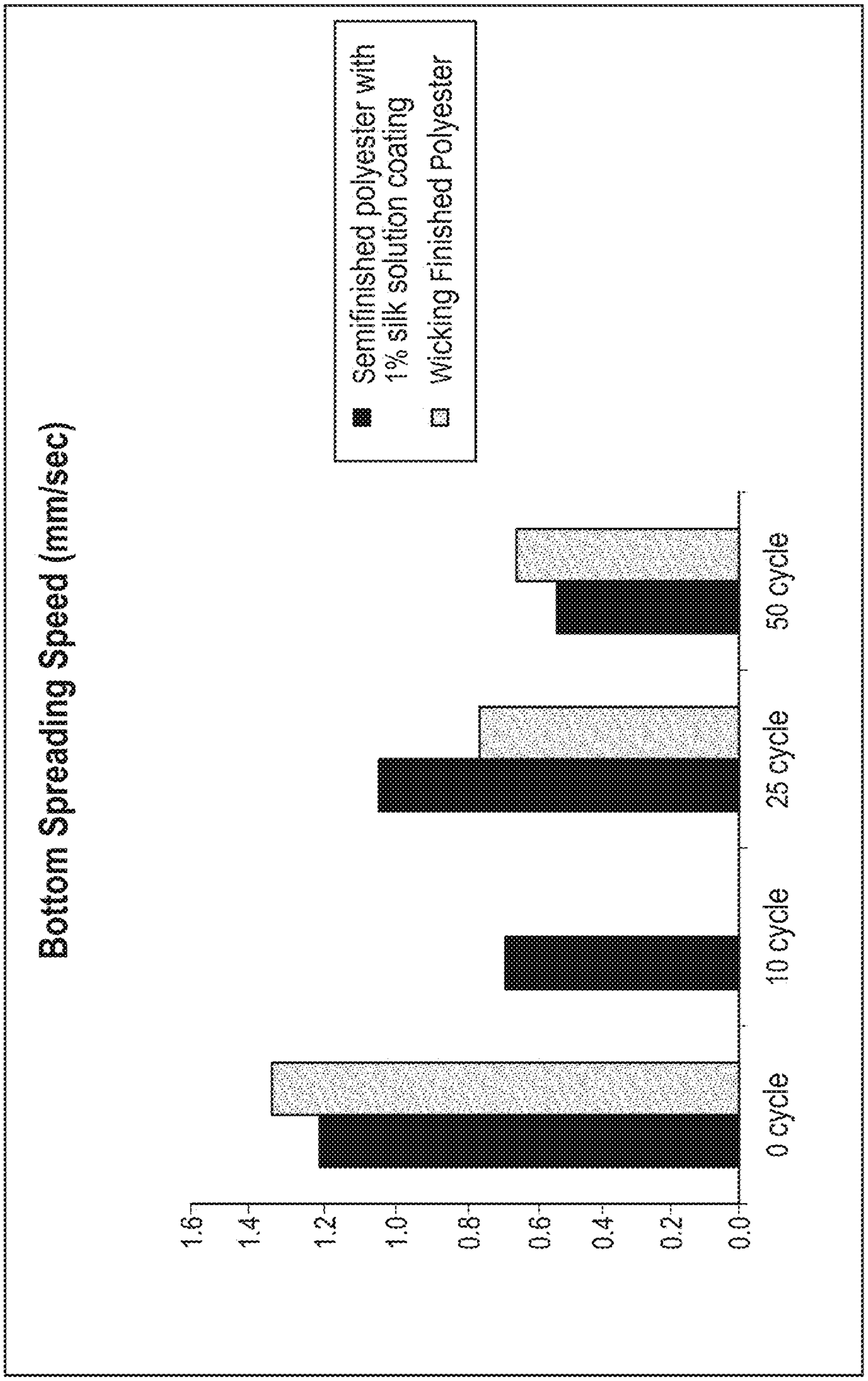

FIG. 100 illustrates spreading speed at the bottom of the fabric versus fabric washing cycles.

Figure 101:
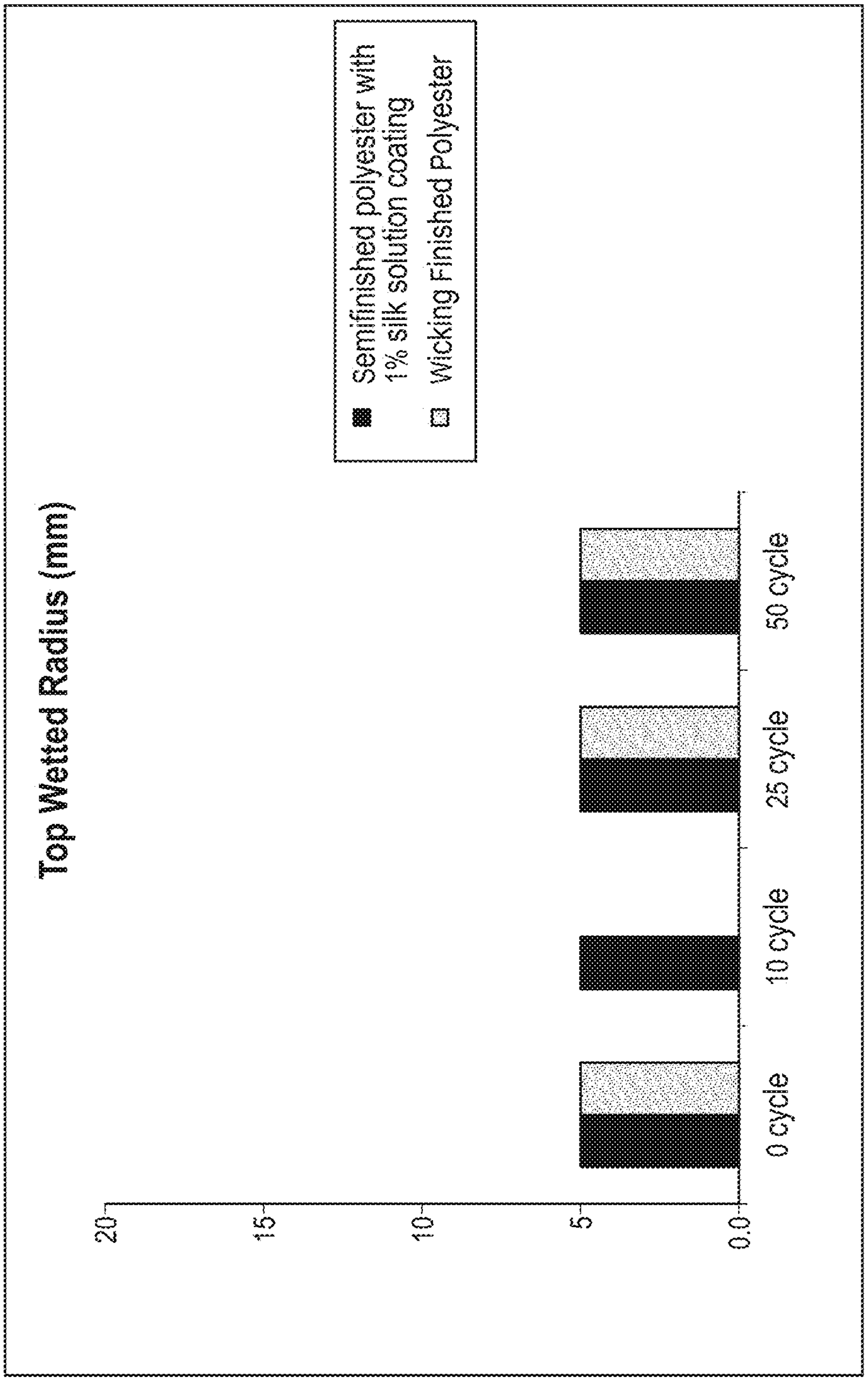

FIG. 101 illustrates wetted radius at the top of the fabric versus fabric washing cycles.

Figure 102:
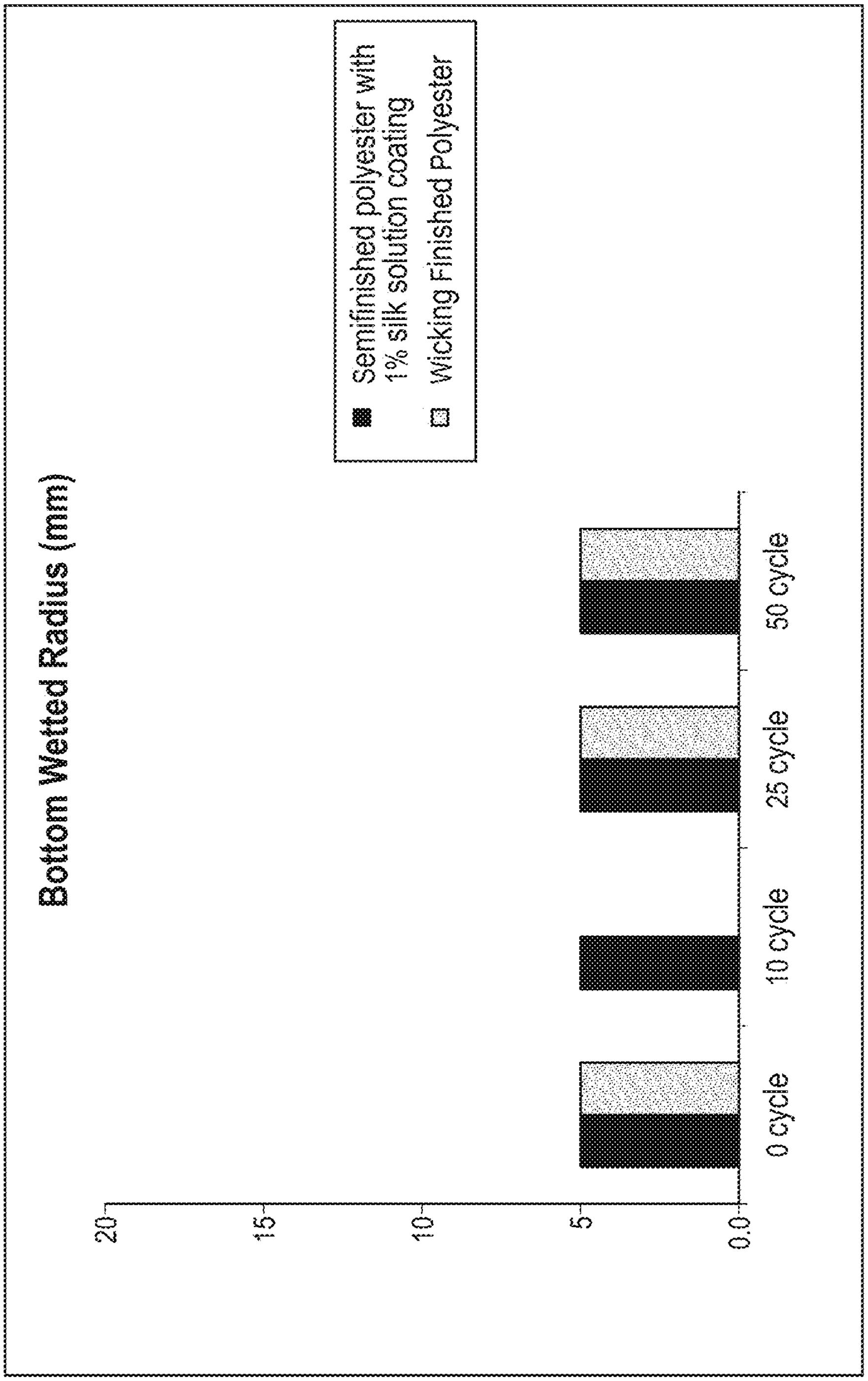

FIG. 102 illustrates wetted radius at the bottom of the fabric versus fabric washing cycles.

Figure 103:
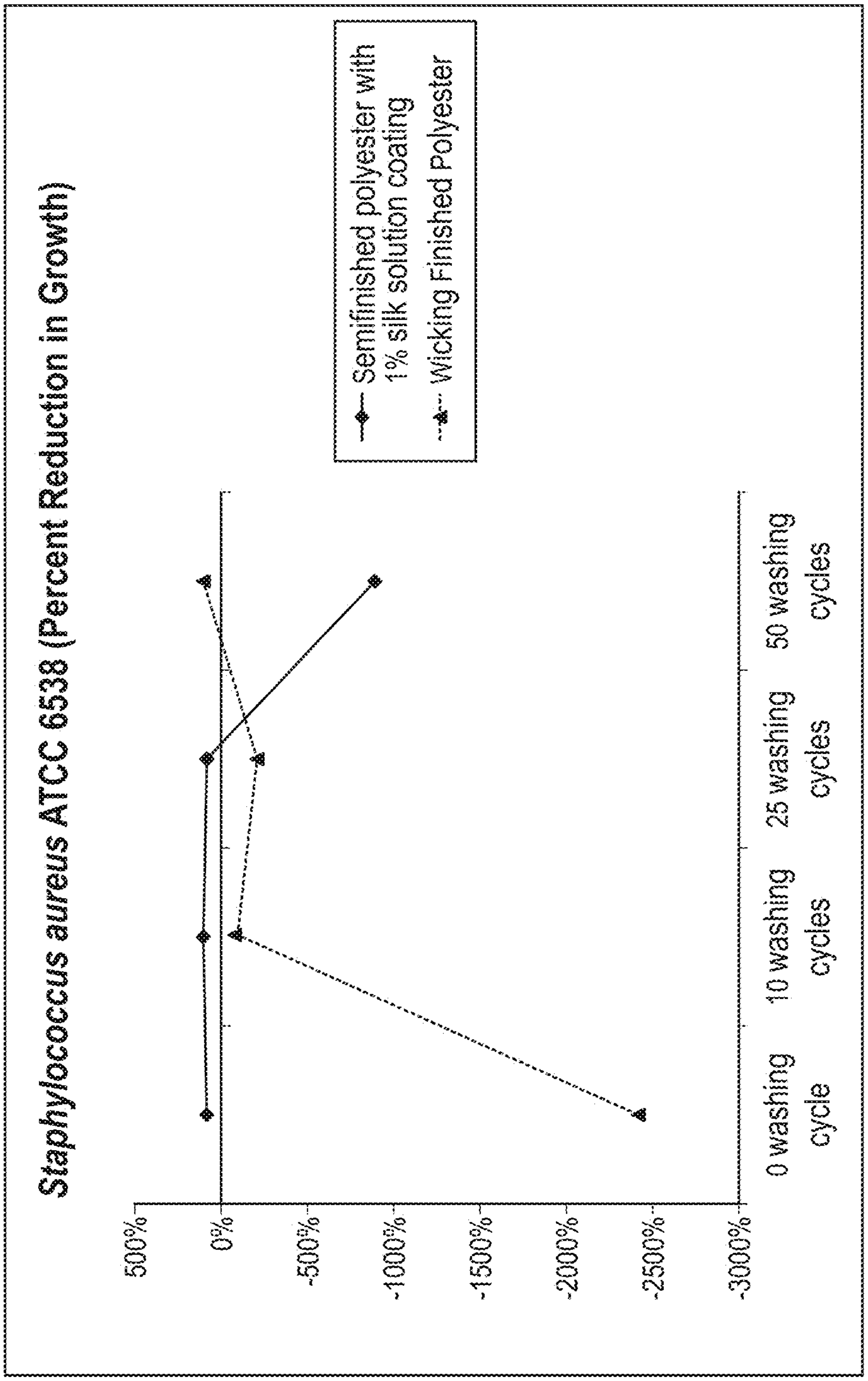

FIG. 103 illustrates percent reduction in growth of *Staphylococcus aureus* ATCC 6538 versus fabric washing cycles.

Figure 104:
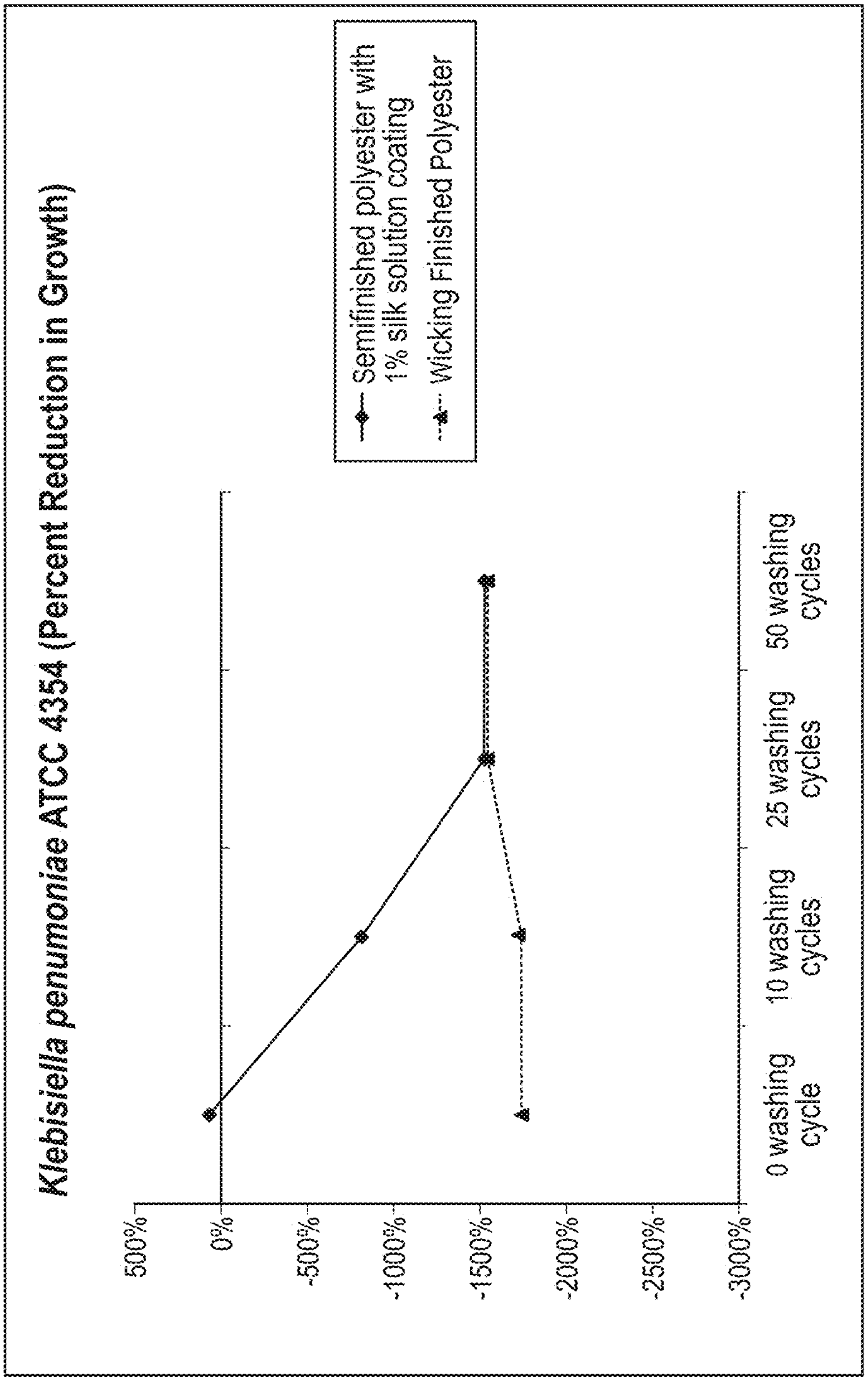

FIG. 104 illustrates percent reduction in growth of *Klebsiella pneumoniae* ATCC 4354 versus fabric washing cycles.

Figure 105:
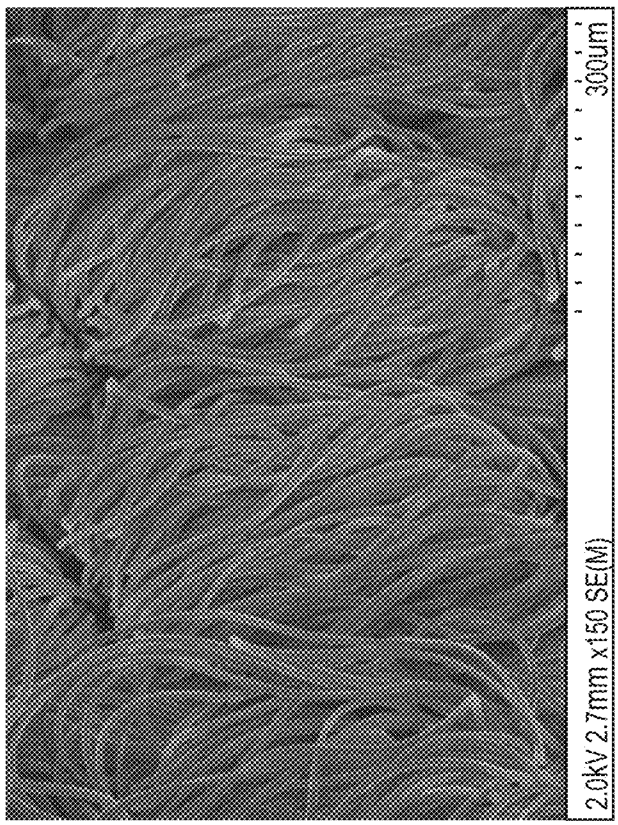

FIG. 105 illustrates a scanning electron microscopy image of fabric sample FAB-01-BATH-B (first view).

Figure 106:
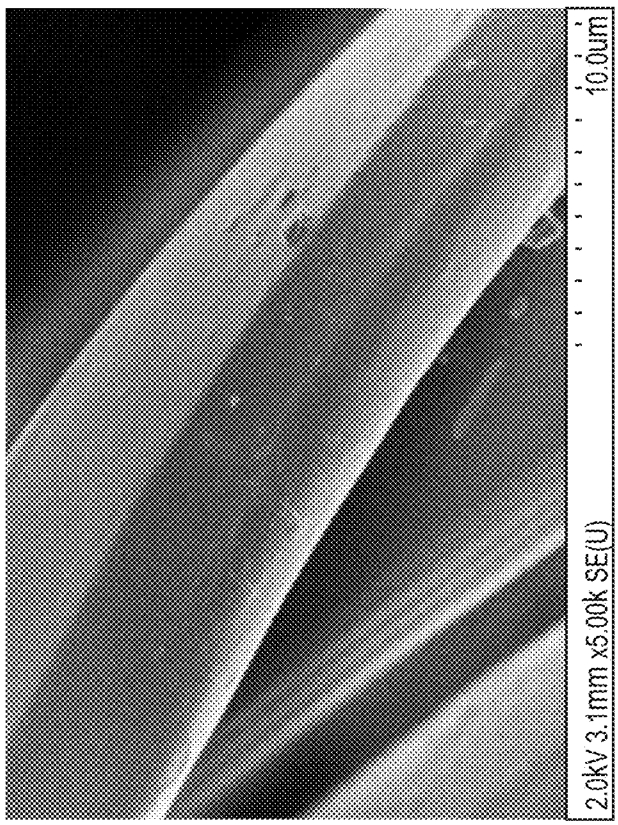

FIG. 106 illustrates a scanning electron microscopy image of fabric sample FAB-01-BATH-B (second view).

Figure 107:
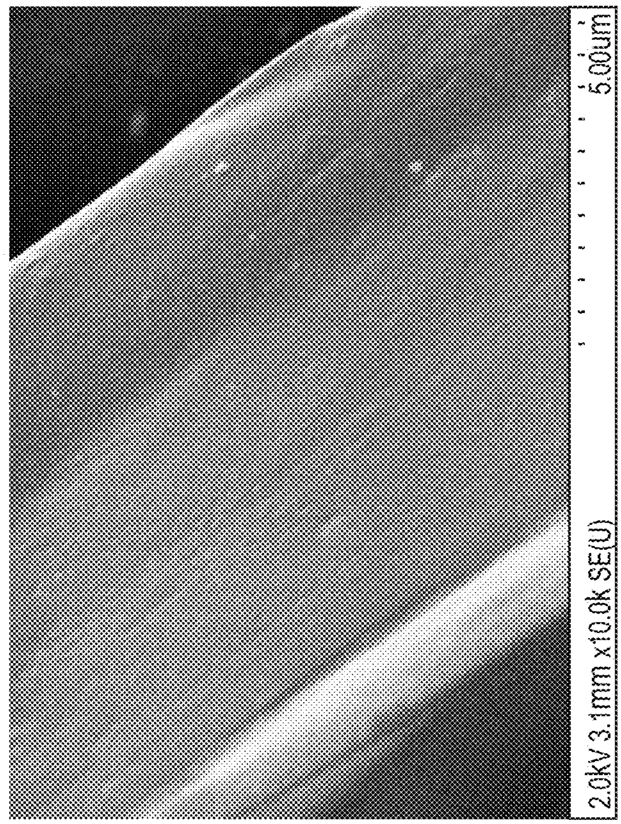

FIG. 107 illustrates a scanning electron microscopy image of fabric sample FAB-01-BATH-B (third view).

Figure 108:
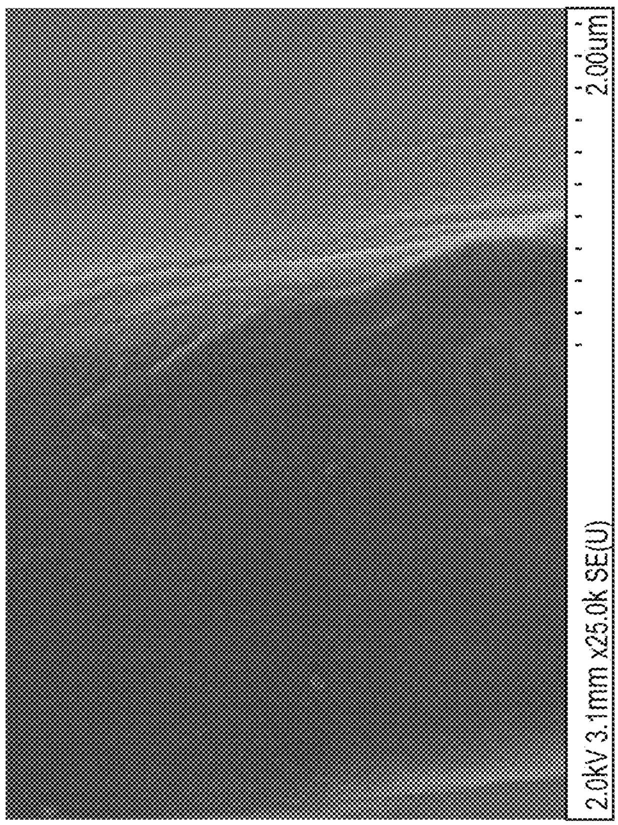

FIG. 108 illustrates a scanning electron microscopy image of fabric sample FAB-01-BATH-B (fourth view).

Figure 109:
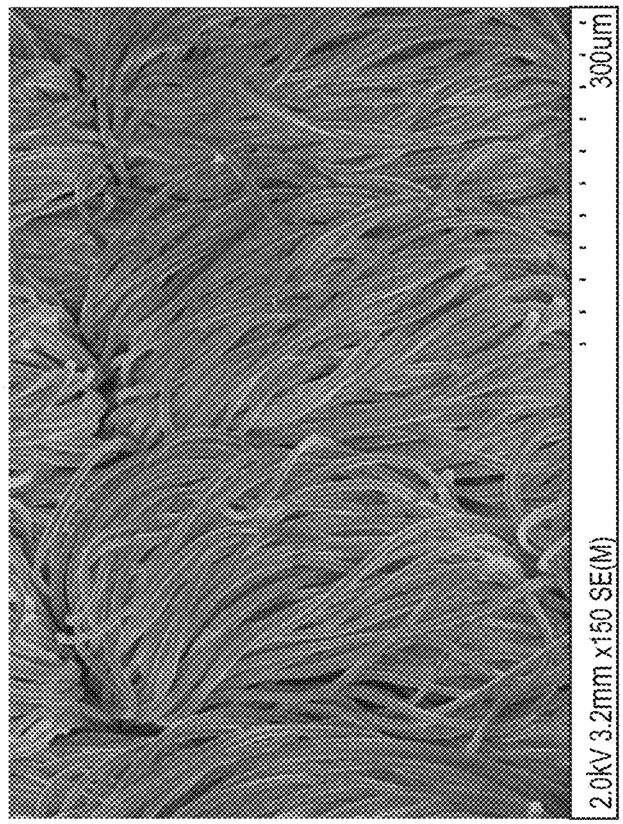

FIG. 109 illustrates a scanning electron microscopy image of fabric sample FAB-01-SPRAY-B (first view).

Figure 110:
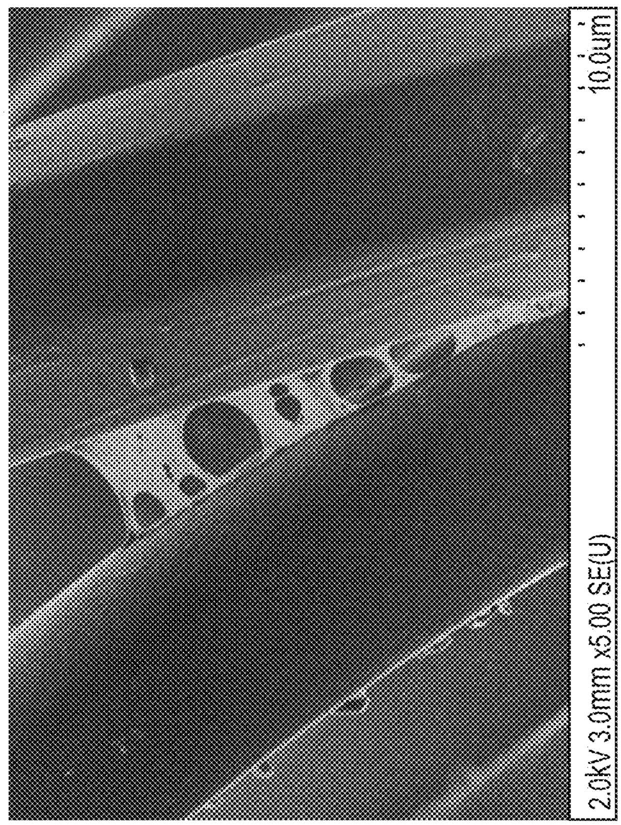

FIG. 110 illustrates a scanning electron microscopy image of fabric sample FAB-01-SPRAY-B (second view).

Figure 111:
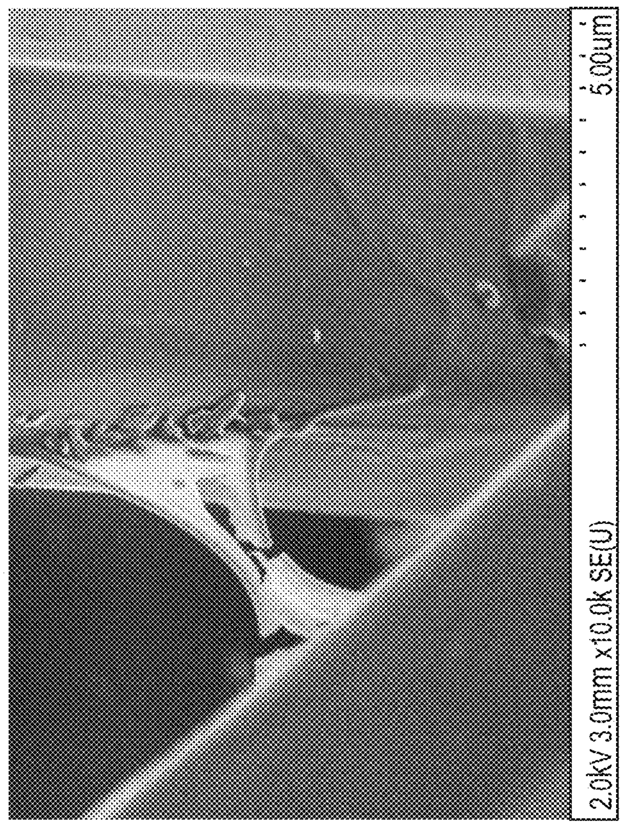

FIG. 111 illustrates a scanning electron microscopy image of fabric sample FAB-01-SPRAY-B (third view).

Figure 112:
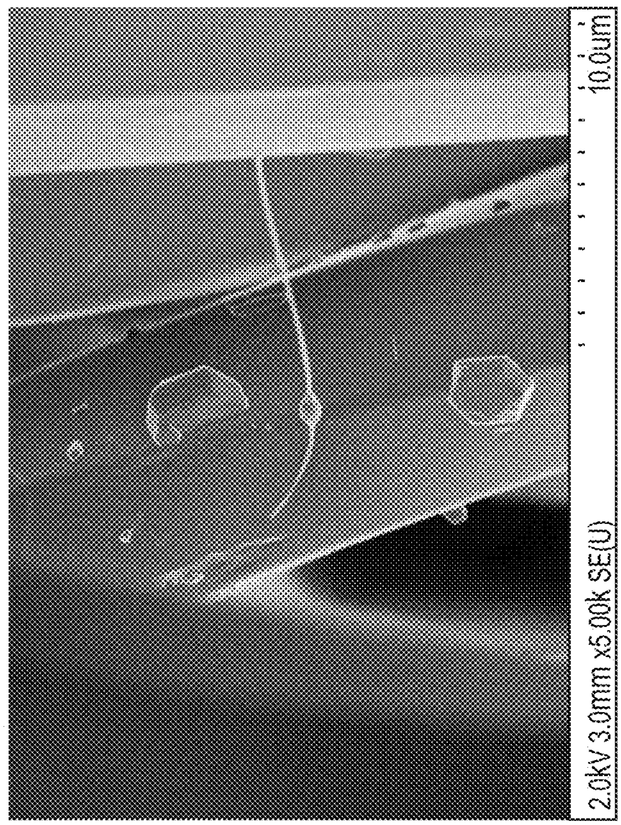

FIG. 112 illustrates a scanning electron microscopy image of fabric sample FAB-01-SPRAY-B (fourth view).

Figure 113:
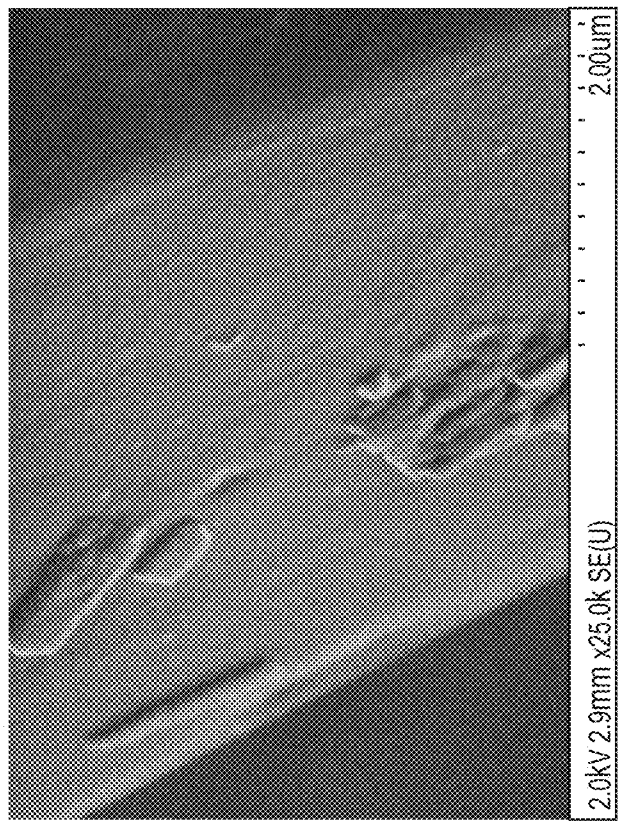

FIG. 113 illustrates a scanning electron microscopy image of fabric sample FAB-01-SPRAY-B (fifth view).

Figure 114:
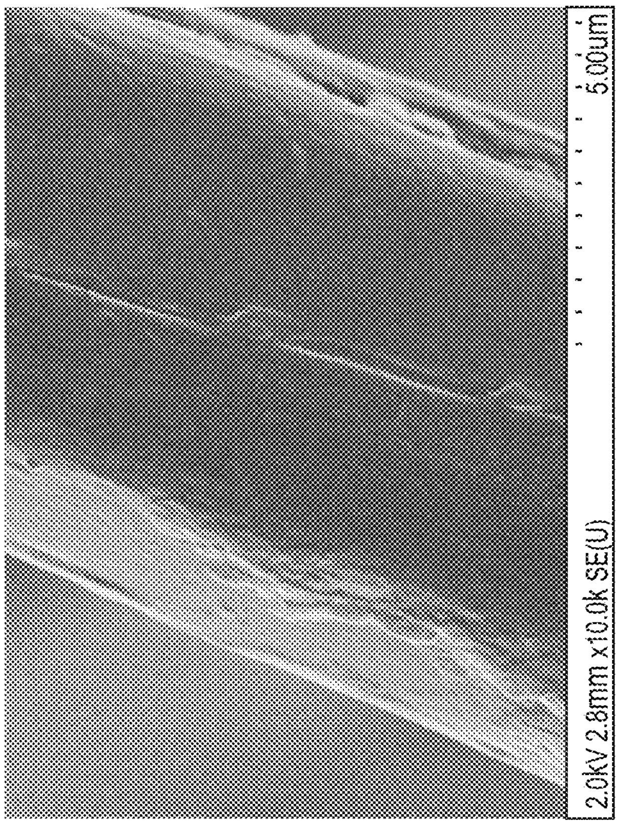

FIG. 114 illustrates a scanning electron microscopy image of fabric sample FAB-01-SPRAY-B (sixth view).

Figure 115:
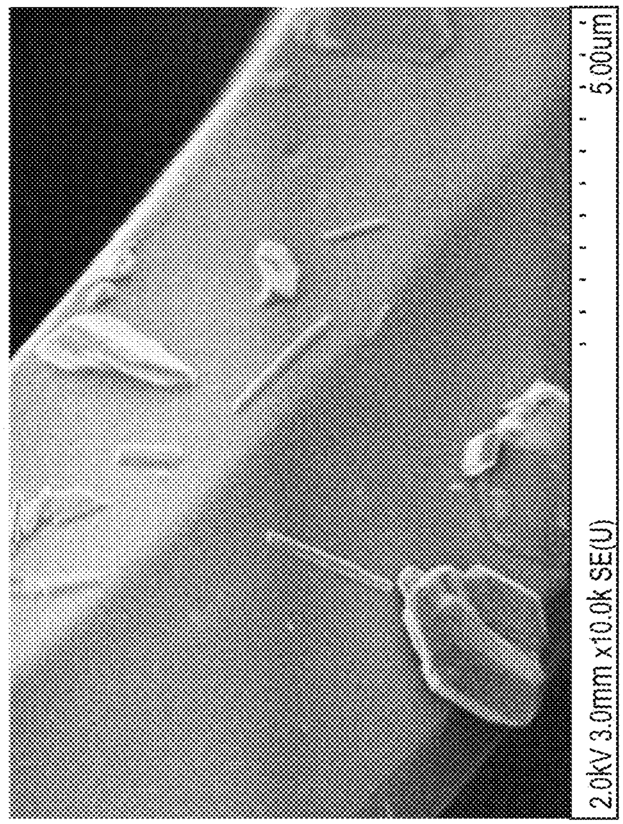

FIG. 115 illustrates a scanning electron microscopy image of fabric sample FAB-01-SPRAY-B (seventh view).

Figure 116:

FIG. 116 illustrates a scanning electron microscopy image of fabric sample FAB-01-SPRAY-C (first view).

Figure 117:
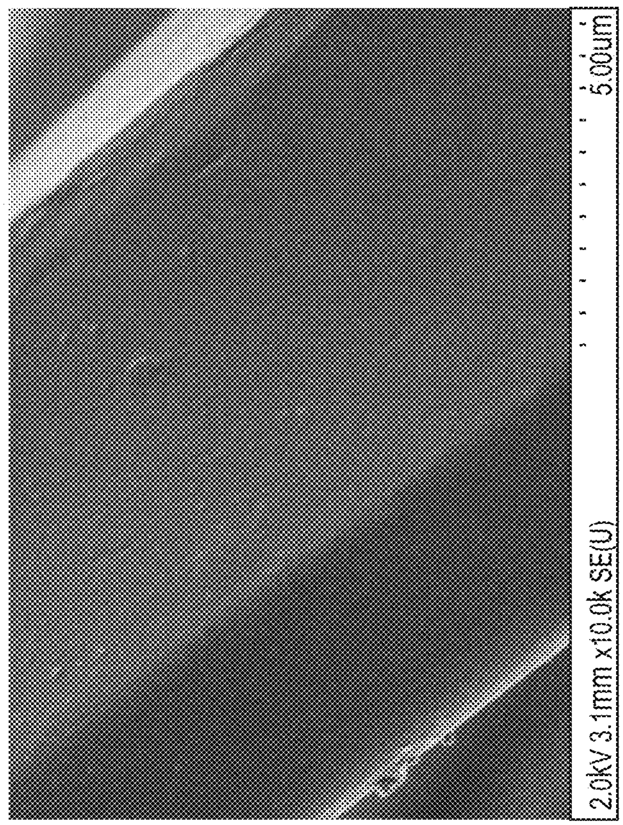

FIG. 117 illustrates a scanning electron microscopy image of fabric sample FAB-01-SPRAY-C (second view).

Figure 118:
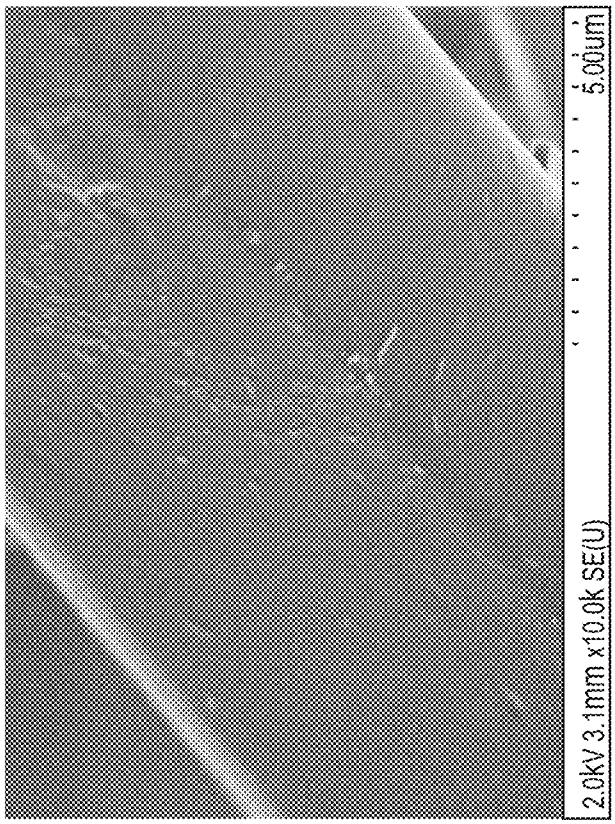

FIG. 118 illustrates a scanning electron microscopy image of fabric sample FAB-01-SPRAY-C (third view).

Figure 119:
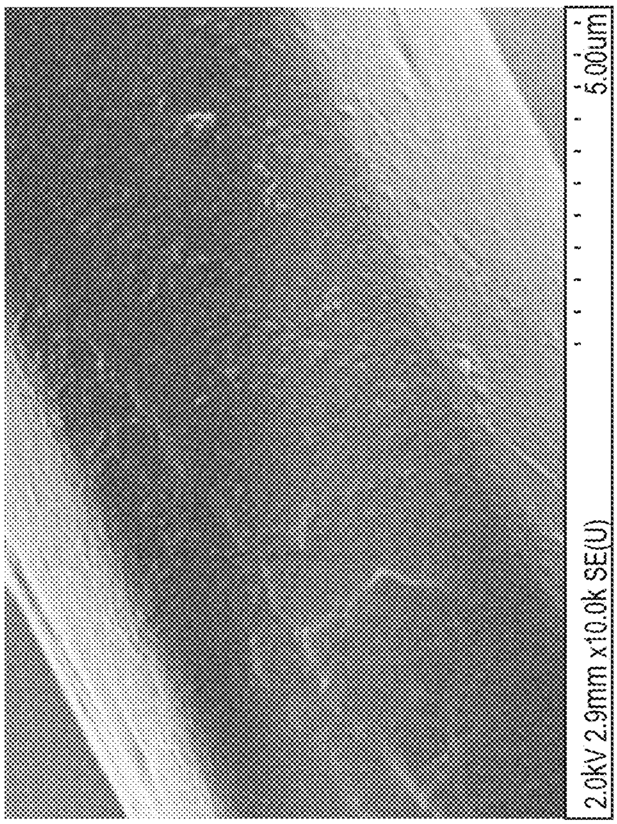

FIG. 119 illustrates a scanning electron microscopy image of fabric sample FAB-01-SPRAY-C (fourth view).

Figure 120:
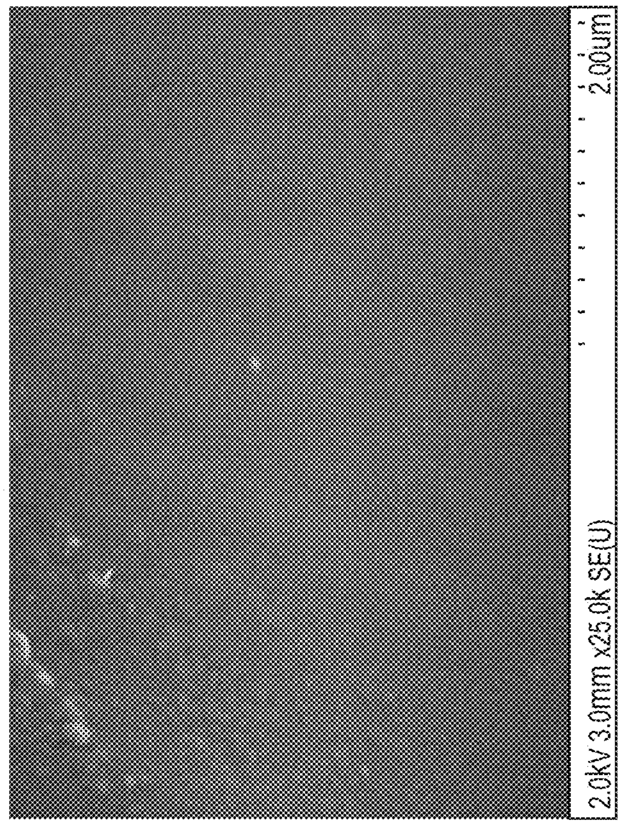

FIG. 120 illustrates a scanning electron microscopy image of fabric sample FAB-01-SPRAY-C (fifth view).

Figure 121:
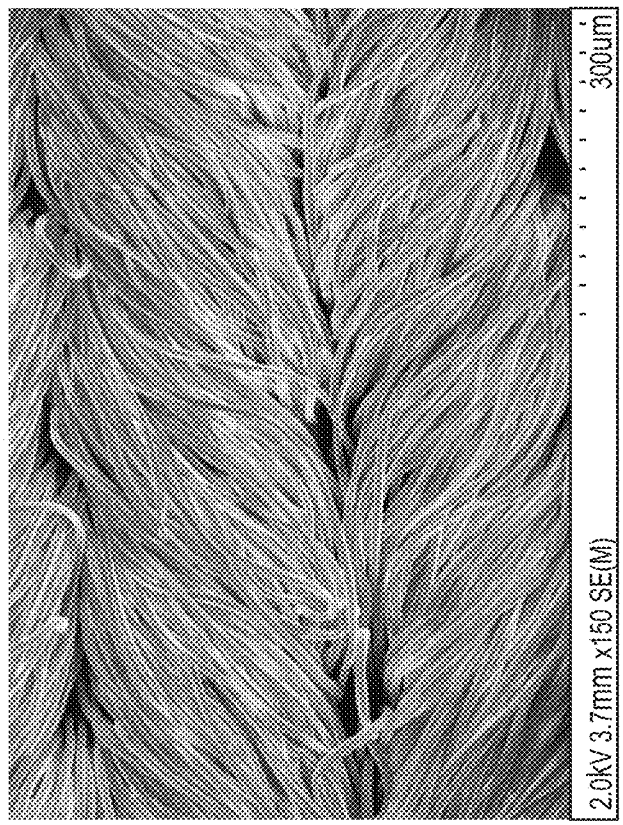

FIG. 121 illustrates a scanning electron microscopy image of fabric sample FAB-01-STEN-C (first view).

Figure 122:
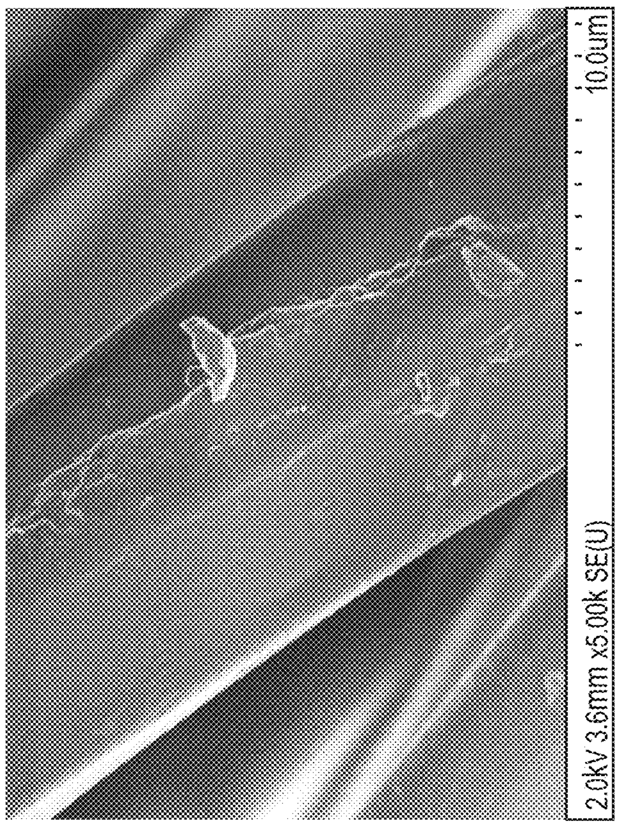

FIG. 122 illustrates a scanning electron microscopy image of fabric sample FAB-01-STEN-C (second view).

Figure 123:
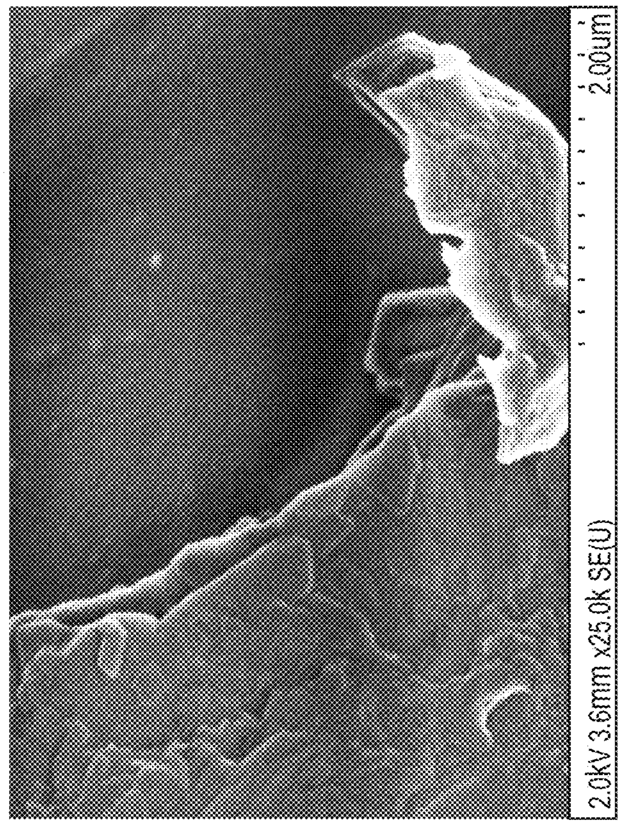

FIG. 123 illustrates a scanning electron microscopy image of fabric sample FAB-01-STEN-C (third view).

Figure 124:
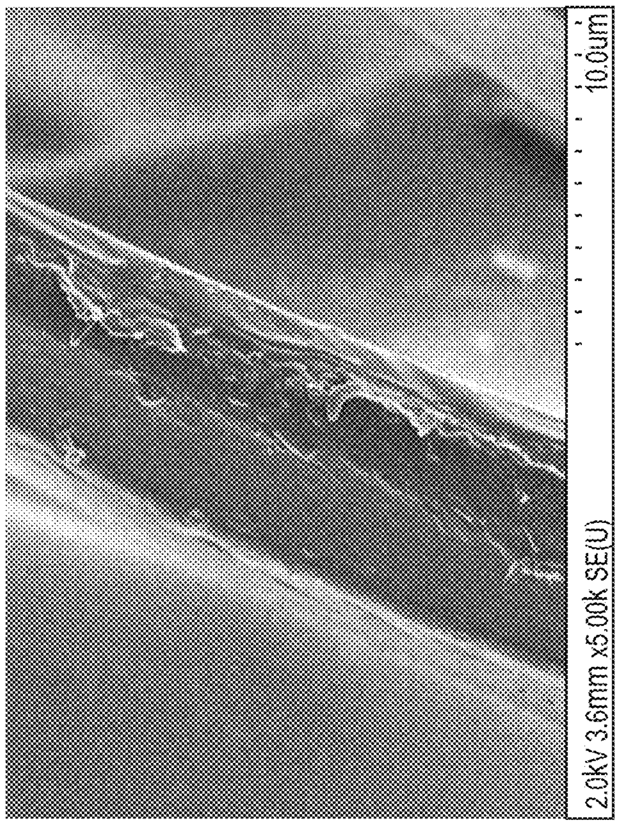

FIG. 124 illustrates a scanning electron microscopy image of fabric sample FAB-01-STEN-C (fourth view).

Figure 125:
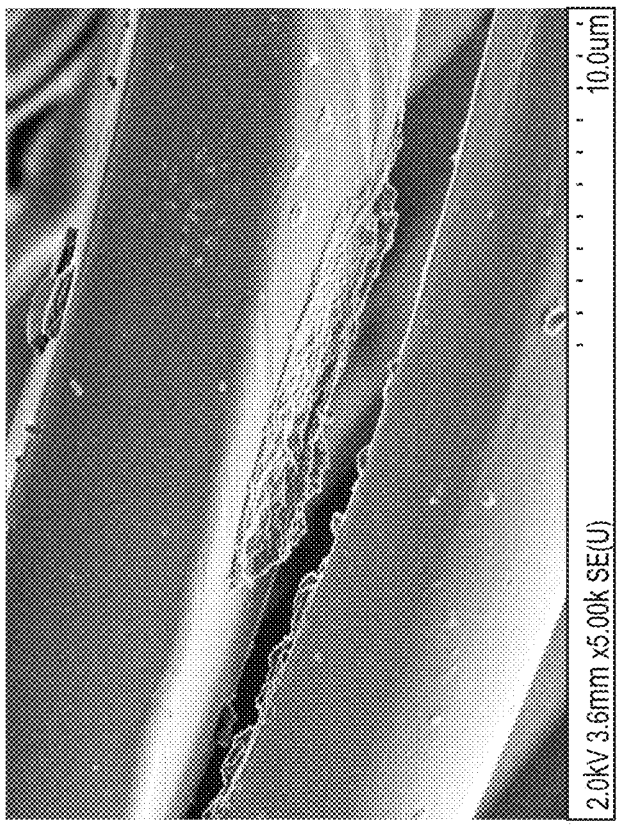

FIG. 125 illustrates a scanning electron microscopy image of fabric sample FAB-01-STEN-C (fifth view).

Figure 126:
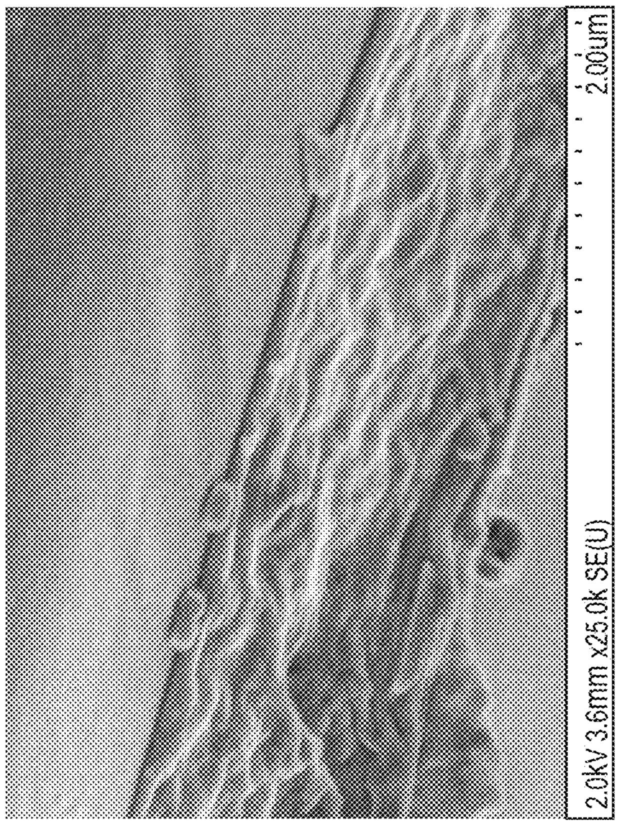

FIG. 126 illustrates a scanning electron microscopy image of fabric sample FAB-01-STEN-C (sixth view).

Figure 127:
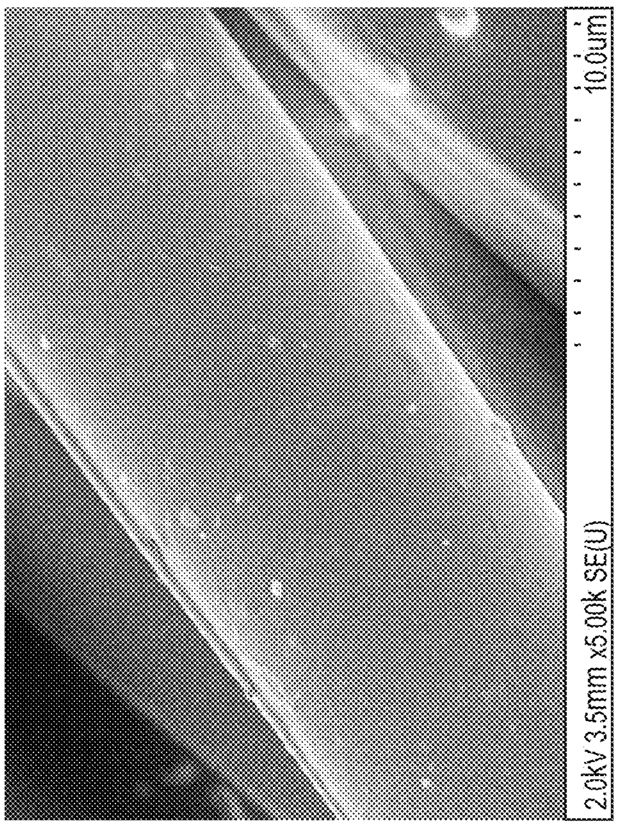

FIG. 127 illustrates a scanning electron microscopy image of fabric sample FAB-01-STEN-C (seventh view).

Figure 128:
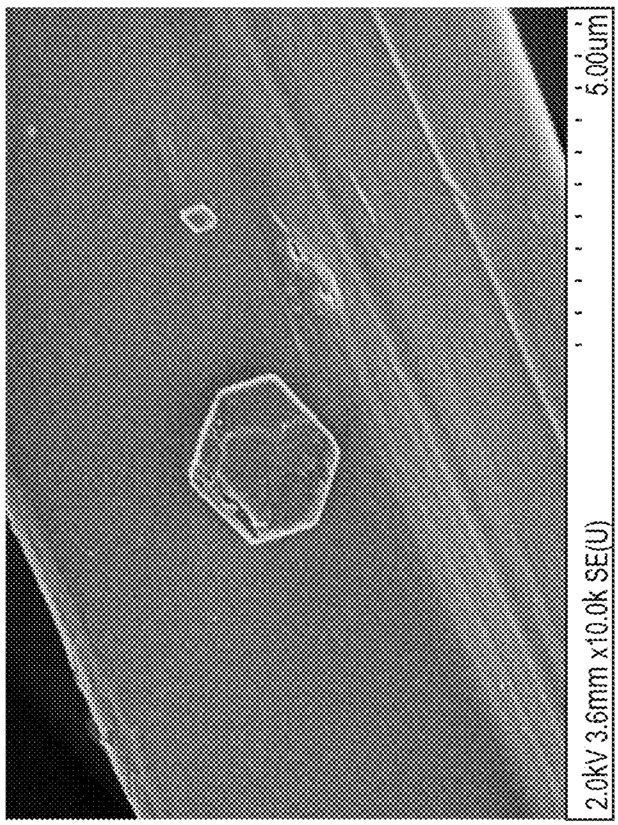

FIG. 128 illustrates a scanning electron microscopy image of fabric sample FAB-01-STEN-C (eighth view).

Figure 129:
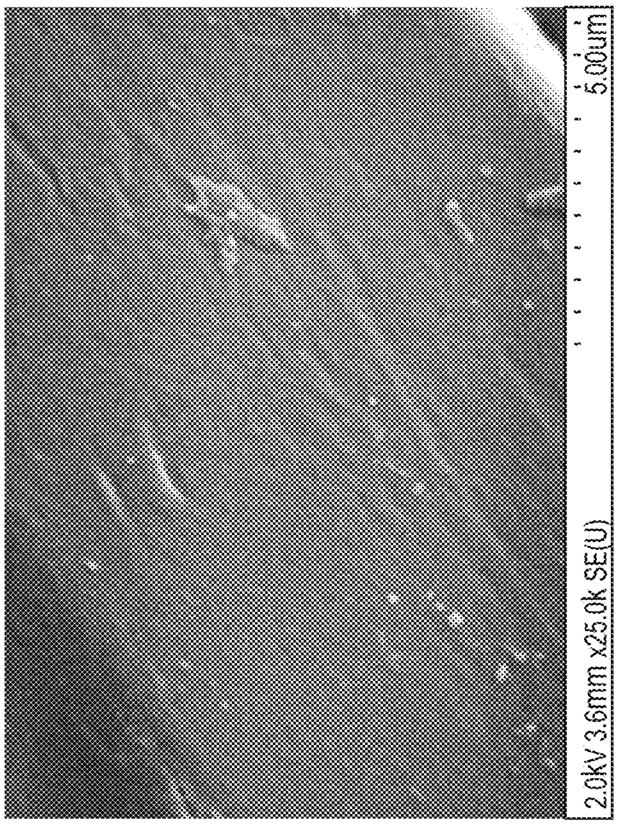

FIG. 129 illustrates a scanning electron microscopy image of fabric sample FAB-01-STEN-C (ninth view).

Figure 130:
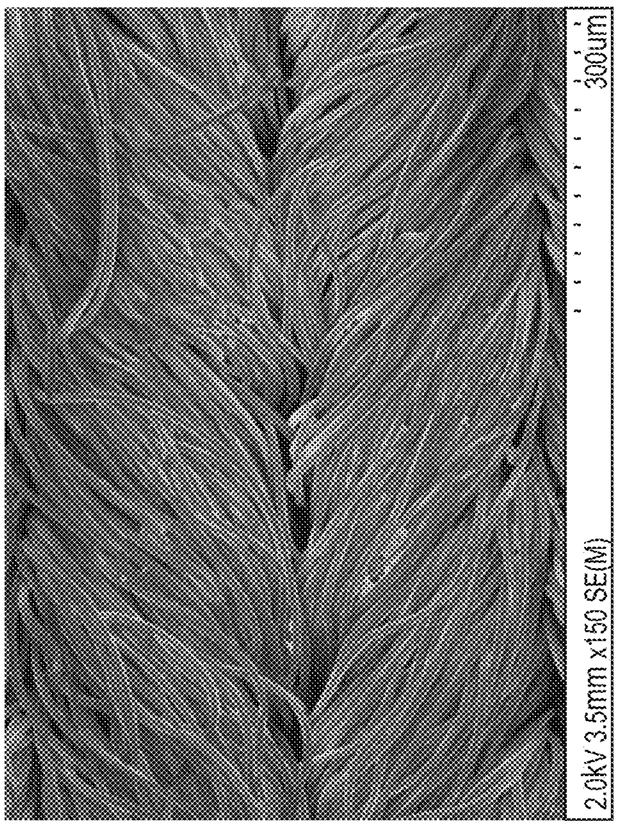

FIG. 130 illustrates a scanning electron microscopy image of fabric sample FAB-10-BATH-B (first view).

Figure 131:
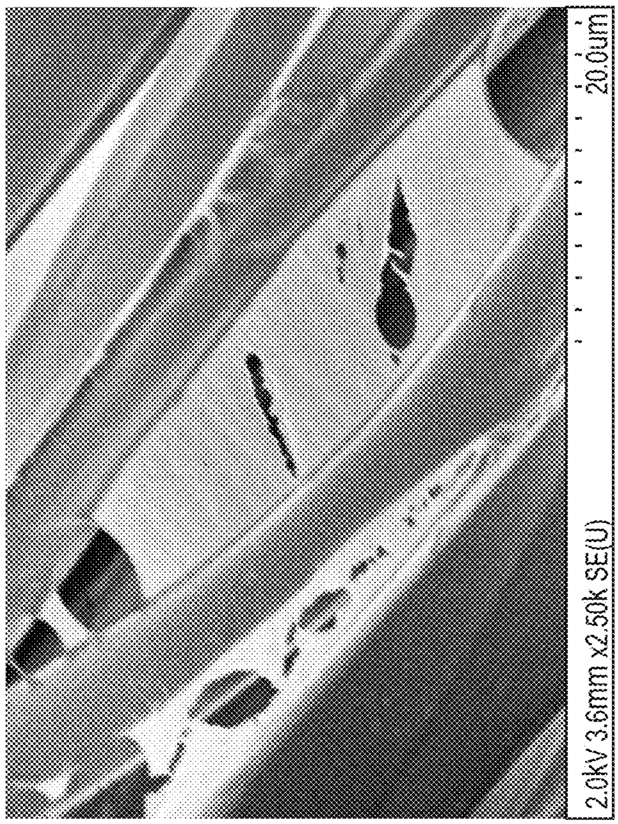

FIG. 131 illustrates a scanning electron microscopy image of fabric sample FAB-10-BATH-B (second view).

Figure 132:
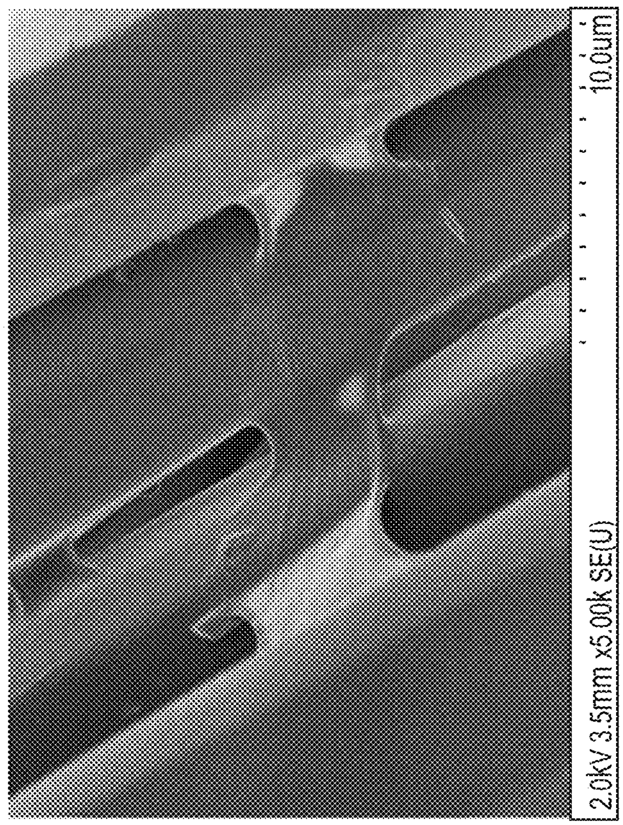

FIG. 132 illustrates a scanning electron microscopy image of fabric sample FAB-10-BATH-B (third view).

Figure 133:
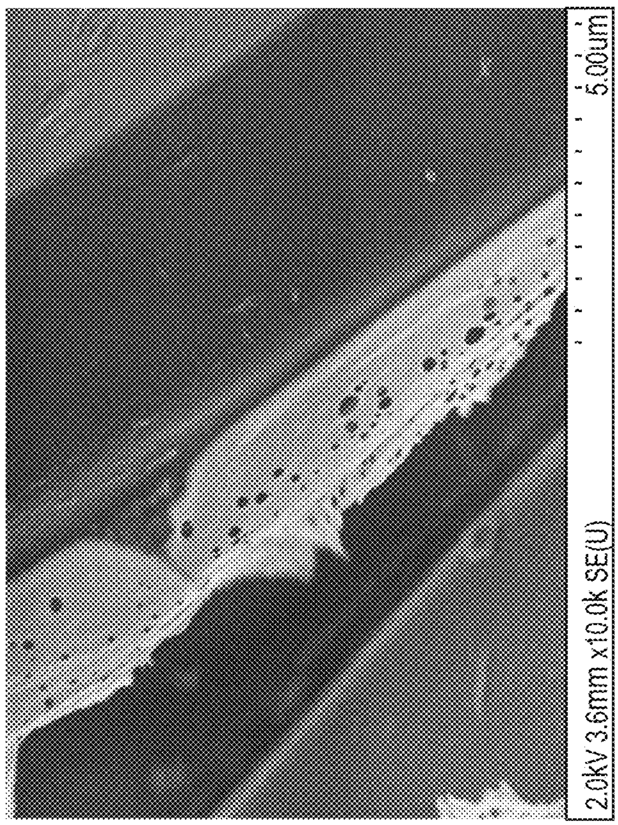

FIG. 133 illustrates a scanning electron microscopy image of fabric sample FAB-10-BATH-B (fourth view).

Figure 134:
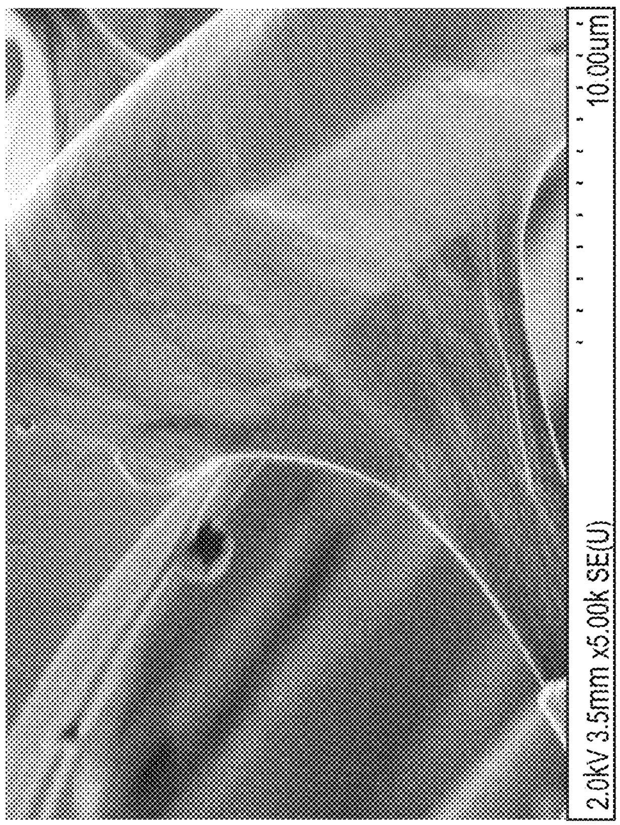

FIG. 134 illustrates a scanning electron microscopy image of fabric sample FAB-10-BATH-B (fifth view).

Figure 135:
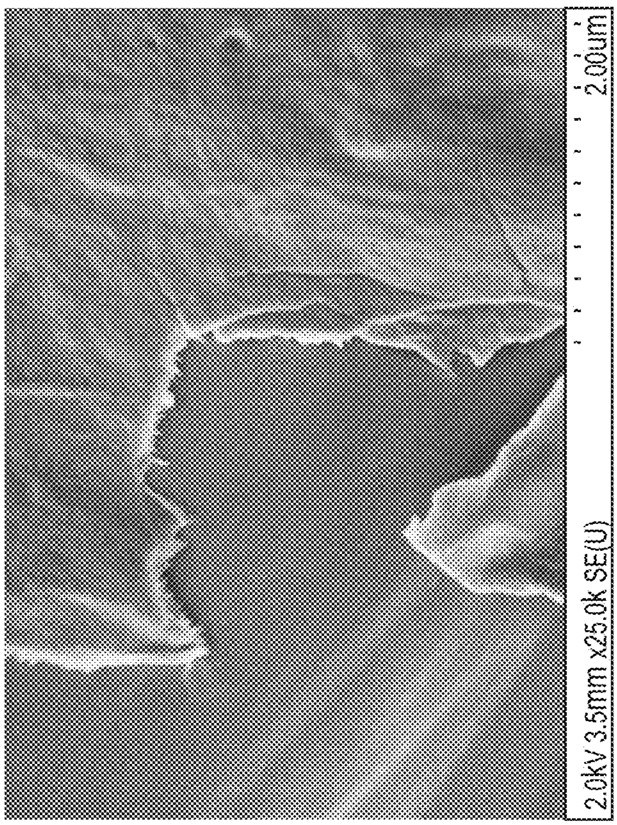

FIG. 135 illustrates a scanning electron microscopy image of fabric sample FAB-10-BATH-B (sixth view).

Figure 136:
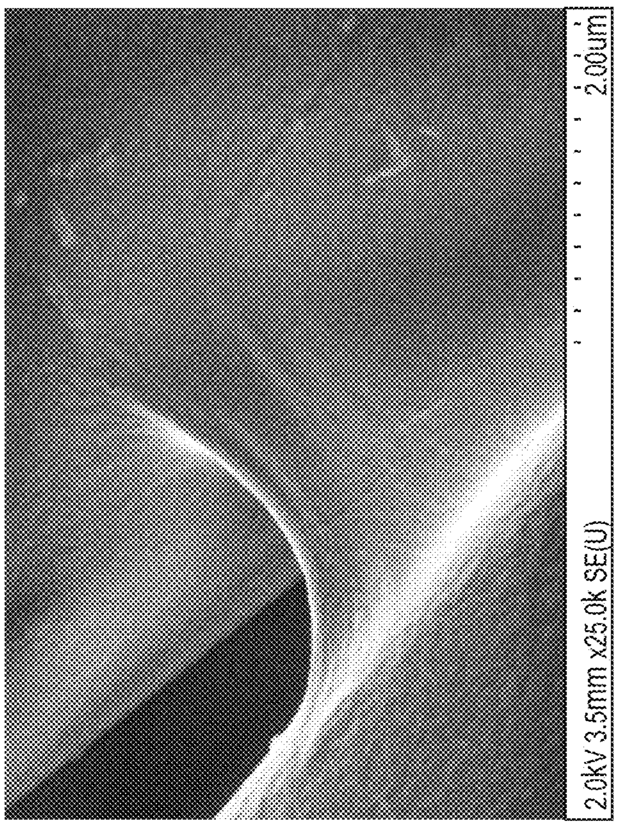

FIG. 136 illustrates a scanning electron microscopy image of fabric sample FAB-10-BATH-B (seventh view).

Figure 137:
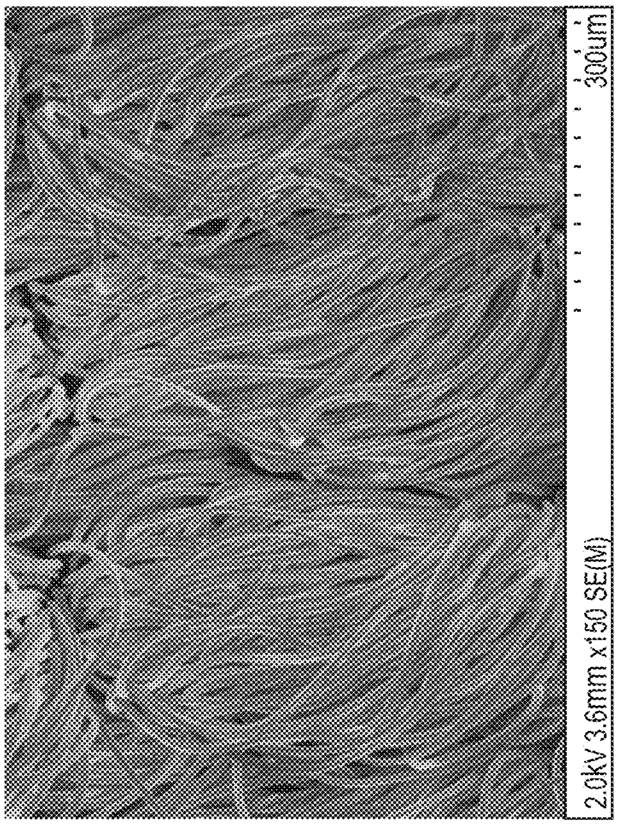

FIG. 137 illustrates a scanning electron microscopy image of fabric sample FAB-10-BATH-C (first view).

Figure 138:
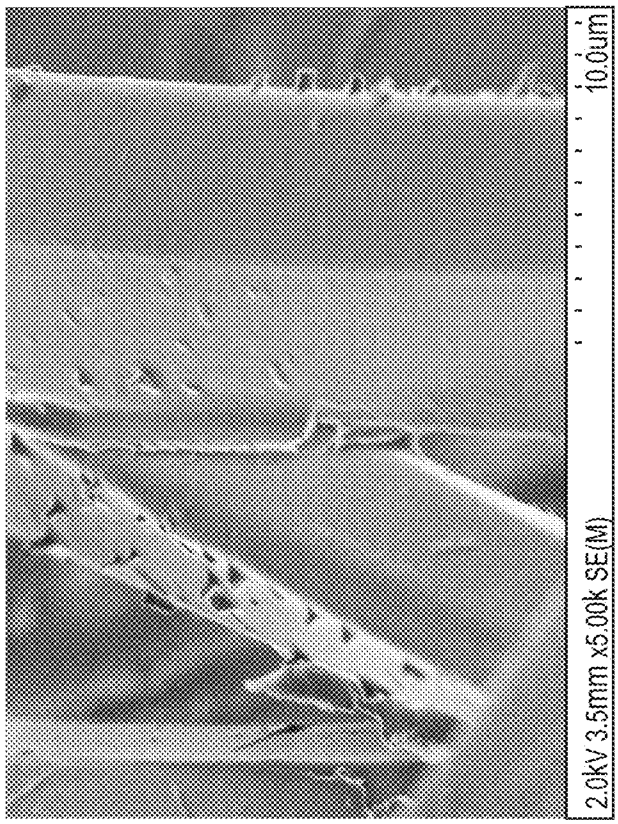

FIG. 138 illustrates a scanning electron microscopy image of fabric sample FAB-10-BATH-C (second view).

Figure 139:
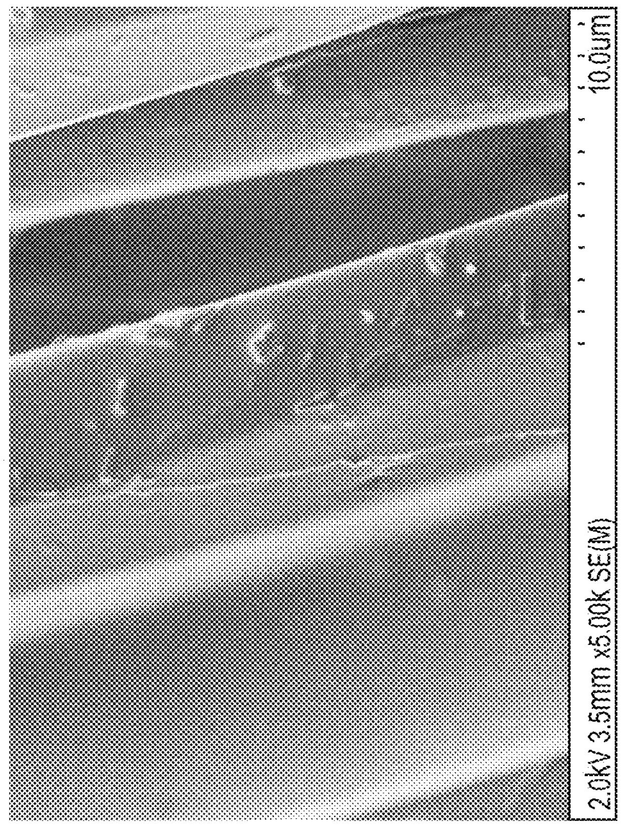

FIG. 139 illustrates a scanning electron microscopy image of fabric sample FAB-10-BATH-C (third view).

Figure 140:
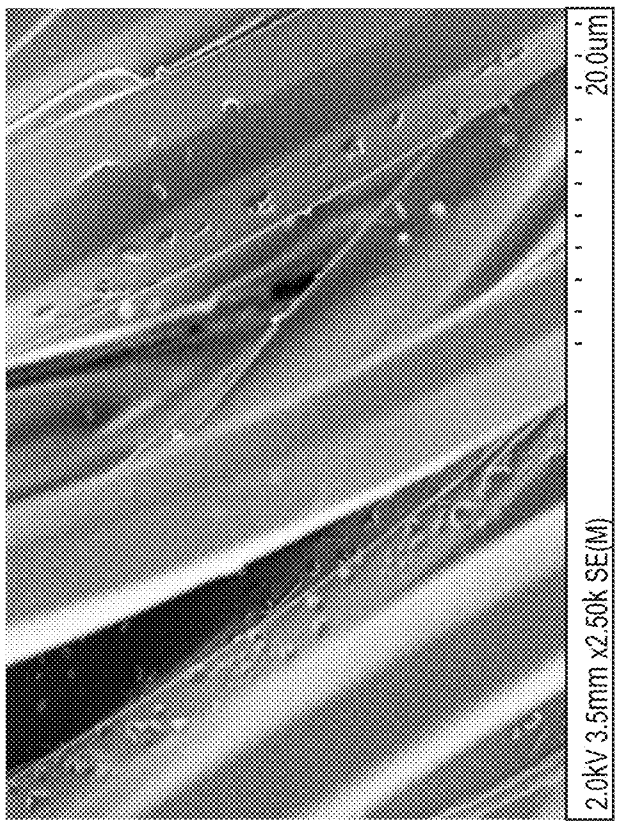

FIG. 140 illustrates a scanning electron microscopy image of fabric sample FAB-10-BATH-C (fourth view).

Figure 141:
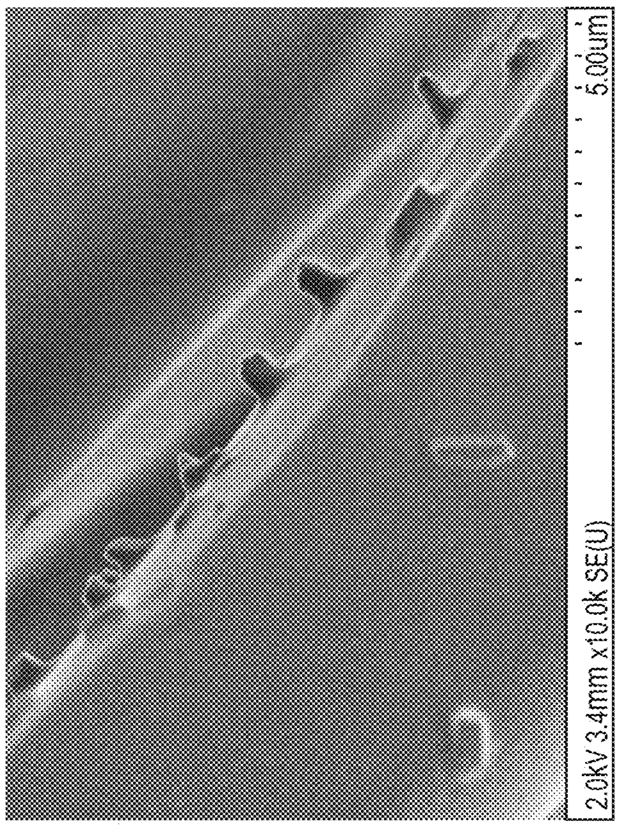

FIG. 141 illustrates a scanning electron microscopy image of fabric sample FAB-10-BATH-C (fifth view).

Figure 142:
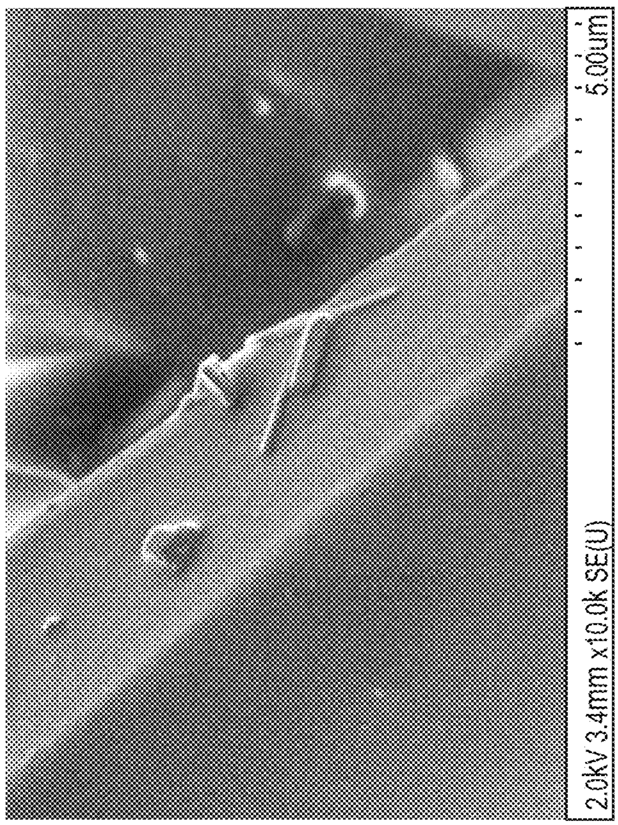

FIG. 142 illustrates a scanning electron microscopy image of fabric sample FAB-10-BATH-C (sixth view).

Figure 143:
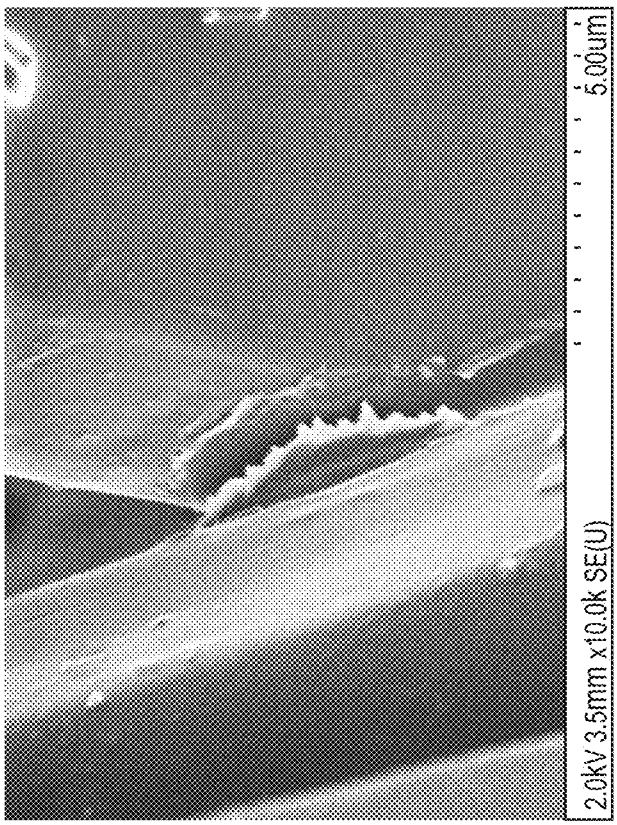

FIG. 143 illustrates a scanning electron microscopy image of fabric sample FAB-10-BATH-C (seventh view).

Figure 144:
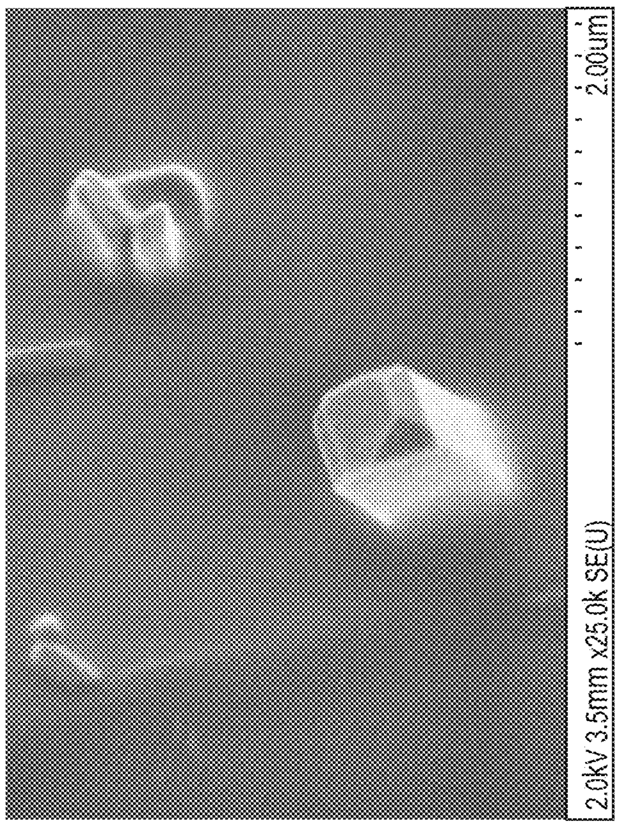

FIG. 144 illustrates a scanning electron microscopy image of fabric sample FAB-10-BATH-C (eighth view).

Figure 145:
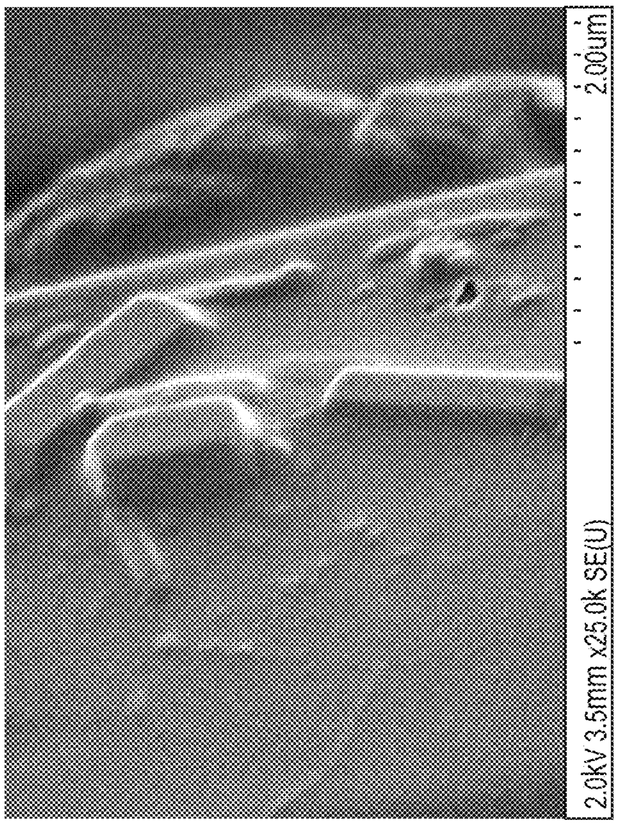

FIG. 145 illustrates a scanning electron microscopy image of fabric sample FAB-10-BATH-C (ninth view).

Figure 146:
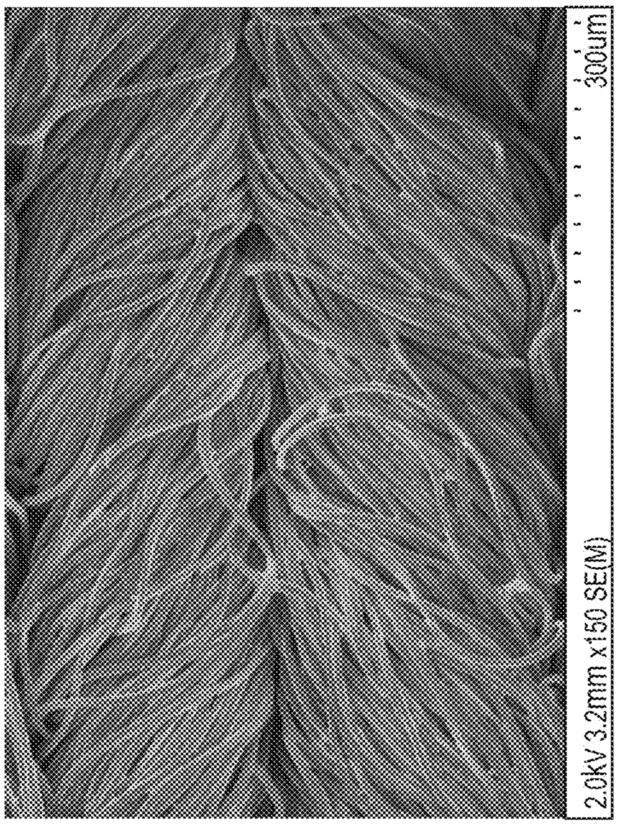

FIG. 146 illustrates a scanning electron microscopy image of fabric sample FAB-10-SPRAY-B (first view).

Figure 147:
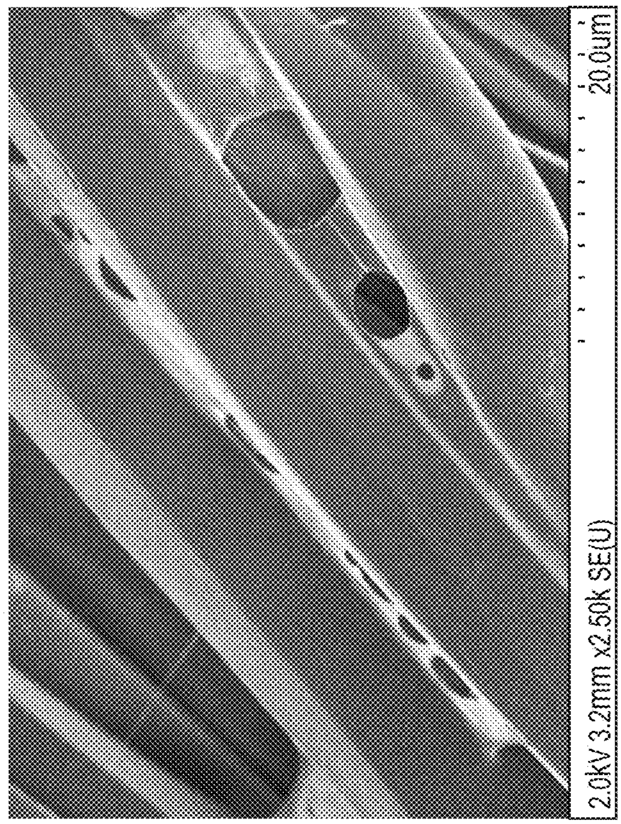

FIG. 147 illustrates a scanning electron microscopy image of fabric sample FAB-10-SPRAY-B (second view).

Figure 148:
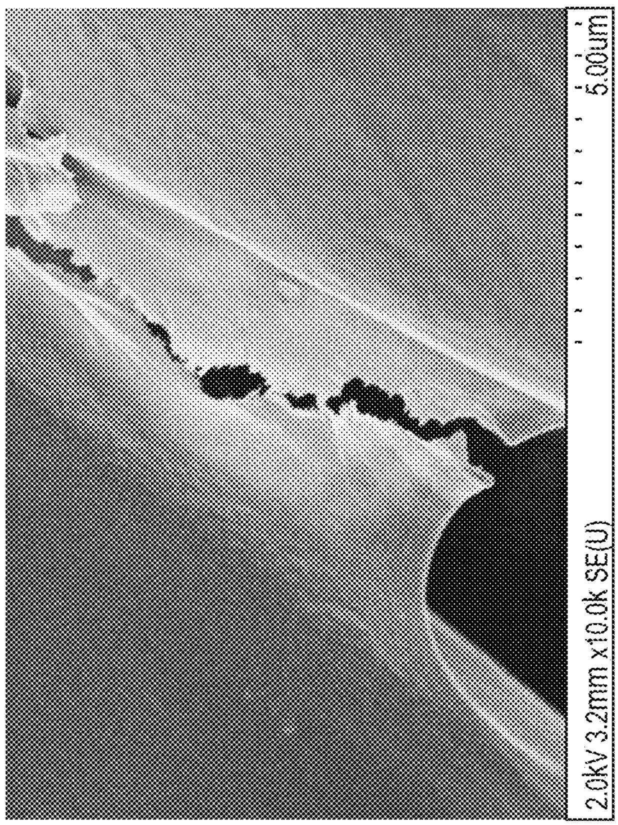

FIG. 148 illustrates a scanning electron microscopy image of fabric sample FAB-10-SPRAY-B (third view).

Figure 149:
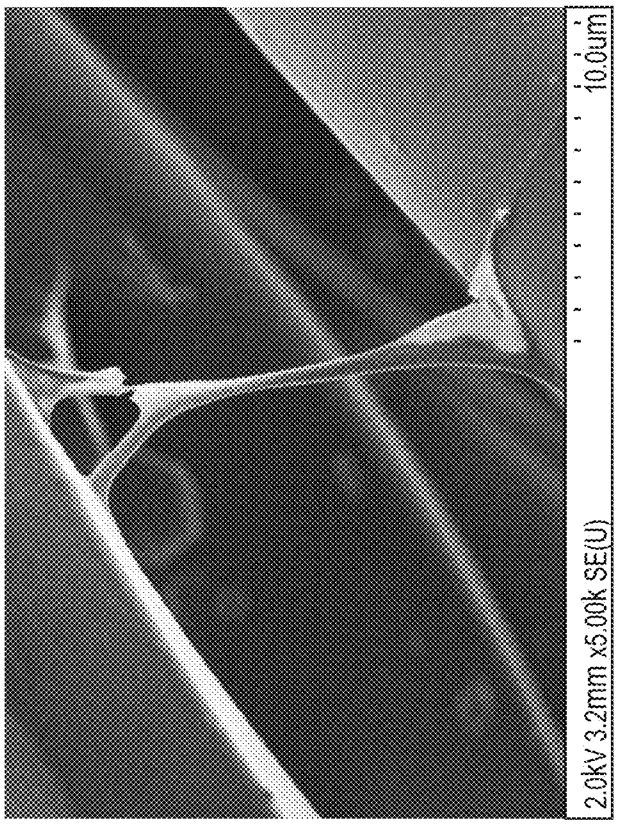

FIG. 149 illustrates a scanning electron microscopy image of fabric sample FAB-10-SPRAY-B (fourth view).

Figure 150:
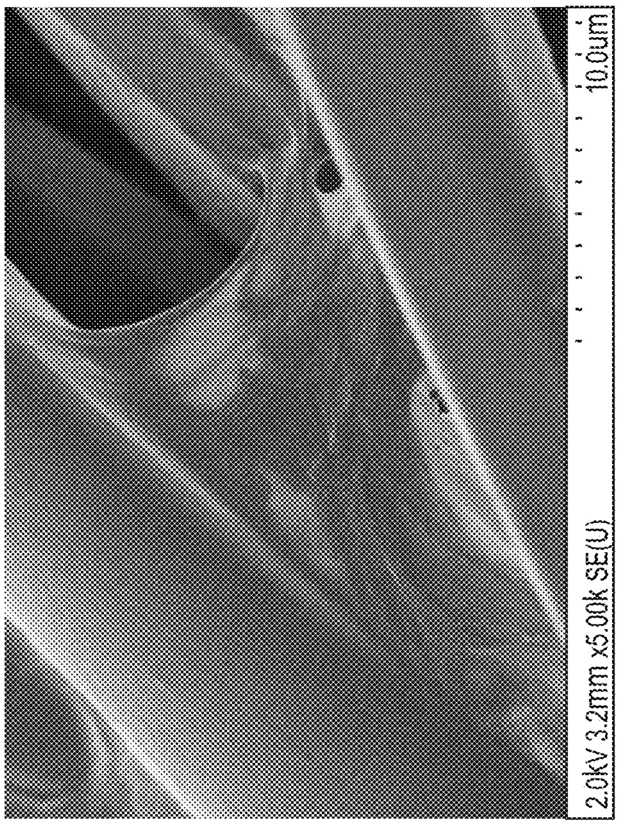

FIG. 150 illustrates a scanning electron microscopy image of fabric sample FAB-10-SPRAY-B (fifth view).

Figure 151:
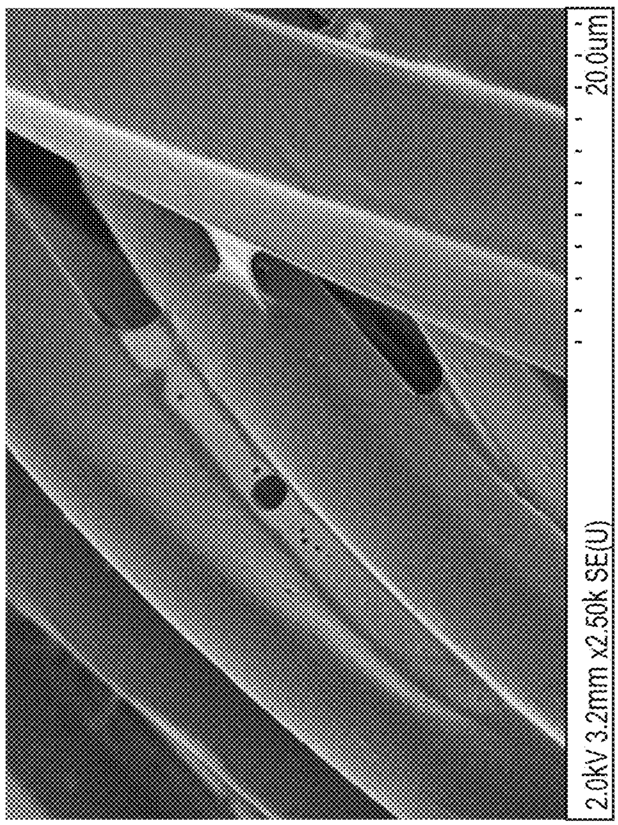

FIG. 151 illustrates a scanning electron microscopy image of fabric sample FAB-10-SPRAY-B (sixth view).

Figure 152:
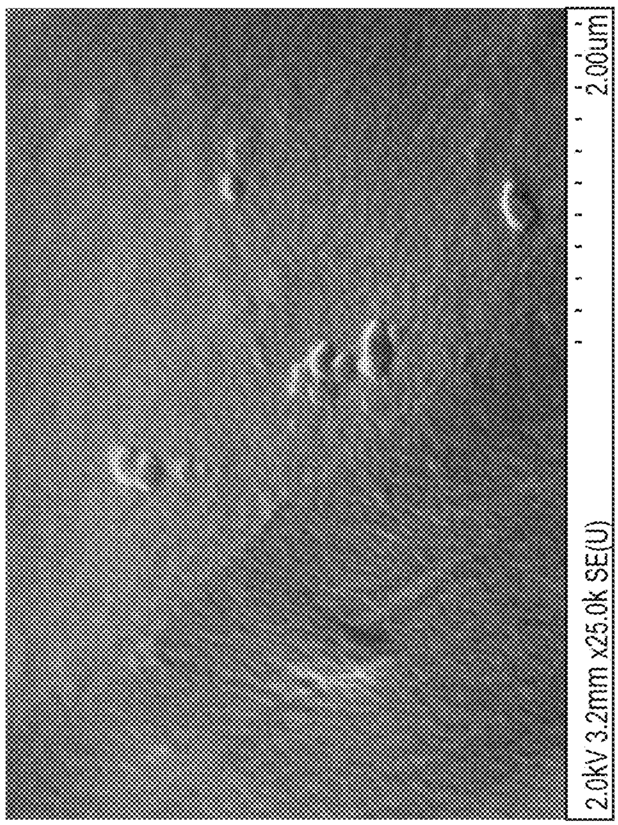

FIG. 152 illustrates a scanning electron microscopy image of fabric sample FAB-10-SPRAY-B (seventh view).

Figure 153:
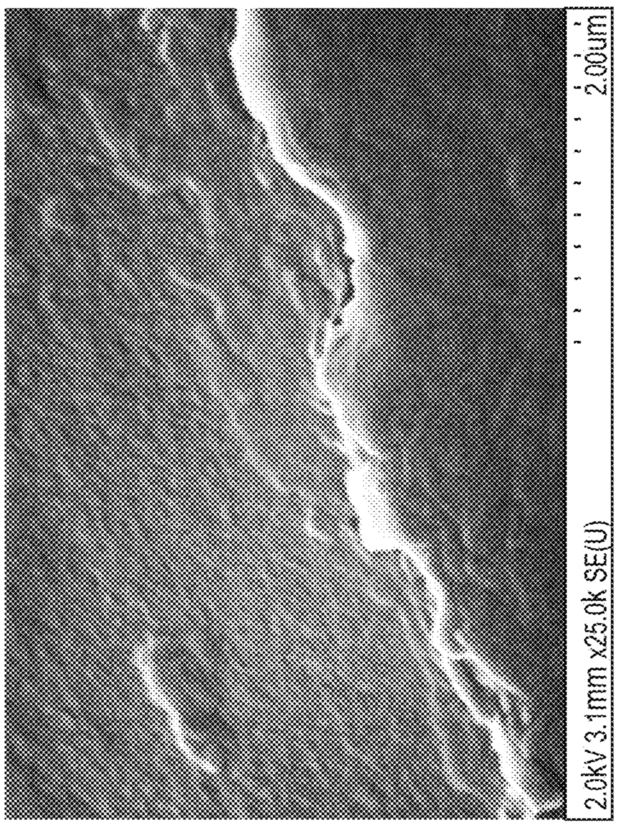

FIG. 153 illustrates a scanning electron microscopy image of fabric sample FAB-10-SPRAY-B (eighth view).

Figure 154:
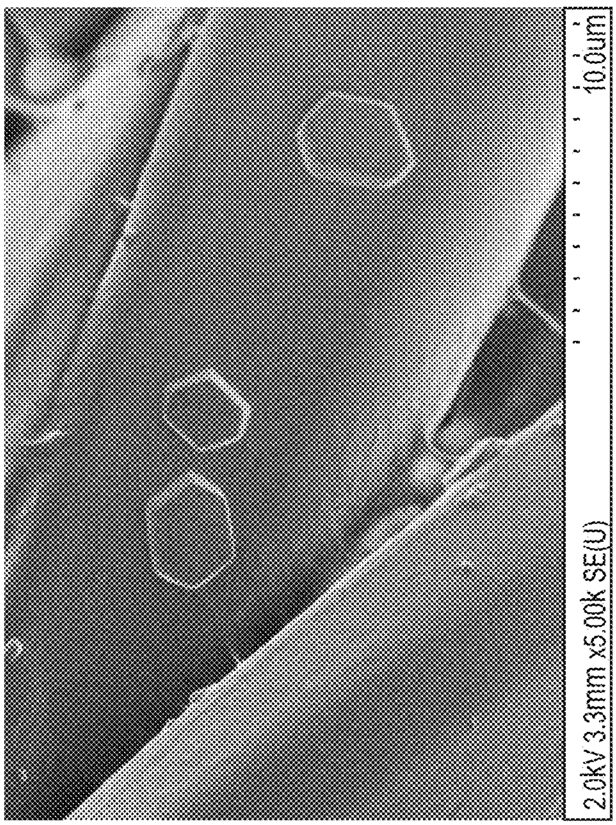

FIG. 154 illustrates a scanning electron microscopy image of fabric sample FAB-10-SPRAY-B (ninth view).

Figure 155:
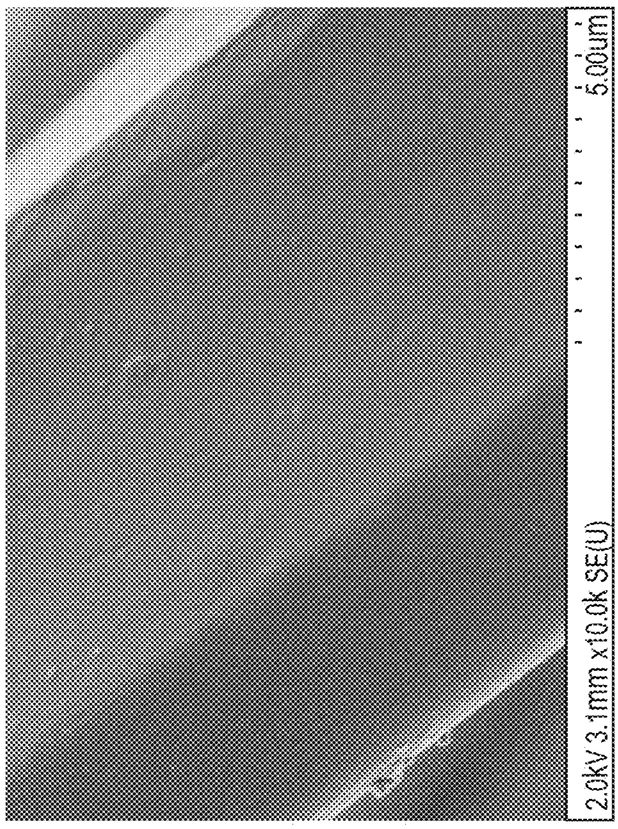

FIG. 155 illustrates a scanning electron microscopy image of fabric sample FAB-10-SPRAY-C.

Figure 156:
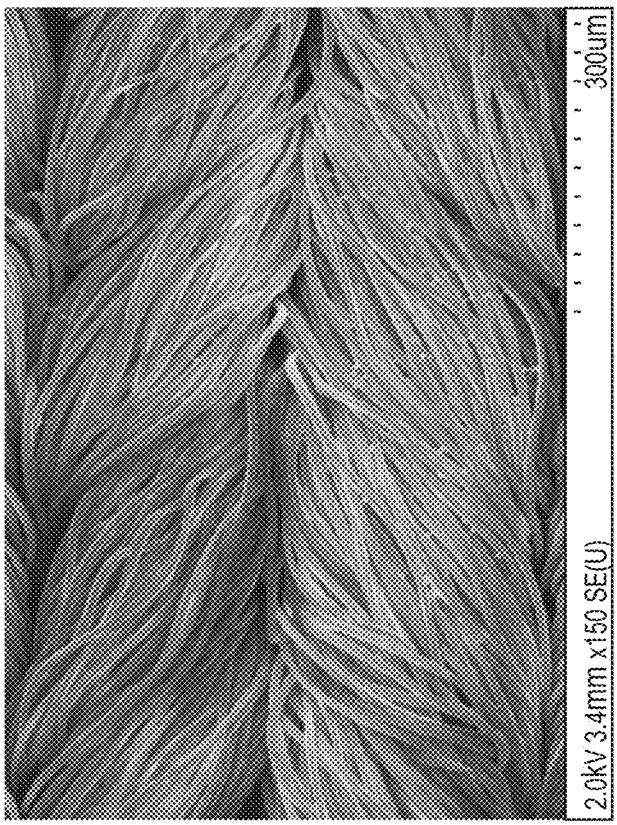

FIG. 156 illustrates a scanning electron microscopy image of fabric sample FAB-10-STEN-B (first view).

Figure 157:
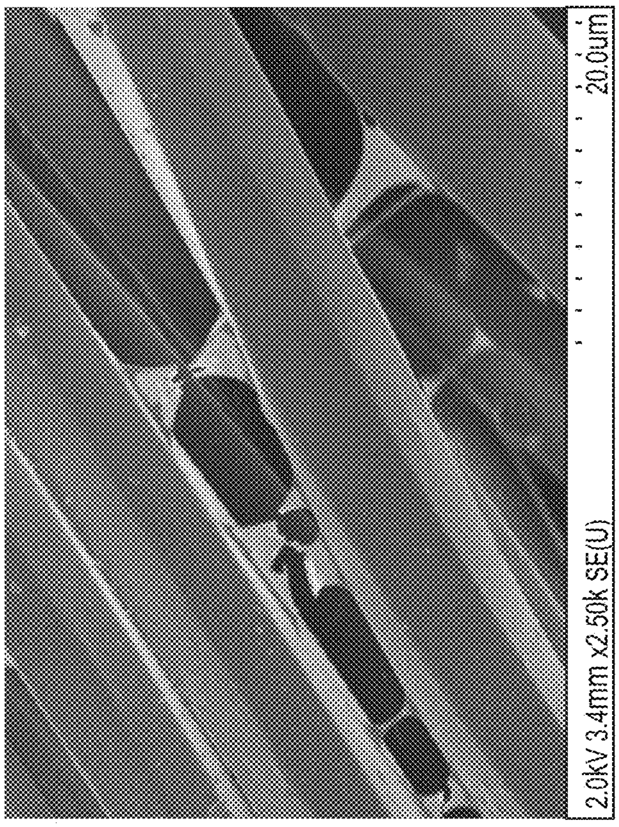

FIG. 157 illustrates a scanning electron microscopy image of fabric sample FAB-10-STEN-B (second view).

Figure 158:
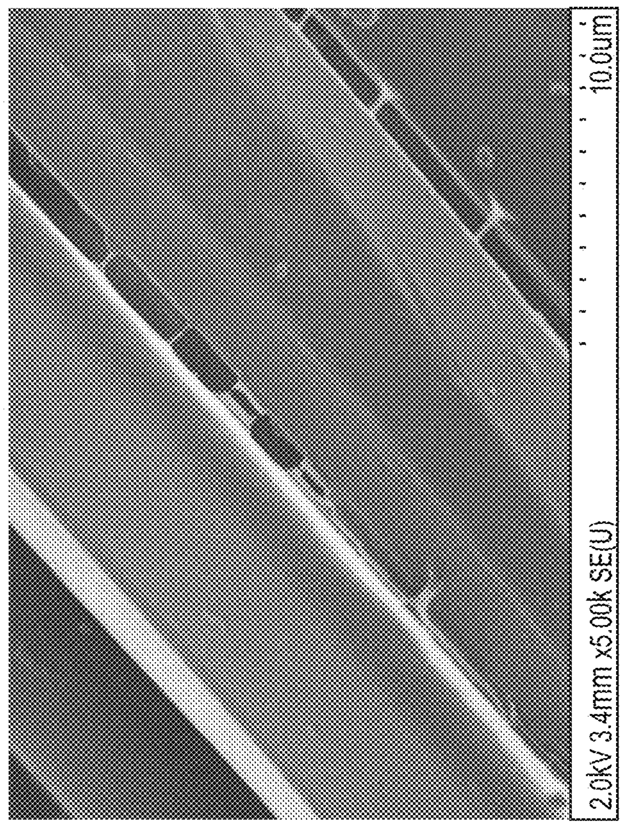

FIG. 158 illustrates a scanning electron microscopy image of fabric sample FAB-10-STEN-B (third view).

Figure 159:
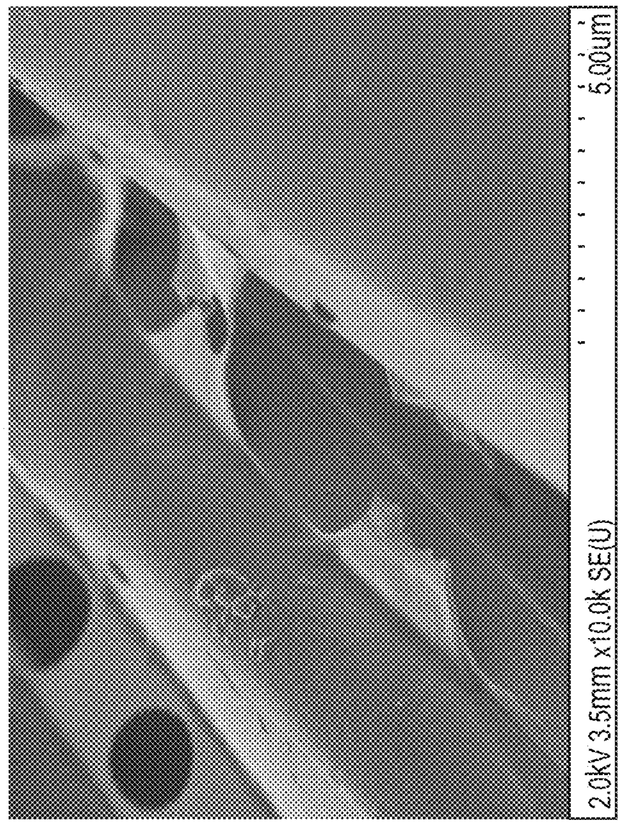

FIG. 159 illustrates a scanning electron microscopy image of fabric sample FAB-10-STEN-B (fourth view).

Figure 160:
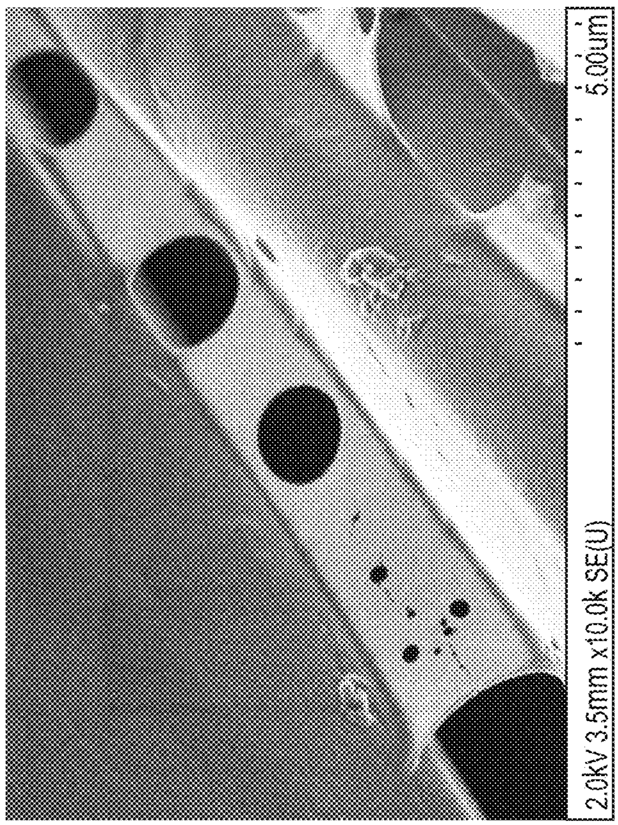

FIG. 160 illustrates a scanning electron microscopy image of fabric sample FAB-10-STEN-B (fifth view).

Figure 161:
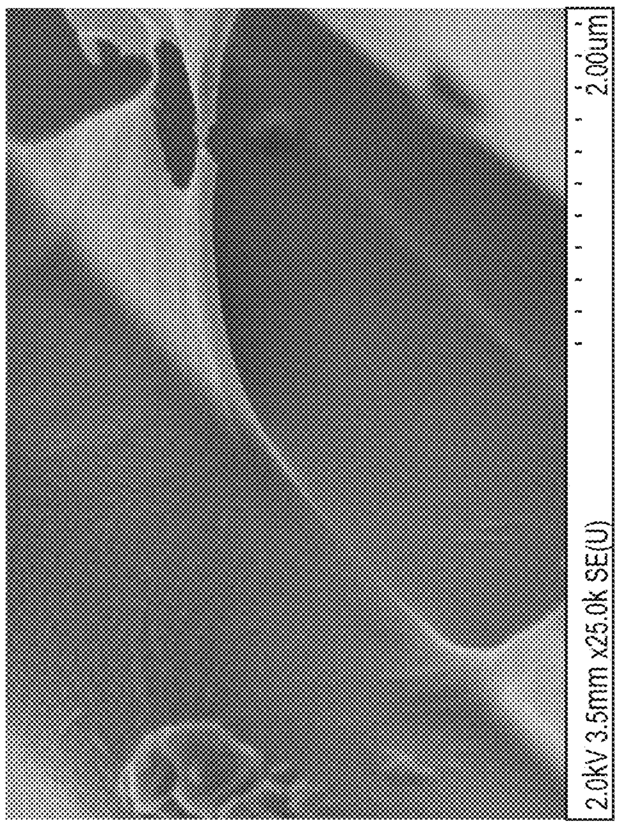

FIG. 161 illustrates a scanning electron microscopy image of fabric sample FAB-10-STEN-B (sixth view).

Figure 162:
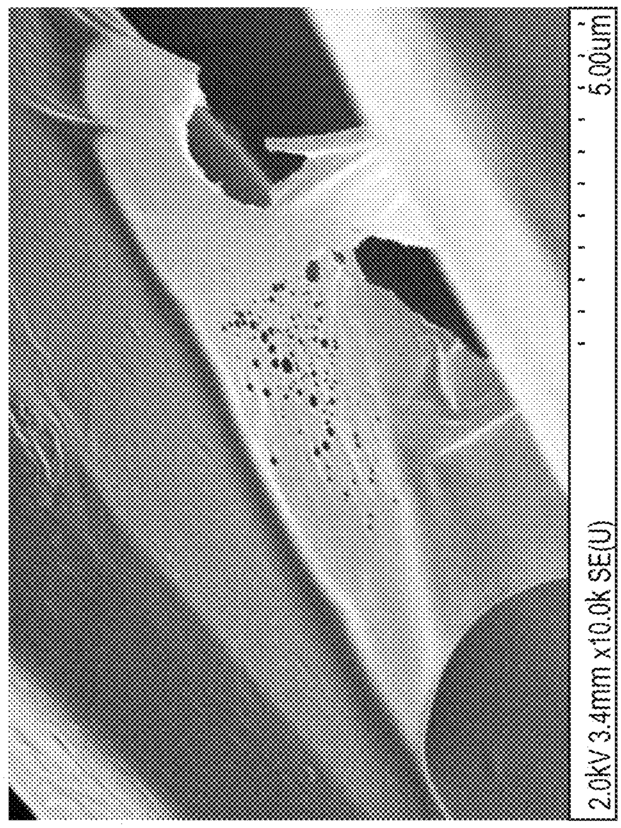

FIG. 162 illustrates a scanning electron microscopy image of fabric sample FAB-10-STEN-B (seventh view).

Figure 163:
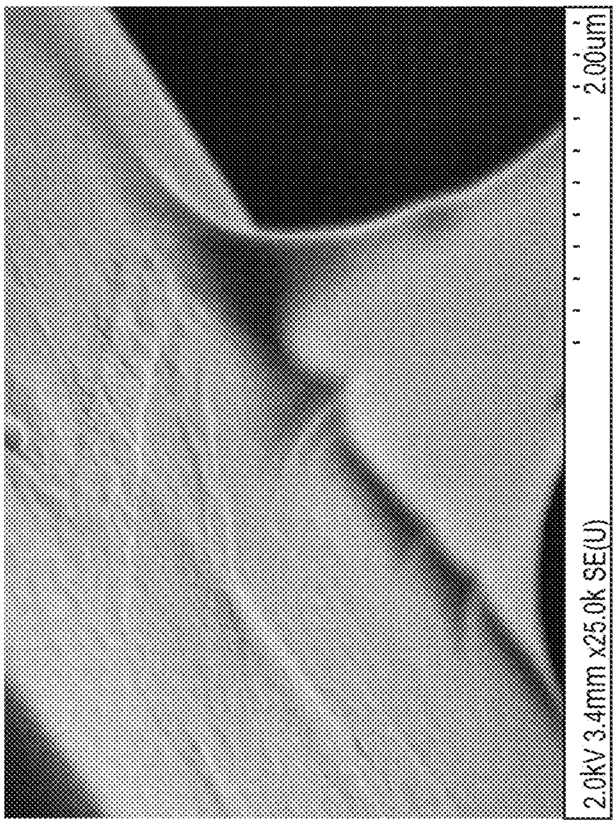

FIG. 163 illustrates a scanning electron microscopy image of fabric sample FAB-10-STEN-B (eighth view).

Figure 164:
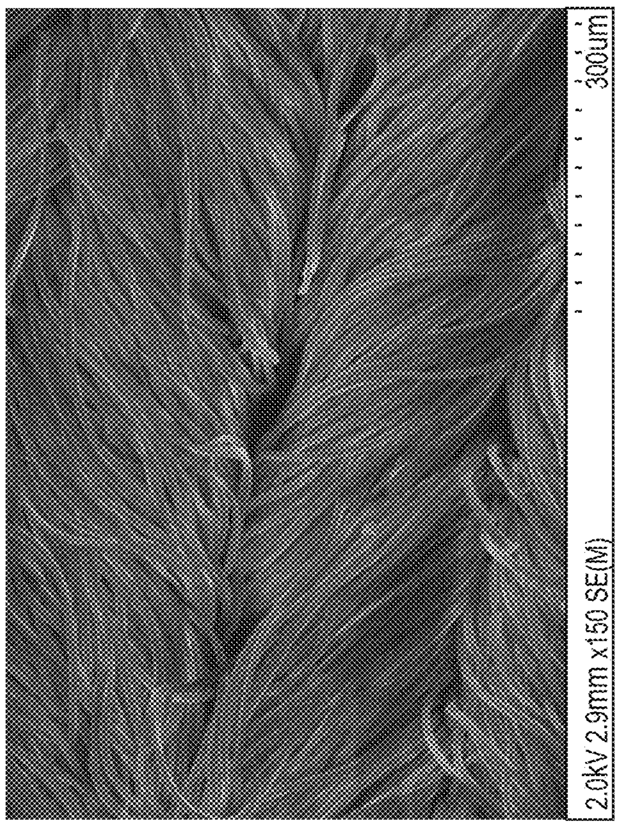

FIG. 164 illustrates a scanning electron microscopy image of a fabric control sample (first view).

Figure 165:
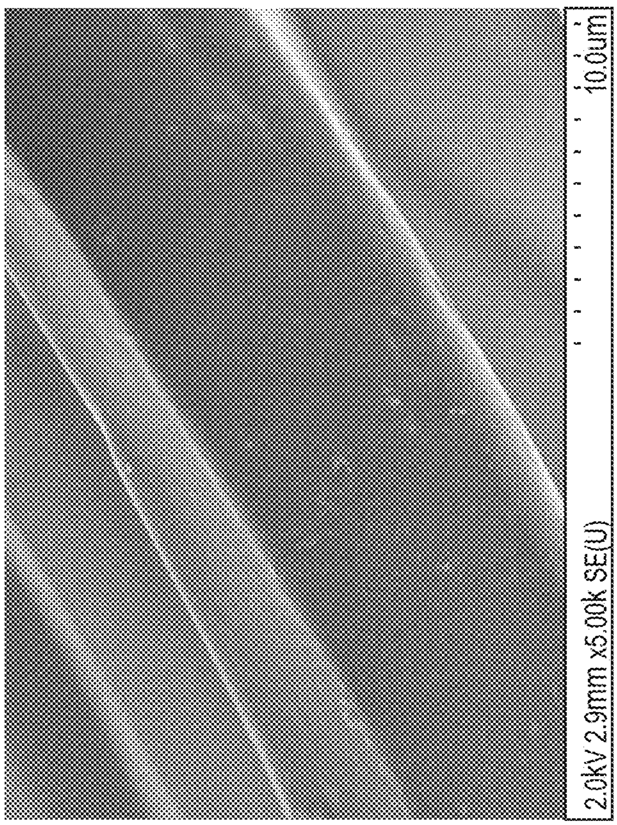

FIG. 165 illustrates a scanning electron microscopy image of a fabric control sample (second view).

Figure 166:
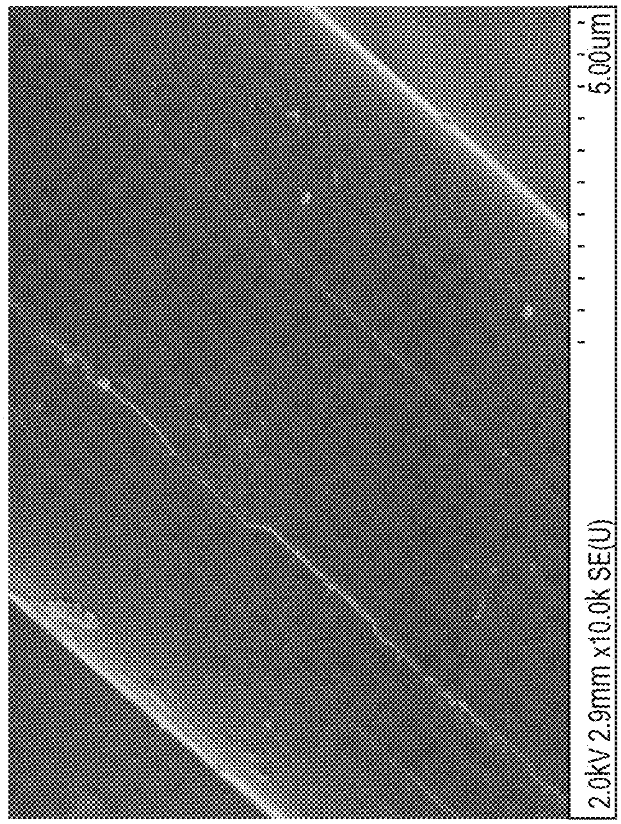

FIG. 166 illustrates a scanning electron microscopy image of a fabric control sample (third view).

Figure 167:
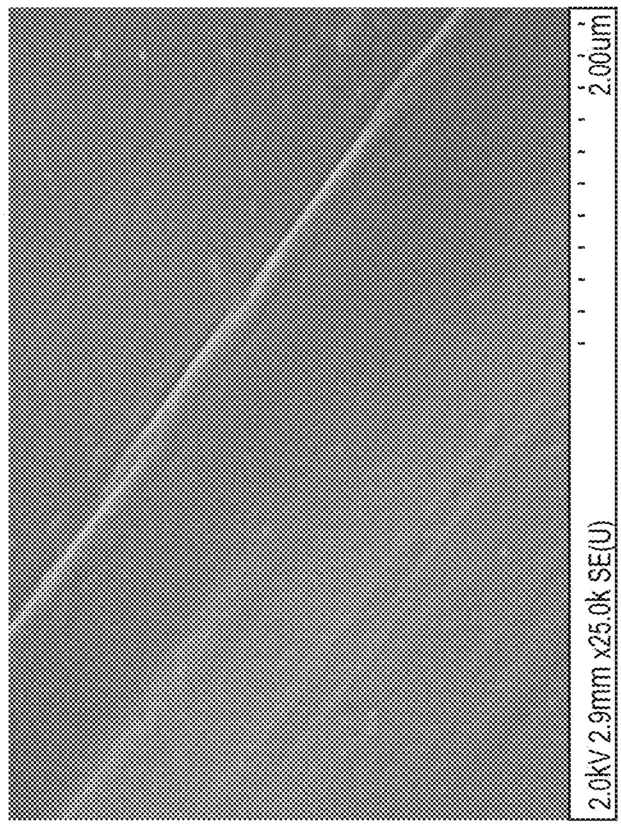

FIG. 167 illustrates a scanning electron microscopy image of a fabric control sample (fourth view).

Figure 168:
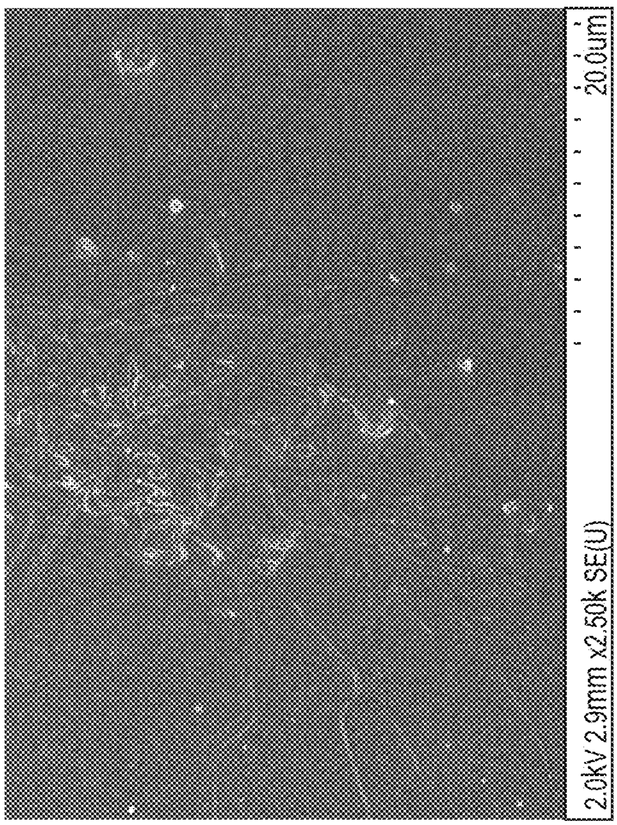

FIG. 168 illustrates a scanning electron microscopy image of film sample FIL-01-BATH-B-01MYL (first view).

Figure 169:
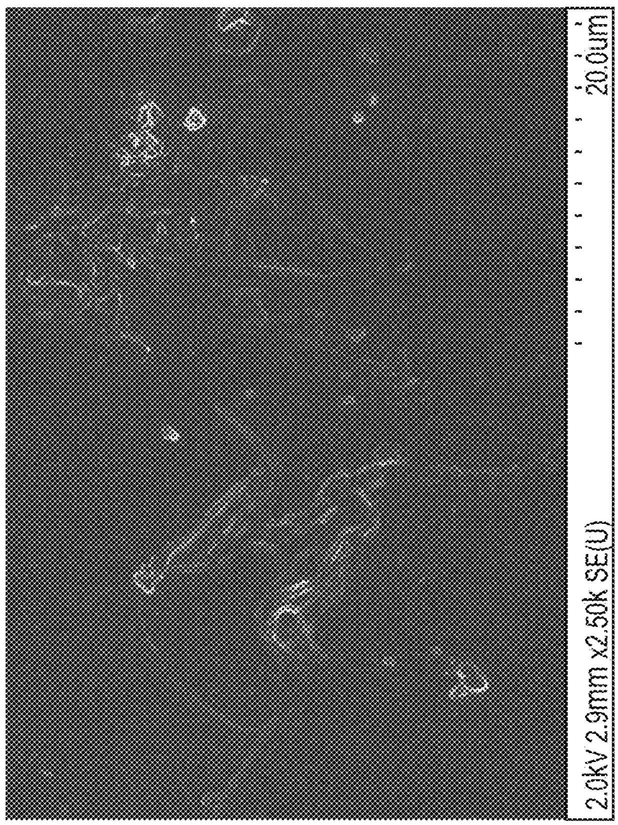

FIG. 169 illustrates a scanning electron microscopy image of film sample FIL-01-BATH-B-01MYL (second view).

Figure 170:
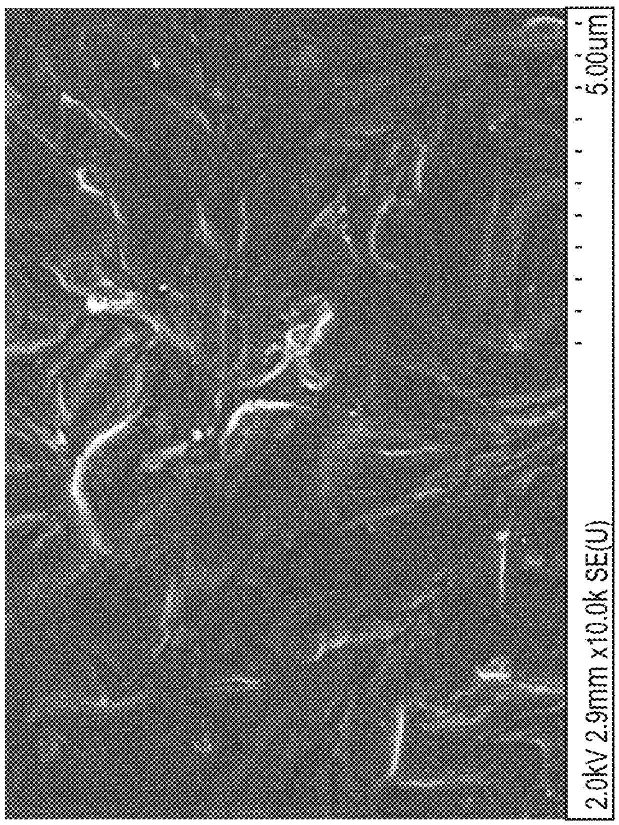

FIG. 170 illustrates a scanning electron microscopy image of film sample FIL-01-BATH-B-01MYL (third view).

Figure 171:
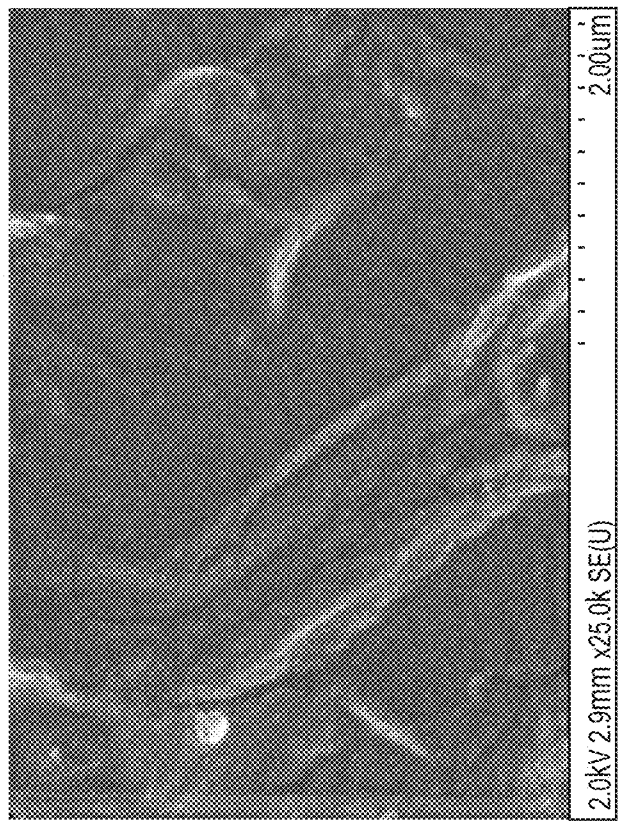

FIG. 171 illustrates a scanning electron microscopy image of film sample FIL-01-BATH-B-01MYL (fourth view).

Figure 172:
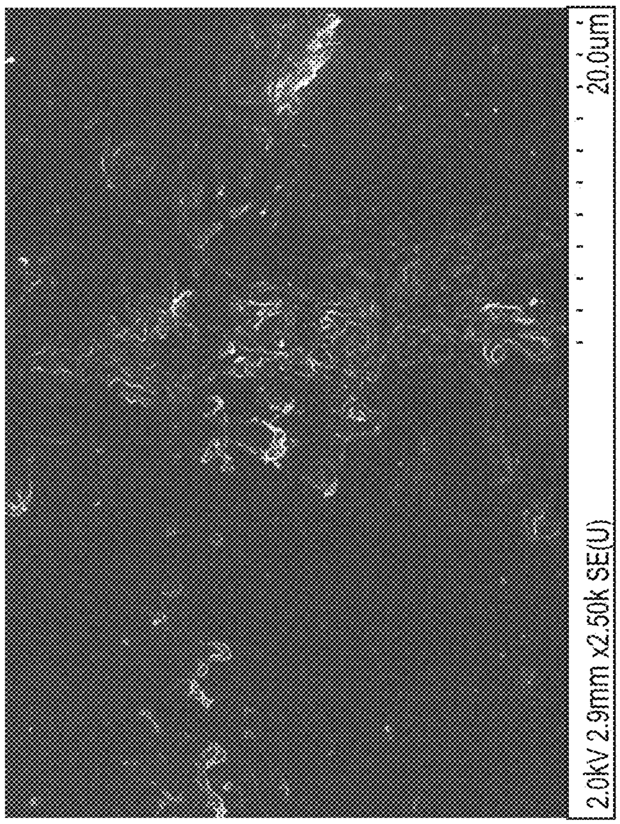

FIG. 172 illustrates a scanning electron microscopy image of film sample FILBATH-B-01MYL (fifth view).

Figure 173:
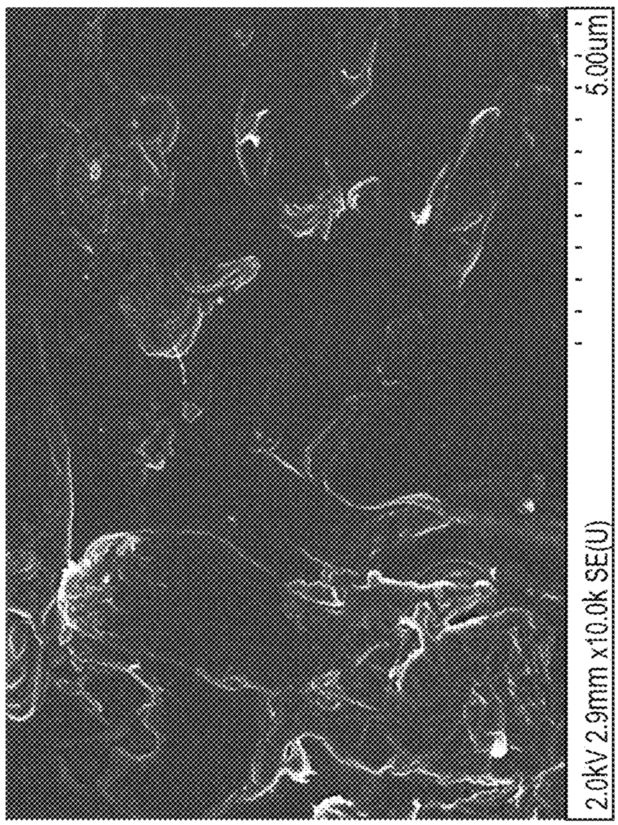

FIG. 173 illustrates a scanning electron microscopy image of film sample FIL-01-BATH-B-01MYL (sixth view).

Figure 174:

FIG. 174 illustrates a scanning electron microscopy image of film sample FIL-01-BATH-B-01MYL (seventh view).

Figure 175:
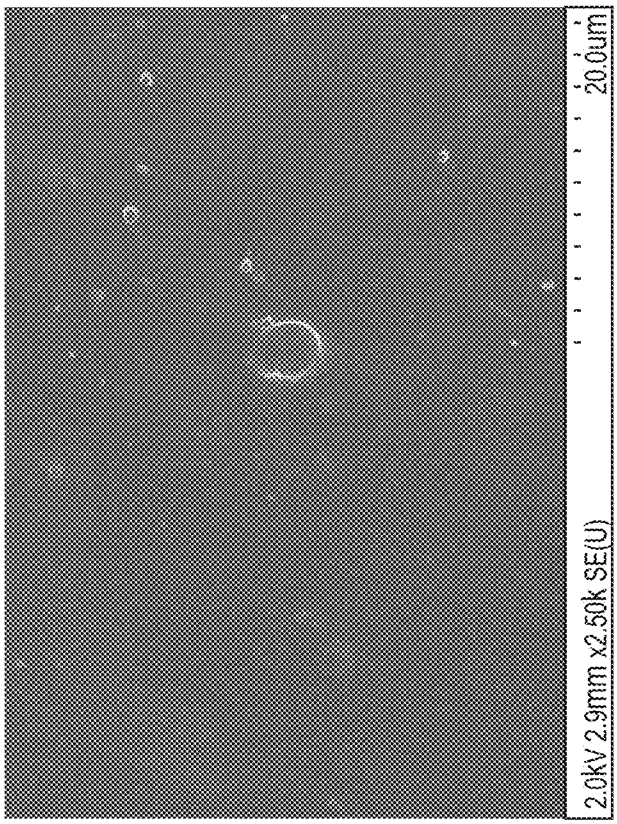

FIG. 175 illustrates a scanning electron microscopy image of film sample FIL-01-SPRAY-B-01MYL (first view).

Figure 176:
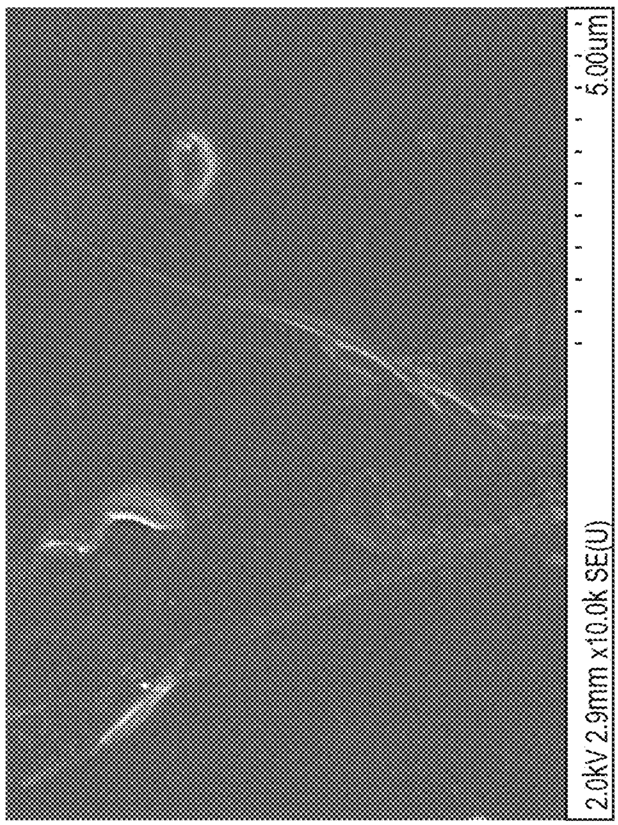

FIG. 176 illustrates a scanning electron microscopy image of film sample FIL-01-SPRAY-B-01MYL (second view).

Figure 177:
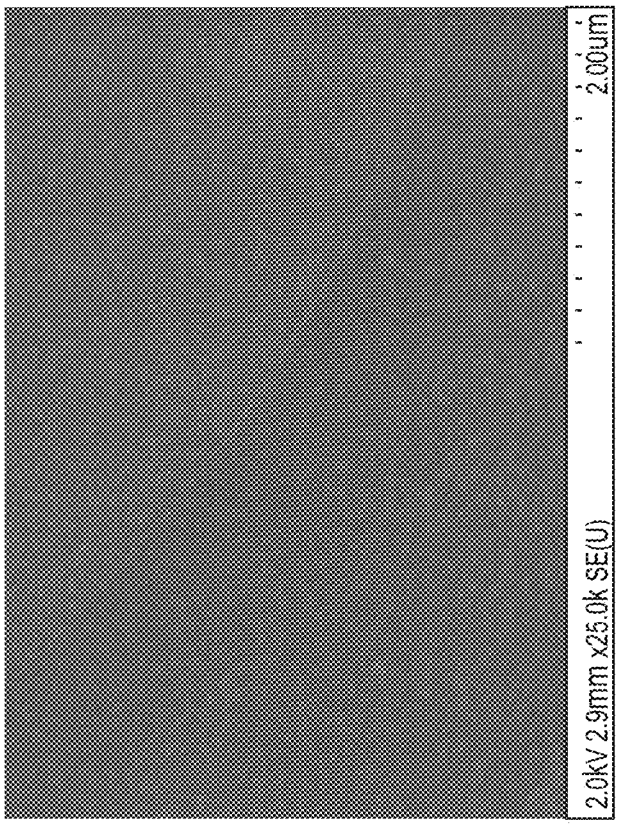

FIG. 177 illustrates a scanning electron microscopy image of film sample FIL-01-SPRAY-B-01MYL (third view).

Figure 178:
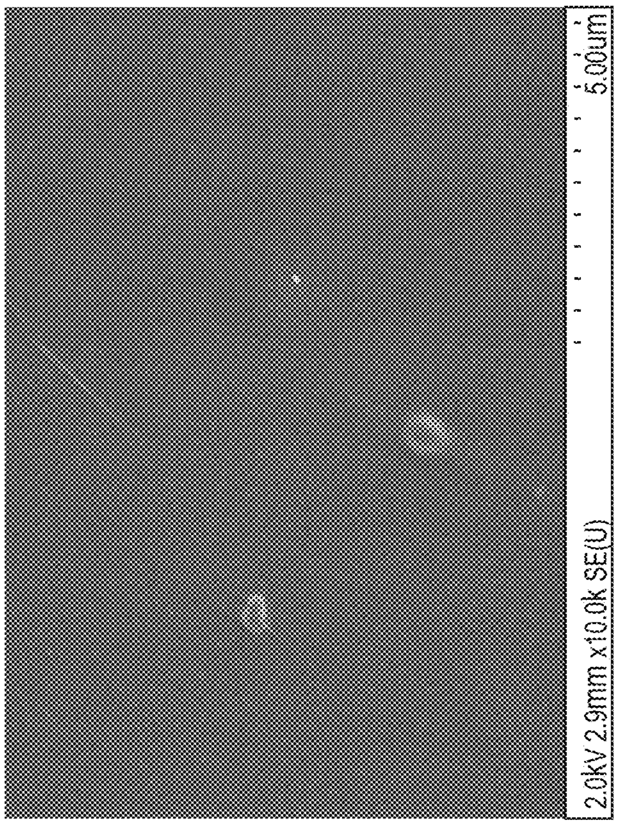

FIG. 178 illustrates a scanning electron microscopy image of film sample FIL-01-SPRAY-B-01MYL (fourth view).

Figure 179:

FIG. 179 illustrates a scanning electron microscopy image of film sample FIL-01-SPRAY-B-01MYL (fifth view).

Figure 180:
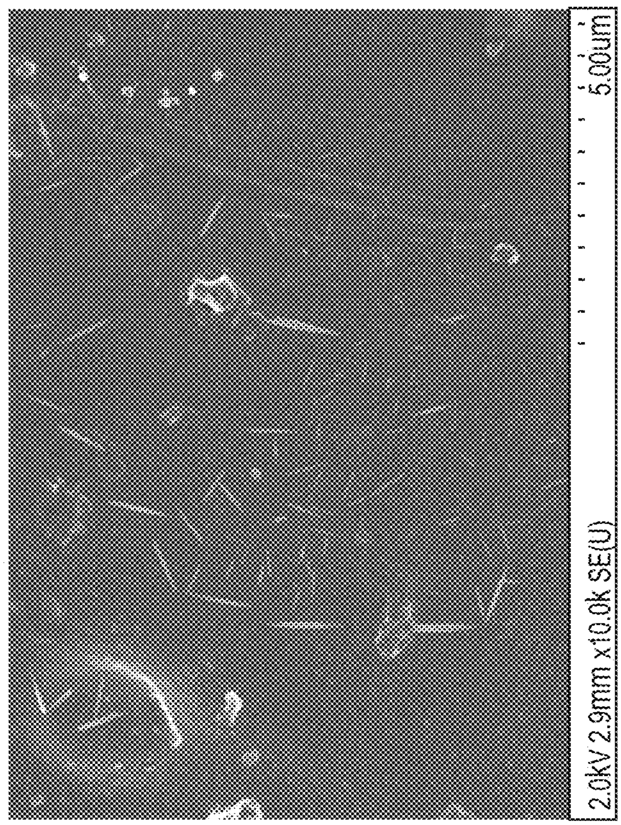

FIG. 180 illustrates a scanning electron microscopy image of film sample FIL-01-SPRAY-B-01MYL (sixth view).

Figure 181:
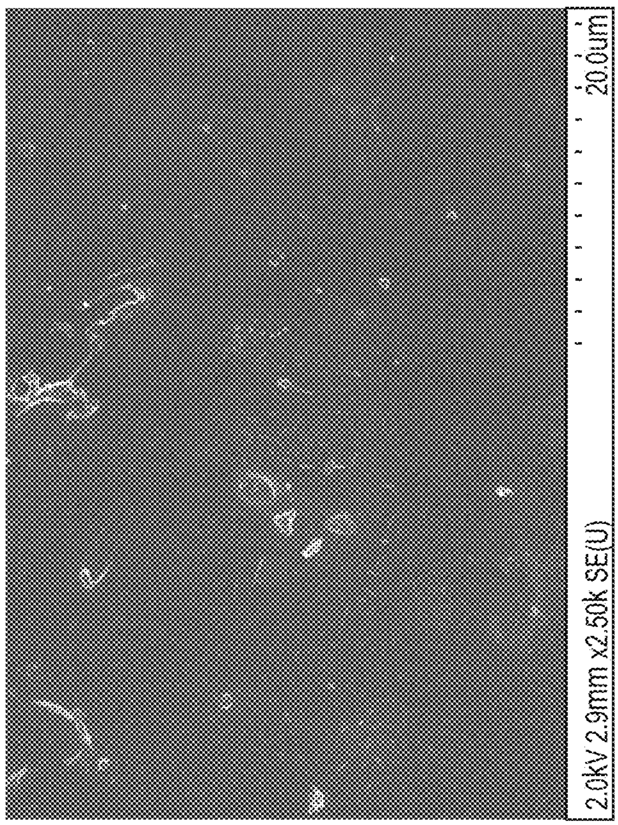

FIG. 181 illustrates a scanning electron microscopy image of film sample FIL-01-SPRAY-B-01MYL (seventh view).

Figure 182:
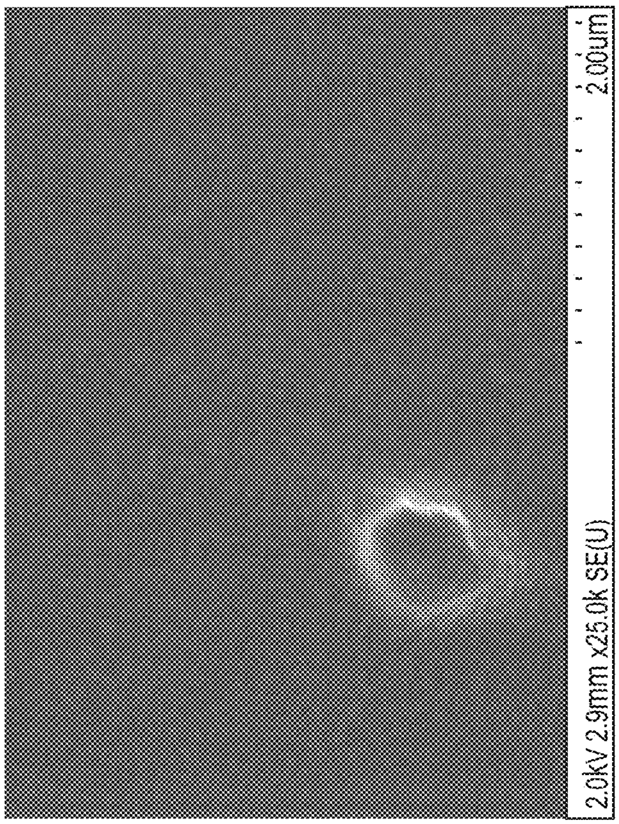

FIG. 182 illustrates a scanning electron microscopy image of film sample FIL-01-SPRAY-B-01MYL (eighth view).

Figure 183:
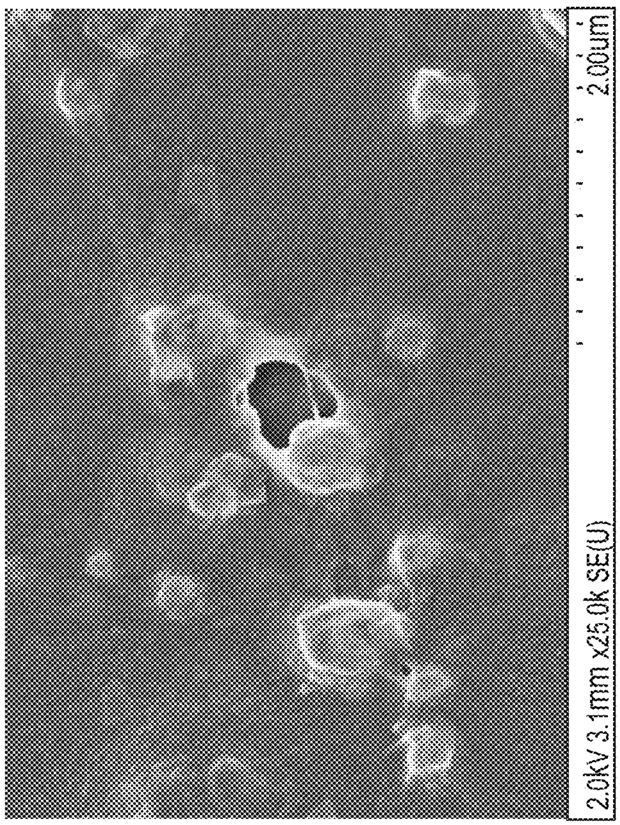

FIG. 183 illustrates a scanning electron microscopy image of film sample FIL-01-SPRAY-B-007MYL (first view).

Figure 184:
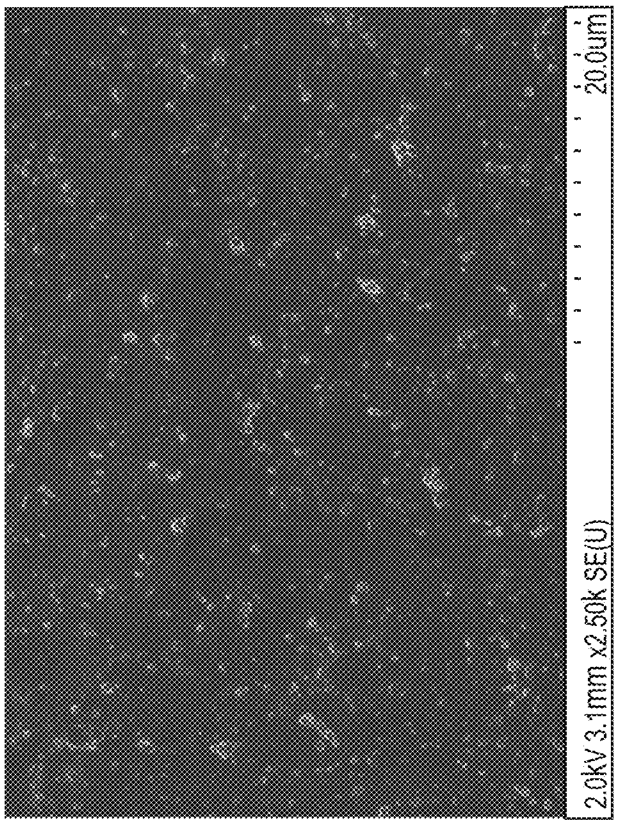

FIG. 184 illustrates a scanning electron microscopy image of film sample FIL-01-SPRAY-B-007MYL (second view).

Figure 185:
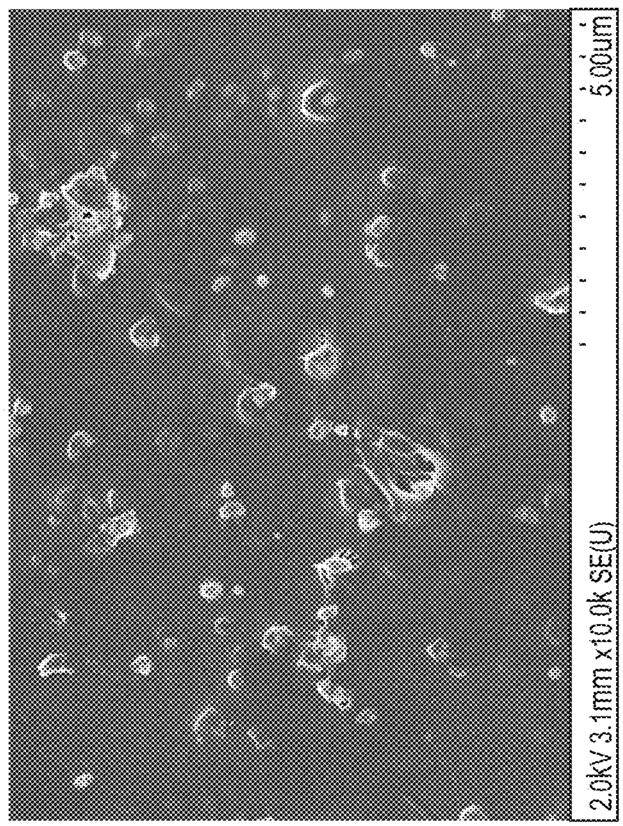

FIG. 185 illustrates a scanning electron microscopy image of film sample FIL-01-SPRAY-B-007MYL (third view).

Figure 186:
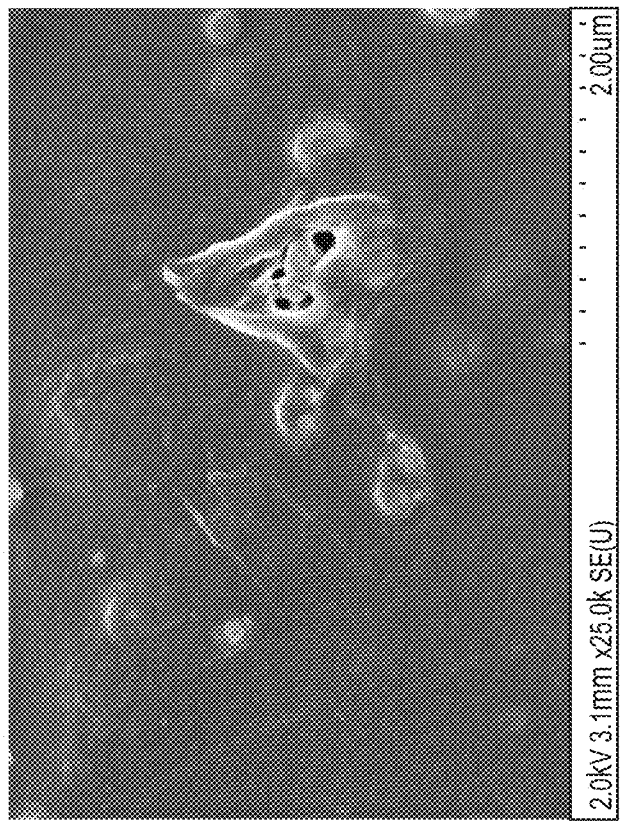

FIG. 186 illustrates a scanning electron microscopy image of film sample FIL-01-SPRAY-B-007MYL (fourth view).

Figure 187:
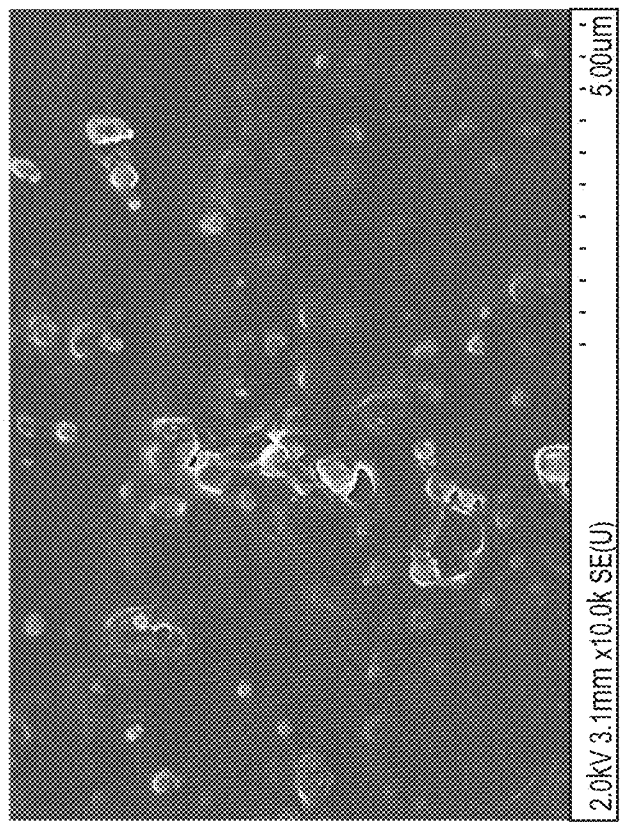

FIG. 187 illustrates a scanning electron microscopy image of film sample FIL-01-SPRAY-B-007MYL (fifth view).

Figure 188:
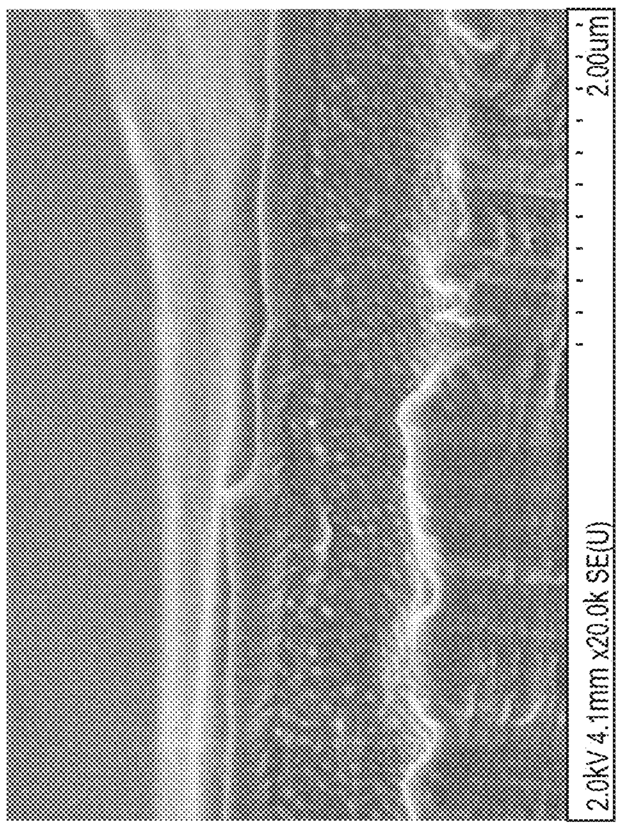

FIG. 188 illustrates a scanning electron microscopy image of film sample FIL-01-SPRAY-B-O1MYL cross-section (first view).

Figure 189:
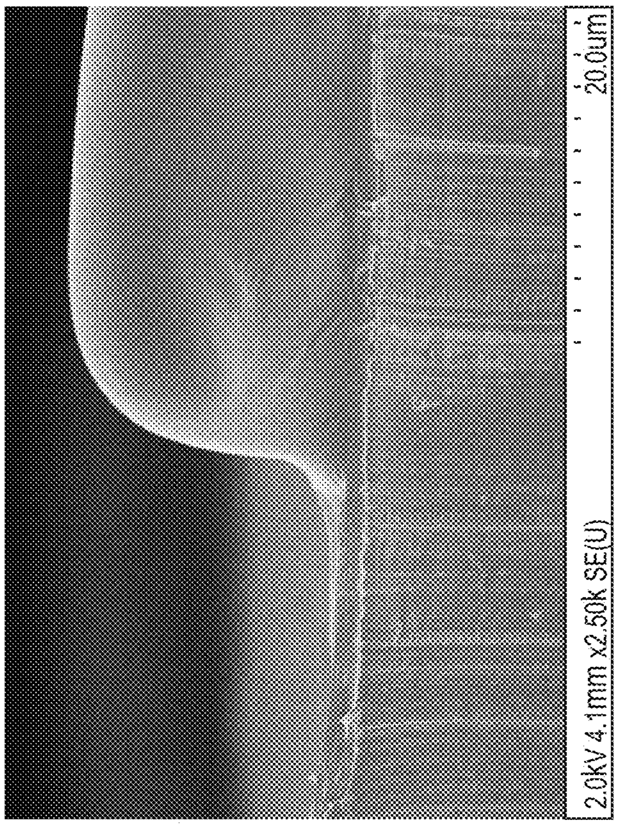

FIG. 189 illustrates a scanning electron microscopy image of film sample FIL-01-SPRAY-B-01MYL cross-section (second view).

Figure 190:
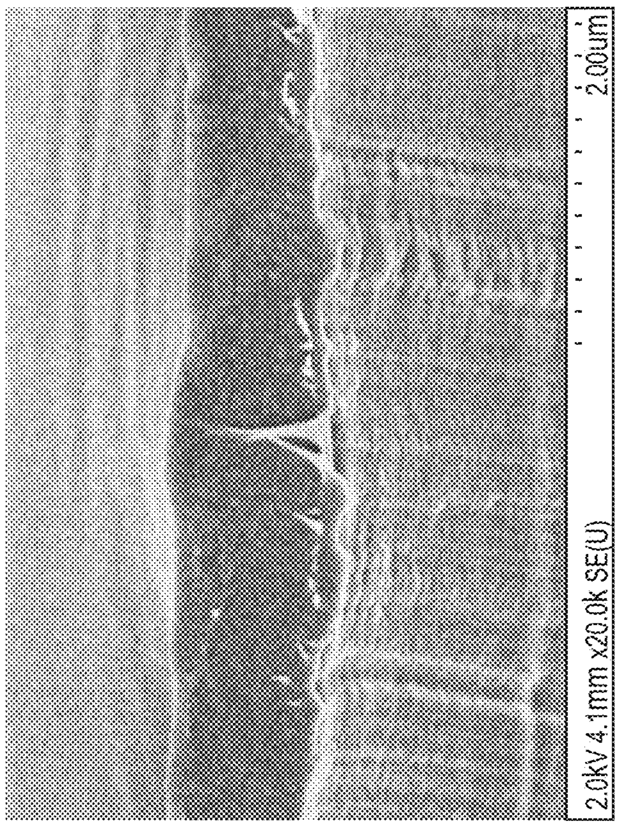

FIG. 190 illustrates a scanning electron microscopy image of film sample FIL-01-SPRAY-B-O1MYL cross-section (third view).

Figure 191:
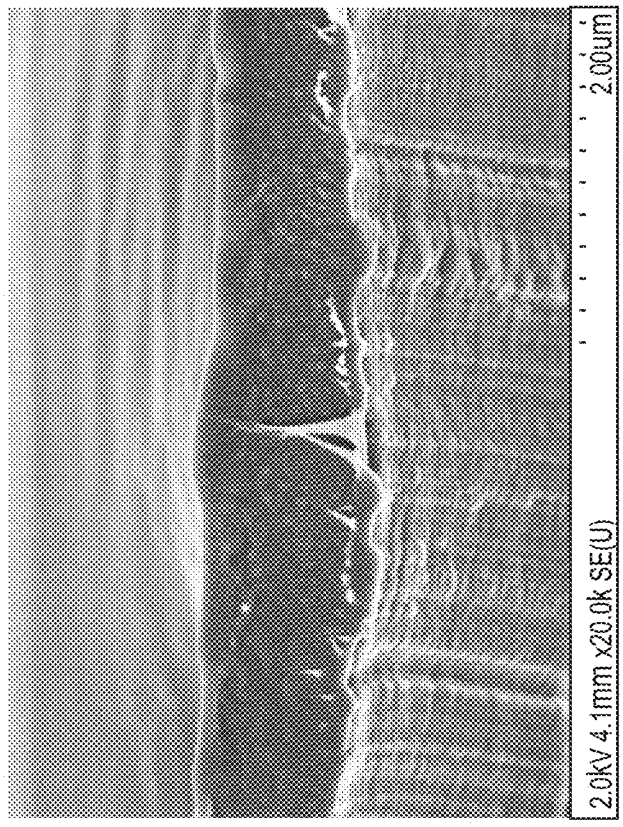

FIG. 191 illustrates a scanning electron microscopy image of film sample FIL-01-SPRAY-B-O1MYL cross-section (fourth view).

Figure 192:
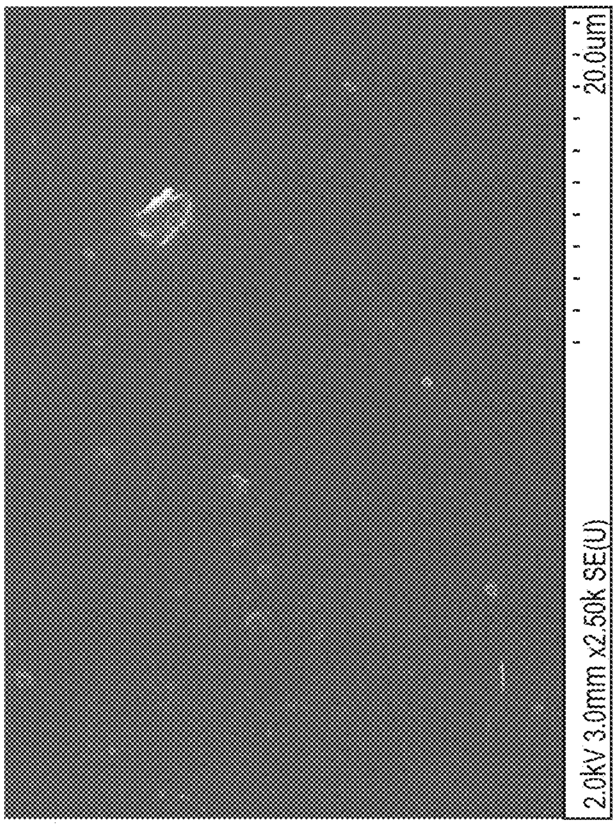

FIG. 192 illustrates a scanning electron microscopy image of film sample FIL-01-SPRAY-C-01MYL (first view).

Figure 193:
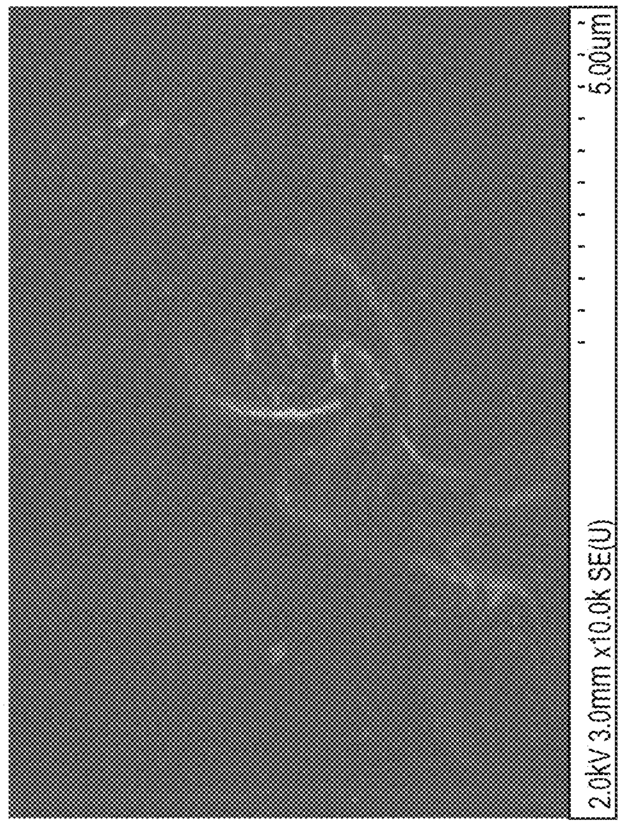

FIG. 193 illustrates a scanning electron microscopy image of film sample FIL-01-SPRAY-C-01MYL (second view).

Figure 194:
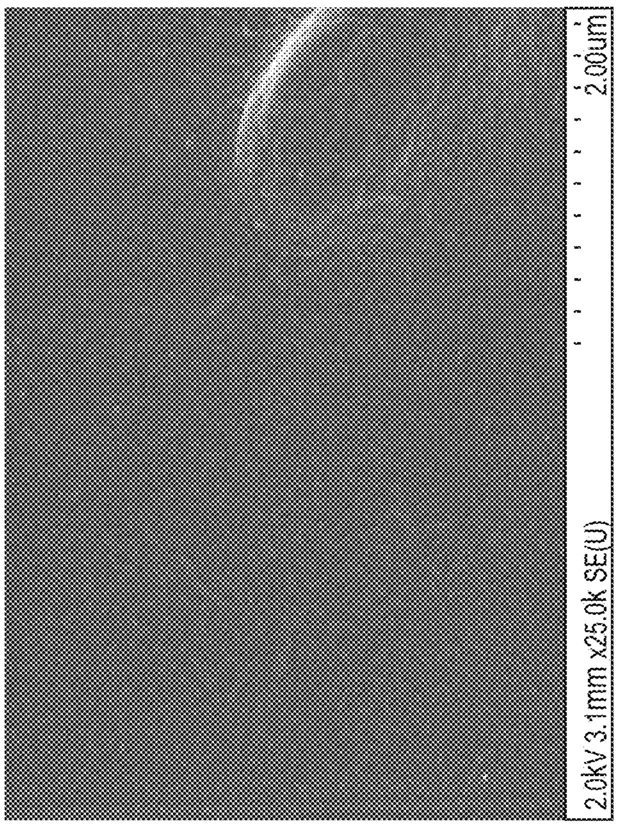

FIG. 194 illustrates a scanning electron microscopy image of film sample FIL-01-SPRAY-C-01MYL (third view).

Figure 195:
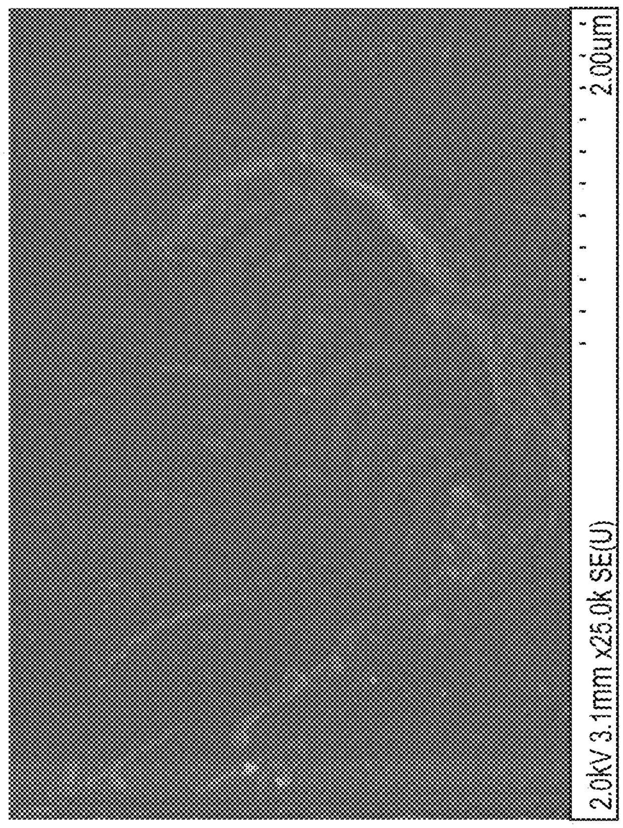

FIG. 195 illustrates a scanning electron microscopy image of film sample FIL-01-SPRAY-C-01MYL (fourth view).

Figure 196:

FIG. 196 illustrates a scanning electron microscopy image of film sample FIL-01-SPRAY-C-01MYL (fifth view).

Figure 197:
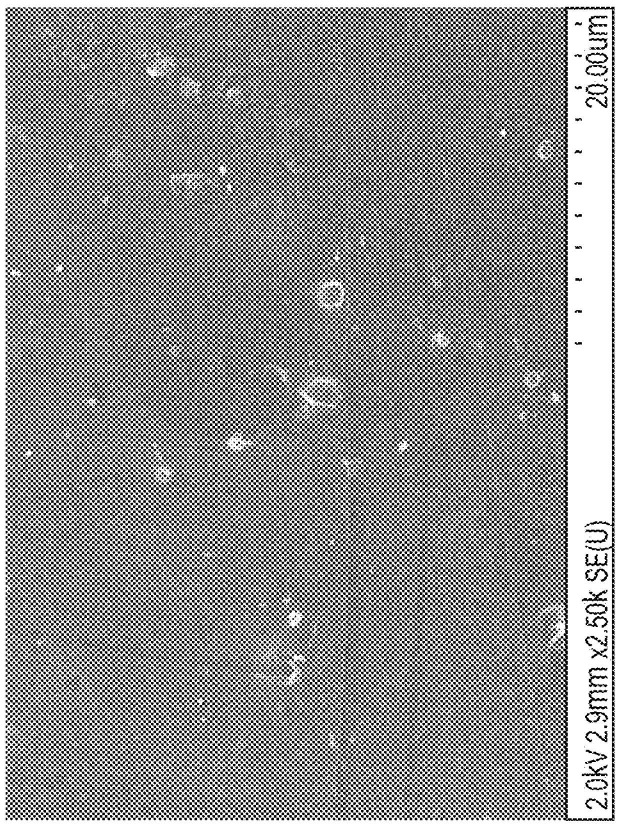

FIG. 197 illustrates a scanning electron microscopy image of film sample FIL-01-STEN-B-01-MYL (first view).

Figure 198:

FIG. 198 illustrates a scanning electron microscopy image of film sample FIL-01-STEN-B-01-MYL (second view).

Figure 199:
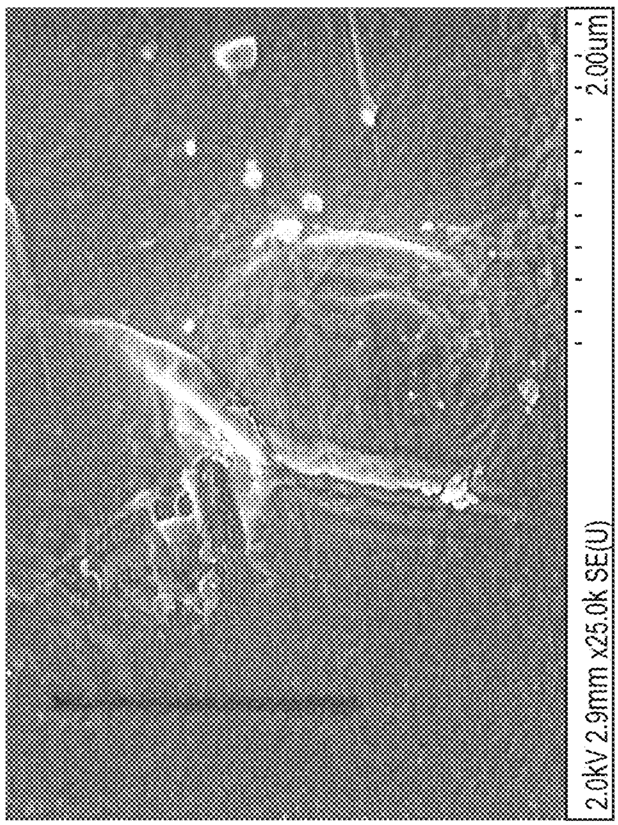

FIG. 199 illustrates a scanning electron microscopy image of film sample FIL-01-STEN-B-01-MYL (third view).

Figure 200:
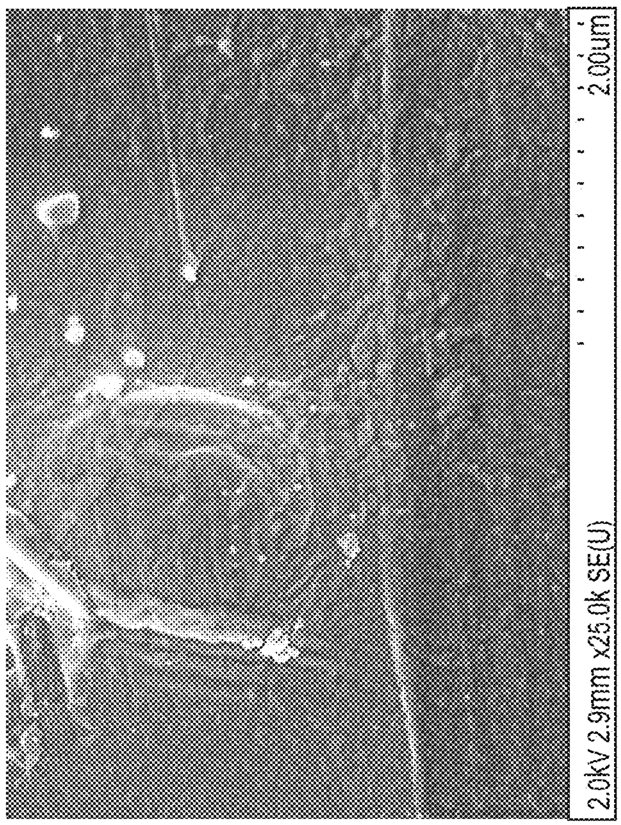

FIG. 200 illustrates a scanning electron microscopy image of film sample FIL-01-STEN-B-01-MYL (fourth view).

Figure 201:
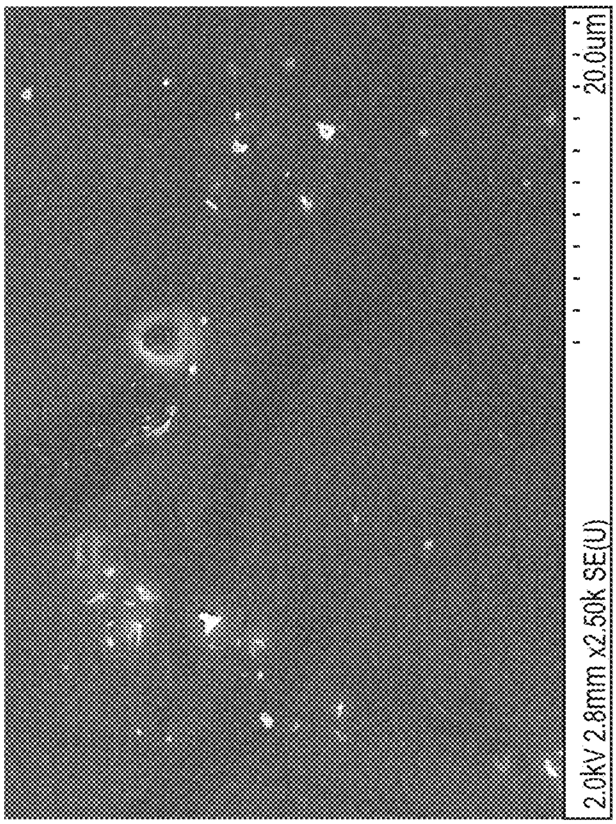

FIG. 201 illustrates a scanning electron microscopy image of film sample FIL-01-STEN-C-01-MYL (first view).

Figure 202:
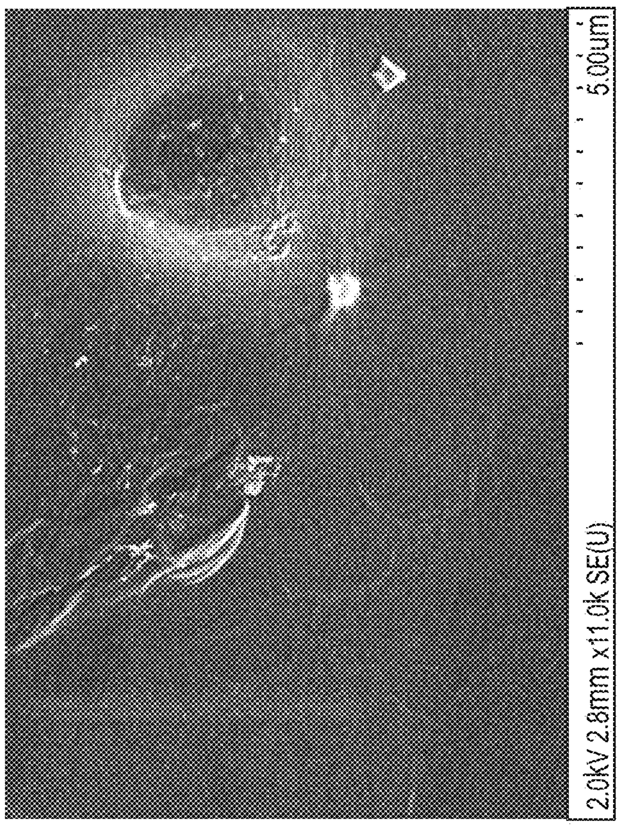

FIG. 202 illustrates a scanning electron microscopy image of film sample FIL-01-STEN-C-01-MYL (second view).

Figure 203:
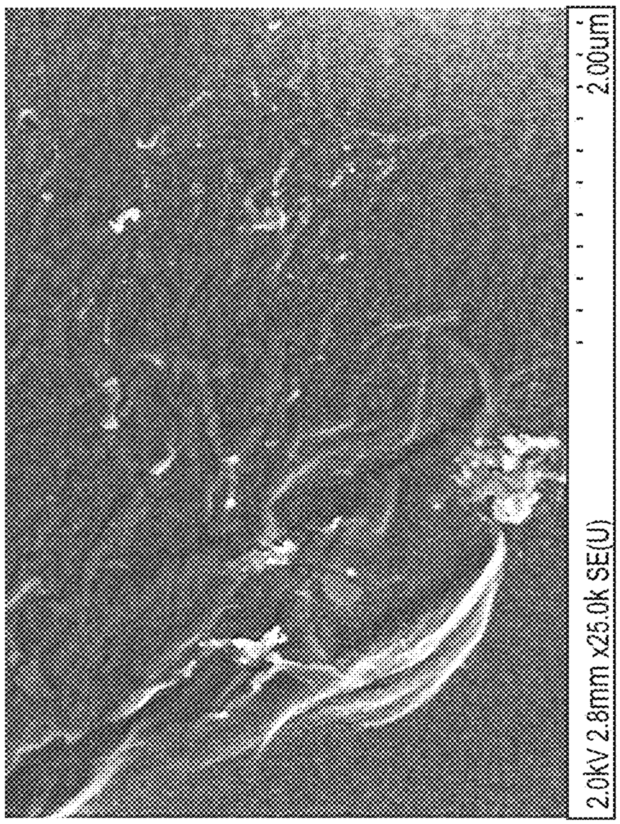

FIG. 203 illustrates a scanning electron microscopy image of film sample FIL-01-STEN-C-01-MYL (third view).

Figure 204:
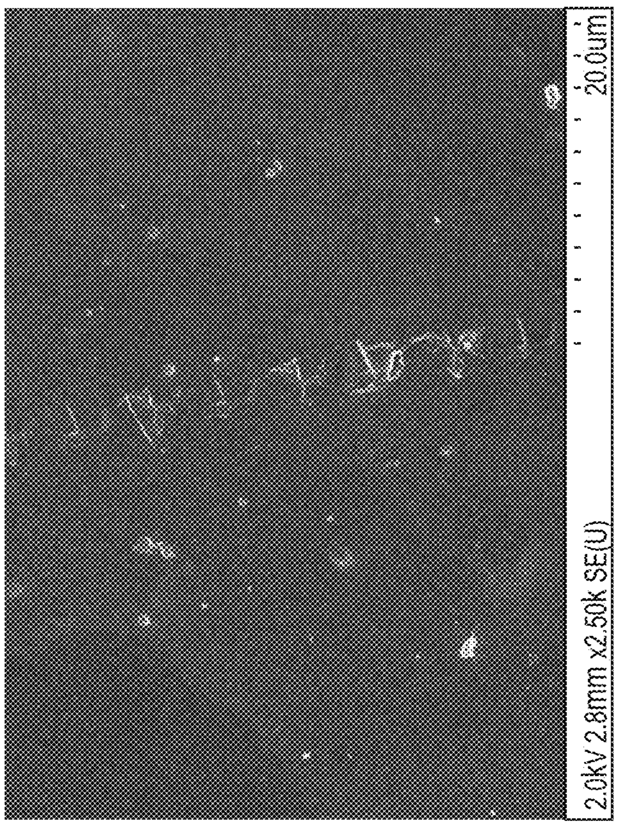

FIG. 204 illustrates a scanning electron microscopy image of film sample FIL-01-STEN-C-01-MYL (fourth view).

Figure 205:
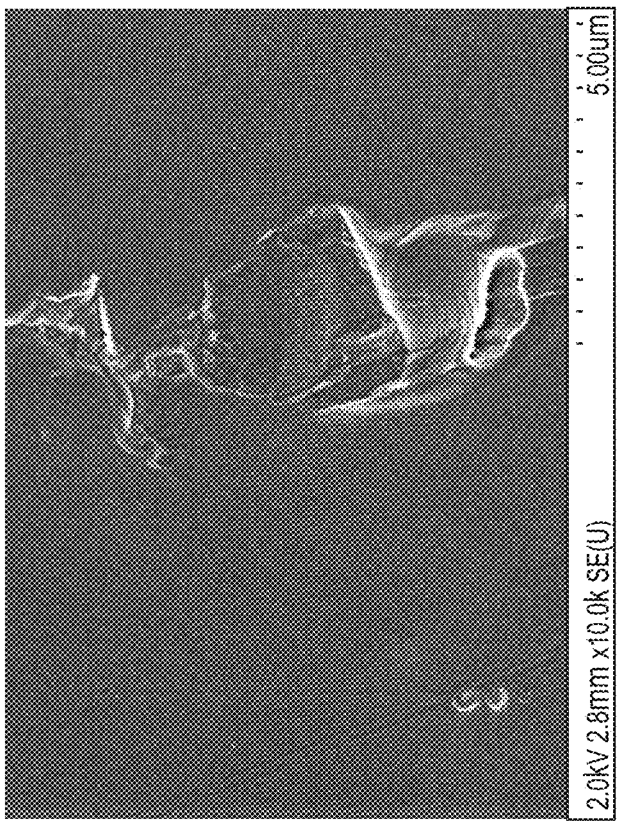

FIG. 205 illustrates a scanning electron microscopy image of film sample FIL-01-STEN-C-01-MYL (fifth view).

Figure 206:
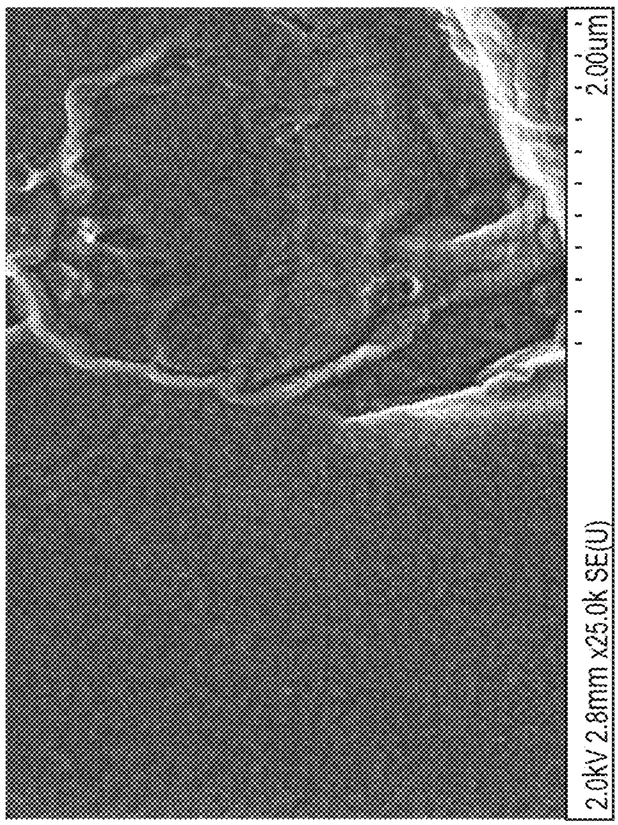

FIG. 206 illustrates a scanning electron microscopy image of film sample FIL-01-STEN-C-01-MYL (sixth view).

Figure 207:
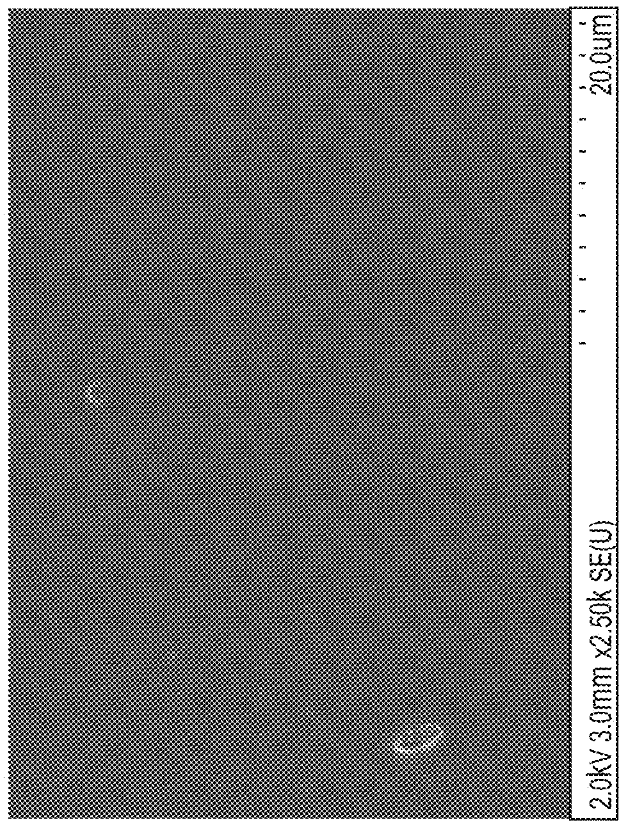

FIG. 207 illustrates a scanning electron microscopy image of film sample FIL-10-BATH-B-01MYL (first view).

Figure 208:
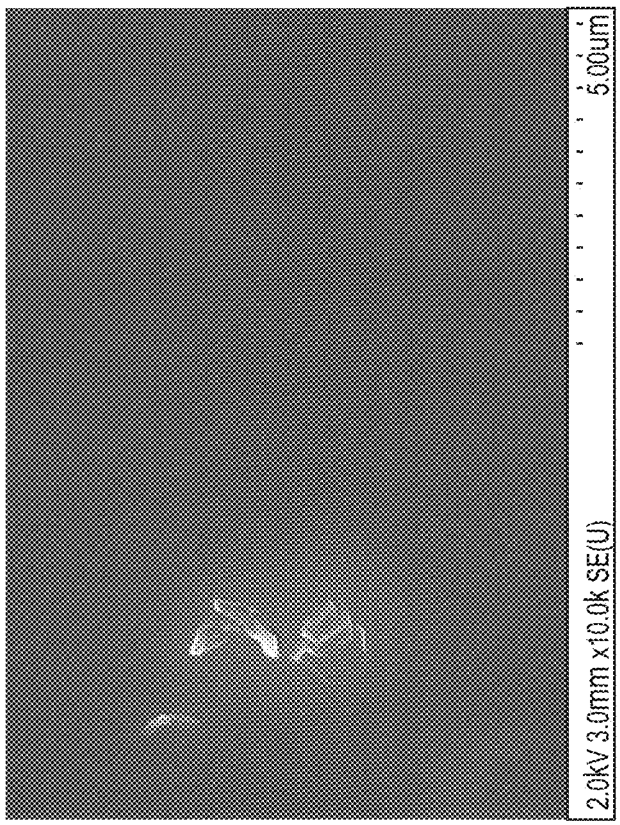

FIG. 208 illustrates a scanning electron microscopy image of film sample FIL-10-BATH-B-01MYL (second view).

Figure 209:
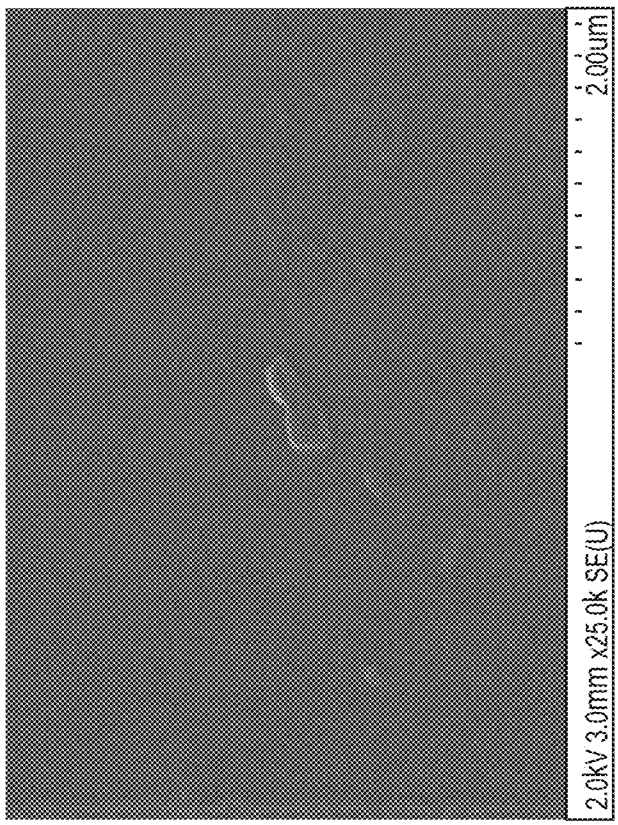

FIG. 209 illustrates a scanning electron microscopy image of film sample FIL-10-BATH-B-01MYL (third view).

Figure 210:
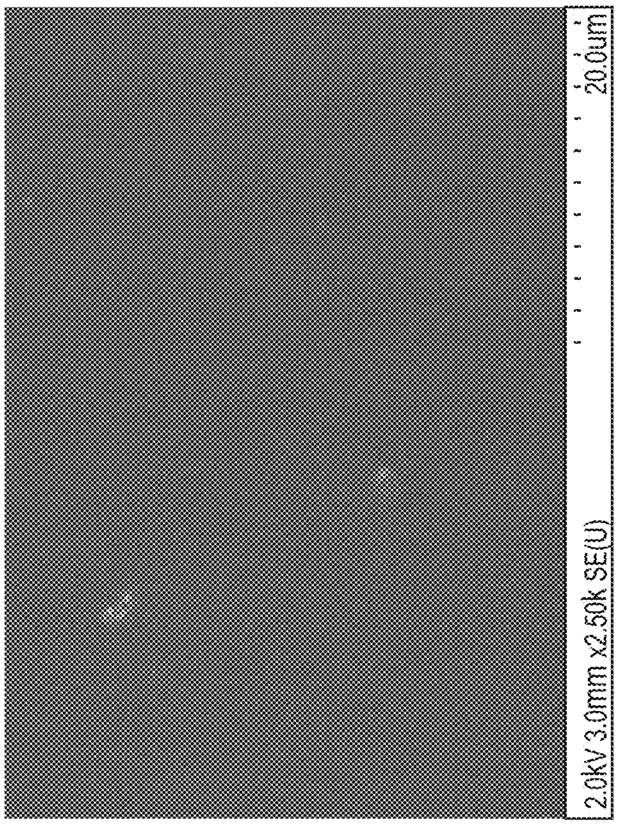

FIG. 210 illustrates a scanning electron microscopy image of film sample FIL-10-BATH-B-01MYL (fourth view).

Figure 211:
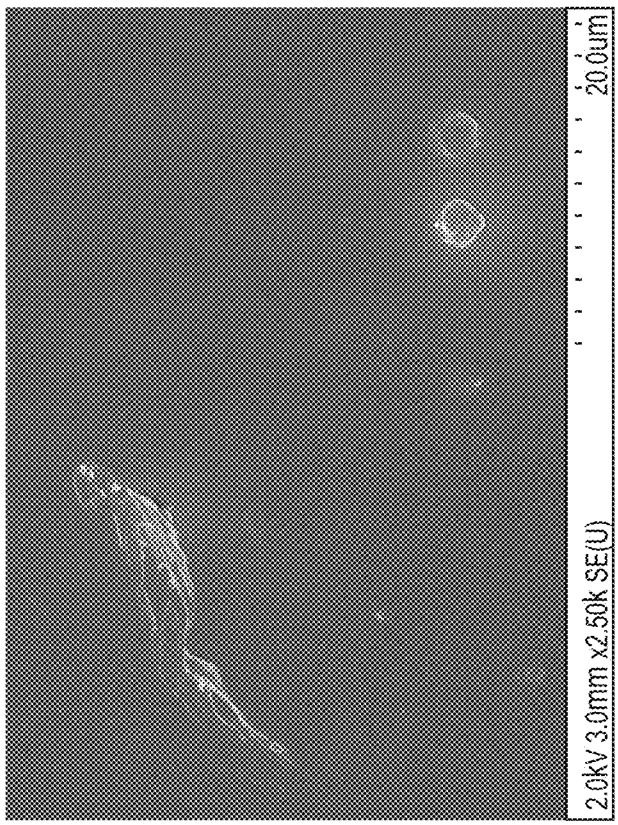

FIG. 211 illustrates a scanning electron microscopy image of film sample FIL-10-BATH-B-01MYL (fifth view).

Figure 212:
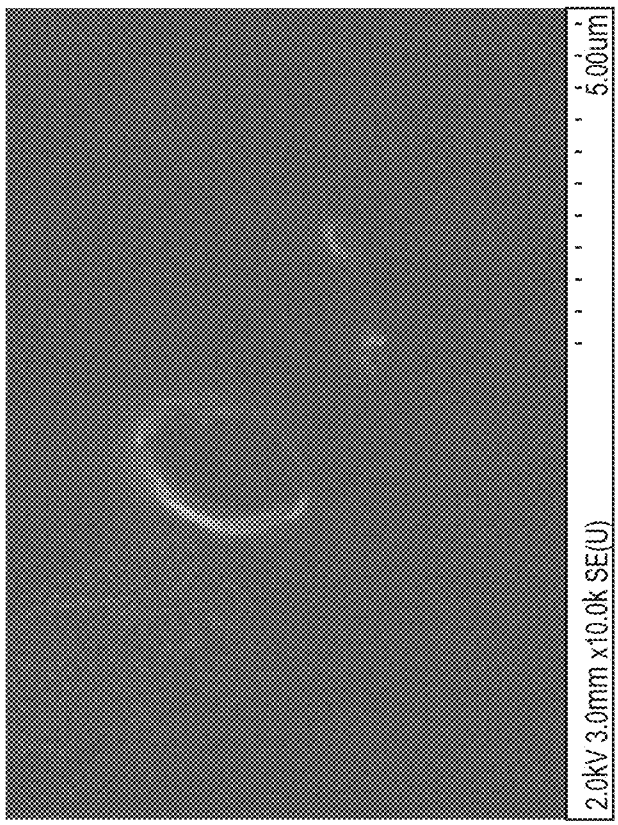

FIG. 212 illustrates a scanning electron microscopy image of film sample FIL-10-BATH-B-01MYL (sixth view).

Figure 213:
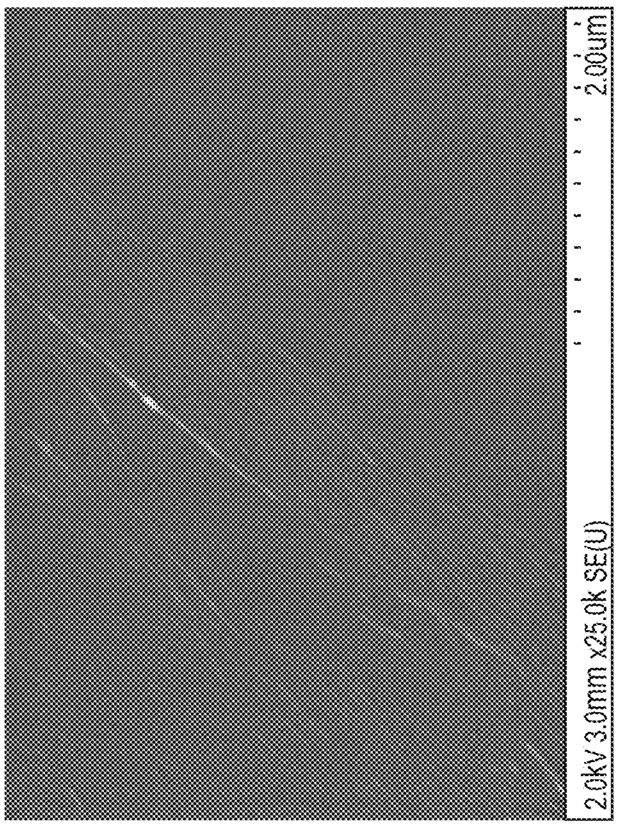

FIG. 213 illustrates a scanning electron microscopy image of film sample FIL-10-BATH-B-01MYL (seventh view).

Figure 214:
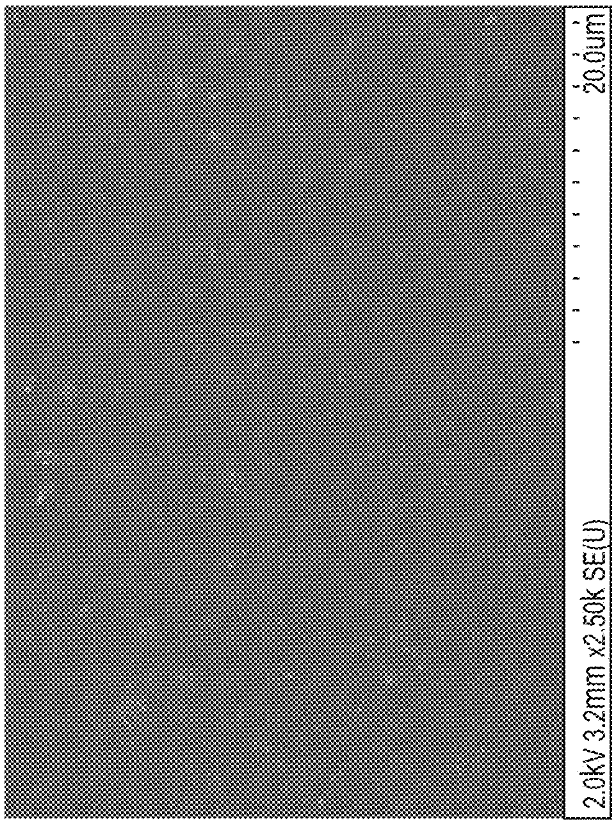

FIG. 214 illustrates a scanning electron microscopy image of film sample FIL-10-BATH-B-007MEL (first view).

Figure 215:
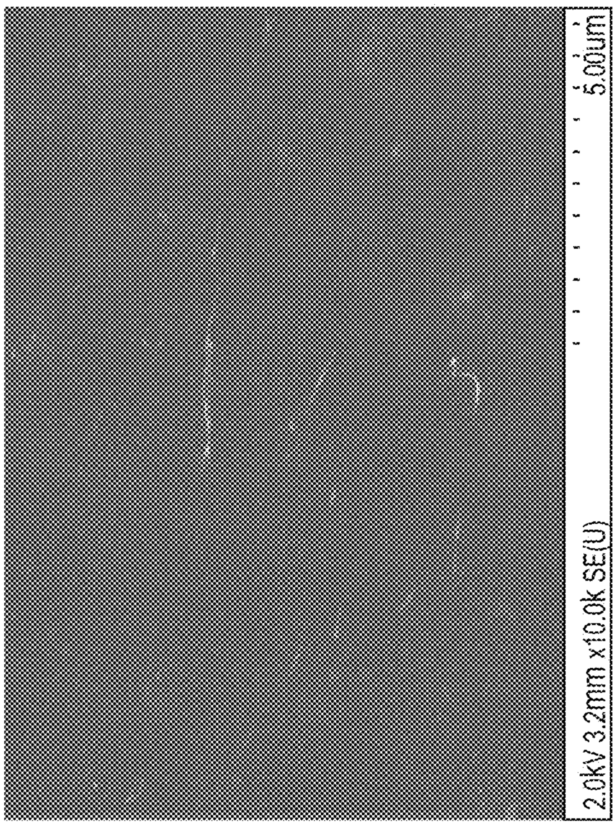

FIG. 215 illustrates a scanning electron microscopy image of film sample FIL-10-BATH-B-007MEL (second view).

Figure 216:
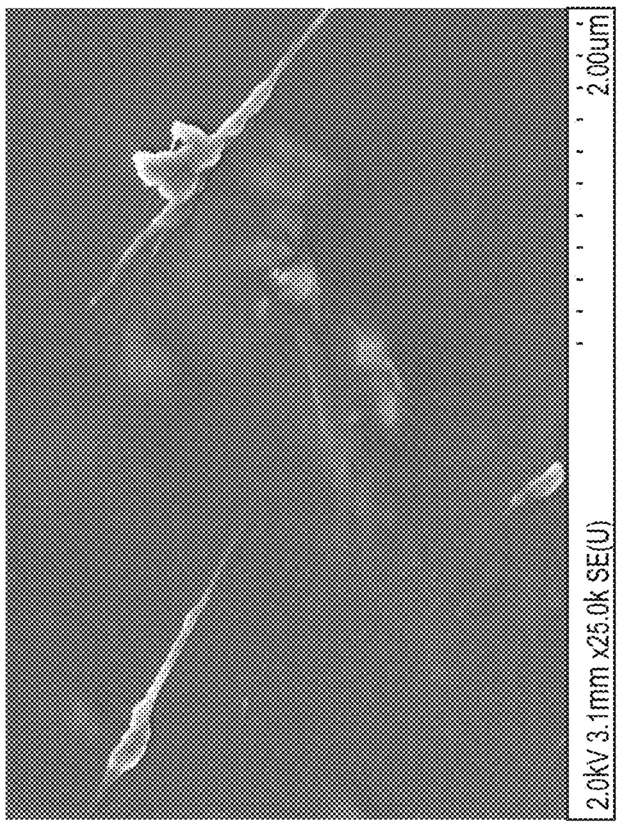

FIG. 216 illustrates a scanning electron microscopy image of film sample FIL-10-BATH-B-007MEL (third view).

Figure 217:
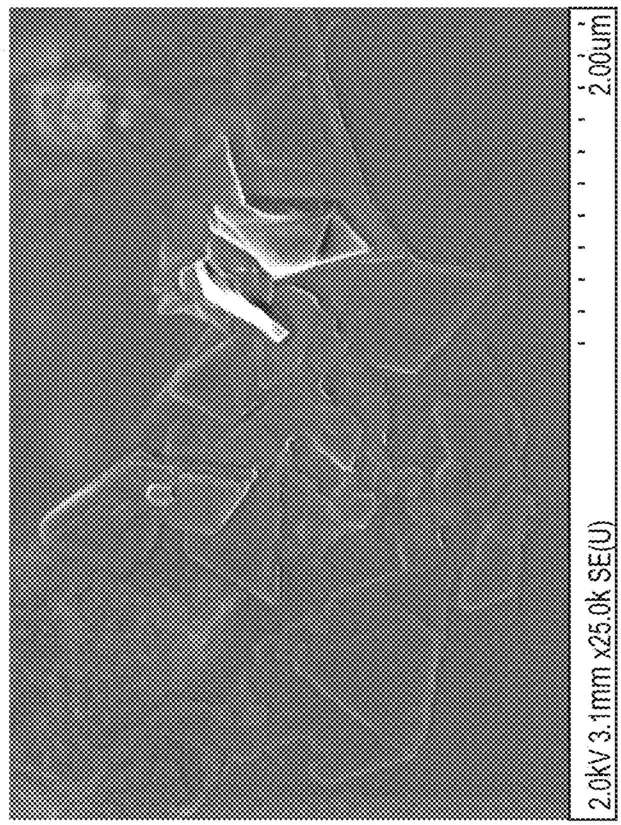

FIG. 217 illustrates a scanning electron microscopy image of film sample FIL-10-BATH-B-007MEL (fourth view).

Figure 218:
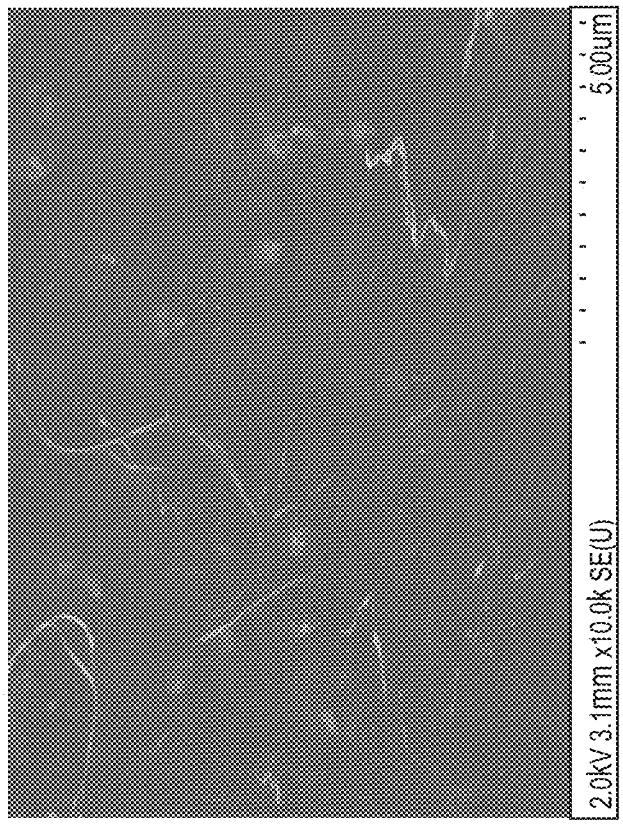

FIG. 218 illustrates a scanning electron microscopy image of film sample FIL-10-BATH-B-007MEL (fifth view).

Figure 219:
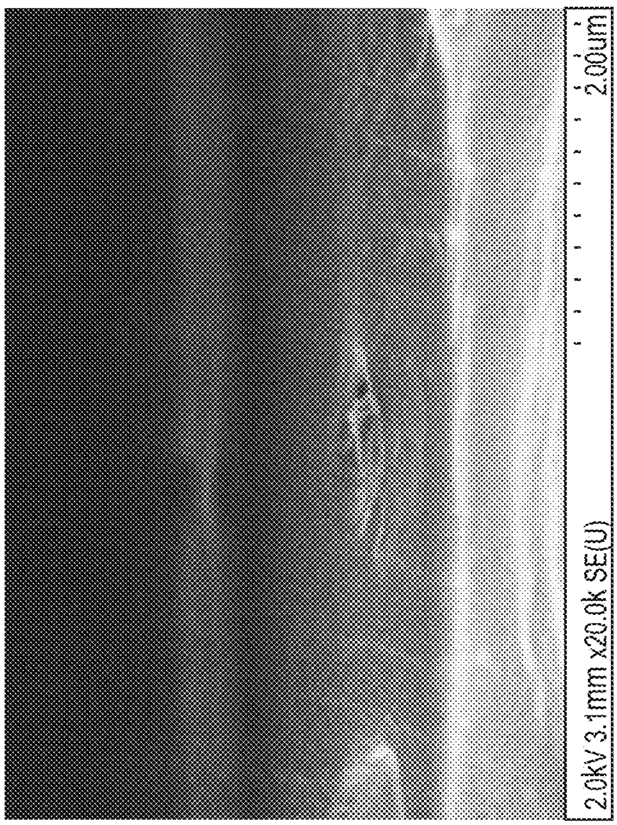

FIG. 219 illustrates a scanning electron microscopy image of film sample FIL-10-BATH-C-01MYL cross-section (first view).

Figure 220:
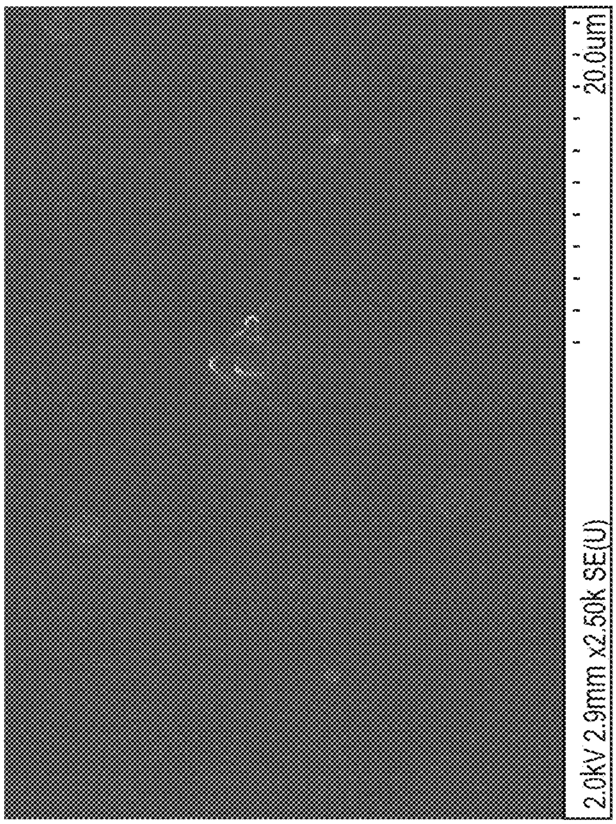

FIG. 220 illustrates a scanning electron microscopy image of film sample FIL-10-SPRAY-B-01MYL (first view).

Figure 221:
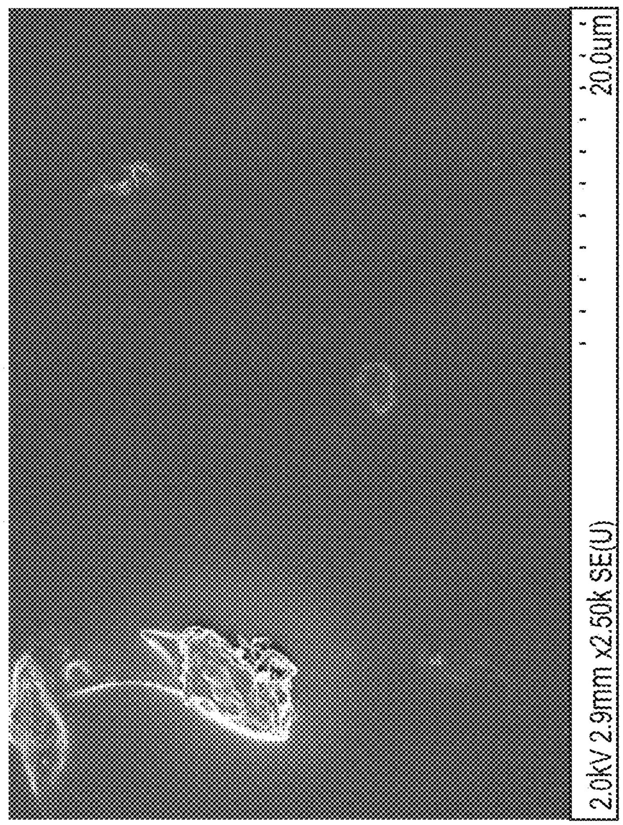

FIG. 221 illustrates a scanning electron microscopy image of film sample FIL-10-SPRAY-B-01MYL (second view).

Figure 222:
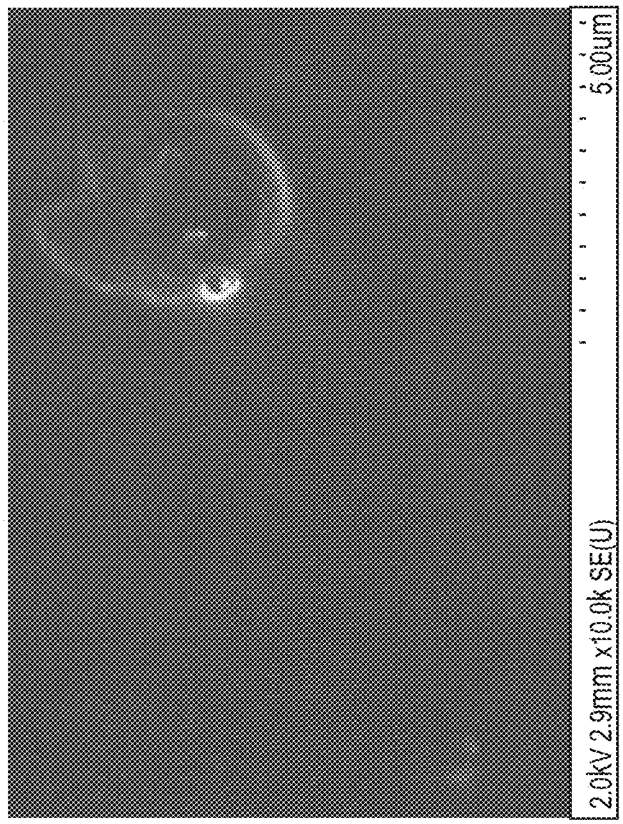

FIG. 222 illustrates a scanning electron microscopy image of film sample FIL-10-SPRAY-B-01MYL (third view).

Figure 223:
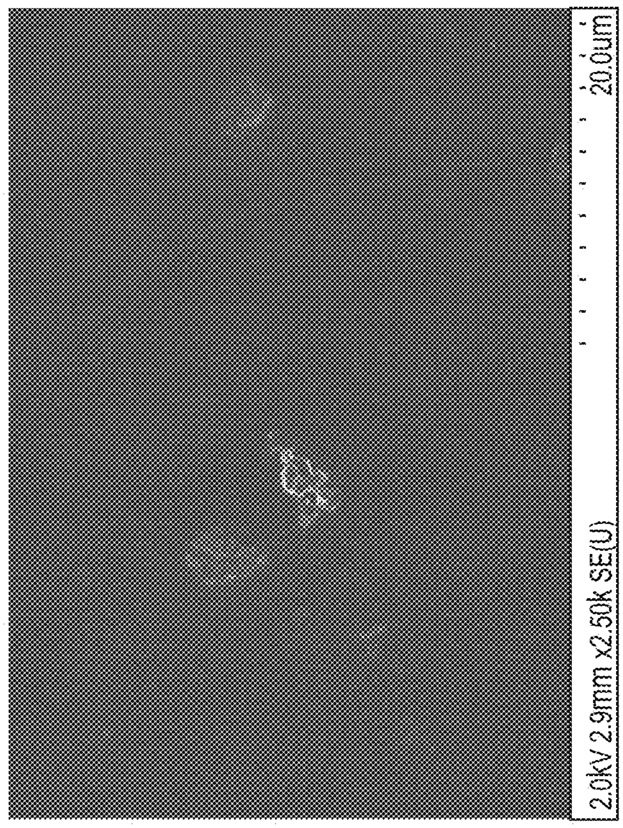

FIG. 223 illustrates a scanning electron microscopy image of film sample FIL-10-SPRAY-B-01MYL (fourth view).

Figure 224:
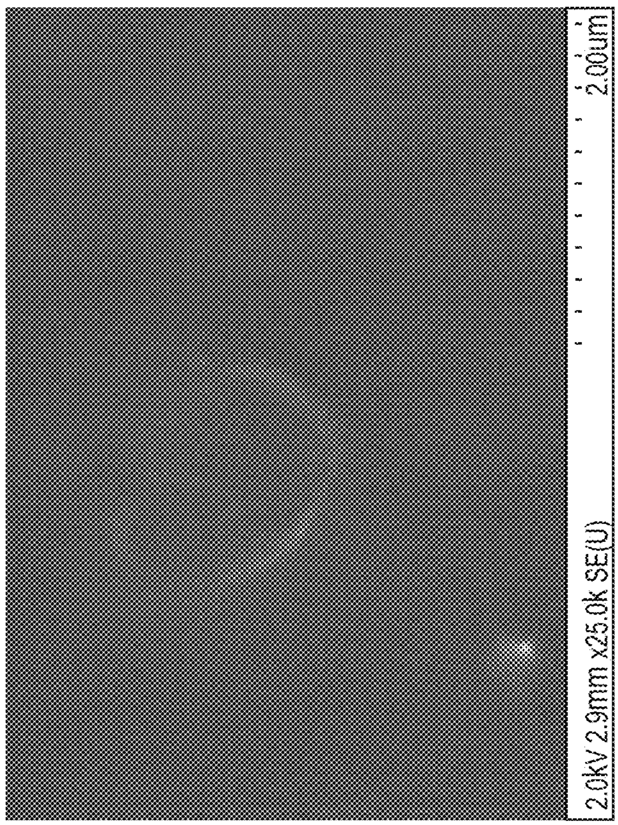

FIG. 224 illustrates a scanning electron microscopy image of film sample FIL-10-SPRAY-B-01MYL (fifth view).

Figure 225:
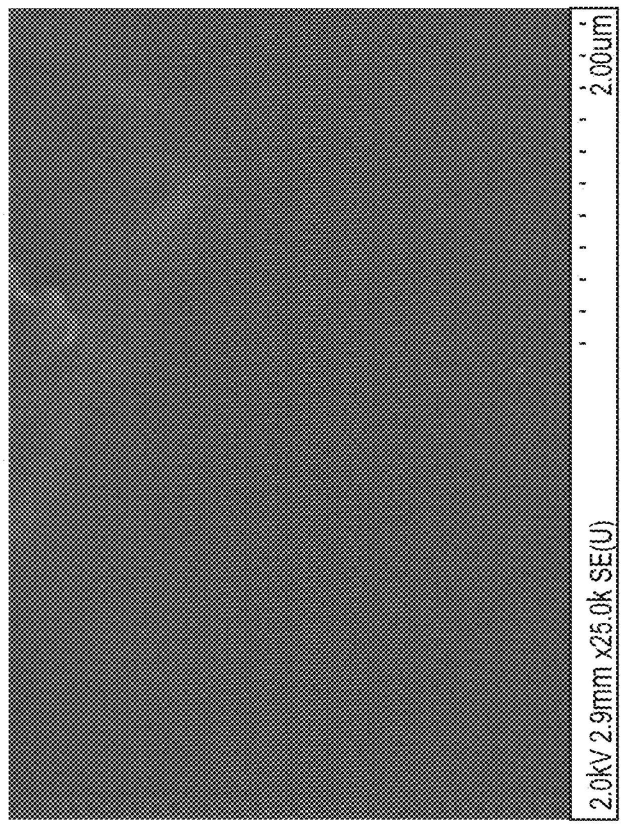

FIG. 225 illustrates a scanning electron microscopy image of film sample FIL-10-SPRAY-B-01MYL (sixth view).

Figure 226:
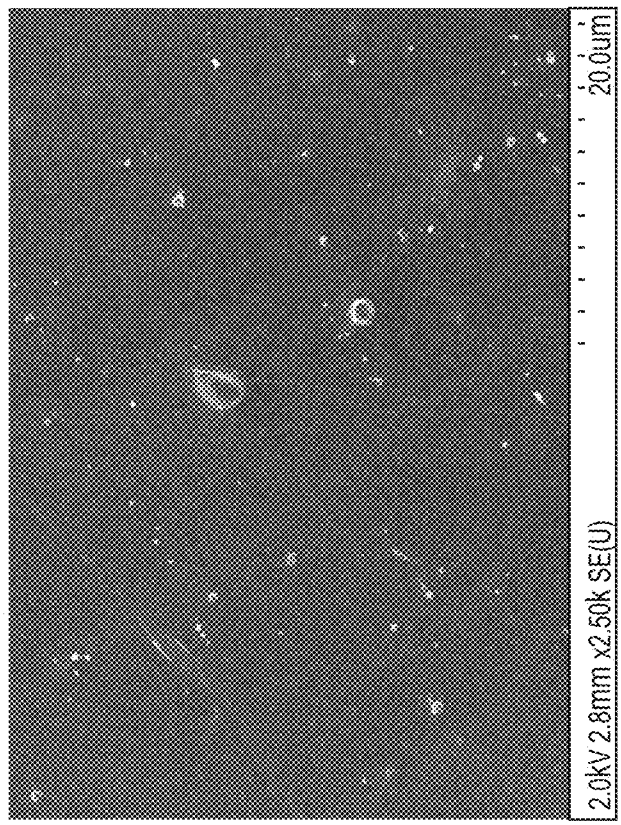

FIG. 226 illustrates a scanning electron microscopy image of film sample FIL-BATH-C-01-MYL (first view).

Figure 227:
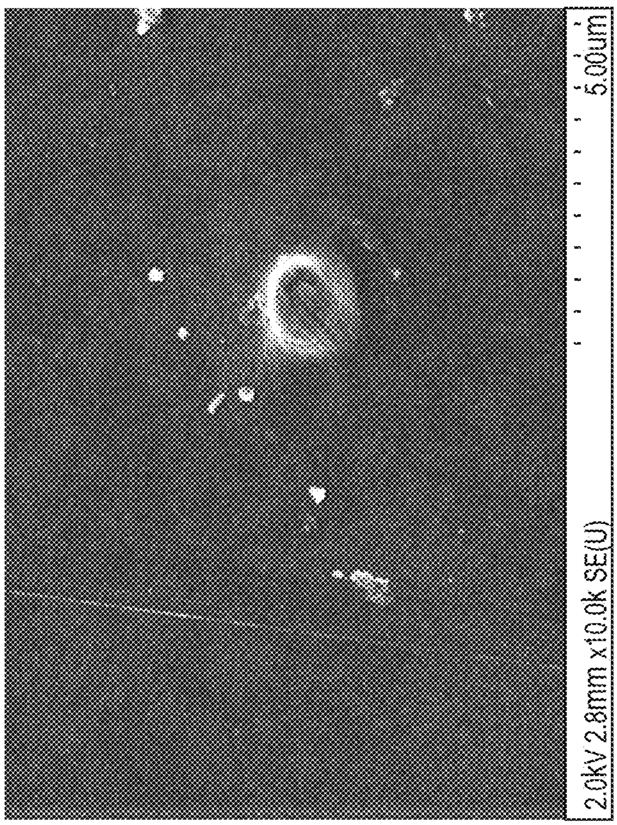

FIG. 227 illustrates a scanning electron microscopy image of film sample FIL-BATH-C-01-MYL (second view).

Figure 228:
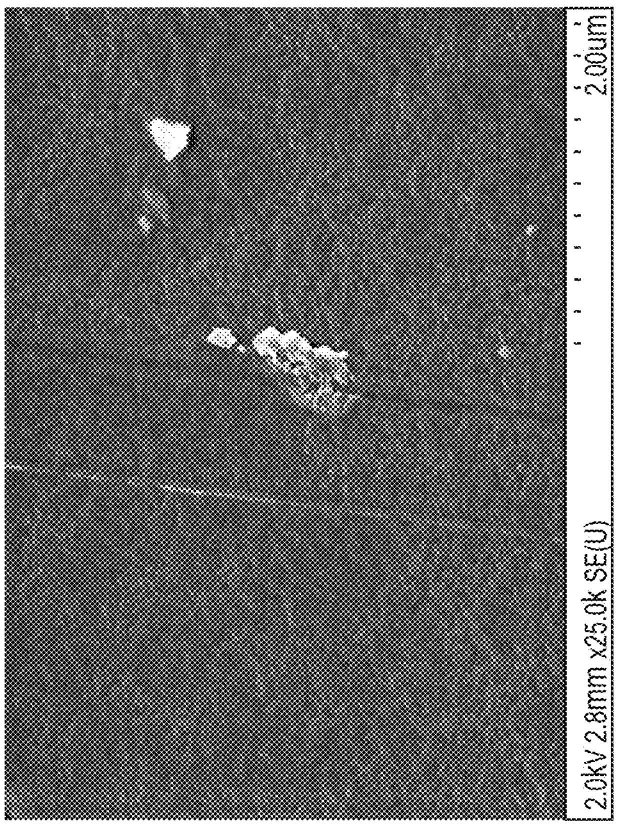

FIG. 228 illustrates a scanning electron microscopy image of film sample FIL-BATH-C-01-MYL (third view).

Figure 229:
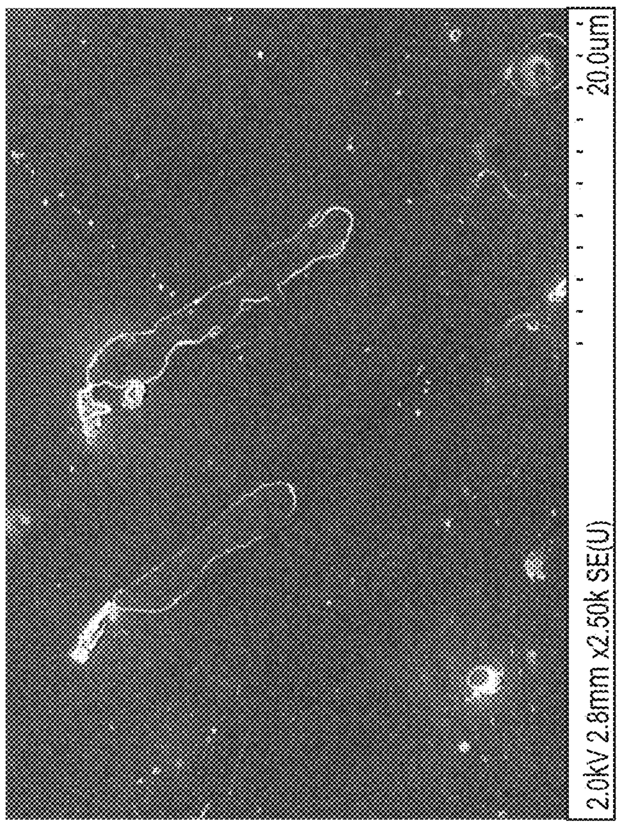

FIG. 229 illustrates a scanning electron microscopy image of film sample FIL-BATH-C-01-MYL (fourth view).

Figure 230:
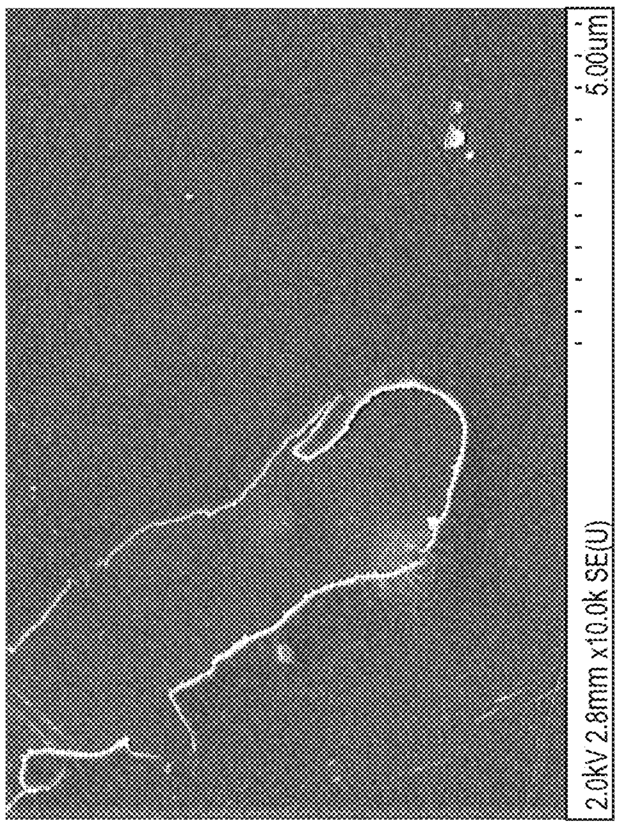

FIG. 230 illustrates a scanning electron microscopy image of film sample FIL-BATH-C-01-MYL (fifth view).

Figure 231:
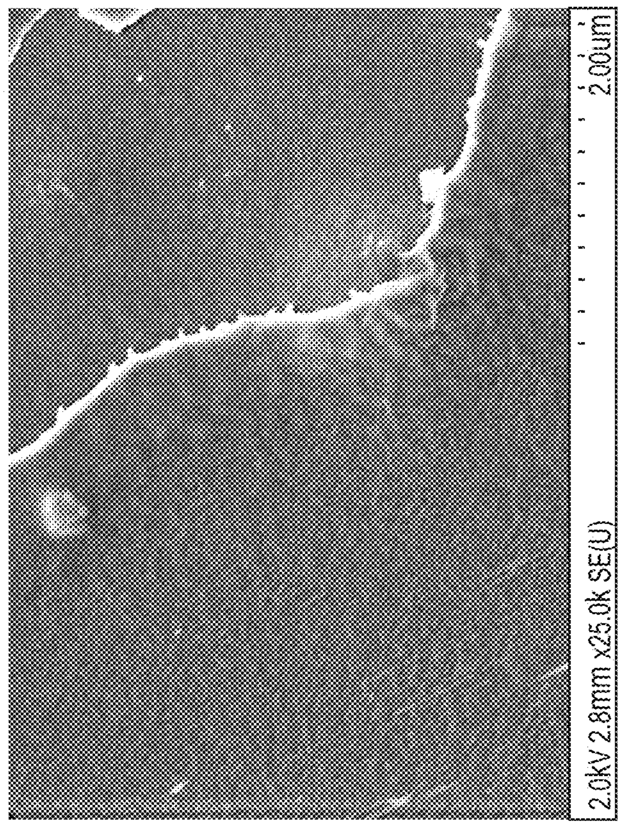

FIG. 231 illustrates a scanning electron microscopy image of film sample FIL-BATH-C-01-MYL (sixth view).

Figure 232:
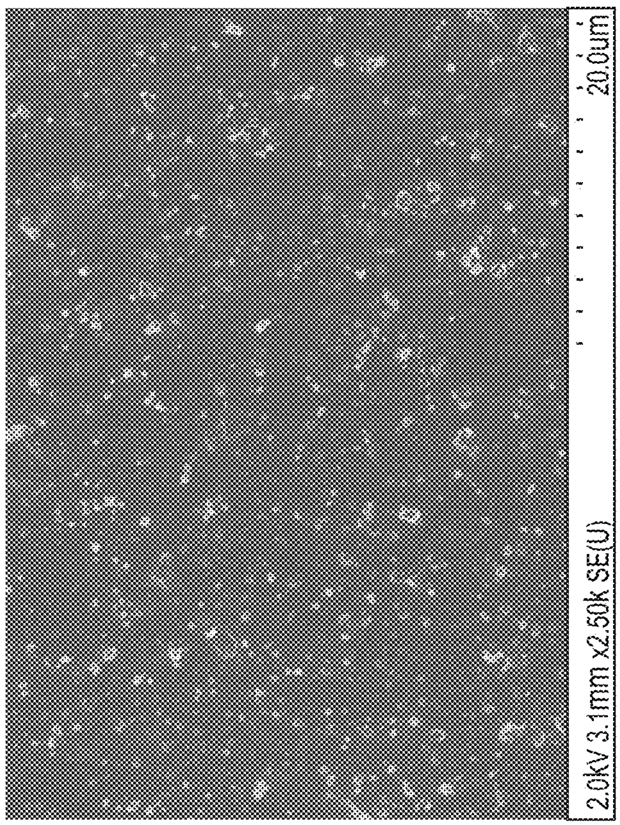

FIG. 232 illustrates a scanning electron microscopy image of film sample Melinex Control (first view).

Figure 233:
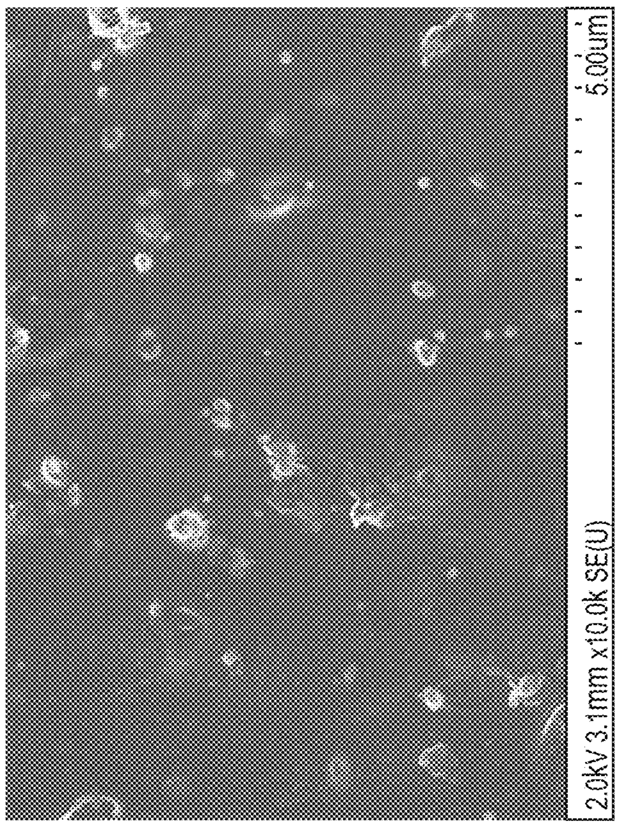

FIG. 233 illustrates a scanning electron microscopy image of film sample Melinex Control (second view).

Figure 234:
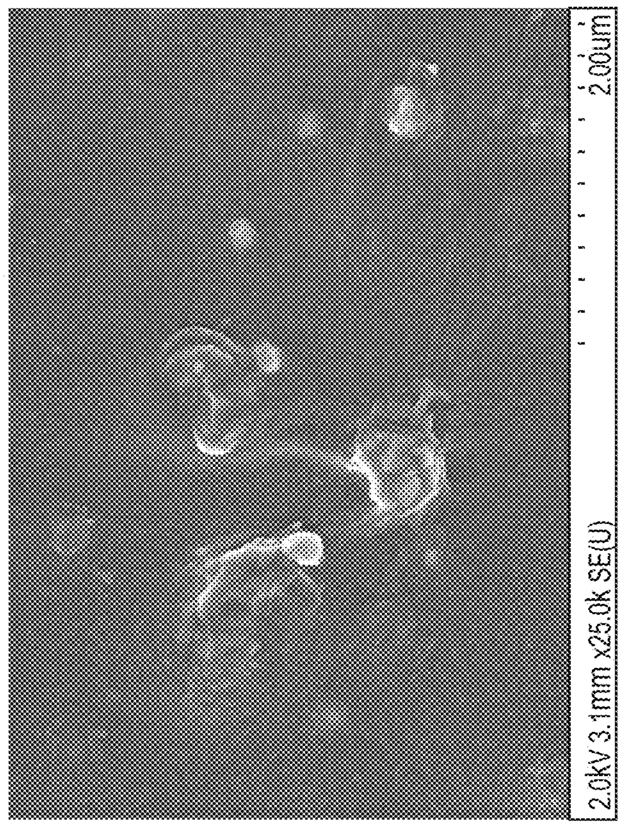

FIG. 234 illustrates a scanning electron microscopy image of film sample Melinex Control (third view).

Figure 235:
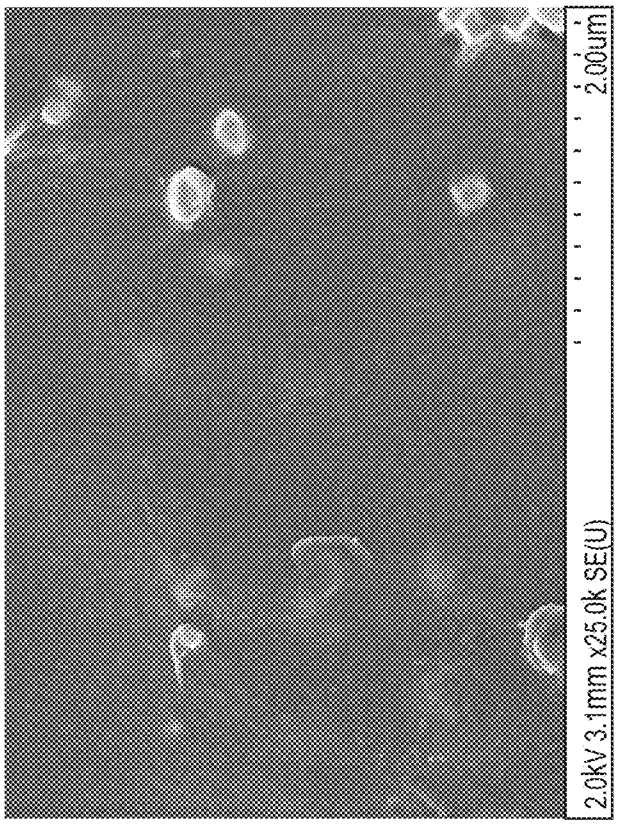

FIG. 235 illustrates a scanning electron microscopy image of film sample Melinex Control (fourth view).

Figure 236:
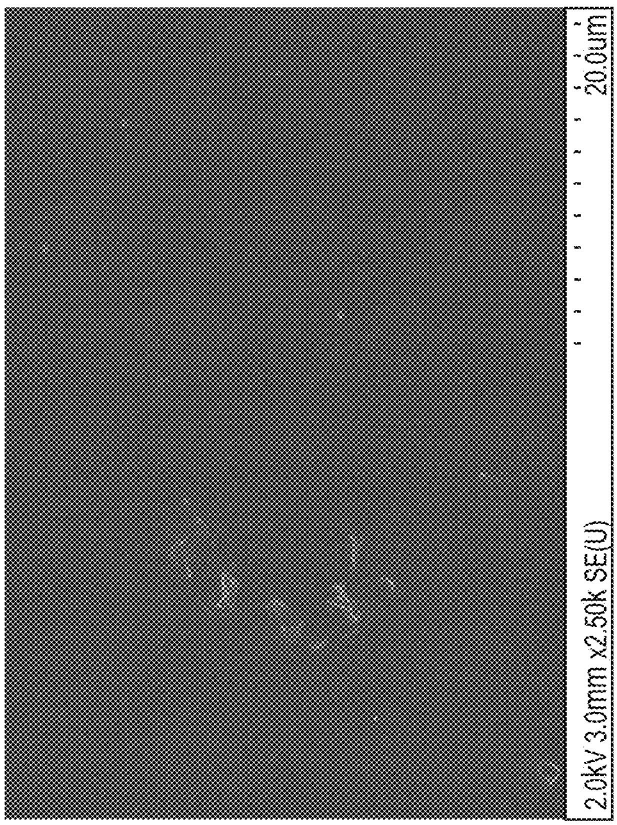

FIG. 236 illustrates a scanning electron microscopy image of film sample Mylar Control (first view).

Figure 237:
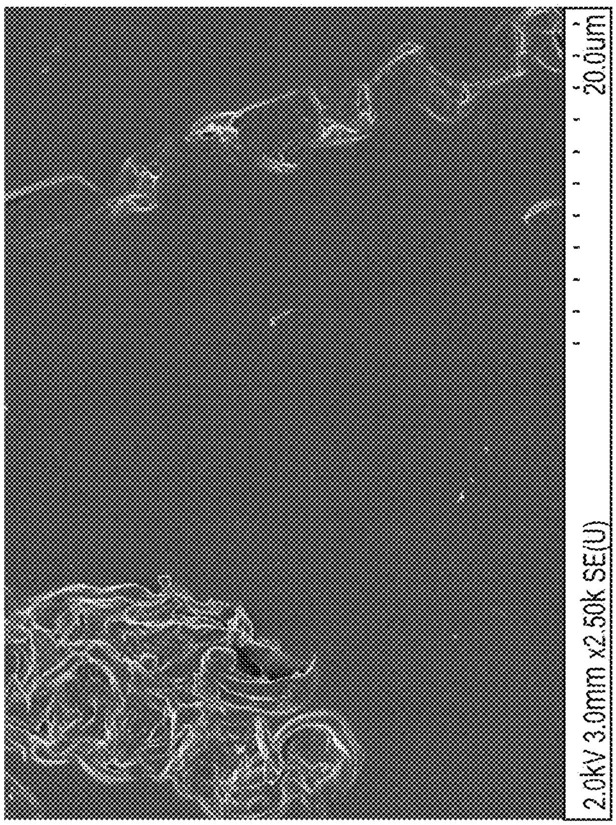

FIG. 237 illustrates a scanning electron microscopy image of film sample Mylar Control (second view).

Figure 238:
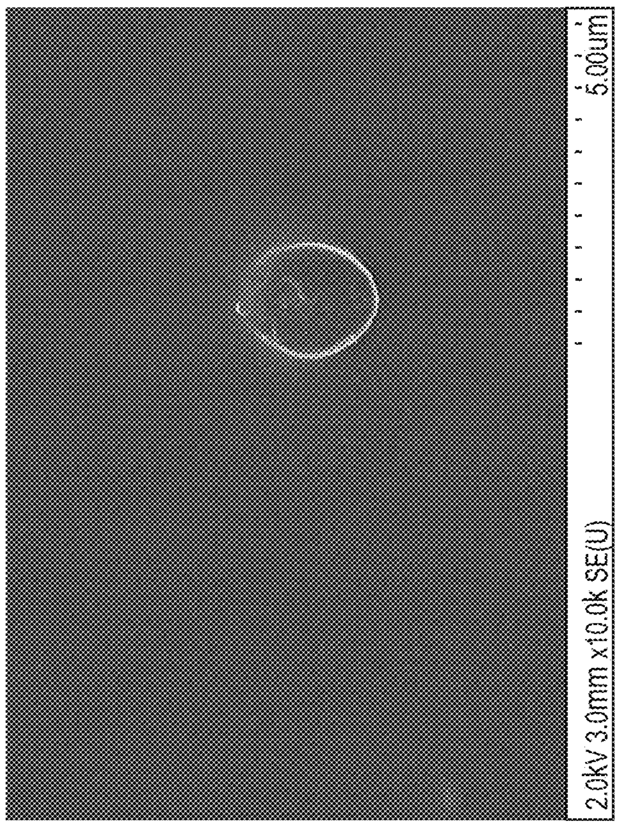

FIG. 238 illustrates a scanning electron microscopy image of film sample Mylar Control (third view).

Figure 239:
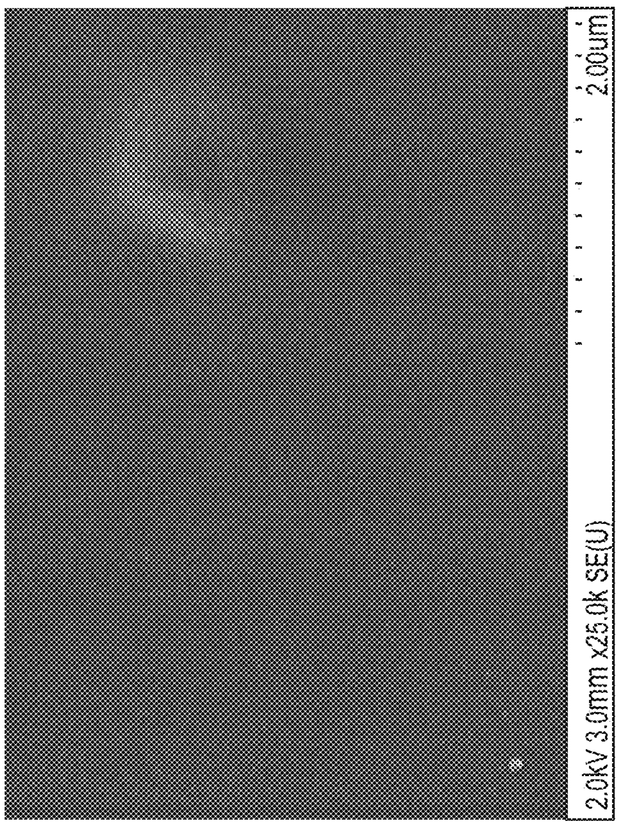

FIG. 239 illustrates a scanning electron microscopy image of film sample Mylar Control (fourth view).

Figure 240:
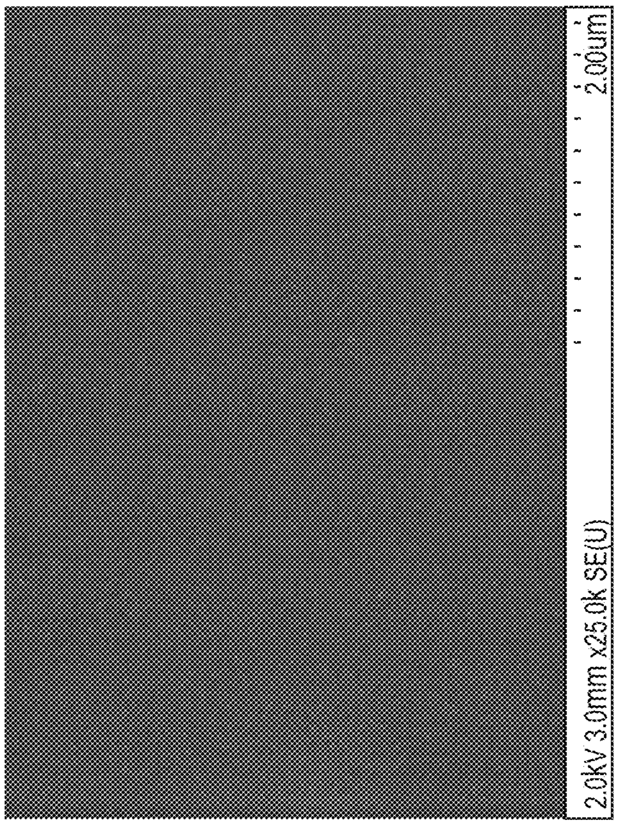

FIG. 240 illustrates a scanning electron microscopy image of film sample Mylar Control (fifth view).

Figure 241:
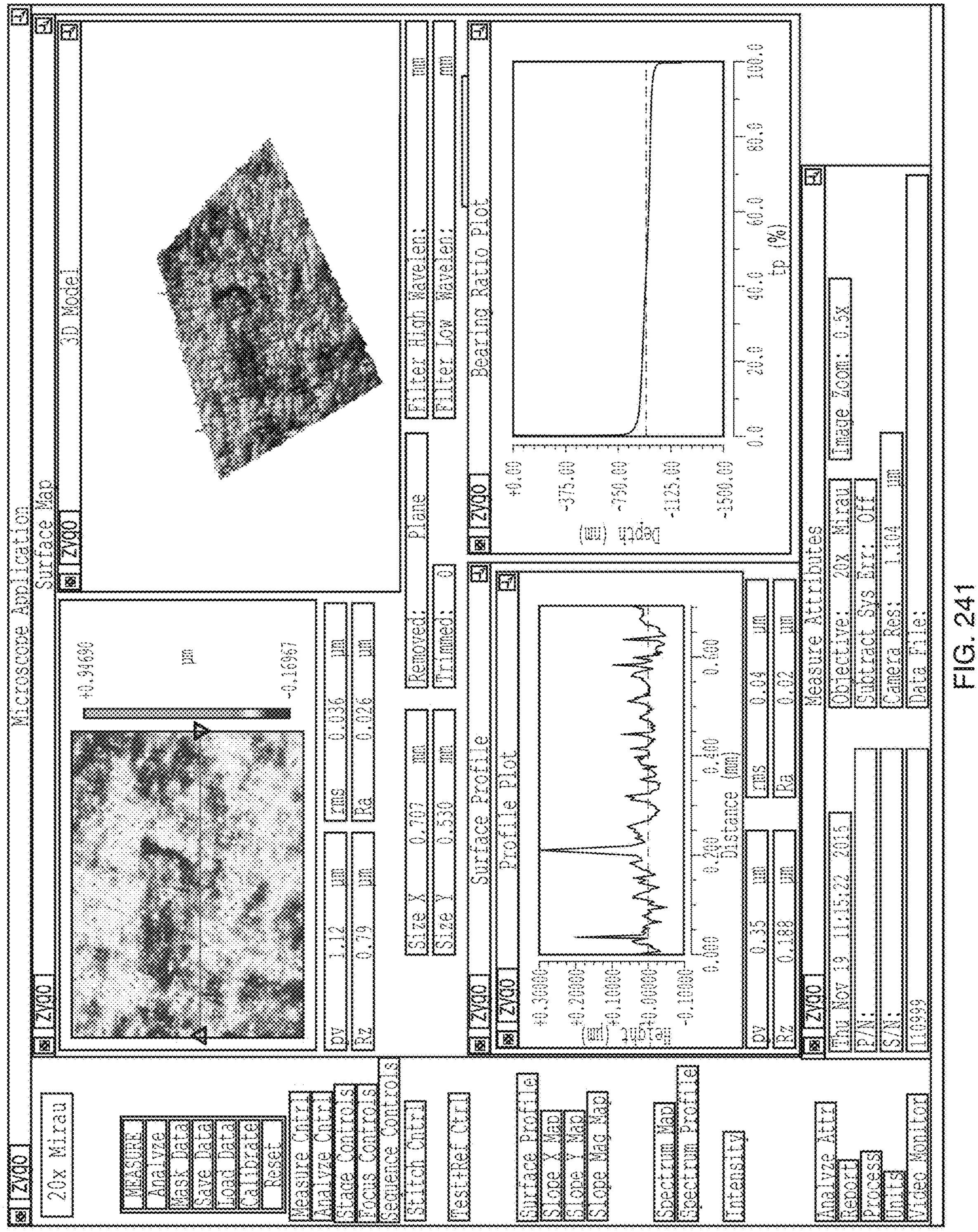

FIG. 241 shows results from optical profiling measurements on the Mylar Control sample taken at the top, location 1 (shiny side).

Figure 242:
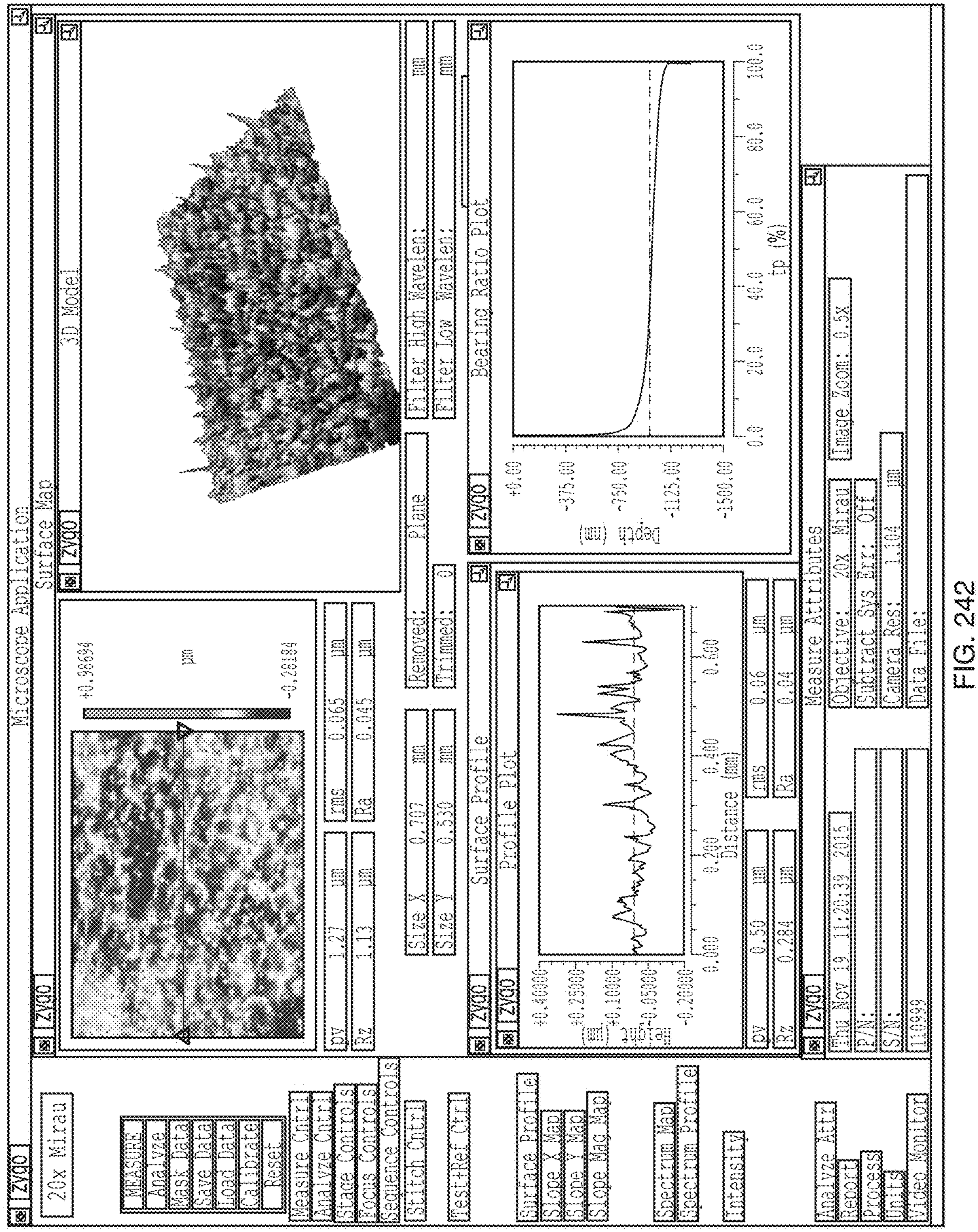

FIG. 242 shows results from optical profiling measurements on the Mylar Control sample taken at the bottom, location 2 (more matte side).

Figure 243:
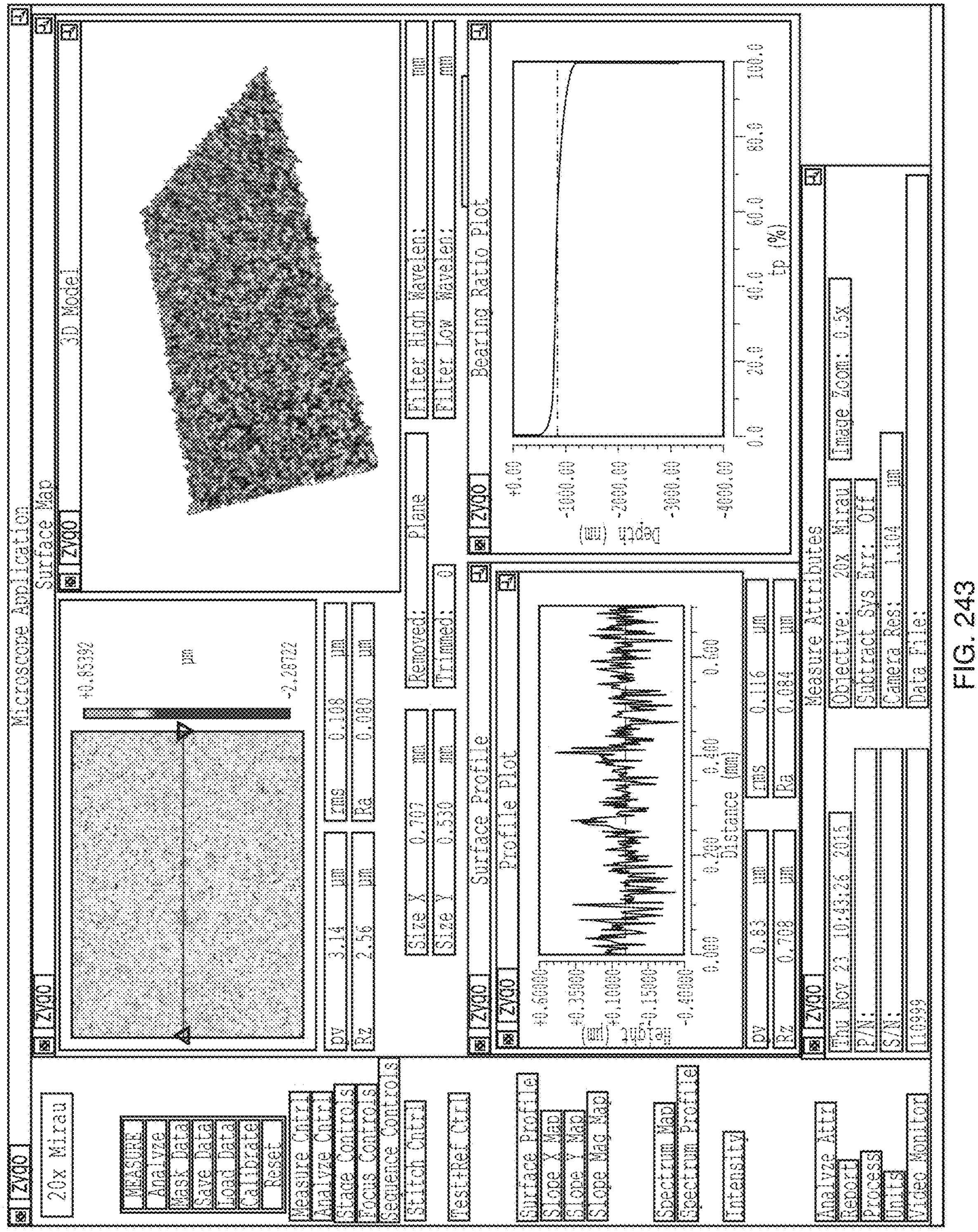

FIG. 243 shows results from optical profiling measurements on the Melinex Control sample taken at the top, location 1.

Figure 244:
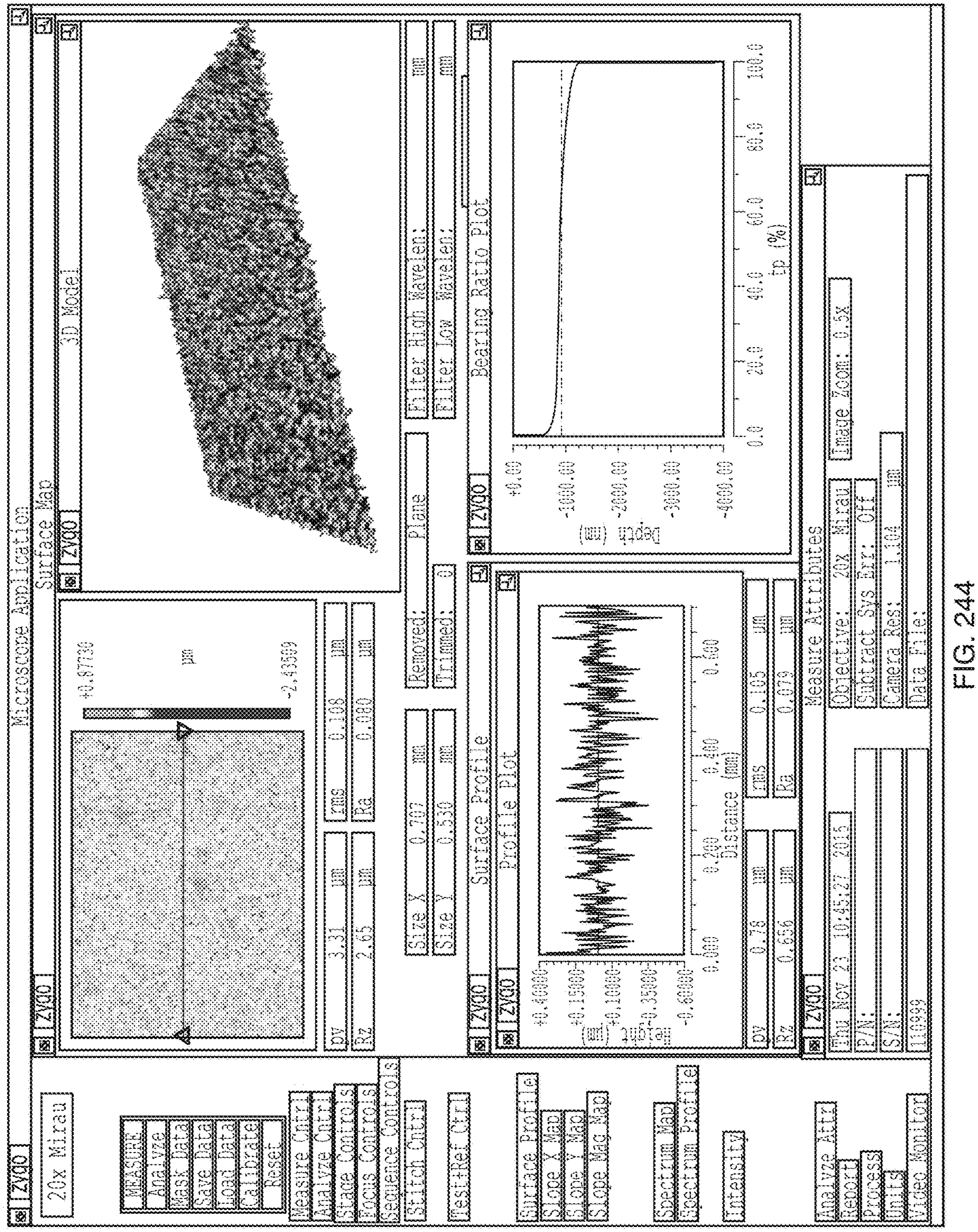

FIG. 244 shows results from optical profiling measurements on the Melinex Control sample taken at the bottom, location 2.

Figure 245:
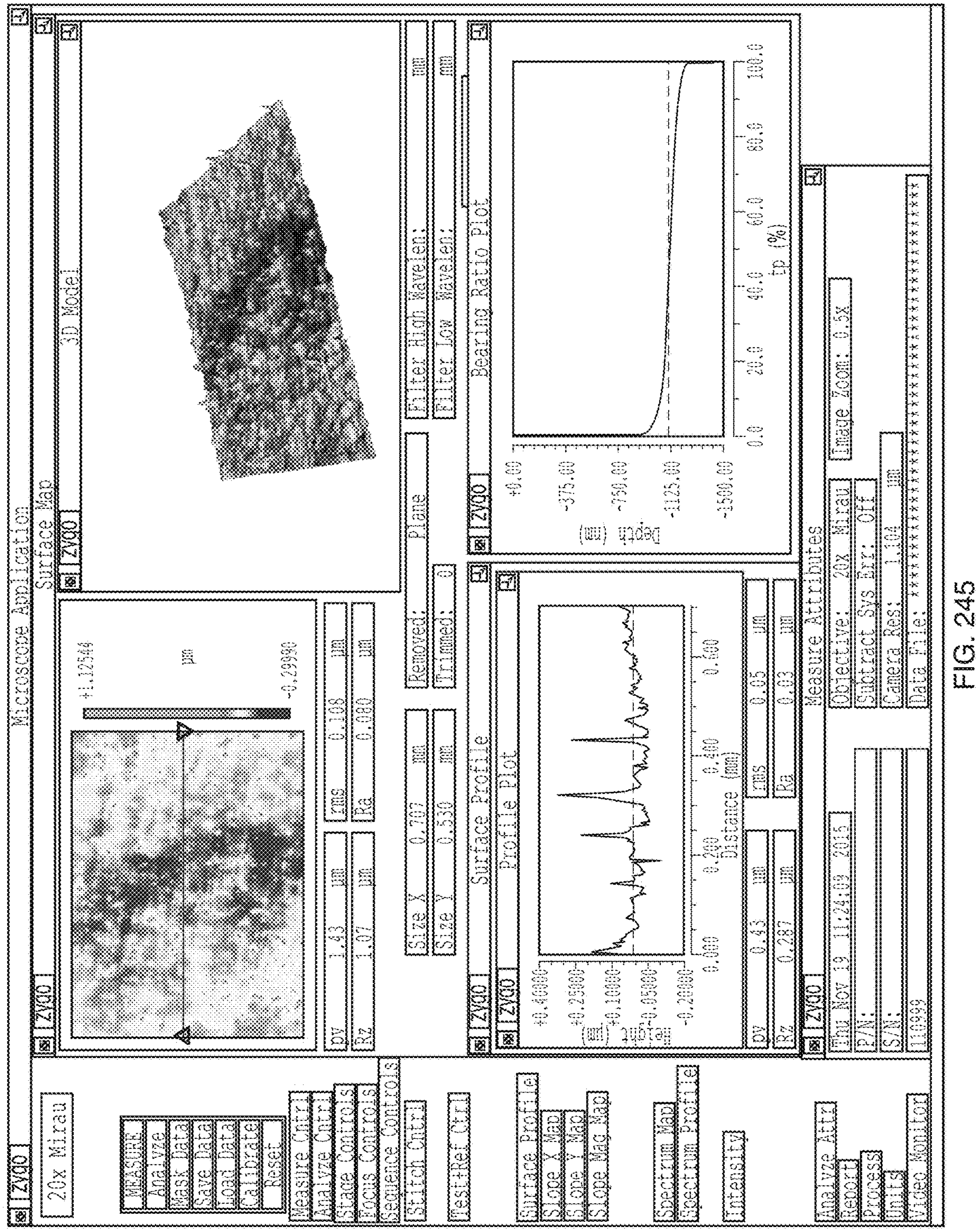

FIG. 245 shows results from optical profiling measurements on sample FIL-10-SPRAY-B-01MYL taken at the top, location 1.

Figure 246:
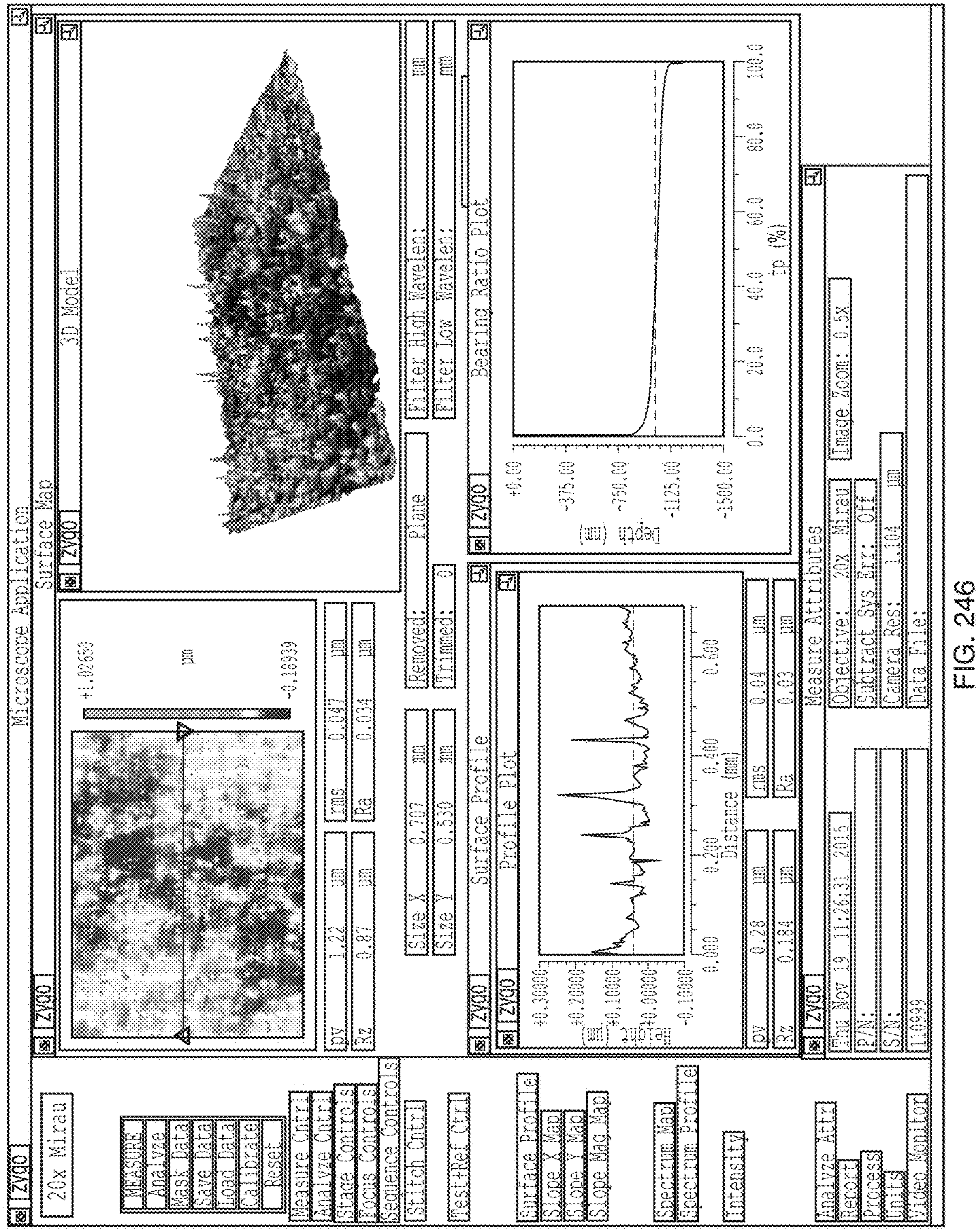

FIG. 246 shows results from optical profiling measurements on sample FIL-10-SPRAY-B-01MYL taken at the bottom, location 2.

Figure 247:
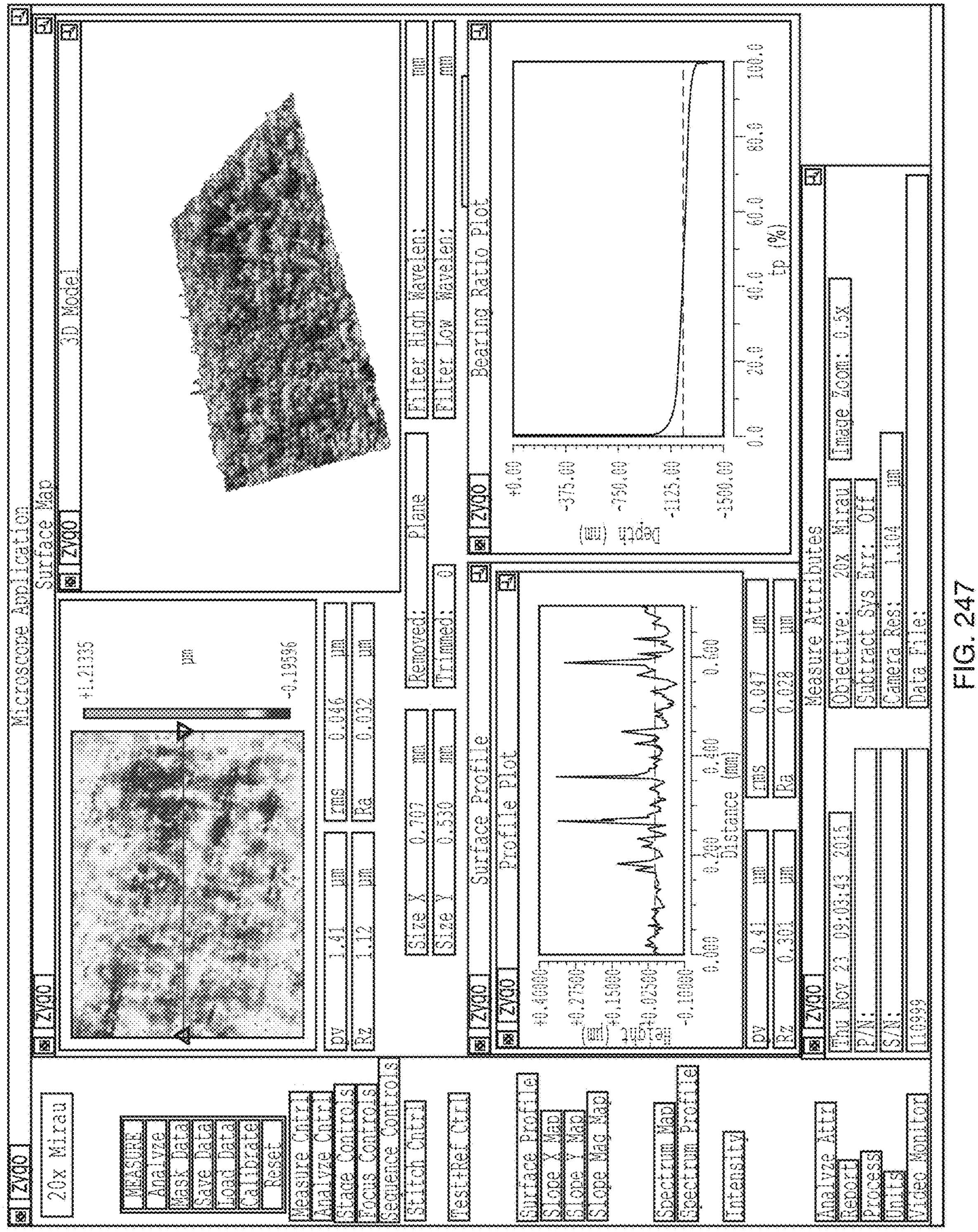

FIG. 247 shows results from optical profiling measurements on sample FIL-01-SPRAY-B-01MYL taken at the top, location 1.

Figure 248:
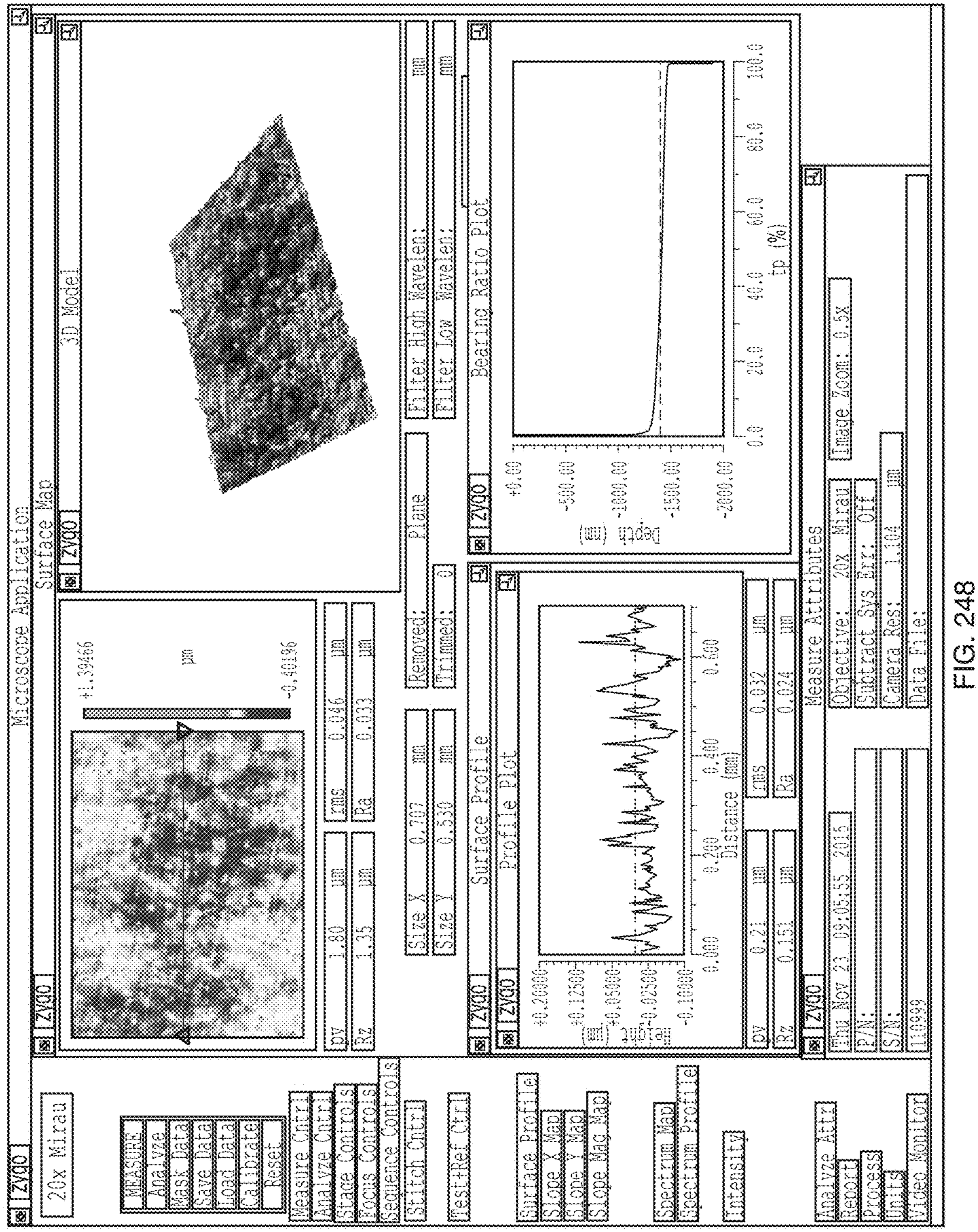

FIG. 248 shows results from optical profiling measurements on sample FIL-01-SPRAY-B-01MYL taken at the bottom, location 2.

Figure 249:
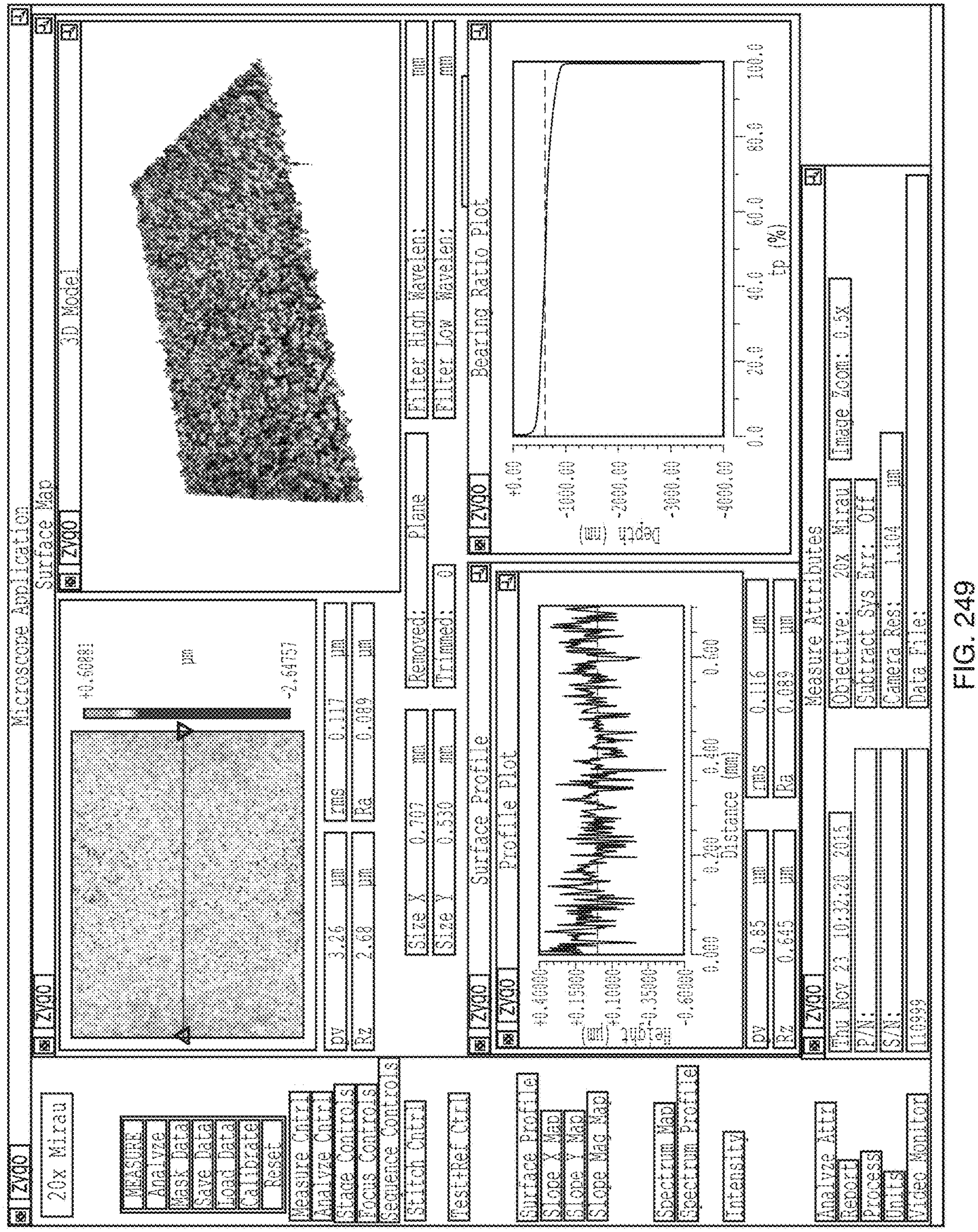

FIG. 249 shows results from optical profiling measurements on sample FIL-01-SPRAY-B-007MEL taken the top, location 1.

Figure 250:
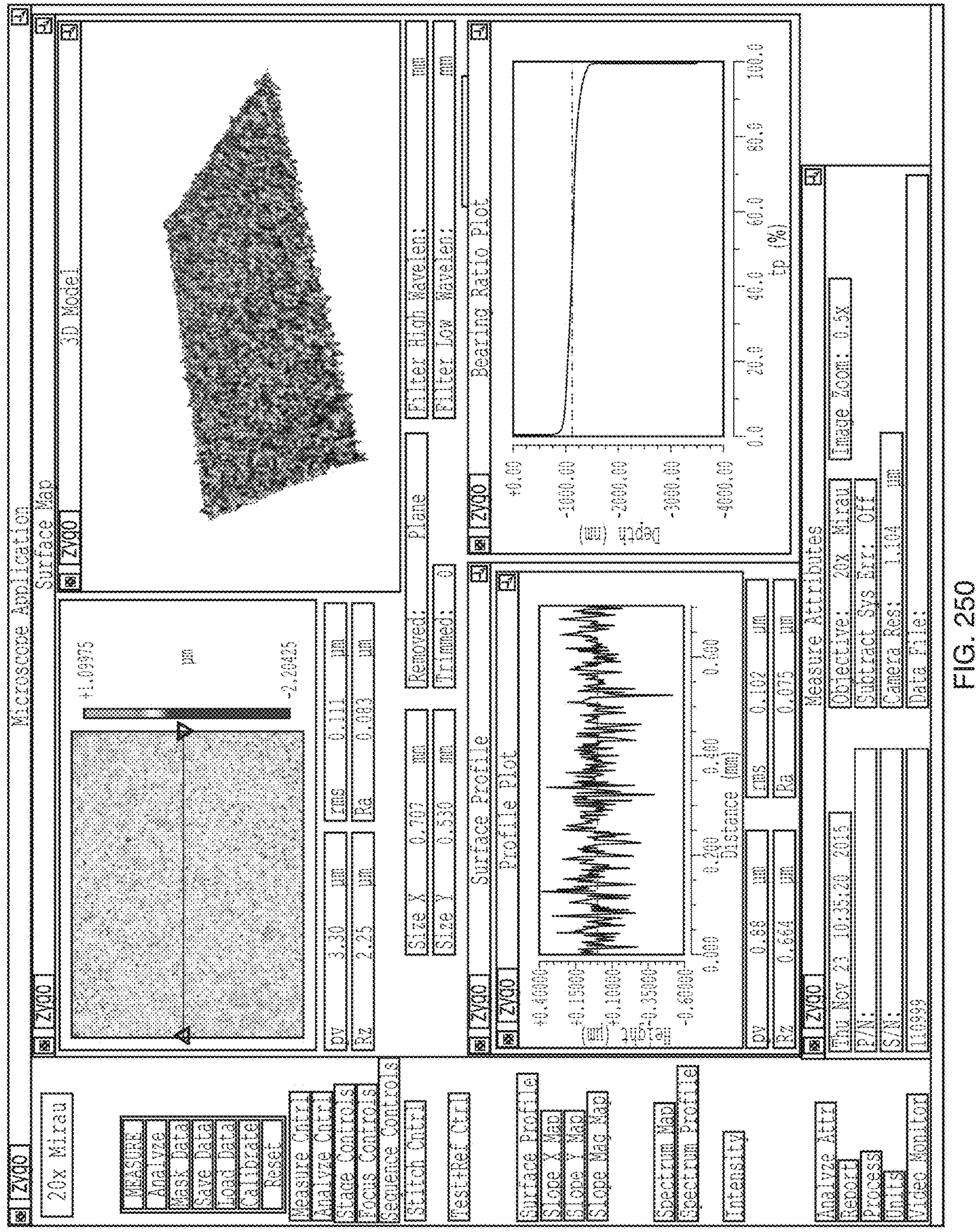

FIG. 250 shows results from optical profiling measurements on sample FIL-01-SPRAY-B-007MEL taken at the bottom, location 2.

Figure 251:
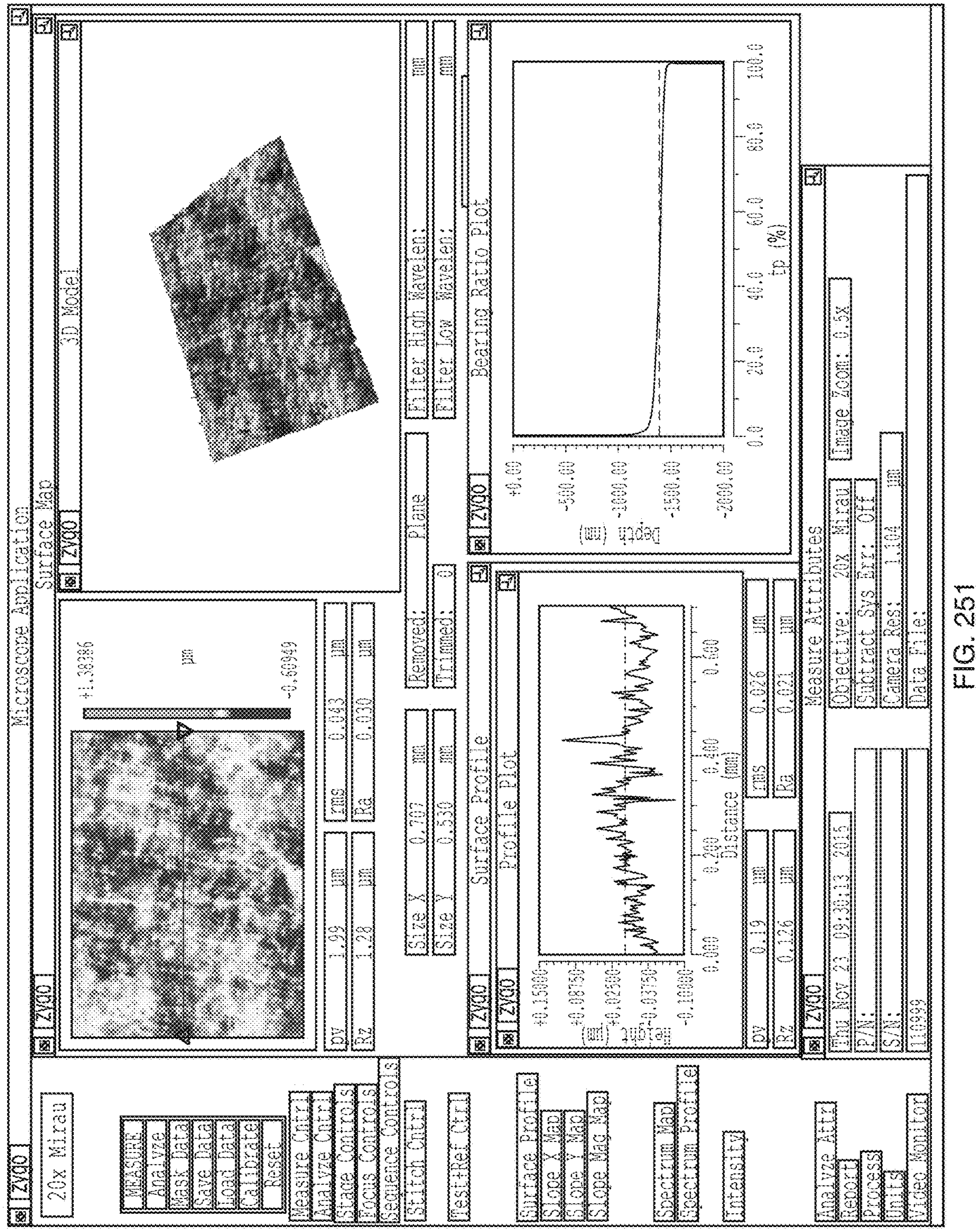

FIG. 251 shows results from optical profiling measurements on sample FIL-01-SPRAY-C-01MYL taken at the top, location 1.

Figure 252:
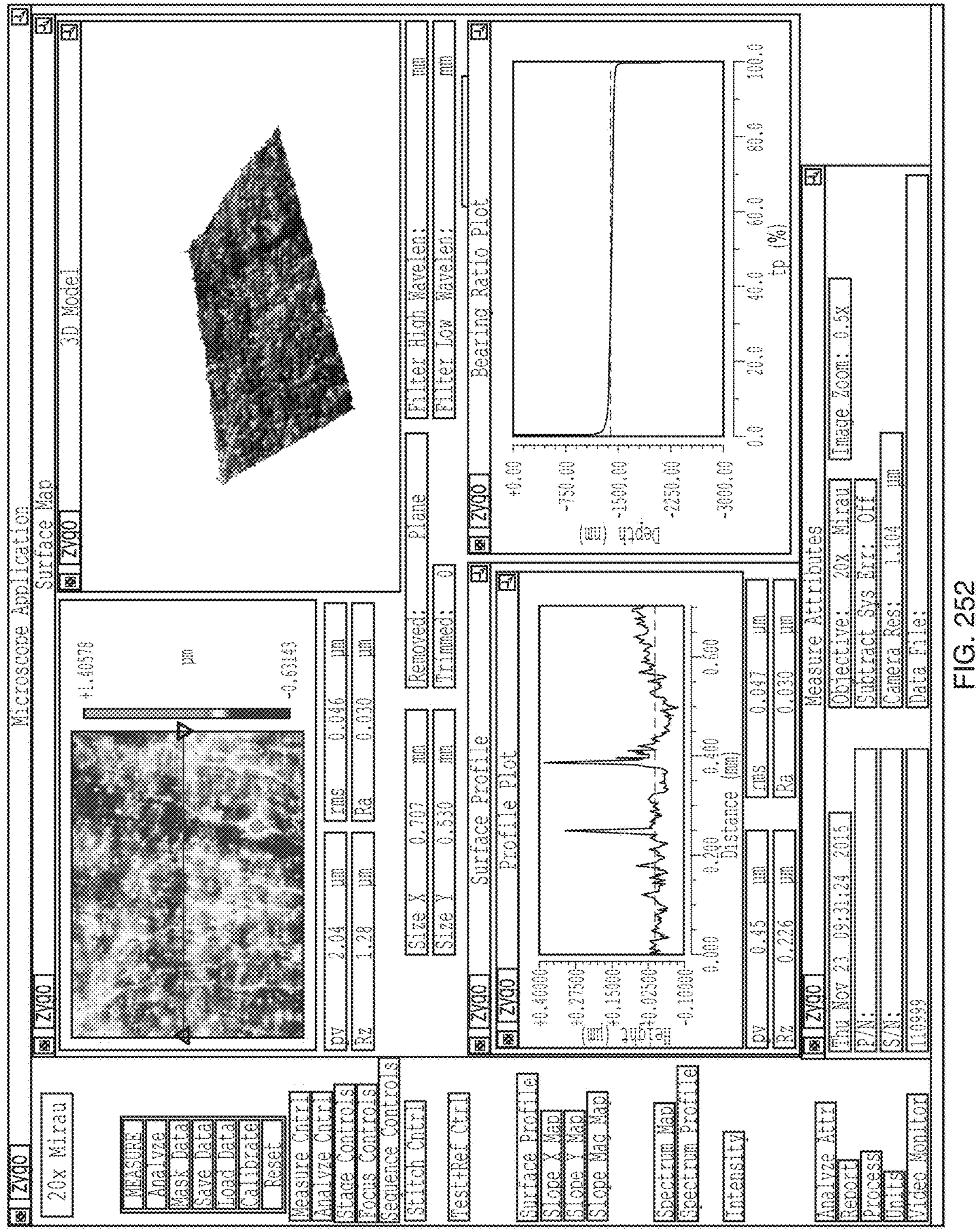

FIG. 252 shows results from optical profiling measurements on sample FIL-01-SPRAY-C-01MYL taken at bottom, location 2

Figure 253:
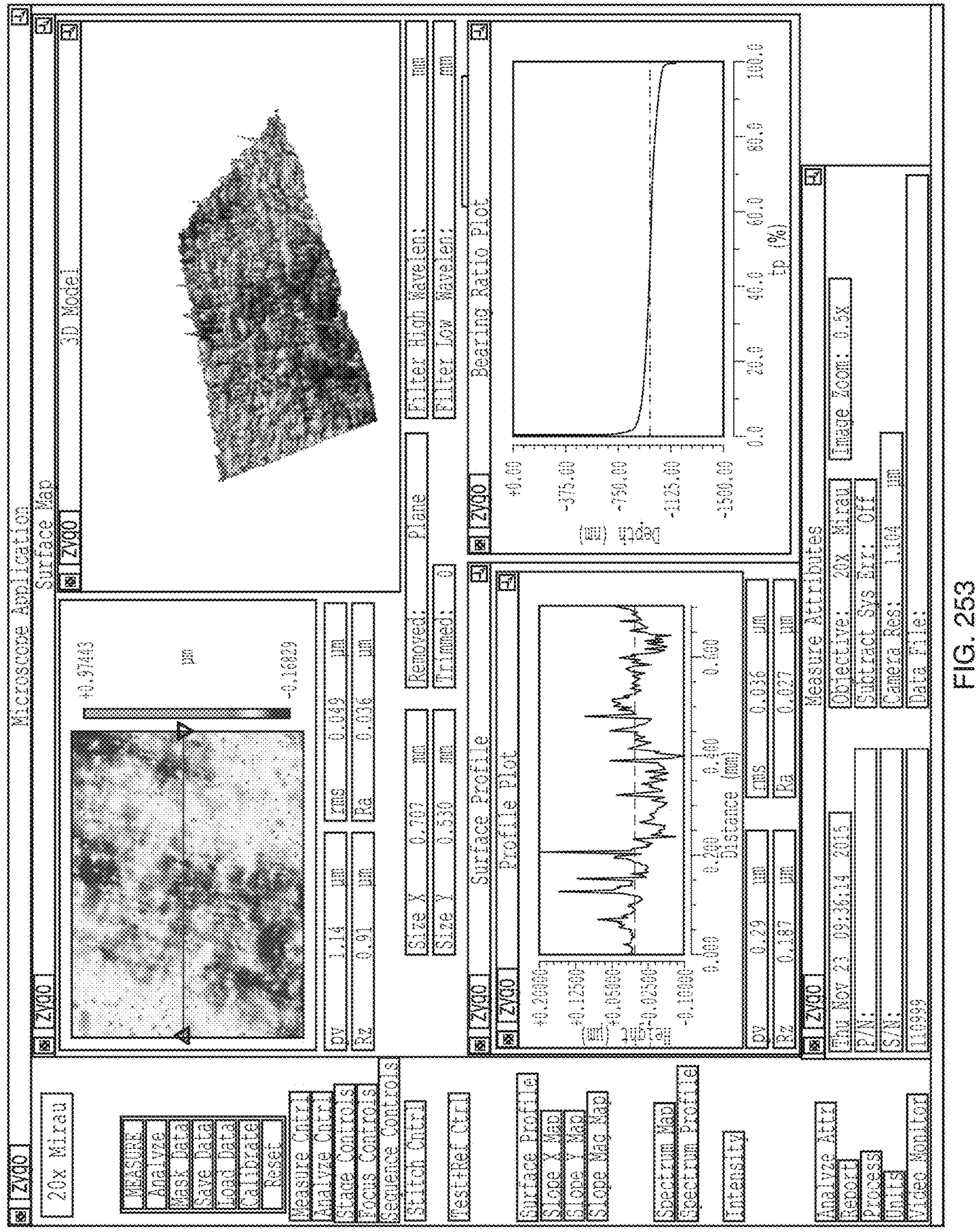

FIG. 253 shows results from optical profiling measurements on sample FIL-01-STEN-B-01MYL taken at the top, location 1.

Figure 254:
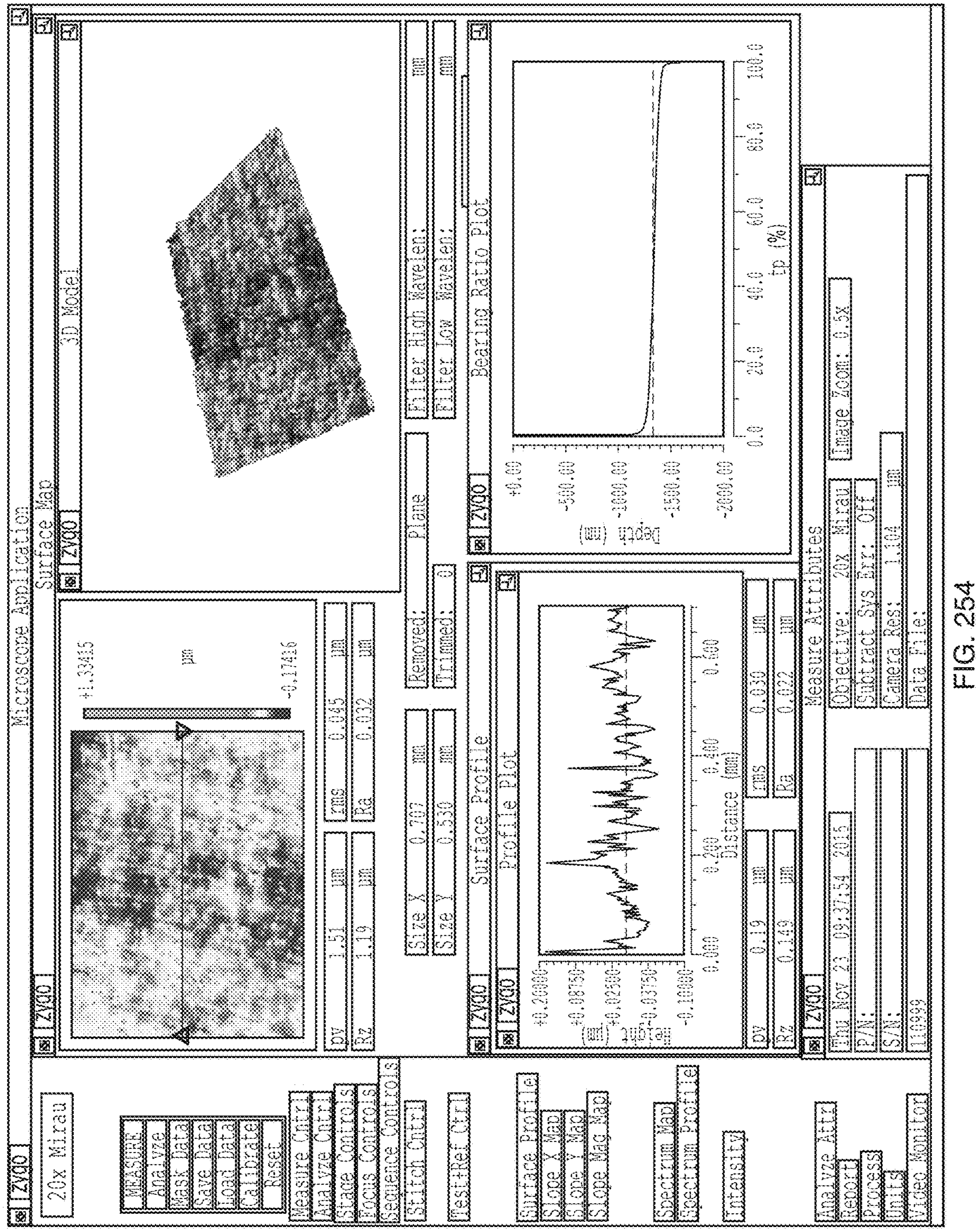

FIG. 254 shows results from optical profiling measurements on sample FIL-01-STEN-B-01MYL taken at the bottom, location 2.

Figure 255:
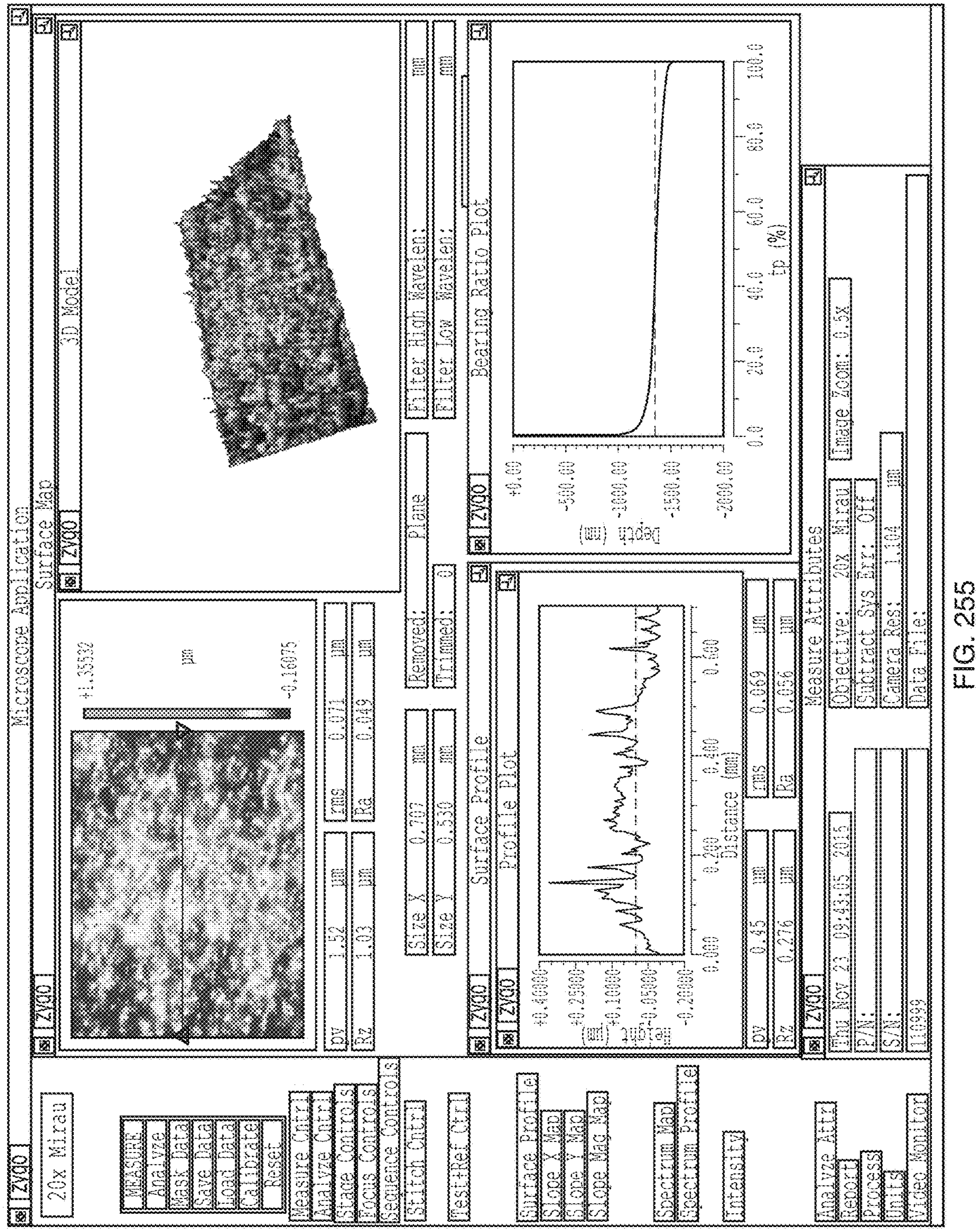

FIG. 255 shows results from optical profiling measurements on sample FIL-01-STEN-C-01MYL taken at the top, location 1.

Figure 256:
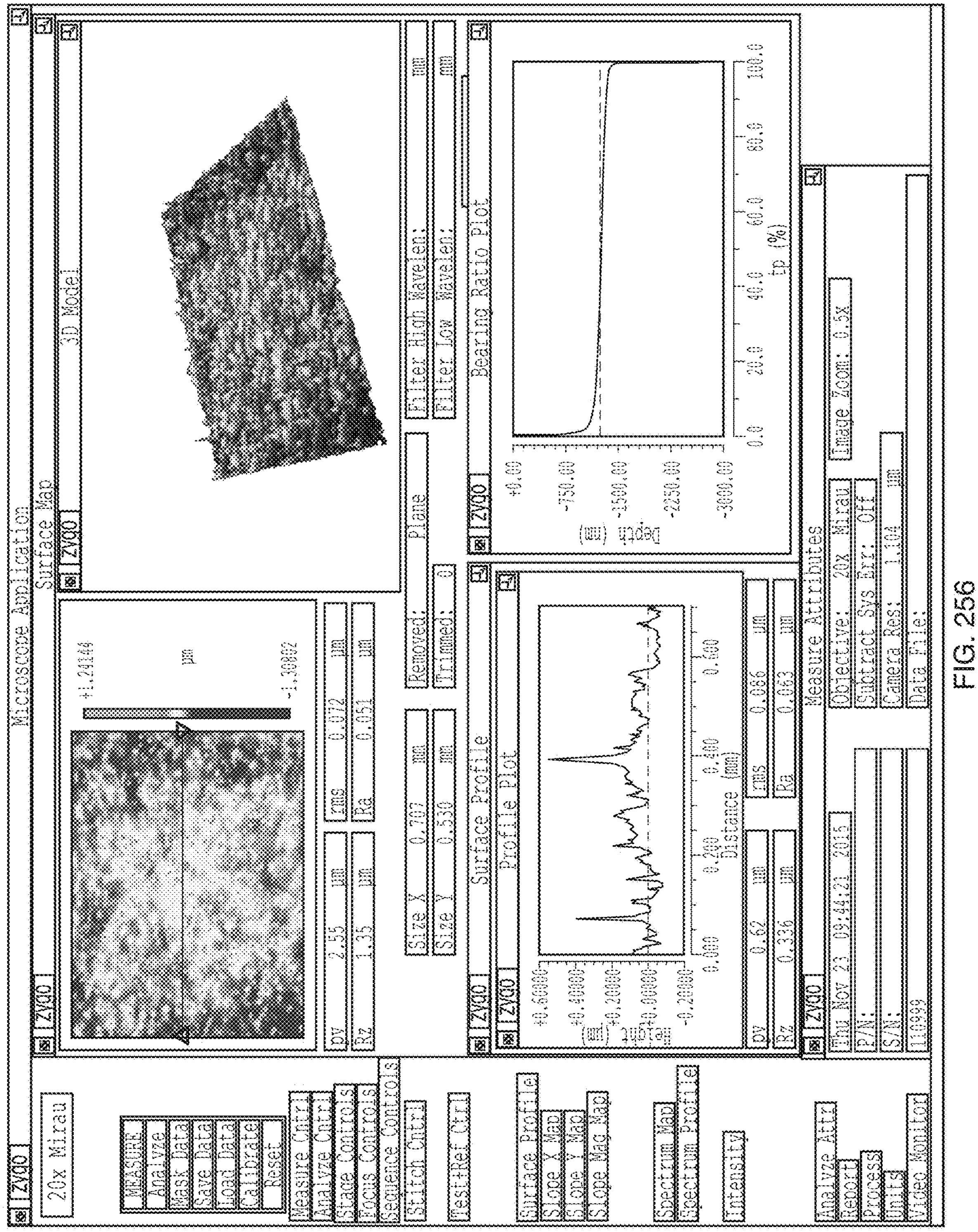

FIG. 256 shows results from optical profiling measurements on sample FIL-01-STEN-C-01MYL taken at the bottom, location 2.

Figure 257:
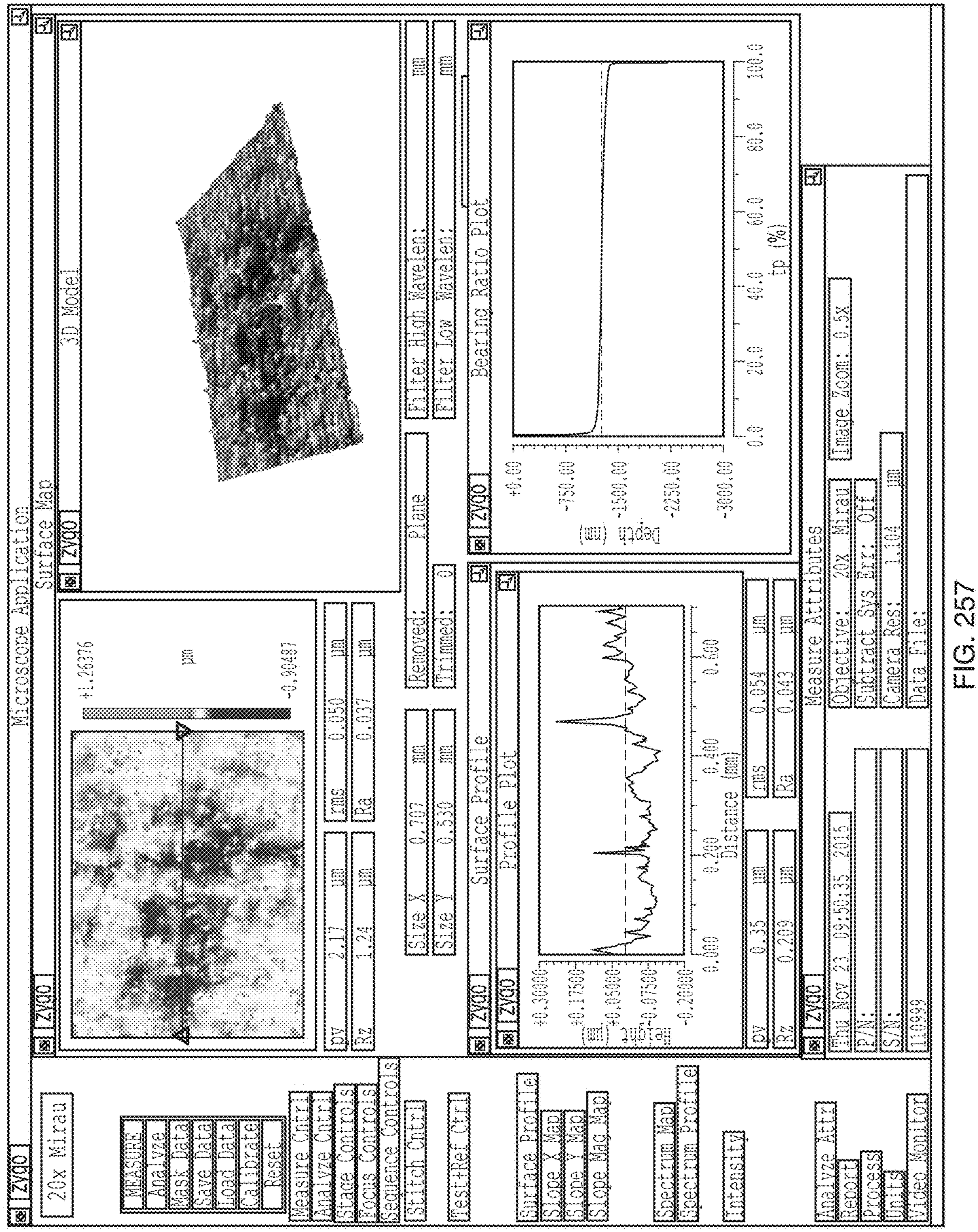

FIG. 257 shows results from optical profiling measurements on sample FIL-10-BATH-B-01MYL taken at the top, location 1.

Figure 258:
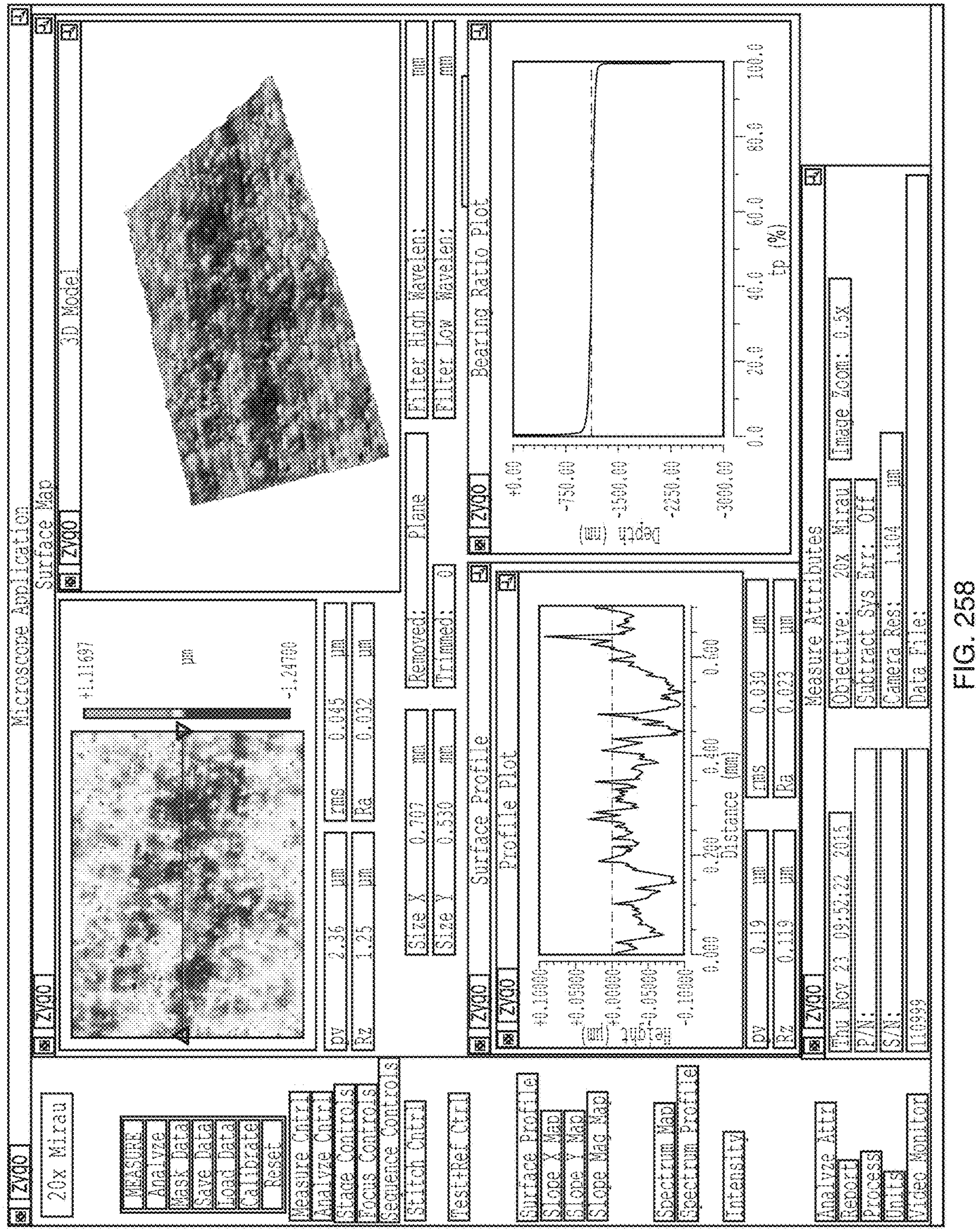

FIG. 258 shows results from optical profiling measurements on sample FIL-10-BATH-B-01MYL taken at the bottom, Location 2.

Figure 259:
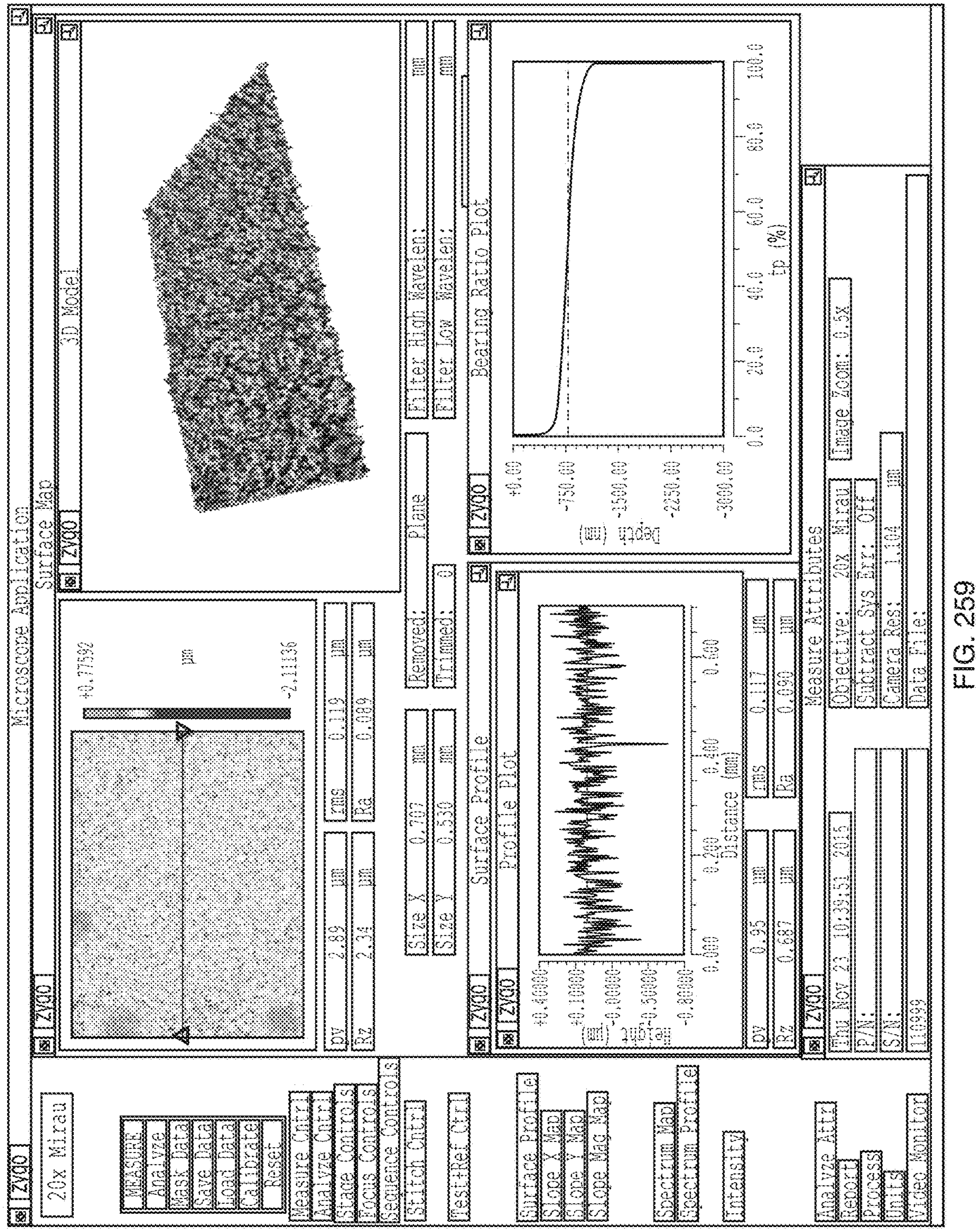

FIG. 259 shows results from optical profiling measurements on sample FIL-10-BATH-B-007MEL taken at the top, location 1.

Figure 260:
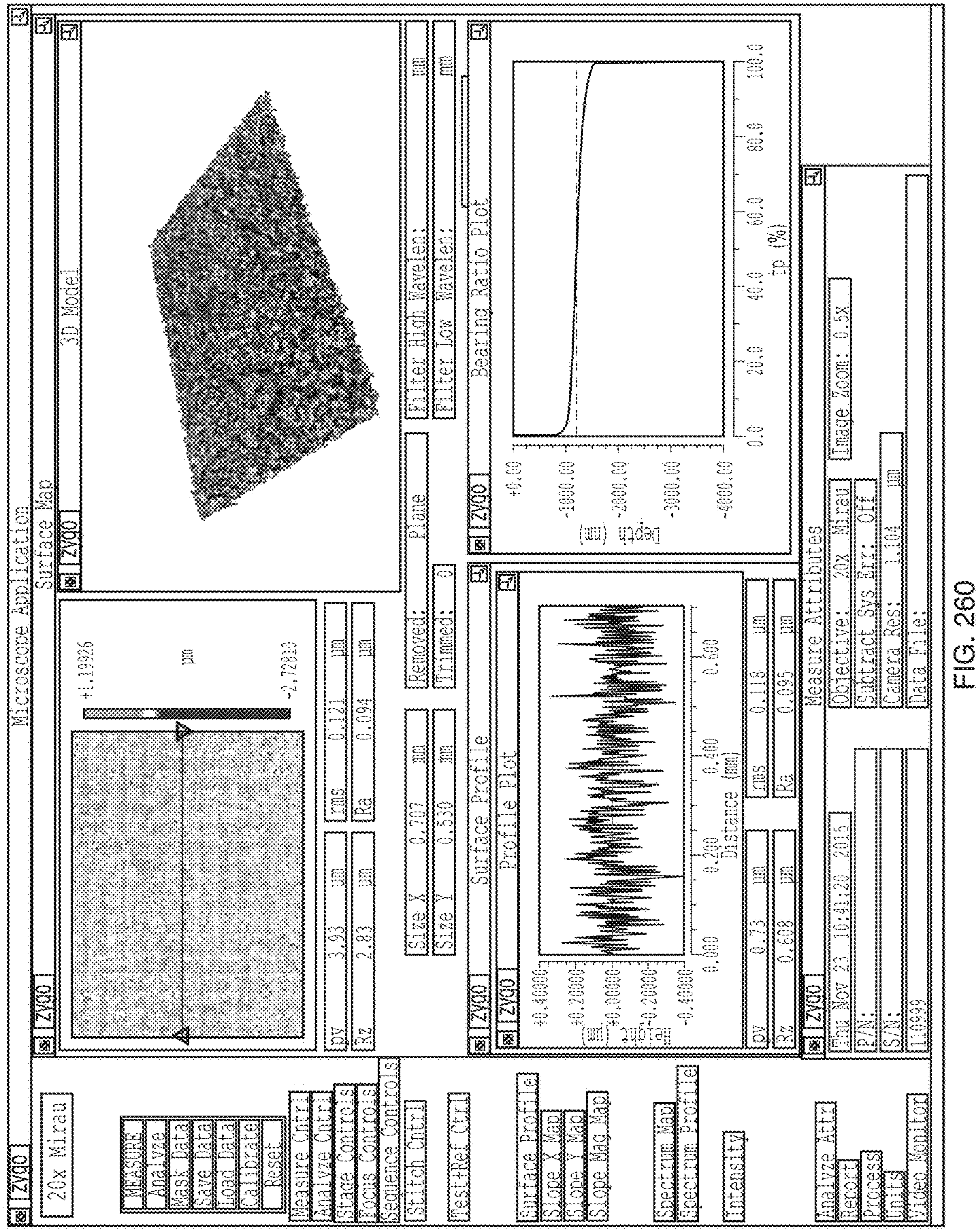

FIG. 260 shows results from optical profiling measurements on sample FIL-10-BATH-B-007MEL taken at the bottom, location 2.

Figure 261:
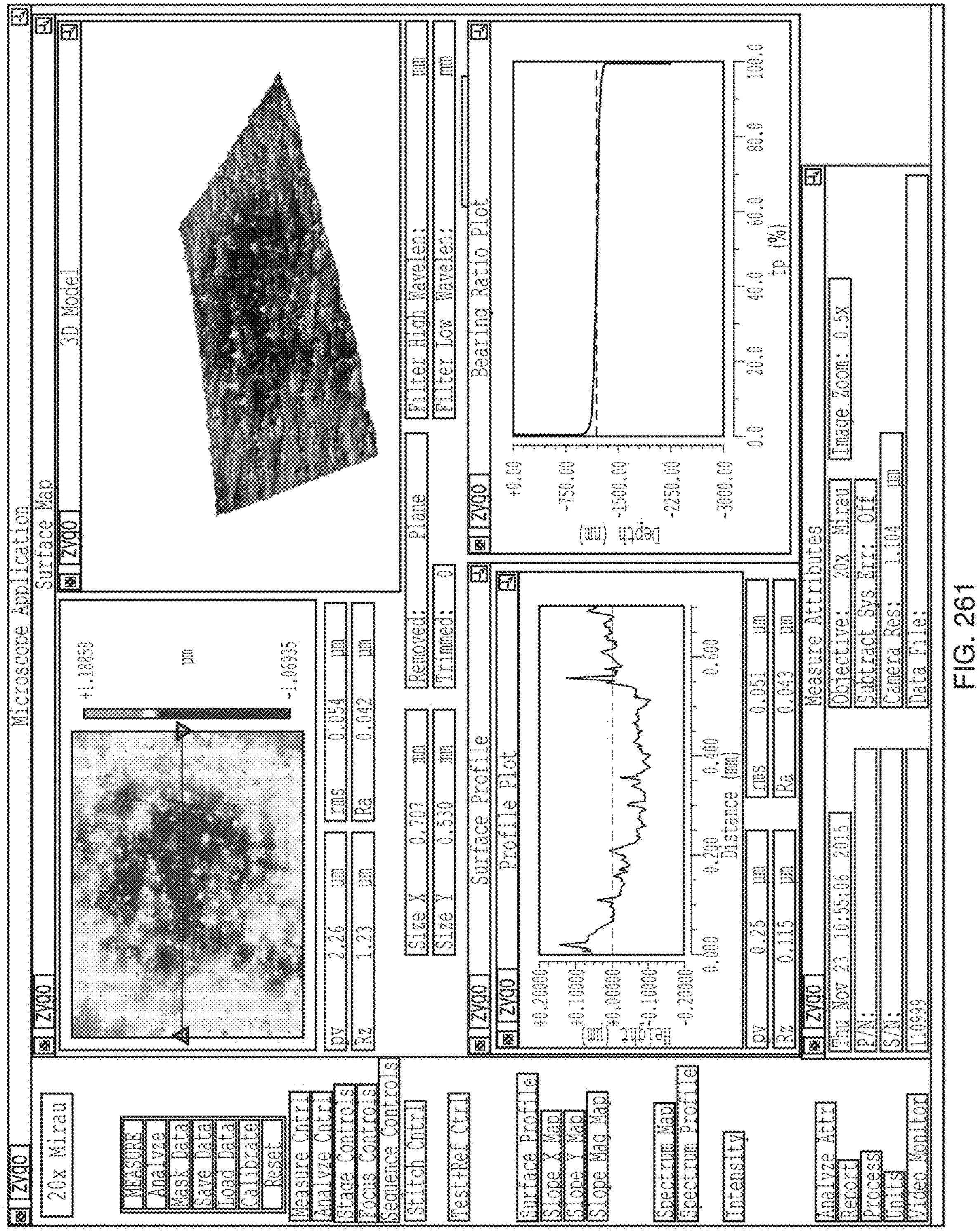

FIG. 261 shows results from optical profiling measurements on sample FIL-10-BATH-C-01MYL taken at top, location 1.

Figure 262:
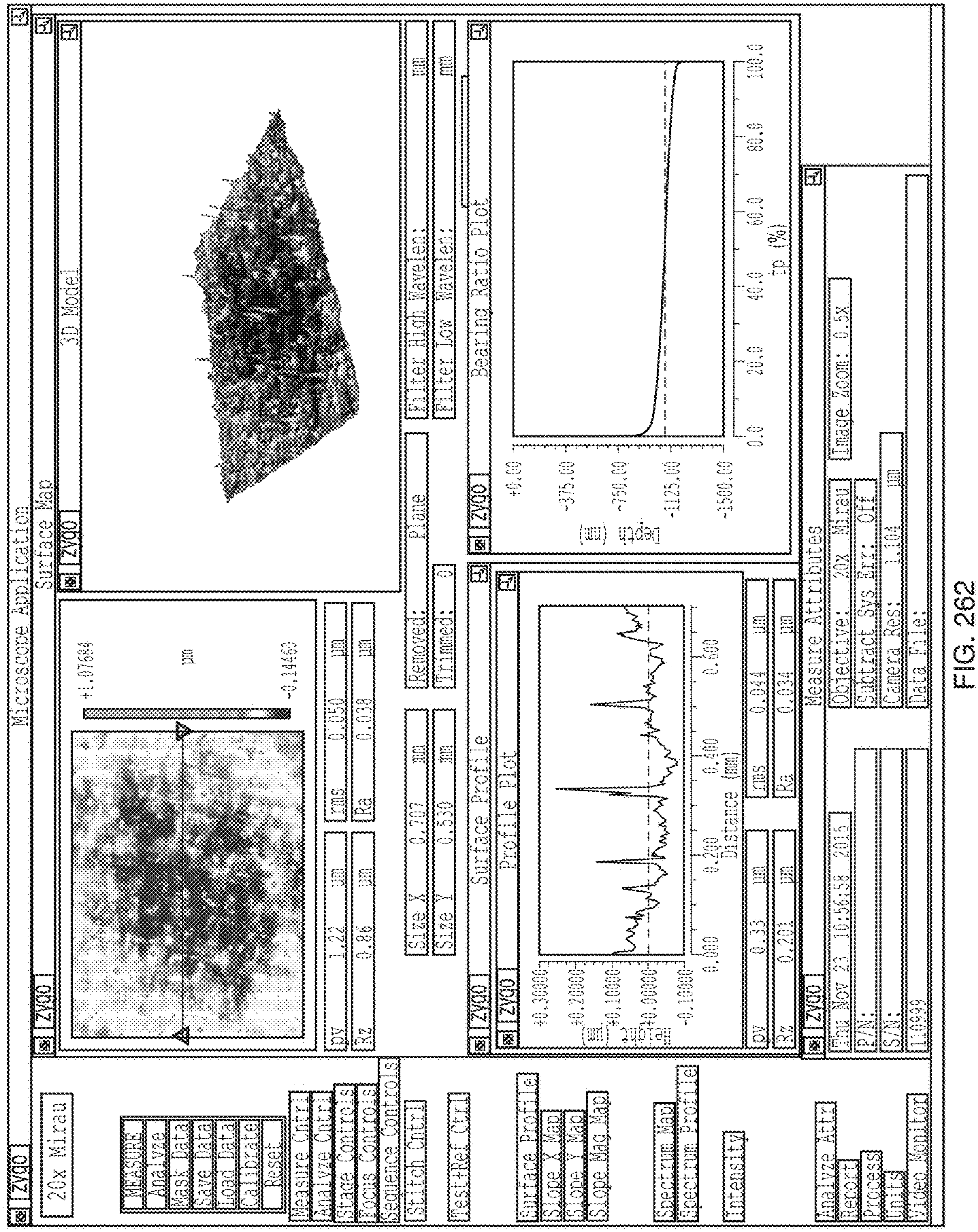

FIG. 262 shows results from optical profiling measurements on sample FIL-10-BATH-C-01MYL taken at the bottom, location 2.

Figure 263:
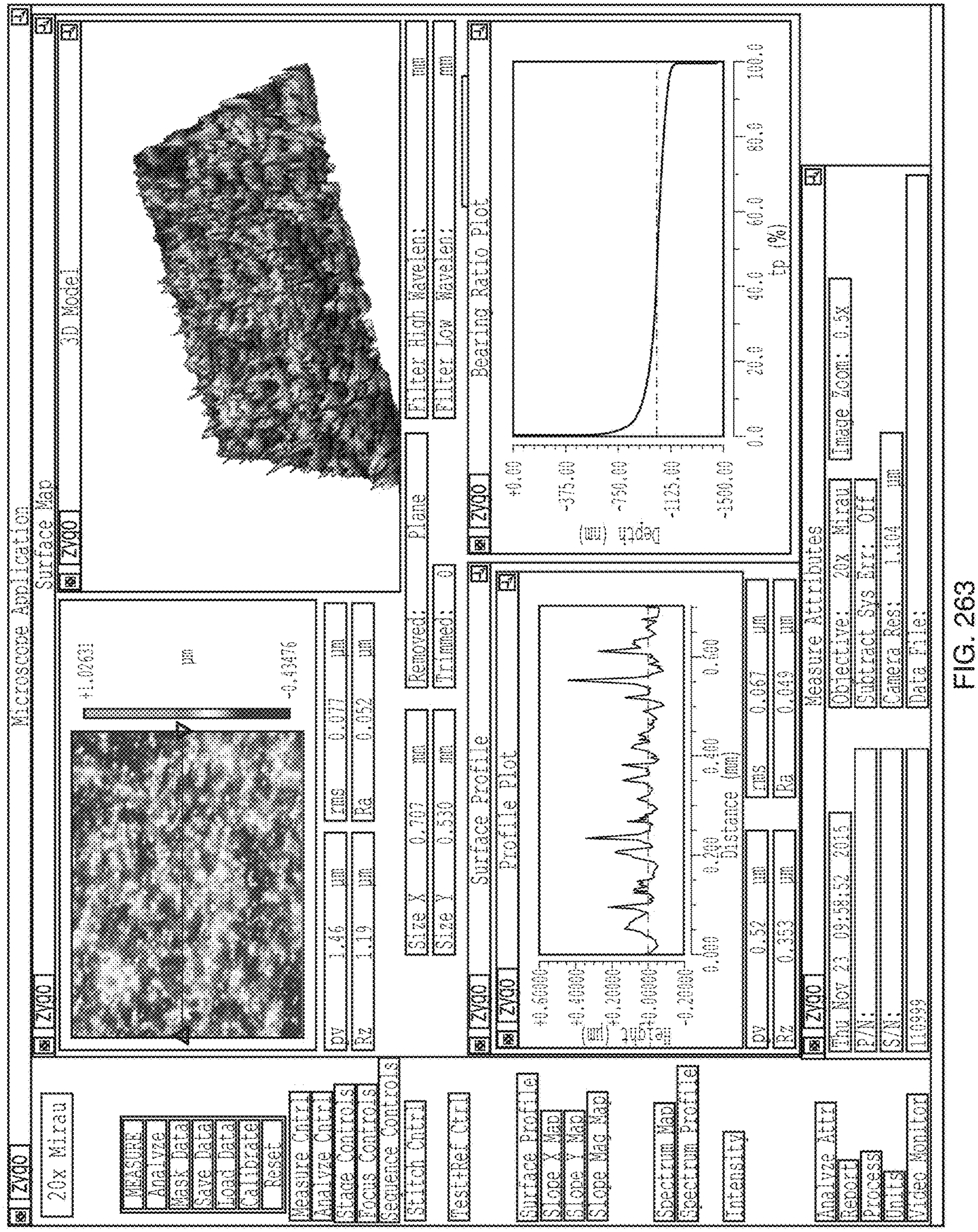

FIG. 263 shows results from optical profiling measurements on sample FIL-01-BATH-B-01MYL taken at the top, location 1.

Figure 264:
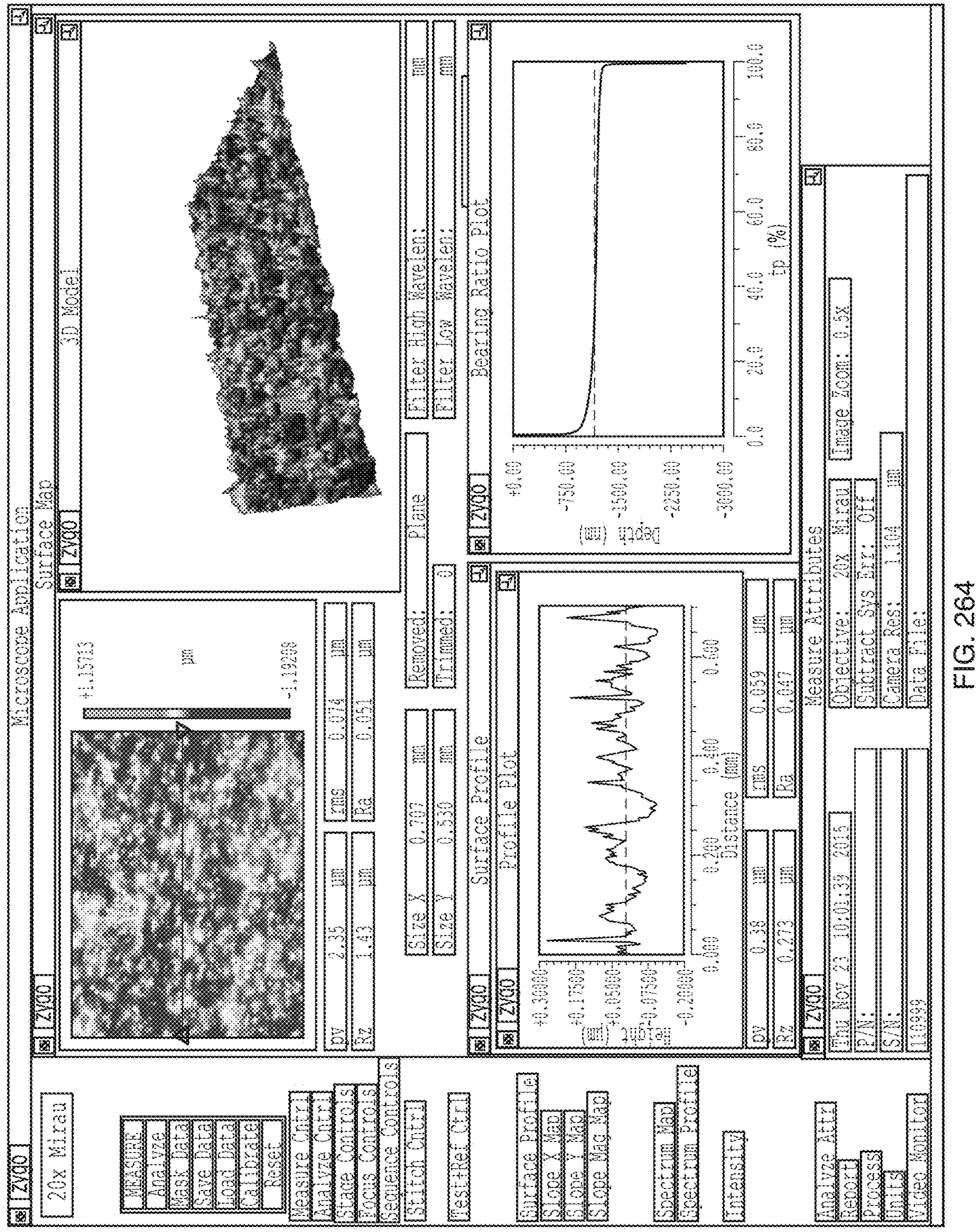

FIG. 264 shows results from optical profiling measurements on sample FIL-01-BATH-B-01MYL taken at the bottom, location 2.

Figure 265:
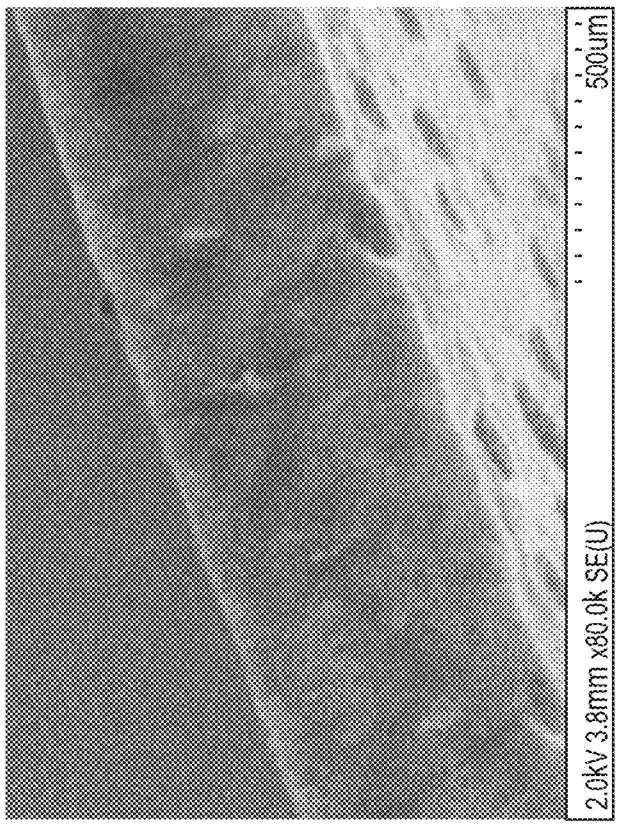

FIG. 265 illustrates a scanning electron microscopy image of film sample FIL-01-SPRAY-B-O1MYL cross-section.

Figure 266:
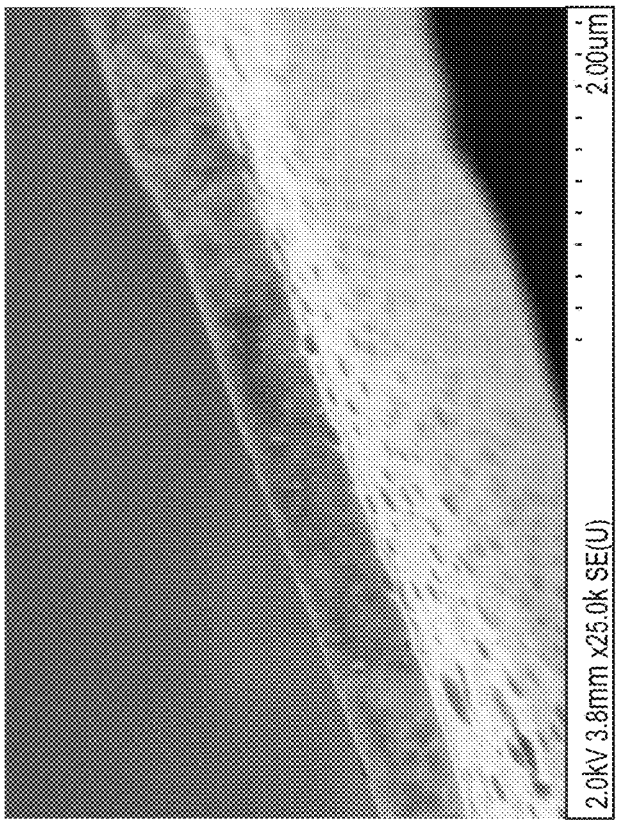

FIG. 266 illustrates a scanning electron microscopy image of film sample FIL-01-SPRAY-B-O1MYL cross-section.

Figure 267:
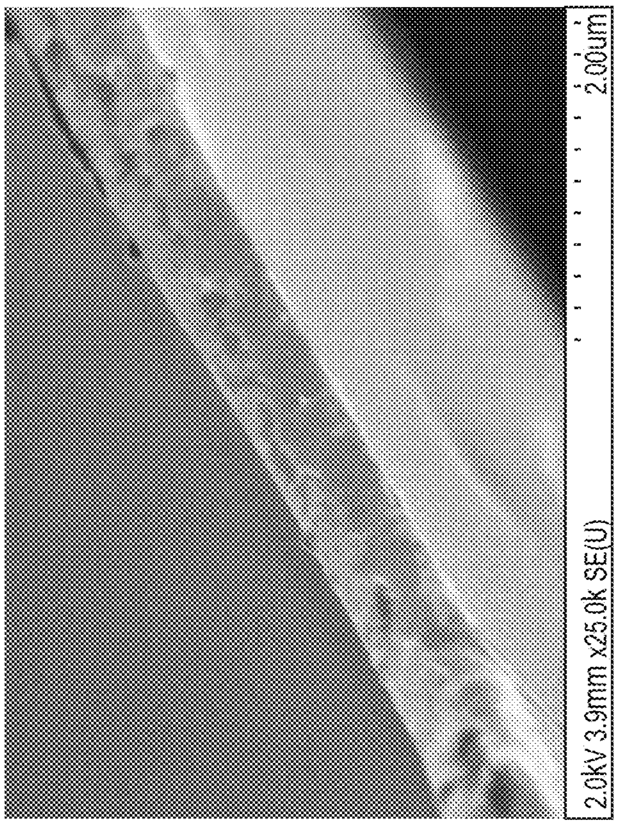

FIG. 267 illustrates a scanning electron microscopy image of film sample FIL-01-SPRAY-B-O1MYL cross-section.

Figure 268:
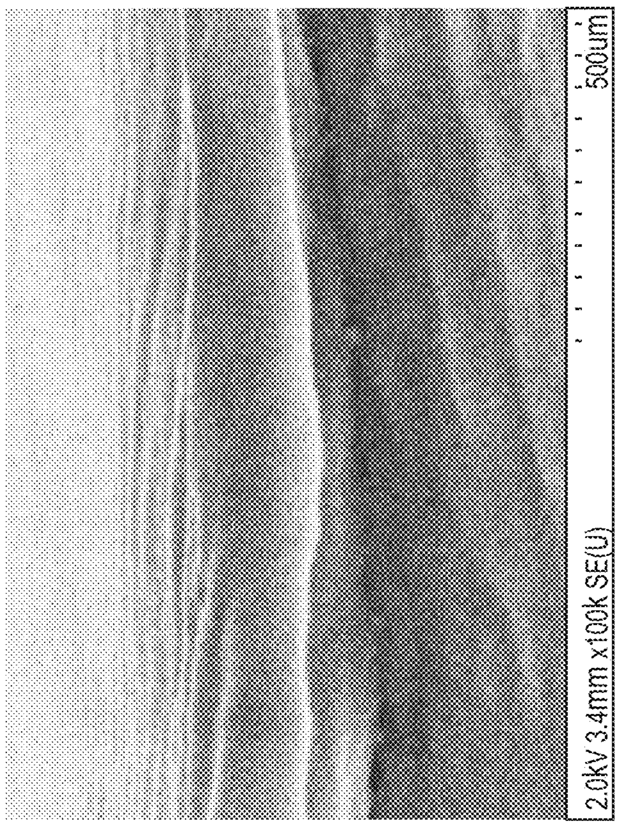

FIG. 268 illustrates a scanning electron microscopy image of film sample FIL-10-BATH-C-01MYL cross-section.

Figure 269:
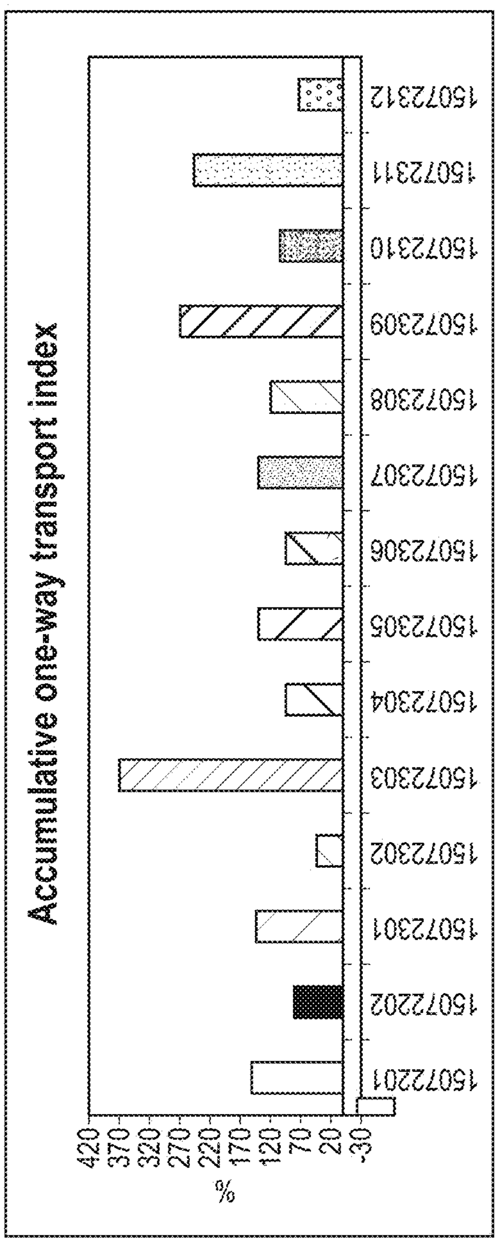

FIG. 269 illustrates accumulative one-way transport index results for natural fibers.

Figure 270:
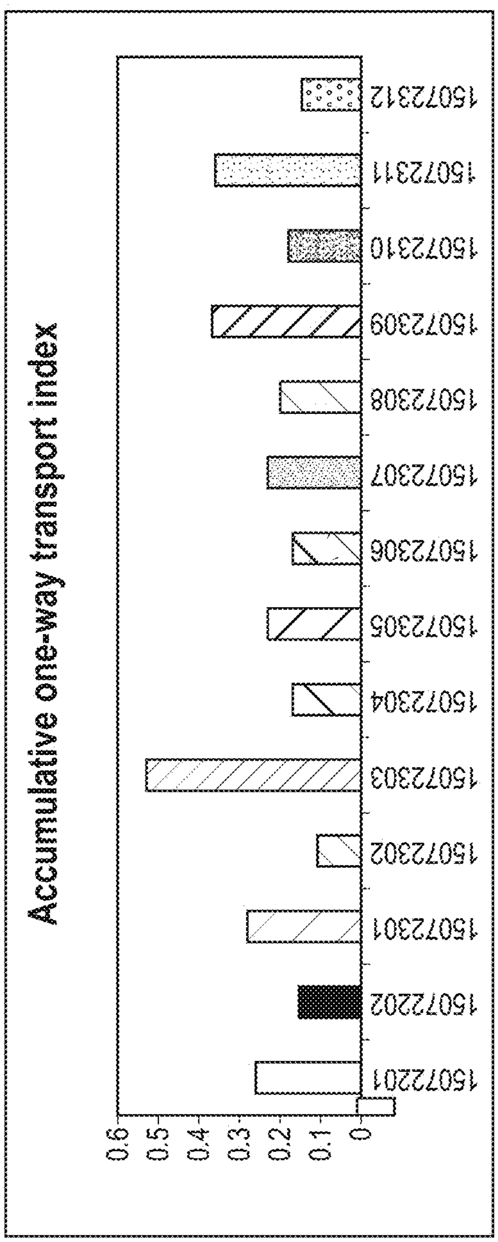

FIG. 270 illustrates overall moisture management capability for natural fibers.

Figure 271:
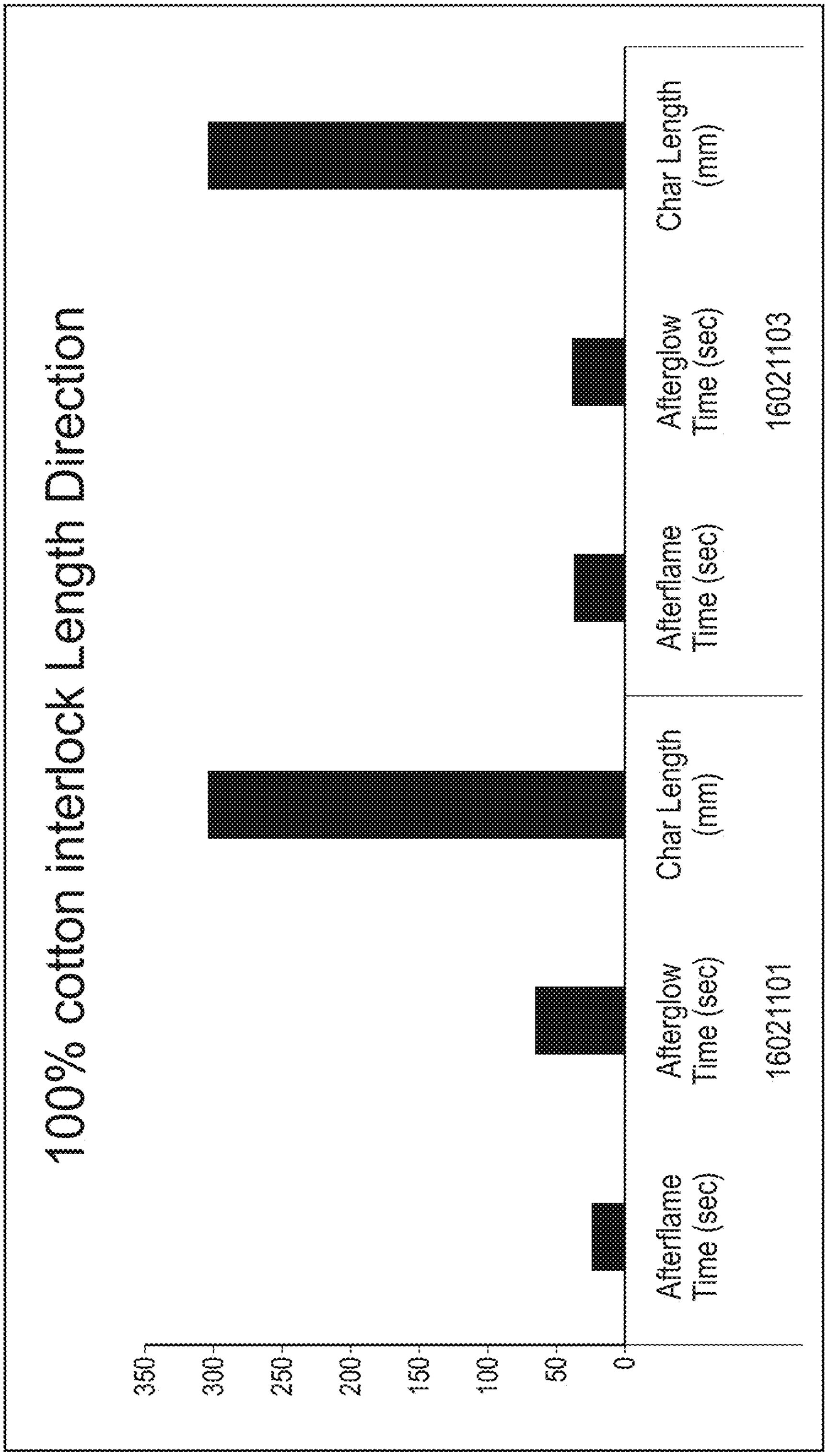

FIG. 271 illustrates flammability test results for a cotton interlock fabric with (16021103) and without (16021101) coating with 1% silk fibroin solution.

Figure 272:
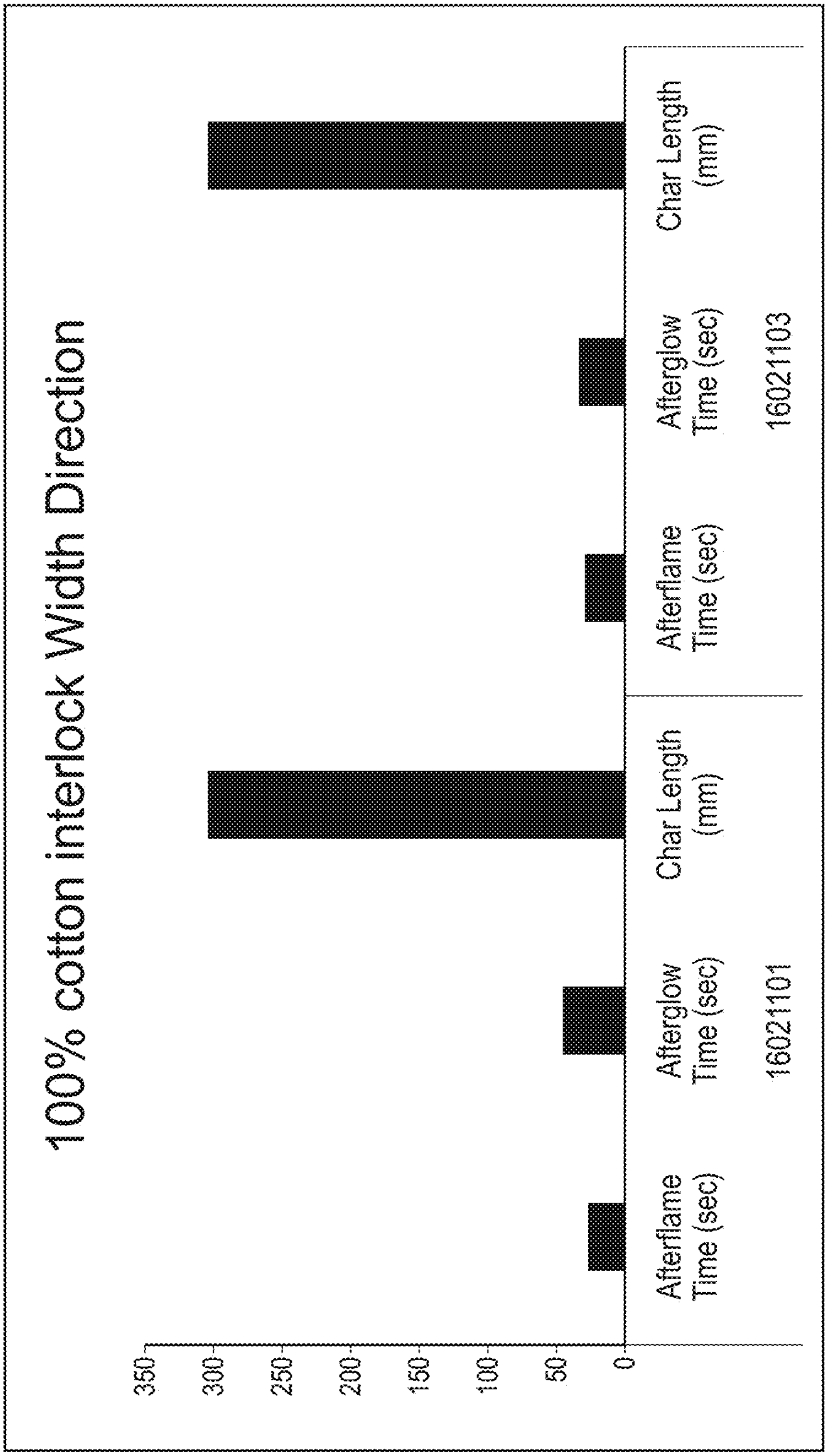

FIG. 272 illustrates flammability test results for a cotton interlock fabric with (16021103) and without (16021101) coating with 1% silk fibroin solution.

Figure 273:
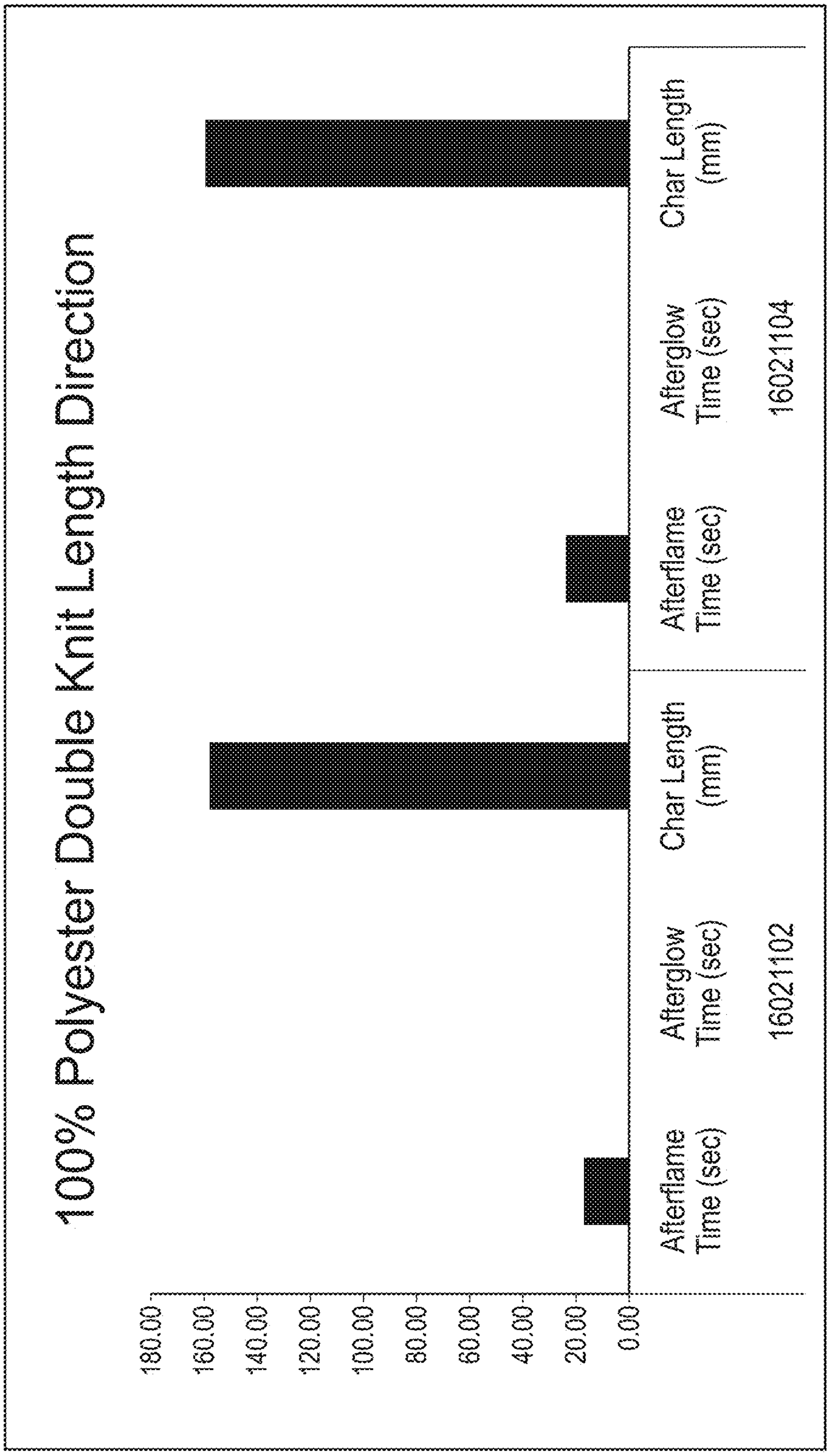

FIG. 273 illustrates flammability test results for a polyester double knit fabric with (16021104) and without (16021102) coating with 1% silk fibroin solution.

Figure 274:
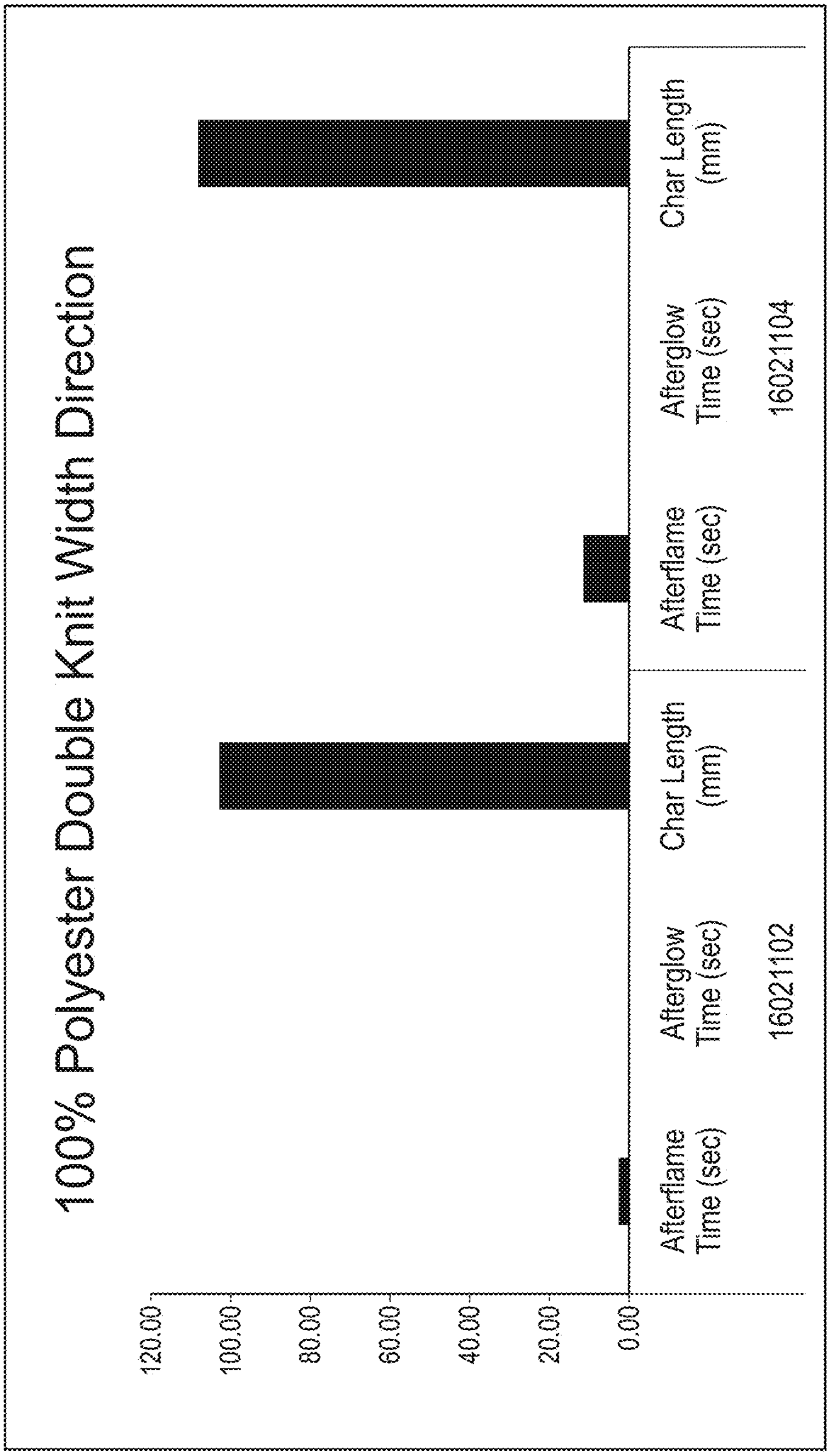

FIG. 274 illustrates flammability test results for a polyester double knit fabric with (16021104) and without (16021102) coating with 1% silk fibroin solution.

Figure 275:
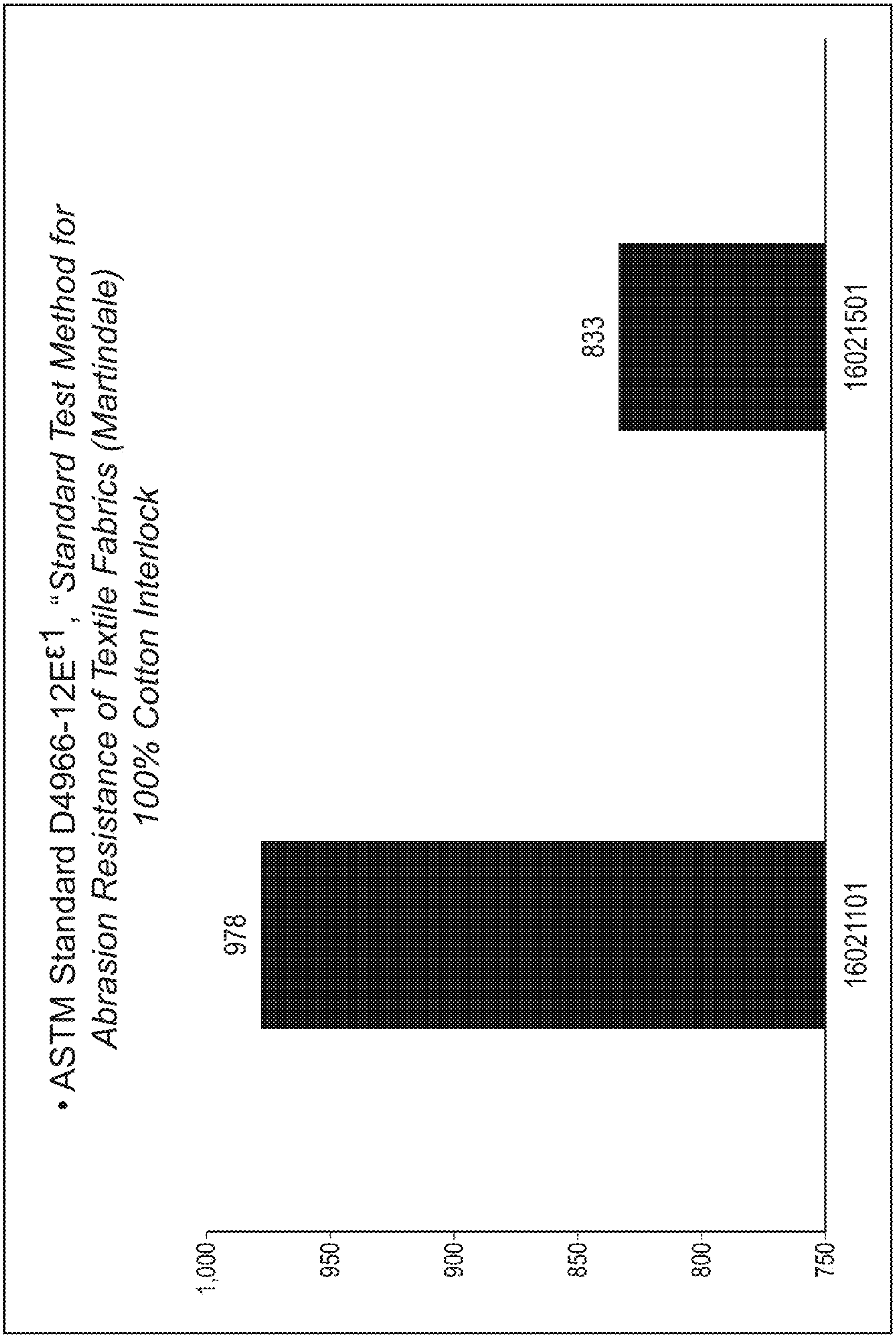

FIG. 275 illustrates abrasion test results for a cotton interlock fabric with (16021501) and without (16021101) coating with 1% silk fibroin solution.

Figure 276:
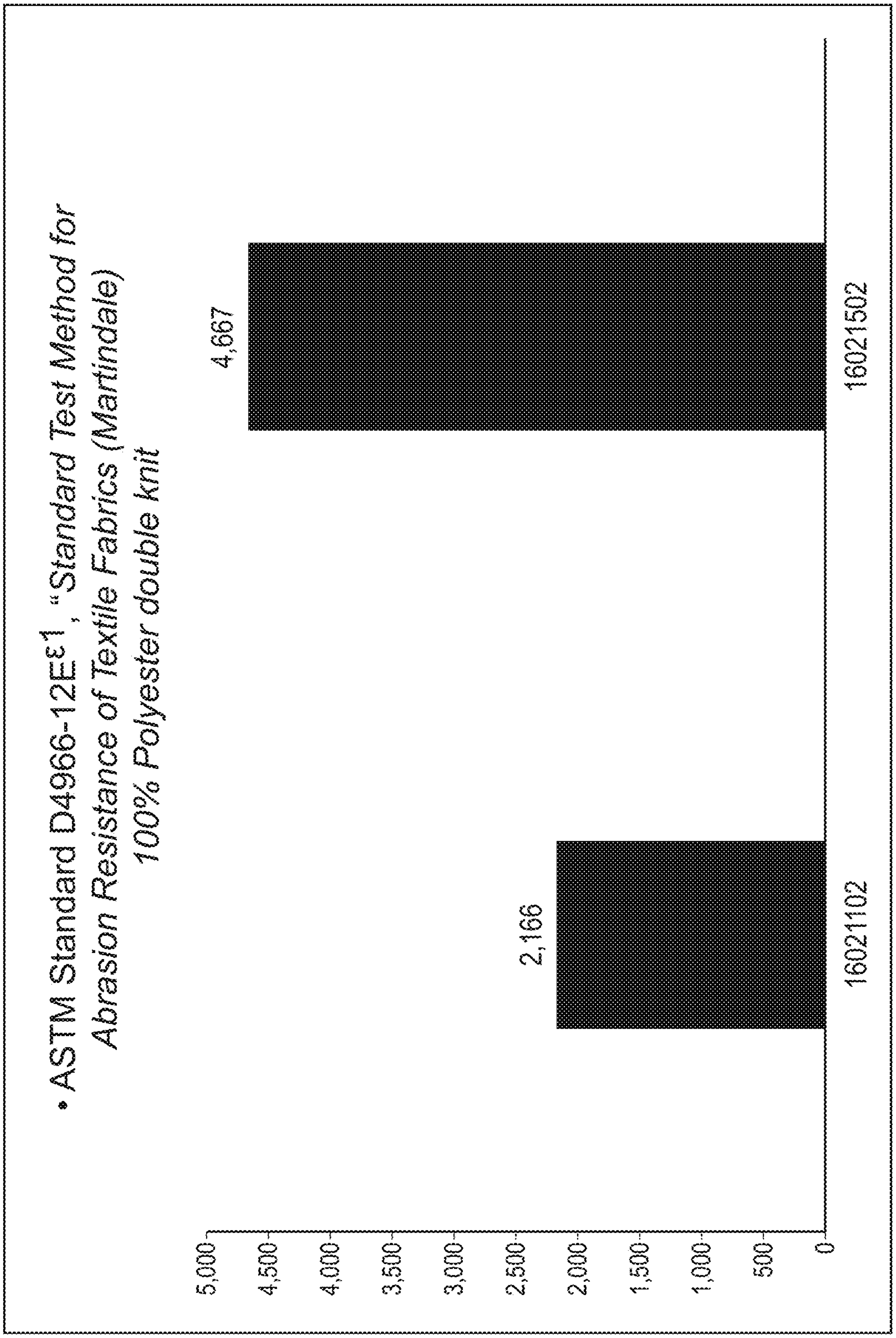

FIG. 276 illustrates abrasion test results for a polyester double knit fabric with (16021502) and without (16021102) coating with 1% silk fibroin solution.

Figure 277:
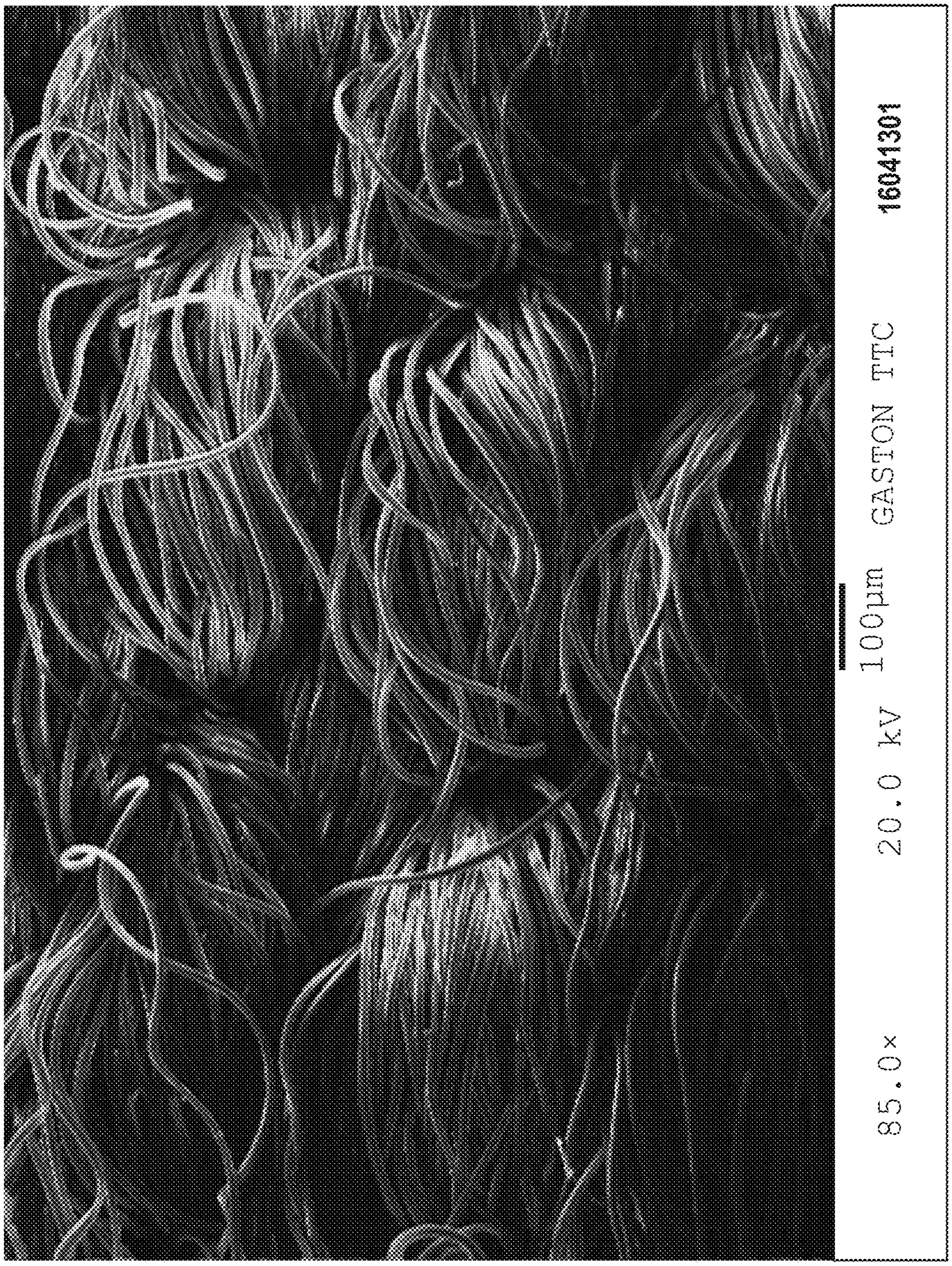

FIG. 277 illustrates a scanning electron microscope image of sample 16041301.

Figure 278:
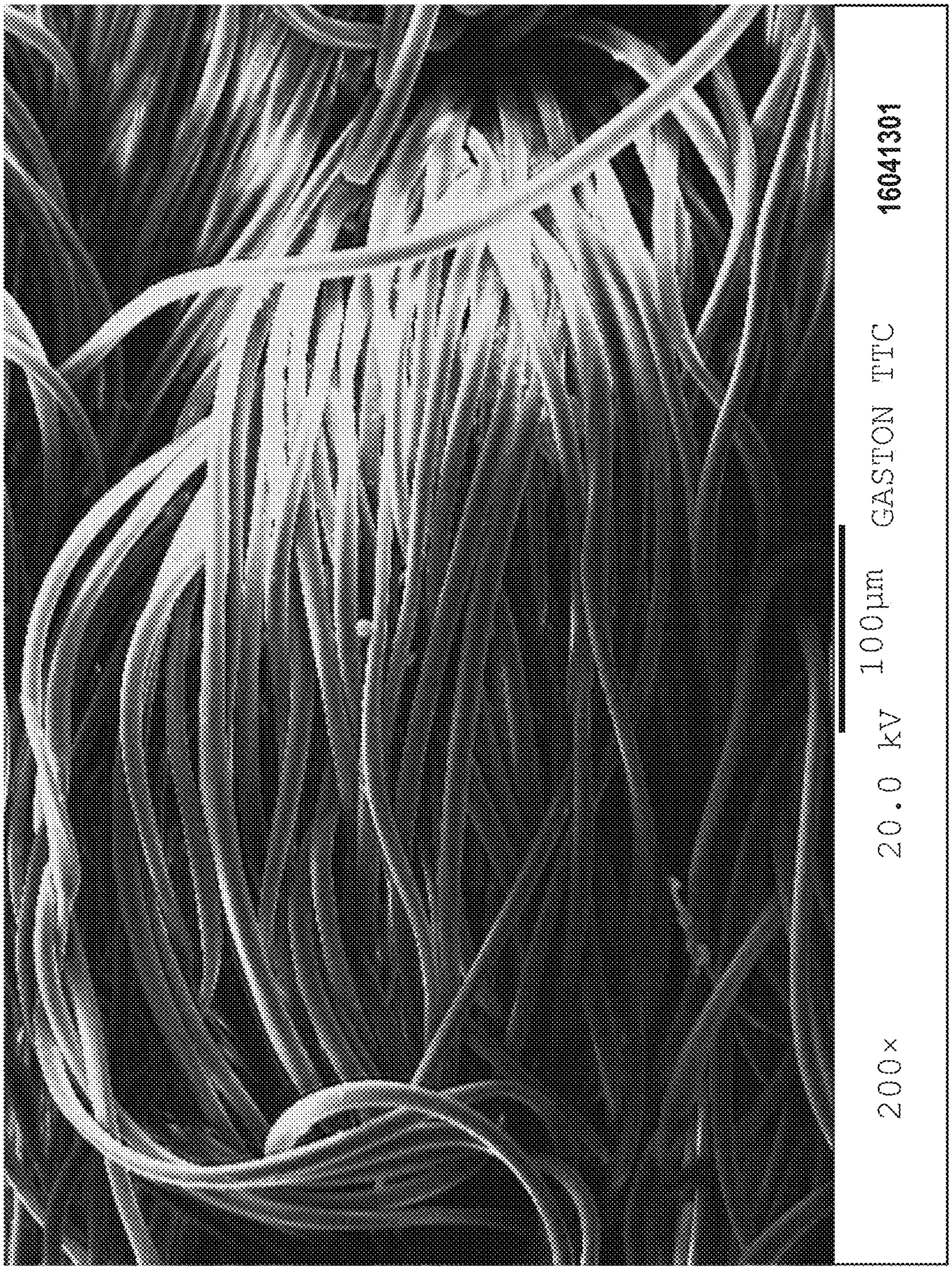

FIG. 278 illustrates a scanning electron microscope image of sample 16041301.

Figure 279:
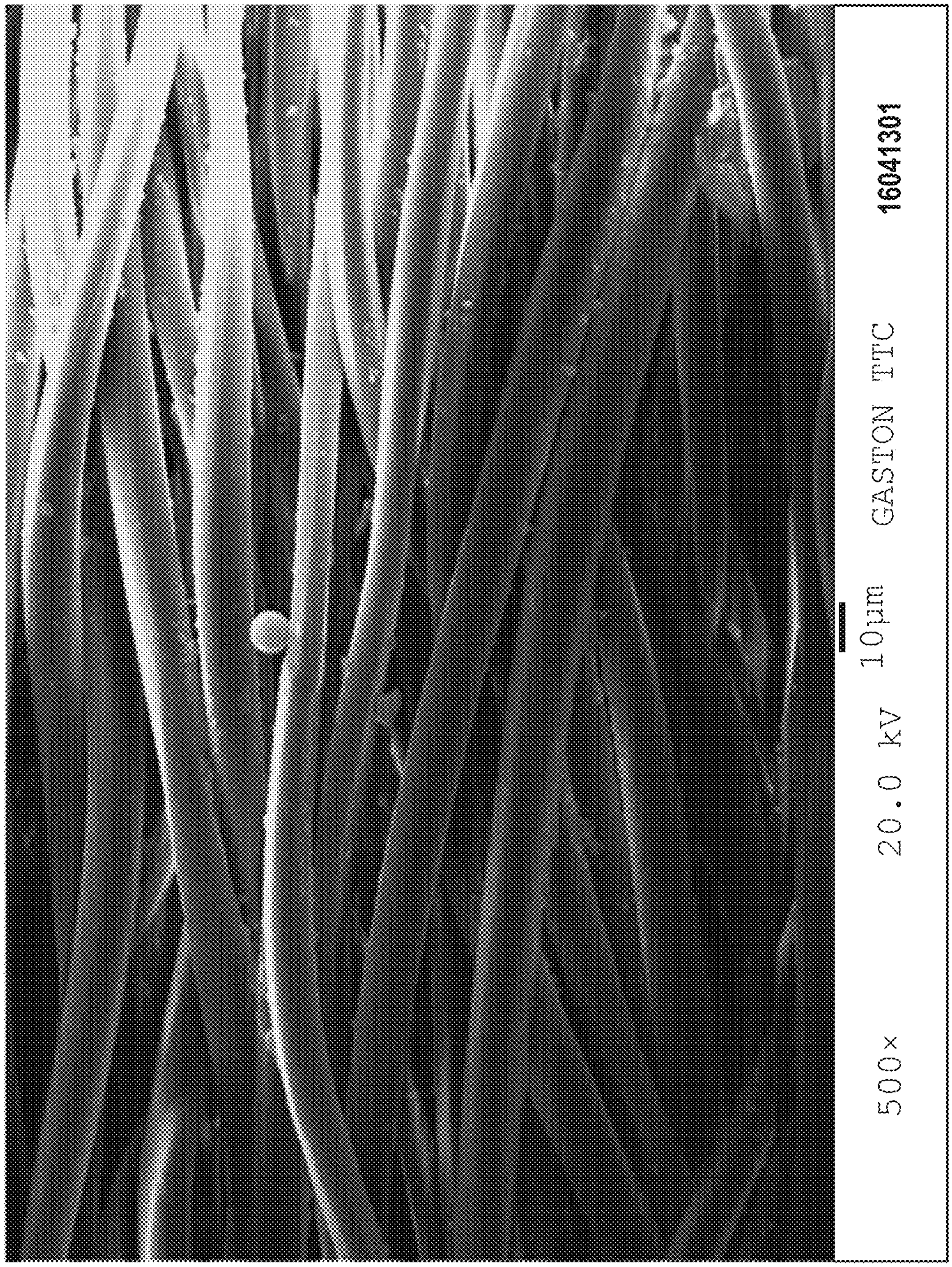

FIG. 279 illustrates a scanning electron microscope image of sample 16041301.

Figure 280:

FIG. 280 illustrates a scanning electron microscope image of sample 16041301.

Figure 281:
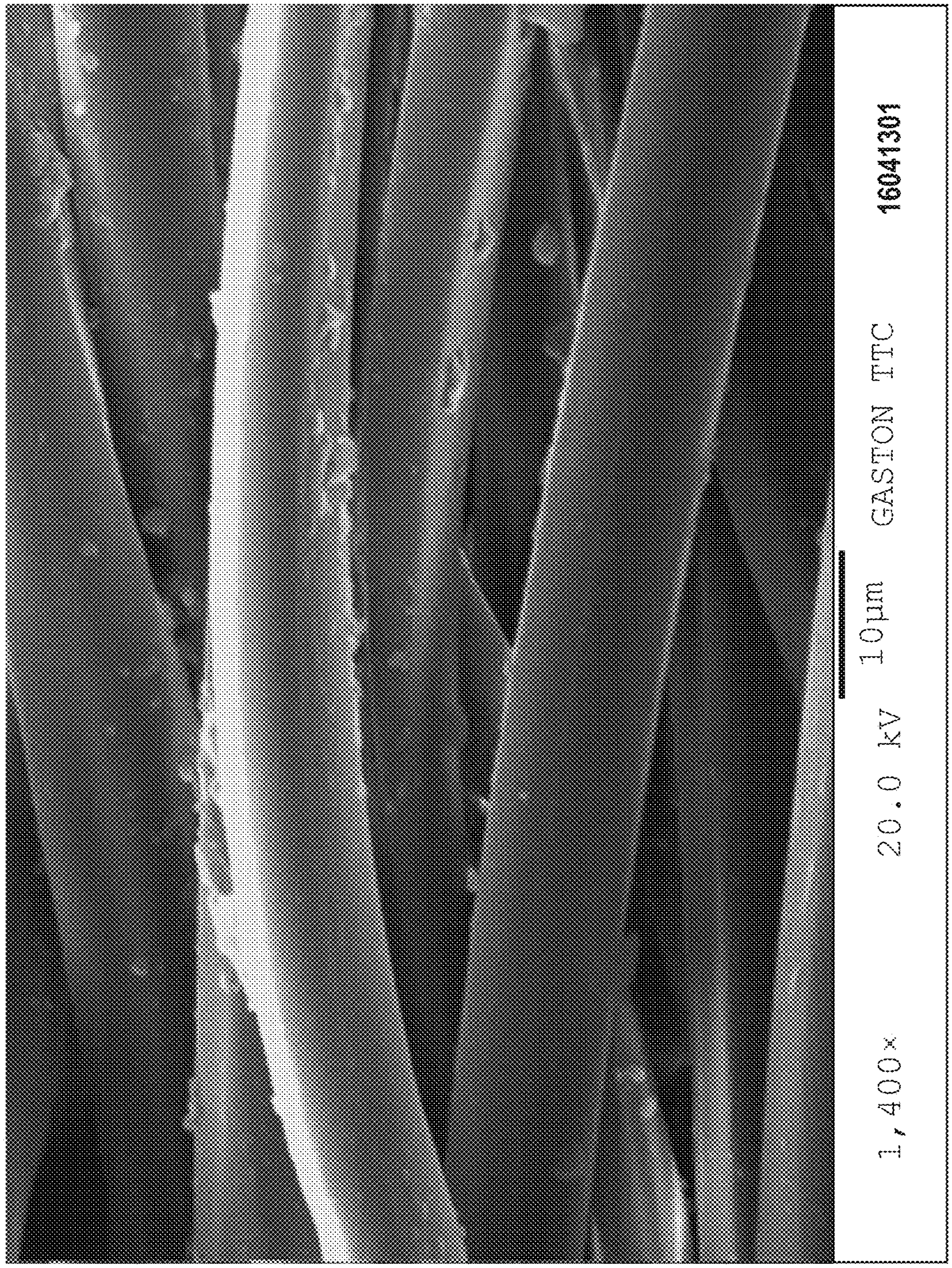

FIG. 281 illustrates a scanning electron microscope image of sample 16041301.

Figure 282:
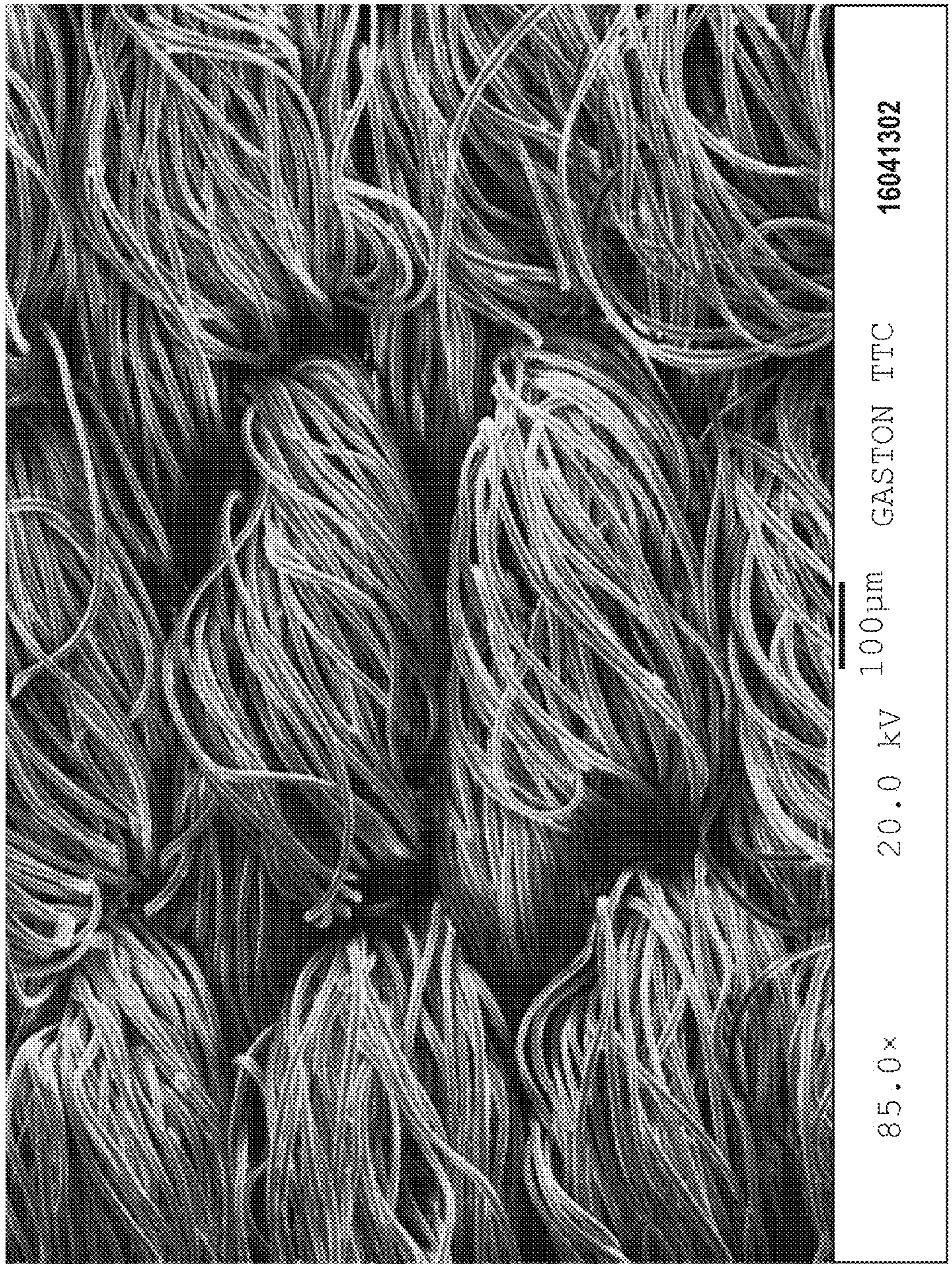

FIG. 282 illustrates a scanning electron microscope image of sample 16041302.

Figure 283:

FIG. 283 illustrates a scanning electron microscope image of sample 16041302.

Figure 284:
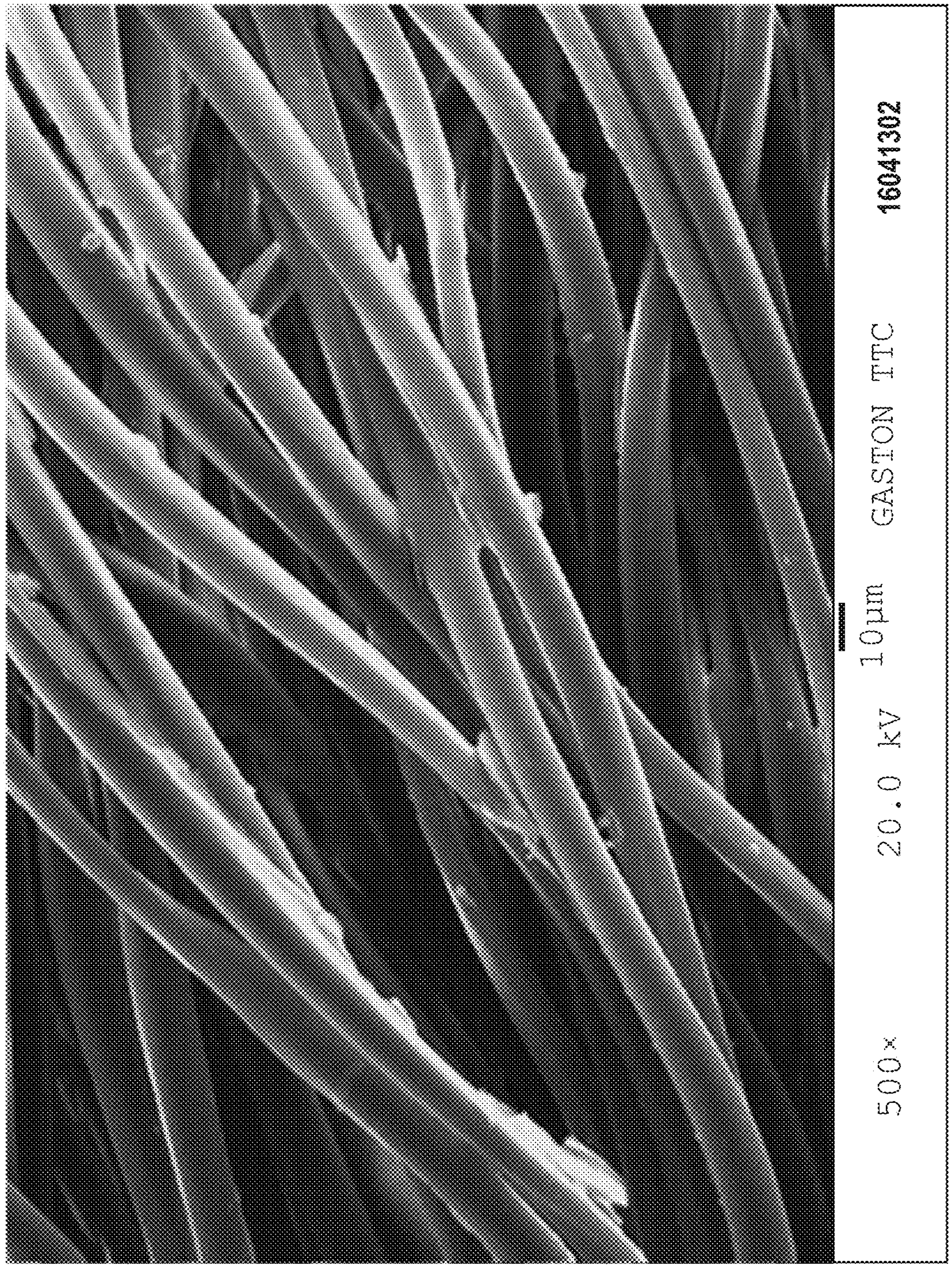

FIG. 284 illustrates a scanning electron microscope image of sample 16041302.

Figure 285:
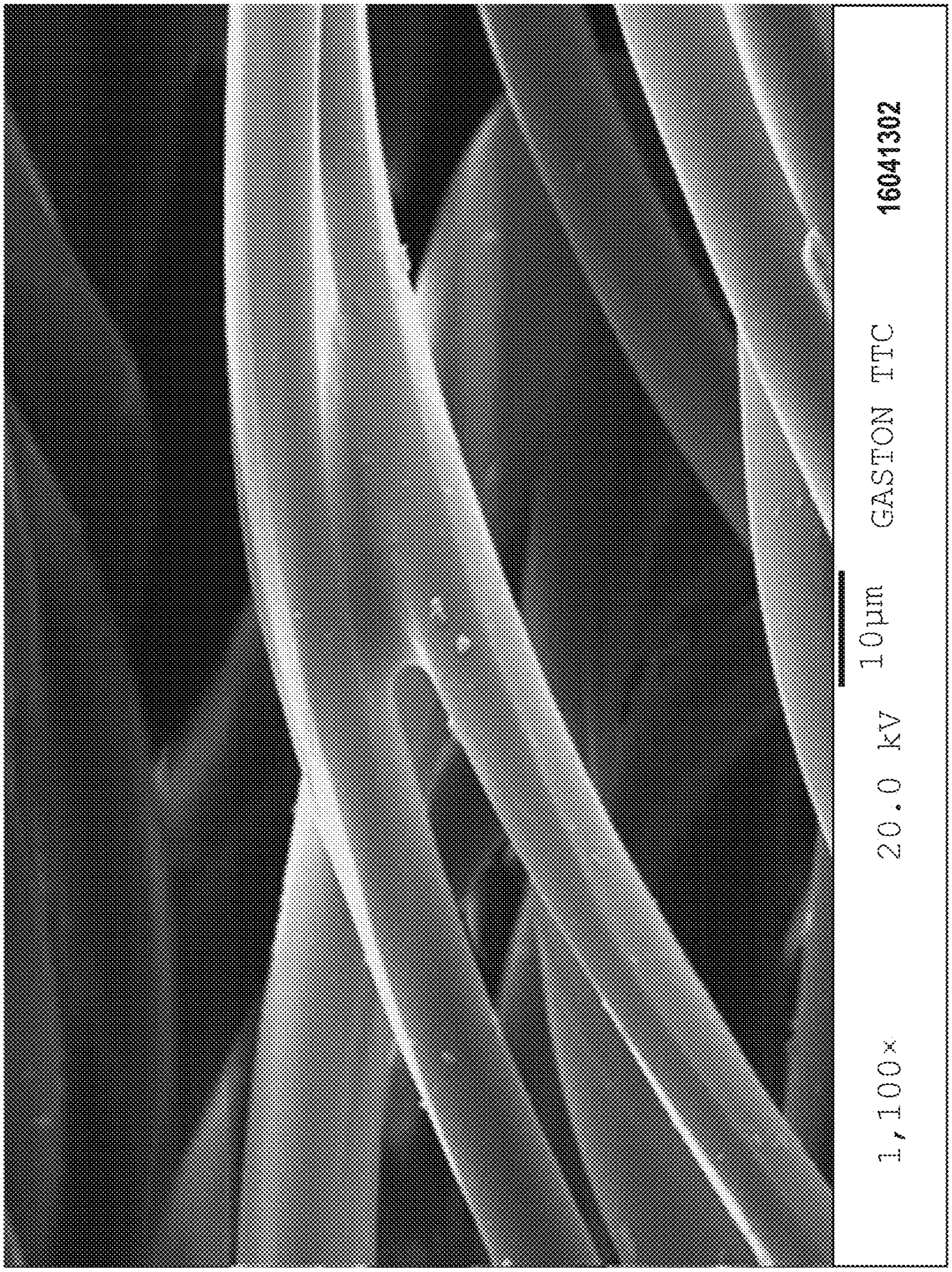

FIG. 285 illustrates a scanning electron microscope image of sample 16041302.

Figure 286:
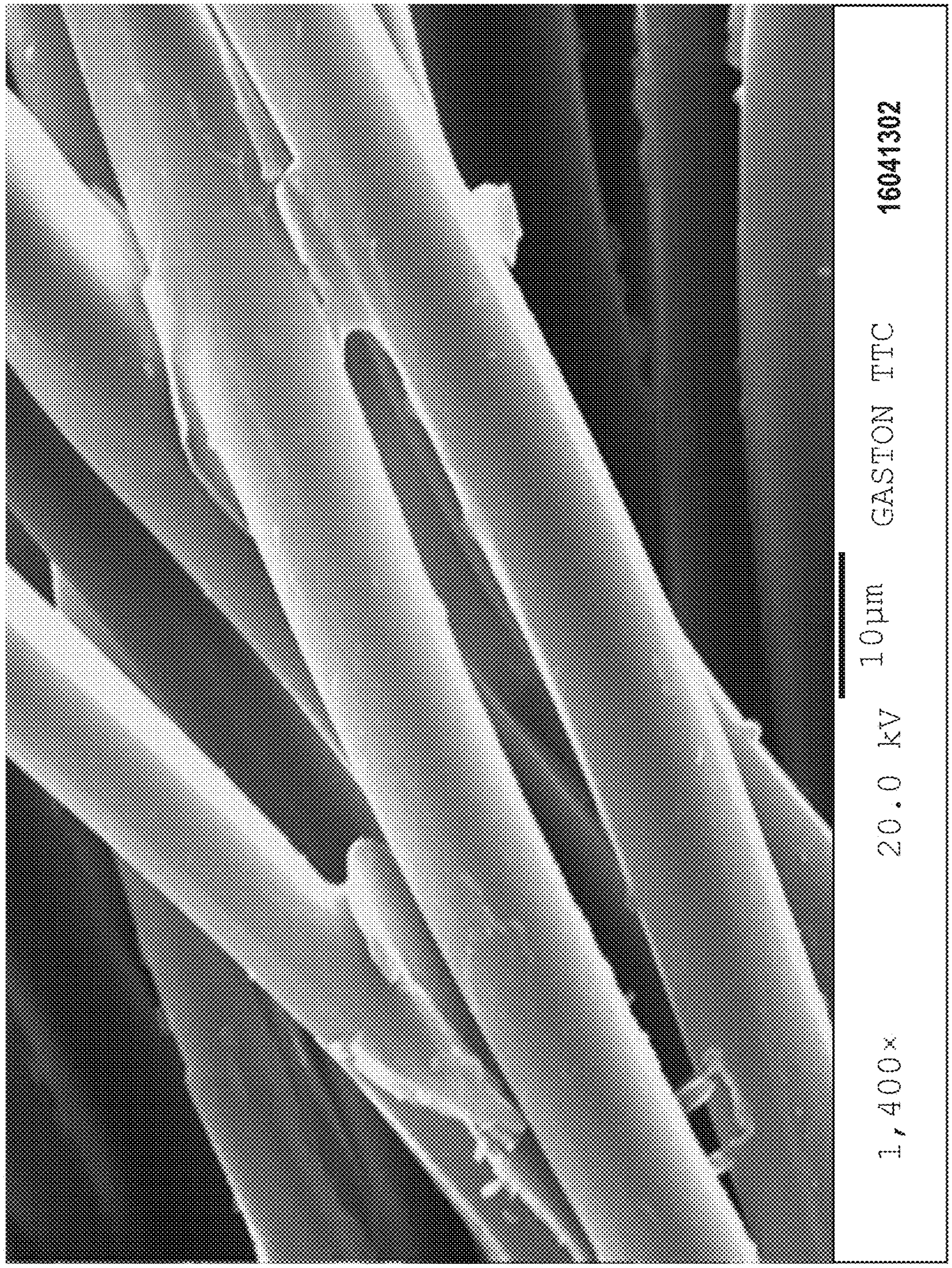

FIG. 286 illustrates a scanning electron microscope image of sample 16041302.

Figure 287:

FIG. 287 illustrates a scanning electron microscope image of sample 16041303.

Figure 288:

FIG. 288 illustrates a scanning electron microscope image of sample 16041303.

Figure 289:
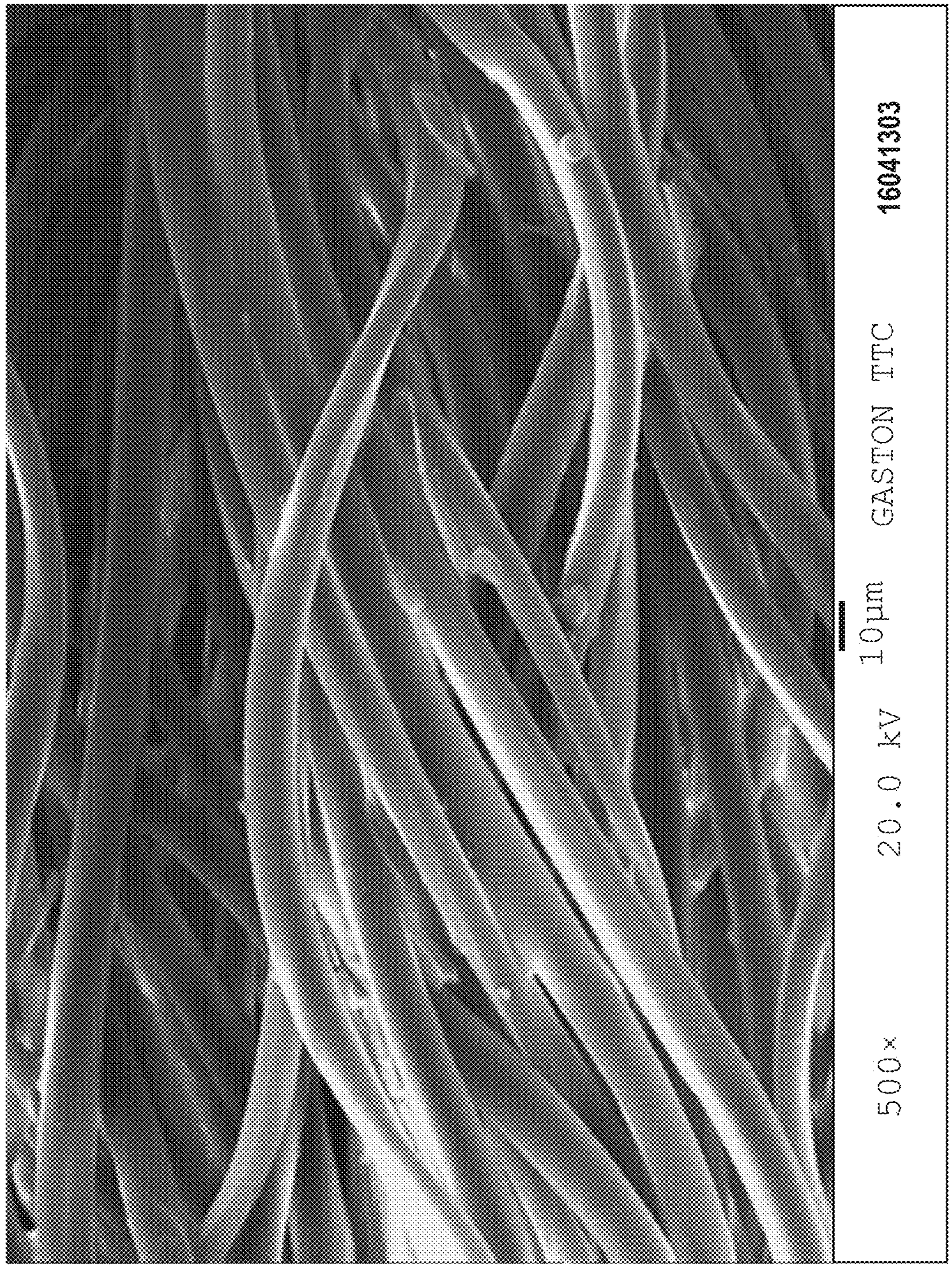

FIG. 289 illustrates a scanning electron microscope image of sample 16041303.

Figure 290:
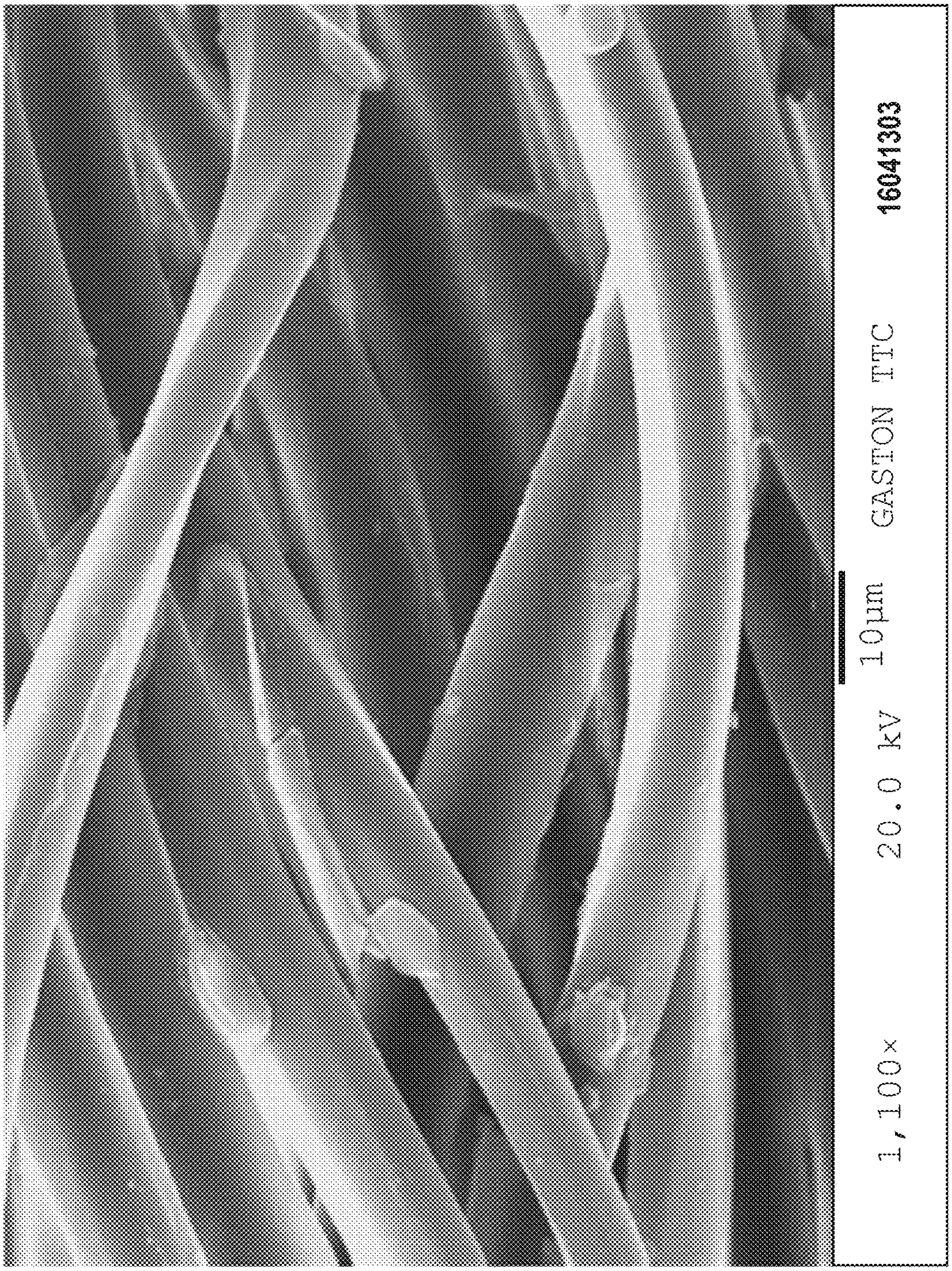

FIG. 290 illustrates a scanning electron microscope image of sample 16041303.

Figure 291:
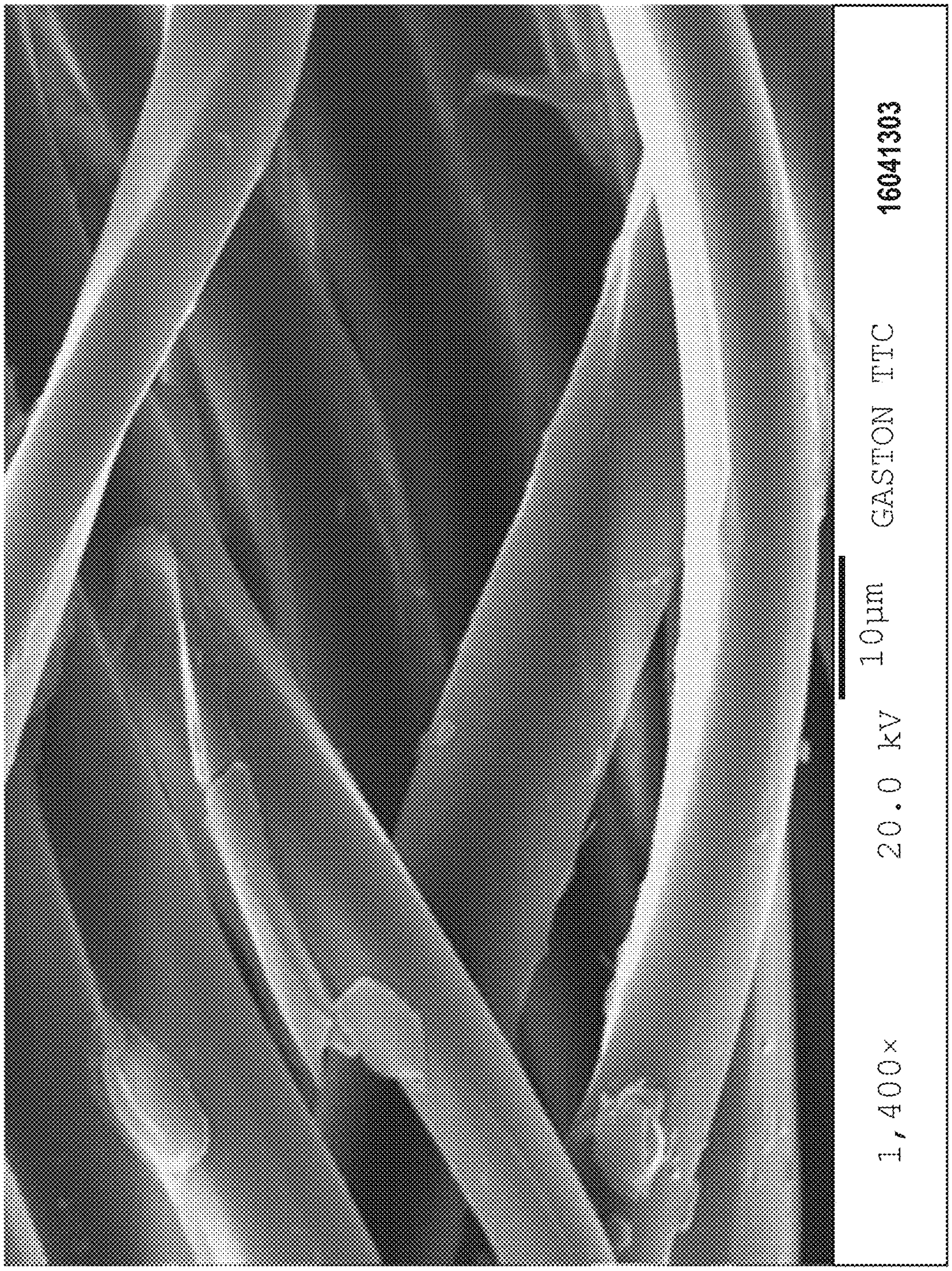

FIG. 291 illustrates a scanning electron microscope image of sample 16041303.

Figure 292:

FIG. 292 illustrates a scanning electron microscope image of sample 16041304.

Figure 293:

FIG. 293 illustrates a scanning electron microscope image of sample 16041304.

Figure 294:
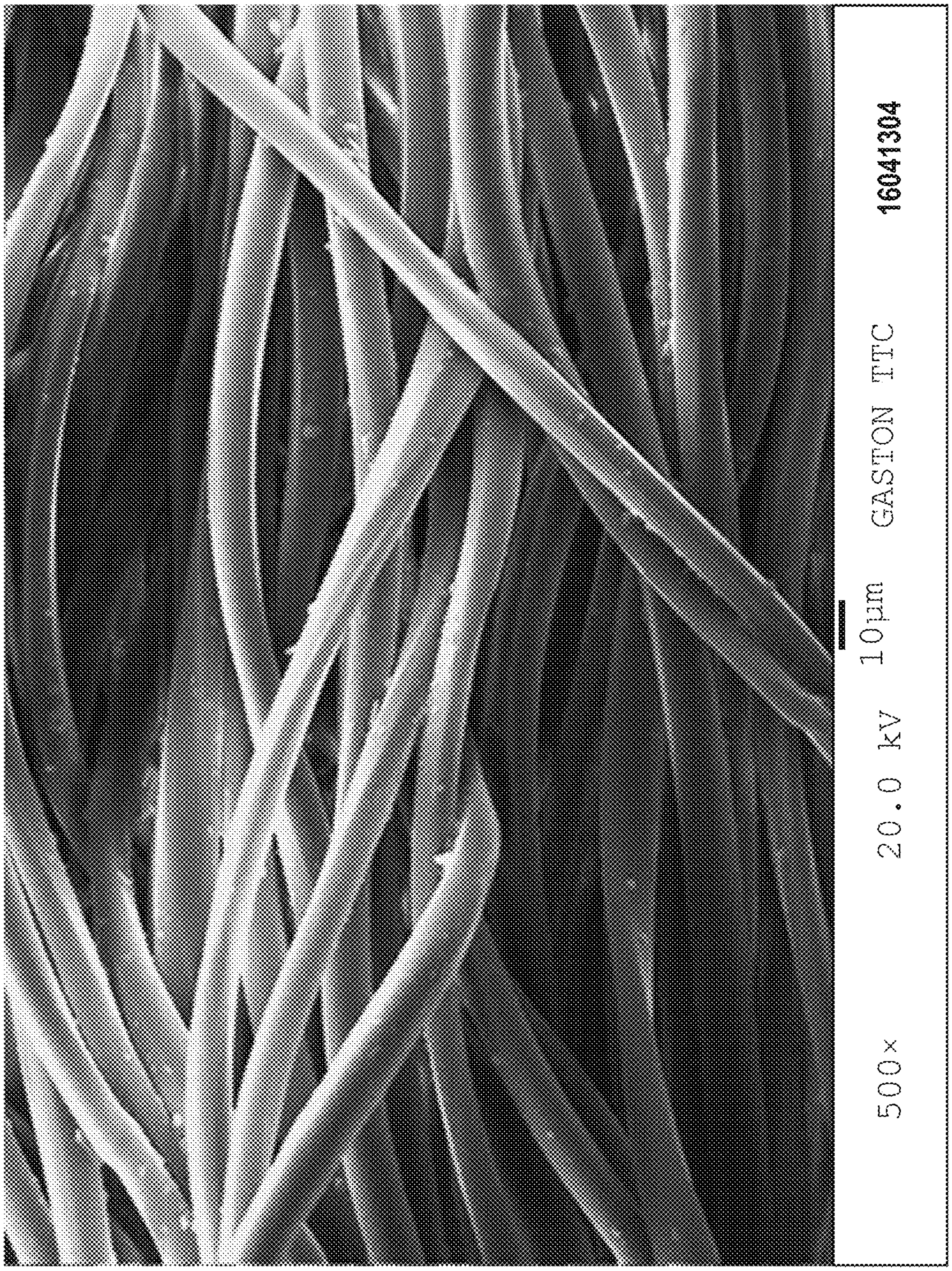

FIG. 294 illustrates a scanning electron microscope image of sample 16041304.

Figure 295:
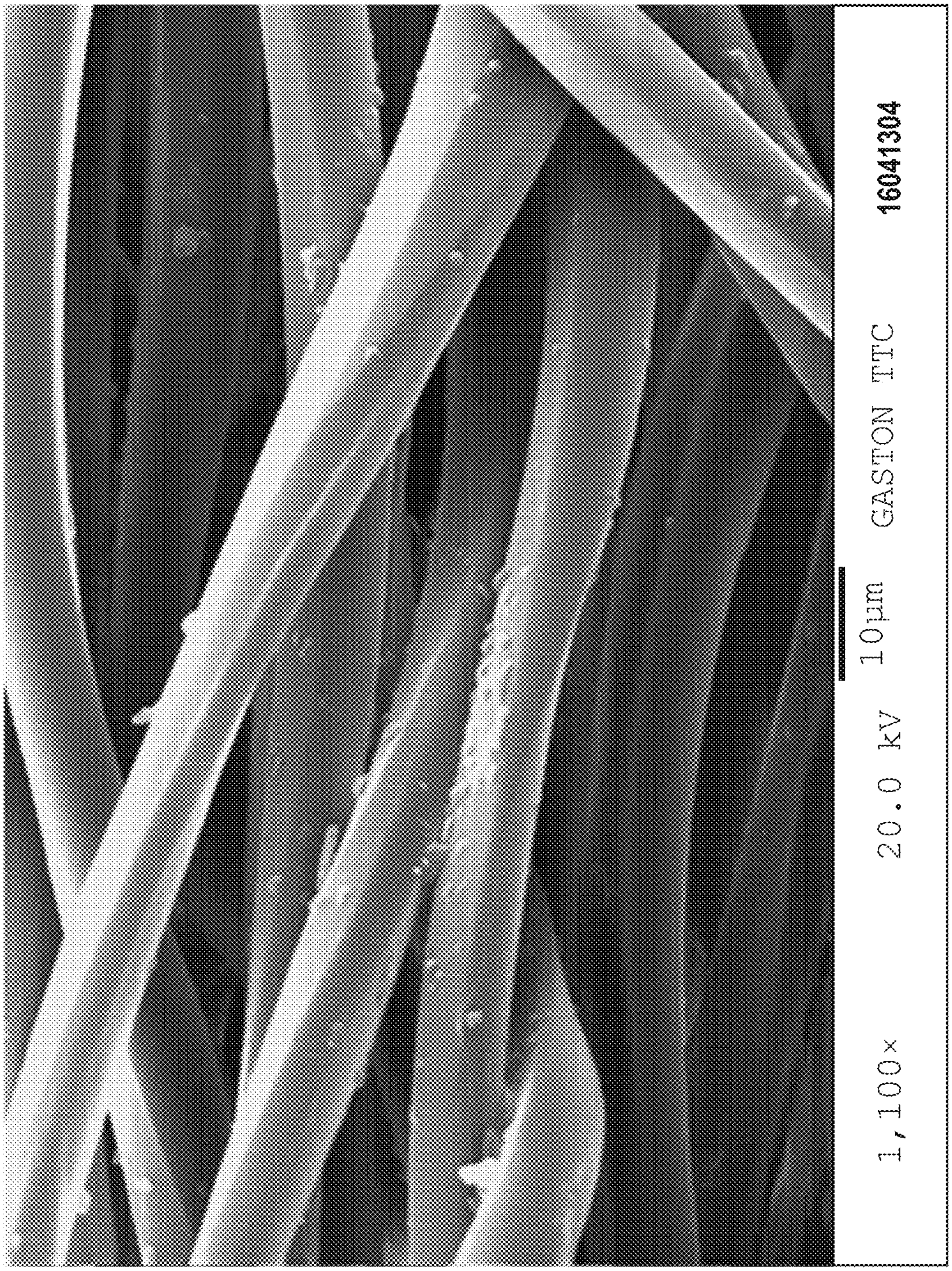

FIG. 295 illustrates a scanning electron microscope image of sample 16041304.

Figure 296:
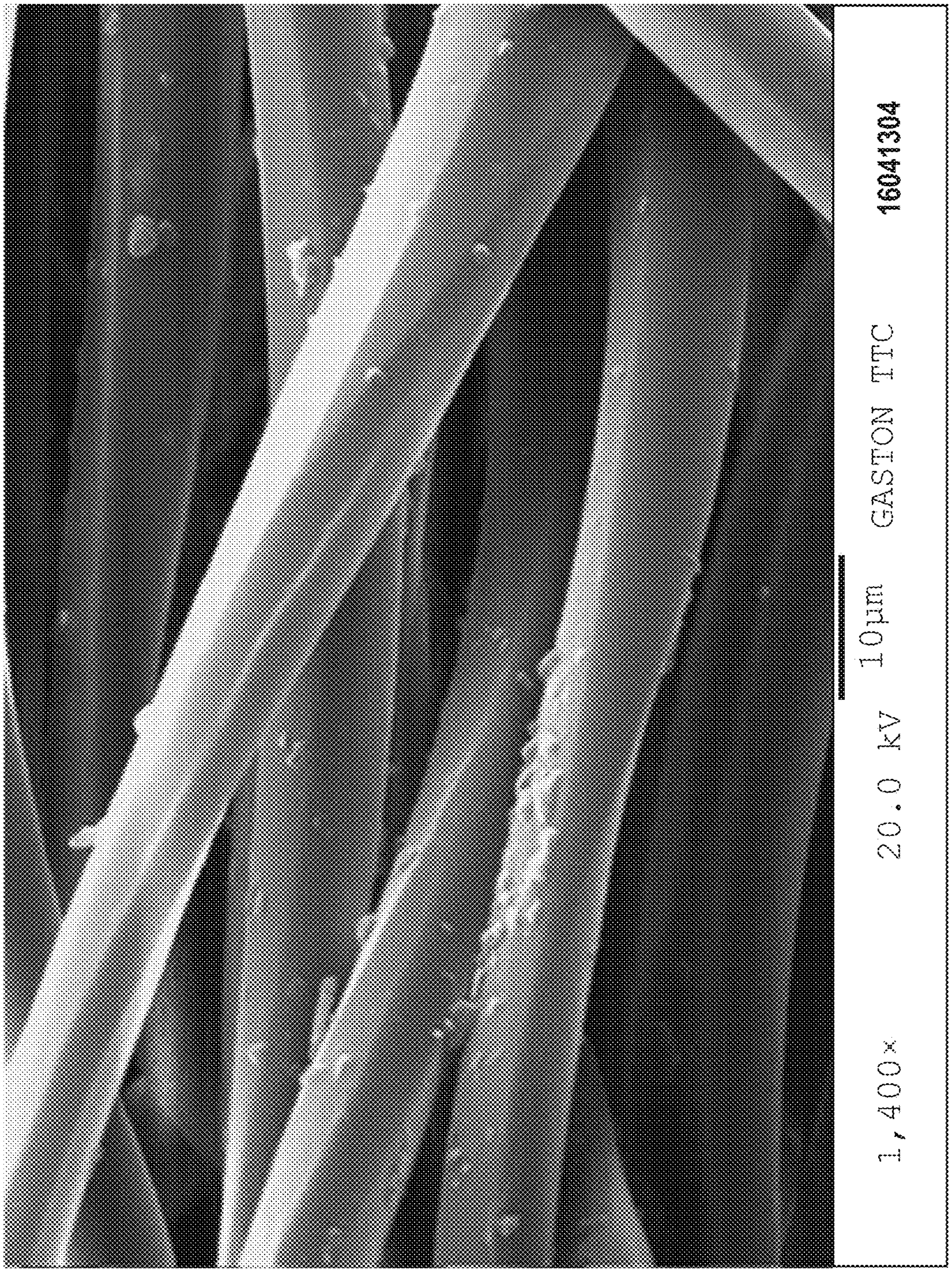

FIG. 296 illustrates a scanning electron microscope image of sample 16041304.

Figure 297:
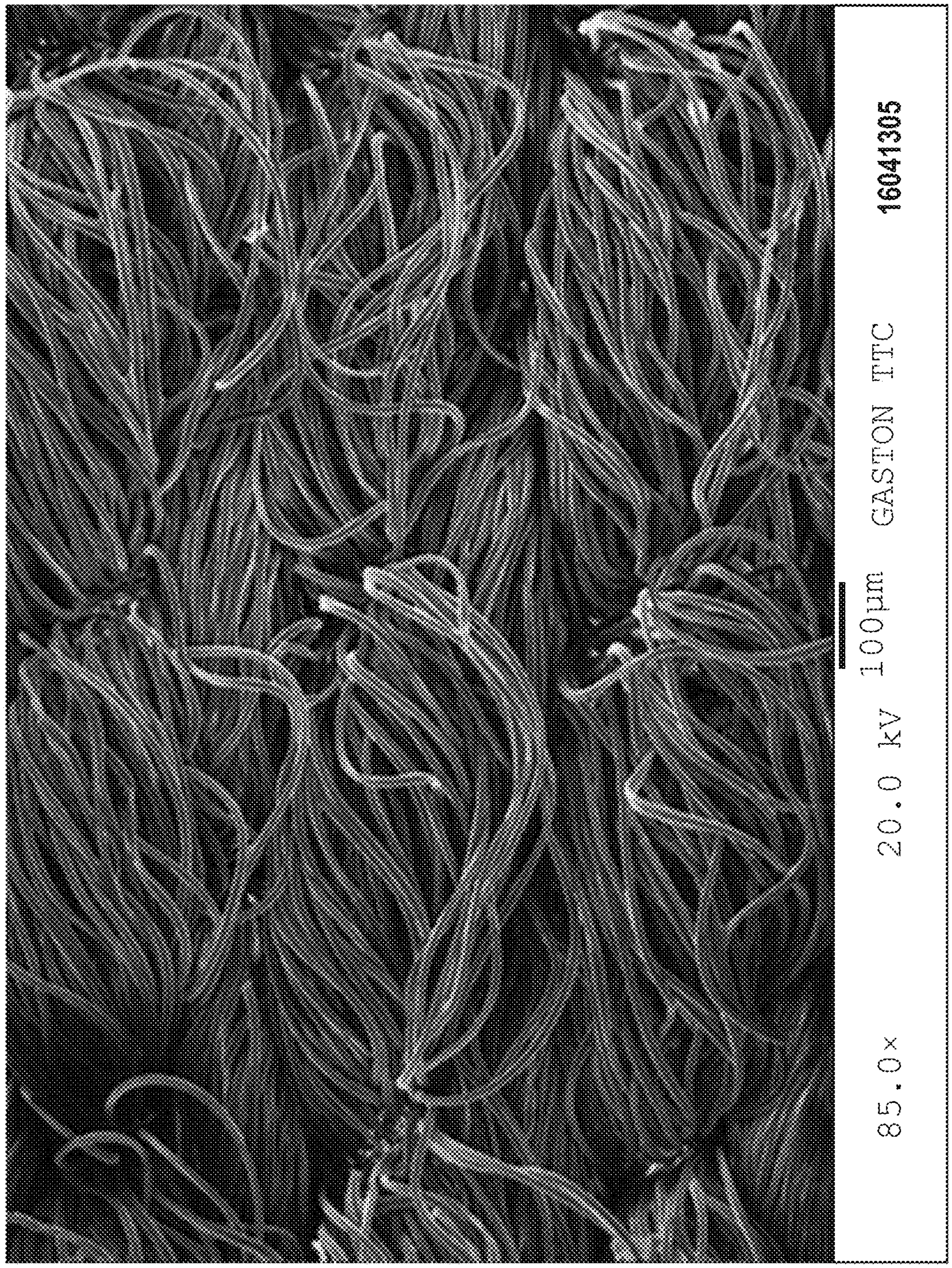

FIG. 297 illustrates a scanning electron microscope image of sample 16041305.

Figure 298:
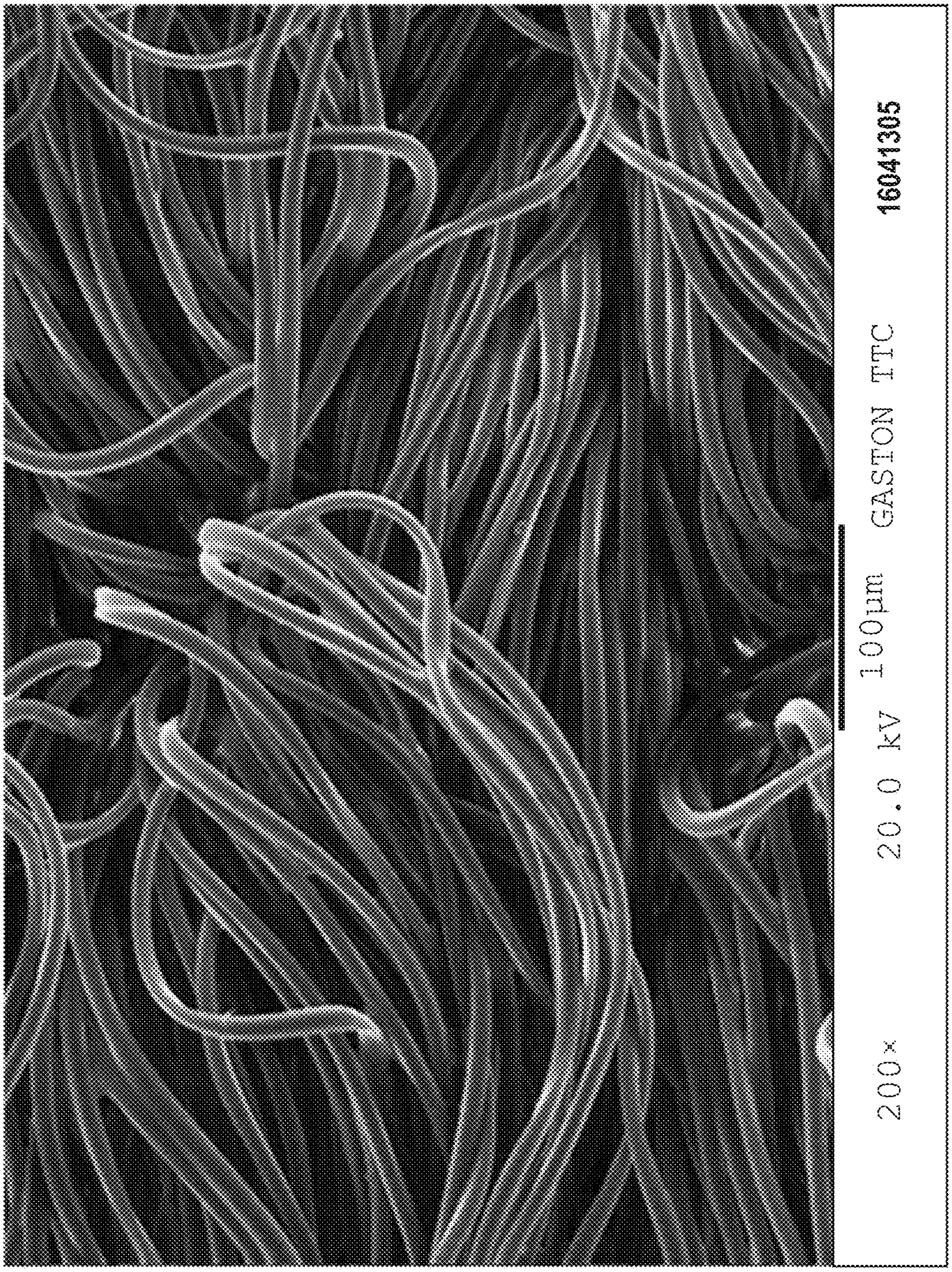

FIG. 298 illustrates a scanning electron microscope image of sample 16041305.

Figure 299:
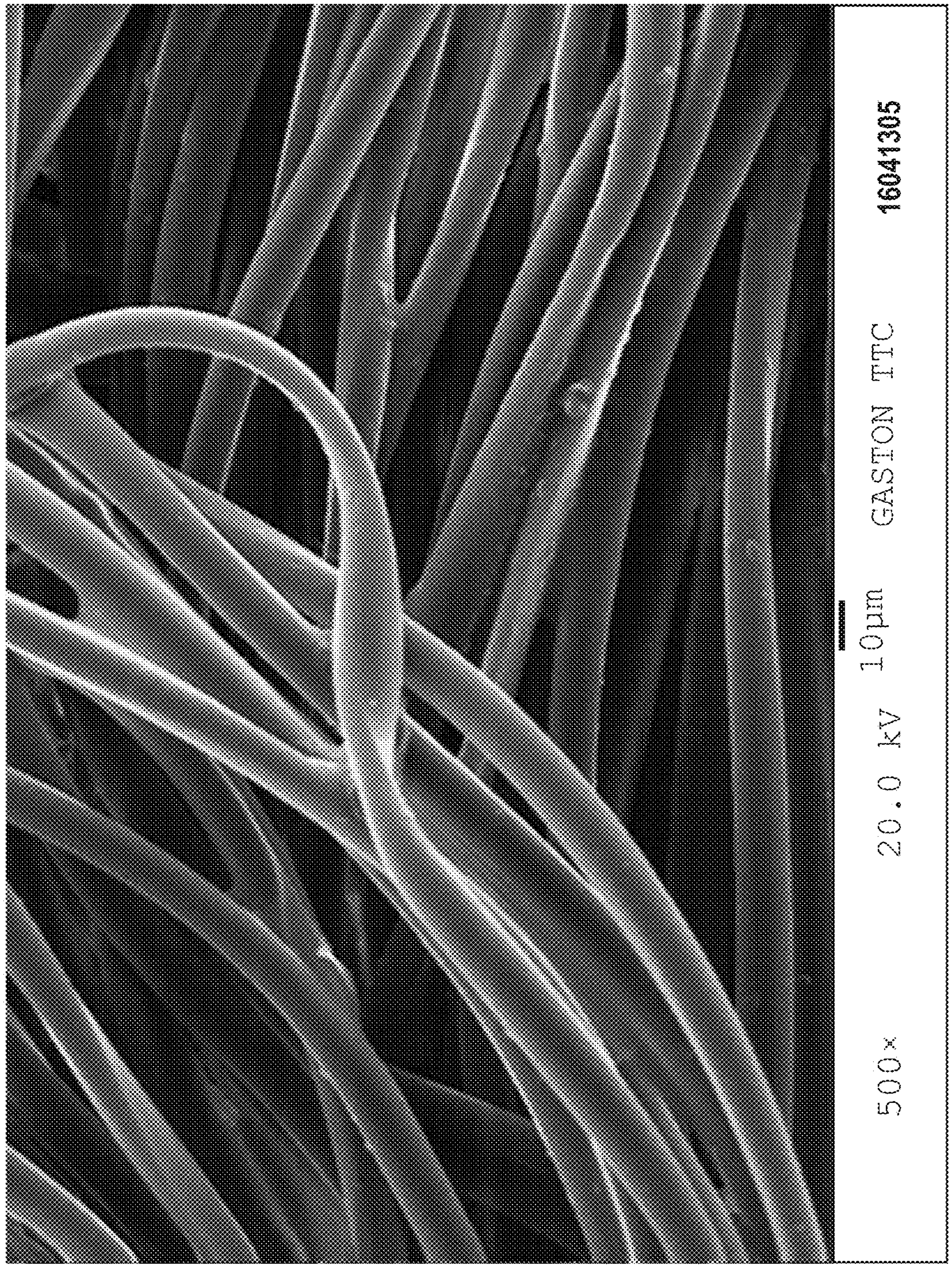

FIG. 299 illustrates a scanning electron microscope image of sample 16041305.

Figure 300:
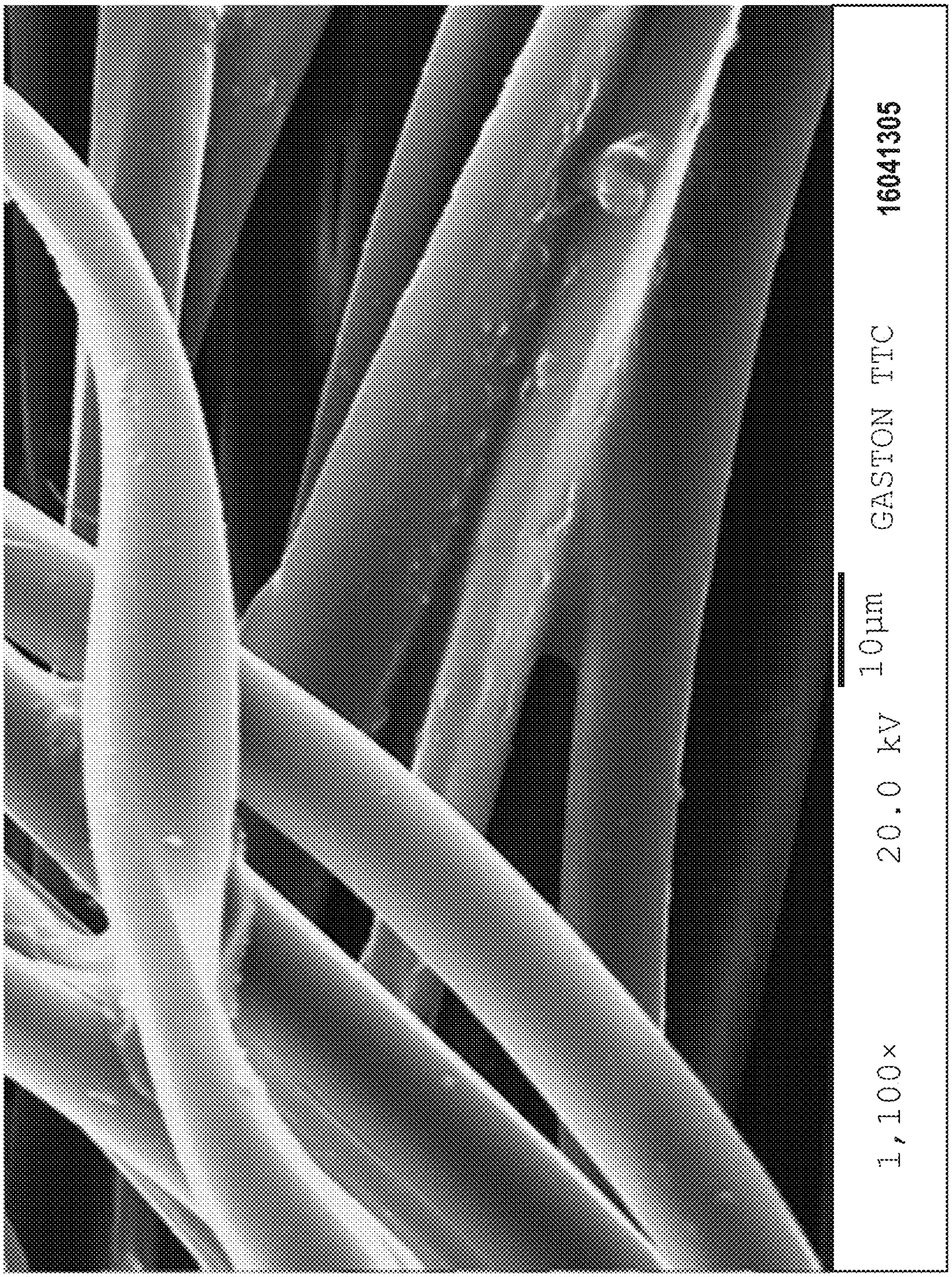

FIG. 300 illustrates a scanning electron microscope image of sample 16041305.

Figure 301:
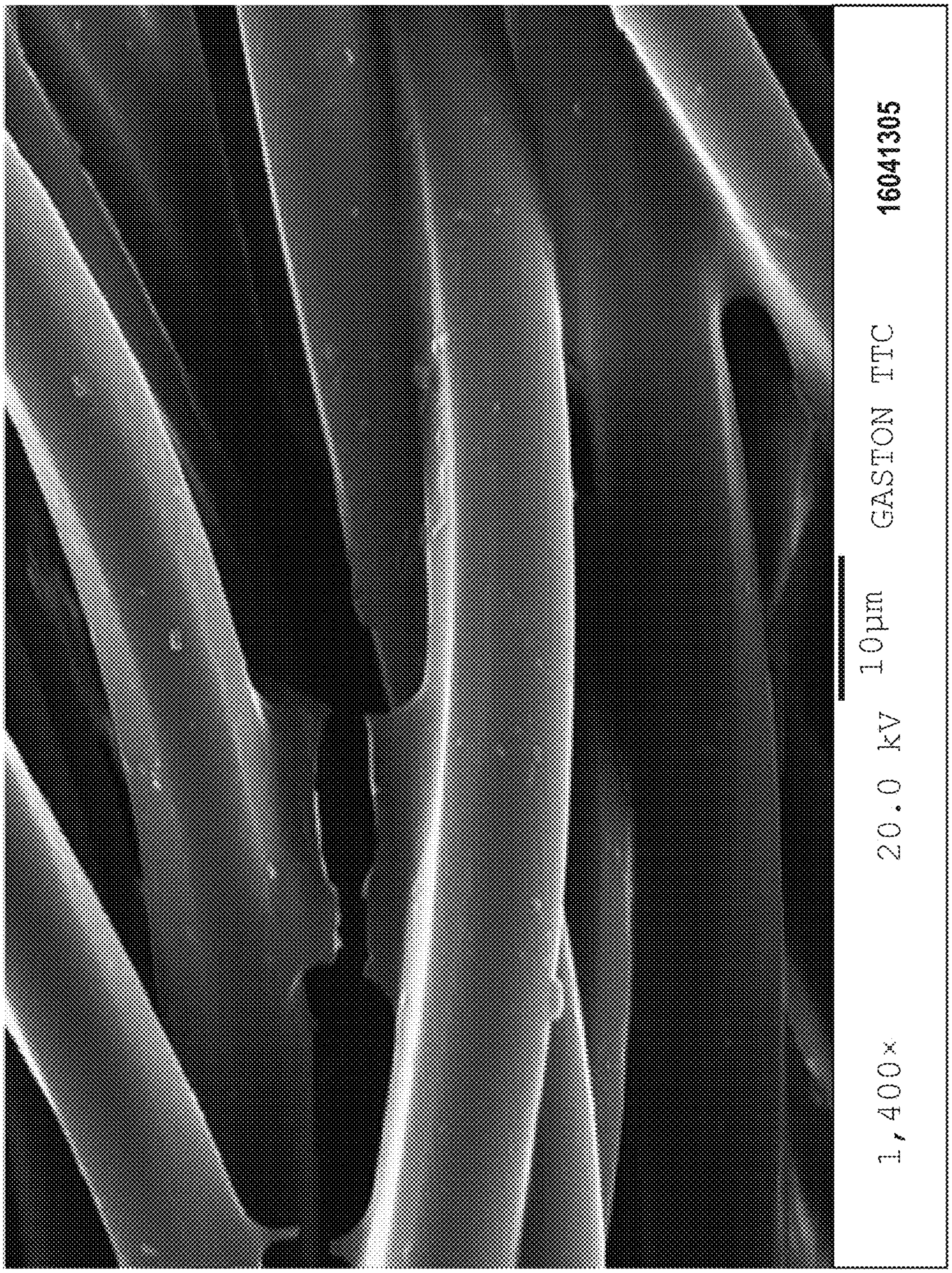

FIG. 301 illustrates a scanning electron microscope image of sample 16041305.

Figure 302:

FIG. 302 illustrates a scanning electron microscope image of sample 16041306.

Figure 303:

FIG. 303 illustrates a scanning electron microscope image of sample 16041306.

Figure 304:

FIG. 304 illustrates a scanning electron microscope image of sample 16041306.

Figure 305:
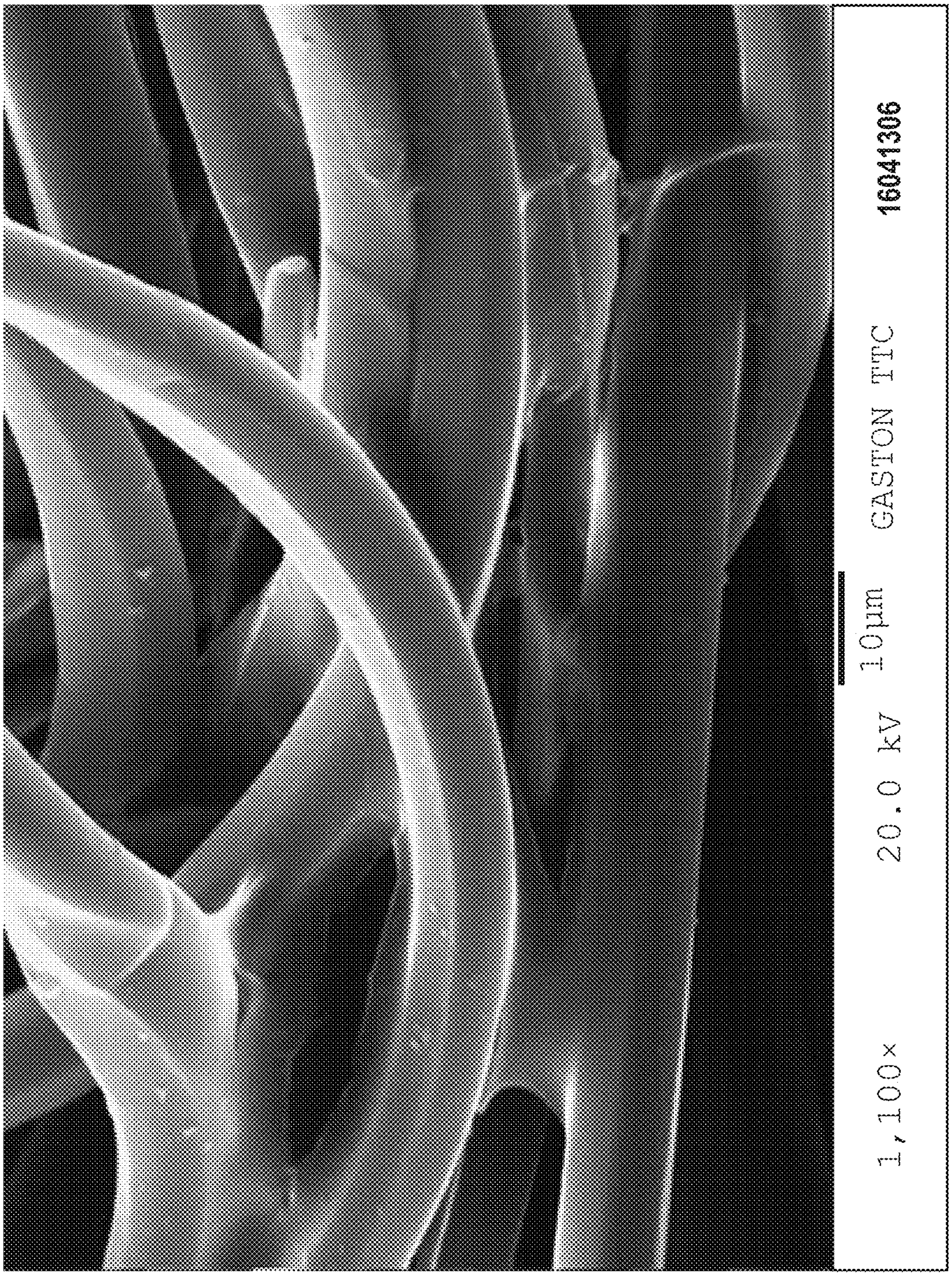

FIG. 305 illustrates a scanning electron microscope image of sample 16041306.

Figure 306:
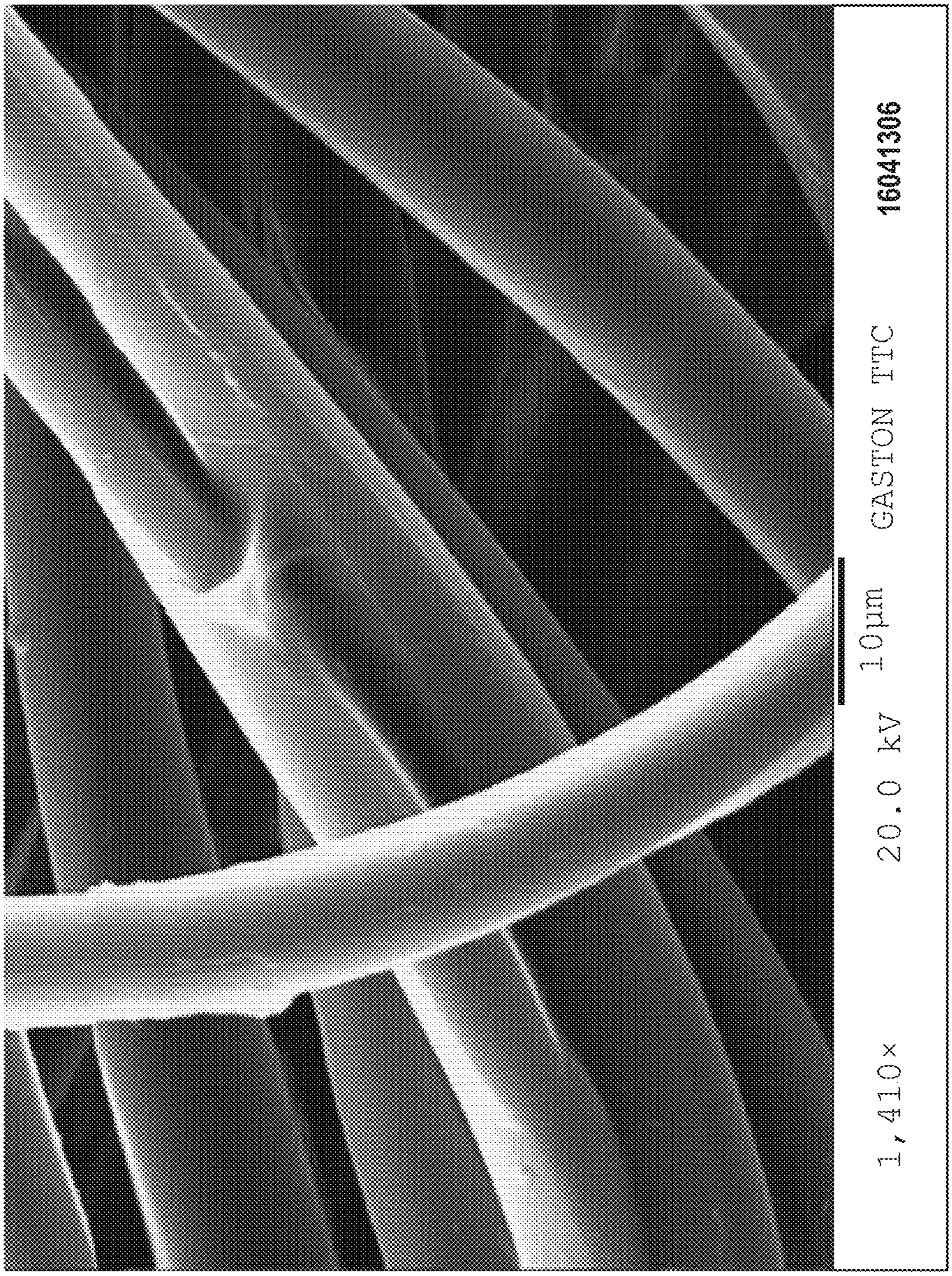

FIG. 306 illustrates a scanning electron microscope image of sample 16041306.

Figure 307:

FIG. 307 illustrates a scanning electron microscope image of sample 16040803.

Figure 308:

FIG. 308 illustrates a scanning electron microscope image of sample 16040803.

Figure 309:
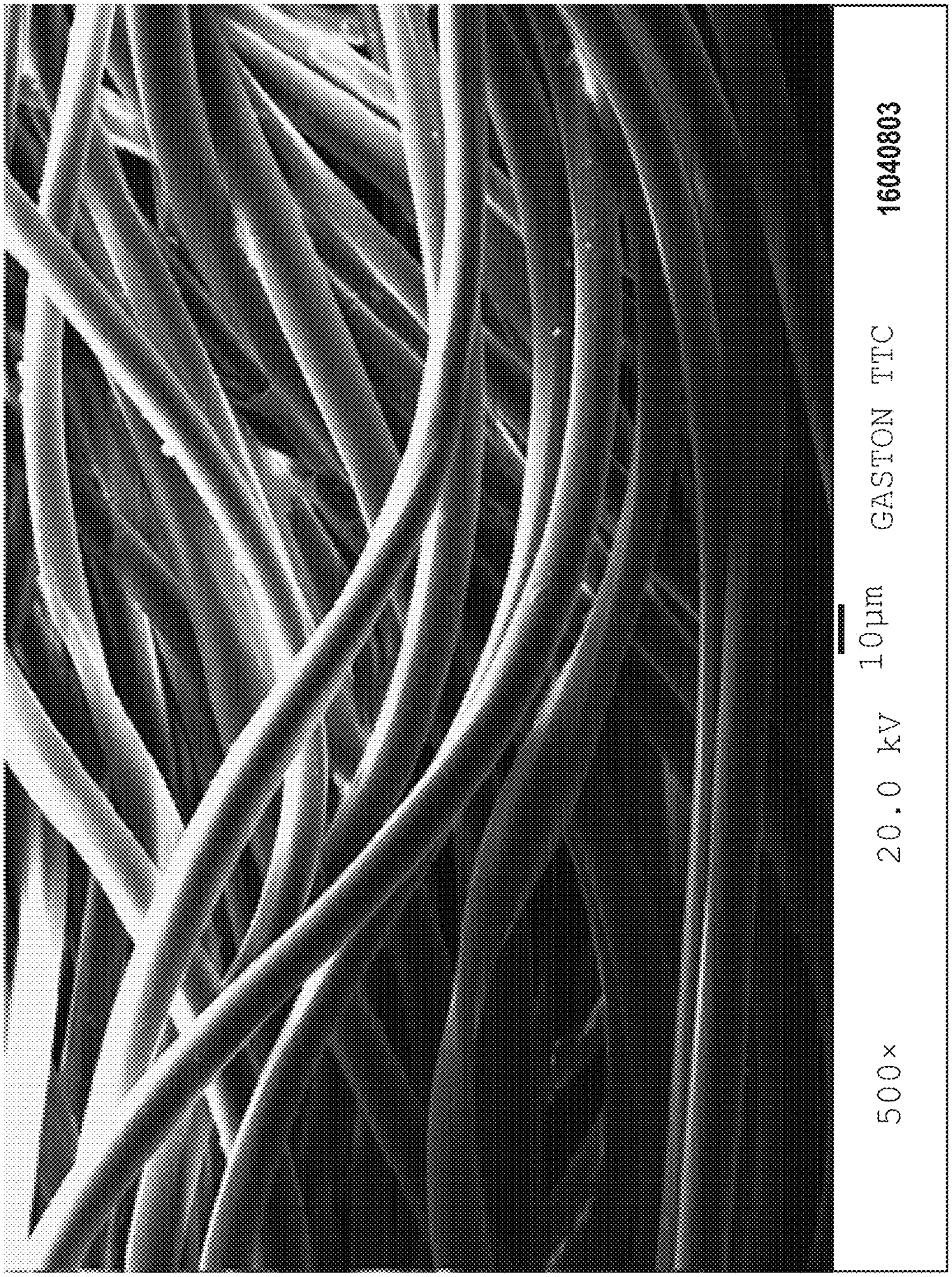

FIG. 309 illustrates a scanning electron microscope image of sample 16040803.

Figure 310:
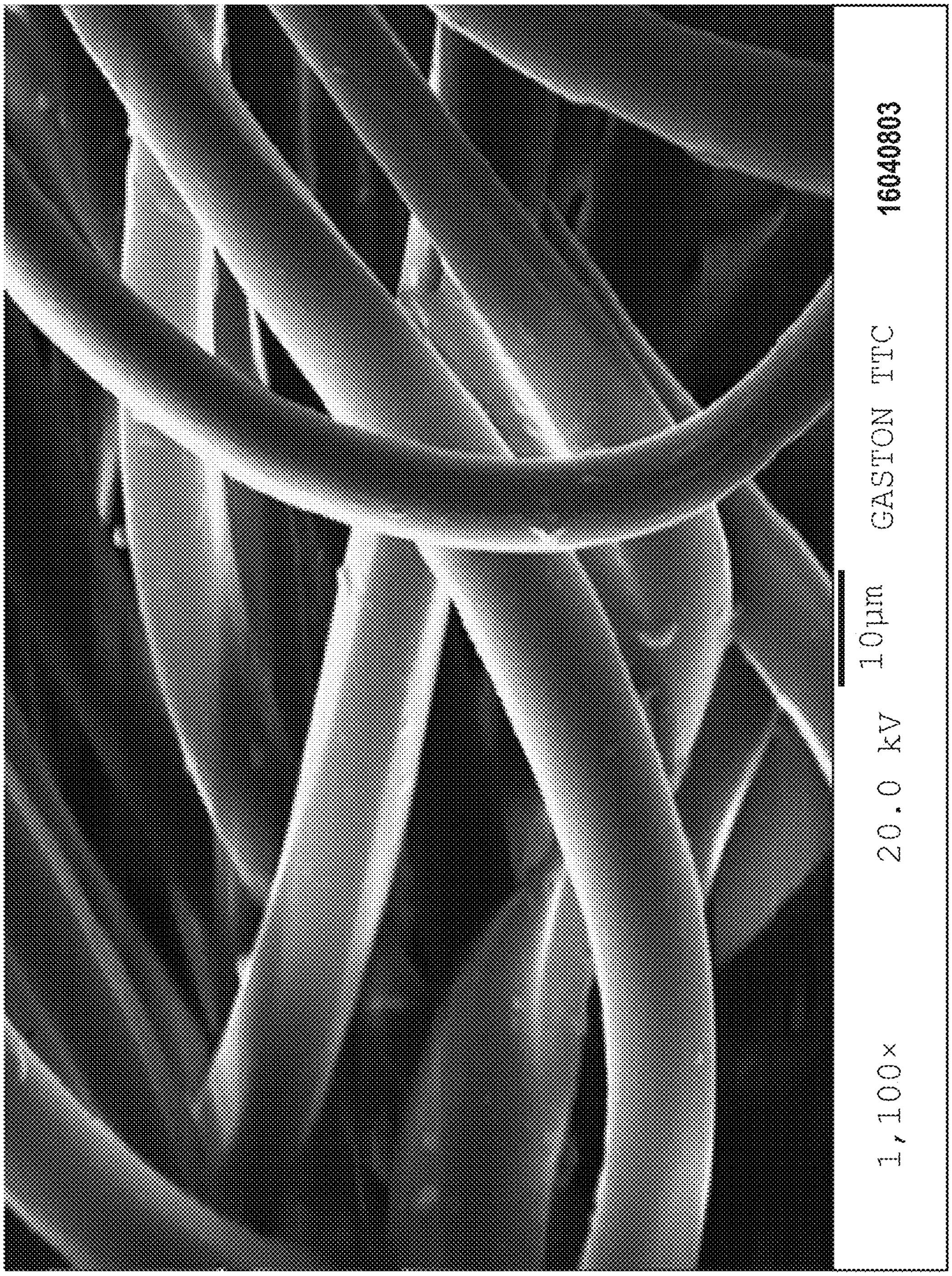

FIG. 310 illustrates a scanning electron microscope image of sample 16040803.

Figure 311:
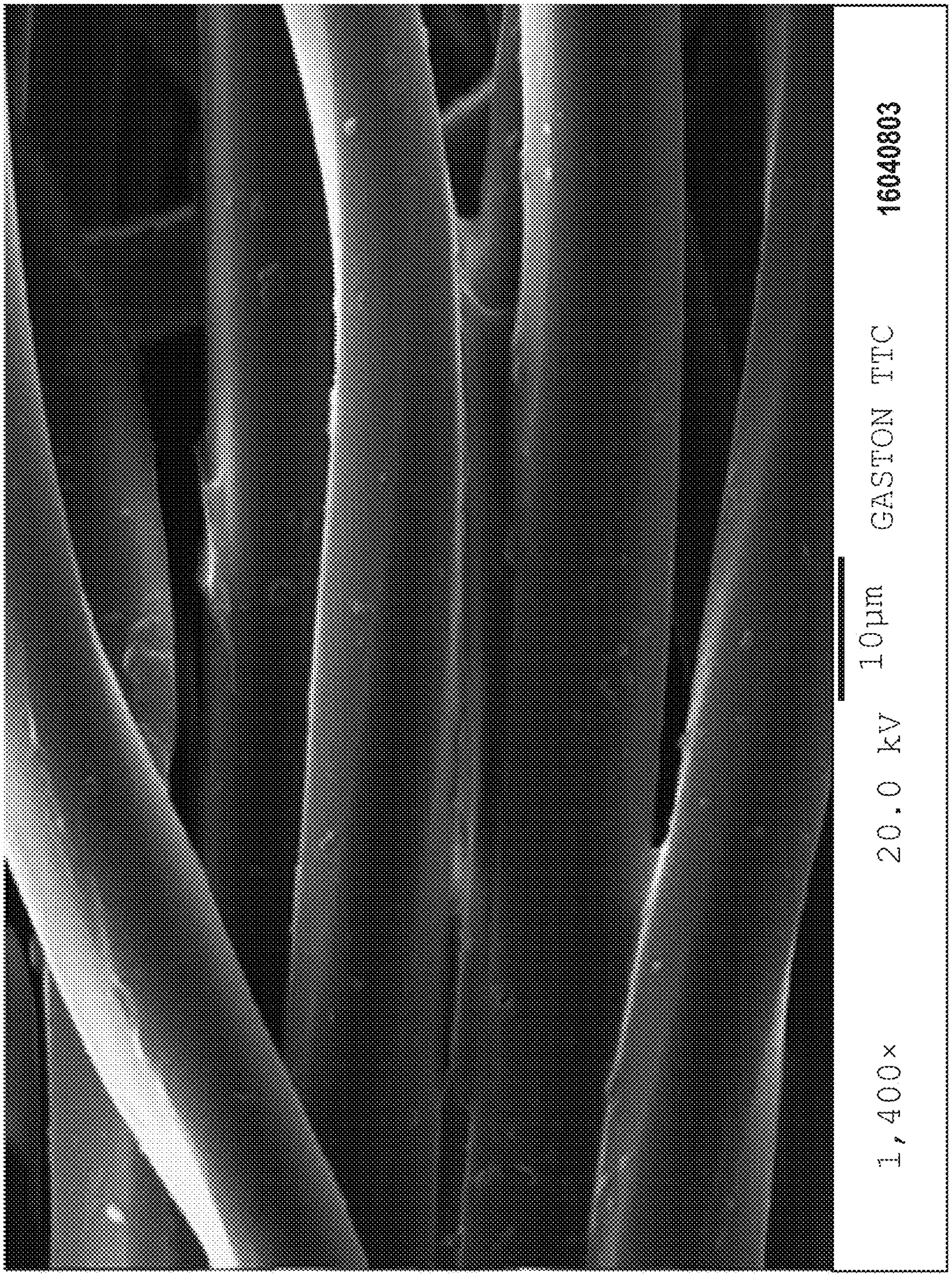

FIG. 311 illustrates a scanning electron microscope image of sample 16040803.

Figure 312:

FIG. 312 illustrates a scanning electron microscope image of sample 16040808.

Figure 313:

FIG. 313 illustrates a scanning electron microscope image of sample 16040808.

Figure 314:
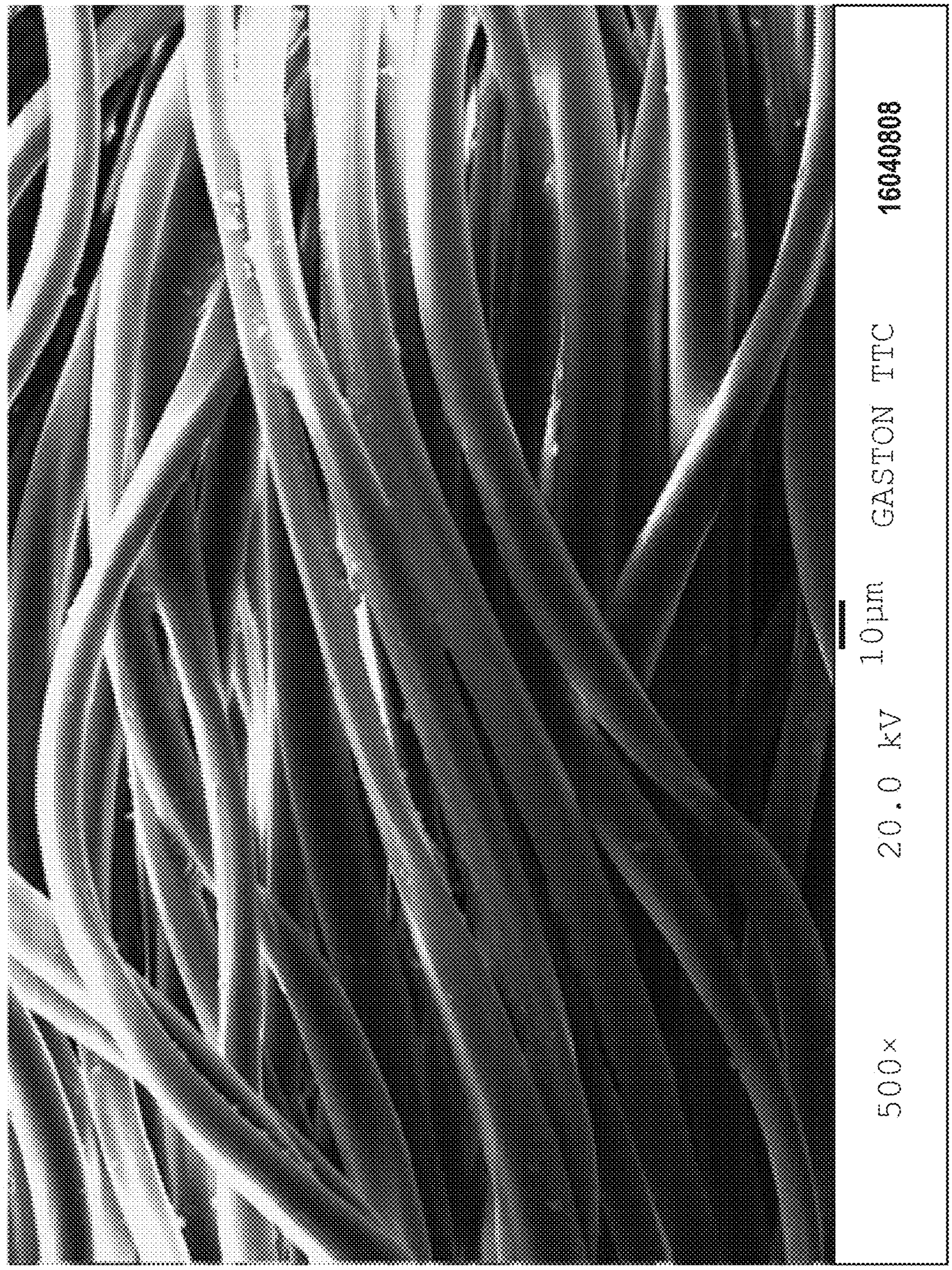

FIG. 314 illustrates a scanning electron microscope image of sample 16040808.

Figure 315:

FIG. 315 illustrates a scanning electron microscope image of sample 16040808.

Figure 316:
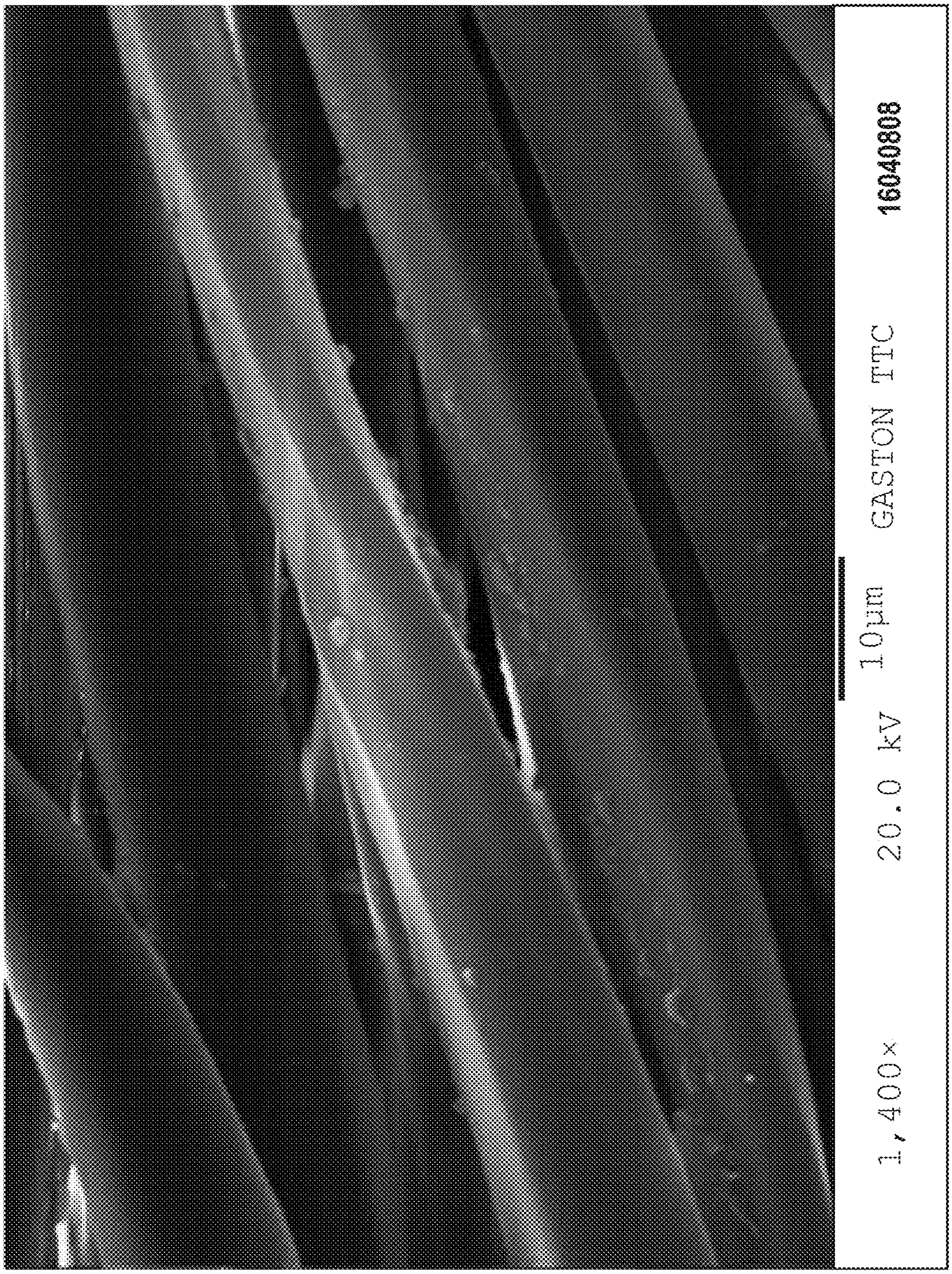

FIG. 316 illustrates a scanning electron microscope image of sample 16040808.

Figure 317:
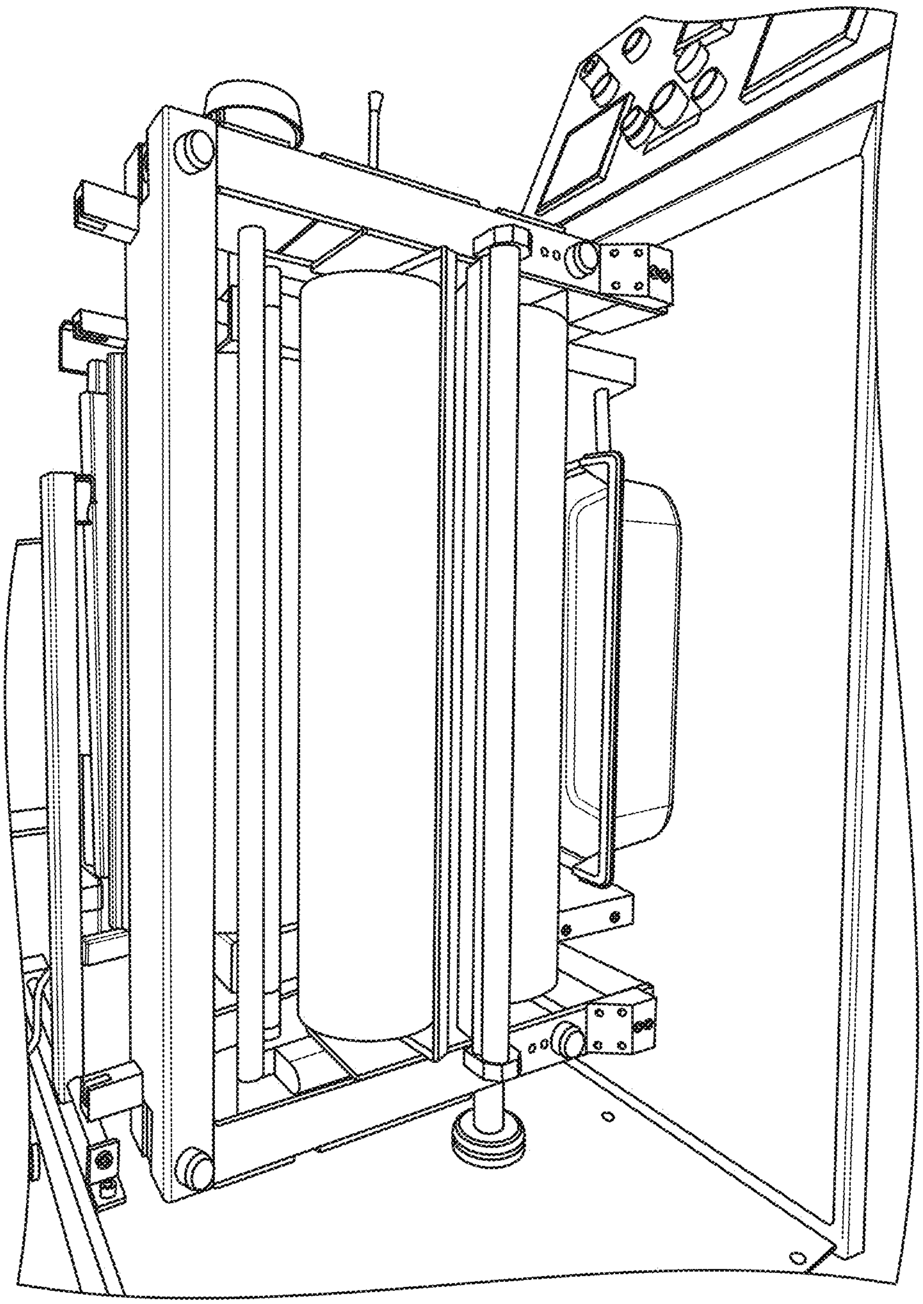

FIG. 317 illustrates an exemplary padder roller.

Figure 318:
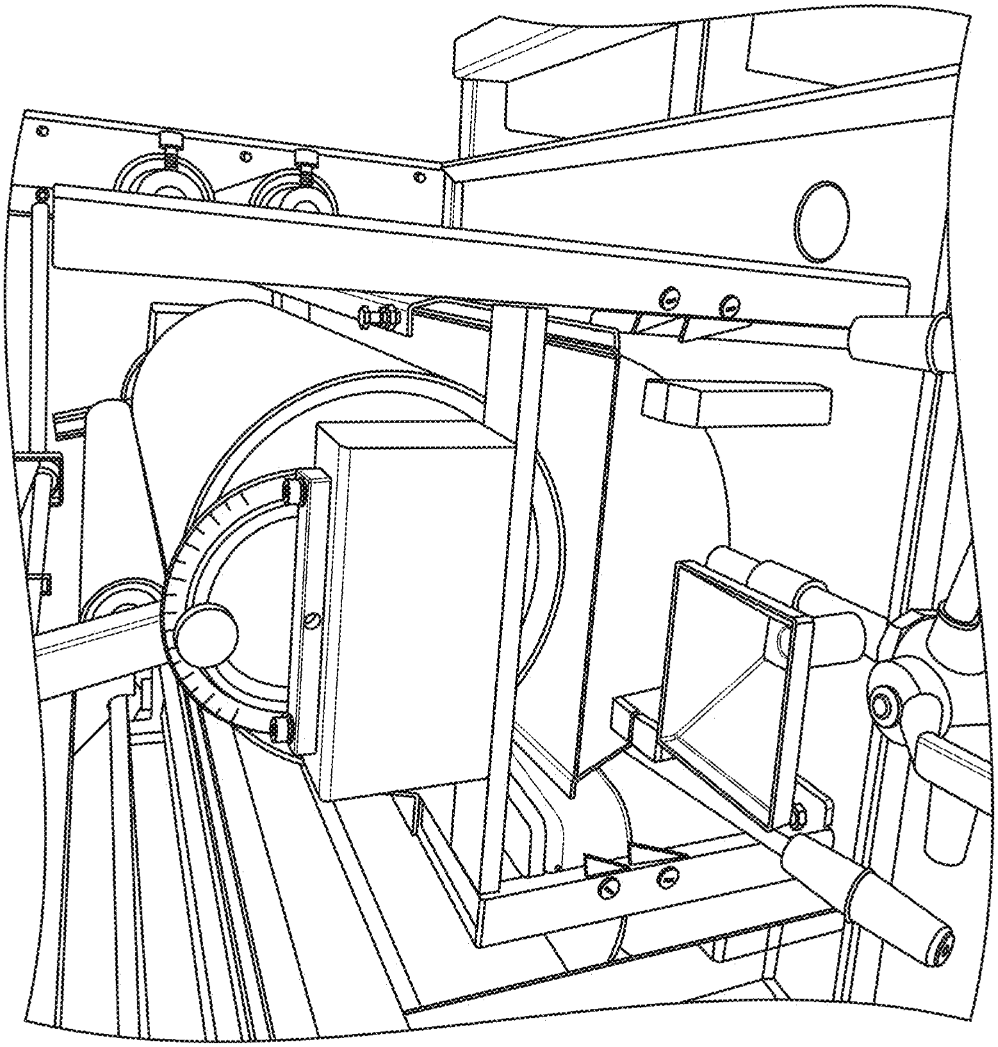

FIG. 318 illustrates an exemplary kiss roller.

Figure 319:
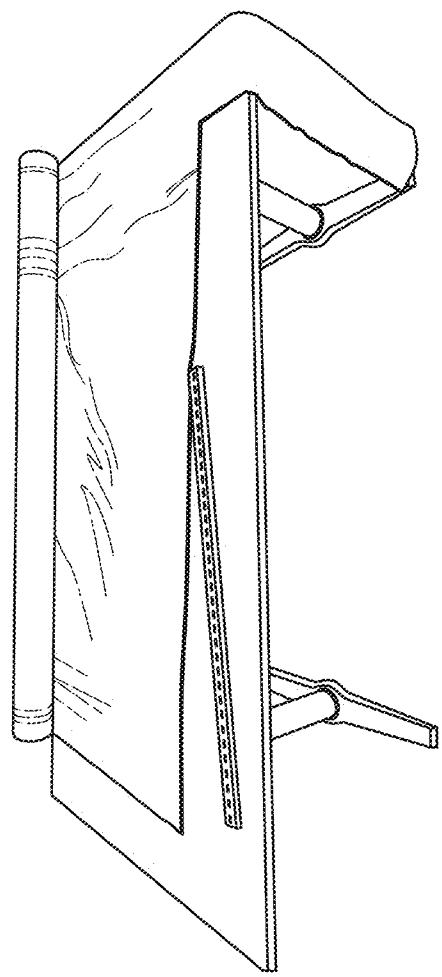

FIG. 319 illustrates the process of unrolling an exemplary fabric roller.

Figure 320:
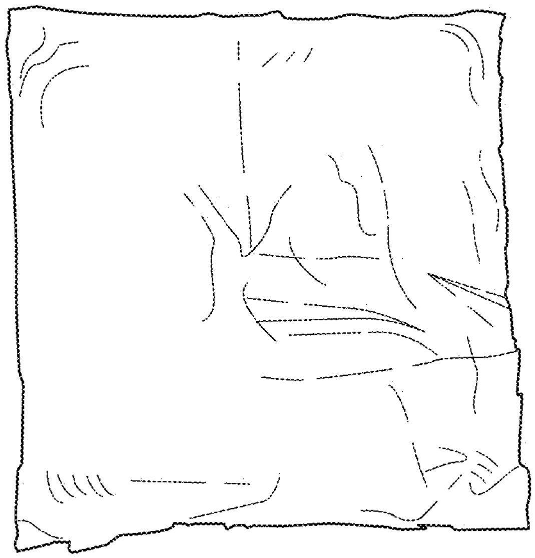

FIG. 320 illustrates a square of sample fabric to be coated.

Figure 321:
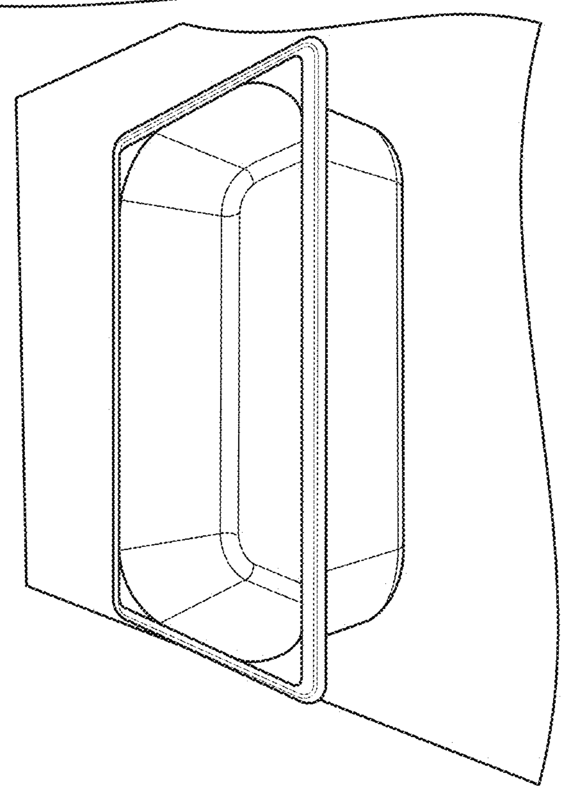

FIG. 321 illustrates an exemplary stainless steel bath.

Figure 322:
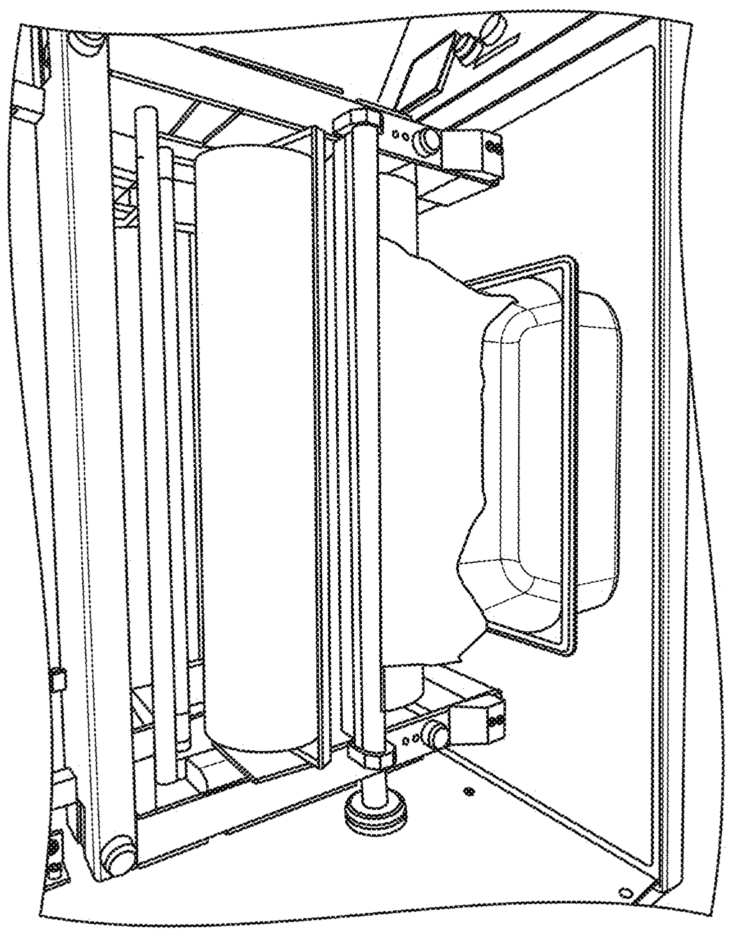

FIG. 322 illustrates a padder unit having two rollers.

Figure 323:
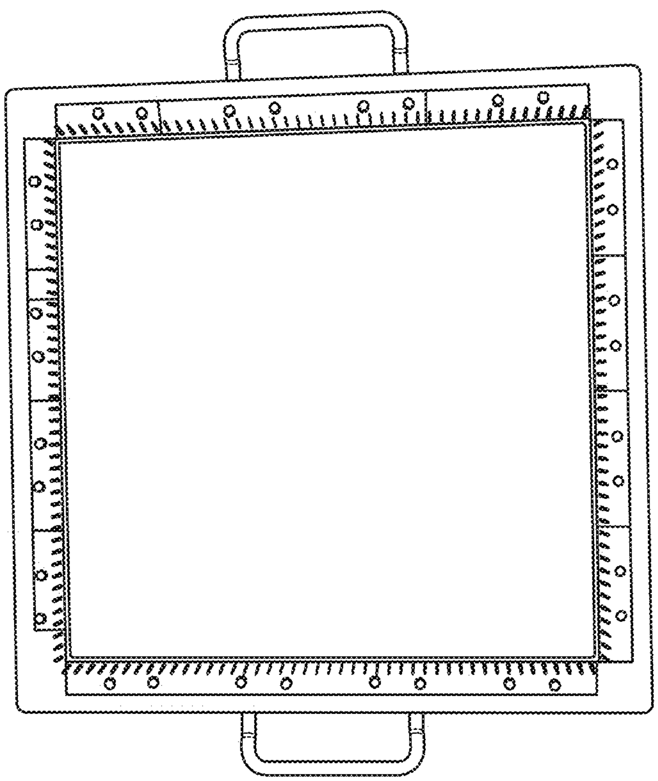

FIG. 323 illustrates a curing frame without fabric provided thereon.

Figure 324:
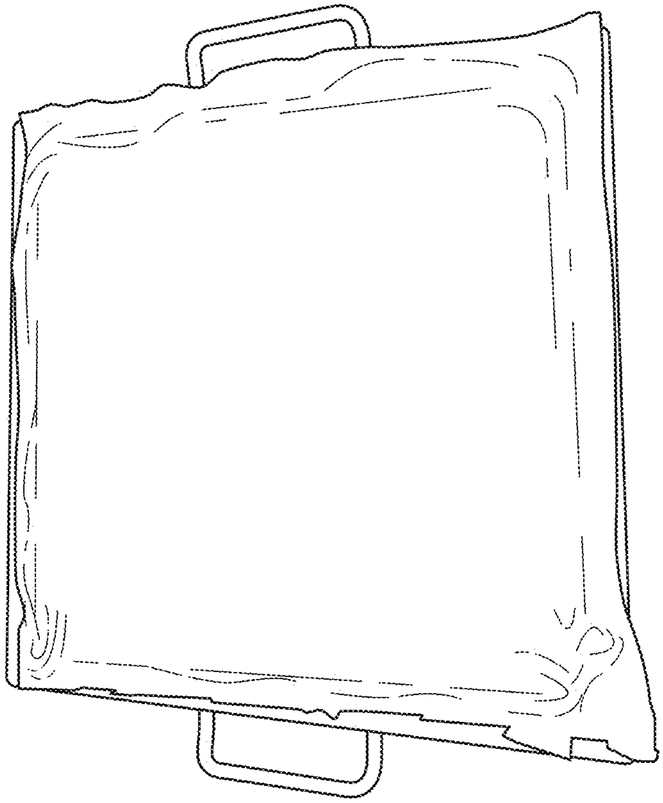

FIG. 324 illustrates a curing frame with fabric provided thereon.

Figure 325:
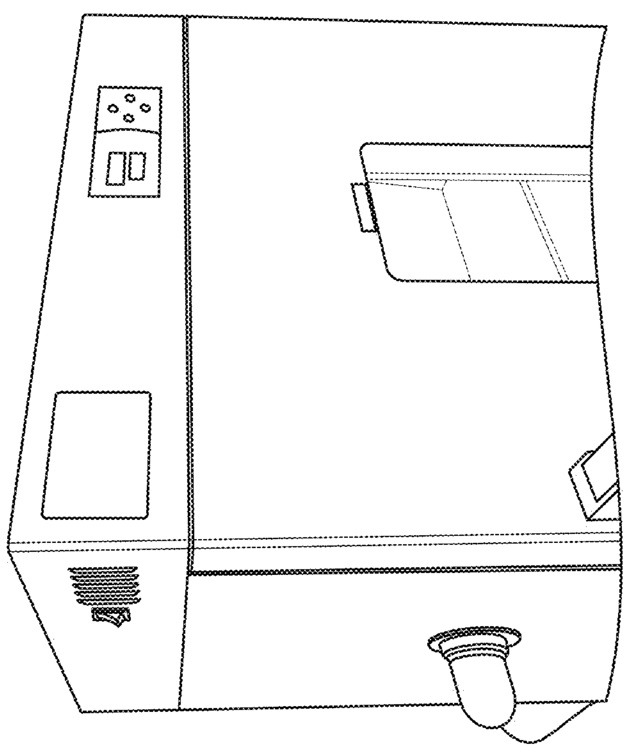

FIG. 325 illustrates an exemplary curing oven.

Figure 326:
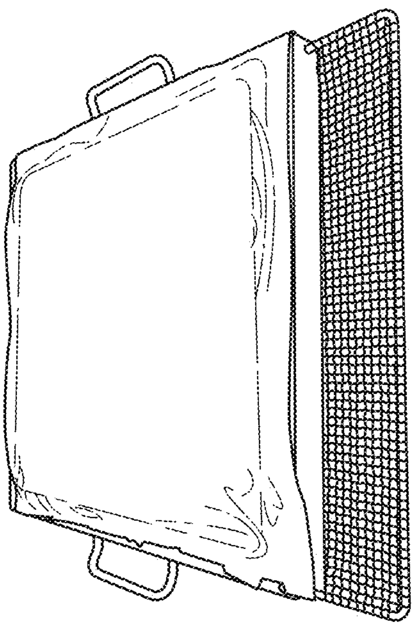

FIG. 326 illustrates a cooling rack with a curing frame and fabric provided thereon.

FIG. 327 illustrates a table that provides testing results for wetting time, absorption rate, wetted radius, spreading speed, accumulative one-way transport, and overall moisture management capability (OMMC) for sample nos. 16040101, 16040102, 16040103,16040104, 16040105, and 16040106.

FIG. 328 illustrates testing results in grades for wetting time, absorption rate, wetted radius, spreading speed, accumulative one-way transport, and OMMC for 16040101, 16040102, 16040103, 16040104, 16040105, and 16040106.

FIG. 329 illustrates testing results for wetting time, absorption rate, wetted radius, spreading speed, accumulative one-way transport, and OMMC for 16040801, 16040802, 16040803, 16040804, 16040805, 16040806, 16040807, and 16040808.

FIG. 330 illustrates testing results in grades for wetting time, absorption rate, wetted radius, spreading speed, accumulative one-way transport, and OMMC for 16040801, 16040802, 16040803, 16040804, 16040805, 16040806, 16040807, and 16040808.

FIG. 331 illustrates testing results for wetting time, absorption rate, wetted radius, spreading speed, accumulative one-way transport, and OMMC for 16041201, 16041202, 16041302, 16041303, 16041203, 16041204, 16041305, 16041306, 16041301, and 16041304.

FIG. 332 illustrates testing results in grades for wetting time, absorption rate, wetted radius, spreading speed, accumulative one-way transport, and OMMC for 16041201, 16041202, 16041302, 16041303, 16041203, 16041204, 16041305, 16041306, 16041301, and 16041304.

FIG. 333 illustrates testing results for wetting time, absorption rate, wetted radius, spreading speed, accumulative one-way transport, and OMMC for 16041301, 16041302, 16041303, 16041304, 16041305, 16041306, 16042001, 16040101, and 16040106.

FIG. 334 illustrates testing results in grades for wetting time, absorption rate, wetted radius, spreading speed, accumulative one-way transport, and OMMC for 16041301, 16041302, 16041303, 16041304, 16041305, 16041306, 16042001, 16040101, and 16040106.

Figure 336:
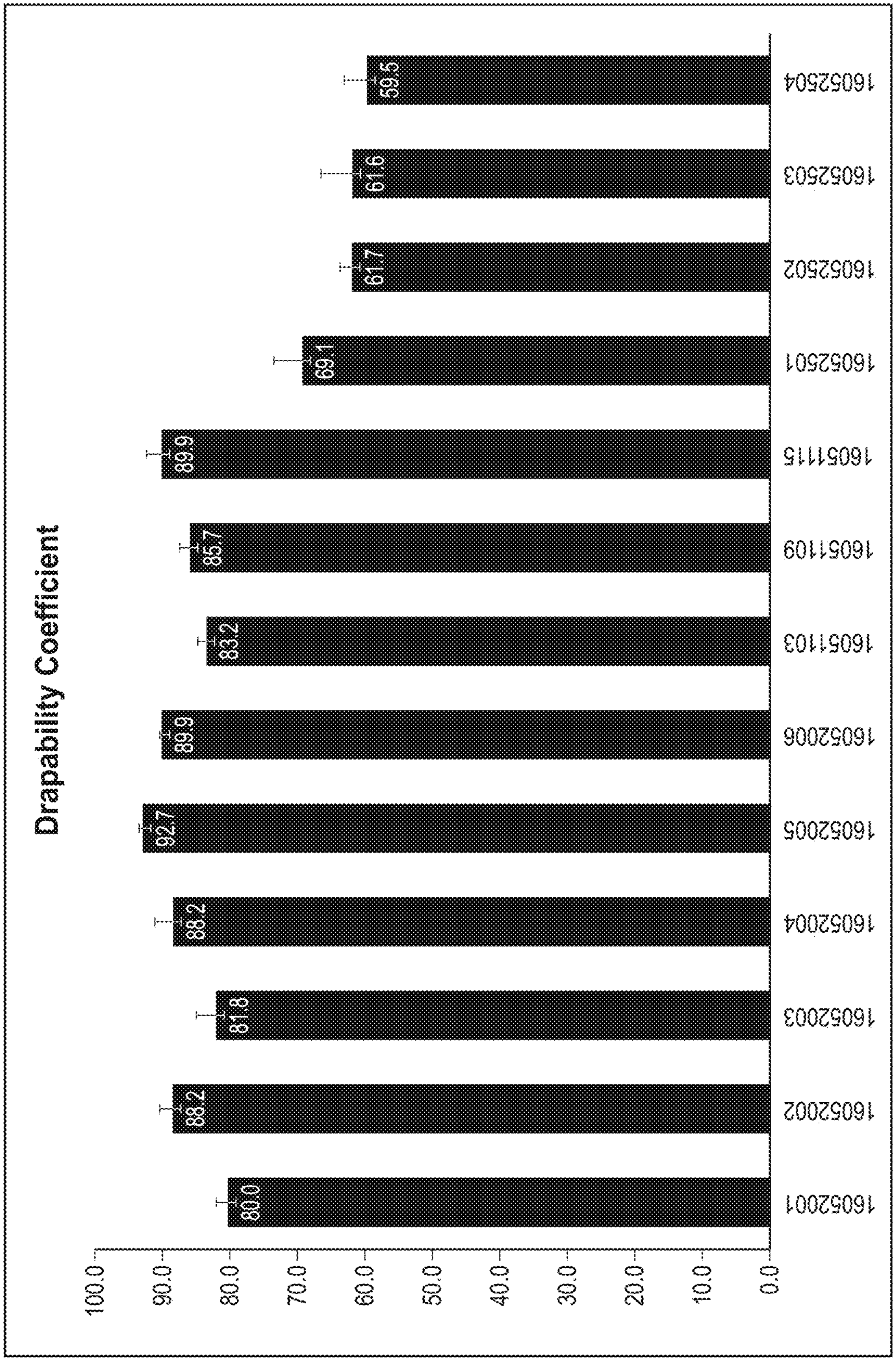

FIG. 335 illustrates a map of Liquid Moisture Management Test results for various coated fabrics described herein FIG. 336 illustrates drapability coefficient testing results for various SFS coated fabrics.

Figure 337:
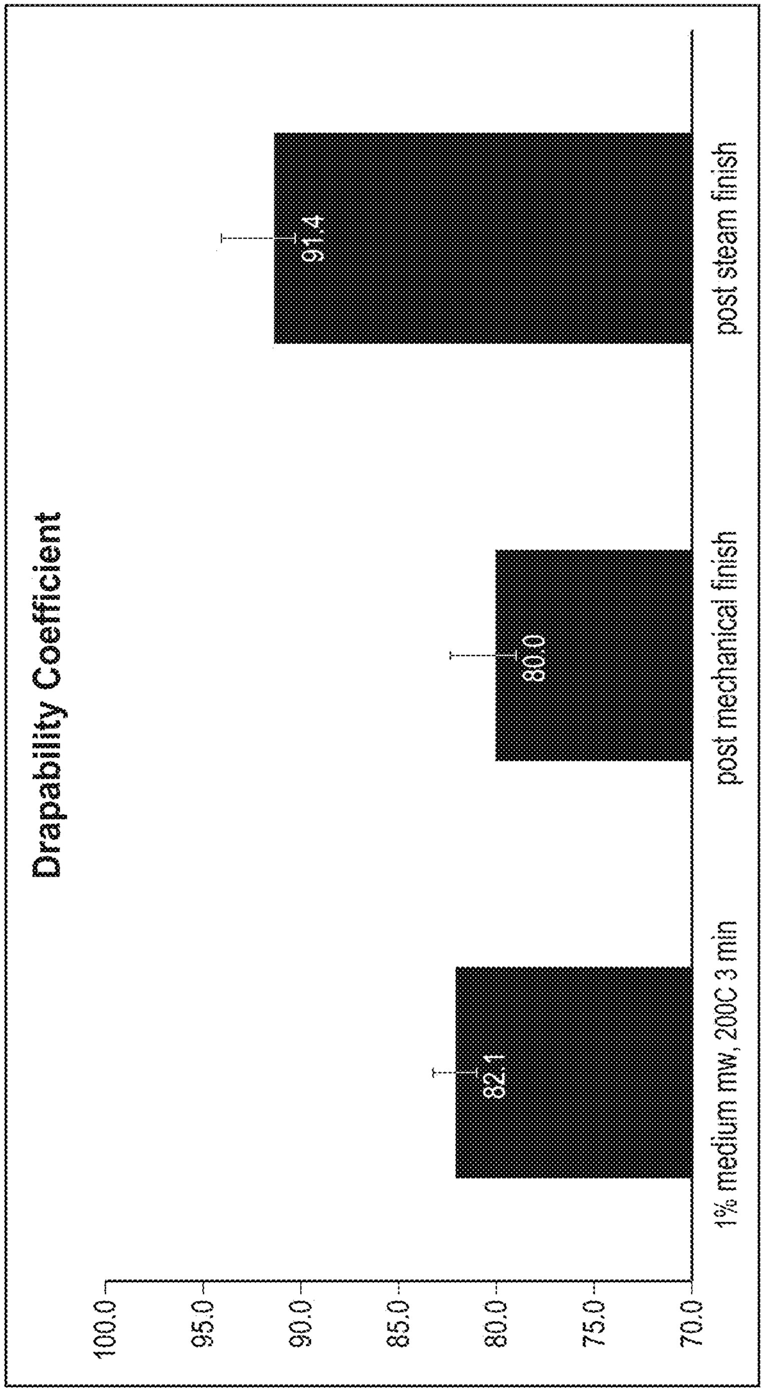

FIG. 337 illustrates drapability coefficient testing results for an SFS coated fabric after mechanical and steam finishing.

FIG. 338 illustrates the results of a solution depletion calculation during coating.

FIG. 339 illustrates samples used in moisture management testing.

FIG. 340 illustrates the results of moisture management testing.

FIG. 341 illustrates samples used in moisture management testing.

FIG. 342 illustrates the results of moisture management testing.

FIG. 343 illustrates samples used in moisture management testing.

FIG. 344 illustrates the results of moisture management testing.

FIG. 345 illustrates samples used in antimicrobial testing.

FIG. 346 illustrates the results of antimicrobial testing.

Figure 347:
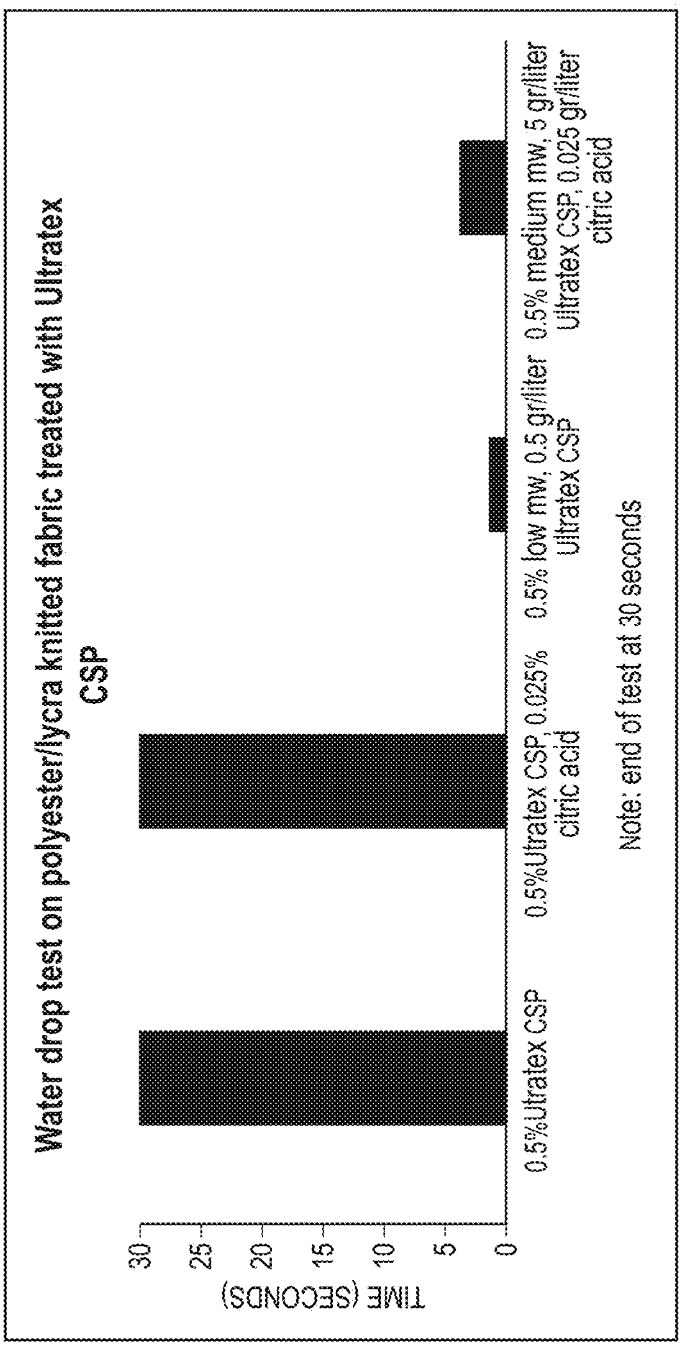

FIG. 347 illustrates the results of a water drop test on polyester/lycra knitted fabric treated with Ultratex CSP.

Figure 348:
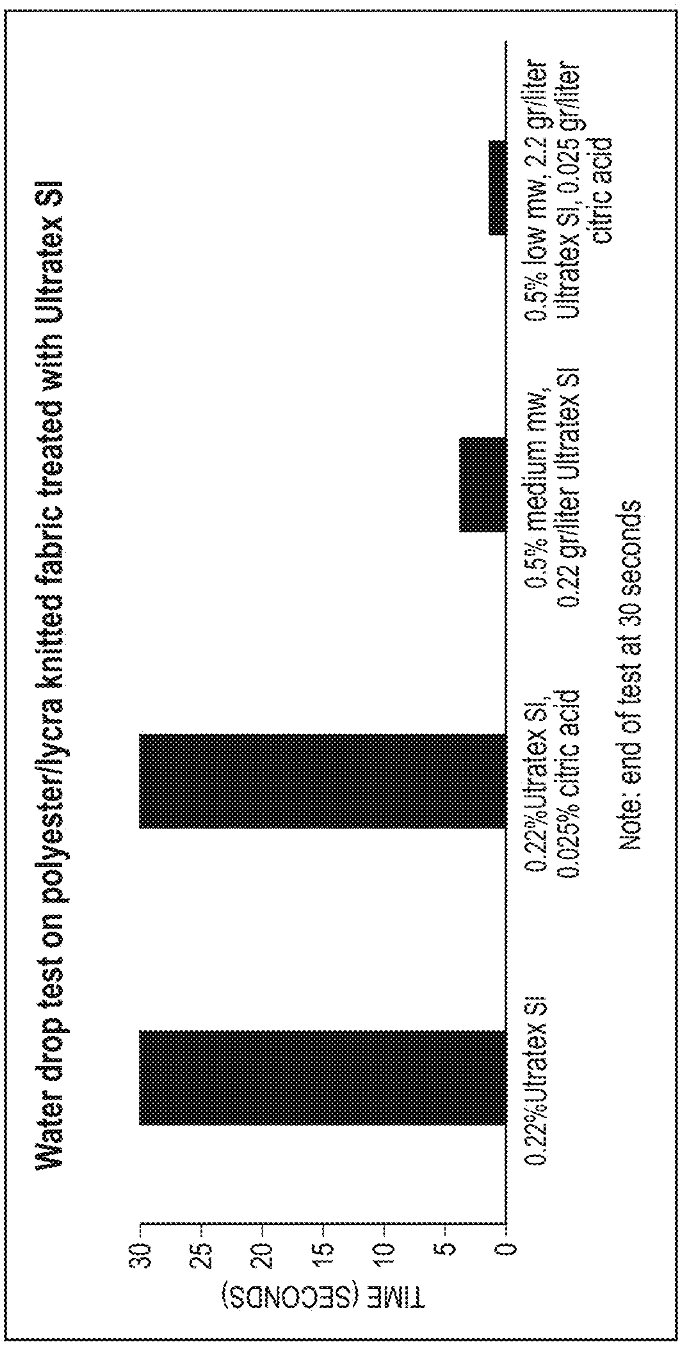

FIG. 348 illustrates the results of a water drop test on polyester/lycra knitted fabric treated with Ultratex SI.

FIG. 349 represents a table that describes test variables for an antibacterial study.

FIG. 350 represents a table that describes the study intervals for an antibacterial study.

FIG. 351 represents a table that describes the additional fabric bacteria load after washing cycles for an antibacterial study. For example, after 1 washing cycle the additional fabric will receive $4\times10^7$ of bacteria load.

FIGS. 352A and 352B represent tables that describes parameters and results for an antibacterial study.

Figure 353:

FIG. 353 illustrates an image of bacterial colonies for sample 16060901 after washing.

Figure 354:
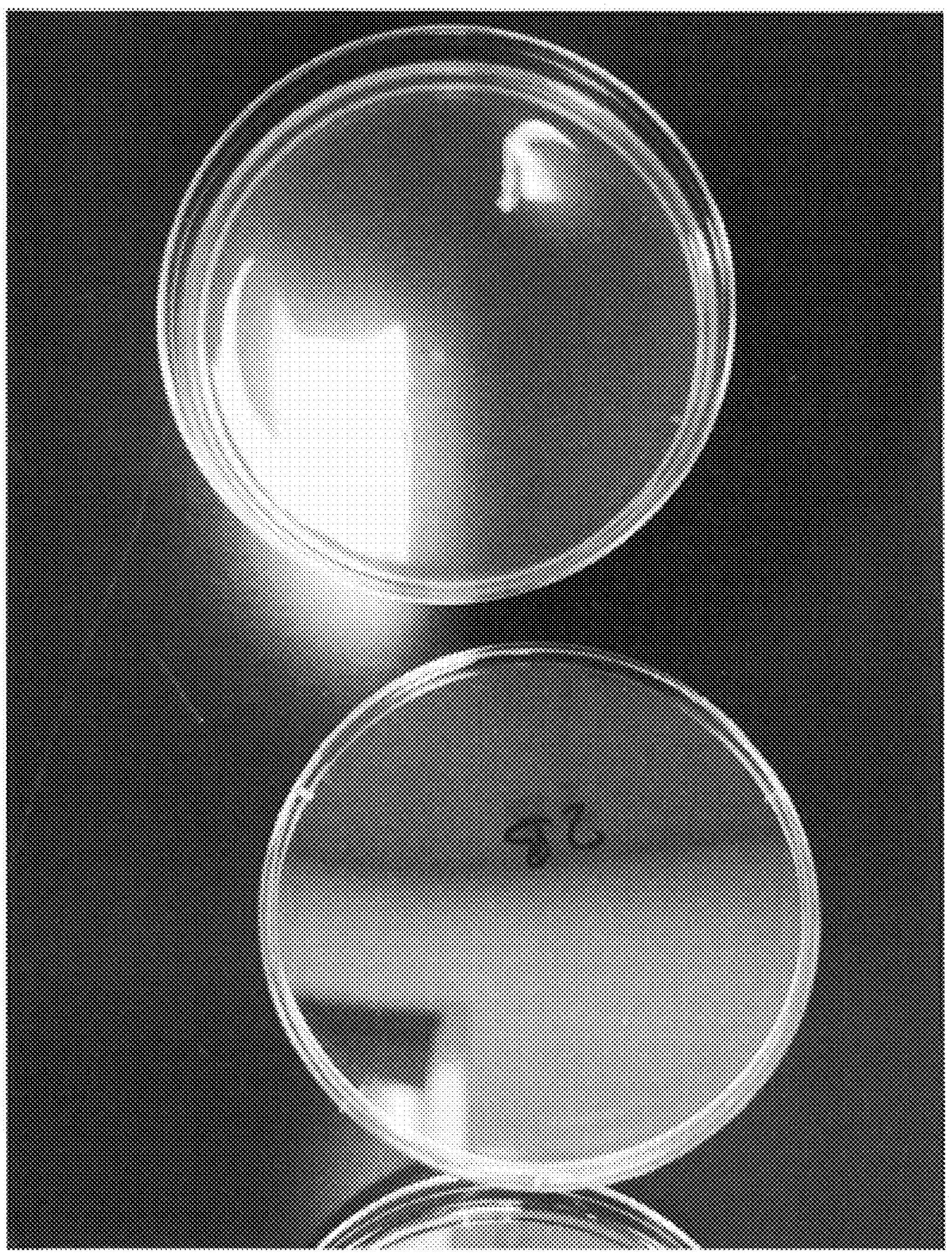

FIG. 354 illustrates an image of bacterial colonies for sample 16060902 after washing.

Figure 355:
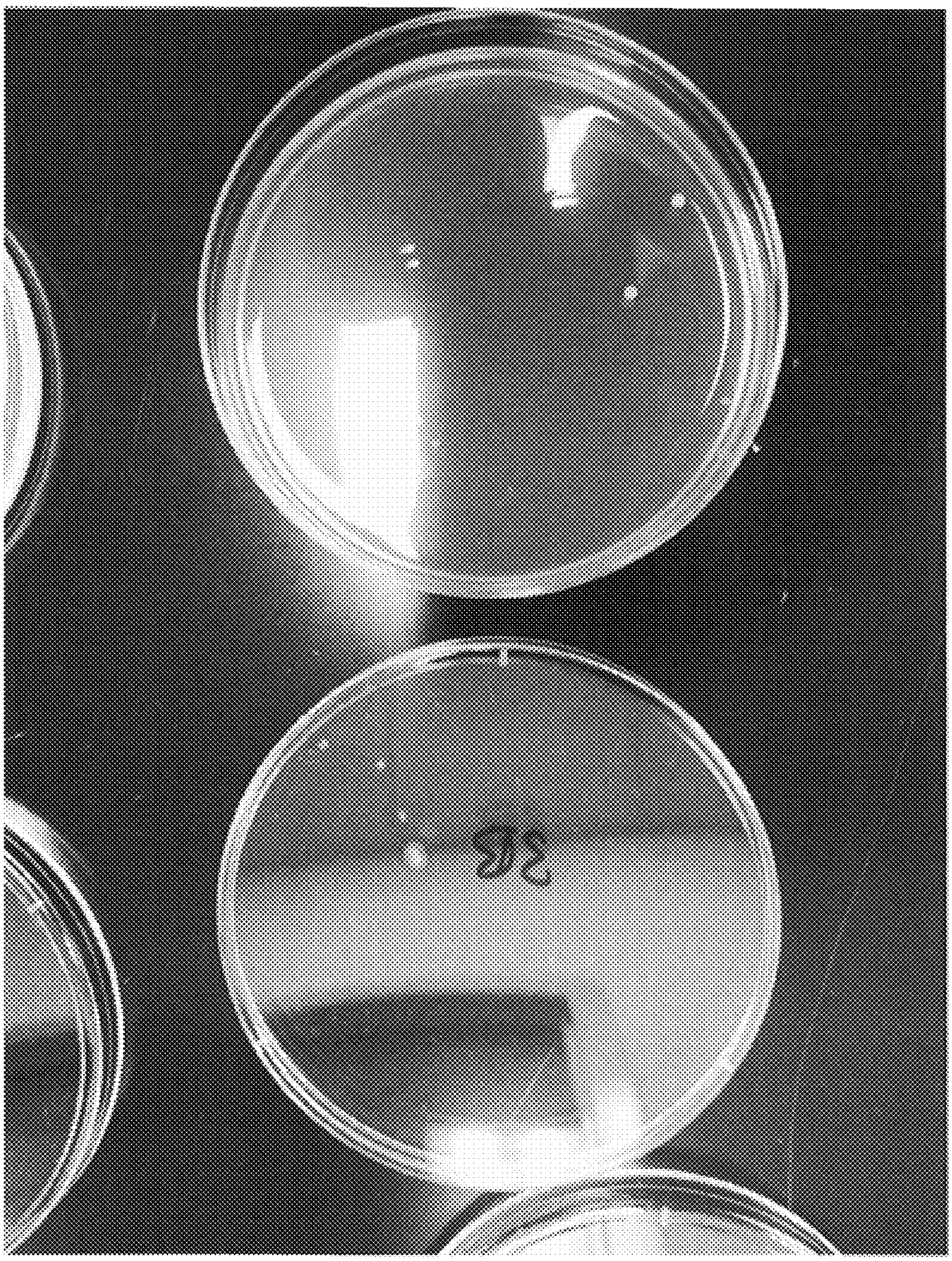

FIG. 355 illustrates an image of bacterial colonies for sample 16060903 after washing.

Figure 356:
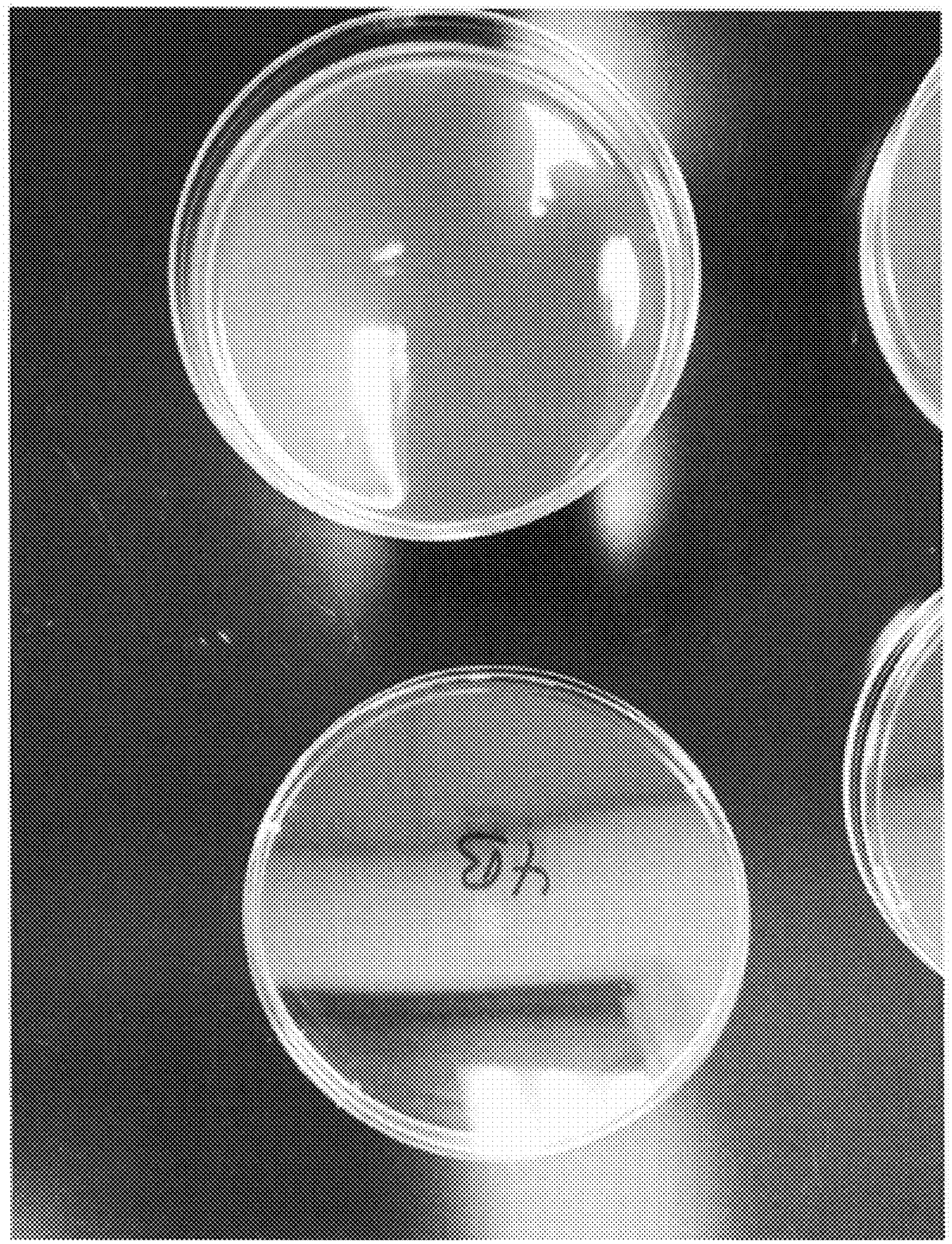

FIG. 356 illustrates an image of bacterial colonies for sample 16060904 after washing.

Figure 357:

FIG. 357 illustrates an image of bacterial colonies for a control.

Figure 358:
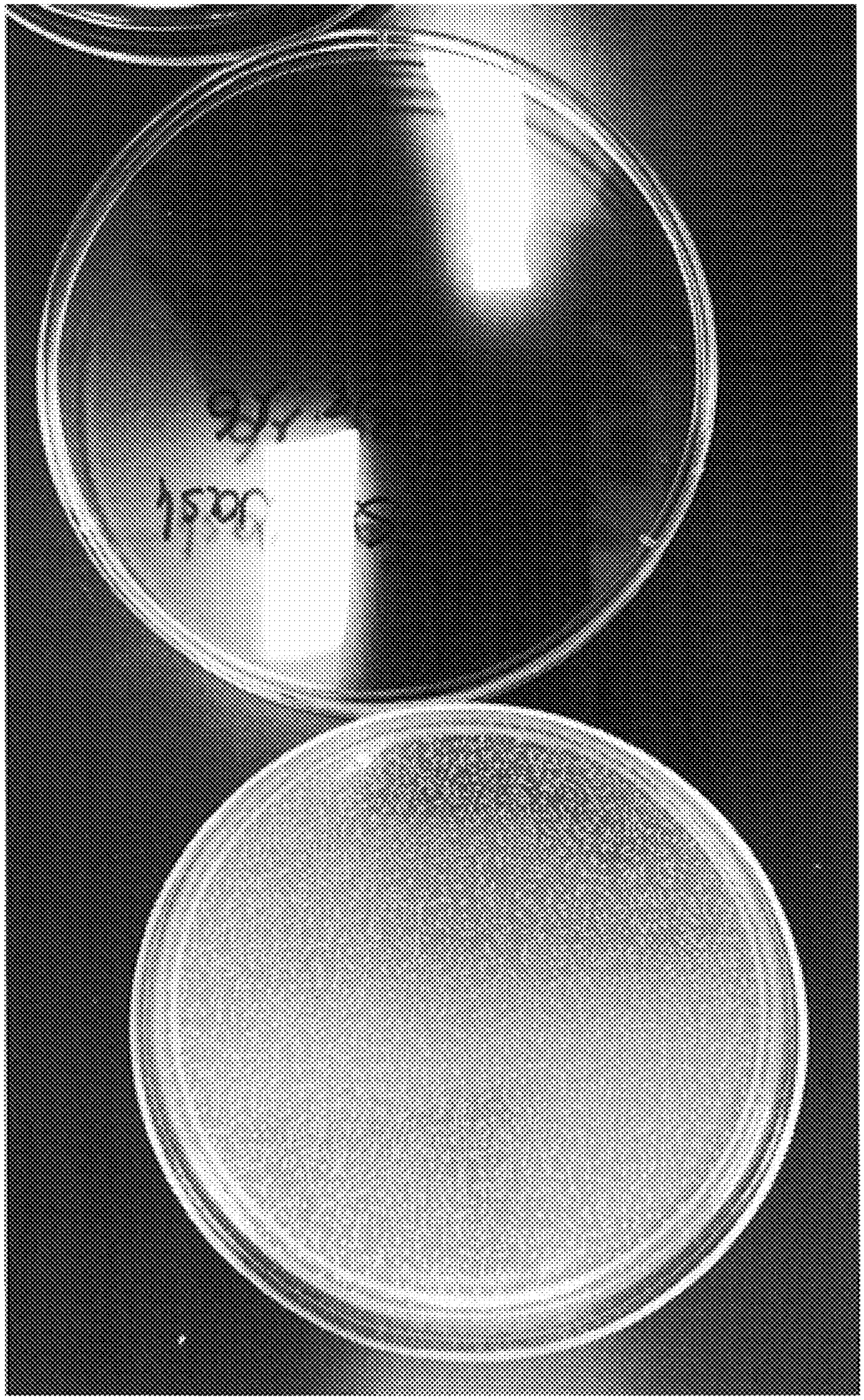

FIG. 358 illustrates an image of bacterial colonies for a control.

Figure 359A:
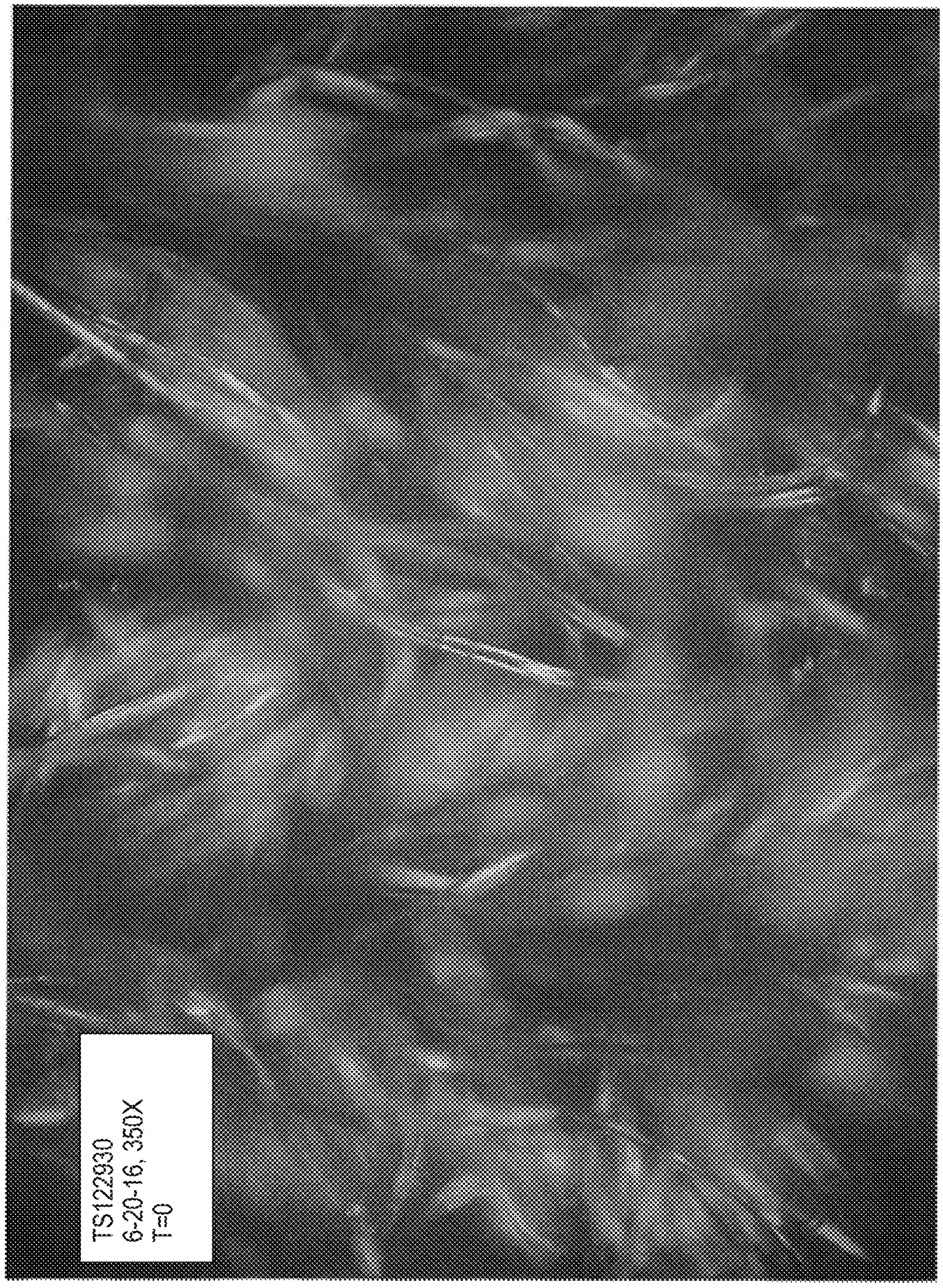
Figure 359B:
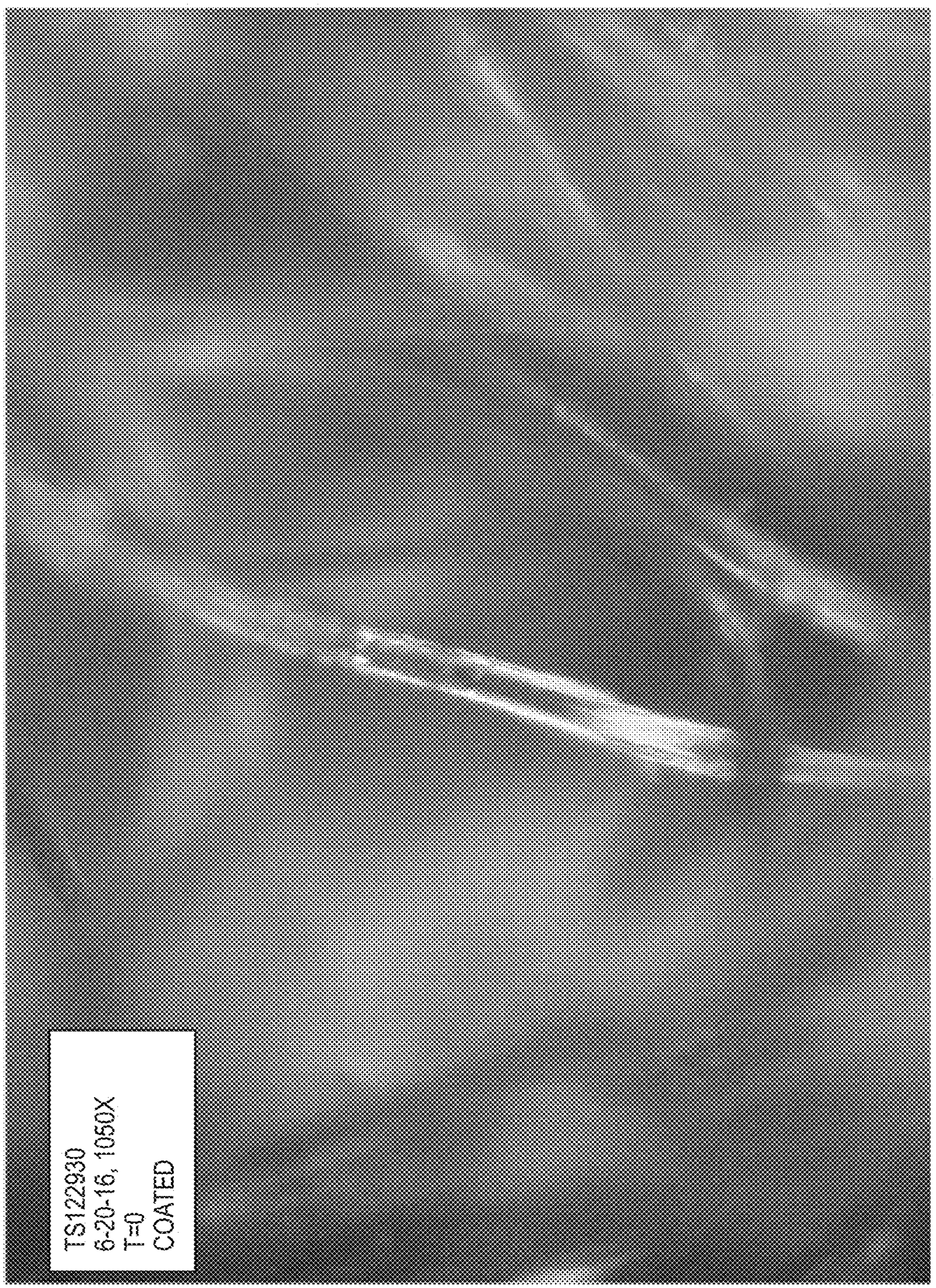
Figure 359C:
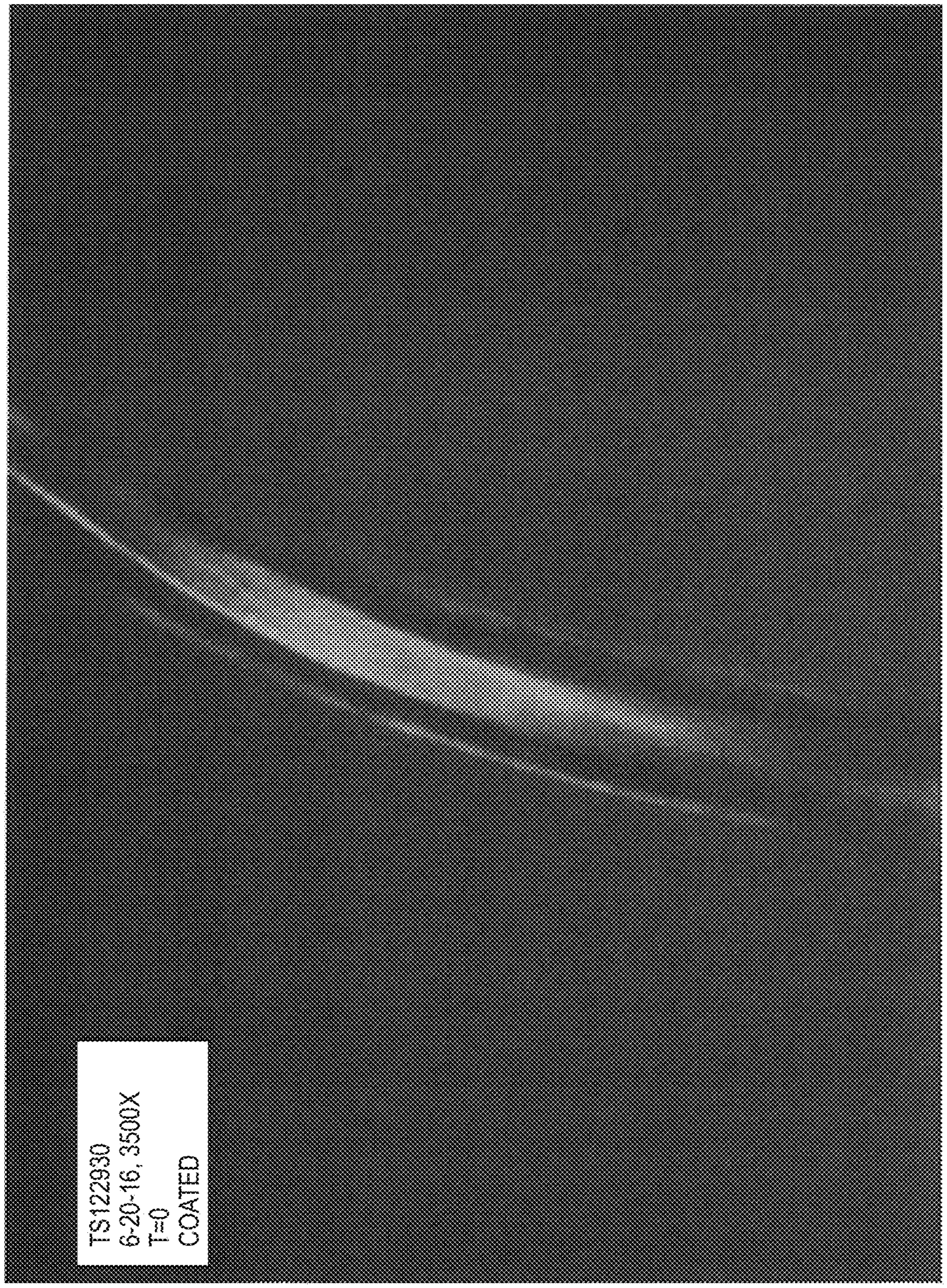

FIGS. 359A to 359C illustrate a microscopic image of coated fabric sample 16060901 at (A) 350× magnification, (B) 1050× magnification, and (C) 3500× magnification, before any wash cycles.

Figure 360A:
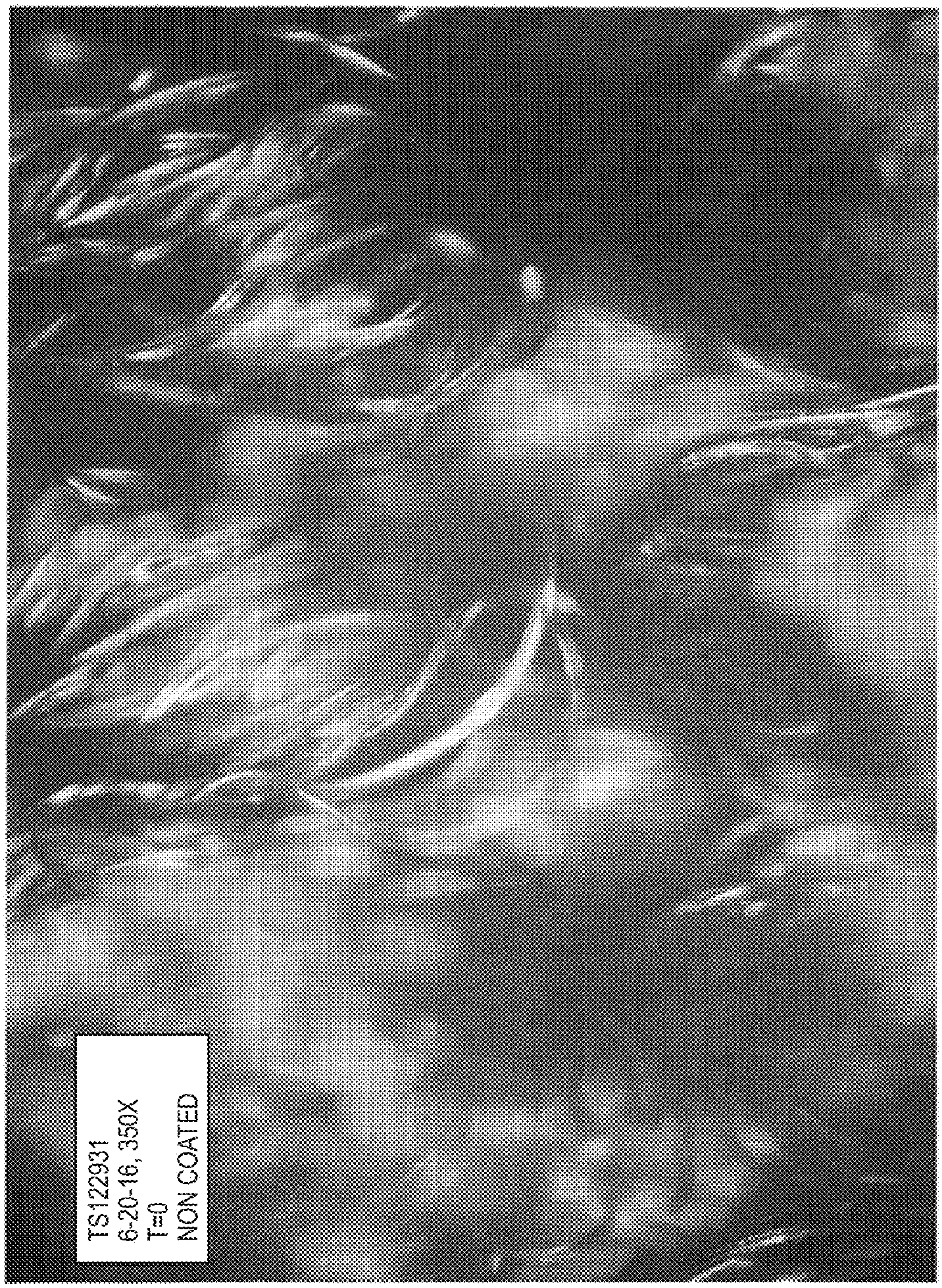
Figure 360B:
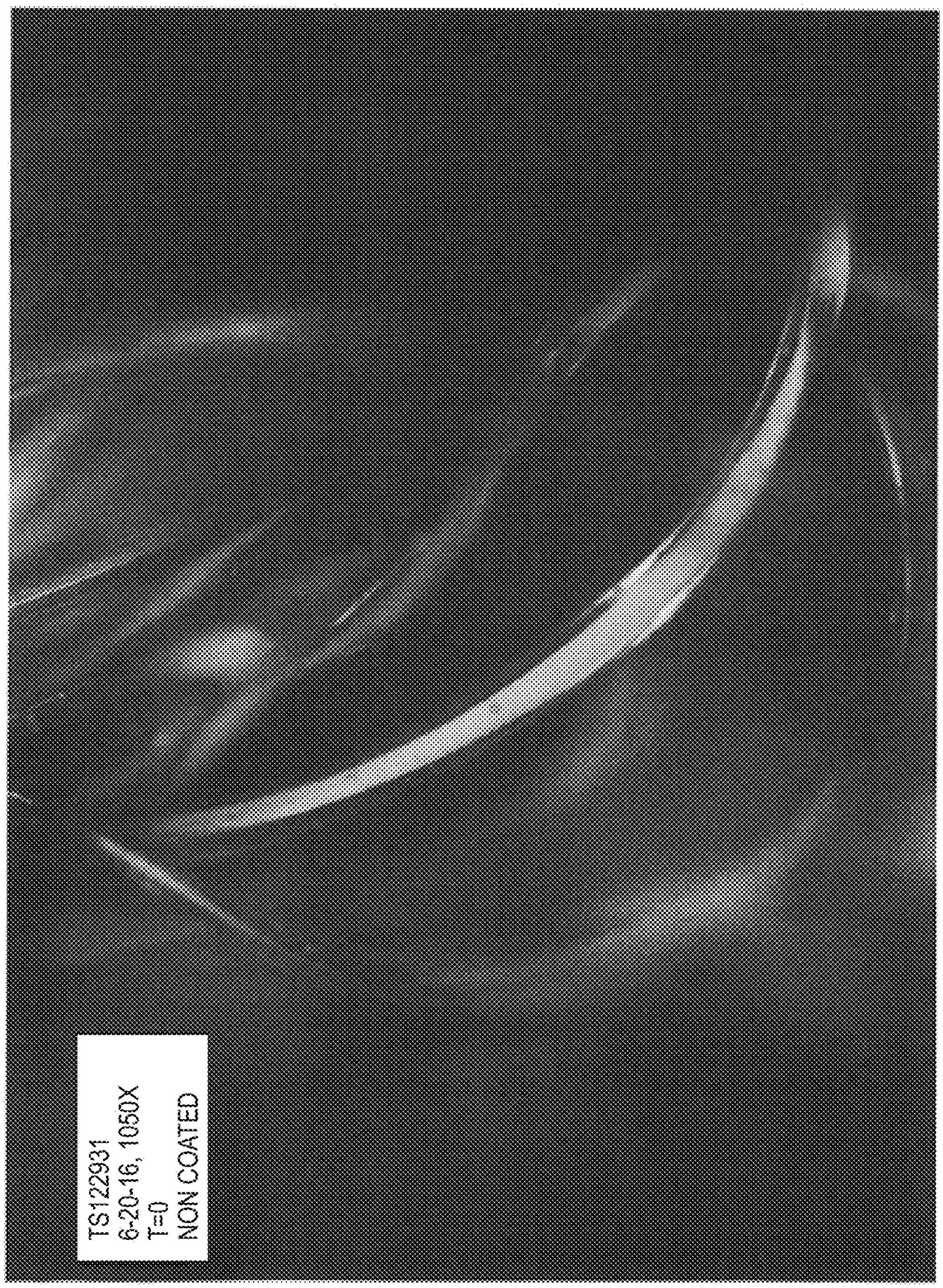
Figure 360C:
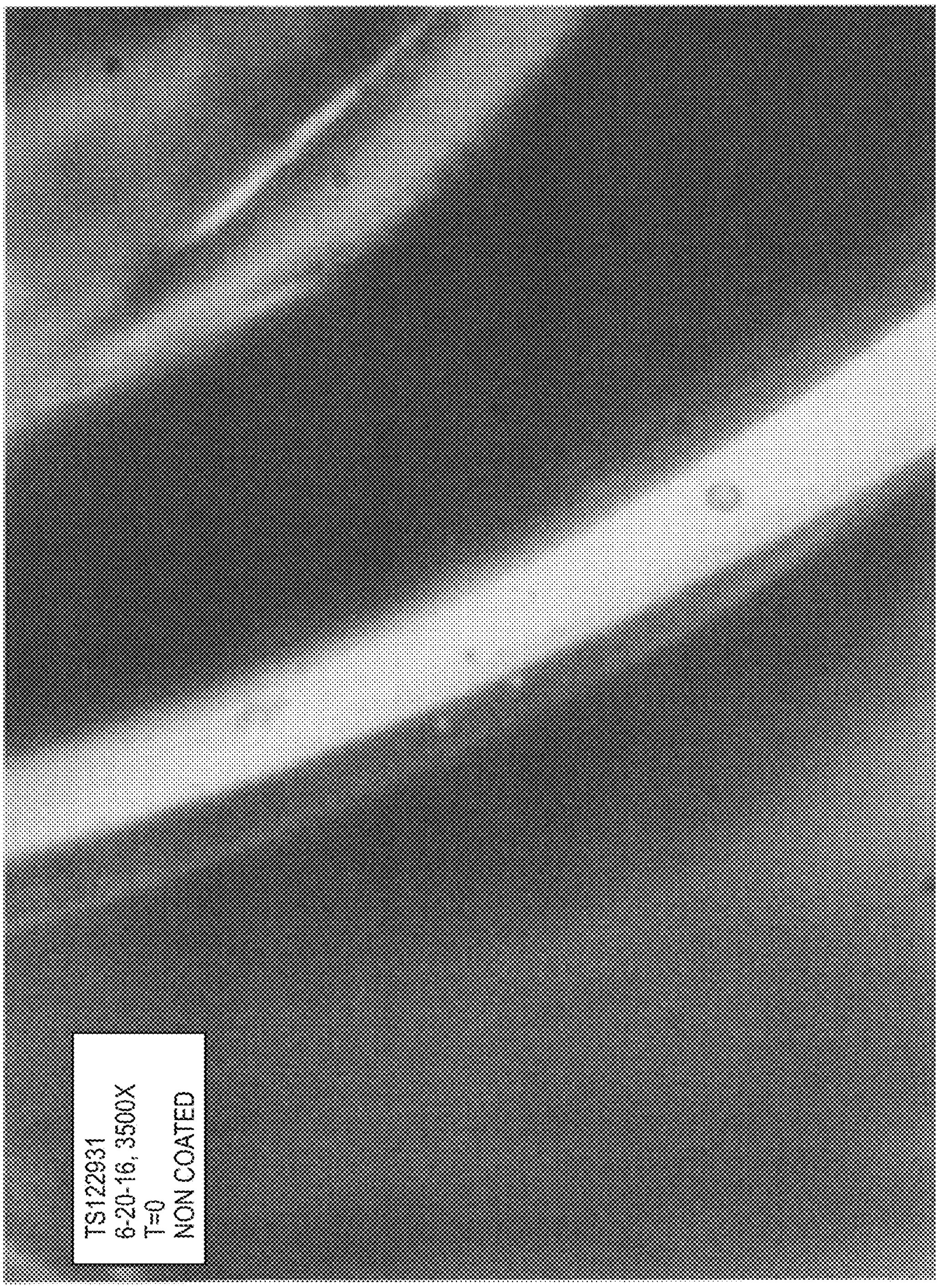

FIGS. 360A to 360C illustrate a microscopic image of coated fabric sample 16060902 at (A) 350× magnification, (B) 1050× magnification, and (C) 3500× magnification, before any wash cycles.

Figure 361A:
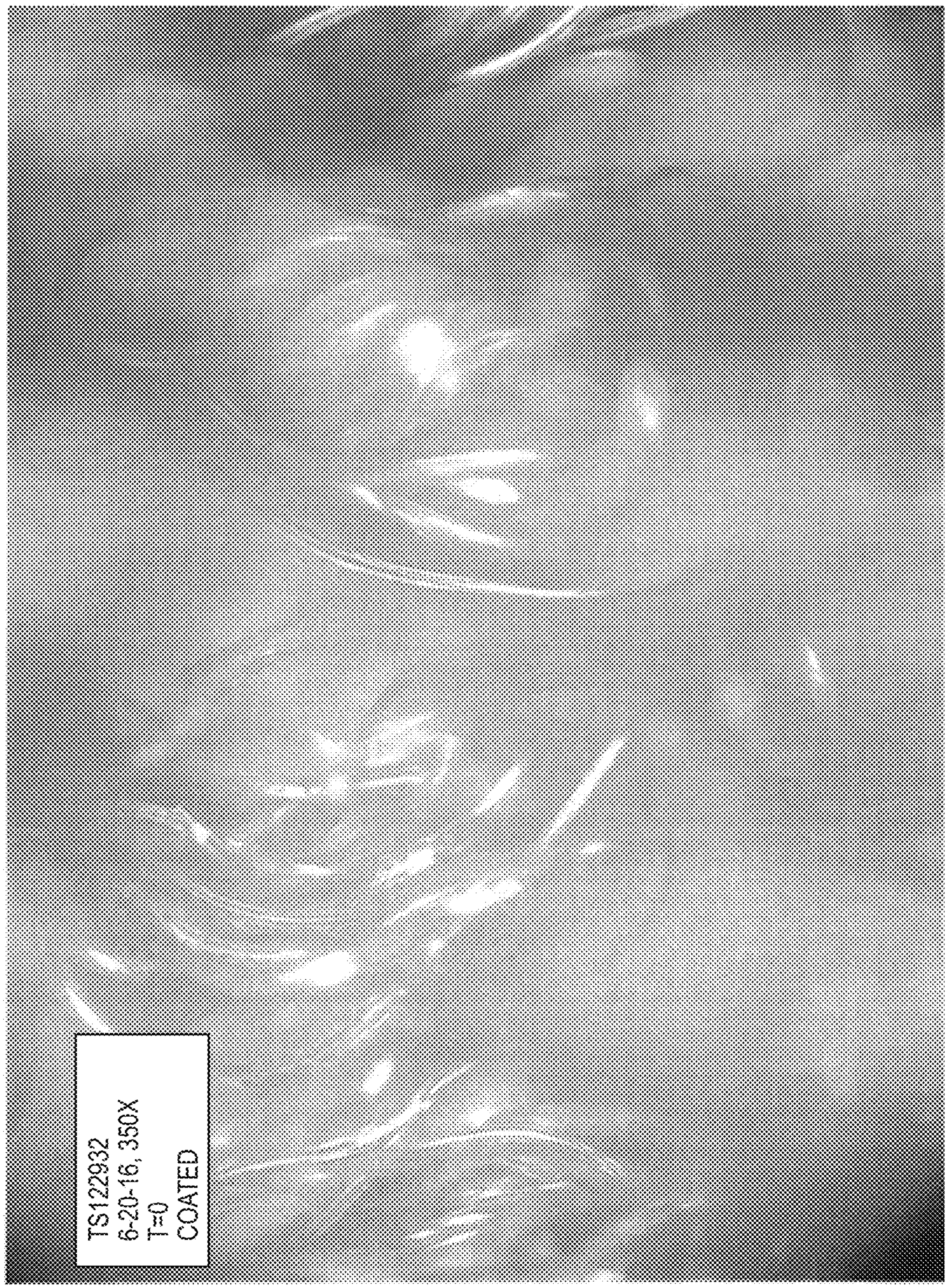
Figure 361B:
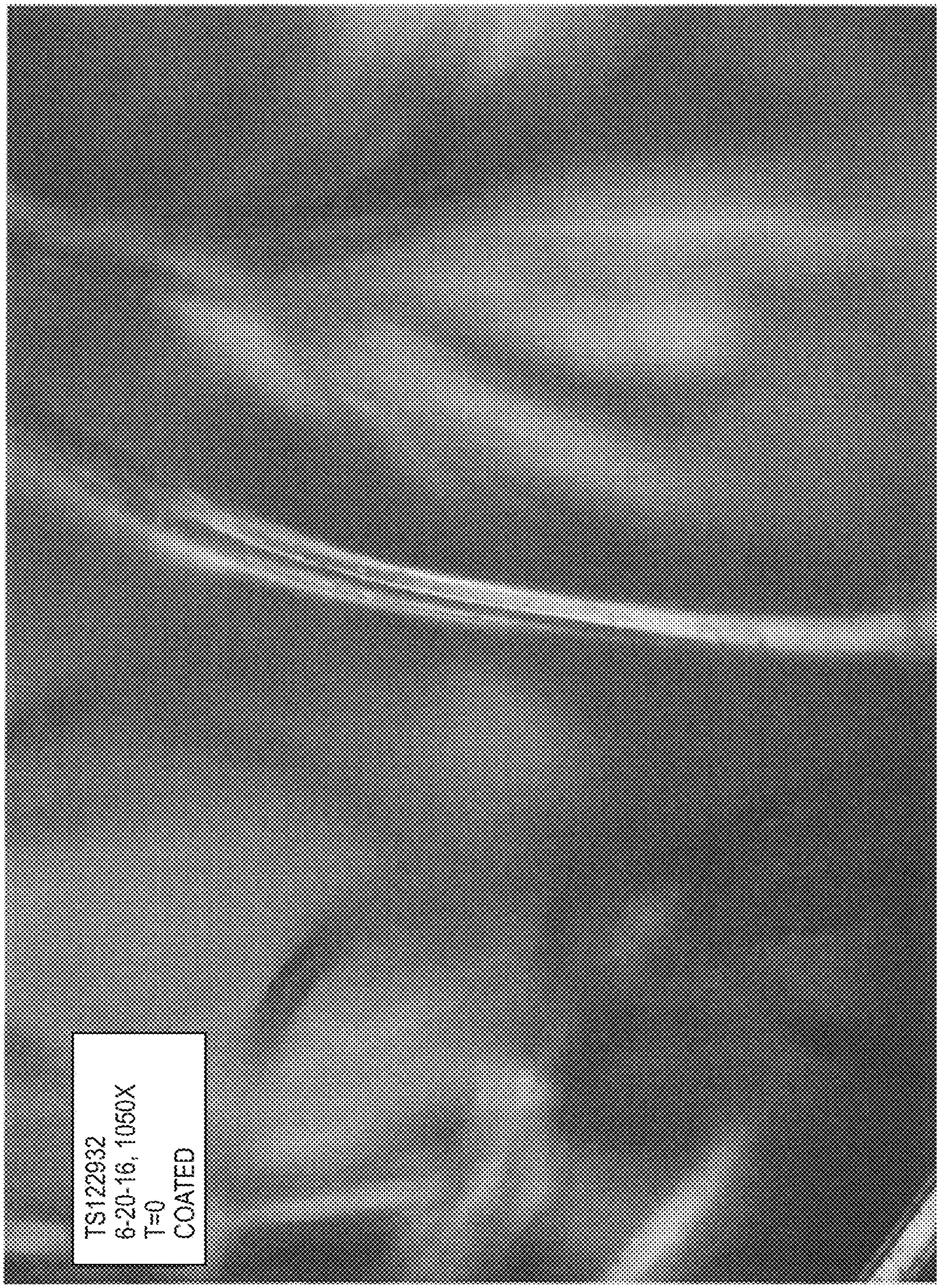
Figure 361C:

FIGS. 361A to 361C illustrate a microscopic image of coated fabric sample 16060903 at (A) 350× magnification, (B) 1050× magnification, and (C) 3500× magnification, before any wash cycles.

Figure 362A:
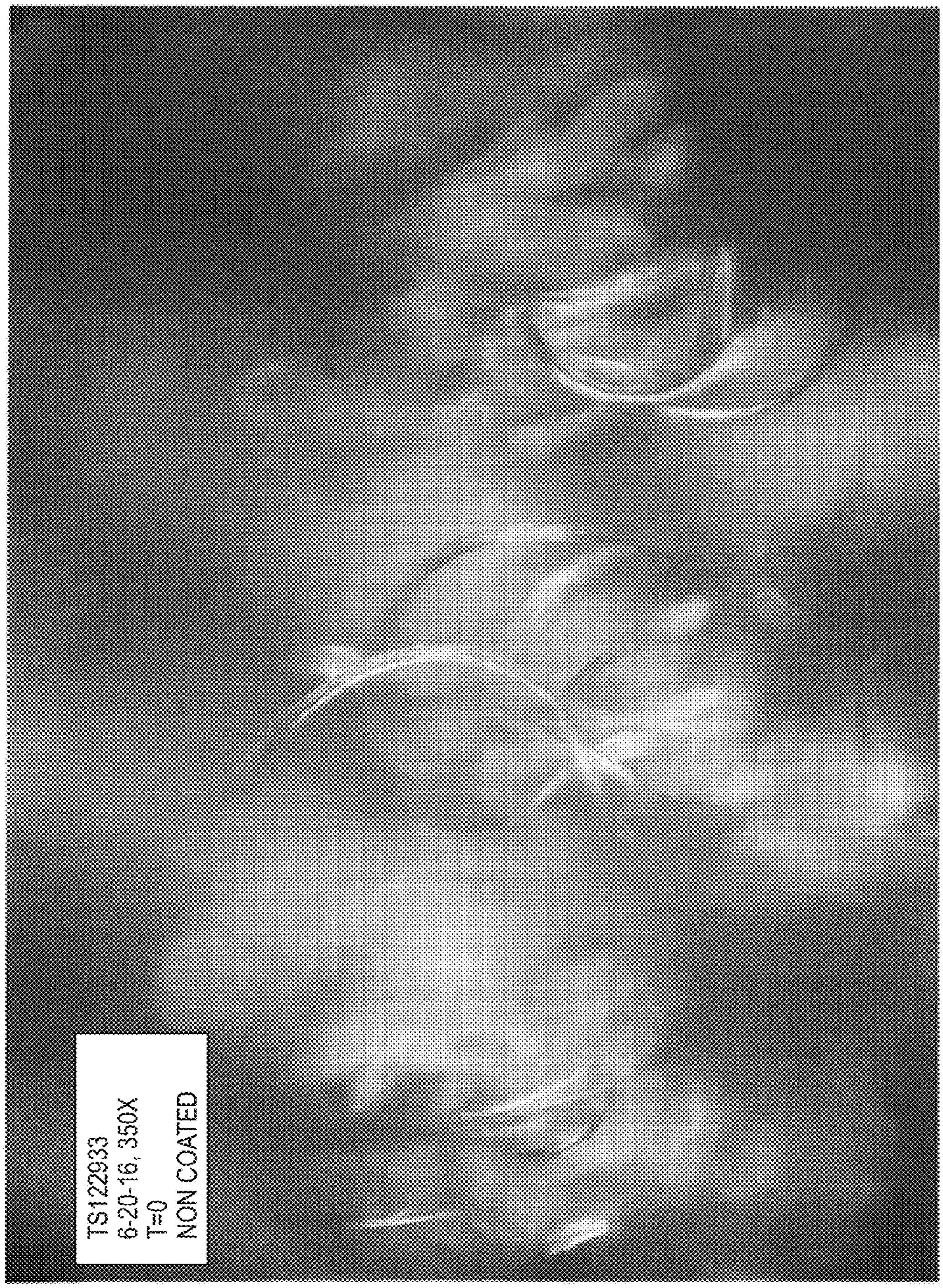
Figure 362B:
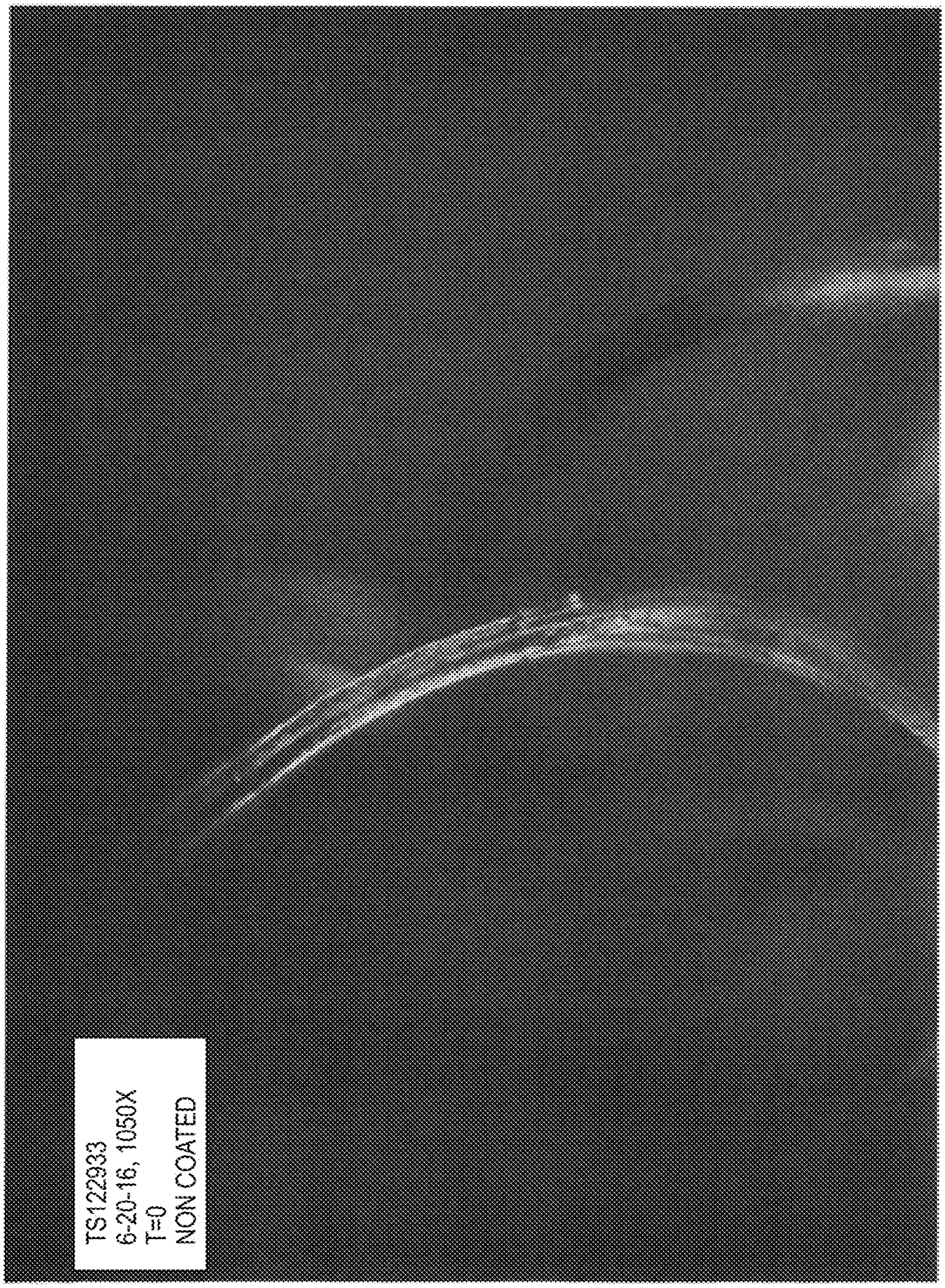
Figure 362C:

FIGS. 362A to 362C illustrate a microscopic image of coated fabric sample 16060904 at (A) 350× magnification, (B) 1050× magnification, and (C) 3500× magnification, before any wash cycles.

Figure 363A:
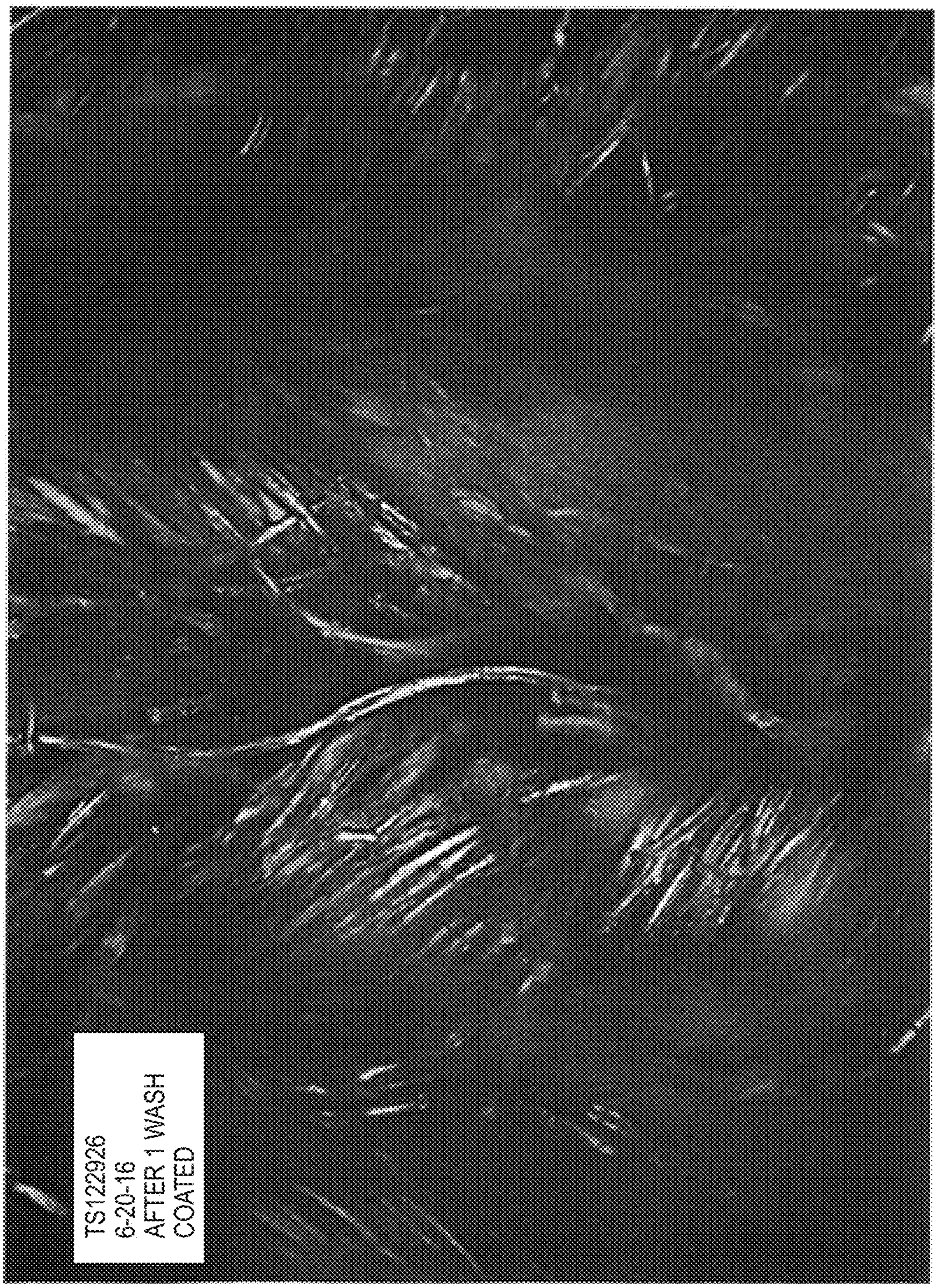
Figure 363B:
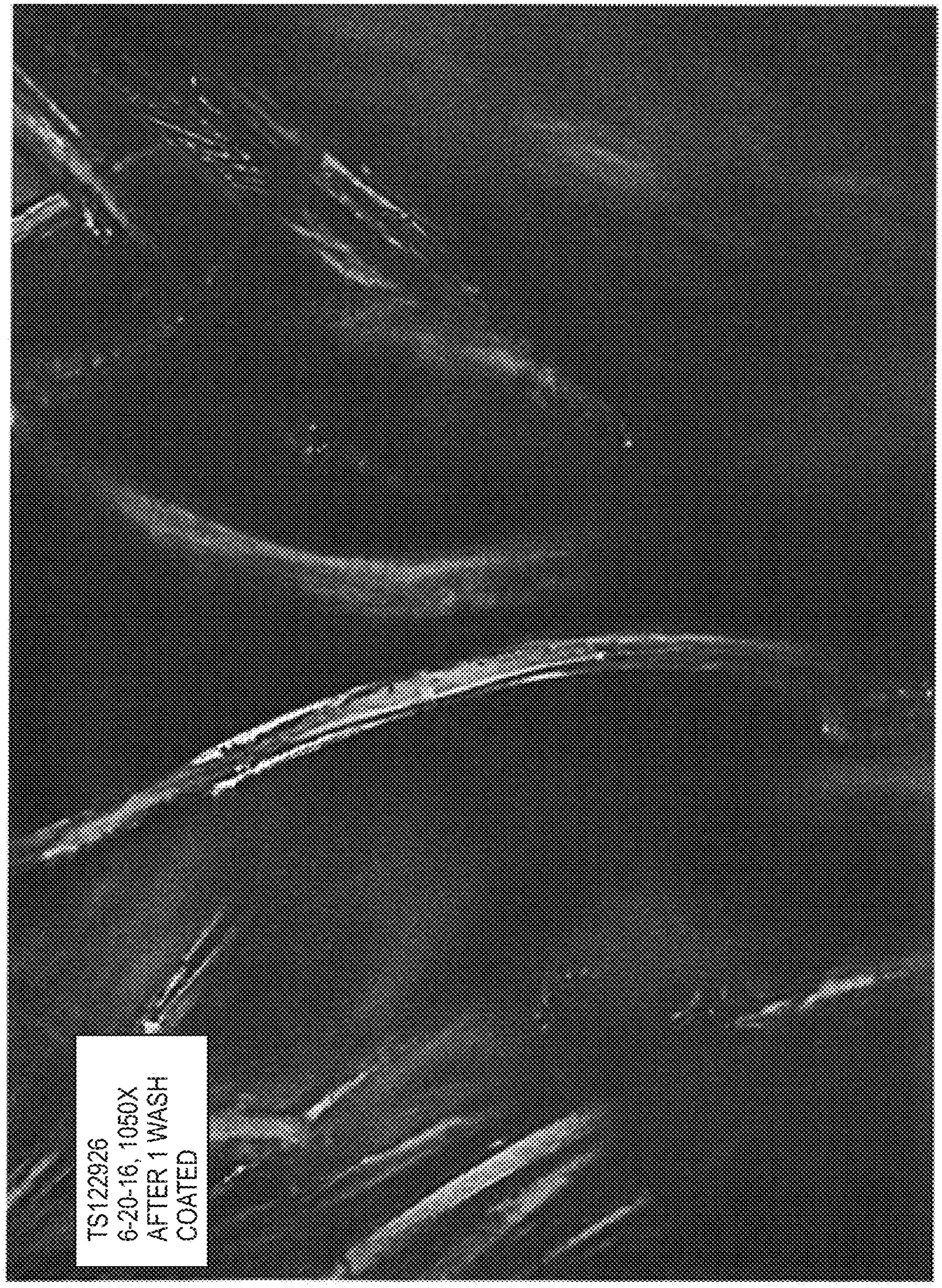
Figure 363C:
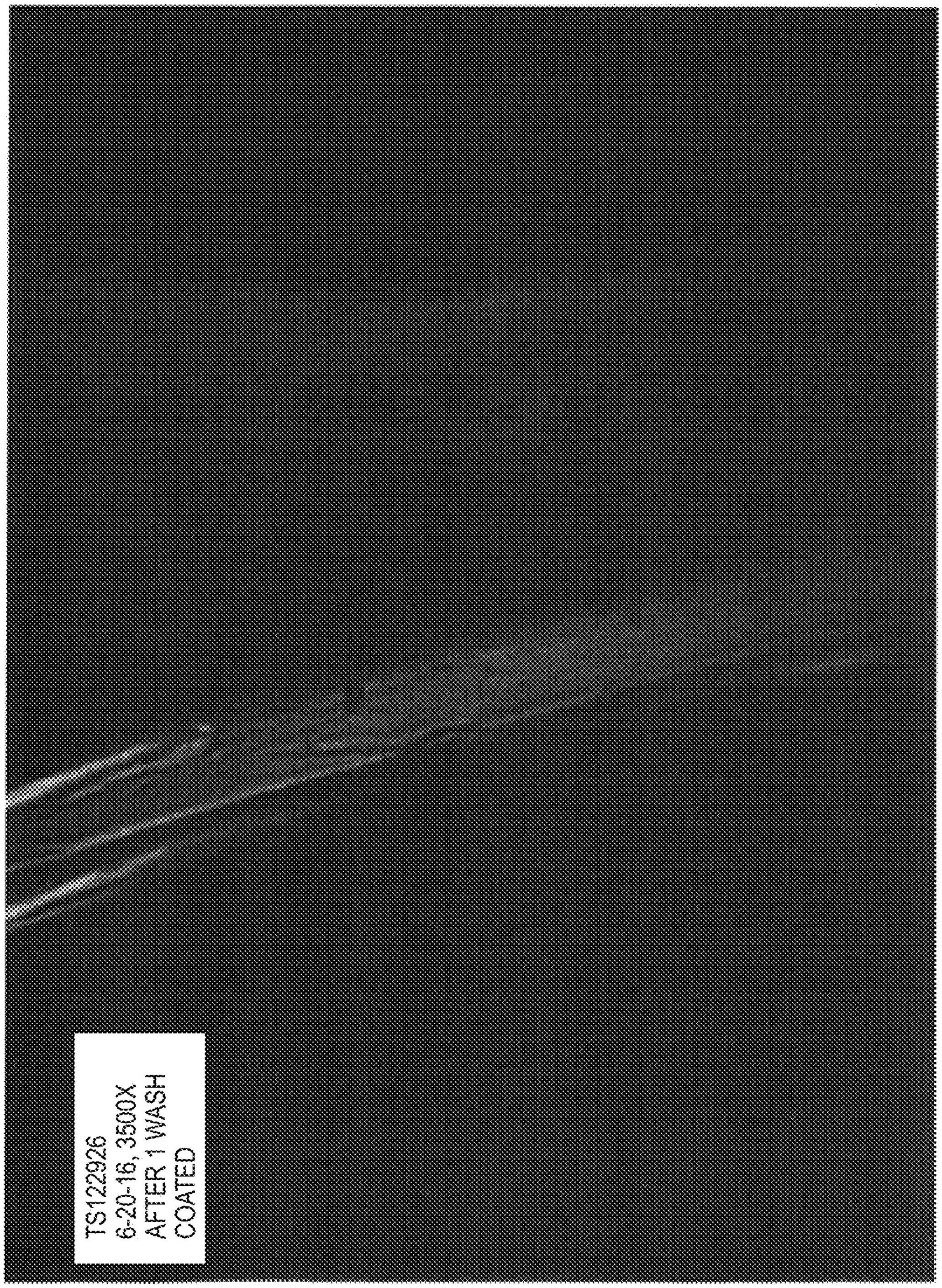

FIGS. 363A to 363C illustrate a microscopic image of coated fabric sample 16060901 at (A) 350× magnification, (B) 1050× magnification, and (C) 3500× magnification, after one wash cycle.

Figure 364A:
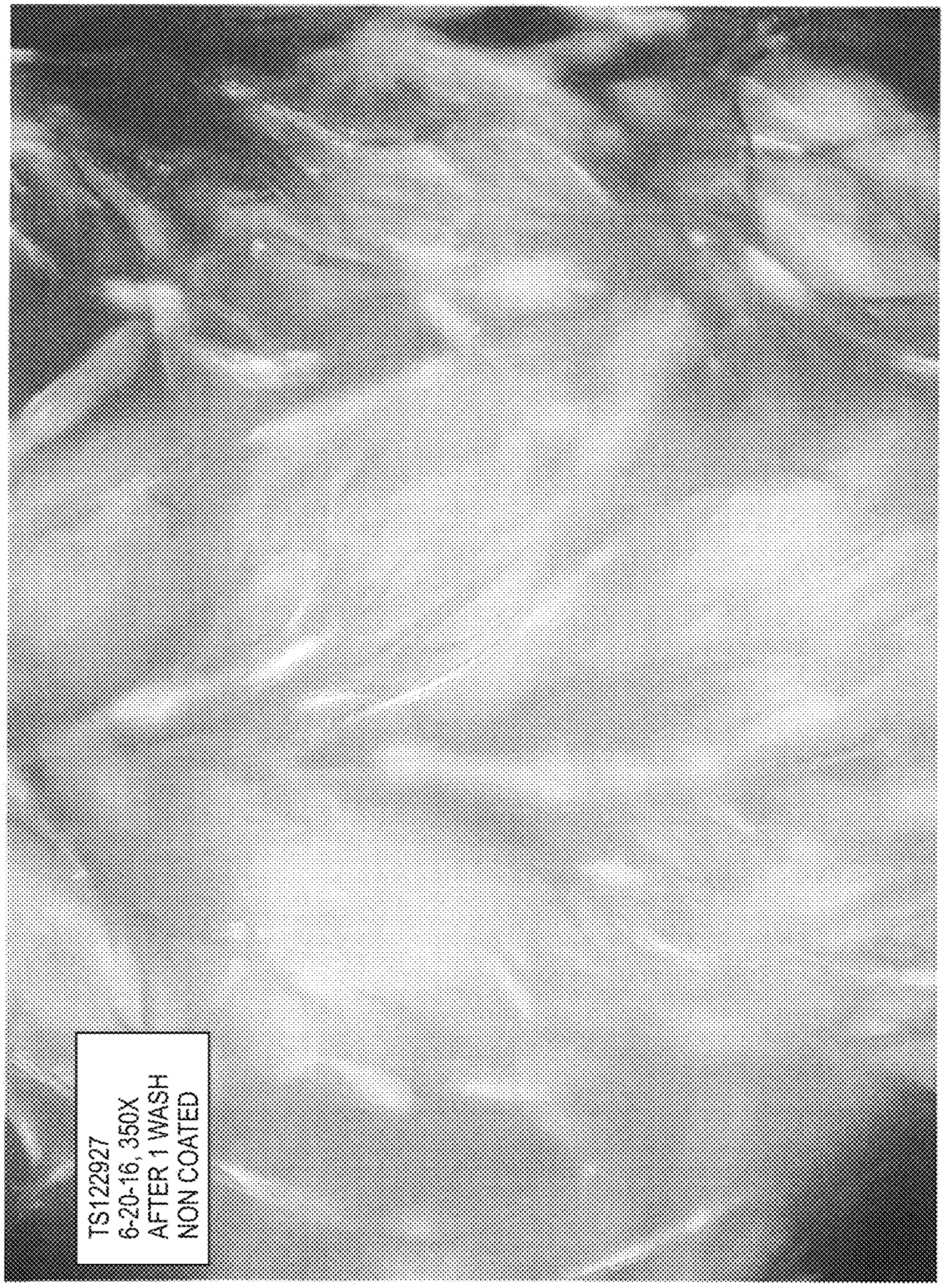
Figure 364B:
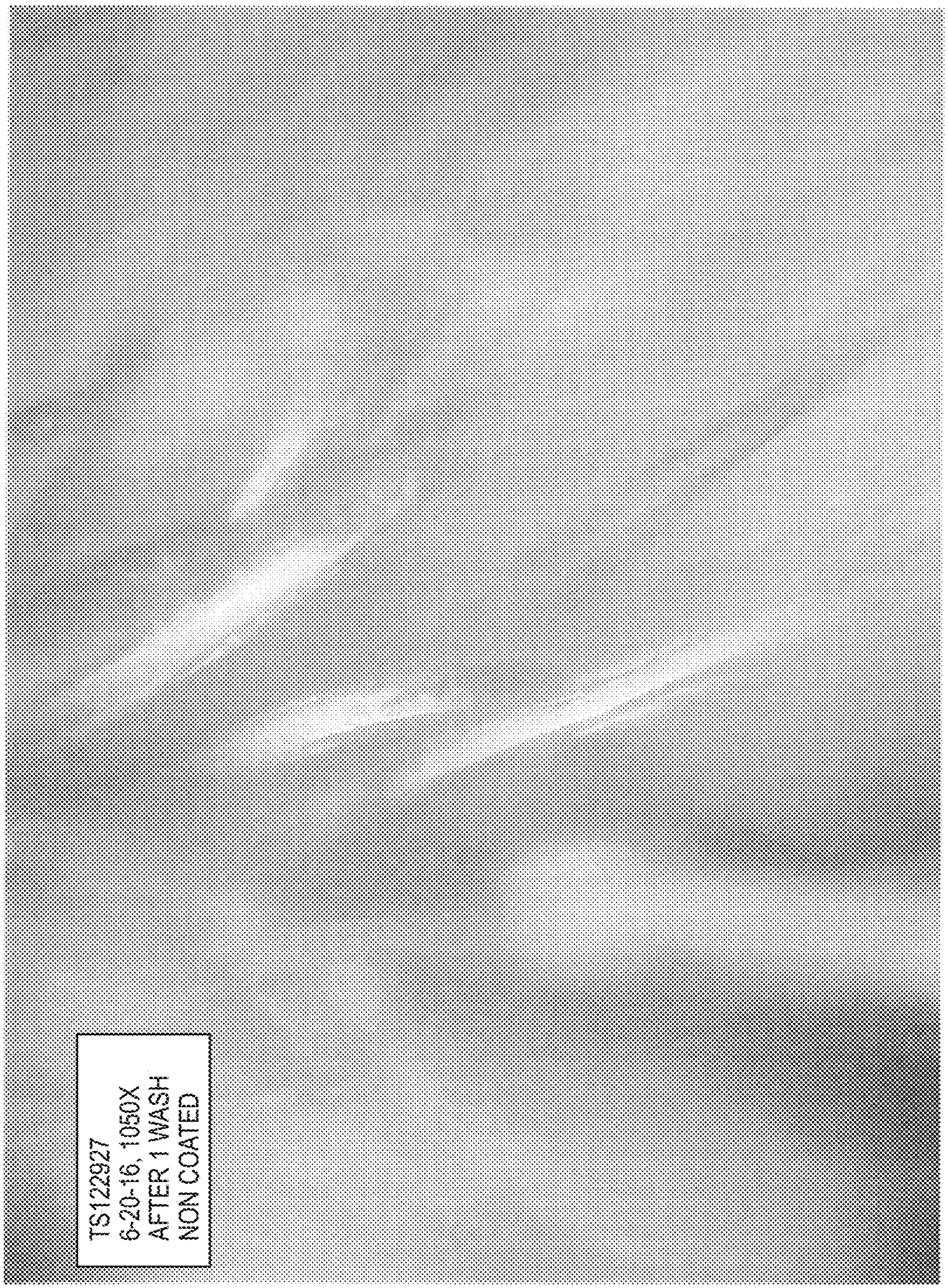
Figure 364C:
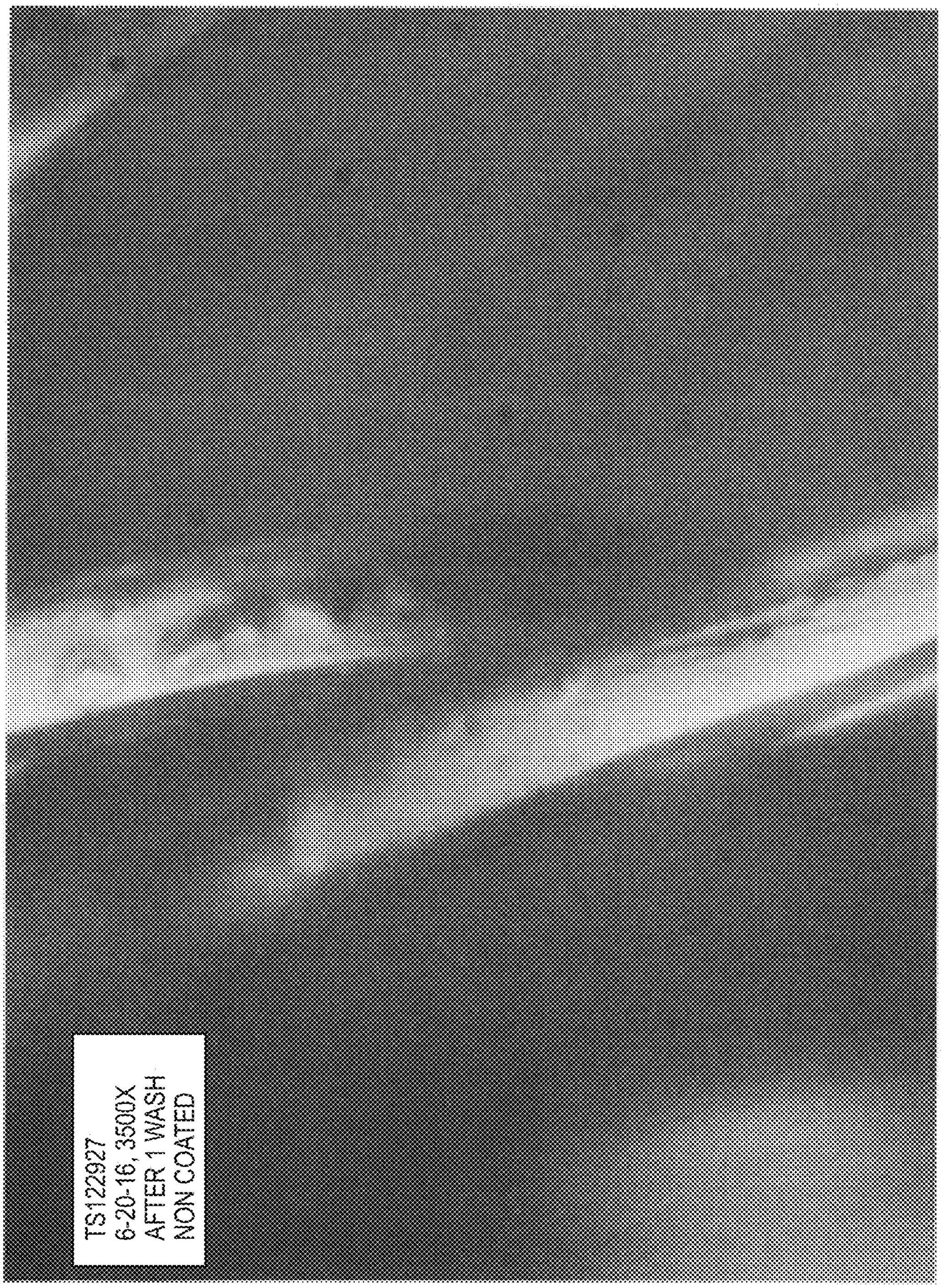

FIGS. 364A to 364C illustrate a microscopic image of coated fabric sample 16060902 at (A) 350× magnification, (B) 1050× magnification, and (C) 3500× magnification, after one wash cycle.

Figure 365A:
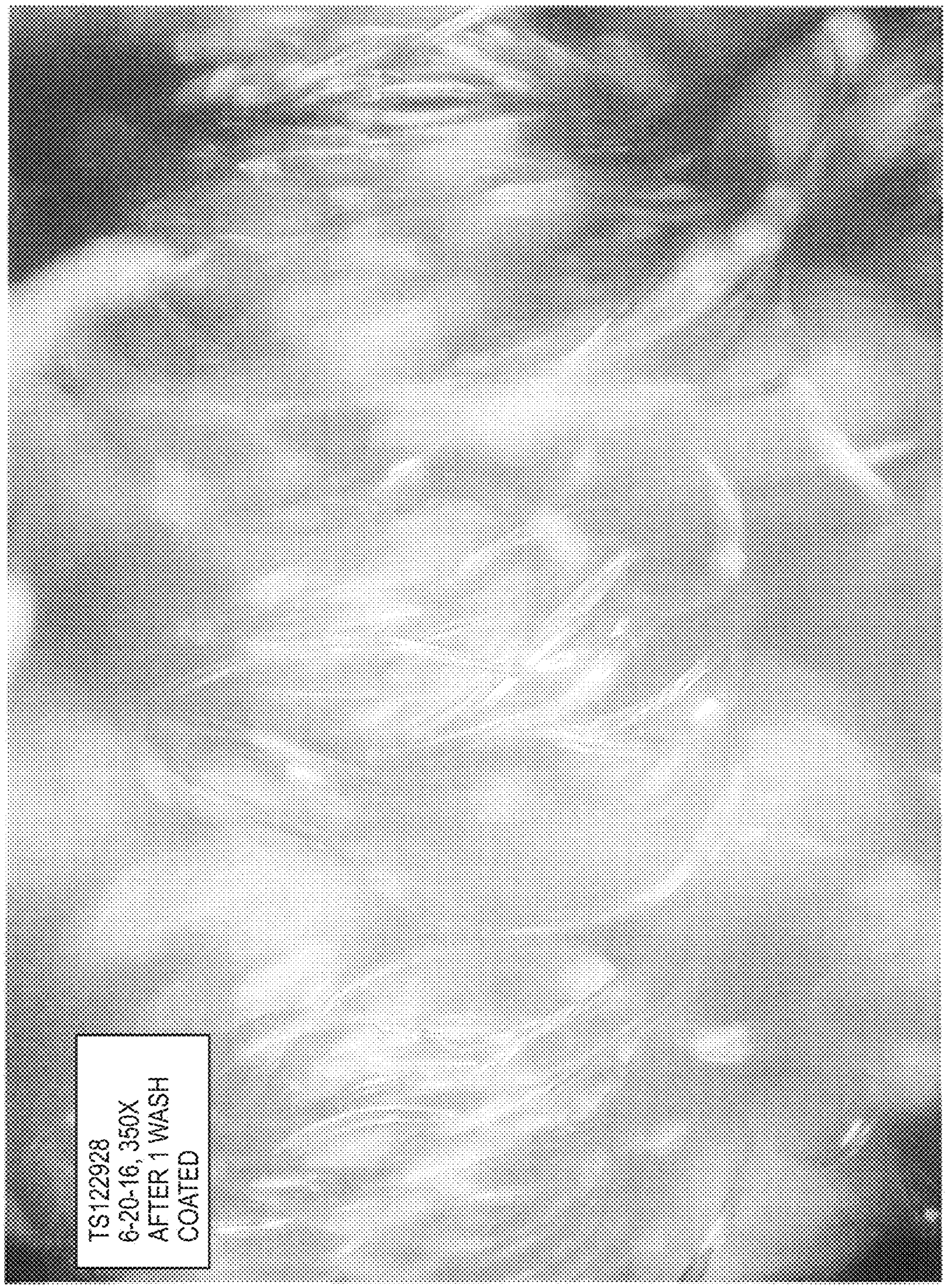
Figure 365B:
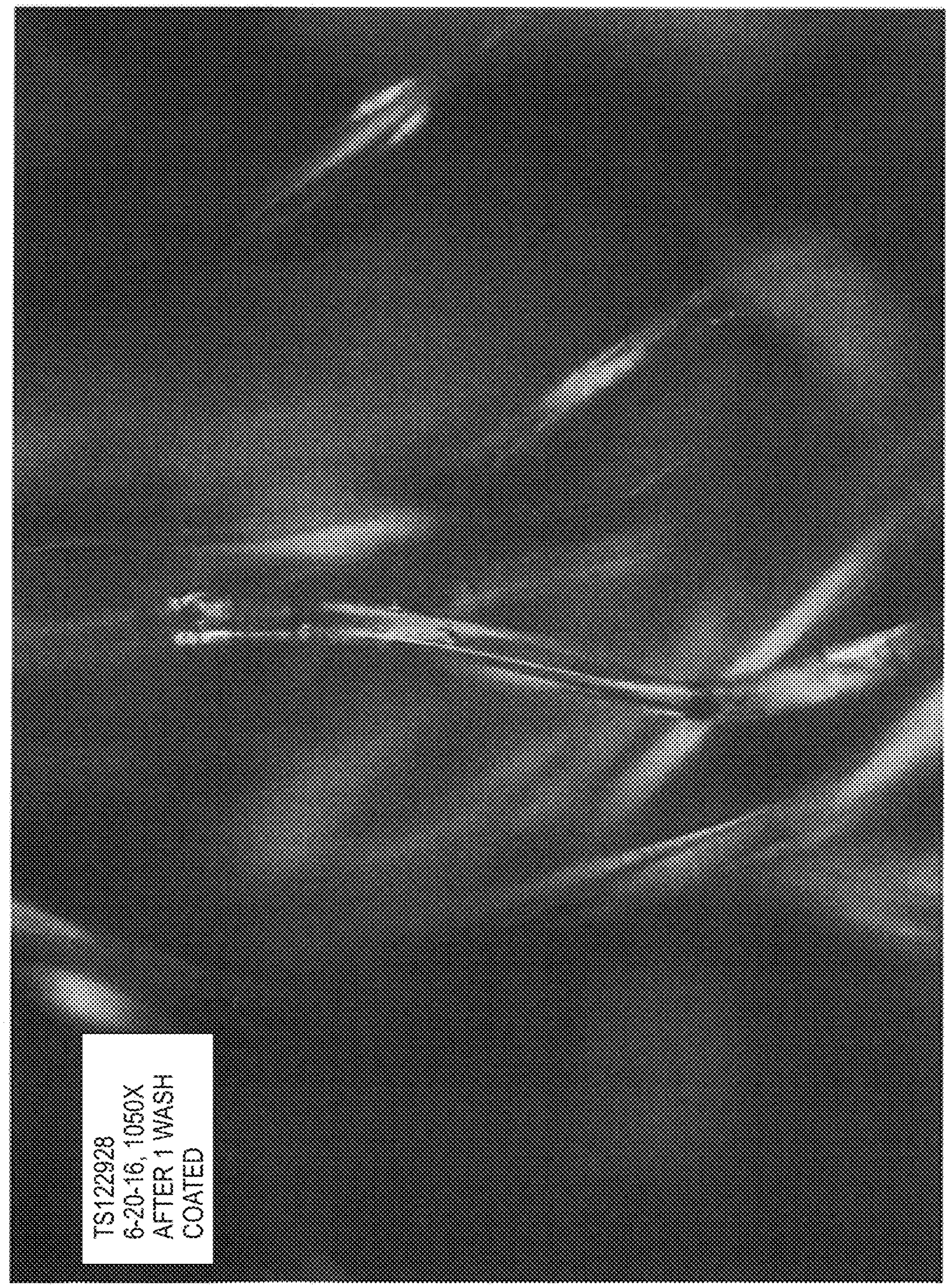
Figure 365C:
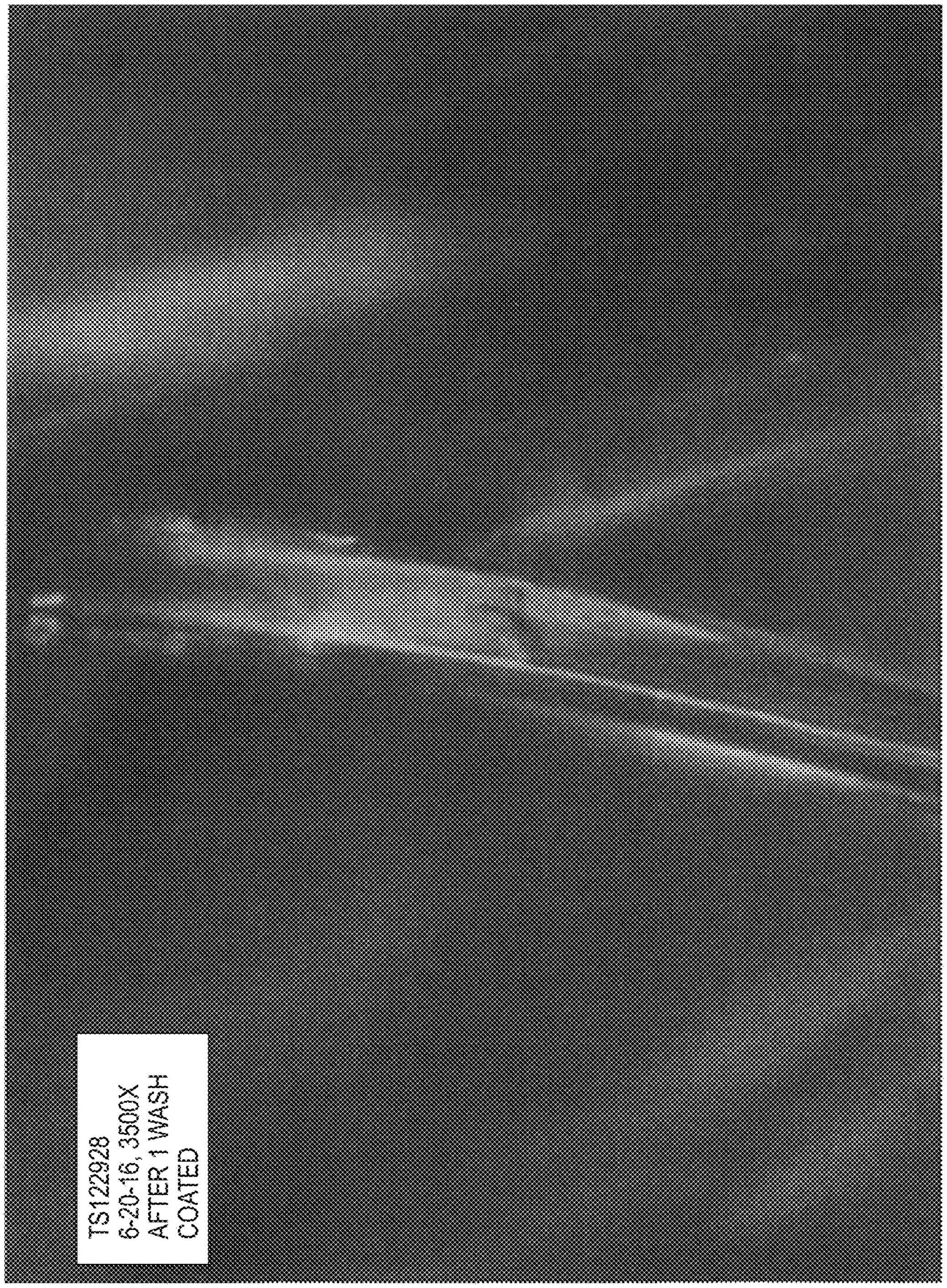

FIGS. 365A to 365C illustrate a microscopic image of coated fabric sample 16060903 at (A) 350× magnification, (B) 1050× magnification, and (C) 3500× magnification, after one wash cycle.

Figure 366A:
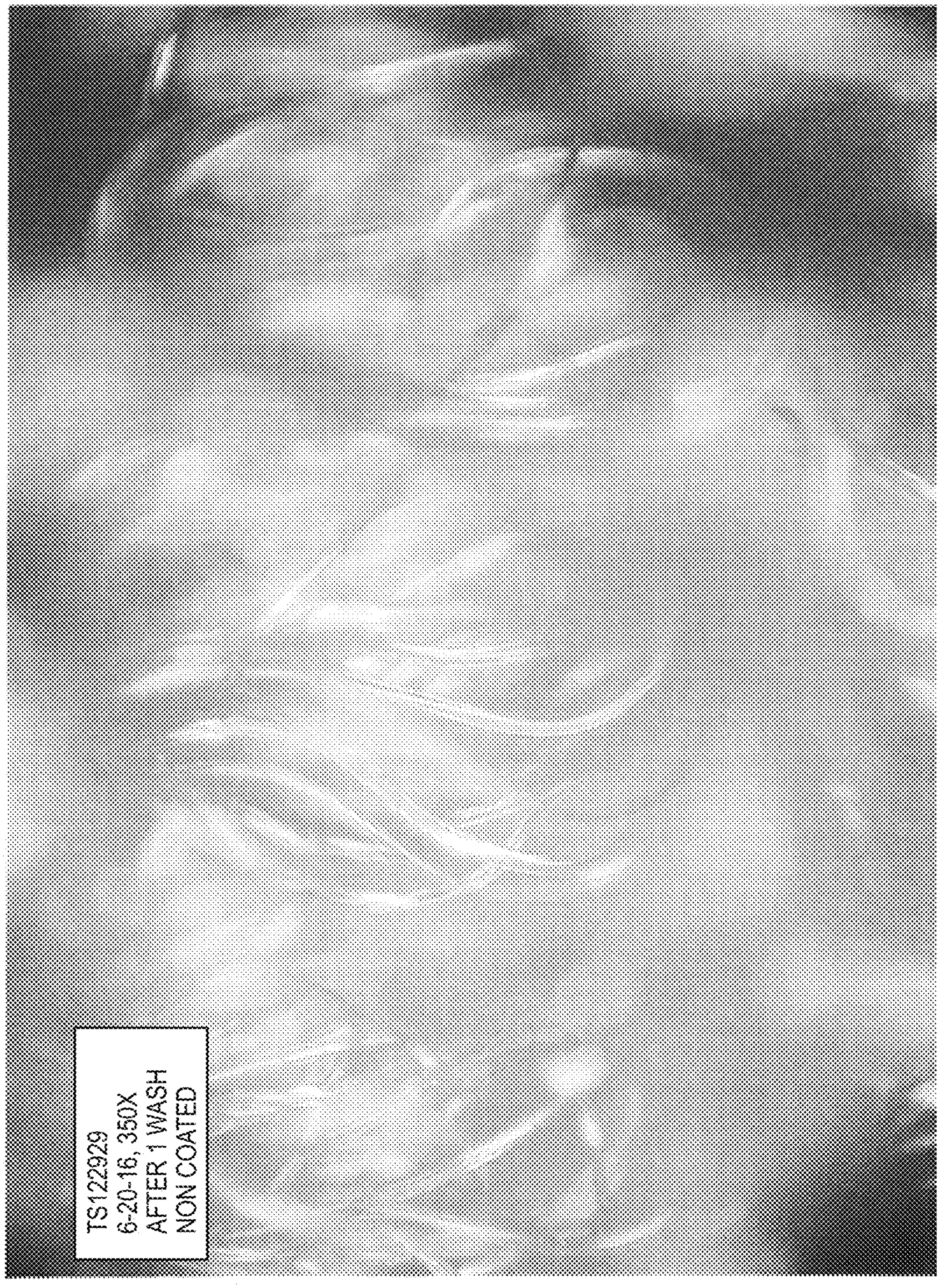
Figure 366B:
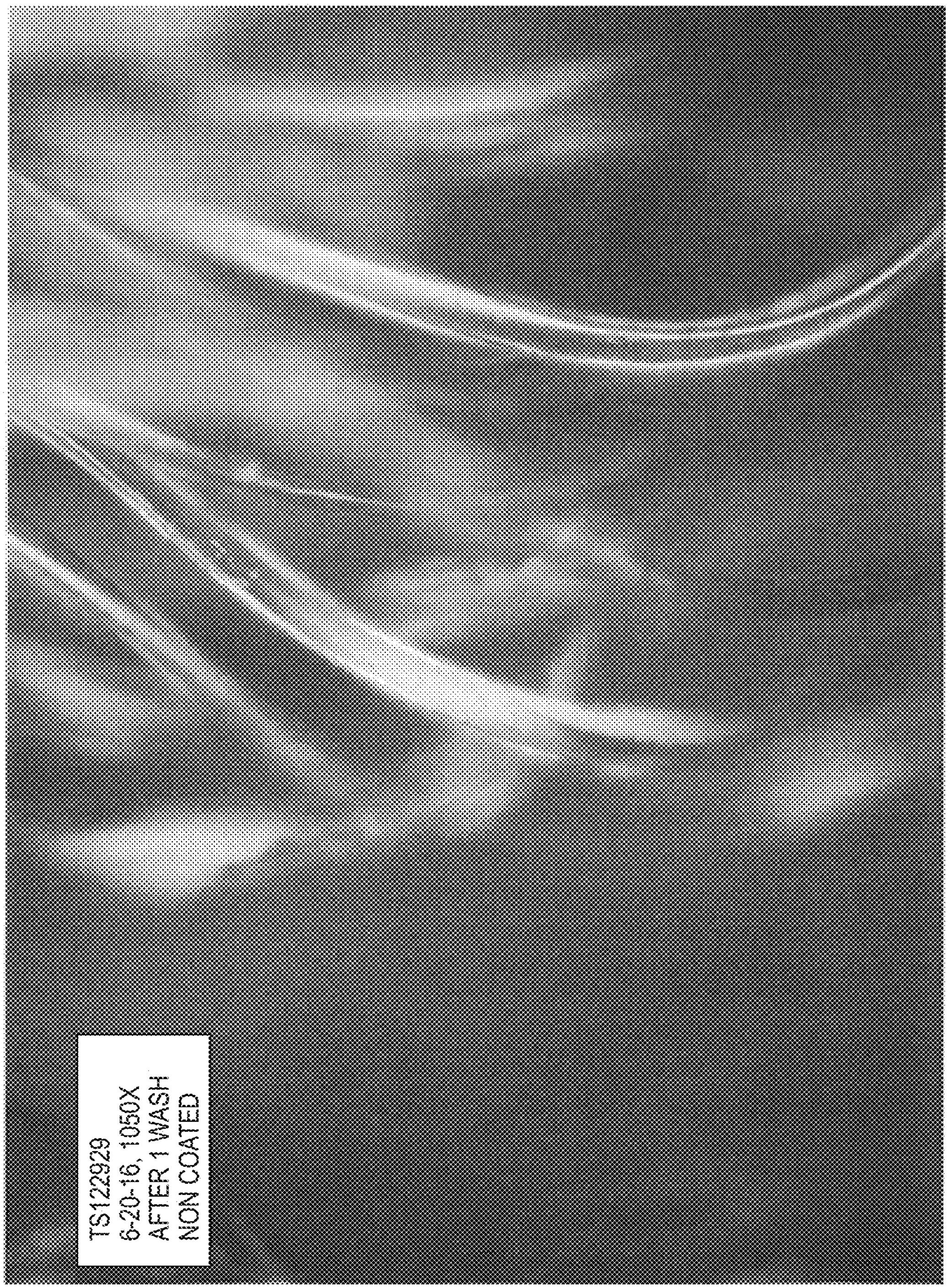
Figure 366C:
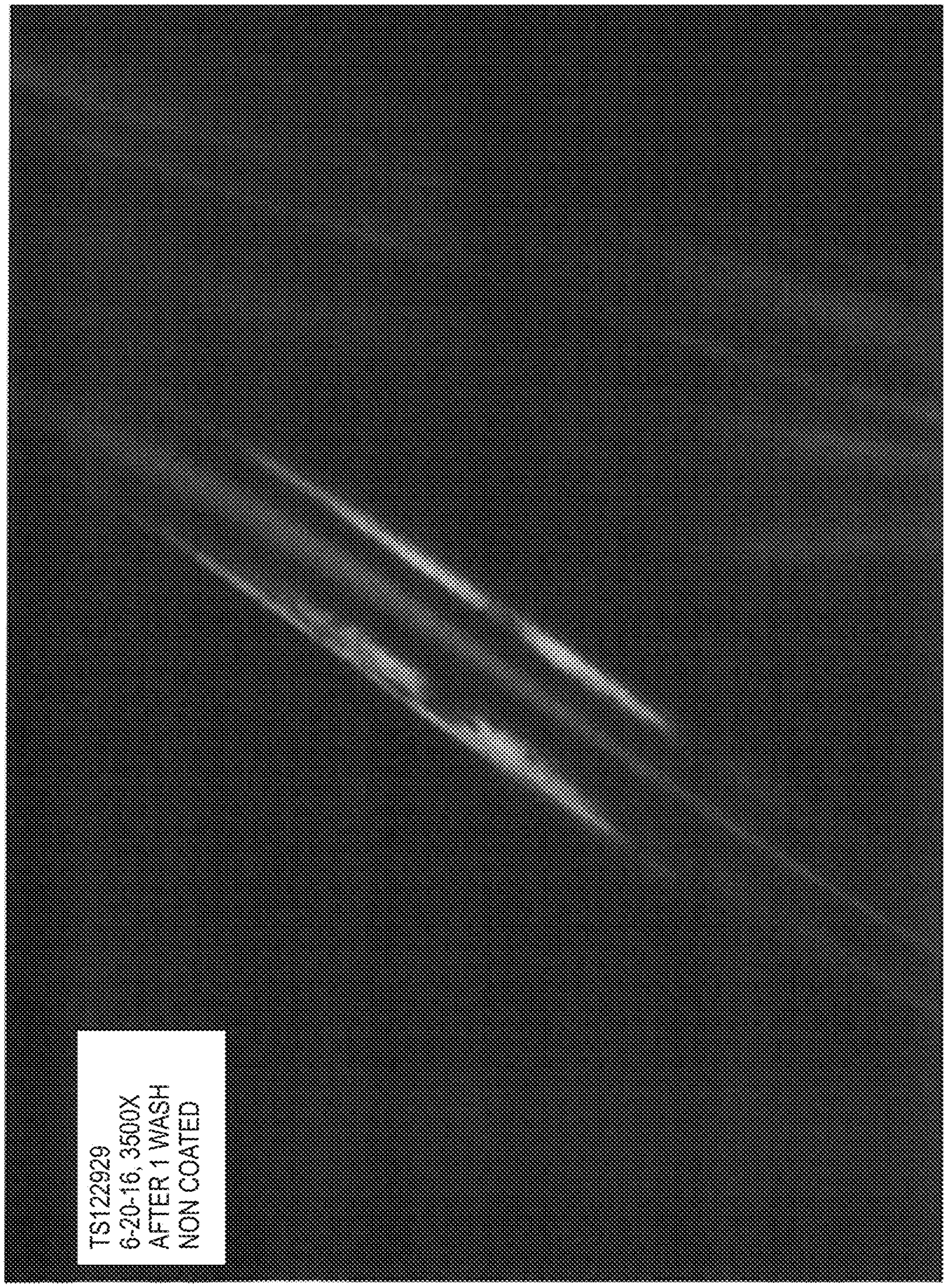
Figure 367A:
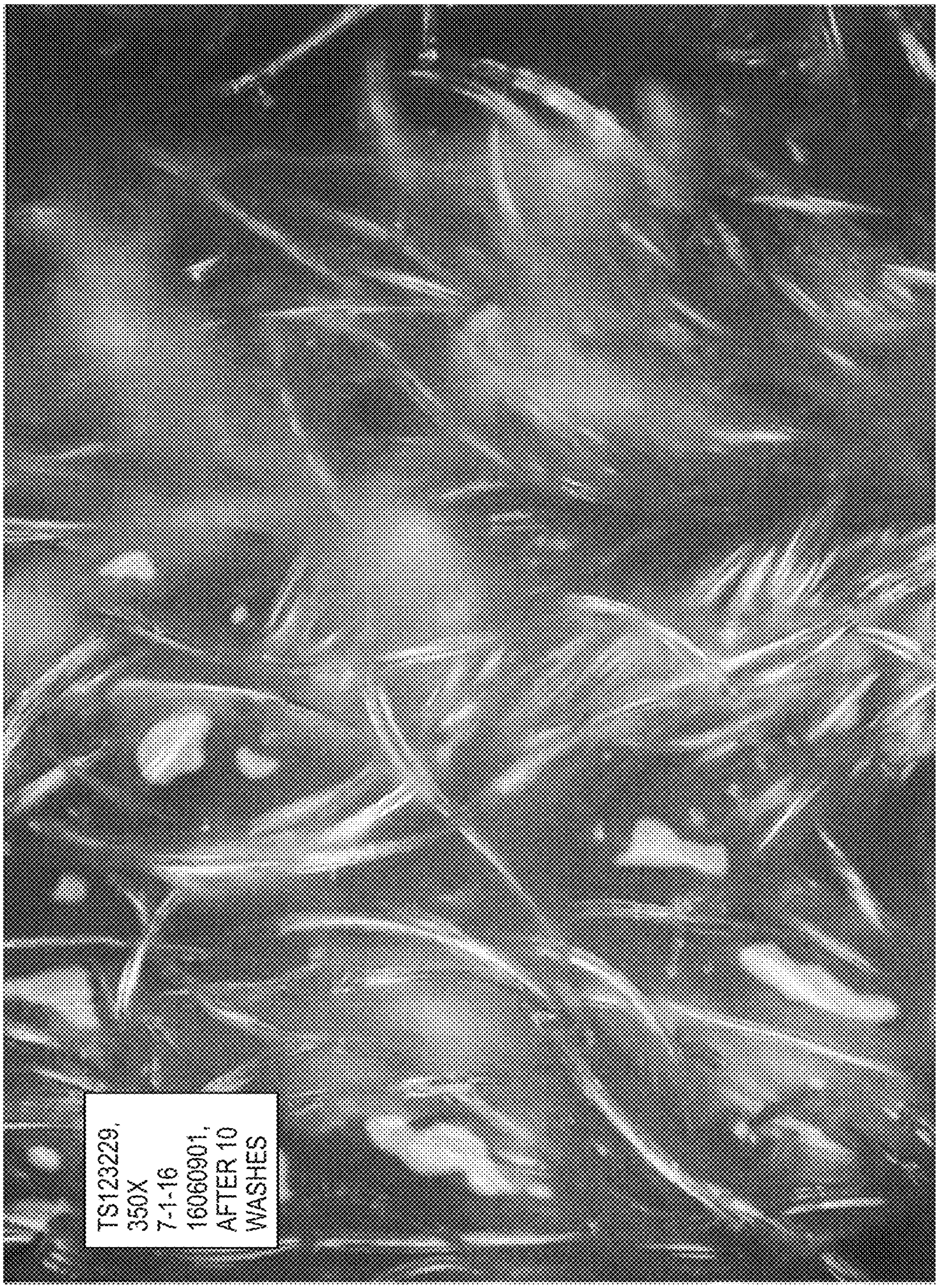
Figure 367B:
Figure 367C:
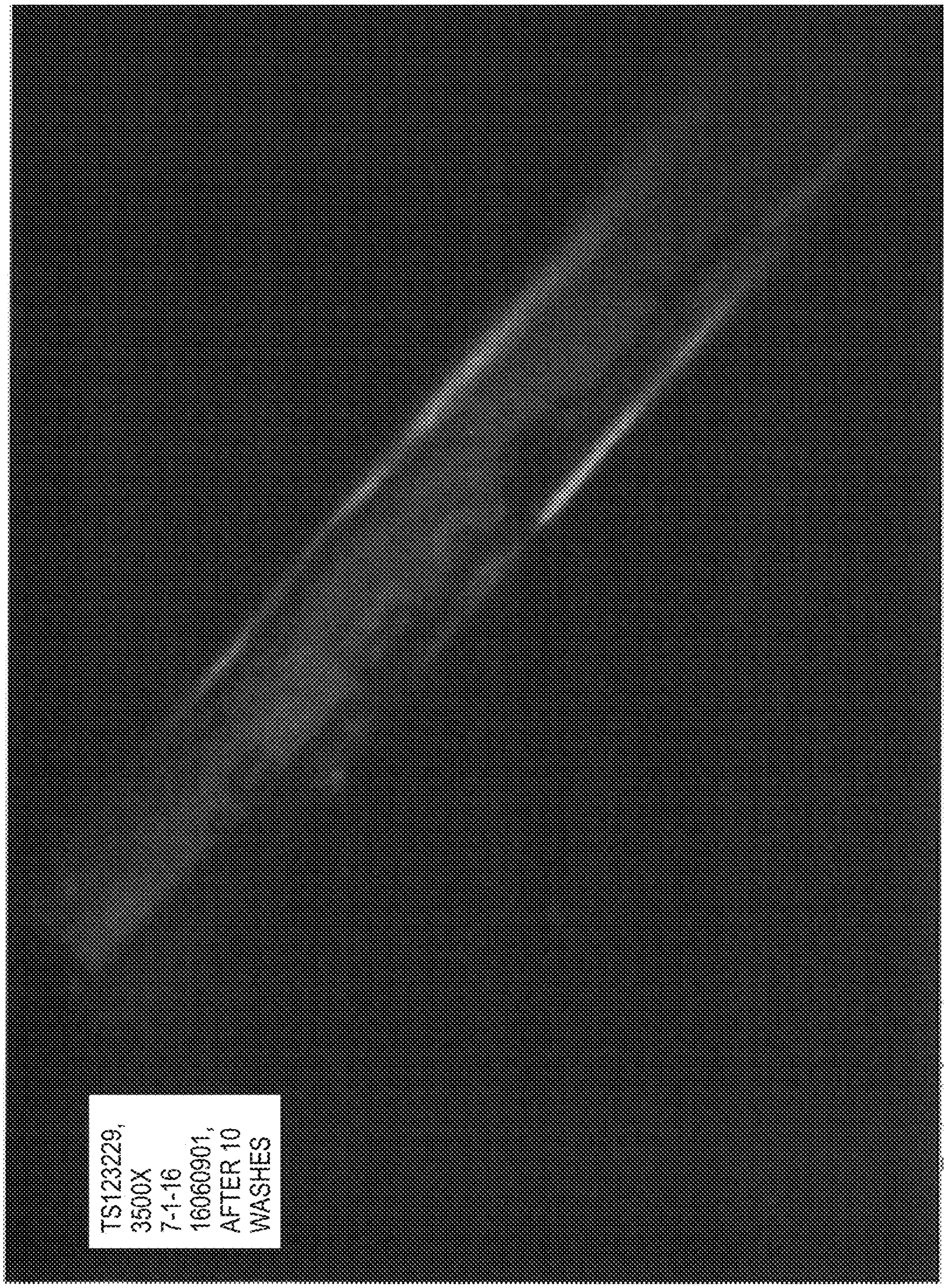

FIGS. 366A to 366C illustrate a microscopic image of coated fabric sample 16060904 at (A) 350× magnification, (B) 1050× magnification, and (C) 3500× magnification, after one wash cycle.

FIGS. 367A to 376C illustrate a microscopic image of coated fabric sample 16060901 at (A) 350× magnification, (B) 1050× magnification, and (C) 3500× magnification, after ten wash cycles.

Figure 368A:
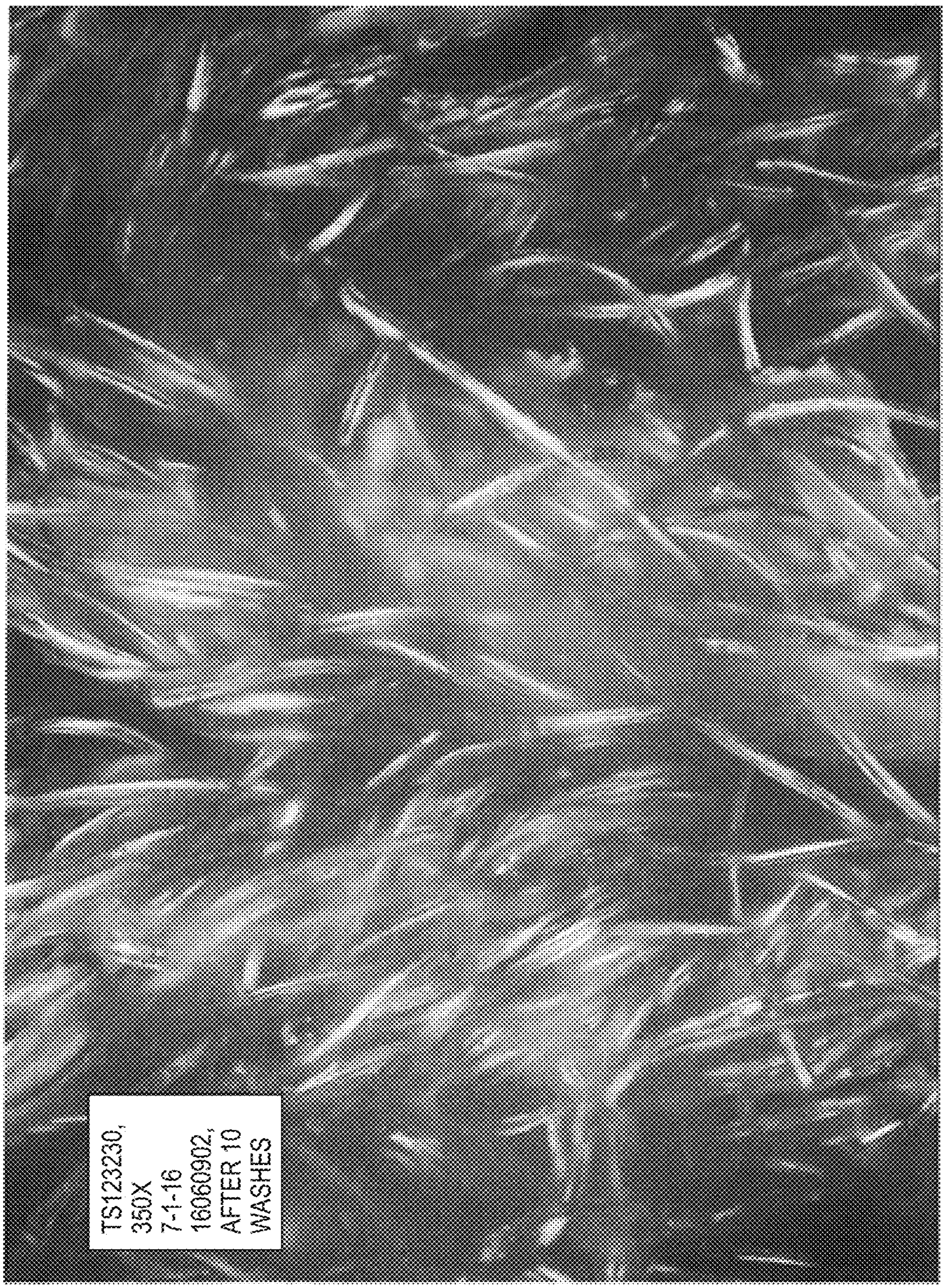
Figure 368B:
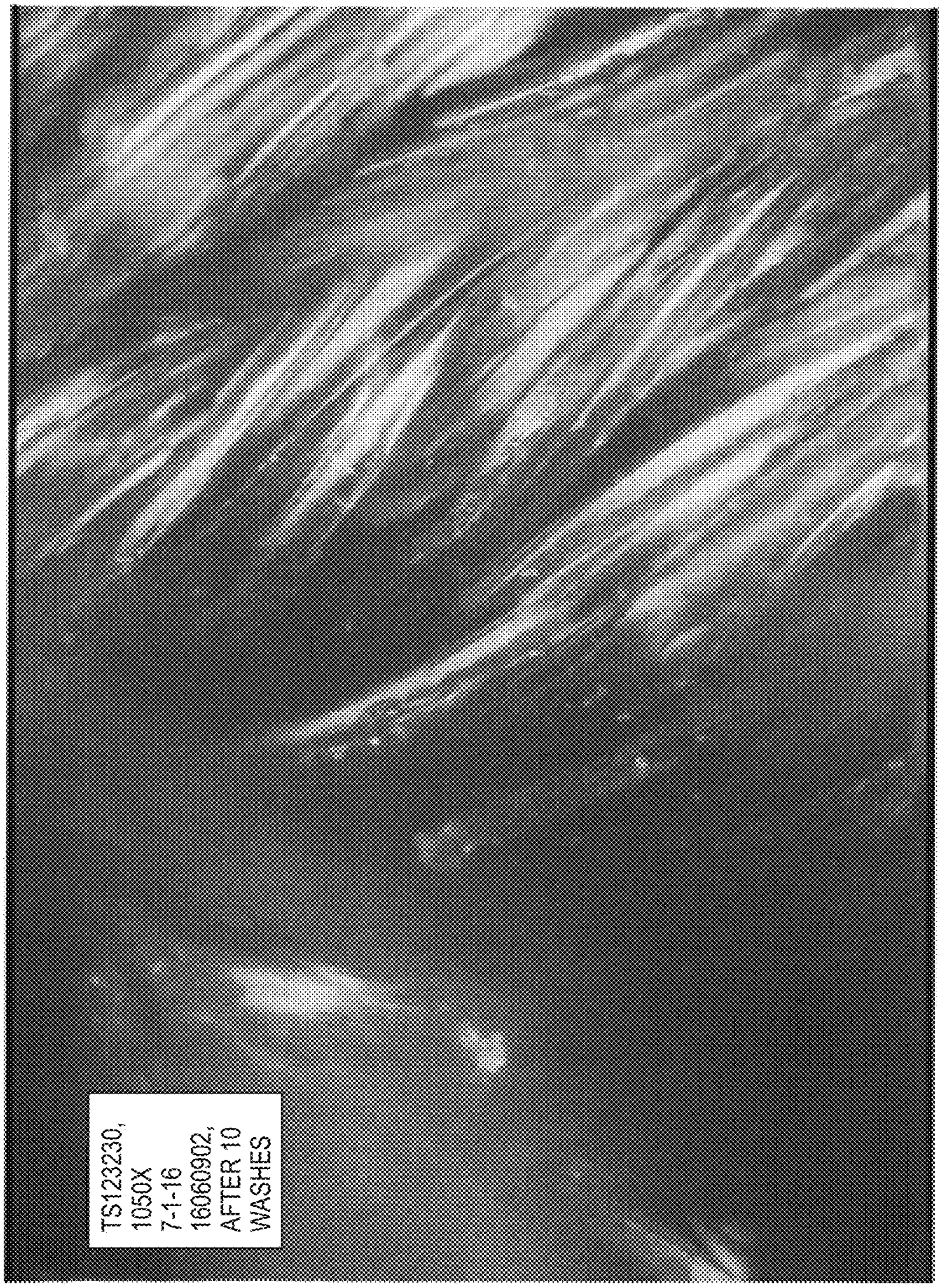
Figure 368C:

FIGS. 368A to 368C to illustrate a microscopic image of coated fabric sample 16060902 at (A) 350× magnification, (B) 1050× magnification, and (C) 3500× magnification, after ten wash cycles.

Figure 369A:
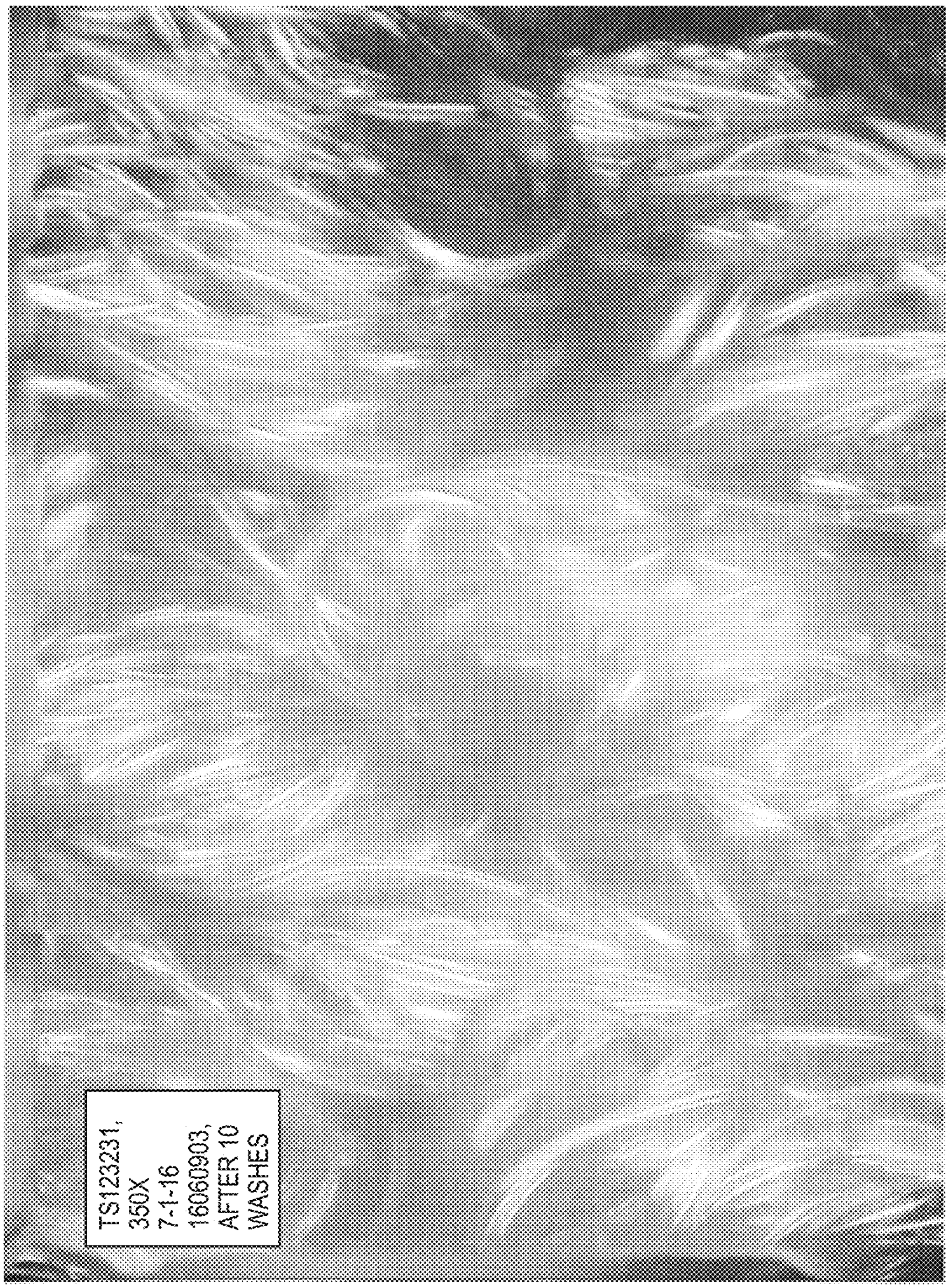
Figure 369B:
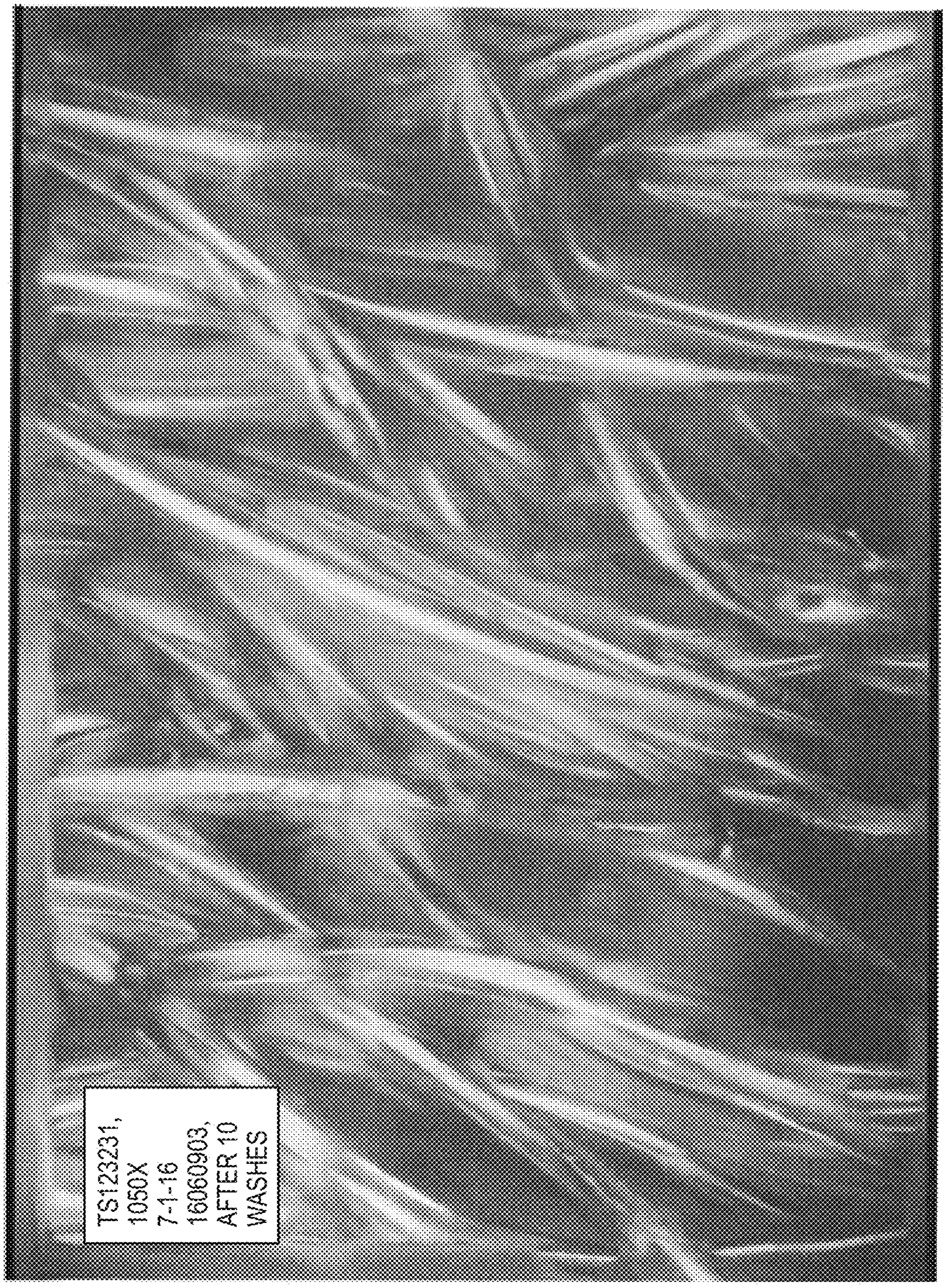
Figure 369C:
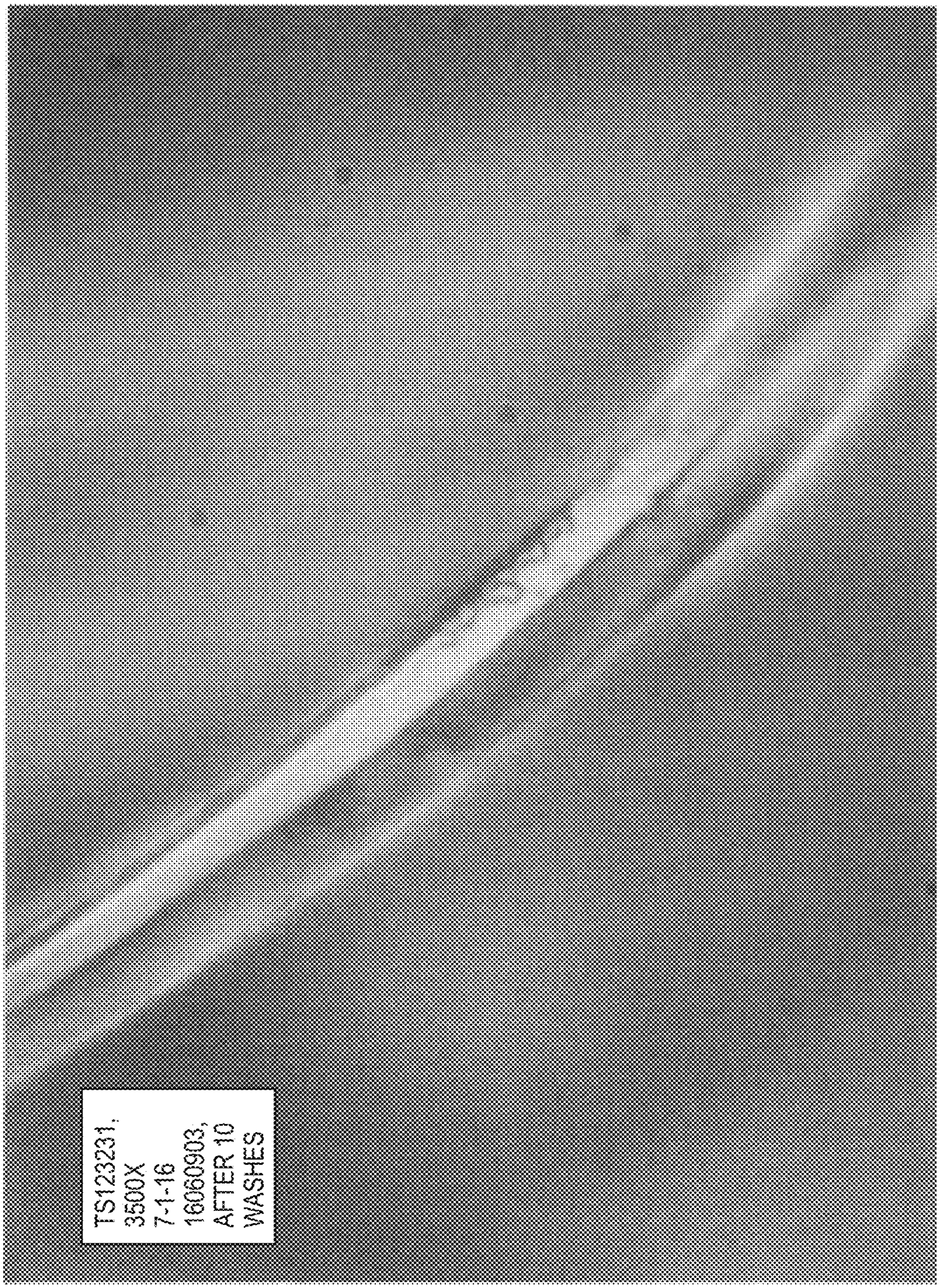

FIGS. 369A to 369C illustrate a microscopic image of coated fabric sample 16060903 at (A) 350× magnification, (B) 1050× magnification, and (C) 3500× magnification, after ten wash cycles.

Figure 370A:
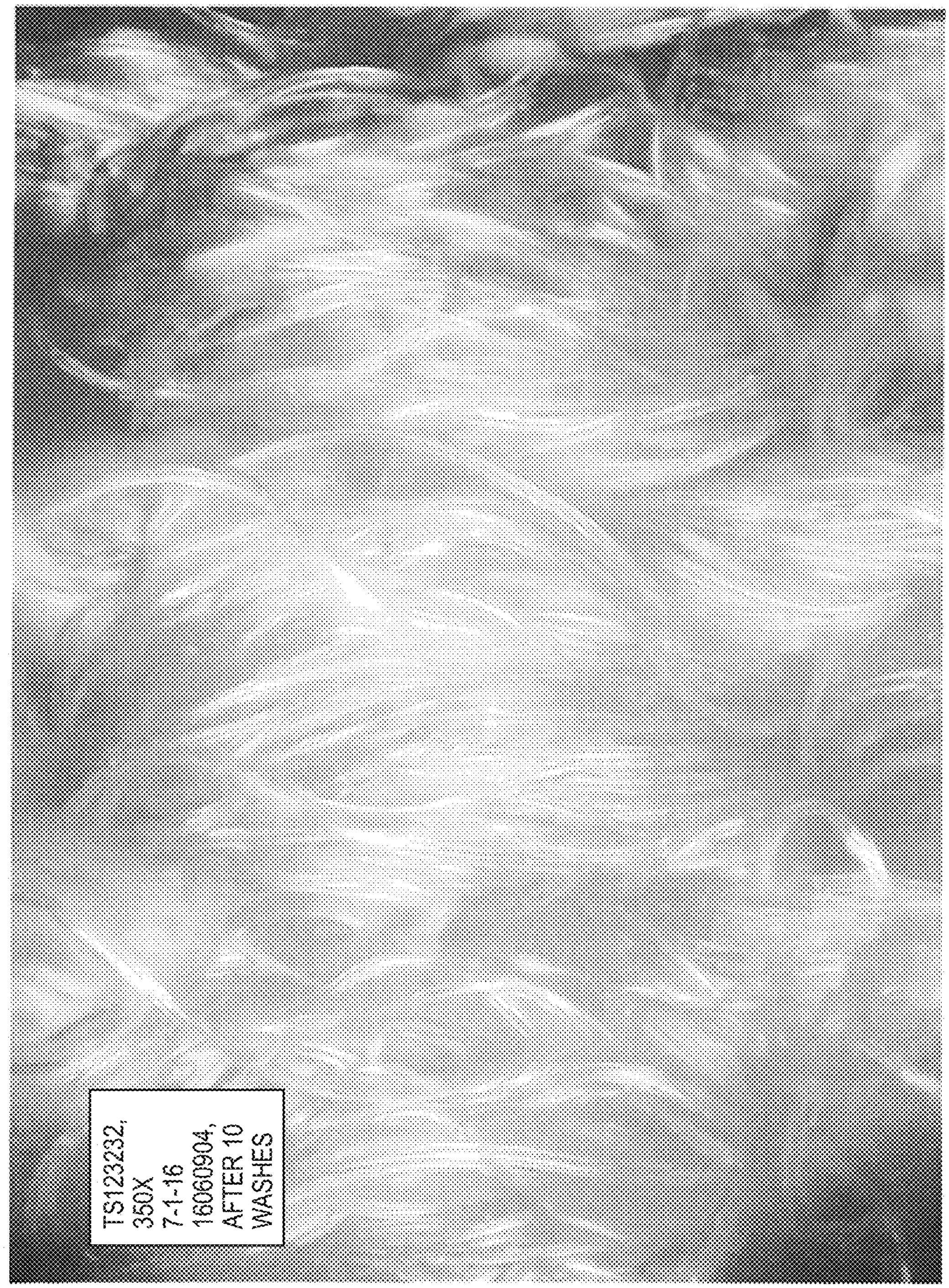
Figure 370B:
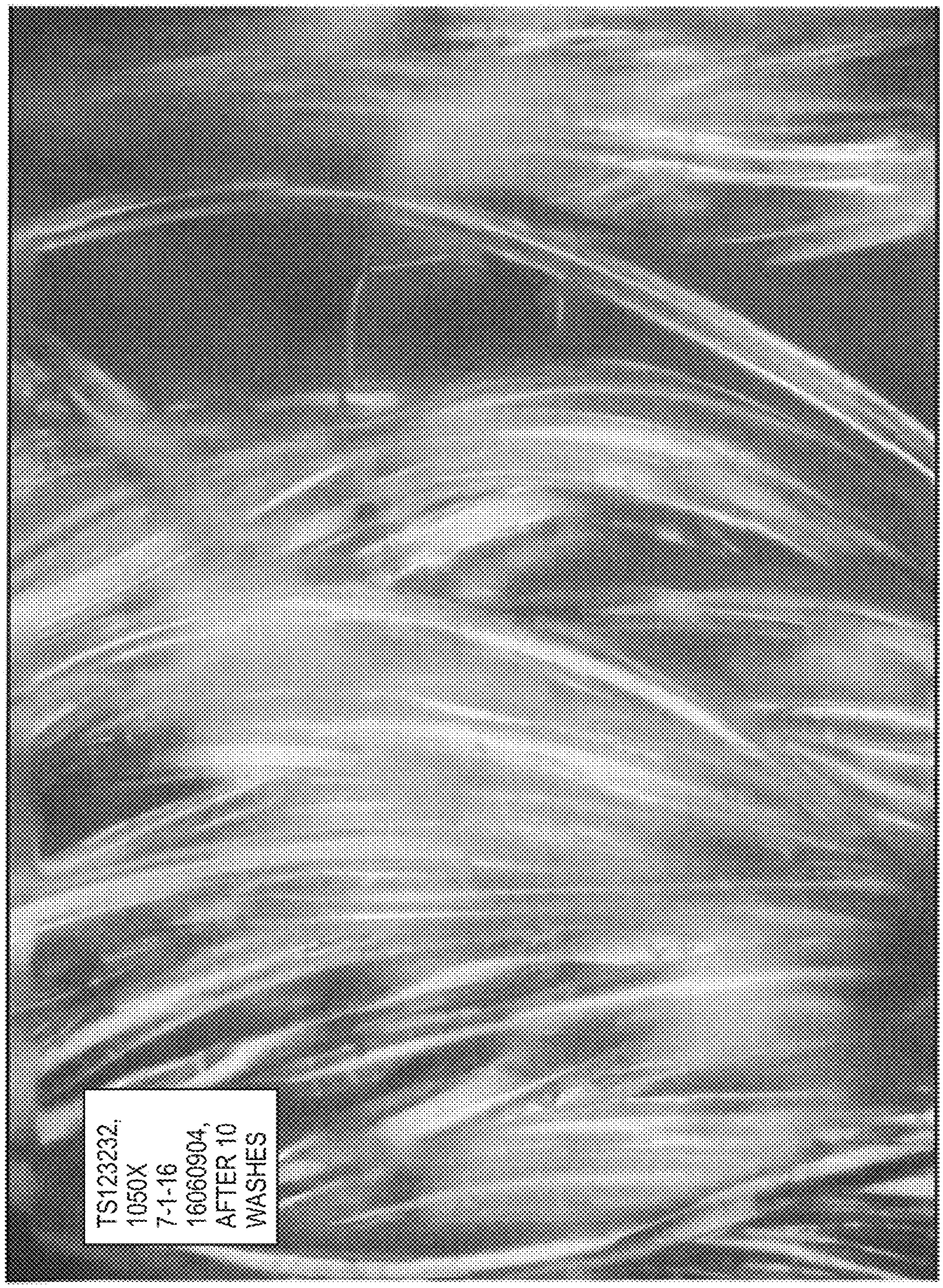
Figure 370C:
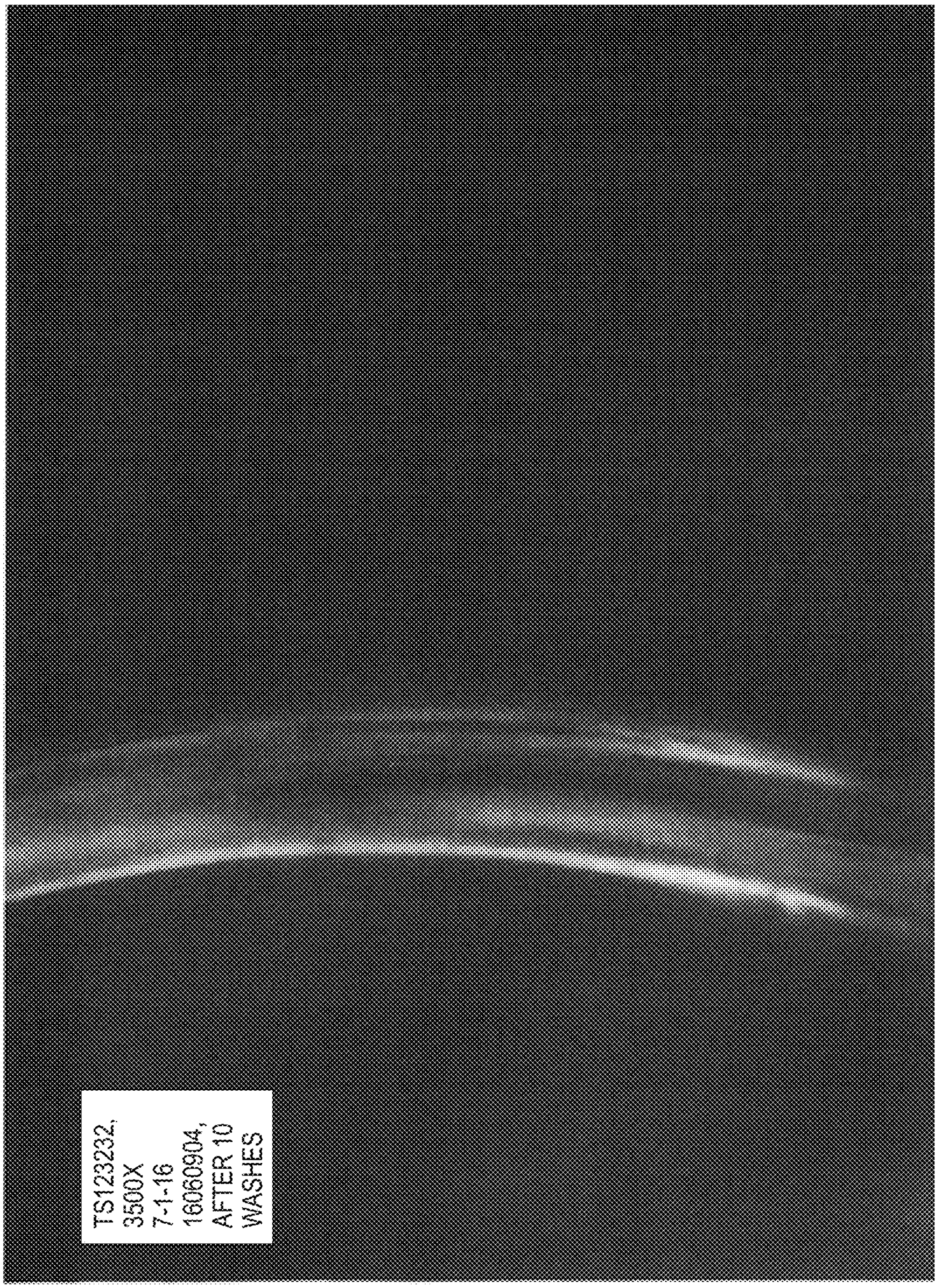

FIGS. 370A to 370C illustrate a microscopic image of coated fabric sample 16060904 at (A) 350× magnification, (B) 1050× magnification, and (C) 3500× magnification, after ten wash cycles.

FIG. 371 provides a qualitative analysis of the bacterial was study by observing the % foreign matter coverage area observed in FIGS. 359A-359C to FIGS. 370A-FIG. 370C.

Figure 372:
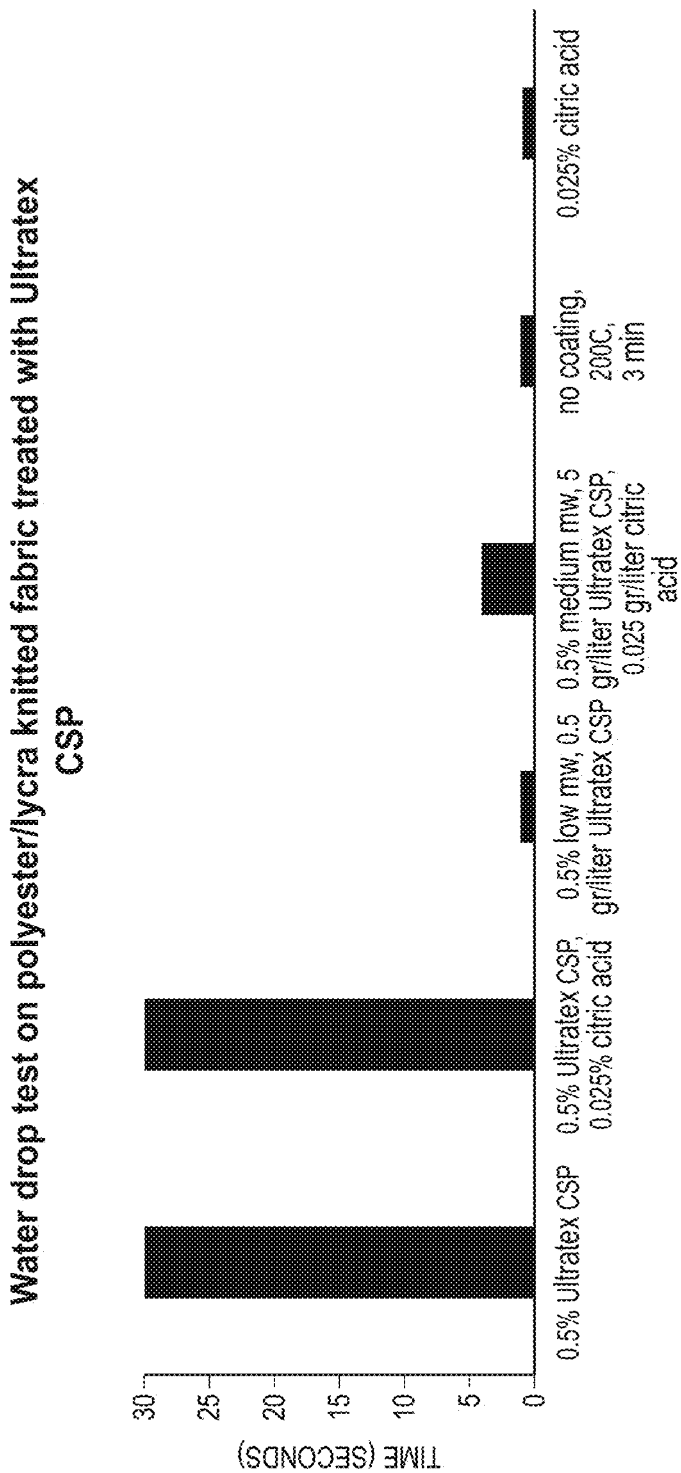

FIG. 372 illustrates the results of a water drop test on polyester/lycra knitted fabric treated with Ultratex CSP.

Figure 373:
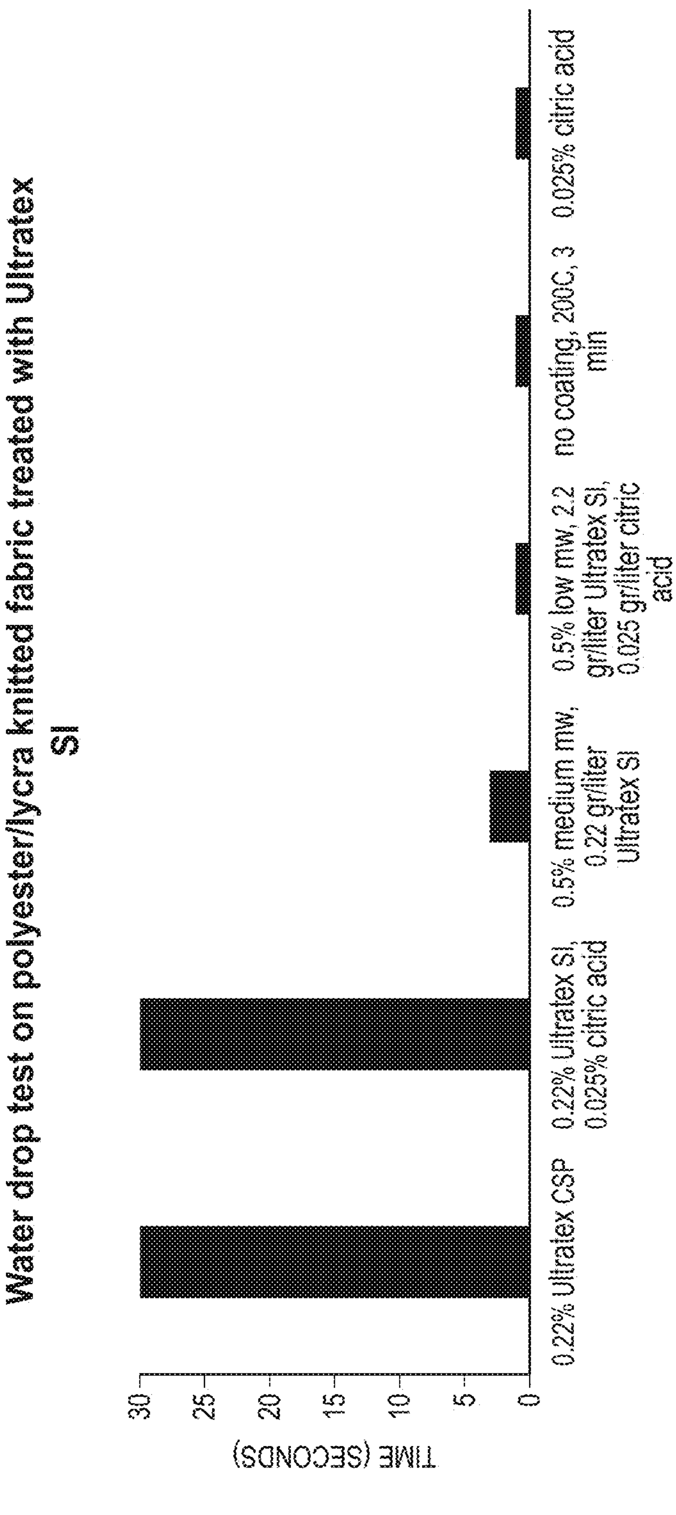

FIG. 373 illustrates the results of a water drop test on polyester/lycra knitted fabric treated with Ultratex SI.

Figure 374:
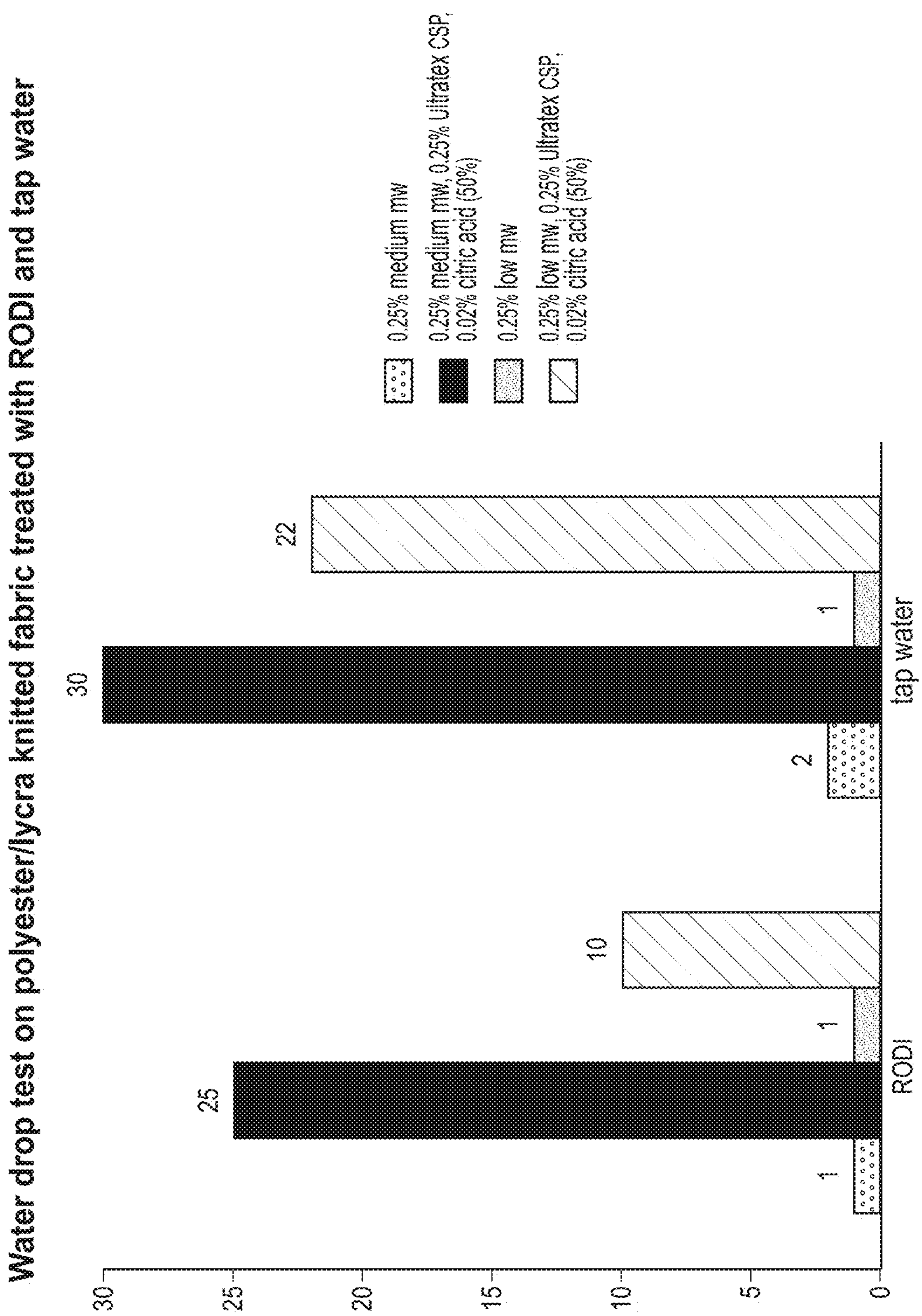

FIG. 374 illustrates the results of a water drop test on polyester/lycra knitted fabric treated with RODI water or tap water.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION OF THE INVENTION

Silk Fibroin-Based Protein Fragments and Solutions Thereof

Provided herein are methods for producing pure and highly scalable silk protein fragment (SPF) mixture solutions that may be used to coat at least a portion of textiles or may be formed into usable fibers for weaving into yarn. In some embodiments, SPF mixture solutions may also refer to silk fibroin solutions (SFS), and vice versa. The solutions are generated from raw pure intact silk protein material and processed in order to remove any sericin and achieve the desired weight average molecular weight (MW) and polydispersity of the fragment mixture. Select method parameters may be altered to achieve distinct final silk protein fragment characteristics depending upon the intended use. The resulting final fragment solution is pure silk protein fragments and water with PPM to non-detectable levels of process contaminants. The concentration, size and polydispersity of silk protein fragments in the solution may further be altered depending upon the desired use and performance requirements. In an embodiment, the pure silk fibroin-based protein fragments in the solution are substantially devoid of sericin, have an average weight average molecular weight ranging from about 6 kDa to about 16 kDa, and have a polydispersity ranging from about 1.5 and about 3.0. In an embodiment, the pure silk fibroin-based protein fragments in the solution are substantially devoid of sericin, have an average weight average molecular weight ranging from about 17 kDa to about 38 kDa, and have a polydispersity ranging from about 1.5 and about 3.0. In an embodiment, the pure silk fibroin-based protein fragments in the solution are substantially devoid of sericin, have an average weight average molecular weight ranging from about 39 kDa to about 80 kDa, and have a polydispersity ranging from about 1.5 and about 3.0. In an embodiment, the solutions may be used to generate articles, such as silk gels of varying gel and liquid consistencies by varying water content/concentration, or sold as a raw ingredient into the consumer market. As used herein, the term "silk solution" may refer to solutions of silk proteins, including solutions of silk fibroin-based protein fragments.

As used herein, "silk based proteins or fragments thereof" includes silk fibroin-based proteins or fragments thereof, natural silk based proteins or fragments thereof, recombinant silk based proteins or fragments thereof, and combinations thereof. Natural silk based proteins or fragments thereof include spider silk based proteins or fragments thereof, silkworm silk based proteins or fragments thereof, and combinations thereof. Silkworm based proteins or fragments thereof may include *Bombyx mori* silk based proteins or fragments thereof. The SPF mixture solutions described herein may include silk based proteins or fragments thereof. Moreover, SFS, as described herein, may be replaced with SPF mixture solutions.

As used herein, "low molecular weight" silk fibroin solutions may include those SFS solutions that include silk fibroin-based protein fragments having a molecular weight in a range of about 5 kDa to 20 kDa. In some embodiments, a target low molecular weight for certain silk fibroin-based protein fragments may be about 11 kDa.

As used herein, "medium molecular weight" silk fibroin solutions may include those SFS solutions that include silk-fibroin based protein fragments having a molecular weight in a range of about 20 kDa to about 55 kDa. In some embodiments, a target medium molecular weight for certain silk fibroin-based protein fragments may be about 40 kDa.

As used herein, "high molecular weight" silk fibroin solutions may include those SFS solutions that include silk-fibroin based protein fragments having a molecular weight that is in a range of about 55 kDa to about 150 kDa. In some embodiments, a target high molecular weight for certain silk fibroin-based protein fragments may be about 100 kDa to about 145 kDa.

As used herein, the terms "substantially sericin free" or "substantially devoid of sericin" refer to silk fibers in which a majority of the sericin protein has been removed. In an embodiment, silk fibroin that is substantially devoid of sericin refers to silk fibroin having between about 0.01% (w/w) and about 10.0% (w/w) sericin. In an embodiment, silk fibroin that is substantially devoid of sericin refers to silk fibroin having between about 0.01% (w/w) and about 9.0% (w/w) sericin. In an embodiment, silk fibroin that is substantially devoid of sericin refers to silk fibroin having between about 0.01% (w/w) and about 8.0% (w/w) sericin. In an embodiment, silk fibroin that is substantially devoid of sericin refers to silk fibroin having between about 0.01% (w/w) and about 7.0% (w/w) sericin. In an embodiment, silk fibroin that is substantially devoid of sericin refers to silk fibroin having between about 0.01% (w/w) and about 6.0% (w/w) sericin. In an embodiment, silk fibroin that is substantially devoid of sericin refers to silk fibroin having between about 0.01% (w/w) and about 5.0% (w/w) sericin. In an embodiment, silk fibroin that is substantially devoid of sericin refers to silk fibroin having between about 0% (w/w) and about 4.0% (w/w) sericin. In an embodiment, silk fibroin that is substantially devoid of sericin refers to silk fibroin having between about 0.05% (w/w) and about 4.0% (w/w) sericin. In an embodiment, silk fibroin that is substantially devoid of sericin refers to silk fibroin having between about 0.1% (w/w) and about 4.0% (w/w) sericin. In an embodiment, silk fibroin that is substantially devoid of sericin refers to silk fibroin having between about 0.5% (w/w) and about 4.0% (w/w) sericin. In an embodiment, silk fibroin that is substantially devoid of sericin refers to silk fibroin having between about 1.0% (w/w) and about 4.0% (w/w) sericin. In an embodiment, silk fibroin that is substantially devoid of sericin refers to silk fibroin having between about 1.5% (w/w) and about 4.0% (w/w) sericin. In an embodiment, silk fibroin that is substantially devoid of sericin refers to silk fibroin having between about 2.0% (w/w) and about 4.0% (w/w) sericin. In an embodiment, silk fibroin that is substantially devoid of sericin refers to silk fibroin having between about 2.5% (w/w) and about 4.0% (w/w) sericin. In an embodiment, silk fibroin that is substantially devoid of sericin refers to silk fibroin having a sericin content between about 0.01% (w/w) and about 0.1% (w/w). In an embodiment, silk fibroin that is substantially devoid of sericin refers to silk fibroin having a sericin content below about 0.1% (w/w). In an embodiment, silk fibroin that is substantially devoid of sericin refers to silk fibroin having a sericin content below about 0.05% (w/w). In an embodiment, when a silk source is added to a boiling (100° C.) aqueous solution of sodium carbonate for a treatment time of between about 30 minutes to about 60 minutes, a degumming loss of about 26 wt. % to about 31 wt. % is obtained.

As used herein, the term "substantially homogeneous" may refer to pure silk fibroin-based protein fragments that are distributed in a normal distribution about an identified molecular weight. As used herein, the term "substantially homogeneous" may refer to an even distribution of additive, for example vitamin C, throughout a composition of the present disclosure.

As used herein, the term "substantially free of inorganic residuals" means that the composition exhibits residuals of 0.1% (w/w) or less. In an embodiment, substantially free of inorganic residuals refers to a composition that exhibits residuals of 0.05% (w/w) or less. In an embodiment, substantially free of inorganic residuals refers to a composition that exhibits residuals of 0.01% (w/w) or less. In an embodiment, the amount of inorganic residuals is between 0 ppm ("non-detectable" or "ND") and 1000 ppm. In an embodiment, the amount of inorganic residuals is ND to about 500 ppm. In an embodiment, the amount of inorganic residuals is ND to about 400 ppm. In an embodiment, the amount of inorganic residuals is ND to about 300 ppm. In an embodiment, the amount of inorganic residuals is ND to about 200 ppm. In an embodiment, the amount of inorganic residuals is ND to about 100 ppm. In an embodiment, the amount of inorganic residuals is between 10 ppm and 1000 ppm.

As used herein, the term "substantially free of organic residuals" means that the composition exhibits residuals of 0.1% (w/w) or less. In an embodiment, substantially free of organic residuals refers to a composition that exhibits residuals of 0.05% (w/w) or less. In an embodiment, substantially free of organic residuals refers to a composition that exhibits residuals of 0.01% (w/w) or less. In an embodiment, the amount of organic residuals is between 0 ppm ("non-detectable" or "ND") and 1000 ppm. In an embodiment, the amount of organic residuals is ND to about 500 ppm. In an embodiment, the amount of organic residuals is ND to about 400 ppm. In an embodiment, the amount of organic residuals is ND to about 300 ppm. In an embodiment, the amount of organic residuals is ND to about 200 ppm. In an embodiment, the amount of organic residuals is ND to about 100 ppm. In an embodiment, the amount of organic residuals is between 10 ppm and 1000 ppm.

Compositions of the present disclosure are "biocompatible" or otherwise exhibit "biocompatibility" meaning that the compositions are compatible with living tissue or a living system by not being toxic, injurious, or physiologically reactive and not causing immunological rejection or an inflammatory response. Such biocompatibility can be evidenced by participants topically applying compositions of the present disclosure on their skin for an extended period of time. In an embodiment, the extended period of time is about 3 days. In an embodiment, the extended period of time is about 7 days. In an embodiment, the extended period of time is about 14 days. In an embodiment, the extended period of time is about 21 days. In an embodiment, the extended period of time is about 30 days. In an embodiment, the extended period of time is selected from the group consisting of about 1 month, about 2 months, about 3 months, about 4 months, about 5 months, about 6 months, about 7 months, about 8 months, about 9 months, about 10 months, about 11 months, about 12 months, and indefinitely. For example, in some embodiments, the coatings described herein are biocompatible coatings.

In some embodiments, compositions described herein, which may be biocompatible compositions (e.g., biocompatible coatings that include silk), may be evaluated and comply with International Standard ISO 10993-1, titled the "Biological evaluation of medical devices—Part 1: Evaluation and testing within a risk management process." In some embodiments, compositions described herein, which may be biocompatible compositions, may be evaluated under ISO 106993-1 for one or more of cytotoxicity, sensitization, hemocompatibility, pyrogenicity, implantation, genotoxicity, carcinogenicity, reproductive and developmental toxicity, and degradation.

In some embodiments, compositions and articles described herein, and methods of preparing the same, include silk coated fabrics and textiles wherein the silk coating is partially dissolved in the fabric or textile. The fabric or textile may be a polymeric material such as those described elsewhere herein. The term "partially dissolved" includes mixing to form a dispersion of, e.g., a portion of a polymeric fabric or textile with a portion of the silk based coating. In some embodiments, the dispersion may be a solid suspension (i.e., a dispersion comprising domains on the order of 10 nm) or a solid solution (i.e., a molecular dispersion) of silk in the polymeric fabric or textile. In some embodiments, the dispersion may be localized at the surface interface between the silk coating and the polymeric fabric or textile, and may have a depth of 1 nm, 2 nm, 5 nm, 10 nm, 25 nm, 50 nm, 75 nm, 100 nm, or greater than 100 nm, depending on the method of preparation. In some embodiments, the dispersion may be a layer sandwiched between the polymeric fabric or textile and the silk coating. In some embodiments, the dispersion may be prepared by coating silk, including silk fibroin with the characteristics described herein, onto the polymeric fabric or textile, and then performing an additional process to form the dispersion, including heating at a temperature of 100° C., 125° C., 150° C., 175° C., 200° C., 225° C., or 250° C. for a time period selected from the group consisting of 1 minute, 2 minutes, 5 minutes, 10 minutes, 15 minutes, 20 minutes, 30 minutes, 1 hour, 2 hours, 4 hours, 8 hours, 16 hours, or 24 hours. In some embodiments, heating may be performed at or above the glass transition temperature ($T_g$) of silk and/or the polymeric fabric or textile, which may be assessed by methods known in the art. In some embodiments, the dispersion may be formed by coating silk, including silk fibroin with the characteristics described herein, onto the polymeric fabric or textile, and then performing an additional process to impregnate the silk coating into the polymeric fabric or textile, including treatment with an organic solvent. Methods for characterizing the properties of polymers dissolved in one another are well known in the art and include differential scanning calorimetry and surface analysis methods capable of depth profiling, including spectroscopic methods.

Compositions of the present disclosure are "hypoallergenic" meaning that they are relatively unlikely to cause an allergic reaction. Such hypoallergenicity can be evidenced by participants topically applying compositions of the present disclosure on their skin for an extended period of time. In an embodiment, the extended period of time is about 3 days. In an embodiment, the extended period of time is about 7 days. In an embodiment, the extended period of time is about 14 days. In an embodiment, the extended period of time is about 21 days. In an embodiment, the extended period of time is about 30 days. In an embodiment, the extended period of time is selected from the group consisting of about 1 month, about 2 months, about 3 months, about 4 months, about 5 months, about 6 months, about 7 months, about 8 months, about 9 months, about 10 months, about 11 months, about 12 months, and indefinitely.

In some embodiments, where aqueous solutions are used to prepare SPF compositions or SPF containing coatings, the aqueous solutions may be prepared with DI water or tap water. As used herein, "tap water" refers to potable water provided by public utilities and water of comparable quality, regardless of the source, without further refinement such as by reverse osmosis, distillation, and/or deionization. Therefore, the use of "DI water," "RODI water," or "water," as set forth herein, may be understood to be interchangeable with "tap water" according to the processes described herein without deleterious effects to such processes.

Textiles and Leathers Coated with Silk Fibroin-Based Protein Fragments

As used herein, the term "washable" and "exhibiting washability" means that a silk coated fabric of the present disclosure is capable of being washed without shrinking, fading, or the like.

As used herein, the term "textile" refers to a flexible woven or non-woven material consisting of a network of natural or artificial fibers often referred to as fabric, thread, or yarn. In an embodiment, textiles can be used to fabricate clothing, shoes and bags. In an embodiment, textiles can be used to fabricate carpeting, upholstered furnishings, window shades, towels, and coverings for tables, beds, and other flat surfaces. In an embodiment, textiles can be used to fabricate flags, backpacks, tents, nets, handkerchiefs, balloons, kites, sails, and parachutes.

As used herein, the term "leather" refers to natural leather and synthetic leather. Natural leather includes chrome-tanned leather (e.g., tanned using chromium sulfate and other chromium salts), vegetable-tanned leather (e.g., tanned using tannins), aldehyde-tanned leather (also known as wet-white leather, e.g., tanned using glutaraldehyde or oxazolidine compounds), brain-tanned leather, formaldehyde-tanned leather, Chamois leather (e.g., tanned using cod oils), rose-tanned leather (e.g., tanned using rose otto oils), synthetic-tanned leather (e.g., tanned using aromatic polymers), alum-tanned leather, patent leather, Vachetta leather, nubuck leather, and rawhide leather. Natural leather also includes split leather, full-grain leather, top-grain leather, and corrected-grain leather, the properties and preparation of which are known to those of skill in the art. Synthetic leather includes poromeric imitation leathers (e.g., polyurethane on polyester), vinyl and polyamide felt fibers, polyurethane, polyvinyl chloride, polyethylene (PE), polypropylene (PP), vinyl acetate copolymer (EVA), polyamide, polyester, textile-polymer composite microfibers, corfan, koskin, leatherette, BIOTHANE®, BIRKIBUC®, BIRKO-FLOR®, CLARINO®, ECOLORICA®, KYDEX®, LORICA®, NAUGAHYDE®, REXINE®, VEGETAN®, FABRIKOID®, or combinations thereof.

As used herein, the term "hand" refers to the feel of a fabric, which may be further described as the feeling of softness, crispness, dryness, silkiness, and combinations thereof. Fabric hand is also referred to as "drape." A fabric with a hard hand is coarse, rough, and generally less comfortable for the wearer. A fabric with a soft hand is fluid and smooth, such as fine silk or wool, and generally more comfortable for the wearer. Fabric hand can be determined by comparison to collections of fabric samples, or by use of methods such as the Kawabata Evaluation System (KES) or the Fabric Assurance by Simple Testing (FAST) methods. Behera and Hari, *Ind. J. Fibre & Textile Res.*, 1994, 19, 168-71.

As used herein, the term "yarn" refers to a single or multi-fiber construct.

As used herein, a "coating" refers to a material, or combination of materials, that form a substantially continuous layer or film on an exterior surface of a substrate, such as a textile. In some embodiments, a portion of the coating may penetrate at least partially into the substrate. In some embodiments, the coating may penetrate at least partially into the interstices of a substrate. In some embodiments, the coating may be infused into a surface of the substrate such that the application of the coating, or coating process, may include infusing (at the melting temperature of the substrate) at least one coating component at least partially into a surface of the substrate. A coating may be applied to a substrate by one or more of the processes described herein.

In embodiments described where the coating may be infused into a surface of the substrate, the coating may be codissolved in a surface of the substrate such that a component of the coating may be intermixed in the surface of the substrate to a depth of at least about 1 nm, or at least about 2 nm, or at least about 3 nm, or at least about 4 nm, or at least about 5 nm, or at least about 6 nm, or at least about 7 nm, or at least about 8 nm, or at least about 9 nm, or at least about 10 nm, or at least about 20 nm, or at least about 30 nm, or at least about 40 nm, or at least about 50 nm, or at least about 60 nm, or at least about 70 nm, or at least about 80 nm, or at least about 90 nm, or at least about 100 nm. In some embodiments, the coating may be infused into a surface of the substrate where the substrate includes one or more polymers including, but not limited to, polyester, polyamide, polyaramid, polytetrafluorethylene, polyethylene, polypropylene, polyurethane, silicone, mixtures of polyurethane and polyethyleneglycol, ultrahigh molecular weight polyethylene, high-performance polyethylene, nylon, and LYCRA.

As used herein, the term "bath coating" encompasses coating a fabric in a batch, immersing a fabric in a bath, and submerging a fabric in a bath. Concepts of bath coating are set forth in U.S. Pat. No. 4,521,458, the entirety of which is incorporated by reference.

As used herein, and unless more specifically described, the term "drying" may refer to drying a coated material as described herein at a temperature greater than room temperature (i.e., 20° C.).

In an embodiment, the invention provides a textile or leather product coated with silk fibroin-based proteins or fragments thereof. In an embodiment, the invention provides a textile or leather product coated with silk fibroin-based proteins or fragments thereof, wherein the textile is a textile used for human apparel, including performance and/or athletic apparel. In an embodiment, the invention provides a textile or leather product coated with silk fibroin-based proteins or fragments thereof, and wherein the textile or leather product exhibits improved moisture management properties and/or resistance to microbial growth. In an embodiment, the invention provides a textile or leather product coated with silk fibroin-based proteins or fragments thereof, wherein the textile is a textile or leather product used for home upholstery. In an embodiment, the invention provides a textile or leather product coated with silk fibroin-based proteins or fragments thereof, wherein the textile or leather product is used for automobile upholstery. In an embodiment, the invention provides a textile or leather product coated with silk fibroin-based proteins or fragments thereof, wherein the textile or leather product is used for aircraft upholstery. In an embodiment, the invention provides a textile or leather product coated with silk fibroin-based proteins or fragments thereof, wherein the textile or leather product is used for upholstery in transportation vehicles for public, commercial, military, or other use, including buses and trains. In an embodiment, the invention provides a textile or leather product coated with silk fibroin-based proteins or fragments thereof, wherein the textile or leather product is used for upholstery of a product that requires a high degree of resistance to wear as compared to normal upholstery.

In an embodiment, the invention provides a textile or leather product coated with silk fibroin-based proteins or fragments thereof, wherein the textile is a textile or leather product fabricated as trim on automobile upholstery. In an embodiment, the invention provides a textile or leather product coated with silk fibroin-based proteins or fragments thereof, wherein the textile is a textile or leather product fabricated as a steering wheel. In an embodiment, the invention provides a textile or leather product coated with silk fibroin-based proteins or fragments thereof, wherein the textile is a textile or leather product fabricated as a headrest. In an embodiment, the invention provides a textile or leather product coated with silk fibroin-based proteins or fragments thereof, wherein the textile is a textile or leather product fabricated as an armrest. In an embodiment, the invention provides a textile or leather product coated with silk fibroin-based proteins or fragments thereof, wherein the textile is a textile or leather product fabricated as an automobile floor mat. In an embodiment, the invention provides a textile or leather product coated with silk fibroin-based proteins or fragments thereof, wherein the textile is a textile or leather product fabricated as automobile or vehicle carpet. In an embodiment, the invention provides a textile or leather product coated with silk fibroin-based proteins or fragments thereof, wherein the textile is a textile or leather product fabricated as automotive trim. In an embodiment, the invention provides a textile or leather product coated with silk fibroin-based proteins or fragments thereof, wherein the textile is a textile or leather product fabricated as a children's car seat. In an embodiment, the invention provides a textile or leather product coated with silk fibroin-based proteins or fragments thereof, wherein the textile is a textile or leather product fabricated as a seat belt or safety harness. In an embodiment, the invention provides a textile or leather product coated with silk fibroin-based proteins or fragments thereof, wherein the textile is a textile or leather product fabricated as a dashboard. In an embodiment, the invention provides a textile or leather product coated with silk fibroin-based proteins or fragments thereof, wherein the textile is a textile or leather product fabricated as a seat. In an embodiment, the invention provides a textile or leather product coated with silk fibroin-based proteins or fragments thereof, wherein the textile is a textile or leather product fabricated as a seat panel. In an embodiment, the invention provides a textile or leather product coated with silk fibroin-based proteins or fragments thereof, wherein the textile is a textile or leather product fabricated as an interior panel. In an embodiment, the invention provides a textile or leather product coated with silk fibroin-based proteins or fragments thereof, wherein the textile is a textile or leather product fabricated as an airbag cover. In an embodiment, the invention provides a textile or leather product coated with silk fibroin-based proteins or fragments thereof, wherein the textile is a textile or leather product fabricated as an airbag. In an embodiment, the invention provides a textile or leather product coated with silk fibroin-based proteins or fragments thereof, wherein the textile is a textile or leather product fabricated as a sunvisor. In an embodiment, the invention provides a textile or leather product coated with silk fibroin-based proteins or fragments thereof, wherein the textile is a textile or leather product fabricated as a wiring harness. In an embodiment, the invention provides a product coated with silk fibroin-based proteins or fragments thereof, wherein the product is a cushion. In an embodiment, the invention provides a product coated with silk fibroin-based proteins or fragments thereof, wherein the product is automotive, aircraft, or other vehicular insulation. The coating comprises silk based proteins or fragments thereof having a weight average molecular weight range of about 5 kDa to about 144 kDa, wherein the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

In an embodiment, the invention provides an article comprising a textile or leather coated with silk fibroin-based proteins or fragments thereof. In an embodiment, the textile or leather is a textile or leather used in the manufacture of tents, sleeping bags, ponchos, and soft-walled coolers. In an embodiment, the textile or leather is a textile or leather used in the manufacture of athletic equipment. In an embodiment, the textile or leather is a textile or leather used in the manufacture of outdoor gear. In an embodiment, the textile or leather is a textile or leather used in the manufacture of hiking gear, such as harnesses and backpacks. In an embodiment, the textile or leather is a textile or leather used in the manufacture of climbing gear. In an embodiment, the textile or leather is canvass. In an embodiment, the textile or leather is a textile or leather used in the manufacture of a hat. In an embodiment, the textile or leather is a textile or leather used in the manufacture of an umbrella. In an embodiment, the textile or leather is a textile or leather used in the manufacture of a tent. In an embodiment, the textile or leather is a textile or leather used in the manufacture of a baby sleeper, a baby blanket, or a baby pajama. In an embodiment, the textile or leather is a textile or leather used in the manufacture of a glove, such as a driving glove or an athletic glove. In an embodiment, the textile or leather is a textile or leather used in the manufacture of athletic pants, such as sweat pants, jogging pants, yoga pants, or pants for use in competitive sports. In an embodiment, the textile or leather is a textile or leather used in the manufacture of athletic shirts, such as sweat shirts, jogging shirts, yoga shirts, or shirts for use in competitive sports. In an embodiment, the textile or leather is a textile or leather used in the manufacture of beach equipment, such as beach umbrellas, beach chairs, beach blankets, and beach towels. In an embodiment, the textile or leather is a textile or leather used in the manufacture of jackets or overcoats. In an embodiment, the textile or leather is a textile or leather used in the manufacture of medical garments, such as surgical drapes, surgical gowns, surgical sleeves, laboratory sleeves, laboratory coats, wound dressings, sterilization wraps, surgical face masks, retention bandages, support devices, compression bandages, shoe covers, surgical blankets, and the like. The coating comprises silk based proteins or fragments thereof having a weight average molecular weight range of about 5 kDa to about 144 kDa, wherein the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

In an embodiment, the invention provides a shoe coated with silk fibroin-based proteins or fragments thereof. In an embodiment, the invention provides a shoe coated with silk fibroin-based proteins or fragments thereof, wherein the shoe exhibits an improved property relative to an uncoated shoe. In an embodiment, the invention provides a shoe coated with silk fibroin-based proteins or fragments thereof, wherein the shoe exhibits an improved property relative to an uncoated shoe, and wherein the improved property is stain resistance. In an embodiment, the invention provides a shoe coated with silk fibroin-based proteins or fragments thereof, wherein the shoe exhibits an improved property relative to an uncoated shoe, and wherein the shoe is made of natural leather or synthetic leather. The coating comprises silk based proteins or fragments thereof having a weight average molecular weight range of about 5 kDa to about 144 kDa, wherein the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

In an embodiment, the invention provides an article comprising a fiber or yarn having a coating, wherein the coating comprises silk based proteins or fragments thereof having a weight average molecular weight range of about 5 kDa to about 144 kDa.

In an embodiment, the invention provides an article comprising a fiber or yarn having a coating, wherein the coating comprises silk based proteins or fragments thereof having a weight average molecular weight range of about 5 kDa to about 144 kDa, and wherein the article is a textile or leather.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and wherein the proteins or protein fragments, prior to coating the fabric, do not spontaneously or gradually gelate and do not visibly change in color or turbidity when in a solution for at least 10 days.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits an improved property, wherein the improved property is an accumulative one-way moisture transport index selected from the group consisting of greater than 40%, greater than 60%, greater than 80%, greater than 100%, greater than 120%, greater than 140%, greater than 160%, and greater than 180%. In an embodiment, the foregoing improved property is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits an improved property, wherein the improved property is an accumulative one way transport capability increase relative to uncoated fabric selected from the group consisting of 1.2 fold, 1.5 fold, 2.0 fold, 3.0 fold, 4.0 fold, 5.0 fold, and 10 fold. In an embodiment, the foregoing improved property is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits an improved property, wherein the improved property is an overall moisture management capability selected from the group consisting of greater than 0.05, greater than 0.10, greater than 0.15, greater than 0.20, greater than 0.25, greater than 0.30, greater than 0.35, greater than 0.40, greater than 0.50, greater than 0.60, greater than 0.70, and greater than 0.80. In an embodiment, the foregoing improved property is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric exhibits substantially no increase in microbial growth after a number of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits substantially no increase in microbial growth after a number of machine washing cycles selected from the group consisting of 5 cycles, 10 cycles, 25 cycles, and 50 cycles, and wherein the microbial growth is microbial growth of a microbe selected from the group consisting of *Staphylococcus aureus, Klebisiella pneumoniae*, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric exhibits substantially no increase in microbial growth after a number of machine washing cycles selected from the group consisting of 5 cycles, 10 cycles, 25 cycles, and 50 cycles, wherein the microbial growth is microbial growth of a microbe selected from the group consisting of *Staphylococcus aureus, Klebisiella pneumoniae*, and combinations thereof, wherein the microbial growth is reduced by a percentage selected from the group consisting of 50%, 100%, 500%, 1000%, 2000%, and 3000% compared to an uncoated fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is applied to the fabric at the fiber level prior to forming the fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is applied to the fabric at the fabric level or garment level (e.g., after manufacture of a garment from fabrics, leathers, and/or other materials).

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level or garment level, and wherein the fabric is bath coated.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level or garment level, and wherein the fabric is spray coated.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level or garment level, and wherein the fabric is coated with a stencil.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level or garment level, and wherein the coating is applied to at least one side of the fabric using a method selected from the group consisting of a bath coating process, a spray coating process, a stencil (i.e., screen) process, a silk-foam based process, a roller-based process, a magnetic roller process, a knife process, a transfer process, a foam process, a lacquering process, and a printing process. In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the coating is applied to both sides of the fabric using a method selected from the group consisting of a bath coating process, a spray coating process, a stencil (i.e., screen) process, a silk-foam based process, a roller-based process, a magnetic roller process, a knife process, a transfer process, a foam process, a lacquering process, and a printing process.

In any of the foregoing embodiment, the coating may be applied at the fabric garment level by any of the methods disclosed herein to recondition fabrics or garments. For example, such reconditioning using a coating comprising silk based proteins or fragments thereof may be performed as part of washing or cleaning a fabric or garment.

In an embodiment, the invention provides an article comprising a fiber or yarn having a coating, wherein the coating comprises silk based proteins or fragments thereof having a weight average molecular weight range of about 5 kDa to about 144 kDa, and wherein the coating has a thickness of about one nanolayer.

In an embodiment, the invention provides an article comprising a fiber or yarn having a coating, wherein the coating comprises silk based proteins or fragments thereof having a weight average molecular weight range of about 5 kDa to about 144 kDa, and wherein the coating has a thickness selected from the group consisting of about 5 nm, about 10 nm, about 15 nm, about 20 nm, about 25 nm, about 50 nm, about 100 nm, about 200 nm, about 500 nm, about 1 μm, about 5 μm, about 10 μm, and about 20 μm.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is adsorbed on the fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the coating is attached to the fabric through chemical, enzymatic, thermal, or irradiative cross-linking.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the hand of the coated fabric is improved relative to an uncoated fabric.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the hand of the coated fabric is improved relative to an uncoated fabric, wherein the hand of the coated fabric that is improved is selected from the group consisting of softness, crispness, dryness, silkiness, and combinations thereof.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is applied to the fabric at the fabric level, and wherein the pilling of the fabric is improved relative to an uncoated fabric.

In an embodiment, the silk coating is applied using a bath process, a screen (or stencil) process, a spray process, a silk-foam based process, and a roller based process.

In an embodiment, a fiber or a yarn comprises a synthetic fiber or yarn, including polyester, Mylar, cotton, nylon, polyester-polyurethane copolymer, rayon, acetate, aramid (aromatic polyamide), acrylic, ingeo (polylactide), lurex (polyamide-polyester), olefin (polyethylene-polypropylene), and combinations thereof.

In an embodiment, a fiber or a yarn comprises a natural fiber or yarn (e.g., from animal or plant sources), including alpaca fiber, alpaca fleece, alpaca wool, lama fiber, lama fleece, lama wool, cotton, cashmere and sheep fiber, sheep fleece, sheep wool, byssus, chiengora, quiviut, yak, rabbit, lambswool, mohair wool, camel hair, angora wool, silkworm silk, abaca fiber, coir fiber, flax fiber, jute fiber, kapok fiber, kenaf fiber, raffia fiber, bamboo fiber, hemp, modal fiber, pina, ramie, sisal, and soy protein fiber.

In an embodiment, a fiber or a yarn comprises a mineral fiber, also known as mineral wool, mineral cotton, or man-made mineral fiber, including fiberglass, glass, glasswool, stone wool, rock wool, slagwool, glass filaments, asbestos fibers, and ceramic fibers.

In an embodiment, a water-soluble silk coating may be used as an adhesive or binder for binding particles to fabrics or for binding fabrics. In an embodiment, an article comprises a fabric bound to another fabric using a silk coating. In an embodiment, an article comprises a fabric with particles bound to the fabric using a silk adhesive.

In an embodiment, the coating is applied to an article including a fabric at the yarn level. In an embodiment, the coating is applied at the fabric level. In an embodiment, the coating has a thickness selected from the group consisting of about 5 nm, about 10 nm, about 15 nm, about 20 nm, about 25 nm, about 50 nm, about 100 nm, about 200 nm, about 500 nm, about 1 μm, about 5 μm, about 10 μm, and about 20 μm. In an embodiment, the coating has a thickness range selected from the group consisting of about 5 nm to about 100 nm, about 100 nm to about 200 nm, about 200 nm to about 500 nm, about 1 μm to about 2 μm, about 2 μm to about 5 μm, about 5 μm to about 10 μm, and about 10 μm to about 20 μm.

In an embodiment, a fiber or a yarn is treated with a polymer, such as polyglycolide (PGA), polyethylene glycols, copolymers of glycolide, glycolide/L-lactide copolymers (PGA/PLLA), glycolide/trimethylene carbonate copolymers (PGA/TMC), polylactides (PLA), stereocopolymers of PLA, poly-L-lactide (PLLA), poly-DL-lactide (PDLLA), L-lactide/DL-lactide copolymers, co-polymers of PLA, lactide/tetramethylglycolide copolymers, lactide/trimethylene carbonate copolymers, lactide/δ-valerolactone copolymers, lactide/ε-caprolactone copolymers, polydepsipeptides, PLA/polyethylene oxide copolymers, unsymmetrically 3,6-substituted poly-1,4-dioxane-2,5-diones, poly-β-hydroxybutyrate (PHBA), PHBA/β-hydroxyvalerate copolymers (PHBA/HVA), poly-β-hydroxypropionate (PHPA), poly-p-dioxanone (PDS), poly-δ-valerolactone, poly-ε-caprolactone, methylmethacrylate-N-vinyl pyrrolidine copolymers, polyesteramides, polyesters of oxalic acid, polydihydropyrans, polyalkyl-2-cyanoacrylates, polyurethanes (PU), polyvinylalcohols (PVA), polypeptides, poly-β-malic acid (PMLA), poly-β-alkanoic acids, polyvinylalcohol (PVA), polyethyleneoxide (PEO), chitine polymers, polyethylene, polypropylene, polyasetal, polyamides, polyesters, polysulphone, polyether ether ketone, polyethylene terephthalate, polycarbonate, polyaryl ether ketone, and polyether ketone ketone.

In an embodiment, the silk coating surface can be modified silk crystals that range in size from nm to μm.

The criterion for "visibility" is satisfied by any one of the following: a change in the surface character of the textile; the silk coating fills the interstices where the yarns intersect; or the silk coating blurs or obscures the weave.

In an embodiment, a silk based protein or fragment solution may be utilized to coat at least a portion of a fabric which can be used to create a textile. In an embodiment, a silk based protein or fragment solution may be weaved into yarn that can be used as a fabric in a textile. In an embodiment, a silk based protein or fragment solution may be used to coat a fiber. In an embodiment, the invention provides an article comprising a silk based protein or fragment solution coating at least a portion of a fabric or a textile. In an embodiment, the invention provides an article comprising a silk based protein or fragment solution coating a yarn. In an embodiment, the invention provides an article comprising a silk based protein or fragment solution coating a fiber.

There is disclosed a textile that is at least partially surface treated with an aqueous solution of pure silk fibroin-based protein fragments of the present disclosure so as to result in a silk coating on the textile. In an embodiment, the silk coating of the present disclosure is available in a spray can and can be sprayed on any textile by a consumer. In an embodiment, a textile comprising a silk coating of the present disclosure is sold to a consumer. In an embodiment, a textile of the present disclosure is used in constructing action sportswear/apparel. In an embodiment, a silk coating of the present disclosure is positioned on the underlining of apparel. In an embodiment, a silk coating of the present disclosure is positioned on the shell, the lining, or the interlining of apparel. In an embodiment, apparel is partially made from a silk coated textile of the present disclosure and partially made from an uncoated textile. In an embodiment, apparel partially made from a silk coated textile and partially made from an uncoated textile combines an uncoated inert synthetic material with a silk coated inert synthetic material. Examples of inert synthetic material include, but are not limited to, polyester, polyamide, polyaramid, polytetrafluorethylene, polyethylene, polypropylene, polyurethane, silicone, mixtures of polyurethane and polyethylenglycol, ultrahigh molecular weight polyethylene, high-performance polyethylene, and mixtures thereof. In an embodiment, apparel partially made from a silk coated textile and partially made from an uncoated textile combines an elastomeric material at least partially covered with a silk coating of the present disclosure. In an embodiment, the percentage of silk to elastomeric material can be varied to achieve desired shrink or wrinkle resistant properties.

In an embodiment, a silk coating of the present disclosure is visible. In an embodiment, a silk coating of the present disclosure positioned on apparel helps control skin temperature. In an embodiment, a silk coating of the present disclosure positioned on apparel helps control fluid transfer away from the skin. In an embodiment, a silk coating of the present disclosure positioned on apparel has a soft feel against the skin decreasing abrasions from fabric on skin. In an embodiment, a silk coating of the present disclosure positioned on a textile has properties that confer at least one of wrinkle resistance, shrinkage resistance, or machine washability to the textile. In an embodiment, a silk coated textile of the present disclosure is 100% machine washable and dry cleanable. In an embodiment, a silk coated textile of the present disclosure is 100% waterproof. In an embodiment, a silk coated textile of the present disclosure is wrinkle resistant. In an embodiment, a silk coated textile of the present disclosure is shrink resistant. In an embodiment, a silk coated textile of the present disclosure has the qualities of being waterproof, breathable, and elastic and possess a number of other qualities which are highly desirable in action sportswear. In an embodiment, a silk coated textile of the present disclosure manufactured from a silk fabric of the present disclosure further includes LYCRA® brand spandex fibers.

In an embodiment, a textile at least partially coated with an aqueous solution of pure silk fibroin-based protein fragments of the present disclosure is a breathable fabric. In an embodiment, a textile at least partially coated with an aqueous solution of pure silk fibroin-based protein fragments of the present disclosure is a water-resistant fabric. In an embodiment, a textile at least partially coated with an aqueous solution of pure silk fibroin-based protein fragments of the present disclosure is a shrink-resistant fabric. In an embodiment, a textile at least partially coated with an aqueous solution of pure silk fibroin-based protein fragments of the present disclosure is a machine-washable fabric. In an embodiment, a textile at least partially coated with an aqueous solution of pure silk fibroin-based protein fragments of the present disclosure is a wrinkle resistant fabric. In an embodiment, textile at least partially coated with an aqueous solution of pure silk fibroin-based protein fragments of the present disclosure provides moisture and vitamins to the skin.

In an embodiment, an aqueous solution of pure silk fibroin-based protein fragments of the present disclosure is used to coat a textile or leather. In an embodiment, the concentration of silk in the solution ranges from about 0.1% to about 20.0%. In an embodiment, the concentration of silk in the solution ranges from about 0.1% to about 15.0%. In an embodiment, the concentration of silk in the solution ranges from about 0.5% to about 10.0%. In an embodiment, the concentration of silk in the solution ranges from about 1.0% to about 5.0%. In an embodiment, an aqueous solution of pure silk fibroin-based protein fragments of the present disclosure is applied directly to a fabric. Alternatively, silk microsphere and any additives may be used for coating a fabric. In an embodiment, additives can be added to an aqueous solution of pure silk fibroin-based protein fragments of the present disclosure before coating (e.g., alcohols) to further enhance material properties. In an embodiment, a silk coating of the present disclosure can have a pattern to optimize properties of the silk on the fabric. In an embodiment, a coating is applied to a fabric under tension and/or lax to vary penetration in to the fabric.

In an embodiment, a silk coating of the present disclosure can be applied at the yarn level, followed by creation of a fabric once the yarn is coated. In an embodiment, an aqueous solution of pure silk fibroin-based protein fragments of the present disclosure can be spun into fibers to make a silk fabric and/or silk fabric blend with other materials known in the apparel industry.

Uses of Textiles and Leathers Coated with Silk Fibroin-Based Protein Fragments in Apparel and Garment Applications In an embodiment, the invention provides an article comprising a fiber or yarn having a coating, wherein the coating comprises silk based proteins or fragments thereof having a weight average molecular weight range of about 5 kDa to about 144 kDa, wherein the article exhibits an improved color retention property. Without being bound by any specific theory, it is postulated that the coating prevents the article from color degradation by separating the fiber or yarn from air or from detergents during washing.

Methods of testing the color retention property of an article are well within the knowledge of one skilled in the art. A specific method of testing of the color retention property of a fabric is described in U.S. Pat. No. 5,142,292, which is incorporated herein by reference in its entirety.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article exhibits an improved color retention property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits an improved color retention property. In an embodiment, the foregoing color retention property of the fabric is determined after a period of machine washing cycles selected from the group consisting of 5 cycles, 10 cycles, 25 cycles, and 50 cycles.

In an embodiment, a textile or leather of the present disclosure exhibits an improved color retention property. In an embodiment, the foregoing improved color retention property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is resistant to microbial (including bacterial and fungal) growth.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is resistant to microbial (including bacterial and fungal) growth. In an embodiment, the foregoing resistant to microbial (including bacterial and fungal) growth property of the fabric is determined after a period of machine washing cycles selected from the group consisting of 5 cycles, 10 cycles, 25 cycles, and 50 cycles.

In an embodiment, a textile or leather of the present disclosure exhibits resistant to microbial (including bacterial and fungal) growth property. In an embodiment, the foregoing resistant to microbial (including bacterial and fungal) growth property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is resistant to the buildup of static electrical charge.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is resistant to the buildup of static electrical charge. In an embodiment, the foregoing resistant to the buildup of static electrical charge property of the fabric is determined after a period of machine washing cycles selected from the group consisting of 5 cycles, 10 cycles, 25 cycles, and 50 cycles.

In an embodiment, a textile or leather of the present disclosure exhibits resistant to the buildup of static electrical charge property. In an embodiment, the foregoing resistant to the buildup of static electrical charge property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is mildew resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is mildew resistant. In an embodiment, the foregoing mildew resistant property of the fabric is determined after a period of machine washing cycles selected from the group consisting of 5 cycles, 10 cycles, 25 cycles, and 50 cycles.

In an embodiment, a textile or leather of the present disclosure exhibits mildew resistant property. In an embodiment, the foregoing mildew resistant property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the coating is transparent.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating is transparent. In an embodiment, the foregoing transparent property of the coating is determined after a period of machine washing cycles selected from the group consisting of 5 cycles, 10 cycles, 25 cycles, and 50 cycles.

In an embodiment, a textile or leather comprises a silk coating of the present disclosure, wherein the silk coating is transparent. In an embodiment, the foregoing transparent property of the coating is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is resistant to freeze-thaw cycle damage.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is resistant to freeze-thaw cycle damage. In an embodiment, the foregoing resistant to freeze-thaw cycle damage property of the fabric is determined after a period of machine washing cycles selected from the group consisting of 5 cycles, 10 cycles, 25 cycles, and 50 cycles.

In an embodiment, a textile or leather of the present disclosure exhibits resistant to freeze-thaw cycle damage. In an embodiment, the foregoing resistant to freeze-thaw cycle damage property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the coating provides protection from abrasion.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the coating provides protection from abrasion. In an embodiment, the foregoing abrasion resistant property of the fabric is determined after a period of machine washing cycles selected from the group consisting of 5 cycles, 10 cycles, 25 cycles, and 50 cycles.

In an embodiment, a textile or leather of the present disclosure exhibits abrasion resistant. In an embodiment, the foregoing abrasion resistant property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article exhibits the property of blocking ultraviolet (UV) radiation.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits the property of blocking ultraviolet (UV) radiation. In an embodiment, the foregoing UV blocking property of the fabric is determined after a period of machine washing cycles selected from the group consisting of 5 cycles, 10 cycles, 25 cycles, and 50 cycles.

In an embodiment, a textile or leather of the present disclosure exhibits UV blocking property. In an embodiment, the foregoing UV blocking property of the textile is determined after a period of machine washing cycles selected from the group consisting of 5 cycles, 10 cycles, 25 cycles, and 50 cycles.

In an embodiment, the invention provides a garment comprising a fiber or yarn having a coating, wherein the coating comprises silk based proteins or fragments thereof having a weight average molecular weight range of about 5 kDa to about 144 kDa, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the article is a fabric, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the garment regulates the body temperature of a wearer.

In an embodiment, the invention provides a garment comprising a fiber or yarn having a coating, wherein the coating comprises silk based proteins or fragments thereof having a weight average molecular weight range of about 5 kDa to about 144 kDa, wherein the article is a fabric, wherein the garment regulates the body temperature of a wearer. In an embodiment, the foregoing temperature regulation property of the fabric is determined after a period of machine washing cycles selected from the group consisting of 5 cycles, 10 cycles, 25 cycles, and 50 cycles.

In an embodiment, a textile or leather of the present disclosure exhibits a temperature regulation property. In an embodiment, the foregoing temperature regulation property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, and wherein the article is tear resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the article is tear resistant. In an embodiment, the foregoing tear resistant property of the fabric is determined after a period of machine washing cycles selected from the group consisting of 5 cycles, 10 cycles, 25 cycles, and 50 cycles.

In an embodiment, a textile or leather of the present disclosure exhibits a tear resistant property. In an embodiment, the foregoing tear resistant property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the elasticity of the article is improved.

In an embodiment, the invention provides an article comprising a fiber or yarn having a coating, wherein the coating comprises silk based proteins or fragments thereof having a weight average molecular weight range of about 5 kDa to about 144 kDa, wherein the elasticity of the article is reduced.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the elasticity of the article is improved.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the elasticity of the article is reduced.

In an embodiment, the invention provides an article comprising a fiber or yarn having a coating, wherein the coating comprises silk based proteins or fragments thereof having a weight average molecular weight range of about 5 kDa to about 144 kDa, wherein the article exhibits a rebound dampening property. Without being bound by any specific theory, it is postulated that the coating prevents the article from returning to the original shape or orientation, and results in the rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article exhibits a rebound dampening property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits a rebound dampening property. In an embodiment, the foregoing rebound dampening property of the fabric is determined after a period of machine washing cycles selected from the group consisting of 5 cycles, 10 cycles, 25 cycles, and 50 cycles.

In an embodiment, a textile or leather of the present disclosure exhibits a rebound dampening property. In an embodiment, the foregoing rebound dampening property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article exhibits an anti-itch property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits an anti-itch property. In an embodiment, the foregoing anti-itch property of the fabric is determined after a period of machine washing cycles selected from the group consisting of 5 cycles, 10 cycles, 25 cycles, and 50 cycles.

In an embodiment, a textile or leather of the present disclosure exhibits an anti-itch property. In an embodiment, the foregoing anti-itch property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article exhibits an improved insulation/warmth property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits an improved insulation/warmth property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article exhibits an improved insulation/warmth property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article exhibits an improved insulation/warmth property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article exhibits an improved insulation/warmth property.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article exhibits an improved insulation/warmth property.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article exhibits an improved insulation/warmth property. In an embodiment, the foregoing improved insulation/warmth property of the fabric is determined after a period of machine washing cycles selected from the group consisting of 5 cycles, 10 cycles, 25 cycles, and 50 cycles.

In an embodiment, a textile or leather of the present disclosure exhibits improved an insulation/warmth property. In an embodiment, the foregoing improved insulation/warmth property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is wrinkle resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is wrinkle resistant. In an embodiment, the foregoing wrinkle resistant property of the fabric is determined after a period of machine washing cycles selected from the group consisting of 5 cycles, 10 cycles, 25 cycles, and 50 cycles.

In an embodiment, a textile or leather of the present disclosure exhibits wrinkle resistant property. In an embodiment, the foregoing wrinkle resistant property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is stain resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is stain resistant. In an embodiment, the foregoing stain resistant property of the fabric is determined after a period of machine washing cycles selected from the group consisting of 5 cycles, 10 cycles, 25 cycles, and 50 cycles.

In an embodiment, a textile or leather of the present disclosure exhibits stain resistant property. In an embodiment, the foregoing stain resistant property of the textile is determined after a period of machine washing cycles selected from the group consisting of 5 cycles, 10 cycles, 25 cycles, and 50 cycles.

In an embodiment, the invention provides an article comprising a fiber or yarn having a coating, wherein the coating comprises silk based proteins or fragments thereof having a weight average molecular weight range of about 5 kDa to about 144 kDa, wherein the article is sticky. Without being bound to any specific theory, it is postulated that the coating provides stickiness and maintains stickiness.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is sticky.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is sticky.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is sticky. In an embodiment, the foregoing sticky property of the fabric is determined after a period of machine washing cycles selected from the group consisting of 5 cycles, 10 cycles, 25 cycles, and 50 cycles.

In an embodiment, a textile or leather of the present disclosure exhibits sticky property. In an embodiment, the foregoing sticky property of the textile is determined after a period of machine washing cycles selected from the group consisting of 5 cycles, 10 cycles, 25 cycles, and 50 cycles.

In an embodiment, the invention provides an article comprising a textile or leather coated with silk fibroin-based proteins or fragments thereof, wherein the article exhibits improved flame resistance relative to an uncoated textile. In an embodiment, the invention provides an article comprising a textile or leather coated with silk fibroin-based proteins or fragments thereof, wherein the article exhibits equal flame resistance relative to an uncoated textile or leather. In an embodiment, the invention provides an article comprising a textile or leather coated with silk fibroin-based proteins or fragments thereof, wherein the article exhibits equal flame resistance relative to an uncoated textile or leather, wherein an alternative textile or leather coating exhibits reduced flame resistance. In an embodiment, the invention provides an article comprising a textile or leather coated with silk fibroin-based proteins or fragments thereof, wherein the article exhibits improved resistance to fire relative to an uncoated textile or leather, wherein the improved resistance to fire is determined by a flammability test. In an embodiment, the flammability test measures afterflame time, afterglow time, char length, and the observation of fabric melting or dripping.

In an embodiment, the invention provides an article comprising a fiber or yarn having a coating, wherein the coating comprises silk based proteins or fragments thereof having a weight average molecular weight range of about 5 kDa to about 144 kDa, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the article is flame resistant.

In an embodiment, the invention provides an article comprising a polyester having a coating, wherein the coating comprises silk based proteins or fragments thereof having a weight average molecular weight range of about 5 kDa to about 144 kDa, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof comprise silk fibroin-based proteins or protein fragments having about 0.01% (w/w) to about 10% (w/w) sericin, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments thereof are selected from the group consisting of natural silk based proteins or fragments thereof, recombinant silk based proteins or fragments thereof, and combinations thereof, wherein the silk based proteins or fragments thereof are natural silk based proteins or fragments thereof that are selected from the group consisting of spider silk based proteins or fragments thereof, silkworm silk based proteins or fragments thereof, and combinations thereof, wherein the natural silk based proteins or fragments are silkworm silk based proteins or fragments thereof, and the silkworm silk based proteins or fragments thereof is *Bombyx mori* silk based proteins or fragments thereof, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the silk based proteins or fragments comprise silk and a copolymer, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is natural fiber or yarn selected from the group consisting of cotton, alpaca fleece, alpaca wool, lama fleece, lama wool, cotton, cashmere, sheep fleece, sheep wool, and combinations thereof, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the fiber or yarn is selected from the group consisting of natural fiber or yarn, synthetic fiber or yarn, or combinations thereof, wherein the fiber or yarn is synthetic fiber or yarn selected from the group consisting of polyester, nylon, polyester-polyurethane copolymer, and combinations thereof, wherein the article is flame resistant.

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, wherein the fabric is flame resistant. In an embodiment, the foregoing flame resistant property of the fabric is determined after a period of machine washing cycles selected from the group consisting of 5 cycles, 10 cycles, 25 cycles, and 50 cycles.

In an embodiment, a textile or leather of the present disclosure is flame resistant. In an embodiment, the foregoing flame resistant property of the textile is determined after a period of machine washing cycles selected from the group consisting of 5 cycles, 10 cycles, 25 cycles, and 50 cycles.

In an embodiment, the invention provides a leather coated with coating, wherein the coating comprises silk based proteins or fragments thereof having a weight average molecular weight range of about 5 kDa to about 144 kDa, wherein the leather exhibits an property selected from the group consisting of an improved color retention property, improved mildew resistance, improved resistance to freeze-thaw cycle damage, improved resistance to abrasion, improved blocking of ultraviolet (UV) radiation, improved regulation of the body temperature of a wearer, improved tear resistance, improved elasticity, improved rebound dampening, improved anti-itch properties, improved insulation, improved wrinkle resistance, improved stain resistance, and improved stickiness. In an embodiment, the invention provides a leather coated with coating, wherein the coating comprises silk based proteins or fragments thereof having a weight average molecular weight range of about 5 kDa to about 144 kDa, wherein the coating is transparent.

In any of the foregoing embodiments, at least one property of the article is improved, wherein the property that is improved is selected from the group consisting of color retention, resistance to microbial growth, resistance to bacterial growth, resistance to fungal growth, resistance to the buildup of static electrical charge, resistance to the growth of mildew, transparency of the coating, resistance to freeze-thaw cycle damage, resistance from abrasion, blocking of ultraviolet (UV) radiation, regulation of the body temperature of a wearer, resistance to tearing, elasticity of the article, rebound dampening, tendency to cause itching in the wearer, thermal insulation of the wearer, wrinkle resistance, stain resistance, stickiness to skin, and flame resistance, and wherein the property is improved by an amount relative to an uncoated article selected from the group consisting of at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 125%, at least 150%, at least 200%, at least 300%, at least 400%, and at least 500%.

In any of the foregoing embodiments, the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

Additional Agents for Use with Textiles Coated with Silk Fibroin-Based Protein Fragments In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with a wetting agent. In an embodiment, the wetting agent improves one or more coating properties. Suitable wetting agents are known to those of skill in the art. Exemplary, non-limiting examples of wetting agents from a representative supplier, Lamberti SPA, are given in the following table.

| | |
|---|---|
| Imbitex NDT | Non silicone low foaming with high wetting in both hot or cold conditions, with good detergency and good stability to alkalis. |
| Imbitex TBL | Wetting and de-aerating agent. |
| Imbitex MRC | Wetting and penetrating agent for mercerizing of cotton. |
| Tensolam Na liq. | Low foam, special wetting and dispersing agent for non-woven wet treatments. |
| Imbitex NRW3 | Wetting agent for water-and oil repellent finishing. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with a detergent. In an embodiment, the detergent improves one or more coating properties. Suitable detergents are known to those of skill in the art. Exemplary, non-limiting examples of detergents from a representative supplier, Lamberti SPA, are given in the following table.

| | |
|---|---|
| Biorol CPNN | Wetting and detergent agent with alkaline stability in NaOH up to 10° C. Recommended for continuous scouring, bleaching, and Jigger applications. |
| Biorol JK new | Wetting and detergent agent with extremely low foam properties, recommended for high bath turbulence machine (e.g., jet, overflow, etc.). |
| Biorol OW 60 | General-purpose wetting and detergent agent suitable for desizing, scouring, and bleaching processes. |
| Biorol OWK | Detergent/wetting agent, low foaming, high concentration, recommended for over-flow. Useful for removal of silicone oil on Lycra blends. |

-continued

| | |
|---|---|
| Cesapon Silk liq. | Specific scouring, de-gumming agent for silk. |
| Cesapon Extra | High detergent power product containing solvent. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with a sequestering or dispersing agent. Suitable sequestering or dispersing agents are known to those of skill in the art. Exemplary, non-limiting examples of sequestering or dispersing agents from a representative supplier, Lamberti SPA, are given in the following table.

| | |
|---|---|
| Lamegal DSP | Dispersing and anti-redepositing agent useful for preparation dyeing and after soaping of dyed and printed materials with reactive and vat dyes. This product is also useful as an anti-olygomer agent in reduction clearing of polyester, dyed or printed with disperse dyes. |
| Chelam TLW/T | Multi-purpose sequestring and dispersing agent for a wide variety of textile processes. No shade variation on dyestuff containing metals. |
| Lamegal TL5 | Multi-purpose sequestring and dispersing agent for a wide variety of textile processes. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with an enzyme. Suitable enzymes are known to those of skill in the art. Exemplary, non-limiting examples of enzymes from a representative supplier, Lamberti SPA, are given in the following table.

| | |
|---|---|
| Lazim HT | Thermo-stable amylase for rapid high temperature desizing. |
| Lazim PE | Specific enzyme for bioscouring; provides optimal wettability, it improves dyeing and color fastness without causing depolimerization and fabric strength loss. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with a bleaching agent. Suitable bleaching agents are known to those of skill in the art. Exemplary, non-limiting examples of bleaching agents from a representative supplier, Lamberti SPA, are given in the following table.

| | |
|---|---|
| Stabilox OTN conc. | Highly concentrated stabilizer for alkaline bleaching with hydrogen peroxide. Suitable for a wide variety of processes. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with an antifoaming agent. Suitable antifoaming agents are known to those of skill in the art. Exemplary, non-limiting examples of antifoaming agents from a representative supplier, Lamberti SPA, are given in the following table.

| | |
|---|---|
| Antifoam SE 47 | General purpose defoaming agent. |
| Defomex JET | Silicone defoamer effective up to 130° C. Recommended for HT and JET dyeing systems. |
| Defomex 2033 | Non-silicone defoamer. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is pretreated with an anti-creasing agent. Suitable anti-creasing agents are known to those of skill in the art. Exemplary, non-limiting examples of anti-creasing agents from a representative supplier, Lamberti SPA, are given in the following table.

| | |
|---|---|
| Lubisol AM | Lubricating and anti-creasing agent for rope wet operation on all kind of fibers and machines. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a dye dispersing agent. Suitable dye dispersing agents are known to those of skill in the art. Exemplary, non-limiting examples of dye dispersing agents from a representative supplier, Lamberti SPA, are given in the following table.

| | |
|---|---|
| Lamegal BO | Liquid dispersing agent (non-ionic), suitable for direct, reactive, disperse dyeing and PES stripping. |
| Lamegal DSP | Dispersing and anti back-staining agent in preparation, dyeing and soaping of dyed and printed materials. Antioligomer agent. |
| Lamegal 619 | Effective low foam dispersing leveling agent for dyeing of PES. |
| Lamegal TL5 | Multi-purpose sequestering and dispersing agent for a variety of textile processes. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a dye leveling agent. Suitable dye leveling agents are known to those of skill in the art. Exemplary, non-limiting examples of dye leveling agents from a representative supplier, Lamberti SPA, are given in the following table.

| | |
|---|---|
| Lamegal A 12 | Leveling agent for dyeing on wool, polyamide and its blends with acid or metal complex dyes. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a dye fixing agent. Suitable dye fixing agents are known to those of skill in the art. Exemplary, non-limiting examples of dye fixing agents from a representative supplier, Lamberti SPA, are given in the following table.

| | |
|---|---|
| Lamfix L | Fixing agent for direct and reactive dyestuffs, containing formaldehyde. |
| Lamfix LU conc. | Formaldehyde free cationic fixing agent for direct and reactive dyes. It does not affect the shade and light fastness. |
| Lamfix PA/TR | Fixing agent to improve the wet fastness of acid dyes on polyamide fabrics, dyed or printed and polyamide yarns. Retarding agent in dyeing of Polyamide/cellulosic blends with direct dyes. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a dye special resin agent. Suitable dye special resin agents are known to those of skill in the art. Exemplary, non-limiting examples of dye special resin agents from a representative supplier, Lamberti SPA, are given in the following table.

| | |
|---|---|
| Denifast TC | Special resin for cationization of cellulose fibers to obtain special effects ("DENIFAST system" and "DENISOL system"). |
| Cobral DD/50 | Special resin for cationization of cellulose fibers to obtain special effect ("DENIFAST system" and "DENISOL system"). |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a dye anti-reducing agent. Suitable dye anti-reducing agents are known to those of skill in the art. Exemplary, non-limiting examples of dye anti-reducing agents from a representative supplier, Lamberti SPA, are given in the following table.

| | |
|---|---|
| Lamberti Redox L2S gra | Anti-reducing agent in grain form. 100% active content. |
| Lamberti Redox L2S liq. | Anti-reducing agent in liquid form for automatic dosage. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a pigment dye system anti-migrating agent. Suitable pigment dye system anti-migrating agents are known to those of skill in the art. Exemplary, non-limiting examples of pigment dye system anti-migrating agents from a representative supplier, Lamberti SPA, are given in the following table.

| | |
|---|---|
| Neopat Compound 96/m conc. | Compound, developed as migration inhibitor for continuous dyeing process with pigments (pad-dry process). |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a pigment dye system binder. Suitable pigment dye system binders are known to those of skill in the art. Exemplary, non-limiting examples of pigment dye system binders from a representative supplier, Lamberti SPA, are given in the following table.

| | |
|---|---|
| Neopat Binder PM/S conc. | Concentrated version of a specific binder used to prepare pad-liquor for dyeing with pigments (pad-dry process). |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a pigment dye system binder and anti-migrating agent combination. Suitable pigment dye system binder and anti-migrating agent combinations are known to those of skill in the art. Exemplary, non-limiting examples of pigment dye system binder and anti-migrating agent combinations from a representative supplier, Lamberti SPA, are given in the following table.

| | |
|---|---|
| Neopat Compound PK1 | Highly concentrated all-in-one product specifically developed as migration inhibitor with specific binder for continuous dyeing process with pigments (pad-dry process). |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is treated with a delave agent. Suitable delave agents are known to those of skill in the art. Exemplary, non-limiting examples of delave agents from a representative supplier, Lamberti SPA, are given in the following table.

| | |
|---|---|
| Neopat compound FTN | Highly concentrated compound of surfactants and polymers specifically developed for pigment dyeing and pigment-reactive dyeing process; especially for medium/dark shades for wash off effect. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is traditionally finished with a wrinkle free treatment. Suitable wrinkle free treatments are known to those of skill in the art. Exemplary, non-limiting examples of wrinkle free treatments from a representative supplier, Lamberti SPA, are given in the following table.

| | |
|---|---|
| Cellofix ULF conc. | Anti-crease modified glyoxalic resin for finishing of cottons, cellulosics and blends with synthetics fibers. |
| Poliflex PO 40 | Polyethilenic resin for waxy, full and slippy handle by foulard applications. |
| Rolflex WF | Aliphatic waterborne Nano-PU dispersion used as extender for wrinkle free treatments. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is traditionally finished with a softener. Suitable softeners are known to those of skill in the art. Exemplary, non-limiting examples of softeners from a representative supplier, Lamberti SPA, are given in the following table.

| | |
|---|---|
| Texamina C/FPN | Cationic softening agent with a very soft handle particularly recommended for application by exhaustion for all kind of fabrics. Suitable also for cone application. |
| Texamina C SAL flakes | 100% cationic softening agent in flakes form for all type of fabrics. Dispersible at room temperature. |
| Texamina CL LIQ. | Anphoteric softening agent for all types of fabrics. Not yellowing. |
| Texamina HVO | Anphoteric softening agent for woven and knitted fabrics of cotton, other cellulosics and blends. Provides a soft, smooth and dry handle. Applied by padding. |
| Texamina SIL | Nonionic silicon dispersion in water. Excellent softening, lubricating and anti-static properties for all fibre types by padding. |
| Texamina SILK | Special cationic softener with silk protein inside. Provides a "swollen touch" particularly suitable for cellulosic, wool, silk. |
| Lamfinish LW | All-in compound based on special polymeric hydrophilic softeners; by coating, foulard, and exhaustion. |
| Elastolam E50 | General purpose mono-component silicone elastomeric softener for textile finishing. |
| Elastolam EC 100 | Modified polysiloxane micro-emulsion which gives a permanent finishing, with extremely soft and silky handle. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is traditionally finished with a handle modifier. Suitable handle modifiers are known to those of skill in the art. Exemplary, non-limiting examples of handle modifiers from a representative supplier, Lamberti SPA, are given in the following table.

| | |
|---|---|
| Poliflex CSW | Cationic anti-slipping agent. |
| Poliflex R 75 | Parafine finishing agent to give waxy handle. |
| Poliflex s | Compound specifically developed for special writing effects. |
| Poliflex m | Compound for special dry-waxy handle. |
| Lamsoft SW 24 | Compound for special slippy handle specifically developed for coating application. |
| Lamfinish SLIPPY | All-in-one compound to get a slippy touch; by coating. |
| Lamfinish GUMMY | All-in-one compound to get a gummy touch; by coating. |
| Lamfinish OLDRY | All-in-one compound to get dry-sandy touch especially suitable for vintage effects; by coating. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is traditionally finished with a waterborne polyurethane (PU) dispersion. Suitable waterborne polyurethane dispersions for traditional finishing are known to those of skill in the art. Exemplary, non-limiting examples of waterborne polyurethane dispersions for traditional finishing from a representative supplier, Lamberti SPA, are given in the following table.

| | |
|---|---|
| Rolflex LB 2 | Aliphatic waterborne PU dispersion particularly suggested for the formulation of textile coatings where bright and rigid top finish is required. It is particularly suitable as a finishing agent for organza touch on silk fabrics. Transparent and shiny. |
| Rolflex HP 51 | Aliphatic waterborne PU dispersion particularly suggested for the formulation of textile coatings for outwear, luggage, technical articles especially where hard and flexible touch is required. Transparent and shiny. |
| Rolflex PU 879 | Aliphatic waterborne PU dispersion particularly suggested for the formulation of textile coatings for outwear, luggage, technical articles where a medium-hard and flexible touch is required. |
| Rolflex ALM | Aliphatic waterborne PU dispersion particularly suggested for the formulation of textile coatings for outwear, luggage, technical articles where a soft and flexible touch is required. Can be also suitable for printing application. |
| Rolflex AP | Aliphatic waterborne PU dispersion particularly suggested for the formulation of textile coatings for outwear, fashion where a soft and gummy touch is required. |
| Rolflex W4 | Aliphatic waterborne PU dispersion particularly suggested for the formulation of textile coatings for clothing, outwear where a full, soft and non sticky touch is required. |
| Rolflex ZB7 | Aliphatic waterborne PU dispersion particularly suggested for the formulation of textile coatings for clothing, outwear, sportswear, fashion and technical articles for industrial applications. The product has a very high charge digestion properties, electrolytes stability and excellent mechanical and tear resistance. Can be also suitable for foam coating and printing application. |
| Rolflex BZ 78 | Aliphatic waterborne PU dispersion particularly suggested for the formulation of textile coatings for clothing, outwear, sportswear, fashion and technical articles for industrial applications. The product has an excellent hydrolysis resistance, a very high charge digestion and electrolytes stability and an excellent mechanical and tear resistance. Can be also suitable for foam coating and printing application. |
| Rolflex K 110 | Gives to the coated fabric a full, soft, and slightly sticky handle with excellent fastness on all types of fabrics. |
| Rolflex OP 80 | Aliphatic waterborne PU dispersion particularly suggested for the formulation of textile coatings for outwear, luggage and fashion finishes where an opaque non writing effect is desired. |
| Rolflex NBC | Aliphatic waterborne PU dispersion generally used by padding application as a filling and zero formaldehyde sizing agent. Can be used for outwear and fashion finishing where a full, elastic and non-sticky touch is required. |
| Rolflex PAD | Aliphatic waterborne PU dispersion specifically designed for padding application for outwear, sportswear and fashion applications where a full, elastic and non sticky touch is required. Excellent washing and dry cleaning fastness as well as good bath stability. |
| Rolflex PN | Aliphatic waterborne PU dispersion generally applied by padding application for outerwear and fashion high quality applications where strong, elastic non sticky finishes are required. |
| Elafix PV 4 | Aliphatic blocked isocyanate nano-dispersion used in order to give anti-felting and anti-pilling properties to pure wool fabrics and his blend. |
| Rolflex SW3 | Aliphatic waterborne PU dispersion particularly suggested to be used by padding application for the finishing of outwear, sportswear and fashion where a slippery and elastic touch is required. It is also a good anti-pilling agent. Excellent in wool application. |
| Rolflex C 86 | Aliphatic cationic waterborne PU dispersion particularly suggested for the formulation of textile coatings for clothing, outwear, fashion where medium-soft and pleasant full touch is required. Fabrics treated with the product can be dyed with a selection of dyes, to get double-color effects of different intensity. |
| Rolflex CN 29 | Aliphatic cationic waterborne PU dispersion particularly suggested for the formulation of textile coatings for clothing, outwear, fashion where soft and pleasant full touch is required. Fabrics treated with the product can be dyed with a selection of dyes, to get double-color effects of different intensity. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is traditionally finished with a finishing resin. Suitable finishing resins are known to those of skill in the art. Exemplary, non-limiting examples of finishing resins from a representative supplier, Lamberti SPA, are given in the following table.

| | |
|---|---|
| Textol 110 | Handle modifier with very soft handle for coating finishes |
| Textol RGD | Water emulsion of acrylic copolymer for textile coating, with very rigid handle. |
| Textol SB 21 | Butadienic resin for finishing and binder for textile printing |
| Appretto PV/CC | Vinylacetate water dispersion for rigid stiffening |
| Amisolo B | CMS water dispersion for textile finishing as stiffening agent |
| Lamovil RP | PVOH stabilized solution as stiffening agent |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is technically finished with a waterborne polyurethane dispersion. Suitable waterborne polyurethane dispersions for technical finishing are known to those of skill in the art. Exemplary, non-limiting examples of waterborne polyurethane dispersions for technical finishing from a representative supplier, Lamberti SPA, are given in the following table.

| | |
|---|---|
| Rolflex AFP | Aliphatic polyether polyurethane dispersion in water. The product has high hydrolysis resistance, good breaking load resistance and excellent tear resistance. |
| Rolflex ACF | Aliphatic polycarbonate polyurethane dispersion in water. The product shows good PU and PVC bonding properties, excellent abrasion resistance as well as chemical resistance, included alcohol. |
| Rolflex V 13 | Aliphatic polyether/acrylic copolymer polyurethane dispersion in water. The product has good thermoadhesive properties and good adhesion properties on PVC. |
| Rolflex K 80 | Aliphatic polyether/acrylic copolymer polyurethane dispersion in water. ROLFLEX K 80 is specifically designed as a high performing adhesive for textile lamination. The product has excellent perchloroethylene and water fastness. |

-continued

| | |
|---|---|
| Rolflex ABC | Aliphatic polyether polyurethane dispersion in water. Particularly, the product presents very high water column, excellent electrolyte resistance, high LOT index, high resistance to multiple bending. |
| Rolflex ADH | Aliphatic polyether polyurethane dispersion in water. The product has a very high water column resistance. |
| Rolflex W4 | Aliphatic waterborne PU dispersion particularly suggested for the formulation of textile coatings for clothing, outwear where a full, soft and non-sticky touch is required. |
| Rolflex ZB7 | Aliphatic waterborne PU dispersion particularly suggested for the formulation of textile coatings for clothing, outwear, sportswear, fashion and technical articles for industrial applications. The product has a very high charge digestion properties, electrolytes stability and excellent mechanical and tear resistance. Can be also suitable for foam coating and printing application. |
| Rolflex BZ 78 | Aliphatic waterborned PU dispersion particularly suggested for the formulation of textile coatings for clothing, outwear, sportswear, fashion and technical articles for industrial applications. The product has an excellent hydrolysis resistance, a very high charge digestion and electrolites stability and an excellent mechanical and tear resistance. Can be also suitable for foam coating and printing application. |
| Rolflex PU 147 | Aliphatic polyether polyurethane dispersion in water. This product shows good film forming properties at room temperature. It has high fastness to light and ultraviolet radiation and good resistance to water, solvent and chemical agents, as well as mechanical resistance. |
| Rolflex SG | Aliphatic polyether polyurethane dispersion in water. Due to its thermoplastic properties it is suggested to formulate heat activated adhesives at low temperatures. |
| Elafix PV 4 | Aliphatic blocked isocyanate nano-dispersion used in order to give antifelting and antipilling properties to pure wool fabrics and his blend. |
| Rolflex C 86 | Aliphatic cationic waterborne PU dispersion particularly suggested for the formulation of textile coatings for clothing, outwear, fashion where medium-soft and pleasant full touch is required. Fabrics treated with the product can be dyed with a selection of dyes, to get double-color effects of different intensity. |
| Rolflex CN 29 | Aliphatic cationic waterborne PU dispersion particularly suggested for the formulation of textile coatings for clothing, outwear, fashion where soft and pleasant full touch is required. Fabrics treated with the product can be dyed with a selection of dyes, to get double-color effects of different intensity. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is technically finished with an oil or water repellant. Suitable oil or water repellants for technical finishing are known to those of skill in the art. Exemplary, non-limiting examples of oil or water repellants for technical finishing from a representative supplier, Lamberti SPA, are given in the following table.

| | |
|---|---|
| Lamgard FT 60 | General purpose fluorocarbon resin for water and oil repellency; by padding application. |
| Lamgard 48 | High performance fluorocarbon resin for water and oil repellency; by padding application. High rubbing fastness. |
| Imbitex NRW3 | Wetting agent for water-and oil repellent finishing. |
| Lamgard EXT | Crosslinker for fluorocarbon resins to improve washing fastness. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is technically finished with a flame retardant. Suitable flame retardants for technical finishing are known to those of skill in the art. Exemplary, non-limiting examples of flame retardants for technical finishing from a representative supplier, Lamberti SPA, are given in the following table.

| | |
|---|---|
| Piroflam 712 | Non-permanent flame retardant compound for padding and spray application. |
| Piroflam ECO | Alogen free flame retardant compound for back coating application for all kind of fibers. |
| Piroflam UBC | Flame retardant compound for back coating application for all kind of fibers. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is technically finished with a crosslinker. Suitable crosslinkers for technical finishing are known to those of skill in the art. Exemplary, non-limiting examples of crosslinkers for technical finishing from a representative supplier, Lamberti SPA, are given in the following table.

| | |
|---|---|
| Rolflex BK8 | Aromatic blocked polyisocyanate in water dispersion. It is suggested as a cross-linking agent in coating pastes based of polyurethane resins to improve washing fastness. |
| Fissativo 05 | Water dispersible aliphatic polyisocyanate suitable as crosslinking agent for acrylic and polyurethane dispersions to improve adhesion and wet and dry scrub resistance. |
| Resina MEL | Melammine-formaldheyde resin. |
| Cellofix VLF | Low formaldheyde malammine resin. |

In an embodiment, the invention provides an article comprising a fiber or yarn having a coating, wherein the coating comprises silk based proteins or fragments thereof having a weight average molecular weight range of about 5 kDa to about 144 kDa, wherein the article is a fabric, and wherein the fabric is technically finished with a thickener for technical finishing. Suitable thickeners for technical finishing are known to those of skill in the art. Exemplary, non-limiting examples of thickeners for technical finishing from a representative supplier, Lamberti SPA, are given in the following table.

| | |
|---|---|
| Lambicol CL 60 | Fully neutralised synthetic thickener for pigment printing in oil/water emulsion; medium viscosity type |
| Viscolam PU conc. | Nonionic polyurethane based thickener with pseudoplastic behavior. |
| Viscolam 115 new | Acrylic thickener; not neutralised. |
| Viscolam PS 202 | Nonionic polyurethane based thickener with newtonian behavior. |
| Viscolam 1022 | Nonionic polyurethane based thickener with moderate pseudoplastic behavior. |

In any of the foregoing textile or leather embodiments, the coating comprises silk based proteins or fragments thereof having a weight average molecular weight range of about 5 kDa to about 144 kDa. In any of the foregoing textile or leather embodiments, the coating comprises silk based proteins or fragments thereof having a weight average molecular weight range of about 6 kDa to about 16 kDa. In any of the foregoing textile or leather embodiments, the coating comprises silk based proteins or fragments thereof having a weight average molecular weight range of about 17 kDa to about 38 kDa. In any of the foregoing textile or leather embodiments, the coating comprises silk based proteins or fragments thereof having a weight average molecular weight range of about 39 kDa to about 80 kDa.

In any of the foregoing textile or leather embodiments, the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

Other Materials Coated with Silk Fibroin-Based Protein Fragments

In an embodiment, the invention provides a material coated with silk fibroin-based proteins or fragments thereof. The material may be any material suitable for coating, including plastics (e.g., vinyl), foams (e.g., for use in padding and cushioning), and various natural or synthetic products.

In an embodiment, the invention provides an automobile component coated with silk fibroin-based proteins or fragments thereof having a weight average molecular weight range of about 5 kDa to about 144 kDa. In an embodiment, the invention provides an automobile component coated with silk fibroin-based proteins or fragments thereof having a weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days. In an embodiment, the invention provides an automobile component coated with silk fibroin-based proteins or fragments thereof, wherein the automobile component exhibits an improved property relative to an uncoated automobile component. In an embodiment, the invention provides an automobile component coated with silk fibroin-based proteins or fragments thereof, wherein the automobile component exhibits an improved property relative to an uncoated automobile component, and wherein the automobile component is selected from the group consisting of an upholstery fabric, a headliner, a seat, a headrest, a transmission control, a floor mat, a carpet fabric, a dashboard, a steering wheel, a trim, a wiring harness, an airbag cover, an airbag, a sunvisor, a seat belt, a headrest, an armrest, and a children's car seat. In an embodiment, the invention provides an electrical component insulated with a coating comprising silk fibroin-based proteins or fragments thereof.

In an embodiment, the invention provides a foam coated with silk fibroin-based proteins or fragments thereof having a weight average molecular weight range of about 5 kDa to about 144 kDa. In an embodiment, the invention provides a foam coated with silk fibroin-based proteins or fragments thereof having a weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days. In an embodiment, the invention provides a foam coated with silk fibroin-based proteins or fragments thereof, wherein the foam exhibits an improved property relative to an uncoated foam, and wherein the foam is selected from the group consisting of a polyurethane foam, an ethylene-vinyl acetate copolymer foam, a low density polyethylene foam, a low density polyethylene foam, a high density polyethylene foam, a polypropylene copolymer foam, a linear low density polyethylene foam, a natural rubber foam, a latex foam, and combinations thereof.

In any of the foregoing embodiments, the material coating comprises silk based proteins or fragments thereof having a weight average molecular weight range of about 5 kDa to about 144 kDa. In any of the foregoing embodiments, the material coating comprises silk based proteins or fragments thereof having a weight average molecular weight range of about 6 kDa to about 16 kDa. In any of the foregoing embodiments, the material coating comprises silk based proteins or fragments thereof having a weight average molecular weight range of about 17 kDa to about 38 kDa. In any of the foregoing embodiments, the material coating comprises silk based proteins or fragments thereof having a weight average molecular weight range of about 39 kDa to about 80 kDa.

In any of the foregoing embodiments, the silk based proteins or protein fragments thereof have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and wherein the proteins or protein fragments, prior to coating the fabric, do not spontaneously or gradually gelate and do not visibly change in color or turbidity when in a solution for at least 10 days.

Processes for Coating Textiles and Leathers with Silk Fibroin-Based Protein Fragments In an embodiment, a method for silk coating a textile, leather, or other material (such as a foam) includes immersion of the textile, leather, or other material in any of the aqueous solutions of pure silk fibroin-based protein fragments of the present disclosure. In an embodiment, a method for coating a textile, leather, or other material (such as a foam) includes spraying. In an embodiment, a method for coating a textile, leather, or other material (such as a foam) includes chemical vapor deposition. In an embodiment, a method for silk coating a textile, leather, or other material (such as a foam) includes electrochemical coating. In an embodiment, a method for silk coating a textile, leather, or other material (such as a foam) includes knife coating to spread any of the aqueous solutions of pure silk fibroin-based protein fragments of the present disclosure onto the fabric. The coated article may then be air dried, dried under heat/air flow, or cross-linked to the fabric surface. In an embodiment, a drying process includes curing with additives, irradition (e.g., using UV light), heat (e.g., microwave or radiofrequency irradiation), and/or drying at ambient condition. In an embodiment, the invention provides a method of coating a textile, leather, or other material (such as a foam) comprising the step of applying a coating, wherein the coating comprises a solution of silk based proteins or fragments thereof having a weight average molecular weight range of about 5 kDa to about 144 kDa, wherein the coating is applied to at least one side of the textile, leather, or other material using a method selected from the group consisting of a bath coating process, a spray coating process, a stencil (i.e., screen) process, a silk-foam based process, a roller-based process, a magnetic roller process, a knife process, a transfer process, a foam process, a lacquering process, a supercritical fluid impregnation process, and a printing process.

In an embodiment, the invention provides a method of coating a textile or leather comprising a step selected from the group consisting of providing an unwinding device used to unroll the fabric supply in a roll configuration, providing a feeding system used to control the feed rate of fabric, providing a material compensator used to maintain consistent the fabric tension, providing a coating machine to apply the silk solution (i.e., silk fibroin-based protein fragments) in different state (liquid or foam) to the fabric, providing a measuring system used to control the amount of silk solution applied, providing a dryer used to cure or dry the silk solution on the fabric, providing a cooling station used to bring the fabric temperature close to room value, providing a steering frame used to guide the fabric to the rewinding device and maintain straight edges, providing a rewinding step used to collect the coated fabric in roll, providing UV irradiation for curing of silk and/or other fabric additives (e.g., in a chemical cross-linking step), providing radiofrequency (RF) irradiation (e.g., using microwave irradiation) for drying and chemical cross-linking, and combinations thereof. Chemical and enzymatic cross-linking steps suitable for use with the compositions, articles, and methods of the invention include any method known to those of skill in the art, including but not limited to N-hydroxysuccinimide ester crosslinking, imidoester crosslinking, carbodiimide crosslinking, dicyclohexyl carbodiimide crosslinking, maleimide crosslinking, haloacetyl crosslinking, pyridyl disulfide crosslinking, hydrazide crosslinking, alkoxyamine crosslinking, reductive amination crossling, aryl azide crosslinking, diazirine crosslinking, azide-phosphine crosslinking, transferase crosslinking, hydrolase crosslinking, transglutaminase crosslinking, peptidase crosslinking (e.g., sortase SrtA from *Staphylococcus aureus*), oxidoreductase crosslinking, tyrosinase crosslinking, laccase crosslinking, peroxidase crosslinking (e.g., horseradish peroxidase), lysyl oxidase crosslinking, and combinations thereof.

In an embodiment, the invention provides a method of coating a textile or leather comprising the step of applying a coating, wherein the coating comprises a solution of silk based proteins or fragments thereof having a weight average molecular weight range of about 5 kDa to about 144 kDa, and wherein the coating is applied to at least one side of the textile or leather using a supercritical fluid impregnation process. The supercritical fluid impregnation process may use $CO_2$ as the supercritical fluid to solubilize and impregnate silk based proteins or fragments thereof into a textile or leather, wherein the supercritical $CO_2$ may include optional organic modifiers known in the art (e.g., methanol) and may further include additional agents described herein, such as dyes.

In an embodiment, the invention provides a method of coating a textile or leather comprising the step of applying a coating, wherein the coating comprises a solution of silk based proteins or fragments thereof having a weight average molecular weight range of about 5 kDa to about 144 kDa, using a handheld aerosol spray suitable for consumer use or an aerosol spray system suitable for use by a professional cleaner (e.g., a dry cleaner).

In an embodiment, the invention provides a method of coating a textile or leather comprising the step of applying a coating, wherein the coating comprises a solution of silk based proteins or fragments thereof having a weight average molecular weight range of about 5 kDa to about 144 kDa, using a home washing machine.

In an embodiment, the invention provides a method of coating a fabric comprising the steps of:

(a) applying a pretreatment selected from the group consisting of a wetting agent, a detergent, a sequestering or dispersing agent, an enzyme, a bleaching agent, an antifoaming agent, an anti-creasing agent, a dye dispersing agent, a dye leveling agent, a dye fixing agent, a dye special resin agent, a dye anti-reducing agent, a pigment dye system anti-migrating agent, a pigment dye system binder, a delave agent, a wrinkle free treatment, a softener, a handle modifier, a waterborne polyurethane dispersion, a finishing resin, an oil or water repellant, a flame retardant, a crosslinker, a thickener for technical finishing, or any combination thereof;

(b) applying a coating comprising a solution of silk based proteins or fragments thereof having a weight average molecular weight range of about 5 kDa to about 144 kDa, using a spray, screen, or stencil coating process; and (c) drying and optionally curing the coating.

In any of the foregoing embodiments of methods, the silk based proteins or protein fragments thereof may have an average weight average molecular weight range selected from the group consisting of about 5 to about 10 kDa, about 6 kDa to about 16 kDa, about 17 kDa to about 38 kDa, about 39 kDa to about 80 kDa, about 60 to about 100 kDa, and about 80 kDa to about 144 kDa, wherein the silk based proteins or fragments thereof have a polydispersity of between about 1.5 and about 3.0, and optionally wherein the proteins or protein fragments, prior to coating the fabric, do not spontaneously or gradually gelate and do not visibly change in color or turbidity when in a solution for at least 10 days.

Additives for Silk Fibroin-Based Protein Fragments and Solutions Thereof

In an embodiment, a solution of the present disclosure is contacted with an additive, such as a therapeutic agent and/or a molecule. In an embodiment, molecules include, but are not limited to, antioxidants and enzymes. In an embodiment, molecules include, but are not limited to, ceramics, ceramic particles, metals, metal particles, polymer particles, aldehydes, luminescent molecules, phosphorescent molecules, fluorescent molecules, inorganic particles, organic particles, selenium, ubiquinone derivatives, thiol-based antioxidants, saccharide-containing antioxidants, polyphenols, botanical extracts, caffeic acid, apigenin, pycnogenol, resveratrol, folic acid, vitamin B12, vitamin B6, vitamin B3, vitamin E, vitamin C and derivatives thereof, vitamin D, vitamin A, astaxathin, Lutein, lycopene, essential fatty acids (omegas 3 and 6), iron, zinc, magnesium, flavonoids (soy, Curcumin, Silymarin, Pycnongeol), growth factors, aloe, hyaluronic acid, extracellular matrix proteins, cells, nucleic acids, biomarkers, biological reagents, zinc oxide, benzyol peroxide, retnoids, titanium, allergens in a known dose (for sensitization treatment), essential oils including, but not limited to, lemongrass or rosemary oil, and fragrances. Therapeutic agents include, but are not limited to, small molecules, drugs, proteins, peptides and nucleic acids. In an embodiment, a solution of the present disclosure is contacted with an allergen of known quantity prior to forming the article. Allergens include but are not limited to milk, eggs, peanuts, tree nuts, fish, shellfish, soy and wheat. Known doses of allergen loaded within a silk article can be released at a known rate for controlled exposure allergy study, tests and sensitization treatment.

In an embodiment, silk fibroin-based protein fragments and solutions thereof may be combined with other soluble and insoluble additives coated onto textiles and leather as described herein, wherein the silk fibroin-based protein fragments and solutions functions as a binder or a dispersion medium for the additives. Additives described herein and those known of ordinary skill in the art for use with coating textiles and leather may be used. The combinations of silk fibroin-based protein fragments and solutions thereof with other soluble and insoluble additives may exhibit improved properties as described herein. The property that is improved may be selected from the group consisting of color retention, resistance to microbial growth, resistance to bacterial growth, resistance to fungal growth, resistance to the buildup of static electrical charge, resistance to the growth of mildew, transparency of the coating, resistance to freeze-thaw cycle damage, resistance from abrasion, blocking of ultraviolet (UV) radiation, regulation of the body temperature of a wearer, resistance to tearing, elasticity of the article, rebound dampening, tendency to cause itching in the wearer, thermal insulation of the wearer, wrinkle resistance, stain resistance, stickiness to skin, flame resistance, and combinations thereof. For example, silk fibroin-based protein fragments and solutions thereof may be combined with insoluble ceramic particles as a suspension, and subsequently coated onto a textile using any of the methods described herein to provide further thermal insulation for the wearer and/or to provide improved flame resistance, or to provide other improved properties.

In an embodiment, a solution of the present disclosure is used to create an article with microneedles by standard methods known to one in the art for controlled delivery of molecules or therapeutic agents to or through the skin.

Processes for Production of Silk Fibroin-Based Protein Fragments and Solutions Thereof As used herein, the term "fibroin" includes silkworm fibroin and insect or spider silk protein. In an embodiment, fibroin is obtained from *Bombyx mori*. In an embodiment, the spider silk protein is selected from the group consisting of swathing silk (Achniform gland silk), egg sac silk (Cylindriform gland silk), egg case silk (Tubuliform silk), non-sticky dragline silk (Ampullate gland silk), attaching thread silk (Pyriform gland silk), sticky silk core fibers (Flagelliform gland silk), and sticky silk outer fibers (Aggregate gland silk).

Figure 1:
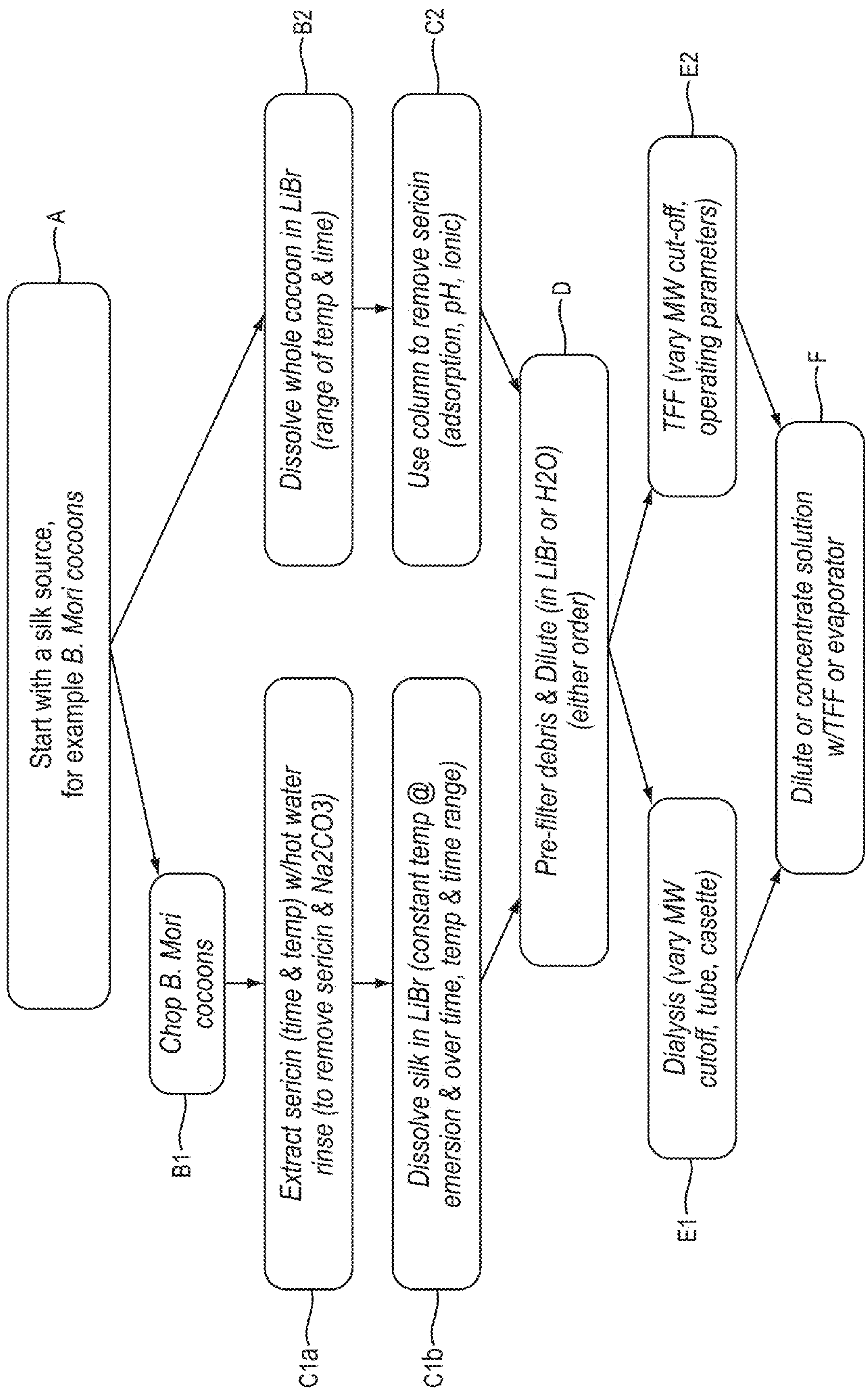
FIG. 1 is a flow chart showing various embodiments for producing pure silk fibroin-based protein fragments (SPFs) of the present disclosure.
Figure 38A:
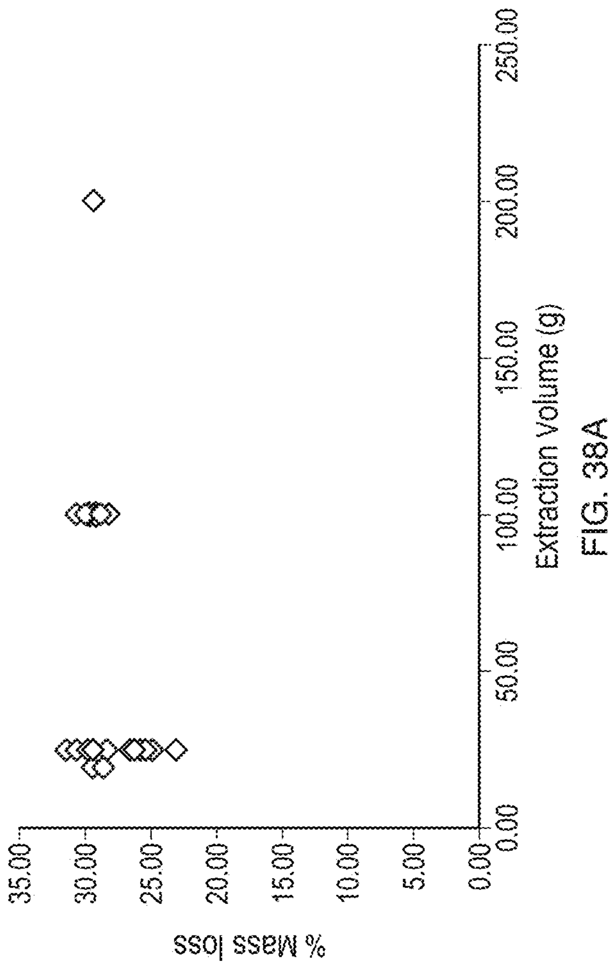
FIGS. 38A and 38B are graphs representing the effect of extraction volume on mass loss.
Figure 38B:
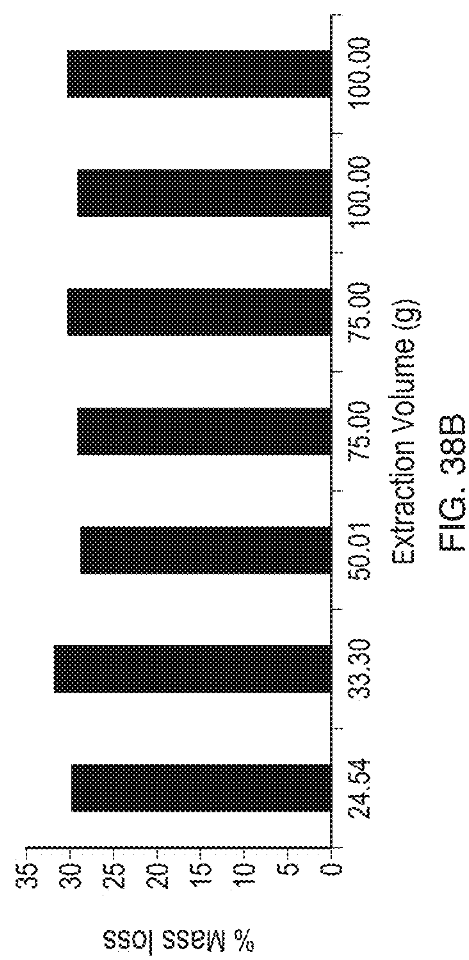
Figure 40:
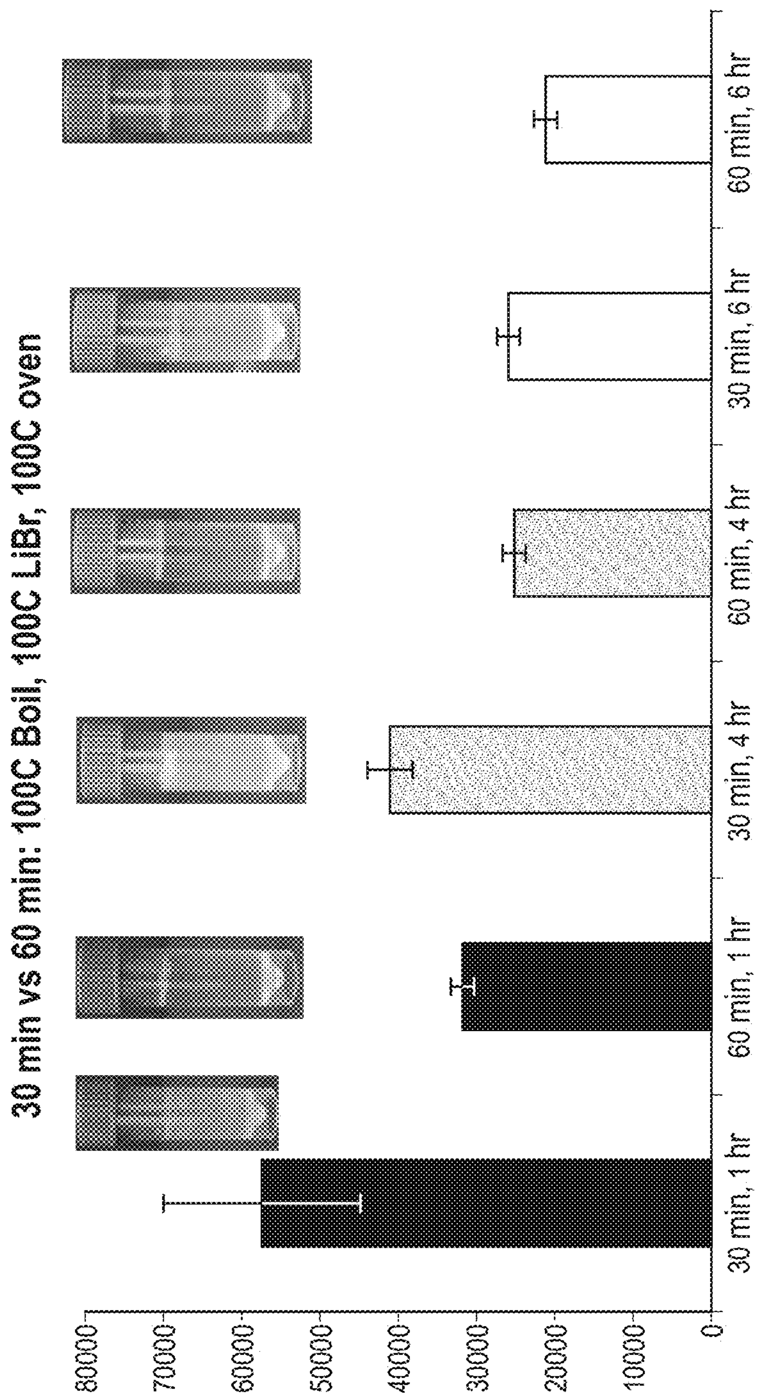
FIG. 40 is a graph summarizing the effect of Extraction Time on Molecular Weight of silk processed under the conditions of 100° C. Extraction Temperature, 100° C. LiBr and 100° C. Oven Dissolution (Oven/Dissolution Time was varied).
Figure 41:
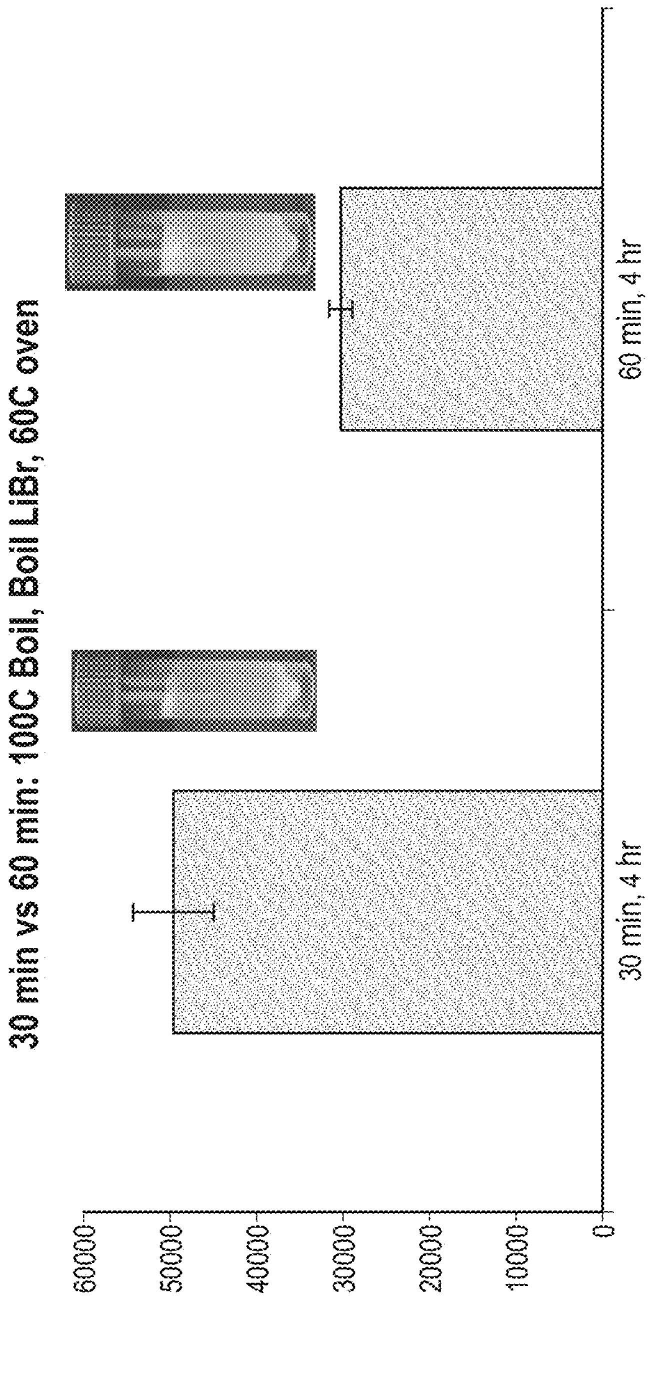
FIG. 41 is a graph summarizing the effect of Extraction Time on Molecular Weight of silk processed under the conditions of 100° C. Extraction Temperature, boiling LiBr and 60° C. Oven Dissolution (Oven/Dissolution Time was varied).
Figure 42:
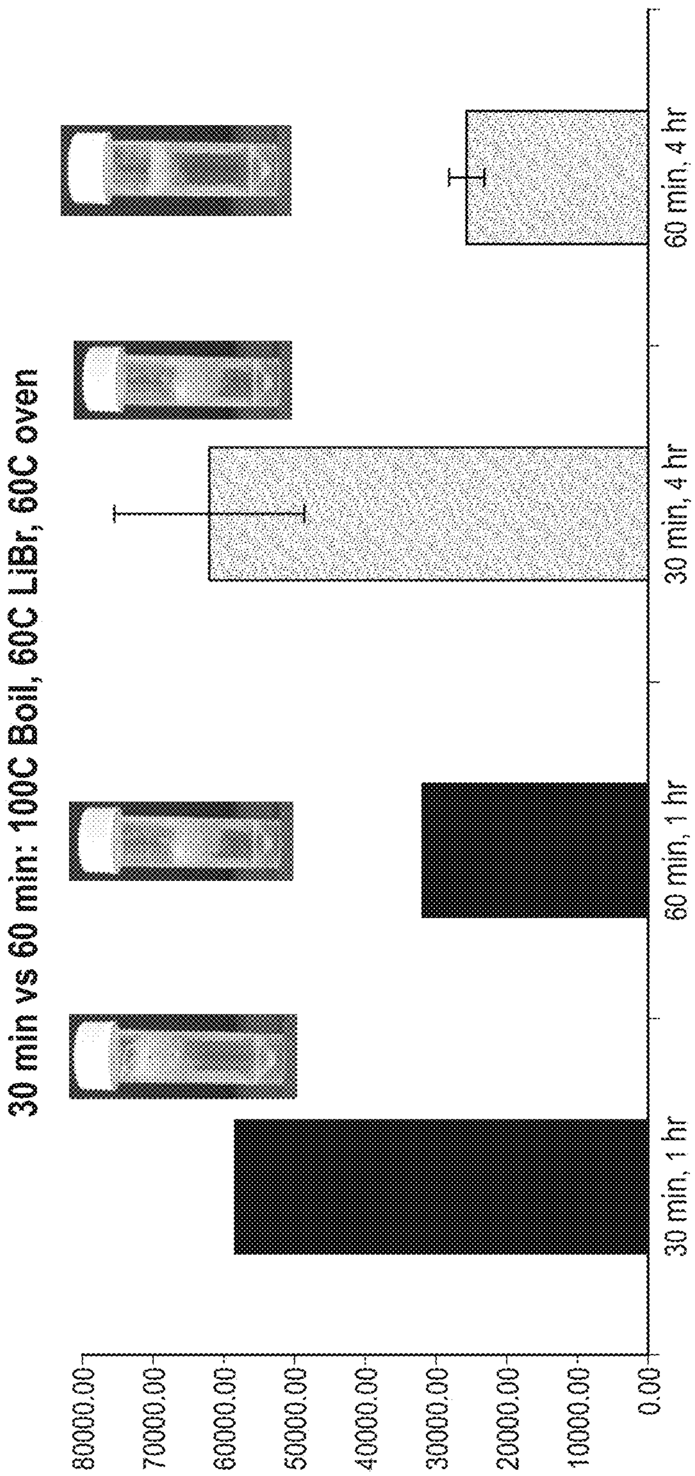
FIG. 42 is a graph summarizing the effect of Extraction Time on Molecular Weight of silk processed under the conditions of 100° C. Extraction Temperature, 60° C. LiBr and 60° C. Oven Dissolution (Oven/Dissolution Time was varied).
Figure 43:
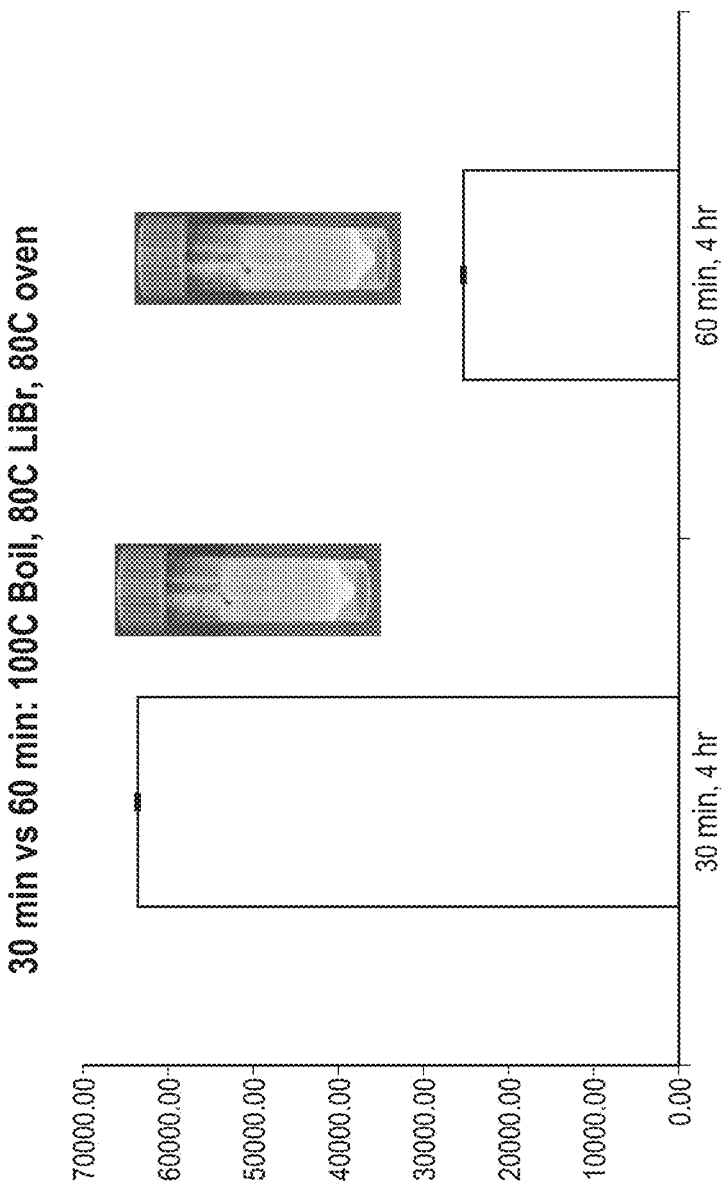
FIG. 43 is a graph summarizing the effect of Extraction Time on Molecular Weight of silk processed under the conditions of 100° C. Extraction Temperature, 80° C. LiBr and 80° C. Oven Dissolution (Oven/Dissolution Time was varied).
Figure 44:
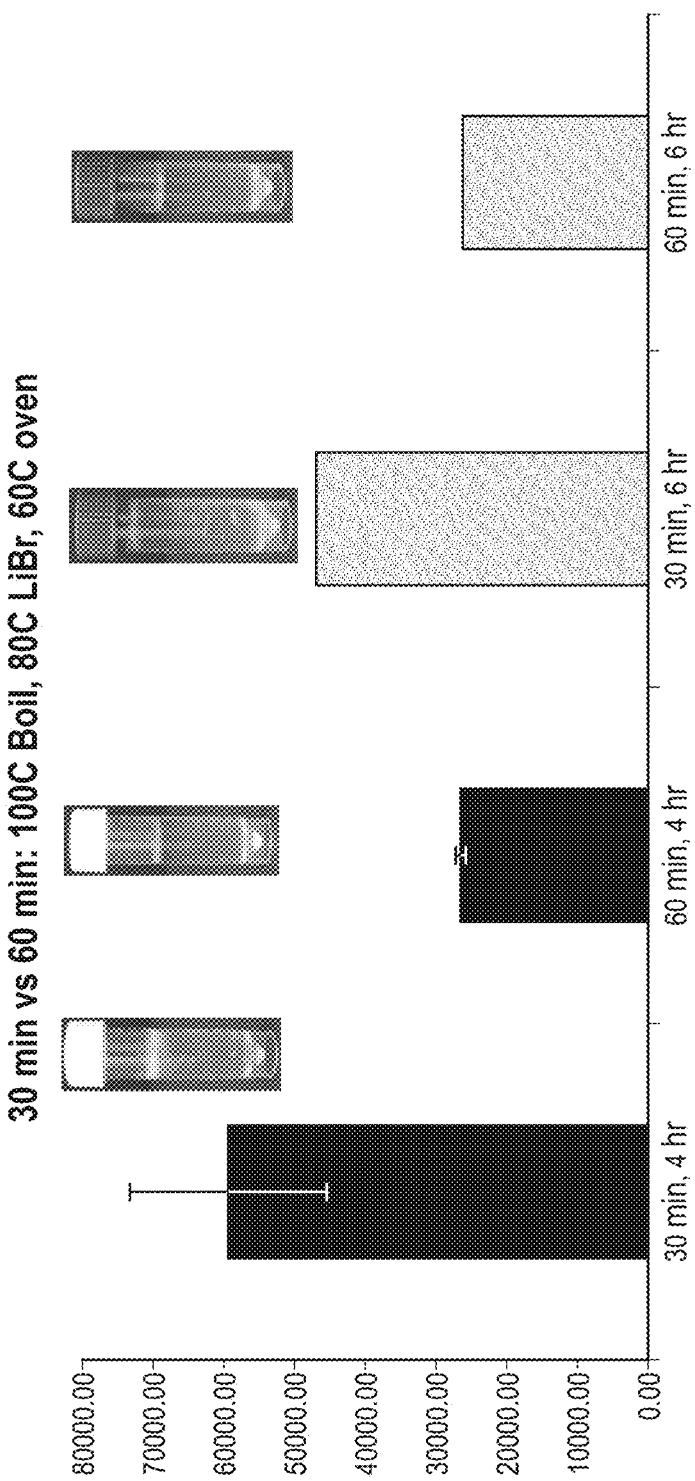
FIG. 44 is a graph summarizing the effect of Extraction Time on Molecular Weight of silk processed under the conditions of 100° C. Extraction Temperature, 80° C. LiBr and 60° C. Oven Dissolution (Oven/Dissolution Time was varied).
Figure 45:
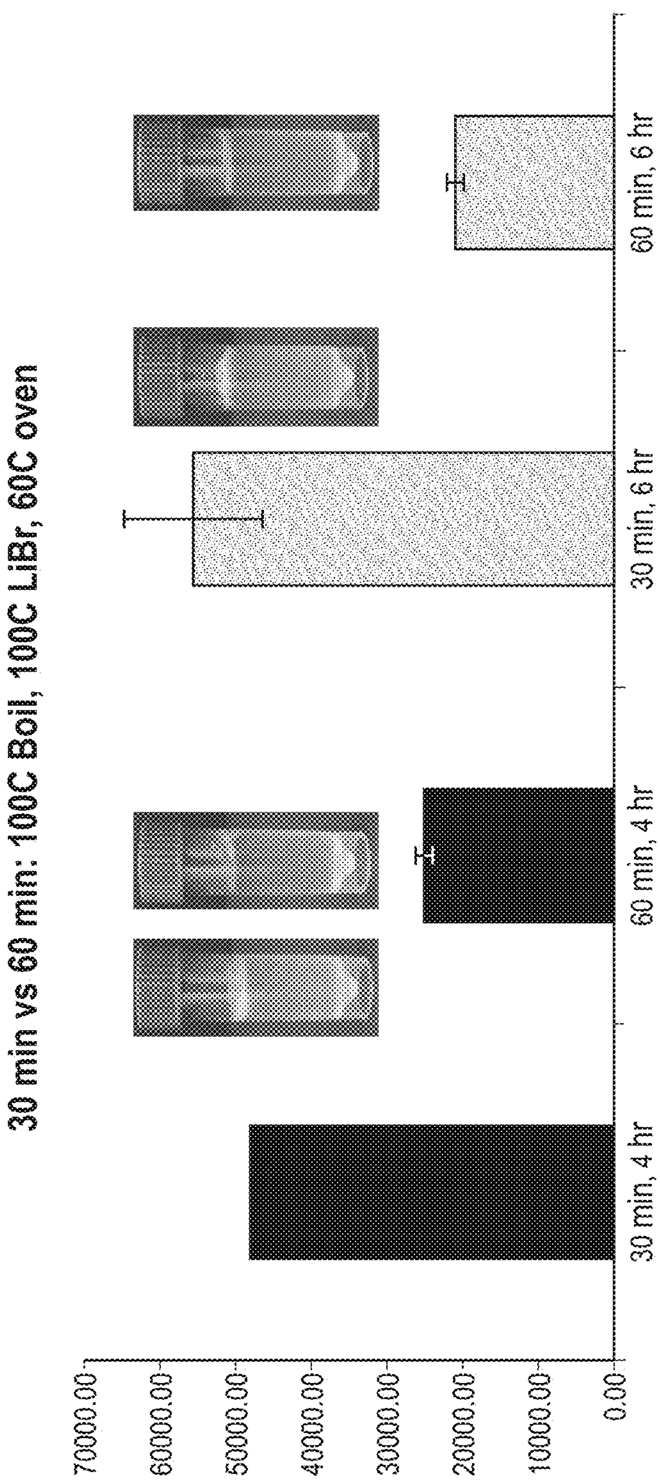
FIG. 45 is a graph summarizing the effect of Extraction Time on Molecular Weight of silk processed under the conditions of 100° C. Extraction Temperature, 100° C. LiBr and 60° C. Oven Dissolution (Oven/Dissolution Time was varied).
Figure 46:
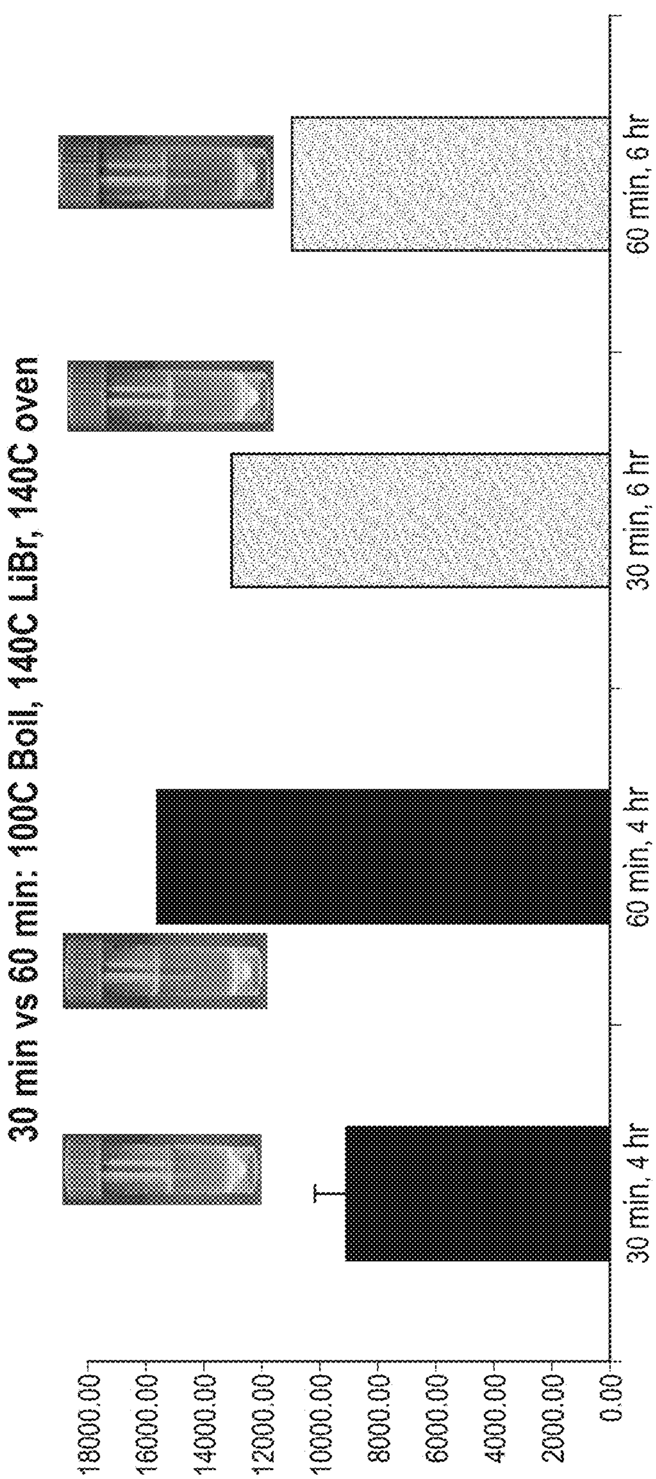
FIG. 46 is a graph summarizing the effect of Extraction Time on Molecular Weight of silk processed under the conditions of 100° C. Extraction Temperature, 140° C. LiBr and 140° C. Oven Dissolution (Oven/Dissolution Time was varied).

FIG. 1 is a flow chart showing various embodiments for producing pure silk fibroin-based protein fragments (SPFs) of the present disclosure. It should be understood that not all of the steps illustrated are necessarily required to fabricate all silk solutions of the present disclosure. As illustrated in FIG. 1, step A, cocoons (heat-treated or non-heat-treated), silk fibers, silk powder or spider silk can be used as the silk source. If starting from raw silk cocoons from *Bombyx mori*, the cocoons can be cut into small pieces, for example pieces of approximately equal size, step B1. The raw silk is then extracted and rinsed to remove any sericin, step C1a. This results in substantially sericin free raw silk. In an embodiment, water is heated to a temperature between 84° C. and 100° C. (ideally boiling) and then $Na_2CO_3$ (sodium carbonate) is added to the boiling water until the $Na_2CO_3$ is completely dissolved. The raw silk is added to the boiling water/$Na_2CO_3$ (100° C.) and submerged for approximately 15-90 minutes, where boiling for a longer time results in smaller silk protein fragments. In an embodiment, the water volume equals about 0.4×raw silk weight and the $Na_2CO_3$ volume equals about 0.848×raw silk weight. In an embodiment, the water volume equals 0.1×raw silk weight and the $Na_2CO_3$ volume is maintained at 2.12 g/L. This is demonstrated in FIG. 38A and FIG. 38B silk mass (x-axis) was varied in the same volume of extraction solution (i.e., the same volume of water and concentration of $Na_2CO_3$) achieving sericin removal (substantially sericin free) as demonstrated by an overall silk mass loss of 26 to 31 percent (y-axis). Subsequently, the water dissolved $Na_2CO_3$ solution is drained and excess water/$Na_2CO_3$ is removed from the silk fibroin fibers (e.g., ring out the fibroin extract by hand, spin cycle using a machine, etc.). The resulting silk fibroin extract is rinsed with warm to hot water to remove any remaining adsorbed sericin or contaminate, typically at a temperature range of about 40° C. to about 80° C., changing the volume of water at least once (repeated for as many times as required). The resulting silk fibroin extract is a substantially sericin-depleted silk fibroin. In an embodiment, the resulting silk fibroin extract is rinsed with water at a temperature of about 60° C. In an embodiment, the volume of rinse water for each cycle equals 0.1 L to 0.2 L×raw silk weight. It may be advantageous to agitate, turn or circulate the rinse water to maximize the rinse effect. After rinsing, excess water is removed from the extracted silk fibroin fibers (e.g., ring out fibroin extract by hand or using a machine). Alternatively, methods known to one skilled in the art such as pressure, temperature, or other reagents or combinations thereof may be used for the purpose of sericin extraction. Alternatively, the silk gland (100% sericin free silk protein) can be removed directly from a worm. This would result in liquid silk protein, without any alteration of the protein structure, free of sericin.

Figure 3:
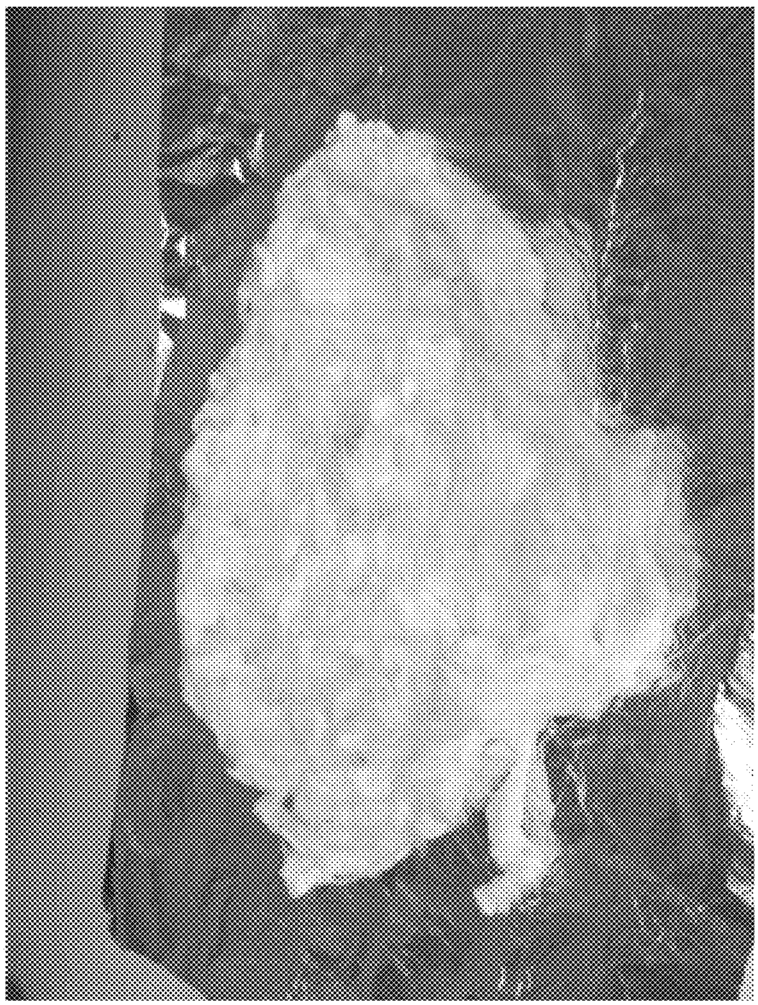
FIG. 3 is a photograph showing dry extracted silk fibroin.

The extracted fibroin fibers are then allowed to dry completely. FIG. 3 is a photograph showing dry extracted silk fibroin. Once dry, the extracted silk fibroin is dissolved using a solvent added to the silk fibroin at a temperature between ambient and boiling, step C1b. In an embodiment, the solvent is a solution of Lithium bromide (LiBr) (boiling for LiBr is 140° C.). Alternatively, the extracted fibroin fibers are not dried but wet and placed in the solvent; solvent concentration can then be varied to achieve similar concentrations as to when adding dried silk to the solvent. The final concentration of LiBr solvent can range from 0.1M to 9.3M. FIG. 39 is a table summarizing the Molecular Weights of silk dissolved from different concentrations of Lithium Bromide (LiBr) and from different extraction and dissolution sizes. Complete dissolution of the extracted fibroin fibers can be achieved by varying the treatment time and temperature along with the concentration of dissolving solvent. Other solvents may be used including, but not limited to, phosphate phosphoric acid, calcium nitrate, calcium chloride solution or other concentrated aqueous solutions of inorganic salts. To ensure complete dissolution, the silk fibers should be fully immersed within the already heated solvent solution and then maintained at a temperature ranging from about 60° C. to about 140° C. for 1-168 hrs. In an embodiment, the silk fibers should be fully immersed within the solvent solution and then placed into a dry oven at a temperature of about 100° C. for about 1 hour.

The temperature at which the silk fibroin extract is added to the LiBr solution (or vice versa) has an effect on the time required to completely dissolve the fibroin and on the resulting molecular weight and polydispersity of the final SPF mixture solution. In an embodiment, silk solvent solution concentration is less than or equal to 20% w/v. In addition, agitation during introduction or dissolution may be used to facilitate dissolution at varying temperatures and concentrations. The temperature of the LiBr solution will provide control over the silk protein fragment mixture molecular weight and polydispersity created. In an embodiment, a higher temperature will more quickly dissolve the silk offering enhanced process scalability and mass production of silk solution. In an embodiment, using a LiBr solution heated to a temperature between 80° C.-140° C. reduces the time required in an oven in order to achieve full dissolution. Varying time and temperature at or above 60° C. of the dissolution solvent will alter and control the MW and polydispersity of the SPF mixture solutions formed from the original molecular weight of the native silk fibroin protein.

Alternatively, whole cocoons may be placed directly into a solvent, such as LiBr, bypassing extraction, step B2. This requires subsequent filtration of silk worm particles from the silk and solvent solution and sericin removal using methods know in the art for separating hydrophobic and hydrophilic proteins such as a column separation and/or chromatography, ion exchange, chemical precipitation with salt and/or pH, and or enzymatic digestion and filtration or extraction, all methods are common examples and without limitation for standard protein separation methods, step C2. Non-heat treated cocoons with the silkworm removed, may alternatively be placed into a solvent such as LiBr, bypassing extraction. The methods described above may be used for sericin separation, with the advantage that non-heat treated cocoons will contain significantly less worm debris.

Dialysis may be used to remove the dissolution solvent from the resulting dissolved fibroin protein fragment solution by dialyzing the solution against a volume of water, step E1. Pre-filtration prior to dialysis is helpful to remove any debris (i.e., silk worm remnants) from the silk and LiBr solution, step D. In one example, a 3 μm or 5 μm filter is used with a flow-rate of 200-300 mL/min to filter a 0.1% to 1.0% silk-LiBr solution prior to dialysis and potential concentration if desired. A method disclosed herein, as described above, is to use time and/or temperature to decrease the concentration from 9.3M LiBr to a range from 0.1M to 9.3M to facilitate filtration and downstream dialysis, particularly when considering creating a scalable process method. Alternatively, without the use of additional time or temperate, a 9.3M LiBr-silk protein fragment solution may be diluted with water to facilitate debris filtration and dialysis. The result of dissolution at the desired time and temperate filtration is a translucent particle-free room temperature shelf-stable silk protein fragment-LiBr solution of a known MW and polydispersity. It is advantageous to change the dialysis water regularly until the solvent has been removed (e.g., change water after 1 hour, 4 hours, and then every 12 hours for a total of 6 water changes). The total number of water volume changes may be varied based on the resulting concentration of solvent used for silk protein dissolution and fragmentation. After dialysis, the final silk solution maybe further filtered to remove any remaining debris (i.e., silk worm remnants).

Alternatively, Tangential Flow Filtration (TFF), which is a rapid and efficient method for the separation and purification of biomolecules, may be used to remove the solvent from the resulting dissolved fibroin solution, step E2. TFF offers a highly pure aqueous silk protein fragment solution and enables scalability of the process in order to produce large volumes of the solution in a controlled and repeatable manner. The silk and LiBr solution may be diluted prior to TFF (20% down to 0.1% silk in either water or LiBr). Pre-filtration as described above prior to TFF processing may maintain filter efficiency and potentially avoids the creation of silk gel boundary layers on the filter's surface as the result of the presence of debris particles. Pre-filtration prior to TFF is also helpful to remove any remaining debris (i.e., silk worm remnants) from the silk and LiBr solution that may cause spontaneous or long-term gelation of the resulting water only solution, step D. TFF, recirculating or single pass, may be used for the creation of water-silk protein fragment solutions ranging from 0.1% silk to 30.0% silk (more preferably, 0.1%-6.0% silk). Different cutoff size TFF membranes may be required based upon the desired concentration, molecular weight and polydispersity of the silk protein fragment mixture in solution. Membranes ranging from 1-100 kDa may be necessary for varying molecular weight silk solutions created for example by varying the length of extraction boil time or the time and temperate in dissolution solvent (e.g., LiBr). In an embodiment, a TFF 5 or 10 kDa membrane is used to purify the silk protein fragment mixture solution and to create the final desired silk-to-water ratio. As well, TFF single pass, TFF, and other methods known in the art, such as a falling film evaporator, may be used to concentrate the solution following removal of the dissolution solvent (e.g., LiBr) (with resulting desired concentration ranging from 0.1% to 30% silk). This can be used as an alternative to standard HFIP concentration methods known in the art to create a water-based solution. A larger pore membrane could also be utilized to filter out small silk protein fragments and to create a solution of higher molecular weight silk with and/or without tighter polydispersity values. FIG. 37 is a table summarizing Molecular Weights for some embodiments of silk protein solutions of the present disclosure. Silk protein solution processing conditions were as follows: 100° C. extraction for 20 min, room temperature rinse, LiBr in 60° C. oven for 4-6 hours. FIGS. 40-49 further demonstrate manipulation of extraction time, LiBr dissolution conditions, and TFF processing and resultant example molecular weights and polydispersities. These examples are not intended to be limiting, but rather to demonstrate the potential of specifying parameters for specific molecular weight silk fragment solutions.

An assay for LiBr and $Na_2CO_3$ detection was performed using an HPLC system equipped with evaporative light scattering detector (ELSD). The calculation was performed by linear regression of the resulting peak areas for the analyte plotted against concentration. More than one sample of a number of formulations of the present disclosure was used for sample preparation and analysis. Generally, four samples of different formulations were weighed directly in a 10 mL volumetric flask.

The analytical method developed for the quantitation of $Na_2CO_3$ and LiBr in silk protein formulations was found to be linear in the range 10-165 μg/mL, with RSD for injection precision as 2% and 1% for area and 0.38% and 0.19% for retention time for sodium carbonate and lithium bromide respectively. The analytical method can be applied for the quantitative determination of sodium carbonate and lithium bromide in silk protein formulations.

Figure 4:
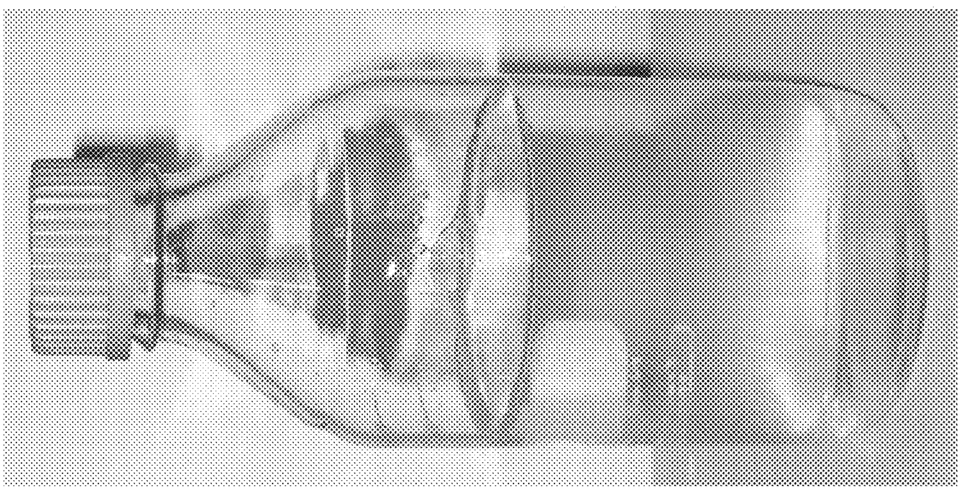
FIG. 4 is a photograph showing an embodiment of a SPF in the form of a solution of the present disclosure.
Figure 5A:
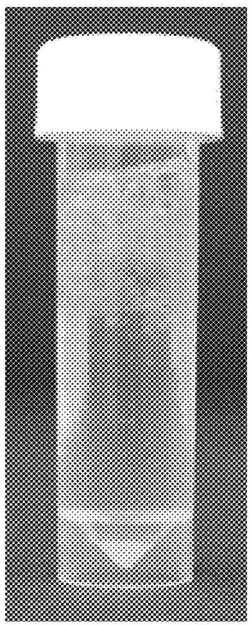
FIGS. 5A-5D are photographs showing dissolved silk in room temperature lithium bromide (LiBr) solutions dissolved in a 60° C. oven for 4 hours (sericin extraction temperature and time were varied).
Figure 5B:
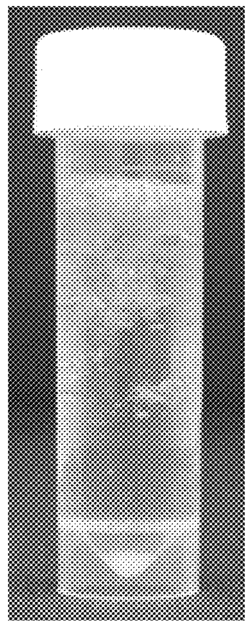
Figure 5C:
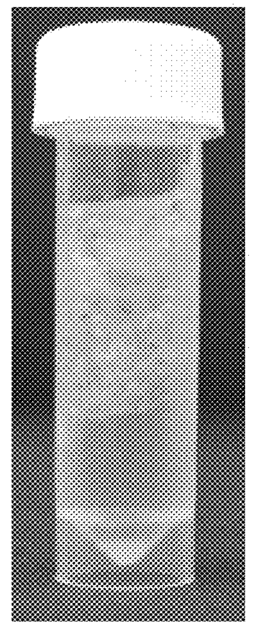
Figure 5D:
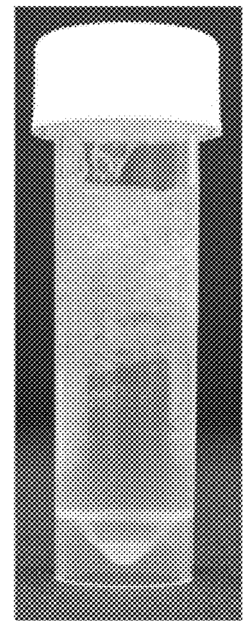
Figure 6A:
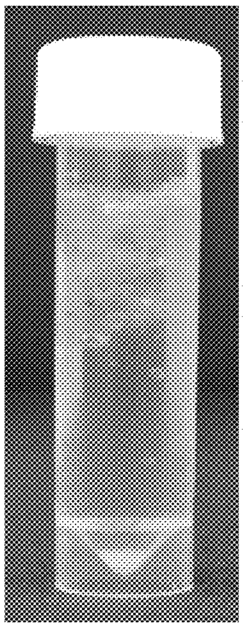
FIGS. 6A-6D are photographs showing dissolved silk in room temperature LiBr solutions dissolved in a 60° C. oven for 6 hours (sericin extraction temperature and time were varied).
Figure 6B:
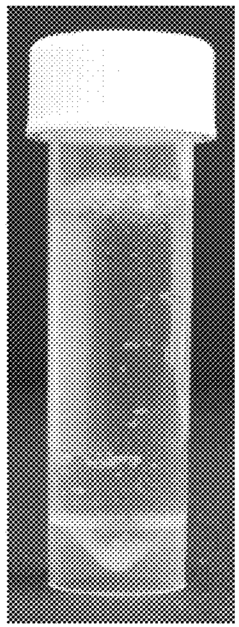
Figure 6C:
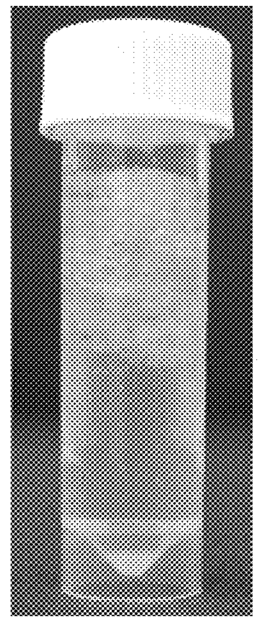
Figure 6D:
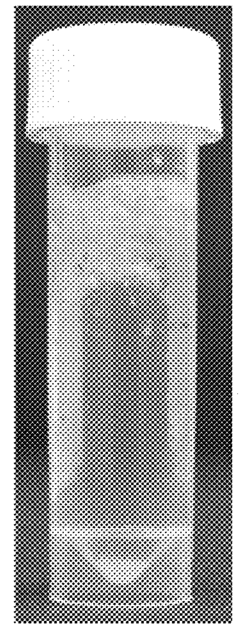
Figure 7A:
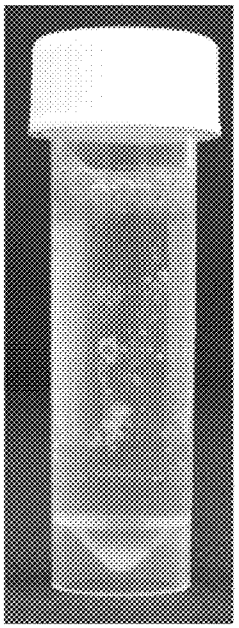
FIGS. 7A-7D are photographs showing dissolved silk in room temperature LiBr solutions dissolved in a 60° C. oven for 8 hours (sericin extraction temperature and time were varied).
Figure 7B:
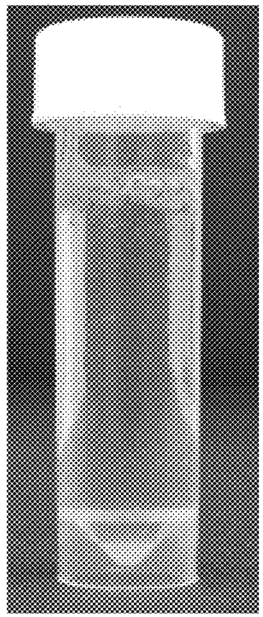
Figure 7C:
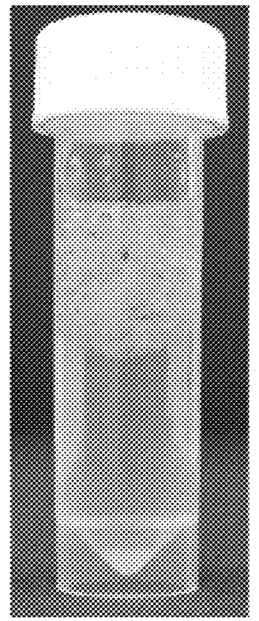
Figure 7D:
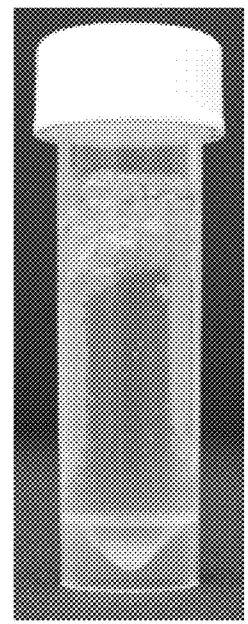
Figure 9A:
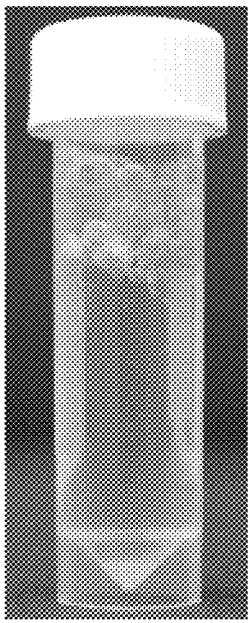
FIGS. 9A-9D are photographs showing dissolved silk in room temperature LiBr solutions dissolved in a 60° C. oven for 24 hours (sericin extraction temperature and time were varied).
Figure 9B:
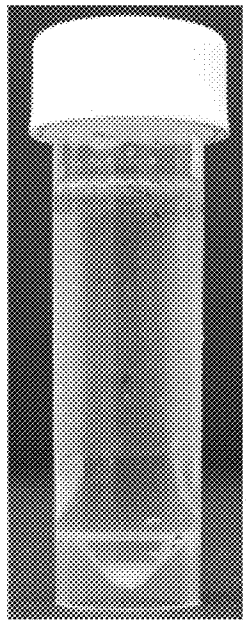
Figure 9C:
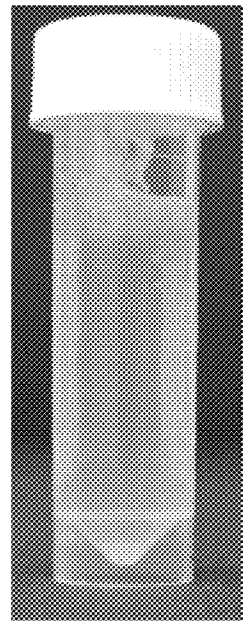
Figure 9D:
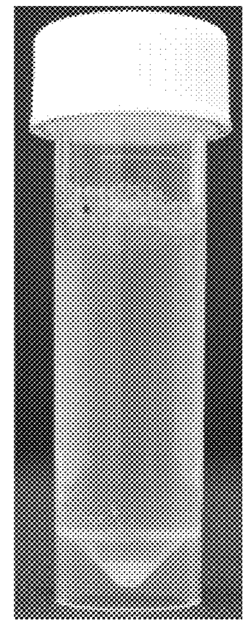
Figure 10A:
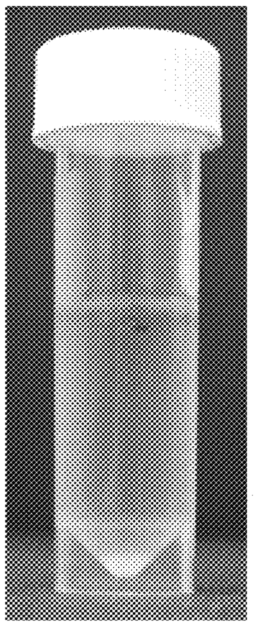
FIGS. 10A-10D are photographs showing dissolved silk in room temperature LiBr solutions dissolved in a 60° C. oven for 168/192 hours (sericin extraction temperature and time were varied).
Figure 10B:
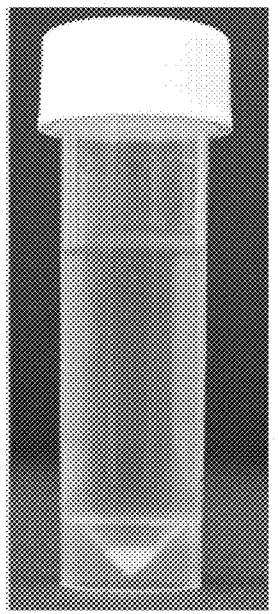
Figure 10C:
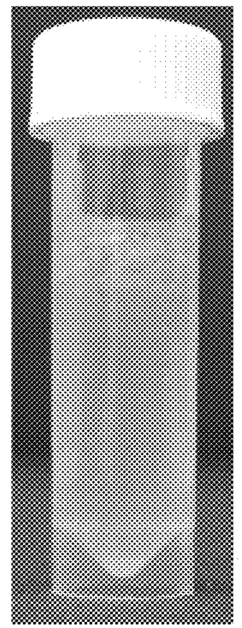
Figure 10D:
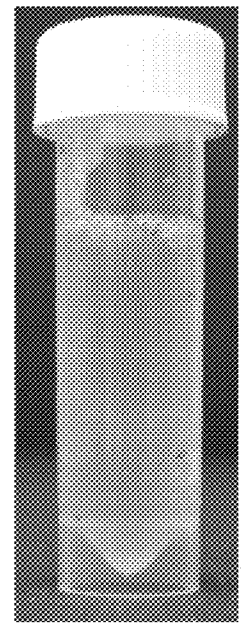
Figure 11A:
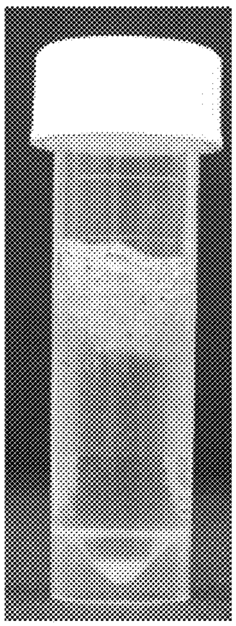
FIGS. 11A-11C are photographs showing dissolved silk in room temperature LiBr solutions dissolved in 60° C. oven for 1, 4, and 6 hours, where sericin extraction was completed at 100° C. for 60 min.
Figure 11B:
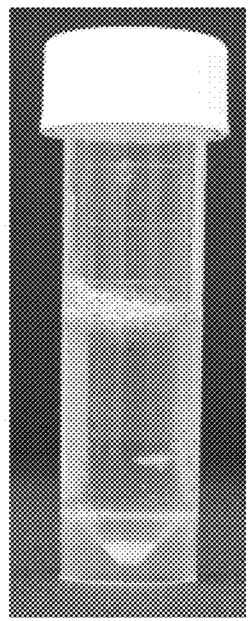
Figure 11C:
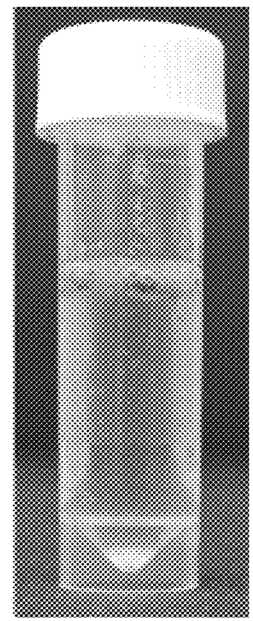
Figure 12A:
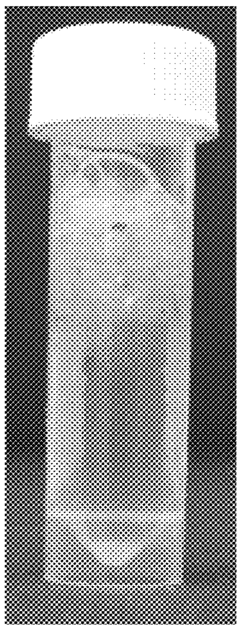
FIGS. 12A-12D are photographs showing dissolved silk in 60° C. LiBr solutions dissolved in a 60° C. oven for 1 hour (sericin extraction temperature and time were varied).
Figure 12B:
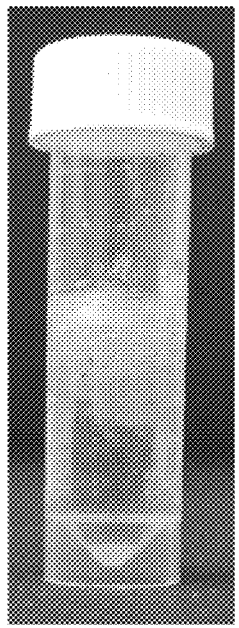
Figure 12C:
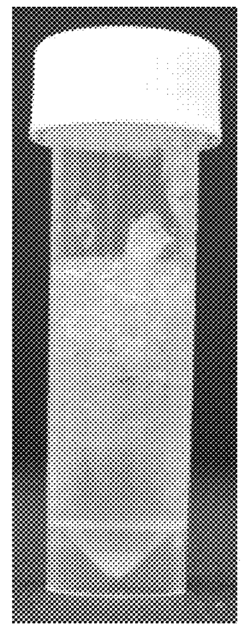
Figure 12D:
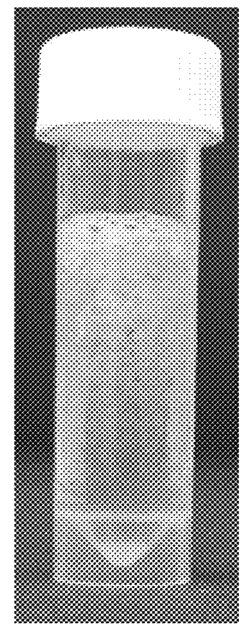
Figure 13A:
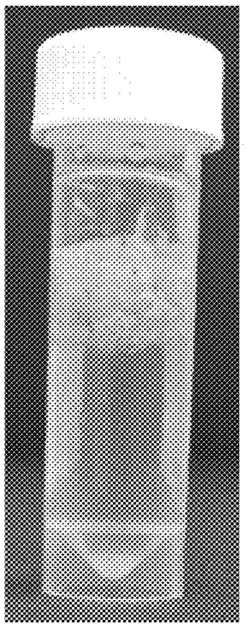
FIGS. 13A-13D are photographs showing dissolved silk in 60° C. LiBr solutions dissolved in a 60° C. oven for 4 hours (sericin extraction temperature and time were varied).
Figure 13B:
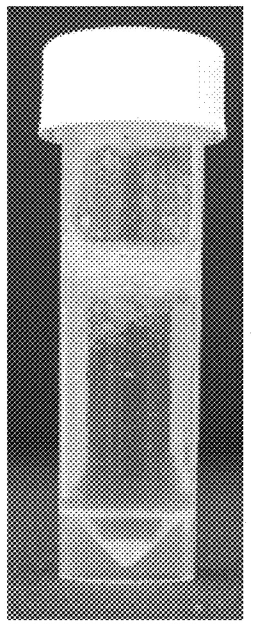
Figure 13C:
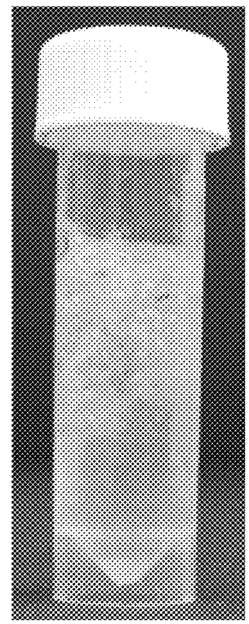
Figure 13D:
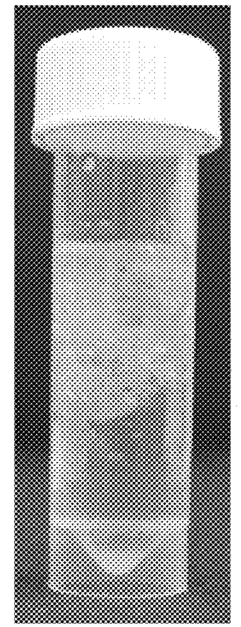
Figure 14A:
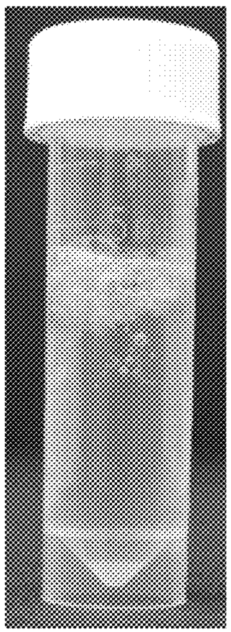
FIGS. 14A-14D are photographs showing dissolved silk in 60° C. LiBr solutions dissolved in a 60° C. oven for 6 hours (sericin extraction temperature and time were varied).
Figure 14B:
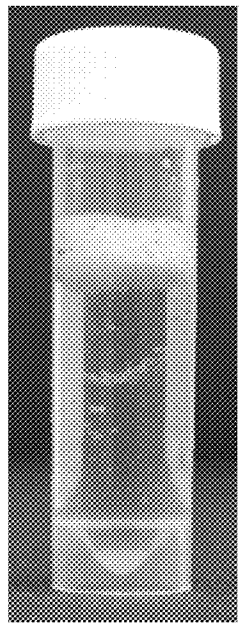
Figure 14C:
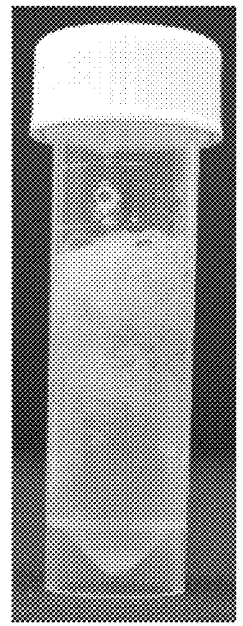
Figure 14D:
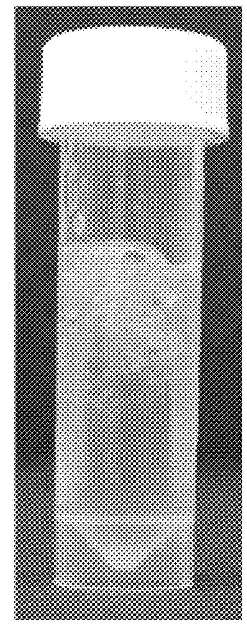
Figure 15A:
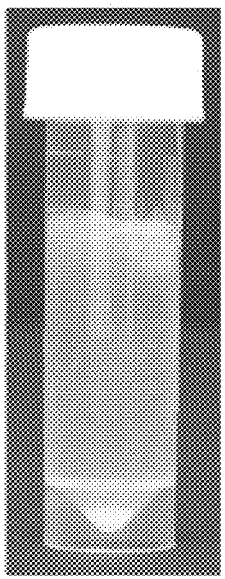
FIGS. 15A-15D are photographs showing dissolved silk in 80° C. LiBr solutions dissolved in a 60° C. oven for 1 hour (sericin extraction temperature and time were varied).
Figure 15B:
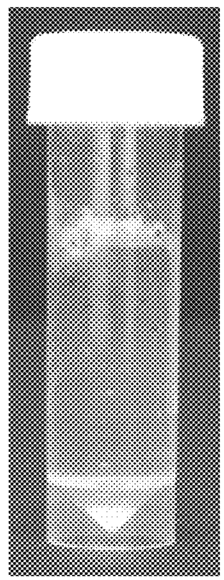
Figure 15C:
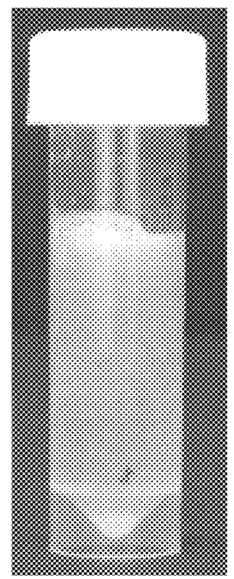
Figure 15D:
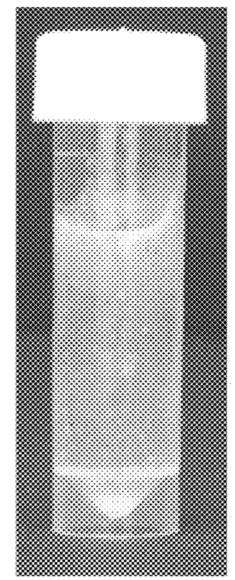
Figure 16A:
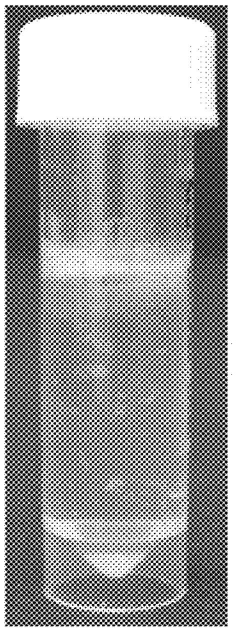
FIGS. 16A-16D are photographs showing dissolved silk in 80° C. LiBr solutions dissolved in a 60° C. oven for 4 hours (sericin extraction temperature and time were varied).
Figure 16B:
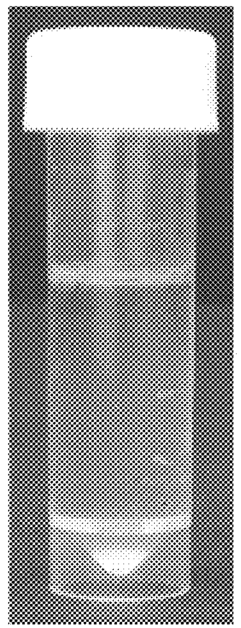
Figure 16C:
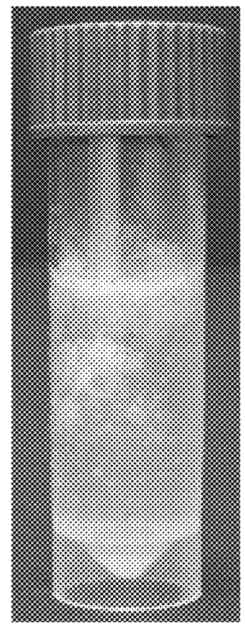
Figure 16D:
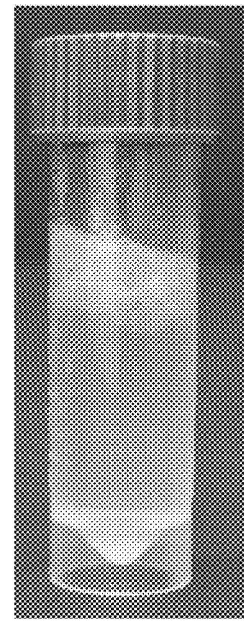
Figure 17A:
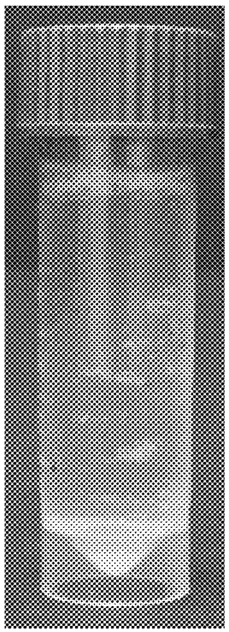
FIGS. 17A-17D are photographs showing dissolved silk in 80° C. LiBr solutions dissolved in a 60° C. oven for 4 hours (sericin extraction temperature and time were varied).
Figure 17B:
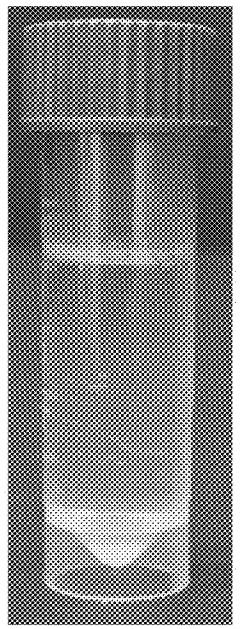
Figure 17C:
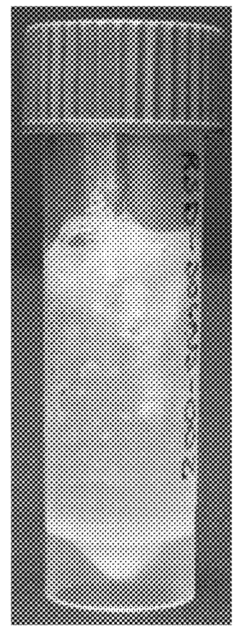
Figure 17D:
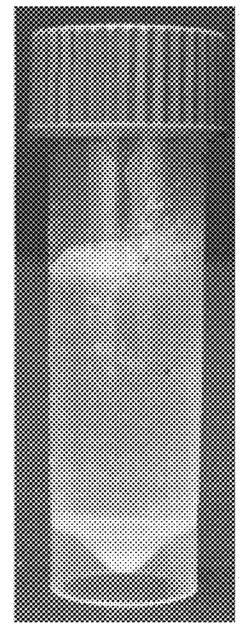
Figure 19A:
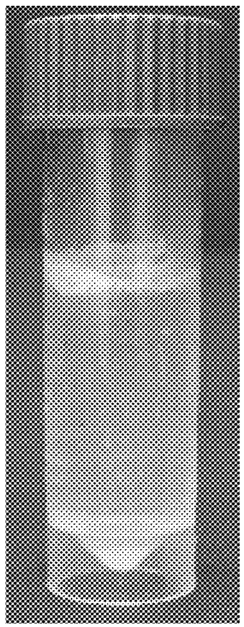
FIGS. 19A-19D are photographs showing dissolved silk in 100° C. LiBr solutions dissolved in a 60° C. oven for 4 hours (sericin extraction temperature and time were varied).
Figure 19B:
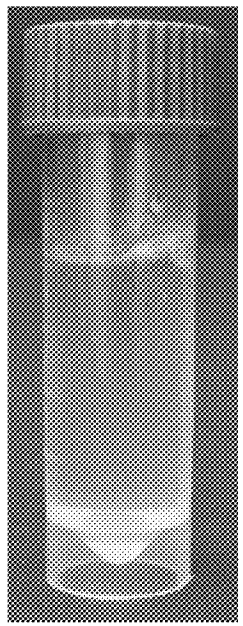
Figure 19C:
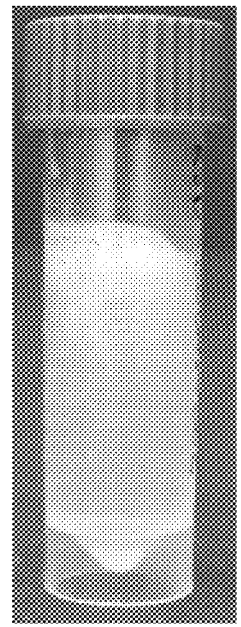
Figure 19D:
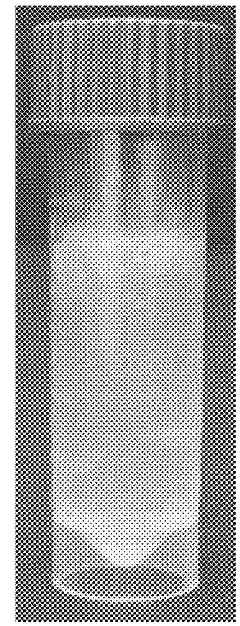
Figure 22A:
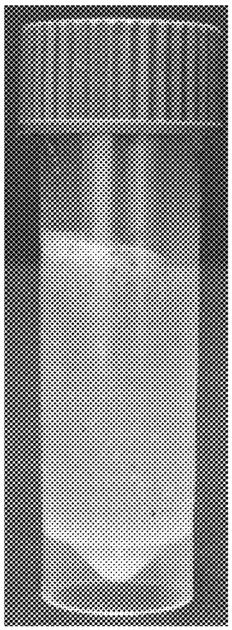
FIGS. 22A-22D are photographs showing dissolved silk in 140° C. (boiling point for LiBr) LiBr solutions dissolved in a 60° C. oven for 4 hours (sericin extraction temperature and time were varied).
Figure 22B:
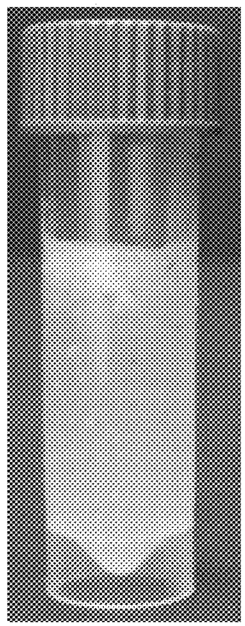
Figure 22C:
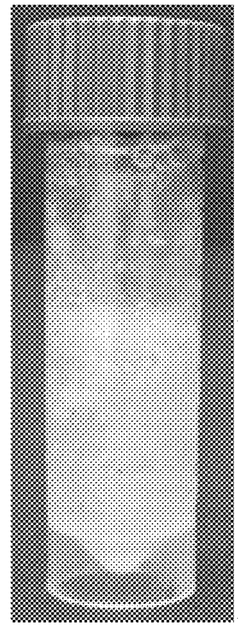
Figure 22D:
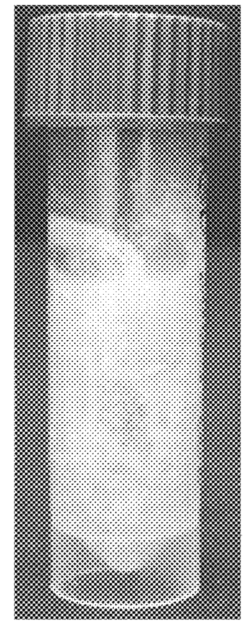
Figure 23A:
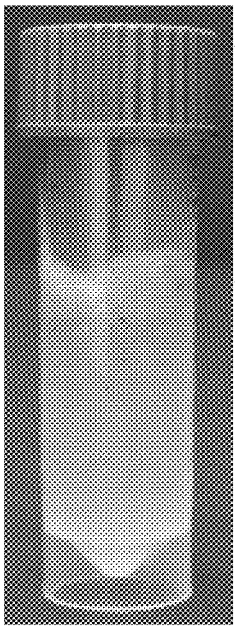
FIGS. 23A-23D are photographs showing dissolved silk in 140° C. (boiling point for LiBr) LiBr solutions dissolved in a 60° C. oven for 6 hours (sericin extraction temperature and time were varied).
Figure 23B:
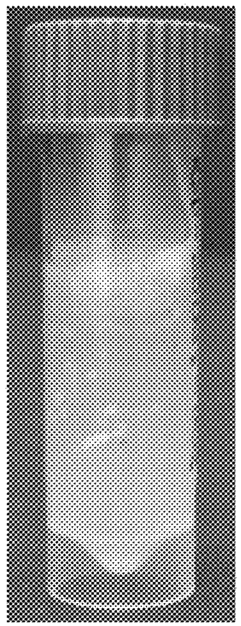
Figure 23C:
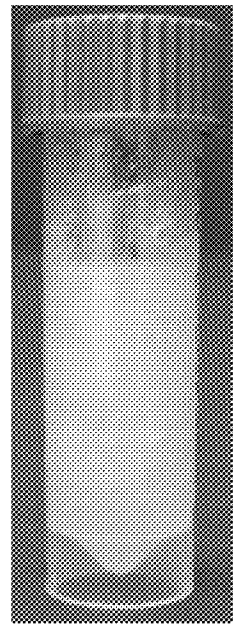
Figure 23D:
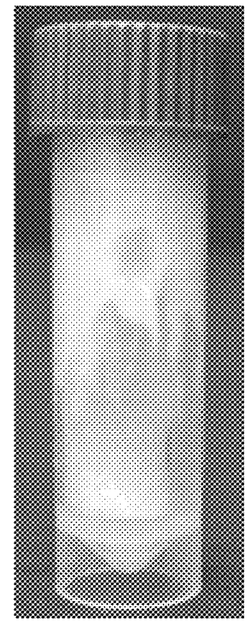
Figure 25A:
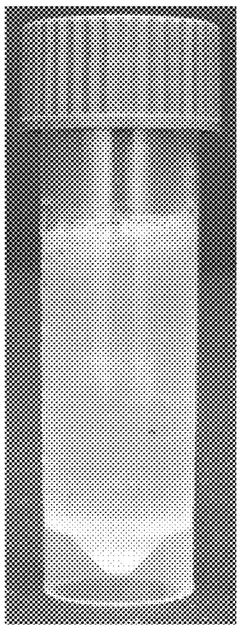
FIGS. 25A-25D are photographs showing dissolved silk in 80° C. LiBr solutions dissolved in a 80° C. oven for 4 hours (sericin extraction temperature and time were varied).
Figure 25B:
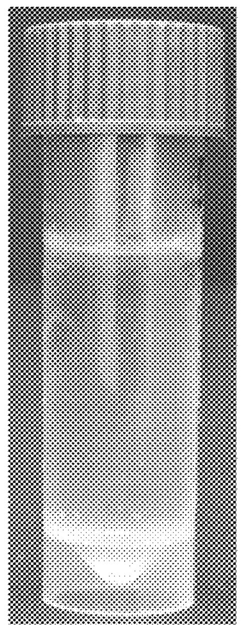
Figure 25C:
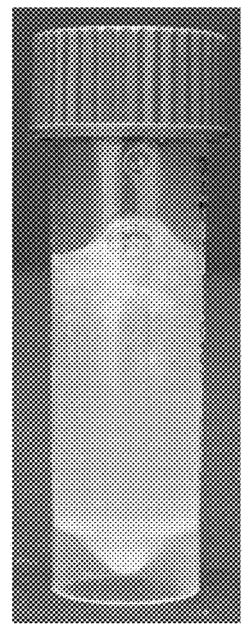
Figure 25D:
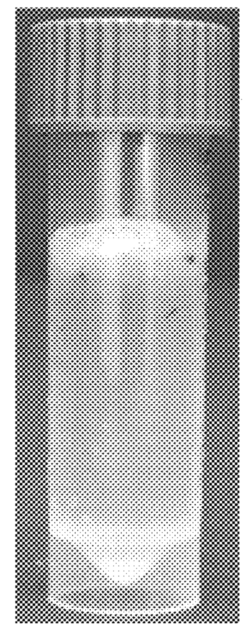
Figure 26A:
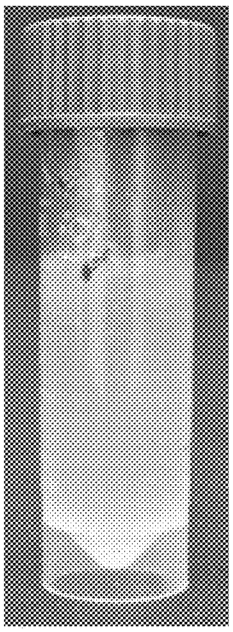
FIGS. 26A-26D are photographs showing dissolved silk in 80° C. LiBr solutions dissolved in a 80° C. oven for 6 hours (sericin extraction temperature and time were varied).
Figure 26B:
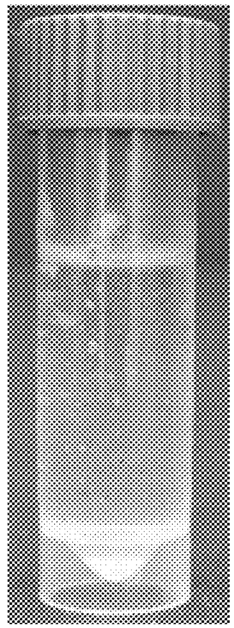
Figure 26C:
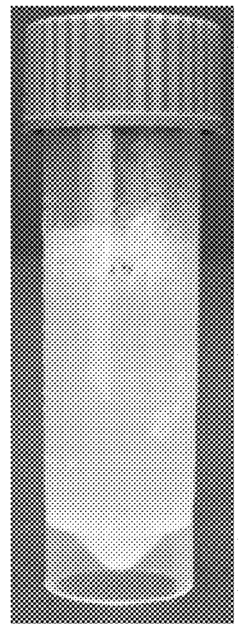
Figure 26D:
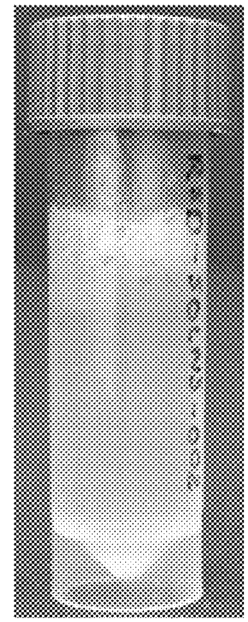
Figure 28A:
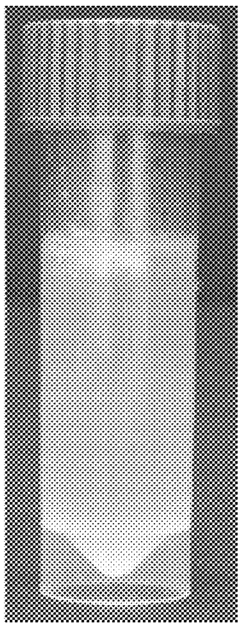
FIGS. 28A-28D are photographs showing dissolved silk in 100° C. LiBr solutions dissolved in a 100° C. oven for 4 hours (sericin extraction temperature and time were varied).
Figure 28B:
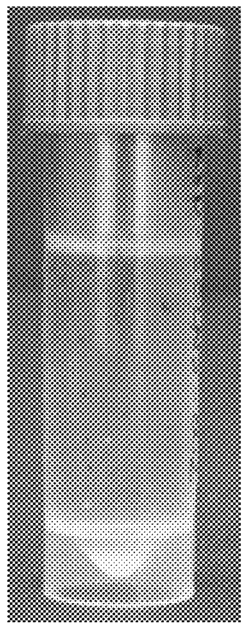
Figure 28C:
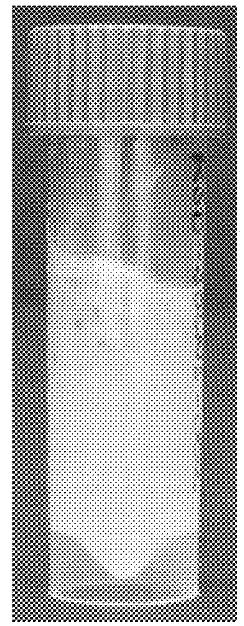
Figure 28D:
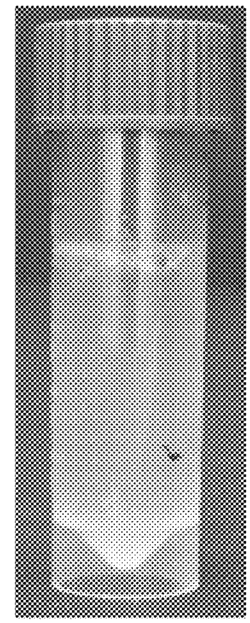
Figure 29A:
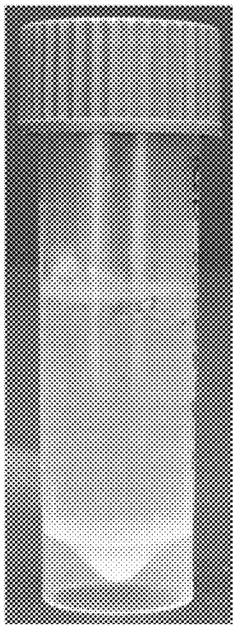
FIGS. 29A-29D are photographs showing dissolved silk in 100° C. LiBr solutions dissolved in a 100° C. oven for 6 hours (sericin extraction temperature and time were varied).
Figure 29B:
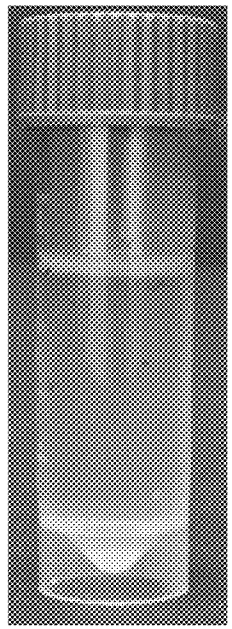
Figure 29C:
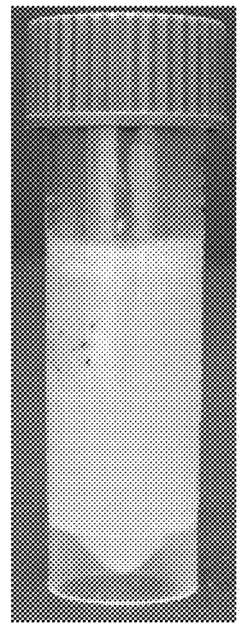
Figure 29D:
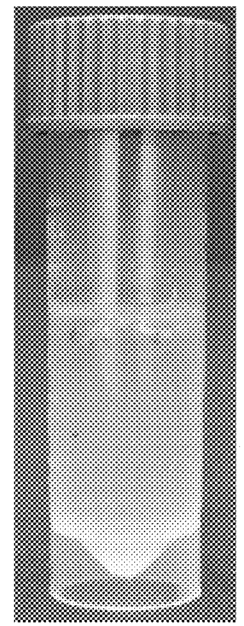
Figure 30A:
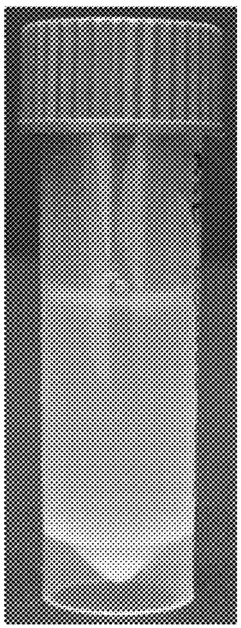
FIGS. 30A-30D are photographs showing dissolved silk in 140° C. (boiling point for LiBr) LiBr solutions dissolved in a 120° C. oven for 1 hour (sericin extraction temperature and time were varied).
Figure 30B:
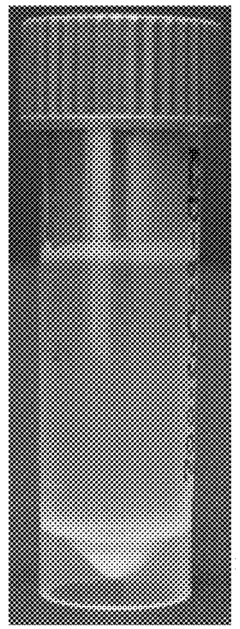
Figure 30C:
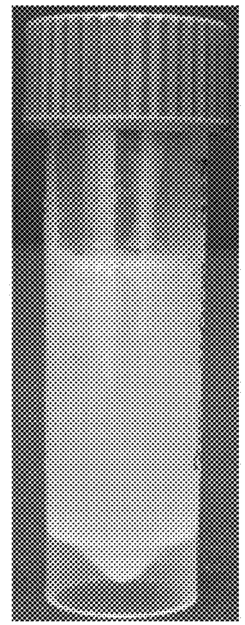
Figure 30D:
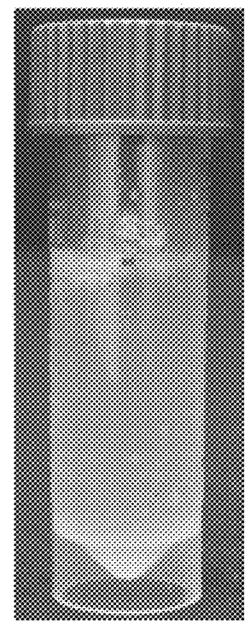
Figure 31A:
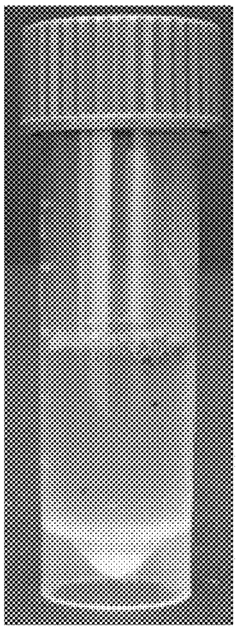
FIGS. 31A-31D are photographs showing dissolved silk in 140° C. (boiling point for LiBr) LiBr solutions dissolved in a 120° C. oven for 4 hours (sericin extraction temperature and time were varied).
Figure 31B:
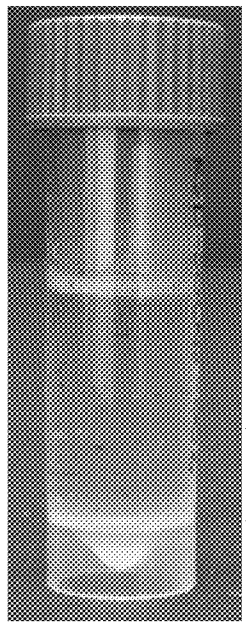
Figure 31C:
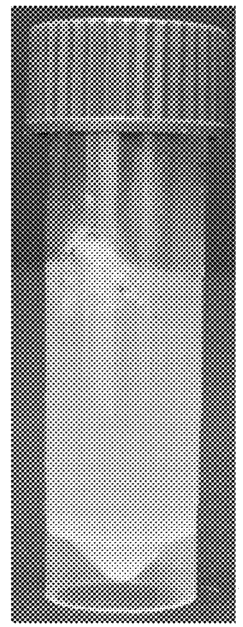
Figure 31D:
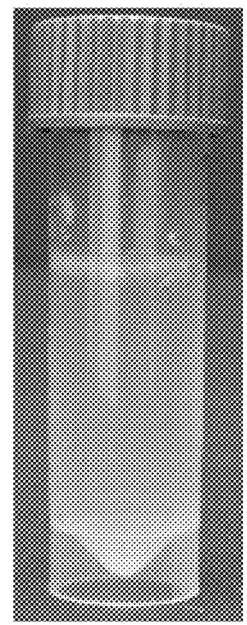
Figure 32A:
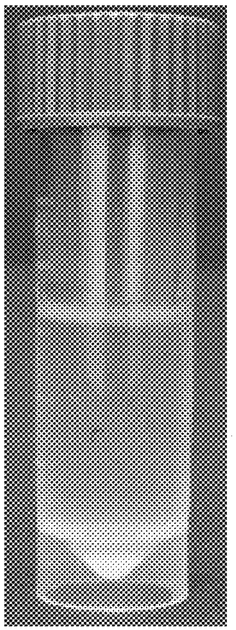
FIG. 32A-32D are photographs showing dissolved silk in 140° C. (boiling point for LiBr) LiBr solutions dissolved in a 120° C. oven for 6 hours (sericin extraction temperature and time were varied).
Figure 32B:
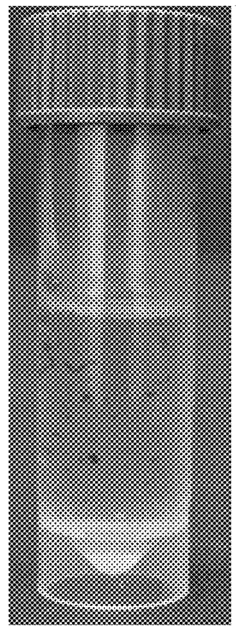
Figure 32C:
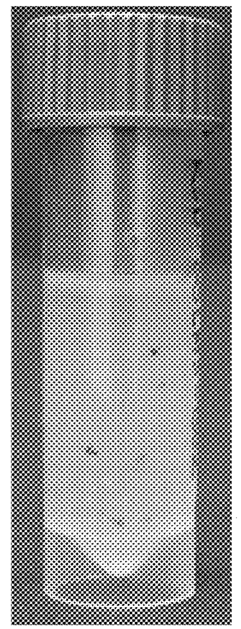
Figure 32D:
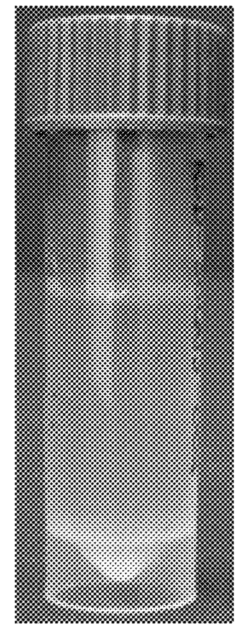

The final silk protein fragment solution, as shown in FIG. 4, is pure silk protein fragments and water with PPM to undetectable levels of particulate debris and/or process contaminants, including LiBr and $Na_2CO_3$. FIG. 34 and FIG. 35 are tables summarizing LiBr and $Na_2CO_3$ concentrations in solutions of the present disclosure. In FIG. 34, the processing conditions included 100° C. extraction for 60 min, 60° C. rinse, 100° C. LiBr in 100° C. oven for 60 min. TFF conditions including pressure differential and number of diafiltration volumes were varied. In FIG. 35, the processing conditions included 100° C. boil for 60 min, 60° C. rinse, LiBr in 60° C. oven for 4-6 hours. In an embodiment, a SPF composition of the present disclosure is not soluble in an aqueous solution due to the crystallinity of the protein. In an embodiment, a SPF composition of the present disclosure is soluble in an aqueous solution. In an embodiment, the SPFs of a composition of the present disclosure include a crystalline portion of about two-thirds and an amorphous region of about one-third. In an embodiment, the SPFs of a composition of the present disclosure include a crystalline portion of about one-half and an amorphous region of about one-half. In an embodiment, the SPFs of a composition of the present disclosure include a 99% crystalline portion and a 1% amorphous region. In an embodiment, the SPFs of a composition of the present disclosure include a 95% crystalline portion and a 5% amorphous region. In an embodiment, the SPFs of a composition of the present disclosure include a 90% crystalline portion and a 10% amorphous region. In an embodiment, the SPFs of a composition of the present disclosure include a 85% crystalline portion and a 15% amorphous region. In an embodiment, the SPFs of a composition of the present disclosure include a 80% crystalline portion and a 20% amorphous region. In an embodiment, the SPFs of a composition of the present disclosure include a 75% crystalline portion and a 25% amorphous region. In an embodiment, the SPFs of a composition of the present disclosure include a 70% crystalline portion and a 30% amorphous region. In an embodiment, the SPFs of a composition of the present disclosure include a 65% crystalline portion and a 35% amorphous region. In an embodiment, the SPFs of a composition of the present disclosure include a 60% crystalline portion and a 40% amorphous region. In an embodiment, the SPFs of a composition of the present disclosure include a 50% crystalline portion and a 50% amorphous region. In an embodiment, the SPFs of a composition of the present disclosure include a 40% crystalline portion and a 60% amorphous region. In an embodiment, the SPFs of a composition of the present disclosure include a 35% crystalline portion and a 65% amorphous region. In an embodiment, the SPFs of a composition of the present disclosure include a 30% crystalline portion and a 70% amorphous region. In an embodiment, the SPFs of a composition of the present disclosure include a 25% crystalline portion and a 75% amorphous region. In an embodiment, the SPFs of a composition of the present disclosure include a 20% crystalline portion and a 80% amorphous region. In an embodiment, the SPFs of a composition of the present disclosure include a 15% crystalline portion and a 85% amorphous region. In an embodiment, the SPFs of a composition of the present disclosure include a 10% crystalline portion and a 90% amorphous region. In an embodiment, the SPFs of a composition of the present disclosure include a 5% crystalline portion and a 90% amorphous region. In an embodiment, the SPFs of a composition of the present disclosure include a 1% crystalline portion and a 99% amorphous region.

A unique feature of the SPF compositions of the present disclosure are shelf stability (they will not slowly or spontaneously gel when stored in an aqueous solution and there is no aggregation of fragments and therefore no increase in molecular weight over time), from 10 days to 3 years depending on storage conditions, percent silk, and number of shipments and shipment conditions. Additionally pH may be altered to extend shelf-life and/or support shipping conditions by preventing premature folding and aggregation of the silk. In an embodiment, a SPF solution composition of the present disclosure has a shelf stability for up to 2 weeks at room temperature (RT). In an embodiment, a SPF solution composition of the present disclosure has a shelf stability for up to 4 weeks at RT. In an embodiment, a SPF solution composition of the present disclosure has a shelf stability for up to 6 weeks at RT. In an embodiment, a SPF solution composition of the present disclosure has a shelf stability for up to 8 weeks at RT. In an embodiment, a SPF solution composition of the present disclosure has a shelf stability for up to 10 weeks at RT. In an embodiment, a SPF solution composition of the present disclosure has a shelf stability for up to 12 weeks at RT. In an embodiment, a SPF solution composition of the present disclosure has a shelf stability ranging from about 4 weeks to about 52 weeks at RT. Table 1 below shows shelf stability test results for embodiments of SPF compositions of the present disclosure.

TABLE 1

Shelf Stability of SPF Compositions of the Present Disclosure

| % Silk | Temperature | Time to Gelation |
|---|---|---|
| 2 | RT | 4 weeks |
| 2 | 4 C. | >9 weeks |
| 4 | RT | 4 weeks |
| 4 | 4 C. | >9 weeks |
| 6 | RT | 2 weeks |
| 6 | 4 C. | >9 weeks |

A silk fragment-water solution of the present disclosure can be sterilized following standard methods in the art not limited to filtration, heat, radiation or e-beam. It is anticipated that the silk protein fragment mixture, because of its shorter protein polymer length, will withstand sterilization better than intact silk protein solutions described in the art. Additionally, silk articles created from the SPF mixtures described herein may be sterilized as appropriate to application.

Figure 2:
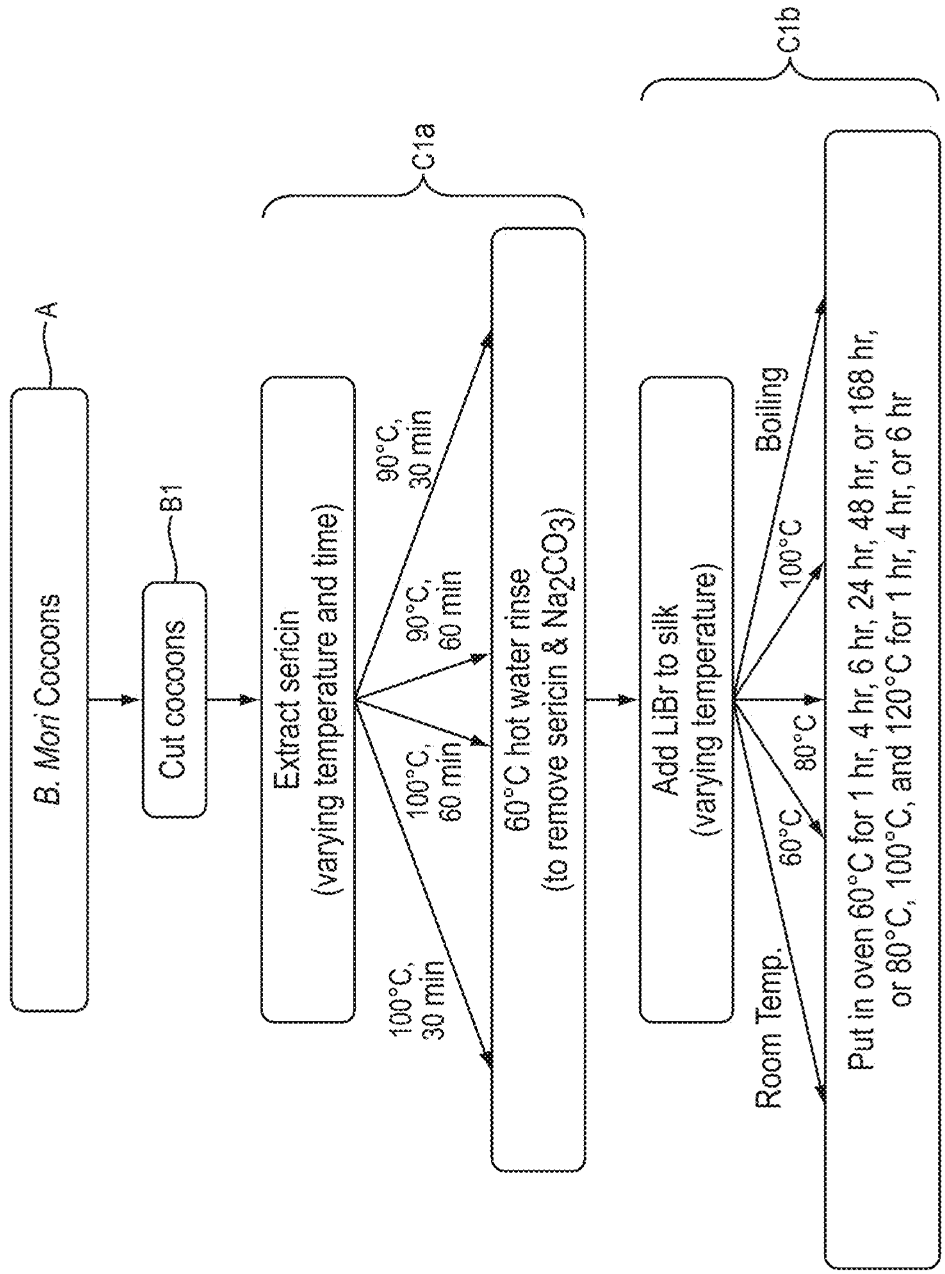
FIG. 2 is a flow chart showing various parameters that can be modified during the process of producing SPFs of the present disclosure during the extraction and the dissolution steps.

FIG. 2 is a flow chart showing various parameters that can be modified during the process of producing a silk protein fragment solution of the present disclosure during the extraction and the dissolution steps. Select method parameters may be altered to achieve distinct final solution characteristics depending upon the intended use, e.g., molecular weight and polydispersity. It should be understood that not all of the steps illustrated are necessarily required to fabricate all silk solutions of the present disclosure.

In an embodiment, a process for producing a silk protein fragment solution of the present disclosure includes forming pieces of silk cocoons from the *Bombyx mori* silk worm; extracting the pieces at about 100° C. in a solution of water and $Na_2CO_3$ for about 60 minutes, wherein a volume of the water equals about 0.4×raw silk weight and the amount of $Na_2CO_3$ is about 0.848×the weight of the pieces to form a silk fibroin extract; triple rinsing the silk fibroin extract at about 60° C. for about 20 minutes per rinse in a volume of rinse water, wherein the rinse water for each cycle equals about 0.2 L×the weight of the pieces; removing excess water from the silk fibroin extract; drying the silk fibroin extract; dissolving the dry silk fibroin extract in a LiBr solution, wherein the LiBr solution is first heated to about 100° C. to create a silk and LiBr solution and maintained; placing the silk and LiBr solution in a dry oven at about 100° C. for about 60 minutes to achieve complete dissolution and further fragmentation of the native silk protein structure into mixture with desired molecular weight and polydispersity; filtering the solution to remove any remaining debris from the silkworm; diluting the solution with water to result in a 1% silk solution; and removing solvent from the solution using Tangential Flow Filtration (TFF). In an embodiment, a 10 kDa membrane is utilized to purify the silk solution and create the final desired silk-to-water ratio. TFF can then be used to further concentrate the pure silk solution to a concentration of 2% silk to water.

Each process step from raw cocoons to dialysis is scalable to increase efficiency in manufacturing. Whole cocoons are currently purchased as the raw material, but pre-cleaned cocoons or non-heat treated cocoons, where worm removal leaves minimal debris, have also been used. Cutting and cleaning the cocoons is a manual process, however for scalability this process could be made less labor intensive by, for example, using an automated machine in combination with compressed air to remove the worm and any particulates, or using a cutting mill to cut the cocoons into smaller pieces. The extraction step, currently performed in small batches, could be completed in a larger vessel, for example an industrial washing machine where temperatures at or in between 60° C. to 100° C. can be maintained. The rinsing step could also be completed in the industrial washing machine, eliminating the manual rinse cycles. Dissolution of the silk in LiBr solution could occur in a vessel other than a convection oven, for example a stirred tank reactor. Dialyzing the silk through a series of water changes is a manual and time intensive process, which could be accelerated by changing certain parameters, for example diluting the silk solution prior to dialysis. The dialysis process could be scaled for manufacturing by using semi-automated equipment, for example a tangential flow filtration system.

Varying extraction (i.e., time and temperature), LiBr (i.e., temperature of LiBr solution when added to silk fibroin extract or vice versa) and dissolution (i.e., time and temperature) parameters results in solvent and silk solutions with different viscosities, homogeneities, and colors (see FIGS. 5-32). Increasing the temperature for extraction, lengthening the extraction time, using a higher temperature LiBr solution at emersion and over time when dissolving the silk and increasing the time at temperature (e.g., in an oven as shown here, or an alternative heat source) all resulted in less viscous and more homogeneous solvent and silk solutions. While almost all parameters resulted in a viable silk solution, methods that allow complete dissolution to be achieved in fewer than 4 to 6 hours are preferred for process scalability.

FIGS. 5-10 show photographs of four different silk extraction combinations tested: 90° C. 30 min, 90° C. 60 min, 100° C. 30 min, and 100° C. 60 min. Briefly, 9.3 M LiBr was prepared and allowed to sit at room temperature for at least 30 minutes. 5 mL of LiBr solution was added to 1.25 g of silk and placed in the 60° C. oven. Samples from each set were removed at 4, 6, 8, 12, 24, 168 and 192 hours. The remaining sample was photographed.

FIGS. 11-23 show photographs of four different silk extraction combinations tested: 90° C. 30 min, 90° C. 60 min, 100° C. 30 min, and 100° C. 60 min. Briefly, 9.3 M LiBr solution was heated to one of four temperatures: 60° C., 80° C., 100° C. or boiling. 5 mL of hot LiBr solution was added to 1.25 g of silk and placed in the 60° C. oven. Samples from each set were removed at 1, 4 and 6 hours. The remaining sample was photographed.

FIGS. 24-32 show photographs of four different silk extraction combinations tested: Four different silk extraction combinations were used: 90° C. 30 min, 90° C. 60 min, 100° C. 30 min, and 100° C. 60 min. Briefly, 9.3 M LiBr solution was heated to one of four temperatures: 60° C., 80° C., 100° C. or boiling. 5 mL of hot LiBr solution was added to 1.25 g of silk and placed in the oven at the same temperature of the LiBr. Samples from each set were removed at 1, 4 and 6 hours. 1 mL of each sample was added to 7.5 mL of 9.3 M LiBr and refrigerated for viscosity testing. The remaining sample was photographed.

Molecular weight of the silk protein fragments may be controlled based upon the specific parameters utilized during the extraction step, including extraction time and temperature; specific parameters utilized during the dissolution step, including the LiBr temperature at the time of submersion of the silk in to the lithium bromide and time that the solution is maintained at specific temperatures; and specific parameters utilized during the filtration step. By controlling process parameters using the disclosed methods, it is possible to create SPF mixture solutions with polydispersity equal to or lower than 2.5 at a variety of different molecular weight ranging from 5 kDa to 200 kDa, more preferably between 10 kDa and 80 kDA. By altering process parameters to achieve silk solutions with different molecular weights, a range of fragment mixture end products, with desired polydispersity of equal to or less than 2.5 may be targeted based upon the desired performance requirements. Additionally, SPF mixture solutions with a polydispersity of greater than 2.5 can be achieved. Further, two solutions with different average molecular weights and polydispersities can be mixed to create combination solutions. Alternatively, a liquid silk gland (100% sericin free silk protein) that has been removed directly from a worm could be used in combination with any of the SPF mixture solutions of the present disclosure. Molecular weight of the pure silk fibroin-based protein fragment composition was determined using High Pressure Liquid Chromatography (HPLC) with a Refractive Index Detector (RID). Polydispersity was calculated using Cirrus GPC Online GPC/SEC Software Version 3.3 (Agilent).

Parameters were varied during the processing of raw silk cocoons into silk solution. Varying these parameters affected the MW of the resulting silk solution. Parameters manipulated included (i) time and temperature of extraction, (ii) temperature of LiBr, (iii) temperature of dissolution oven, and (iv) dissolution time. Molecular weight was determined with mass spec as shown in FIGS. 40-54.

Experiments were carried out to determine the effect of varying the extraction time. FIGS. 40-46 are graphs showing these results, and Tables 2-8 summarize the results. Below is a summary:

- A sericin extraction time of 30 minutes resulted in larger MW than a sericin extraction time of 60 minutes
- MW decreases with time in the oven
- 140° C. LiBr and oven resulted in the low end of the confidence interval to be below a MW of 9500 Da
- 30 min extraction at the 1 hour and 4 hour time points have undigested silk
- 30 min extraction at the 1 hour time point resulted in a significantly high molecular weight with the low end of the confidence interval being 35,000 Da
- The range of MW reached for the high end of the confidence interval was 18000 to 216000 Da (important for offering solutions with specified upper limit)

TABLE 2

The effect of extraction time (30 min vs 60 min) on molecular weight of silk processed under the conditions of 100° C. Extraction Temperature, 100° C. Lithium Bromide (LiBr) and 100° C. Oven Dissolution (Oven/Dissolution Time was varied).

| Boil Time | Oven Time | Average Mw | Std dev | Confidence Interval | | PD |
|---|---|---|---|---|---|---|
| 30 | 1 | 57247 | 12780 | 35093 | 93387 | 1.63 |
| 60 | 1 | 31520 | 1387 | 11633 | 85407 | 2.71 |
| 30 | 4 | 40973 | 2632 | 14268 | 117658 | 2.87 |
| 60 | 4 | 25082 | 1248 | 10520 | 59803 | 2.38 |
| 30 | 6 | 25604 | 1405 | 10252 | 63943 | 2.50 |
| 60 | 6 | 20980 | 1262 | 10073 | 43695 | 2.08 |

TABLE 3

The effect of extraction time (30 min vs 60 min) on molecular weight of silk processed under the conditions of 100° C. Extraction Temperature, boiling Lithium Bromide (LiBr) and 60° C. Oven Dissolution for 4 hr.

| Sample | Boil Time | Average Mw | Std dev | Confidence Interval | | PD |
|---|---|---|---|---|---|---|
| 30 min, 4 hr | 30 | 49656 | 4580 | 17306 | 142478 | 2.87 |
| 60 min, 4 hr | 60 | 30042 | 1536 | 11183 | 80705 | 2.69 |

TABLE 4

The effect of extraction time (30 min vs 60 min) on molecular weight of silk processed under the conditions of 100° C. Extraction Temperature, 60° C. Lithium Bromide (LiBr) and 60° C. Oven Dissolution (Oven/Dissolution Time was varied).

| Sample | Boil Time | Oven Time | Average Mw | Std dev | Confidence Interval | | PD |
|---|---|---|---|---|---|---|---|
| 30 min, 1 hr | 30 | 1 | 58436 | | 22201 | 153809 | 2.63 |
| 60 min, 1 hr | 60 | 1 | 31700 | | 11931 | 84224 | 2.66 |
| 30 min, 4 hr | 30 | 4 | 61956.5 | 13337 | 21463 | 178847 | 2.89 |
| 60 min, 4 hr | 60 | 4 | 25578.5 | 2446 | 9979 | 65564 | 2.56 |

TABLE 5

The effect of extraction time (30 min vs 60 min) on molecular weight of silk processed under the conditions of 100° C. Extraction Temperature, 80° C. Lithium Bromide (LiBr) and 80° C. Oven Dissolution for 6 hr.

| Sample | Boil Time | Average Mw | Std dev | Confidence Interval | | PD |
|---|---|---|---|---|---|---|
| 30 min, 6 hr | 30 | 63510 | | 18693 | 215775 | 3.40 |
| 60 min, 6 hr | 60 | 25164 | 238 | 9637 | 65706 | 2.61 |

TABLE 6

The effect of extraction time (30 min vs 60 min) on molecular weight of silk processed under the conditions of 100° C. Extraction Temperature, 80° C. Lithium Bromide (LiBr) and 60° C. Oven Dissolution (Oven/Dissolution Time was varied).

| Sample | Boil Time | Oven Time | Average Mw | Std dev | Confidence Interval | | PD |
|---|---|---|---|---|---|---|---|
| 30 min, 4 hr | 30 | 4 | 59202 | 14028 | 19073 | 183760 | 3.10 |
| 60 min, 4 hr | 60 | 4 | 26312.5 | 637 | 10266 | 67442 | 2.56 |
| 30 min, 6 hr | 30 | 6 | 46824 | | 18076 | 121293 | 2.59 |
| 60 min, 6 hr | 60 | 6 | 26353 | | 10168 | 68302 | 2.59 |

TABLE 7

The effect of extraction time (30 min vs 60 min) on molecular weight of silk processed under the conditions of 100° C. Extraction Temperature, 100° C. Lithium Bromide (LiBr) and 60° C. Oven Dissolution (Oven/Dissolution Time was varied).

| Sample | Boil Time | Oven Time | Average Mw | Std dev | Confidence Interval | | PD |
|---|---|---|---|---|---|---|---|
| 30 min, 4 hr | 30 | 4 | 47853 | | 19758 | 115900 | 2.42 |
| 60 min, 4 hr | 60 | 4 | 25082 | 1248 | 10520 | 59804 | 2.38 |
| 30 min, 6 hr | 30 | 6 | 55421 | 8992 | 19153 | 160366 | 2.89 |
| 60 min, 6 hr | 60 | 6 | 20980 | 1262 | 10073 | 43694 | 2.08 |

TABLE 8

The effect of extraction time (30 min vs 60 min) on molecular weight of silk processed under the conditions of 100° C. Extraction Temperature, 140° C. Lithium Bromide (LiBr) and 140° C. Oven Dissolution (Oven/Dissolution Time was varied).

| Sample | Boil Time | Oven Time | Average Mw | Std dev | Confidence Interval | | PD |
|---|---|---|---|---|---|---|---|
| 30 min, 4 hr | 30 | 4 | 9024.5 | 1102 | 4493 | 18127 | 2.00865 |
| 60 min, 4 hr | 60 | 4 | 15548 | | 6954 | 34762 | 2.2358 |
| 30 min, 6 hr | 30 | 6 | 13021 | | 5987 | 28319 | 2.1749 |
| 60 min, 6 hr | 60 | 6 | 10888 | | 5364 | 22100 | 2.0298 |

Figure 47:
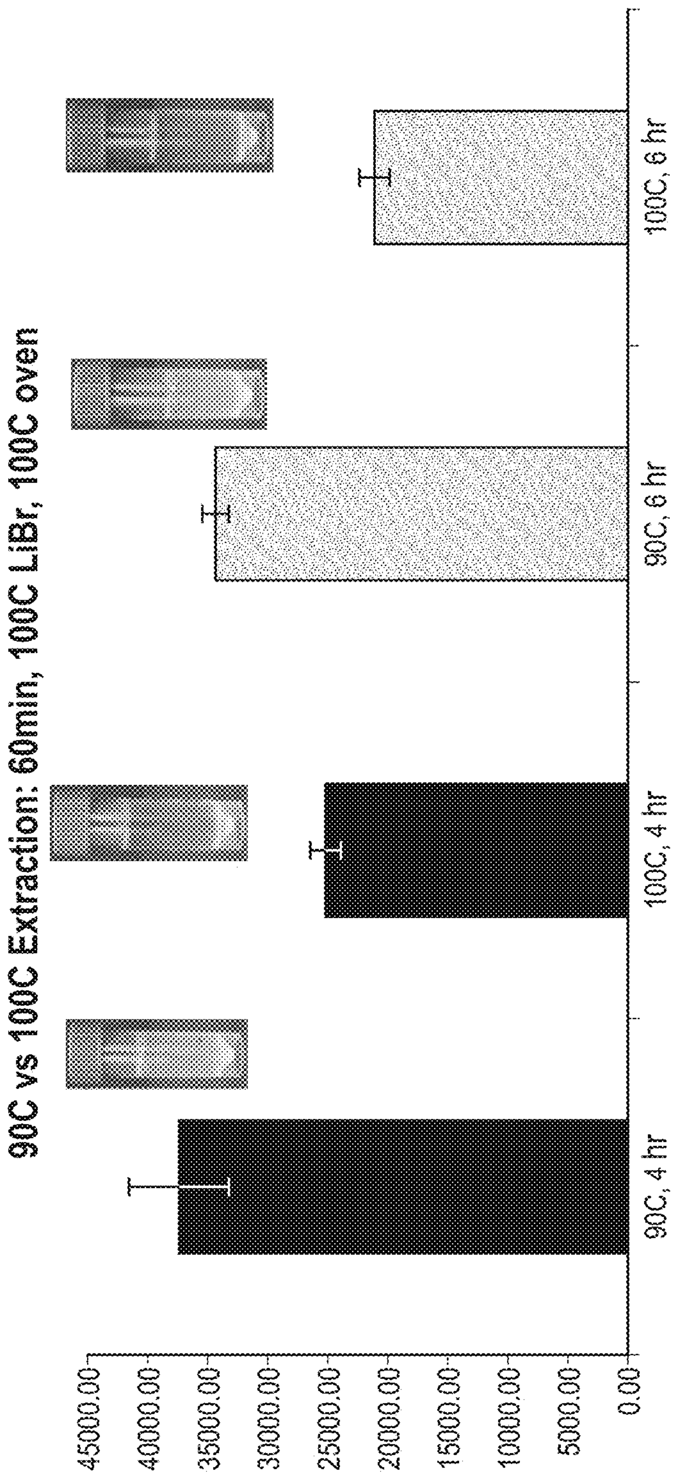
FIG. 47 is a graph summarizing the effect of Extraction Temperature on Molecular Weight of silk processed under the conditions of 60 minute Extraction Time, 100° C. LiBr and 100° C. Oven Dissolution (Oven/Dissolution Time was varied).

Experiments were carried out to determine the effect of varying the extraction temperature. FIG. 47 is a graph showing these results, and Table 9 summarizes the results. Below is a summary:

Sericin extraction at 90° C. resulted in higher MW than sericin extraction at 100° C. extraction Both 90° C. and 100° C. show decreasing MW over time in the oven

TABLE 9

The effect of extraction temperature (90° C. vs. 100° C.) on molecular weight of silk processed under the conditions of 60 min. Extraction Temperature, 100° C. Lithium Bromide (LiBr) and 100° C. Oven Dissolution (Oven/Dissolution Time was varied).

| Sample | Boil Time | Oven Time | Average Mw | Std dev | Confidence Interval | | PD |
|---|---|---|---|---|---|---|---|
| 90° C., 4 hr | 60 | 4 | 37308 | 4204 | 13368 | 104119 | 2.79 |
| 100° C., 4 hr | 60 | 4 | 25082 | 1248 | 10520 | 59804 | 2.38 |
| 90° C., 6 hr | 60 | 6 | 34224 | 1135 | 12717 | 92100 | 2.69 |
| 100° C., 6 hr | 60 | 6 | 20980 | 1262 | 10073 | 43694 | 2.08 |

Figure 48:
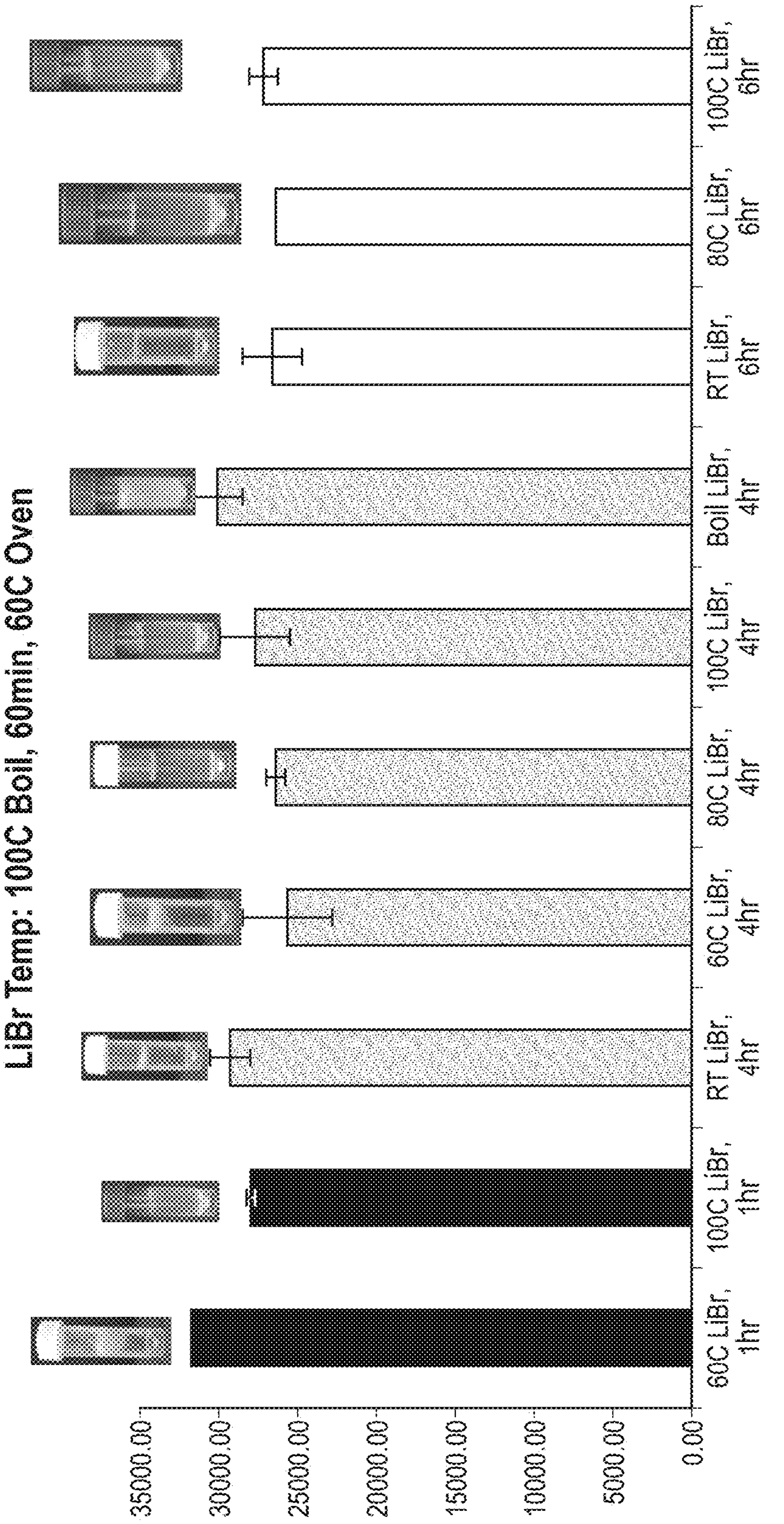
FIG. 48 is a graph summarizing the effect of LiBr Temperature on Molecular Weight of silk processed under the conditions of 60 minute Extraction Time, 100° C. Extraction Temperature and 60° C. Oven Dissolution (Oven/Dissolution Time was varied).
Figure 49:
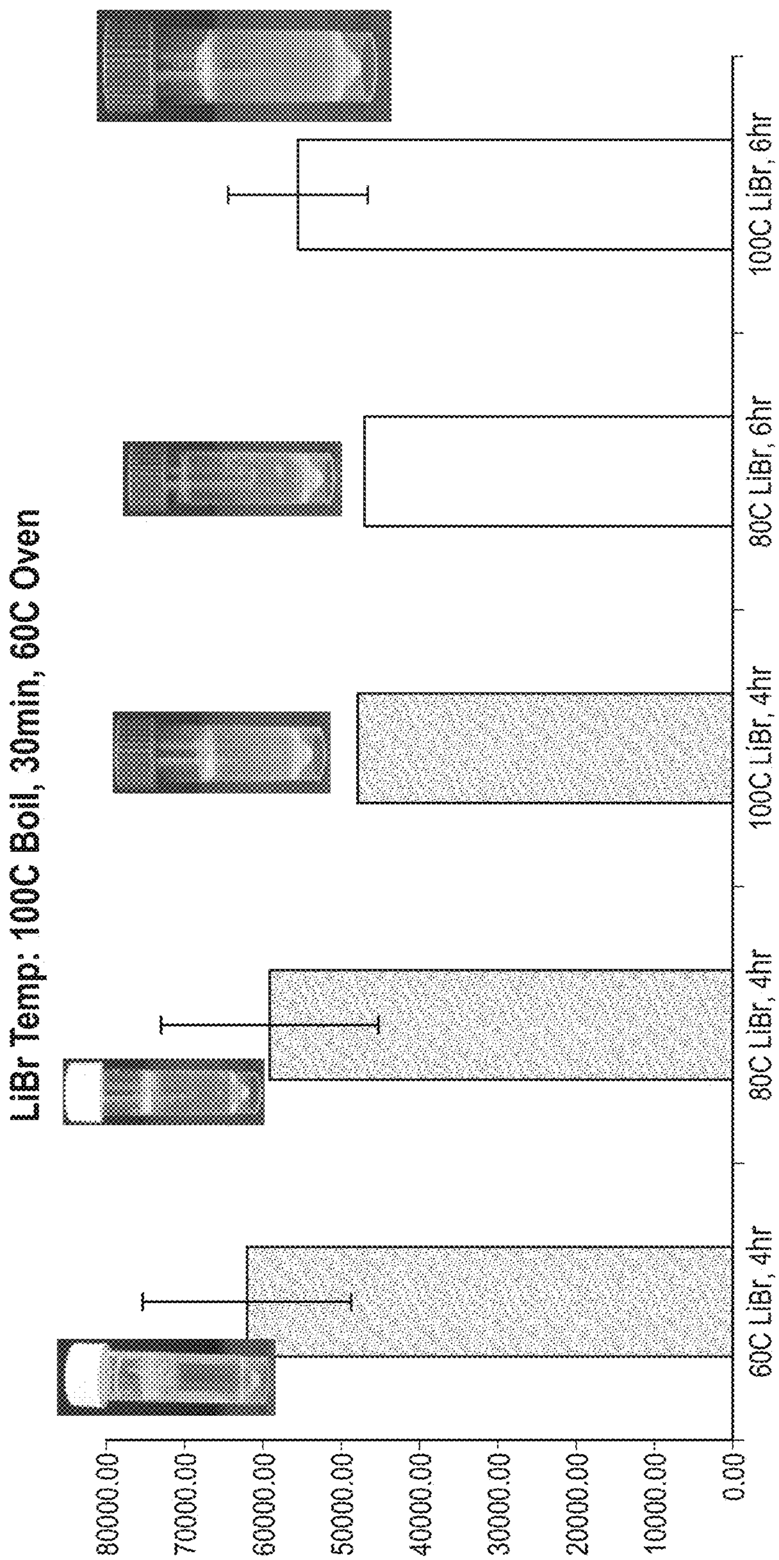
FIG. 49 is a graph summarizing the effect of LiBr Temperature on Molecular Weight of silk processed under the conditions of 30 minute Extraction Time, 100° C. Extraction Temperature and 60° C. Oven Dissolution (Oven/Dissolution Time was varied).
Figure 50:
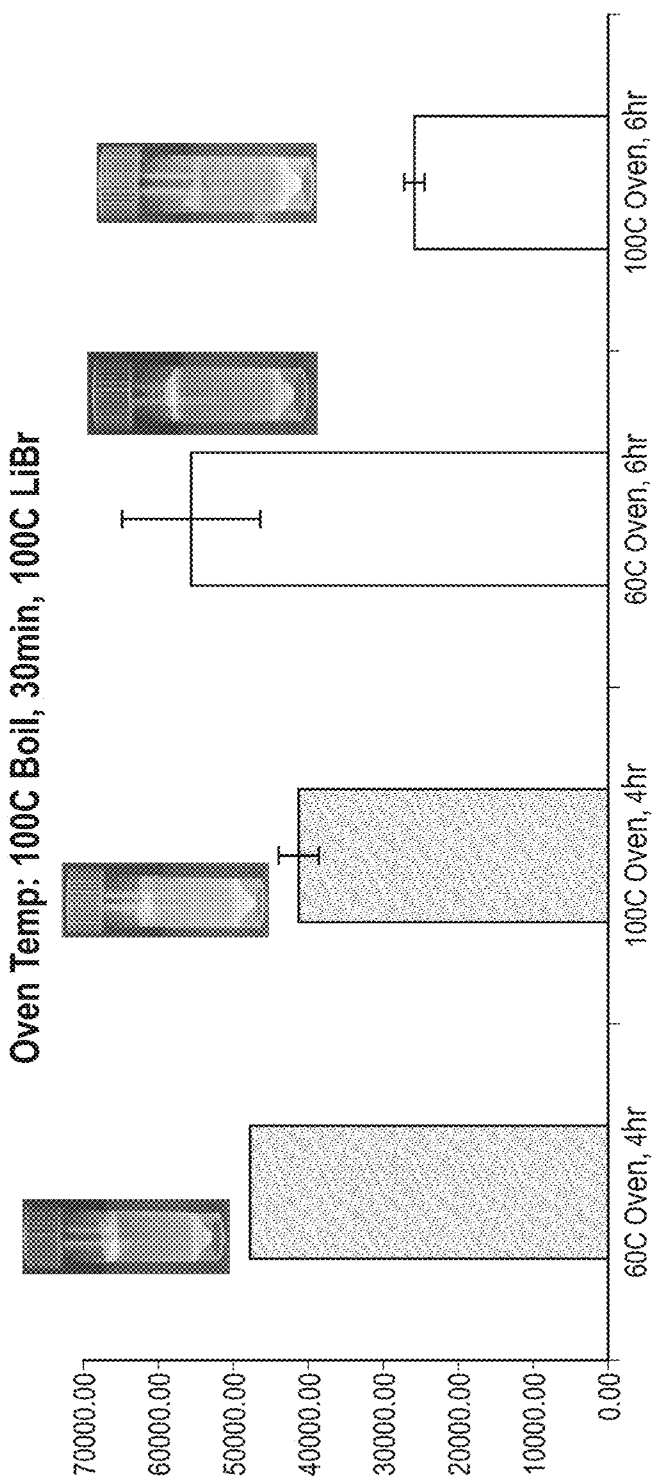
FIG. 50 is a graph summarizing the effect of Oven/Dissolution Temperature on Molecular Weight of silk processed under the conditions of 100° C. Extraction Temperature, 30 minute Extraction Time, and 100° C. Lithium Bromide (Oven/Dissolution Time was varied).
Figure 51:
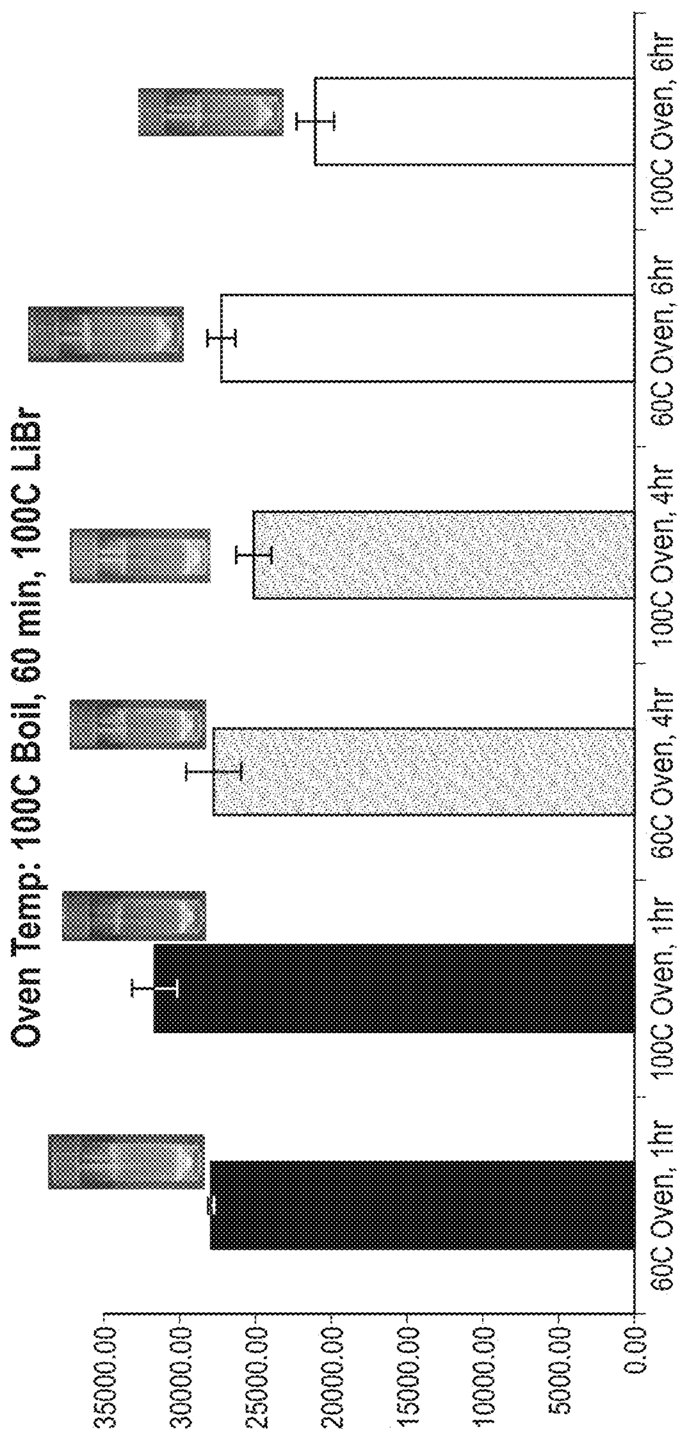
FIG. 51 is a graph summarizing the effect of Oven/Dissolution Temperature on Molecular Weight of silk processed under the conditions of 100° C. Extraction Temperature, 60 minute Extraction Time, and 100° C. Lithium Bromide. (Oven/Dissolution Time was varied).
Figure 52:
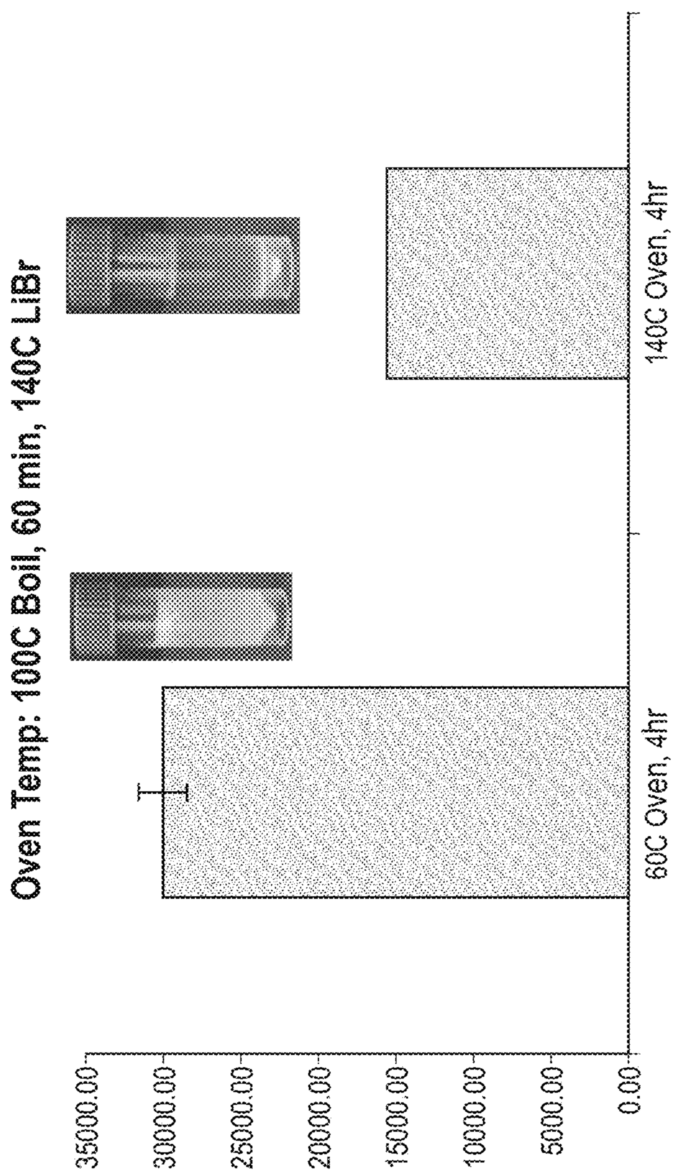
FIG. 52 is a graph summarizing the effect of Oven/Dissolution Temperature on Molecular Weight of silk processed under the conditions of 100° C. Extraction Temperature, 60 minute Extraction Time, and 140° C. Lithium Bromide (Oven/Dissolution Time was varied).
Figure 53:
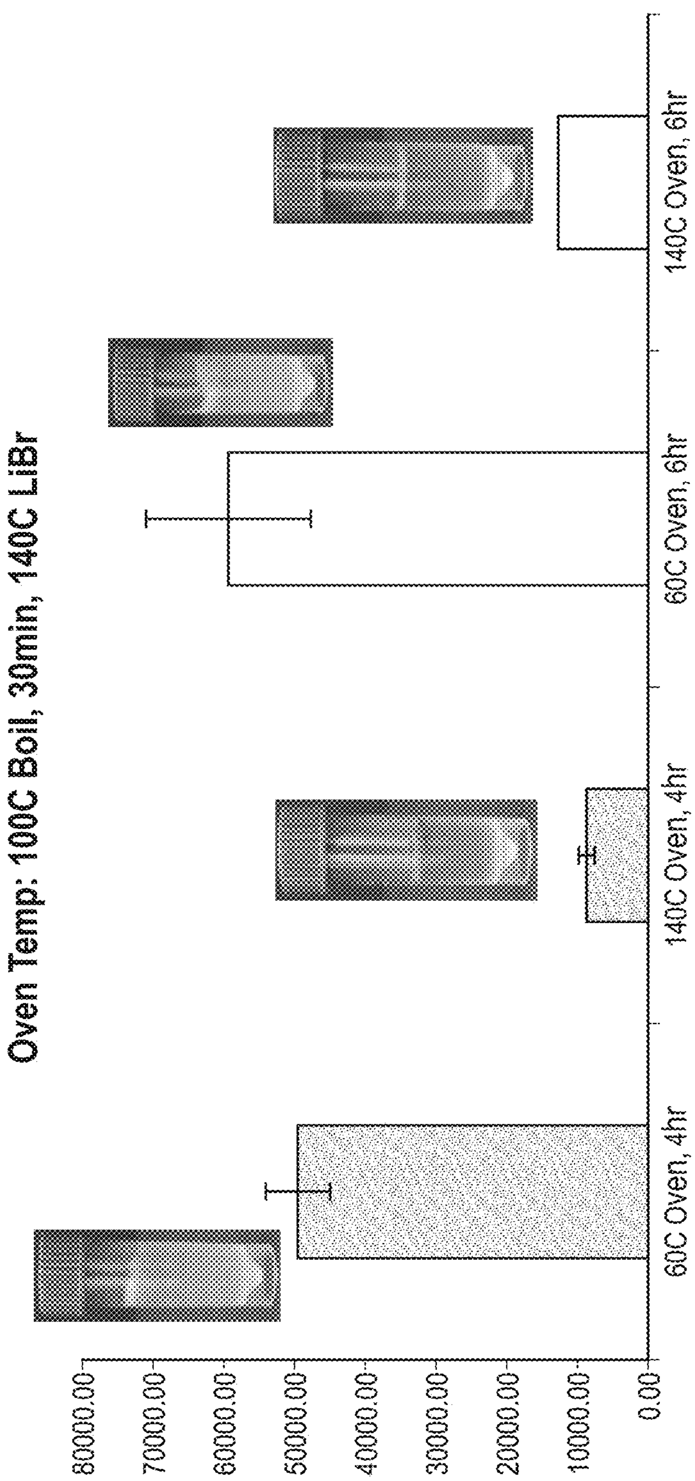
FIG. 53 is a graph summarizing the effect of Oven/Dissolution Temperature on Molecular Weight of silk processed under the conditions of 100° C. Extraction Temperature, 30 minute Extraction Time, and 140° C. Lithium Bromide (Oven/Dissolution Time was varied).
Figure 54:
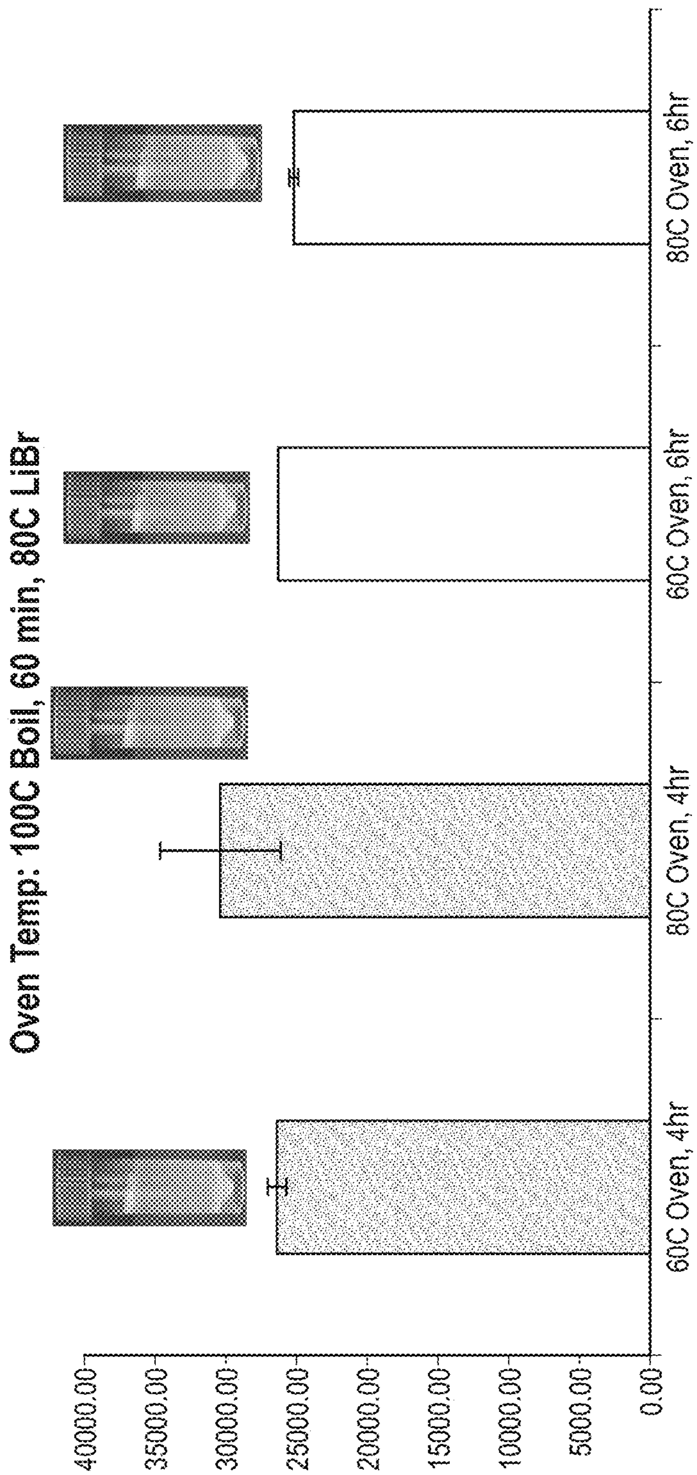
FIG. 54 is a graph summarizing the effect of Oven/Dissolution Temperature on Molecular Weight of silk processed under the conditions of 100° C. Extraction Temperature, 60 minute Extraction Time, and 80° C. Lithium Bromide (Oven/Dissolution Time was varied).
Figure 55:
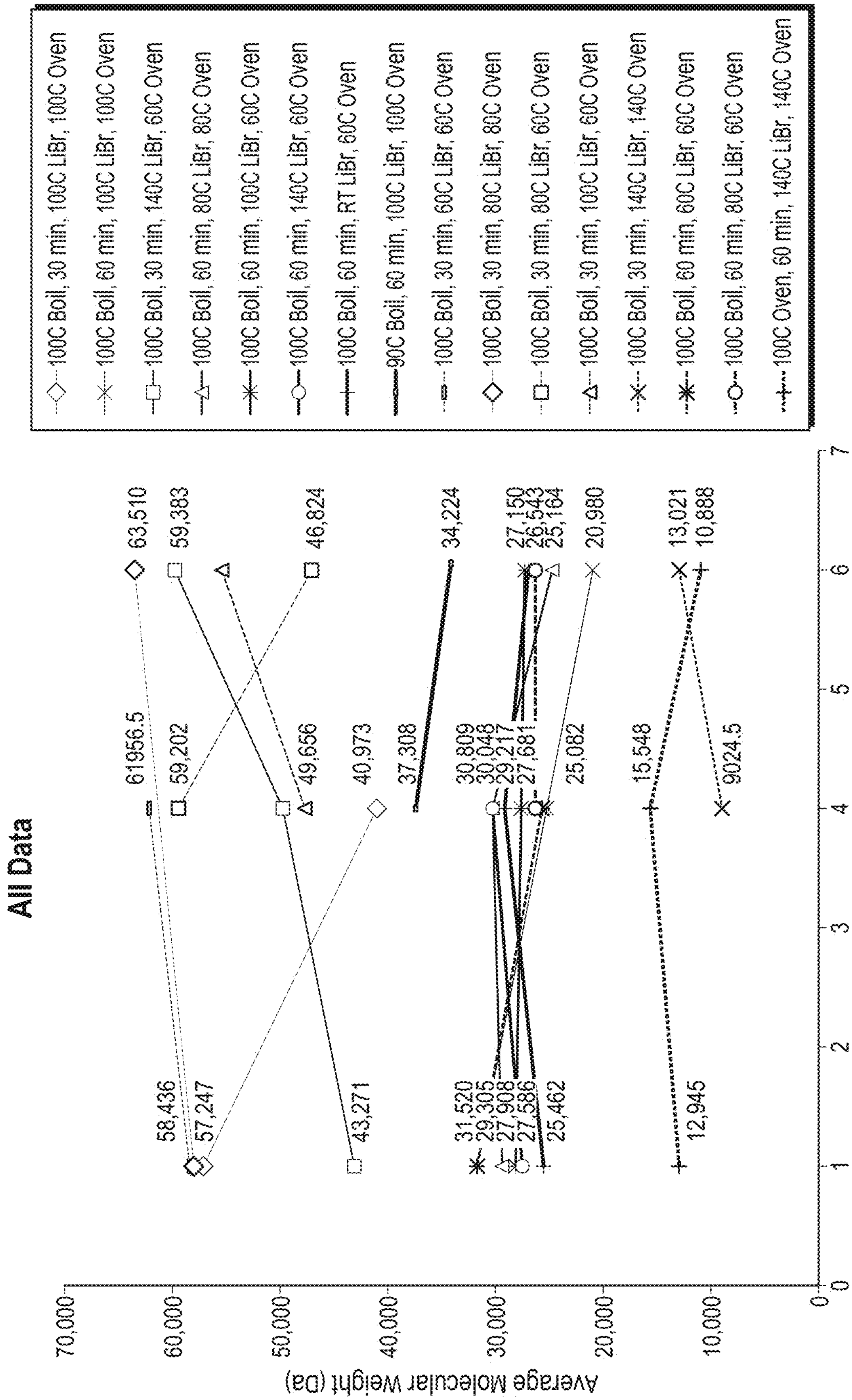
FIG. 55 is a graph summarizing the Molecular Weights of silk processed under varying conditions including Extraction Time, Extraction Temperature, Lithium Bromide (LiBr) Temperature, Oven Temperature for Dissolution, Oven Time for Dissolution.
Figure 56:
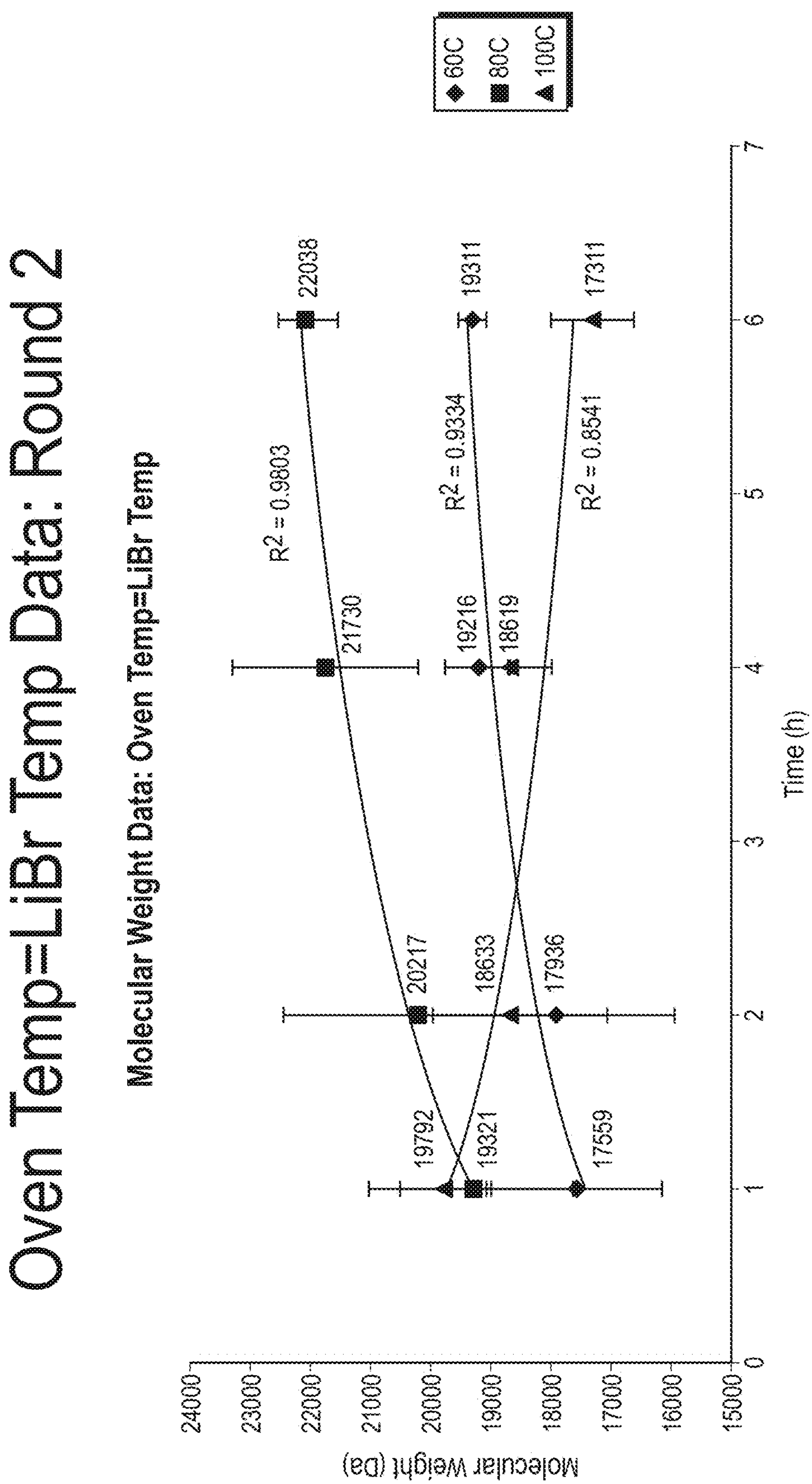
FIG. 56 is a graph summarizing the Molecular Weights of silk processed under conditions in which Oven/Dissolution Temperature is equal to LiBr Temperature.
Figure 57A:
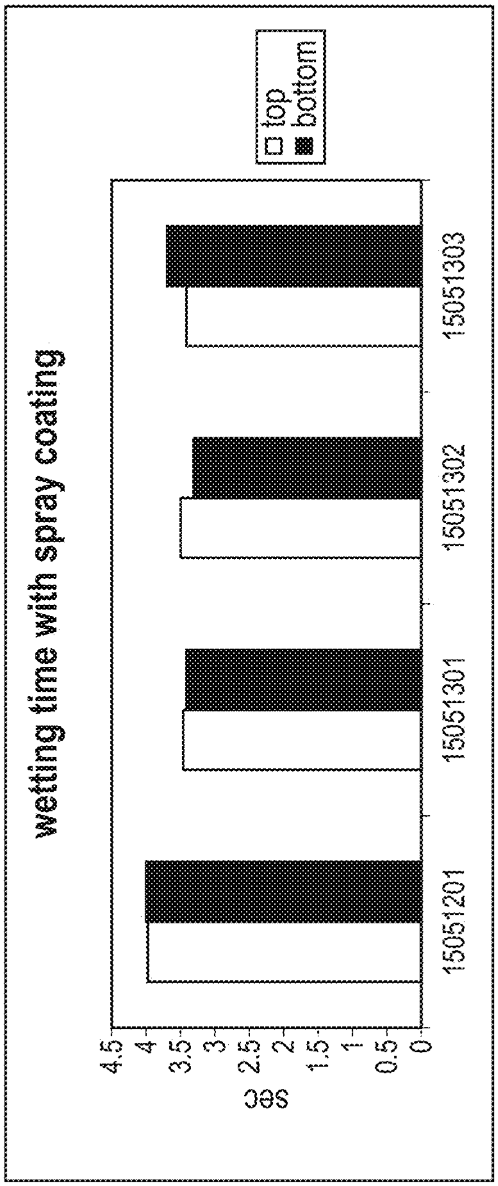
FIG. 57A is a graph illustrating wetting time with spray coating.
Figure 57B:
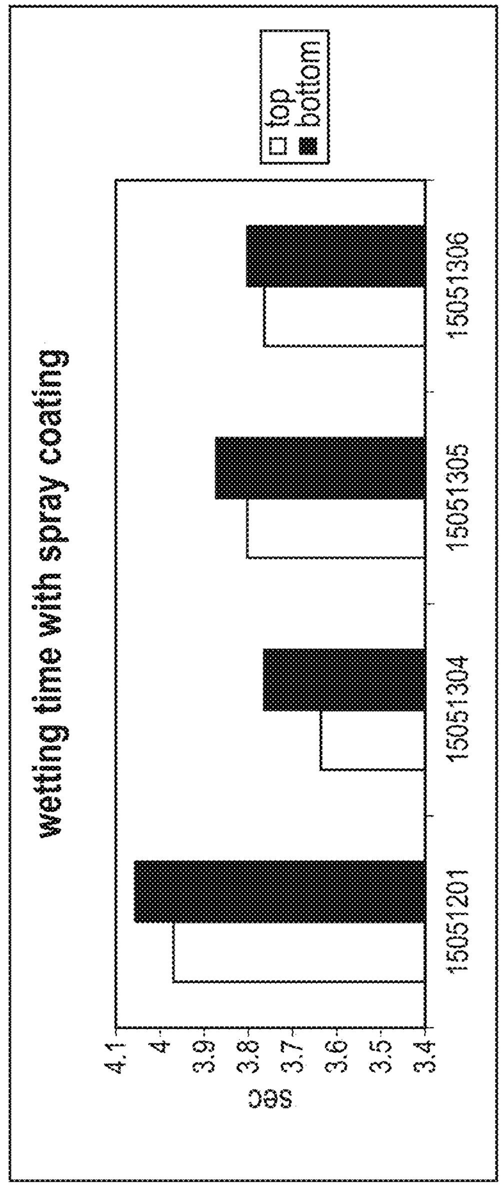
FIG. 57B is a graph illustrating wetting time with stencil coating.
Figure 57C:
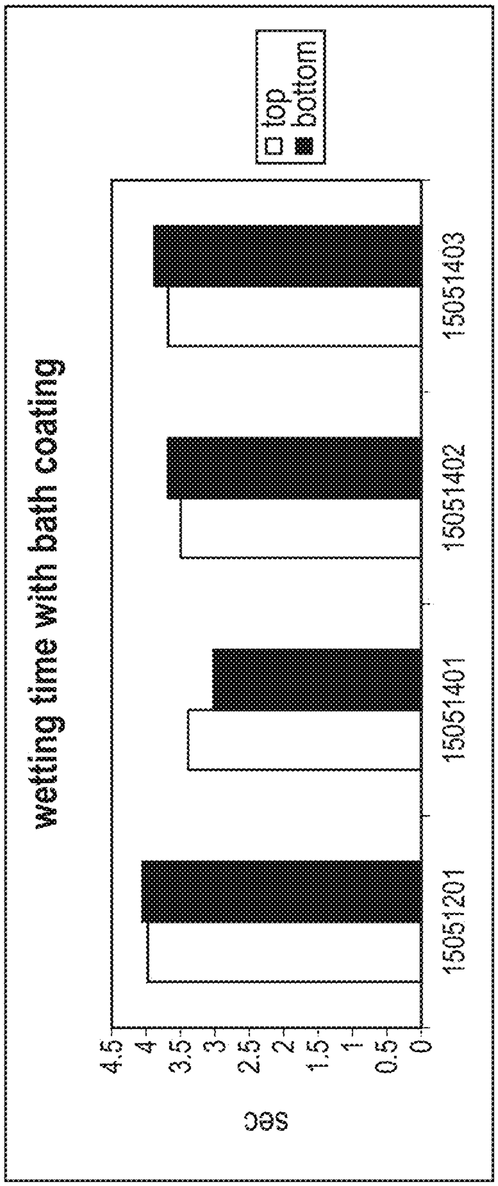
FIG. 57C is a graph illustrating wetting time with bath coating.
Figure 57D:
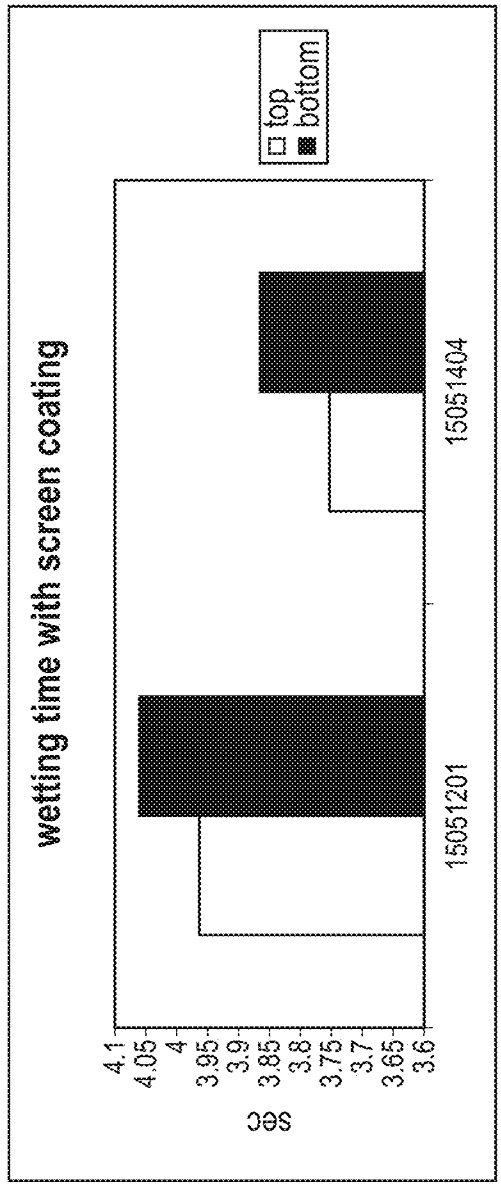
FIG. 57D is a graph illustrating wetting time with screen coating.
Figure 58A:
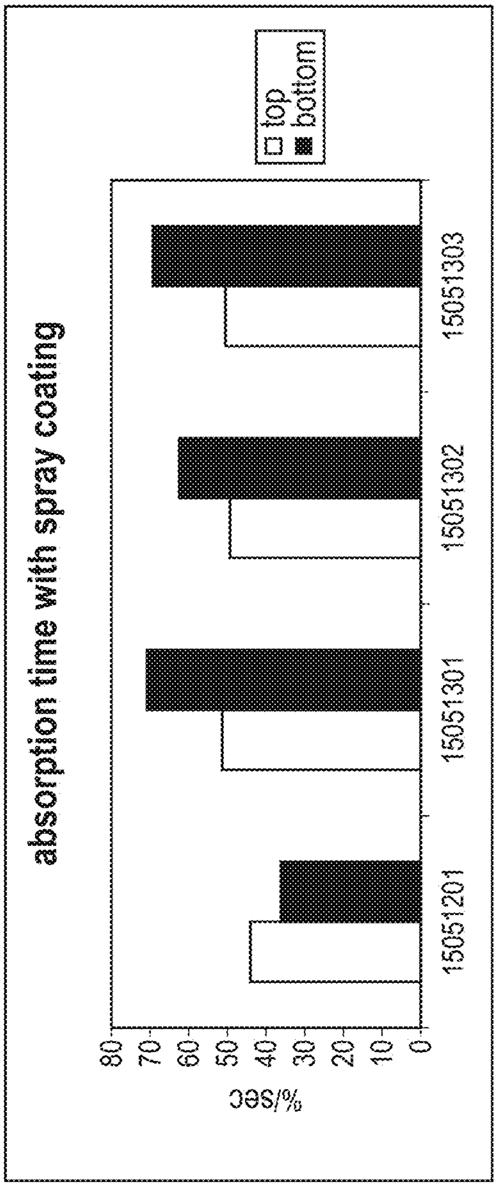
FIG. 58A is a graph illustrating absorption time with spray coating.
Figure 58B:
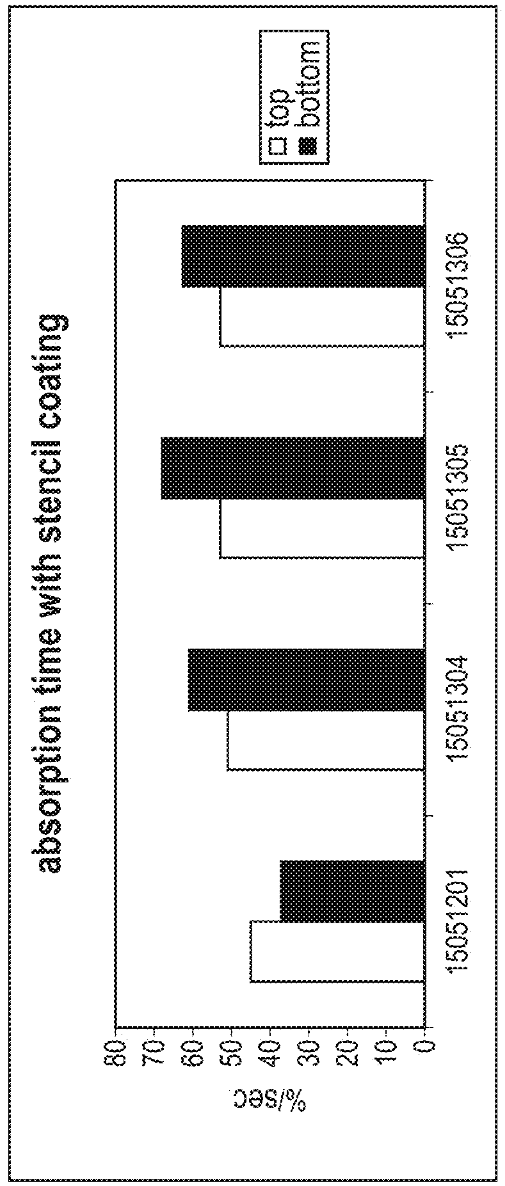
FIG. 58B is a graph illustrating absorption time with stencil coating.
Figure 58C:
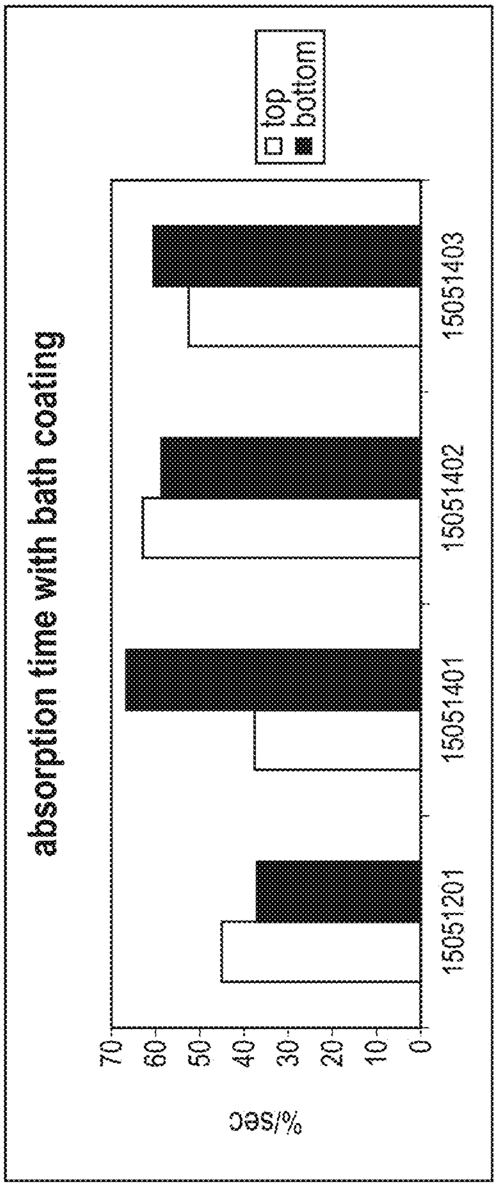
FIG. 58C is a graph illustrating absorption time with bath coating.
Figure 58D:
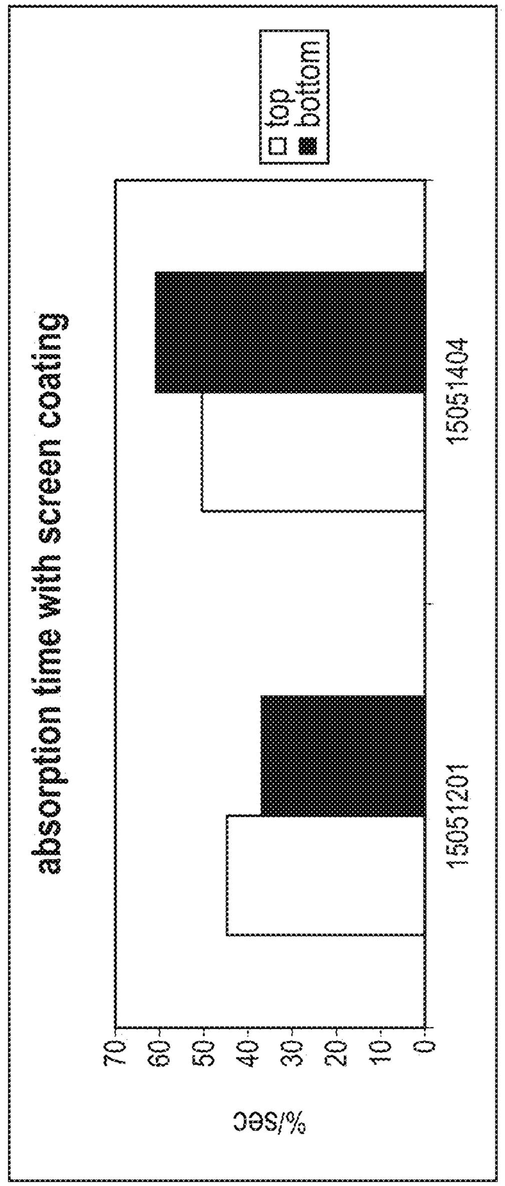
FIG. 58D is a graph illustrating absorption time with screen coating.
Figure 59A:
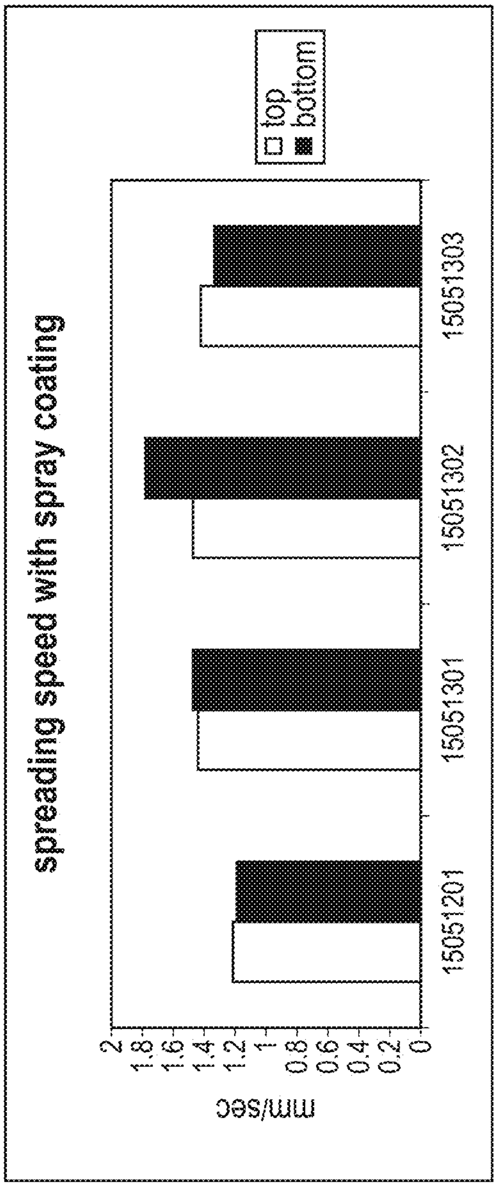
FIG. 59A is a graph illustrating spreading speed with spray coating.
Figure 59B:
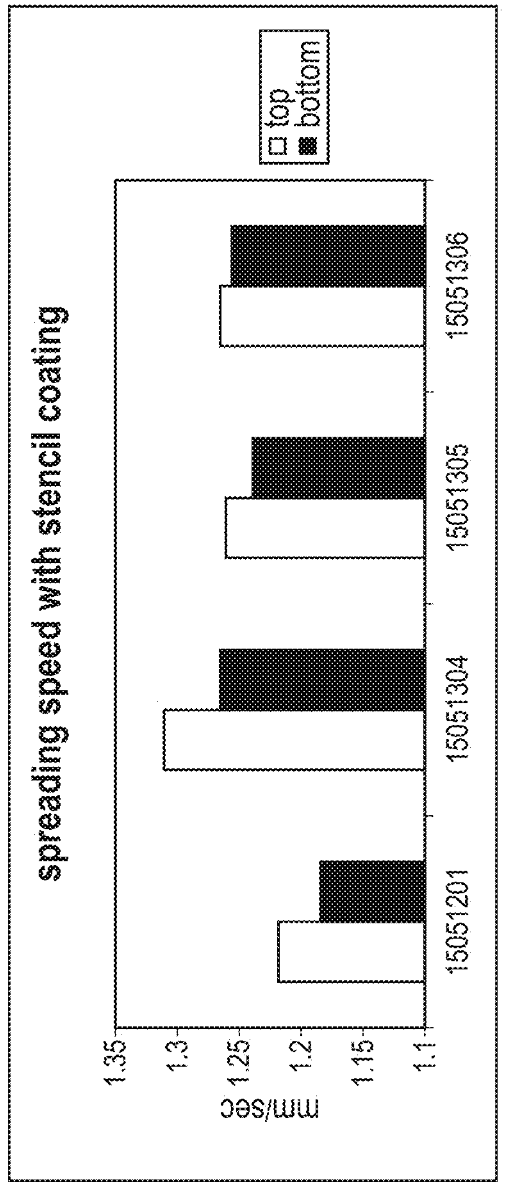
FIG. 59B is a graph illustrating spreading speed with stencil coating.
Figure 59C:
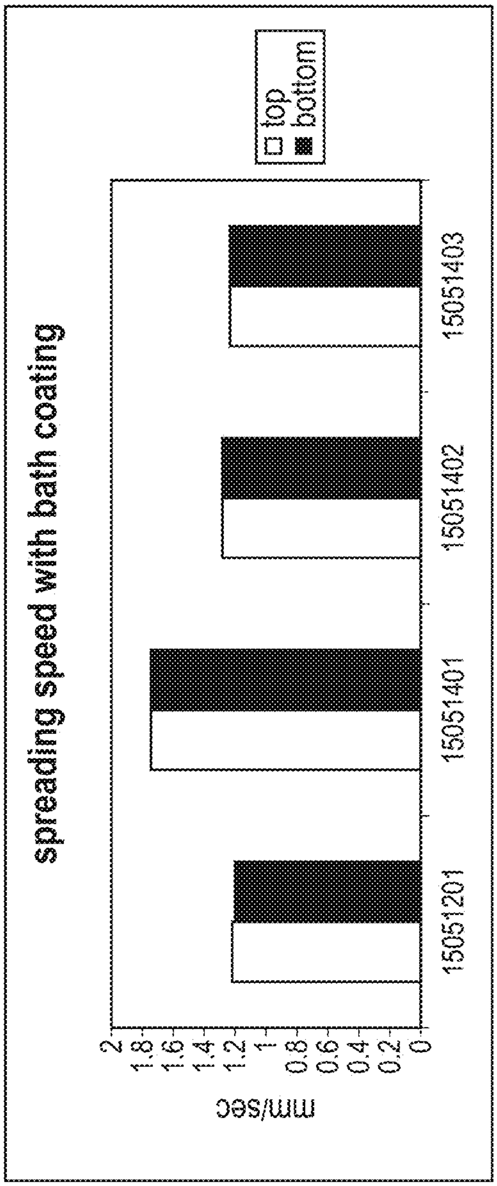
FIG. 59C is a graph illustrating spreading speed with bath coating.
Figure 59D:
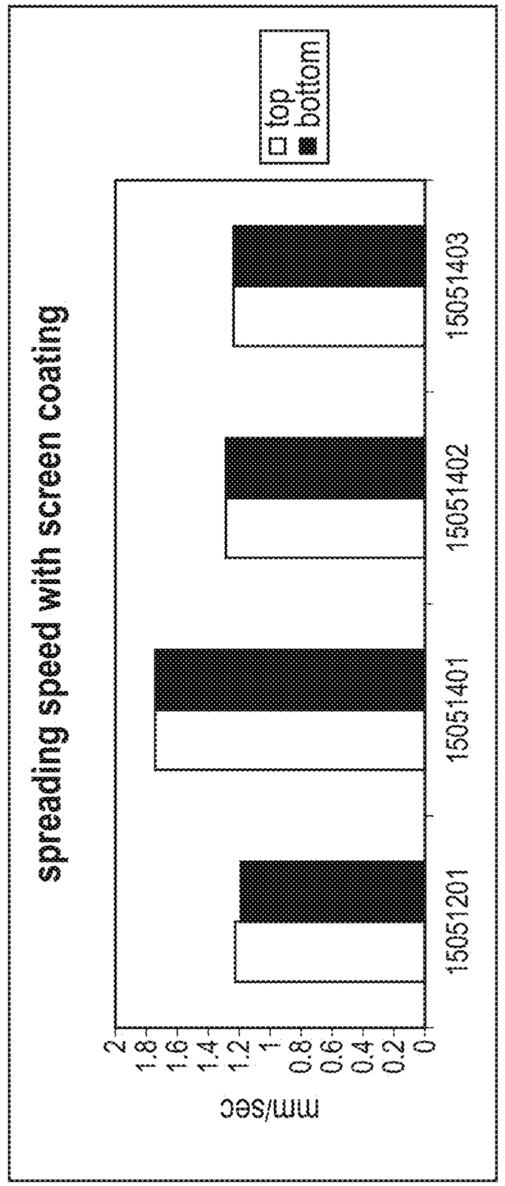
FIG. 59D is a graph illustrating spreading speed with screen coating.
Figure 60A:
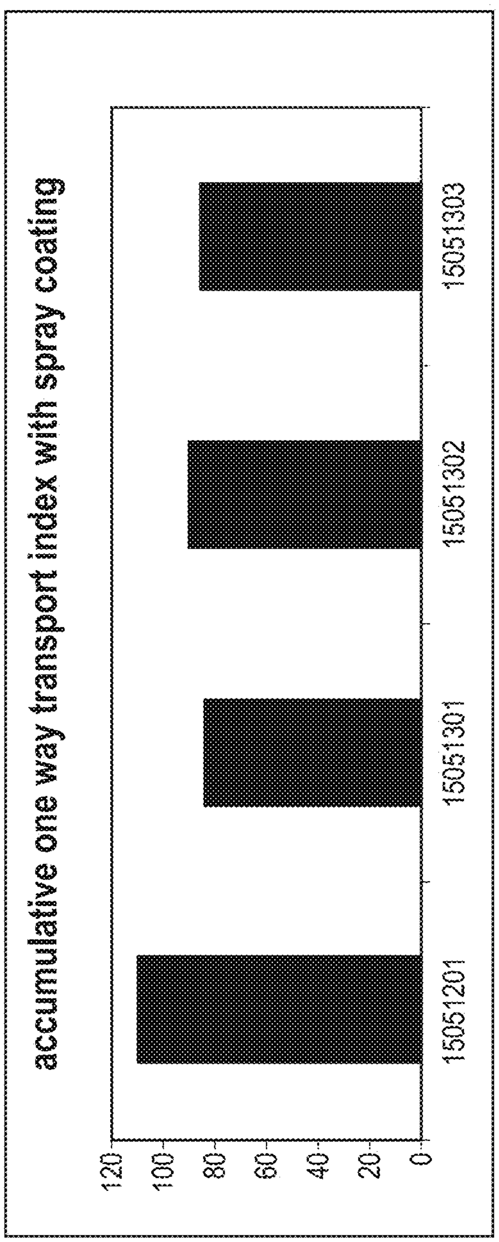
FIG. 60A is a graph illustrating accumulative one way transport index with spray coating.
Figure 60B:
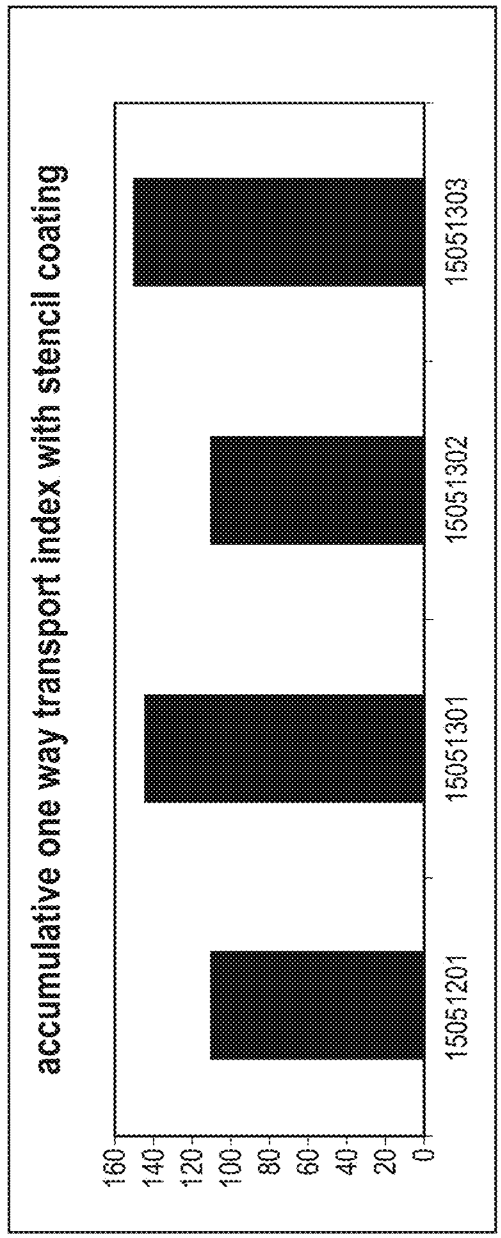
FIG. 60B is a graph illustrating accumulative one way transport index with stencil coating.
Figure 60C:
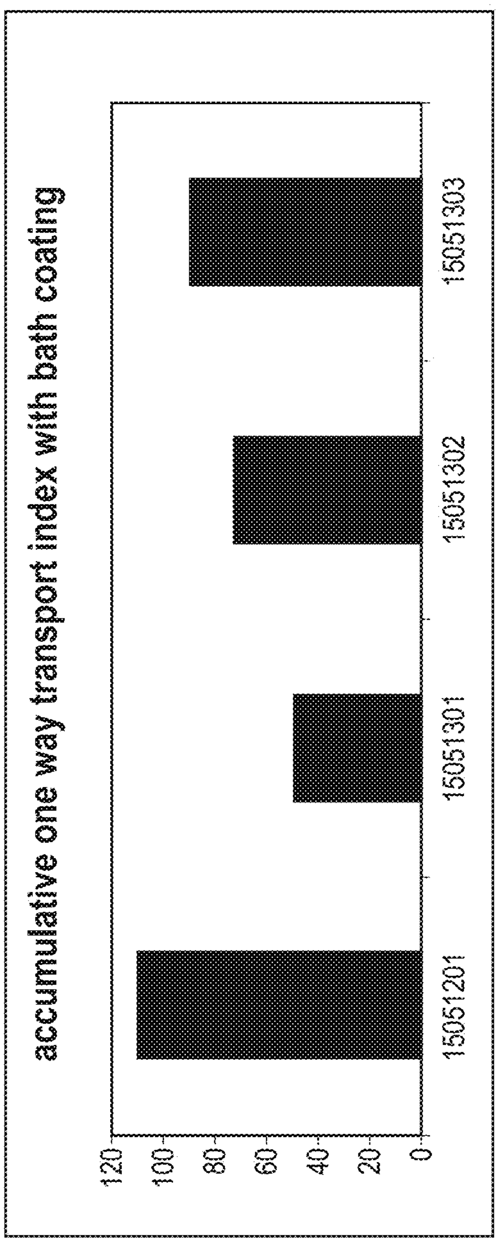
FIG. 60C is a graph illustrating accumulative one way transport index with bath coating.
Figure 60D:
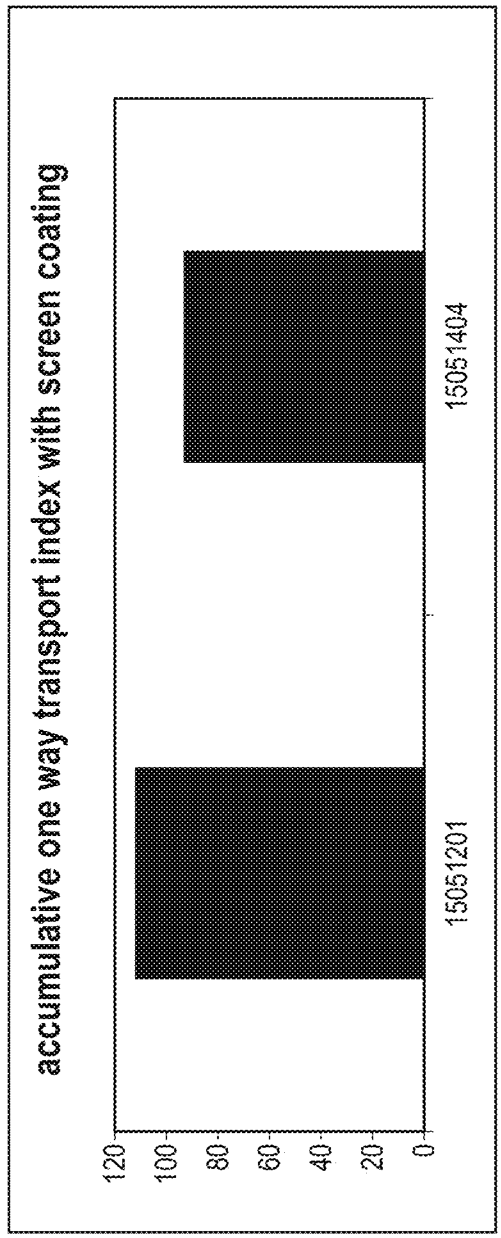
FIG. 60D is a graph illustrating accumulative one way transport index with screen coating.
Figure 61A:
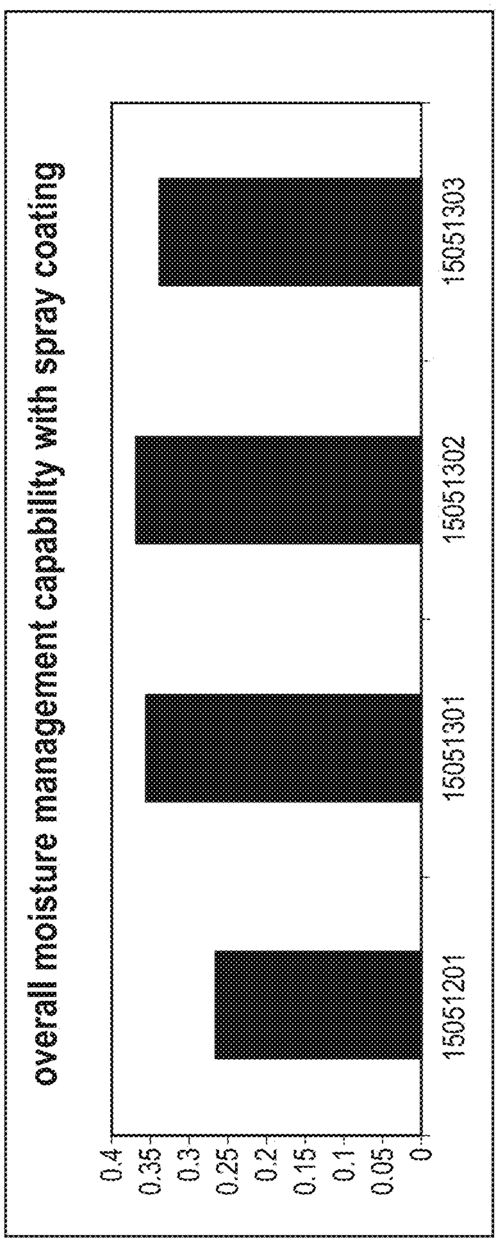
FIG. 61A is a graph illustrating overall moisture management capability with spray coating.
Figure 61B:
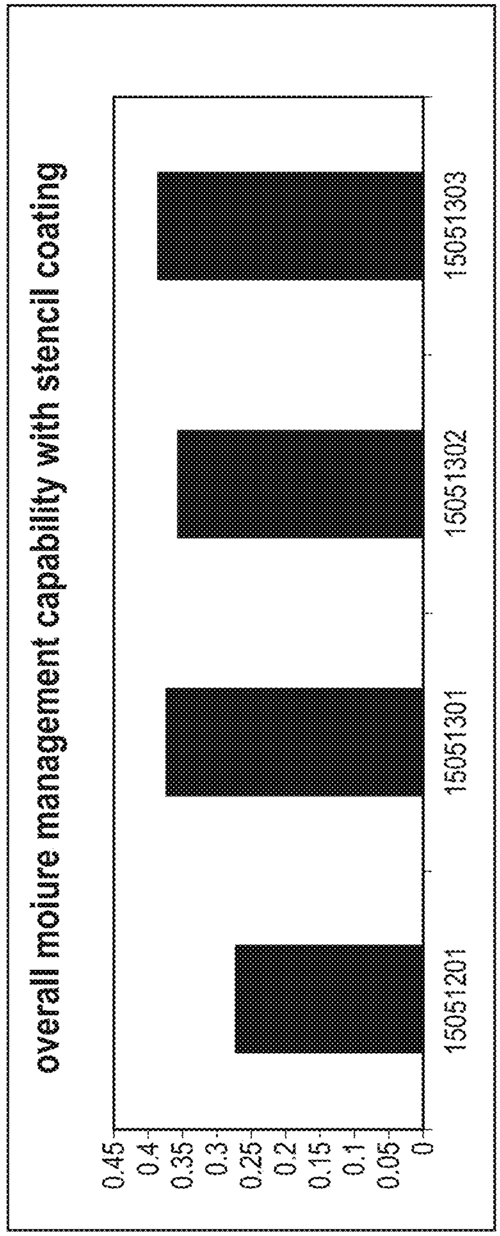
FIG. 61B is a graph illustrating overall moisture management capability with stencil coating.
Figure 61C:
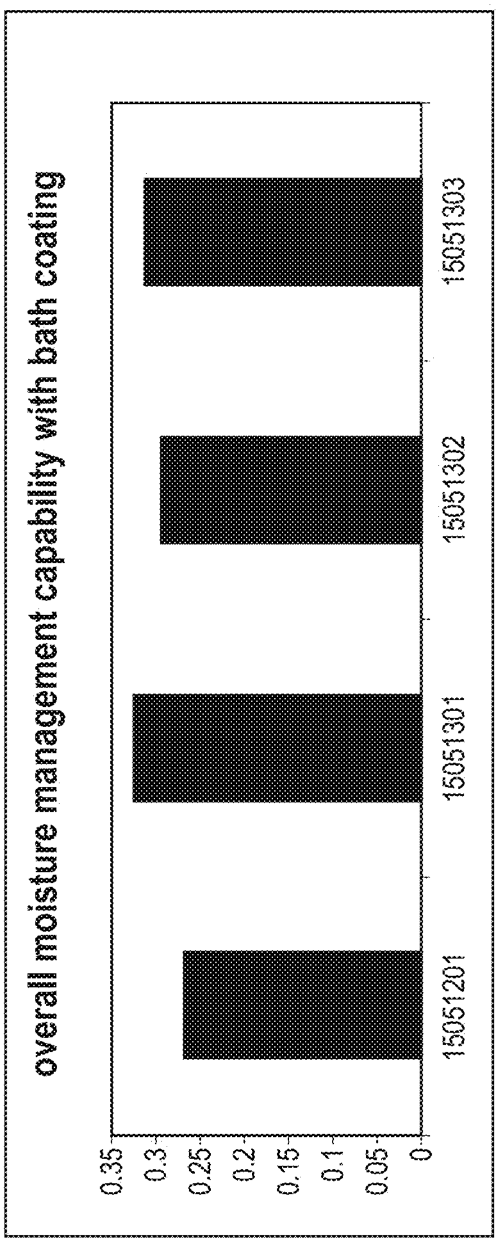
FIG. 61C is a graph illustrating overall moisture management capability with bath coating.
Figure 61D:
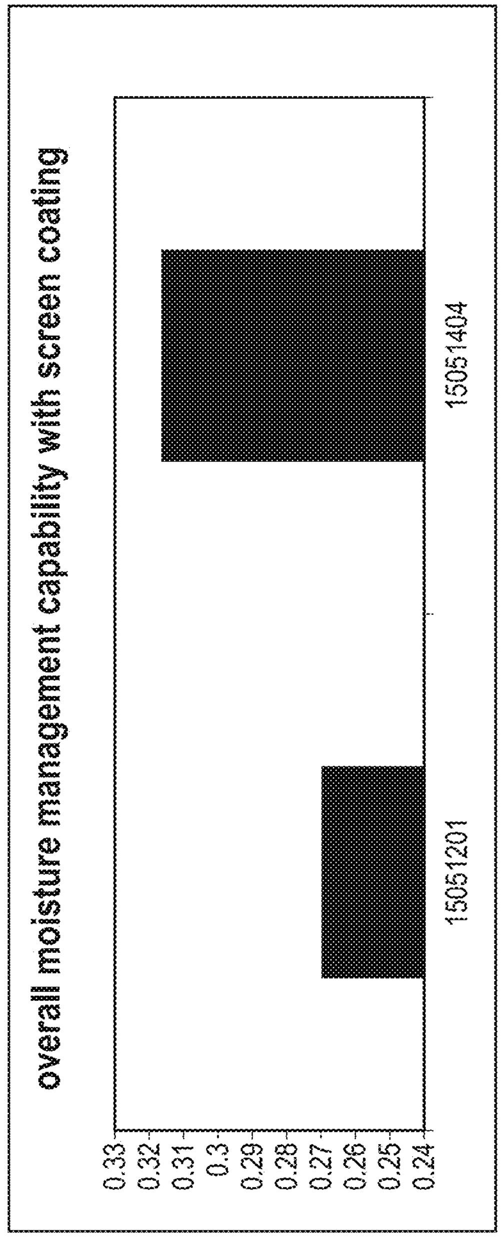
FIG. 61D is a graph illustrating overall moisture management capability with screen coating.
Figure 62A:
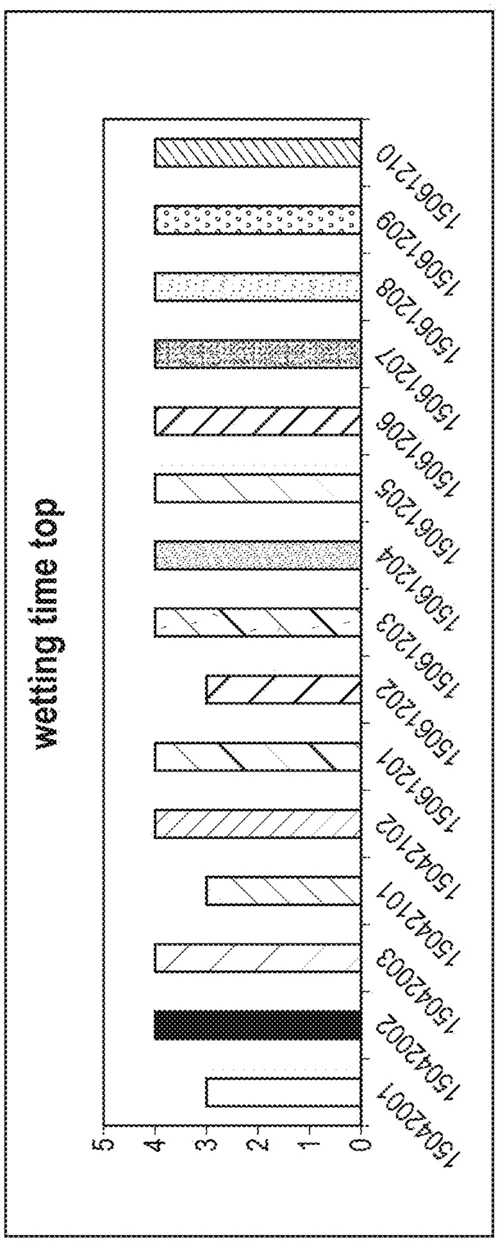
FIG. 62A is a graph illustrating wetting time top.
Figure 62B:
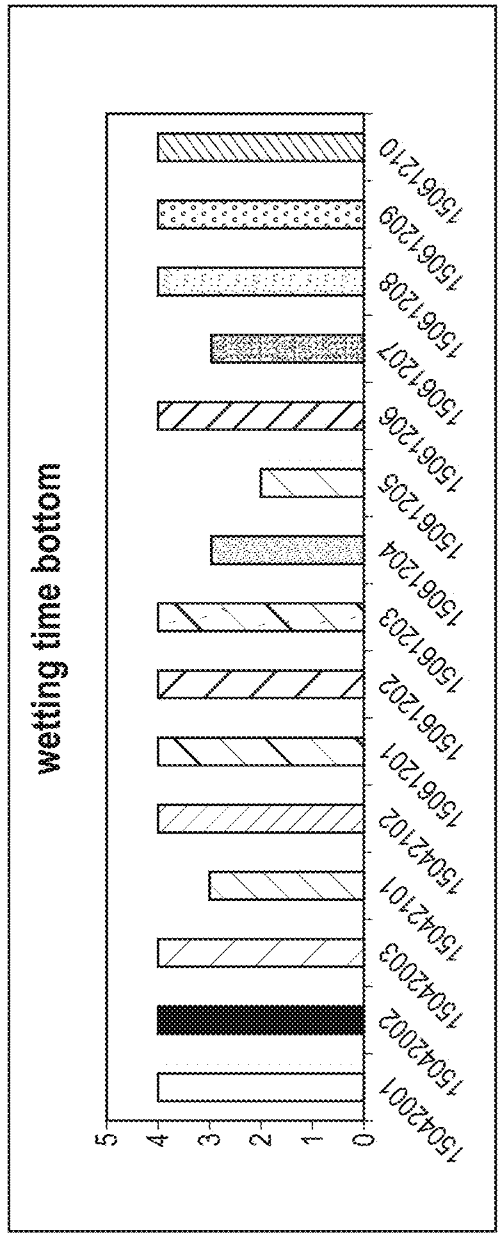
FIG. 62B is a graph illustrating wetting time bottom.
Figure 63A:
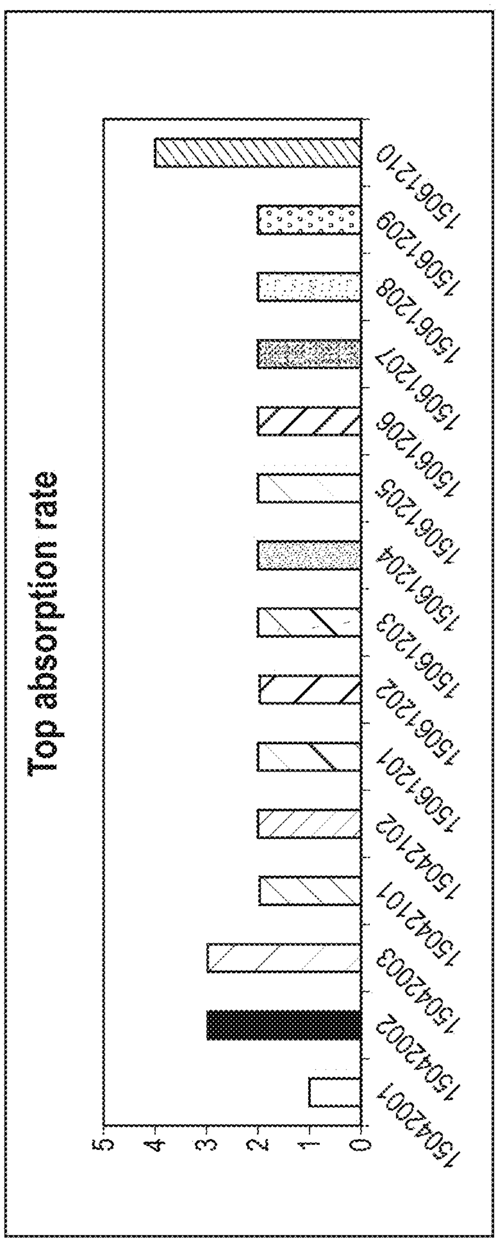
FIG. 63A is a graph illustrating top absorption rate.
Figure 63B:
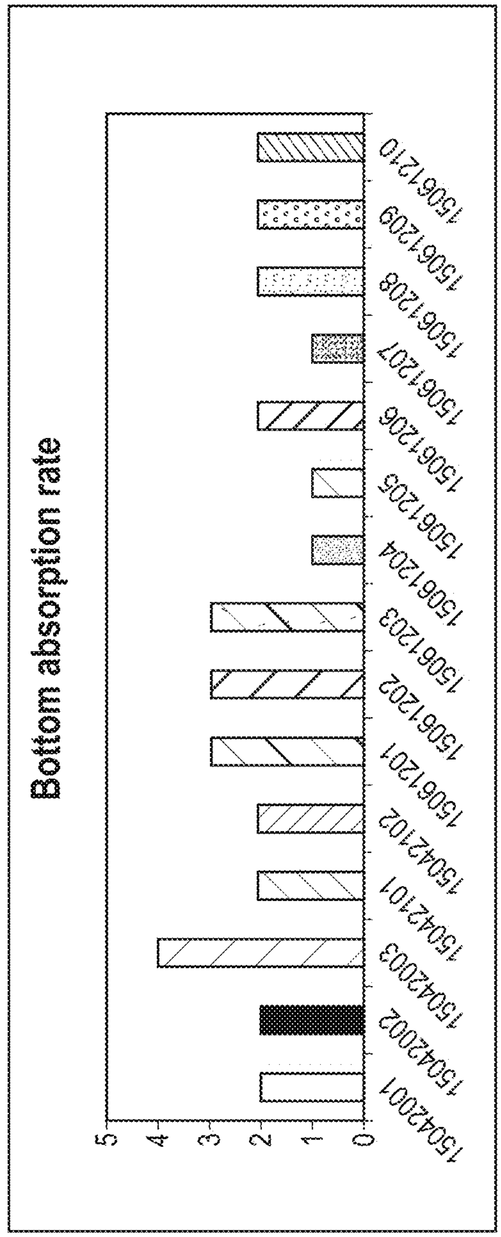
FIG. 63B is a graph illustrating bottom absorption rate.
Figure 64A:
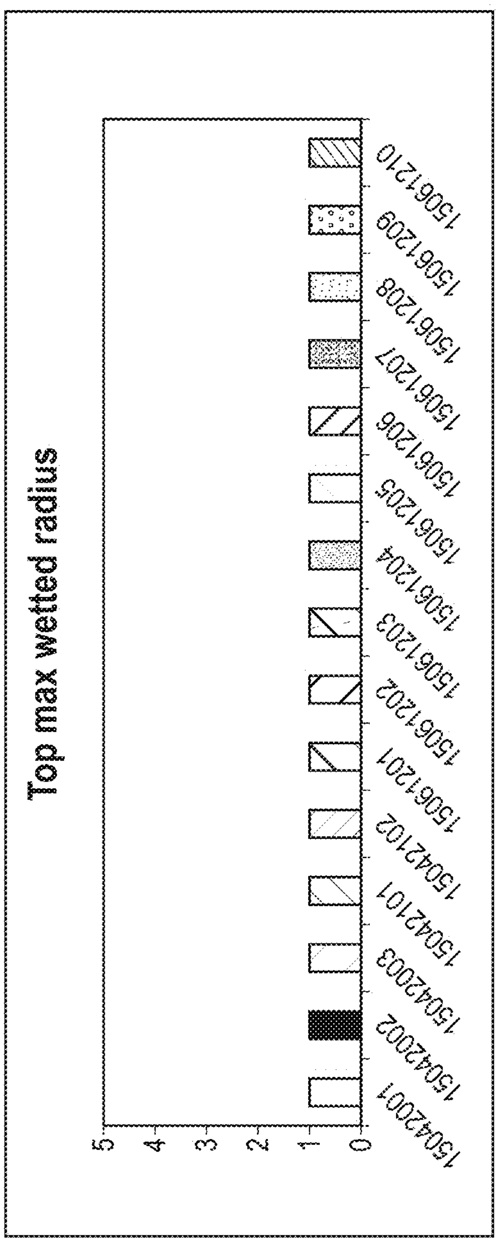
FIG. 64A is a graph illustrating top max wetted radius.
Figure 64B:
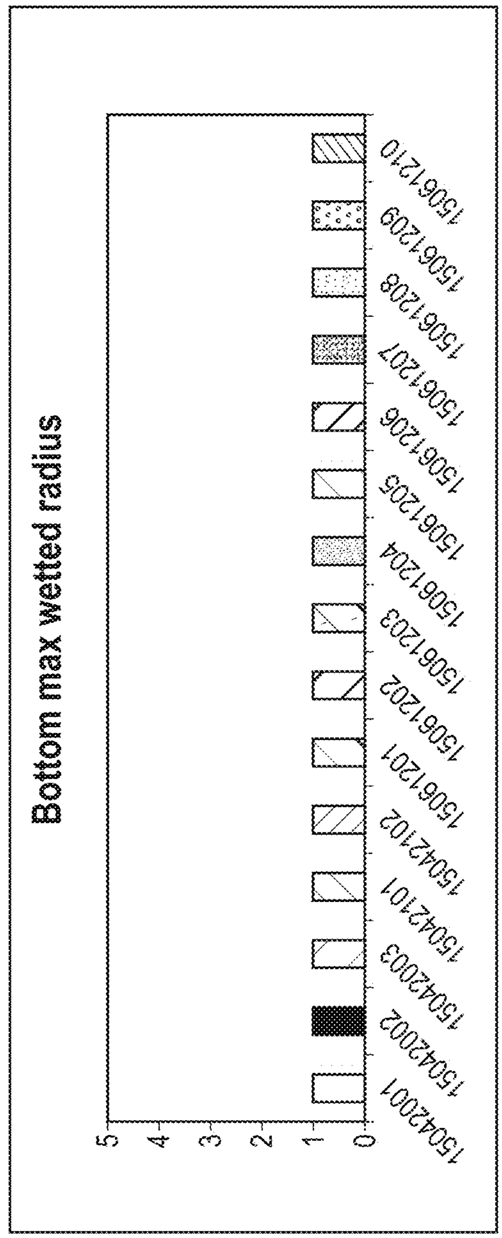
FIG. 64B is a graph illustrating bottom max wetted radius.
Figure 65A:
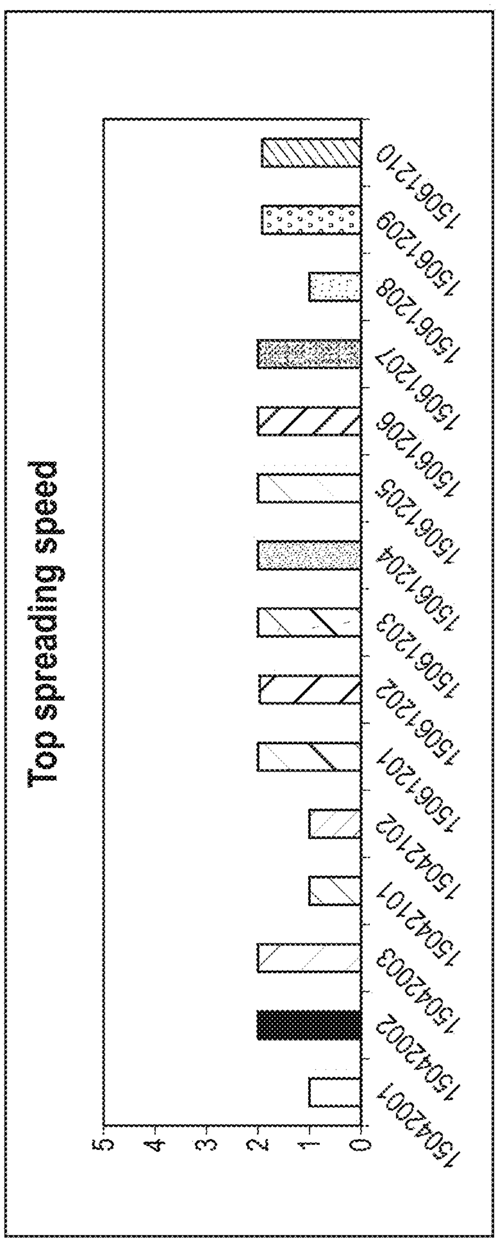
FIG. 65A is a graph illustrating top spreading speed.
Figure 65B:
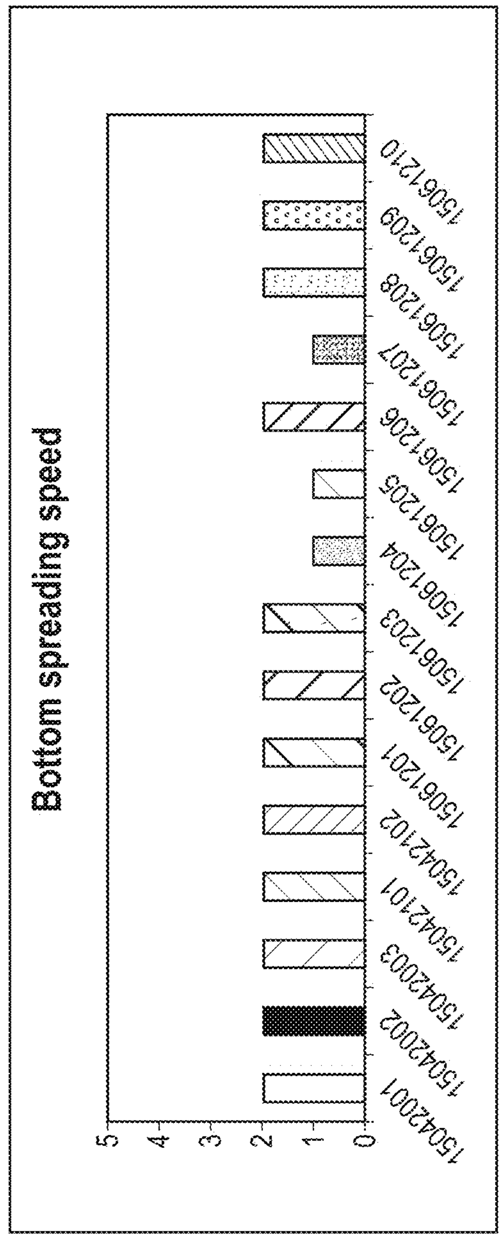
FIG. 65B is a graph illustrating bottom spreading speed.
Figure 66A:
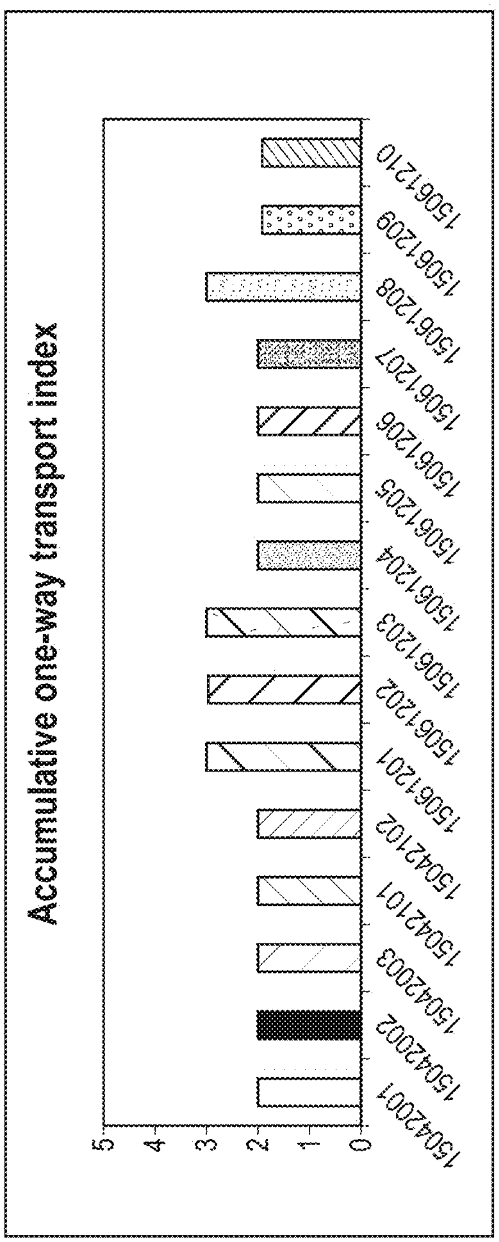
FIG. 66A is a graph illustrating accumulative one-way transport index.
Figure 66B:
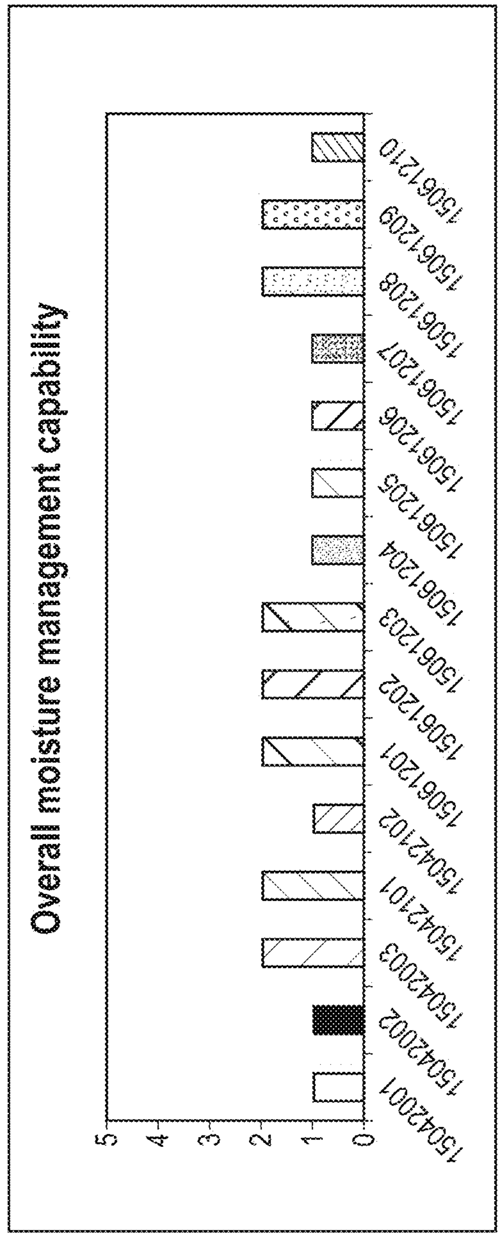
FIG. 66B is a graph illustrating overall moisture management capability.
Figure 67A:
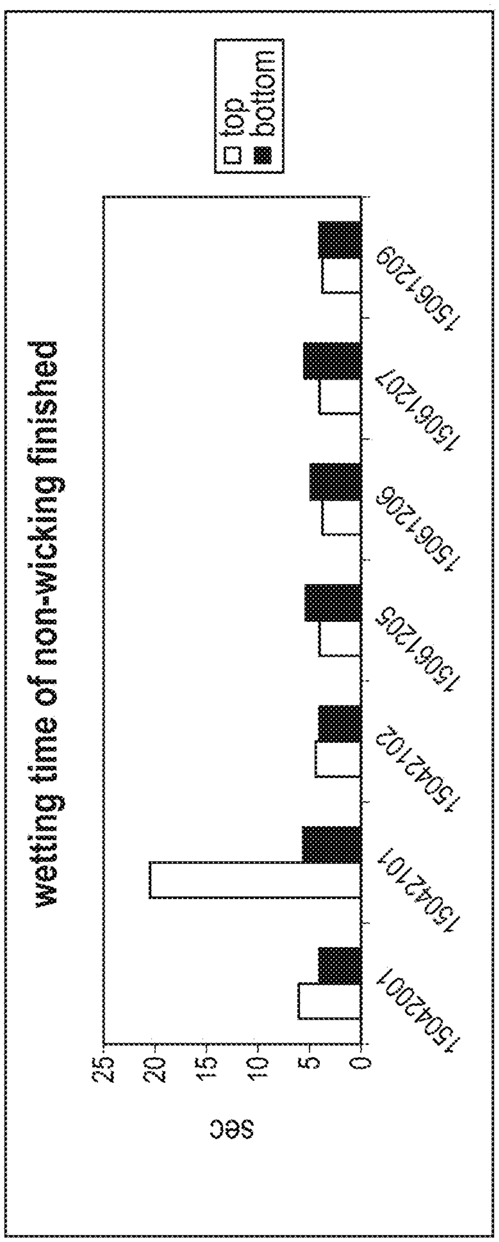
FIG. 67A is a graph illustrating wetting time of non-wicking finished.
Figure 67B:
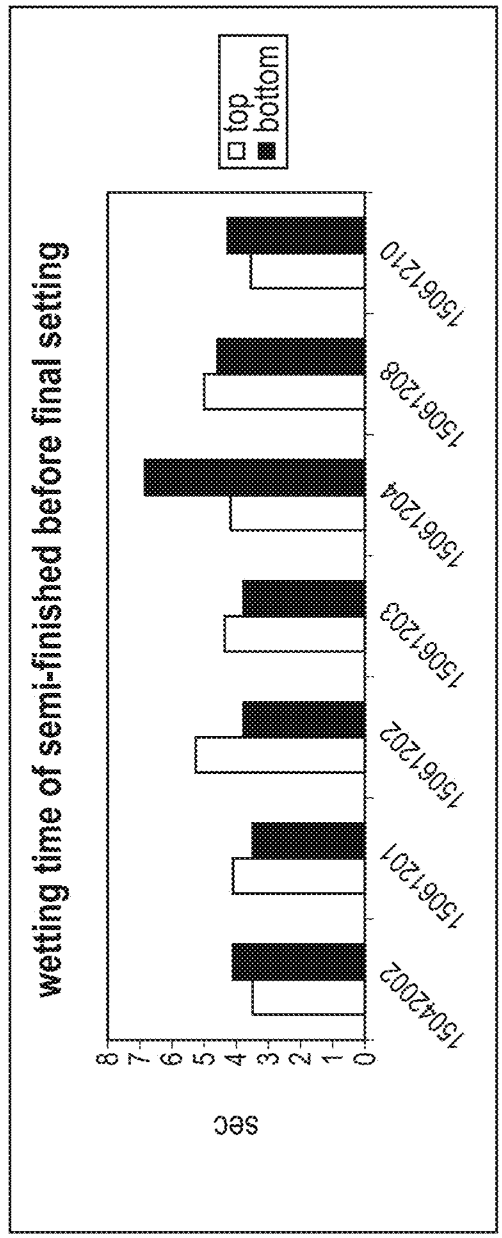
FIG. 67B is a graph illustrating wetting time of semi-finished before final setting.
Figure 68A:
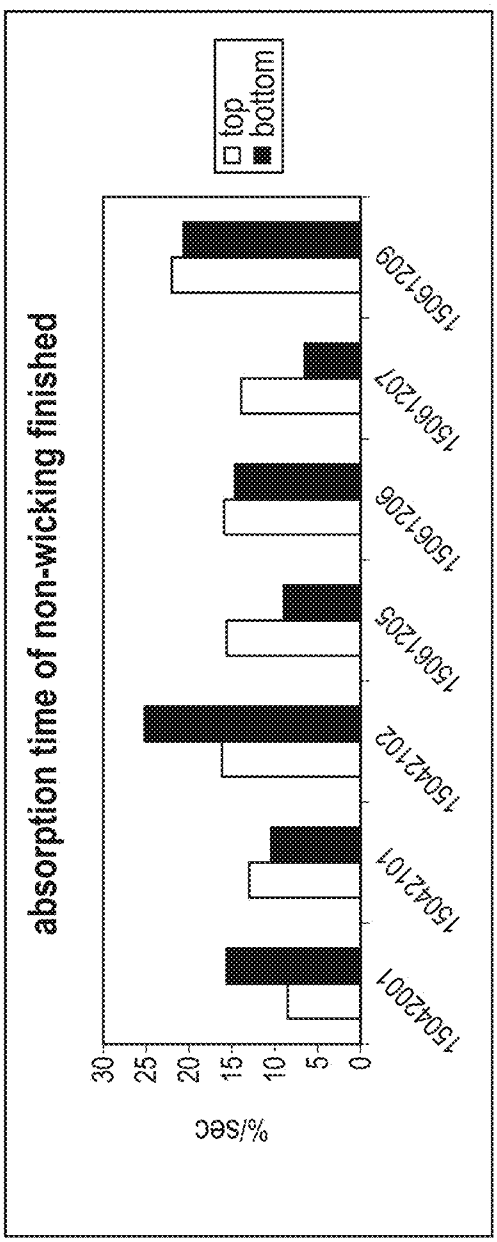
FIG. 68A is a graph illustrating absorption time of non-wicking finished.
Figure 68B:
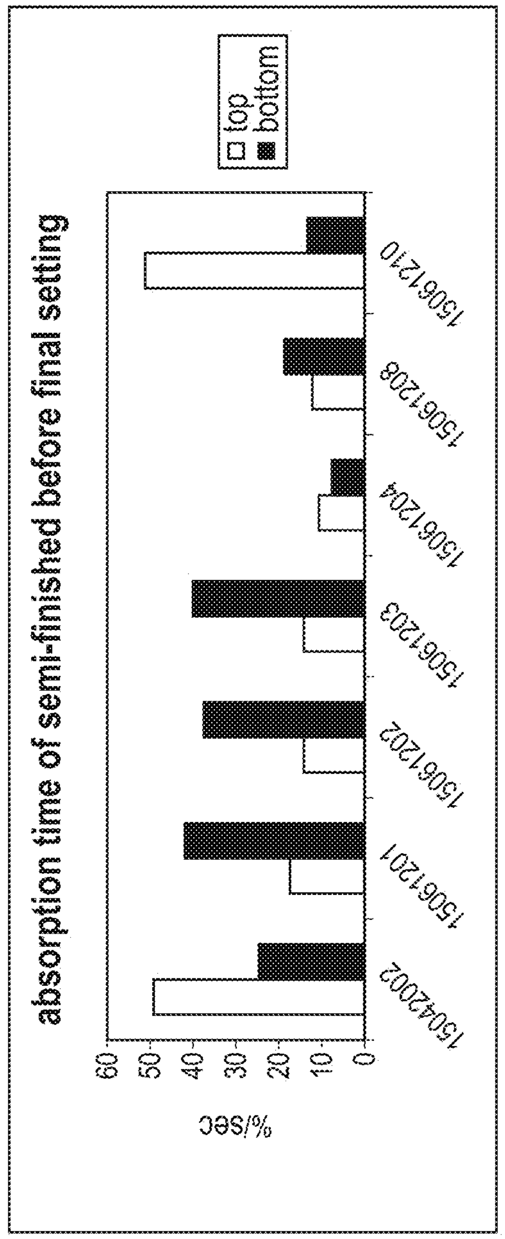
FIG. 68B is a graph illustrating absorption time of semi-finished before final setting.
Figure 69A:
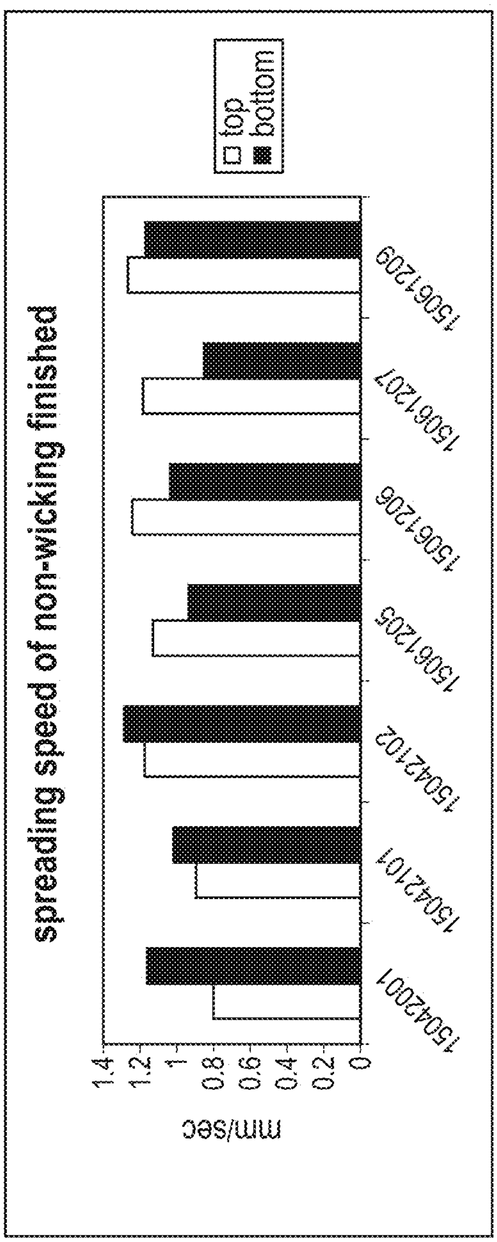
FIG. 69A is a graph illustrating spreading speed of non-wicking finished.
Figure 69B:
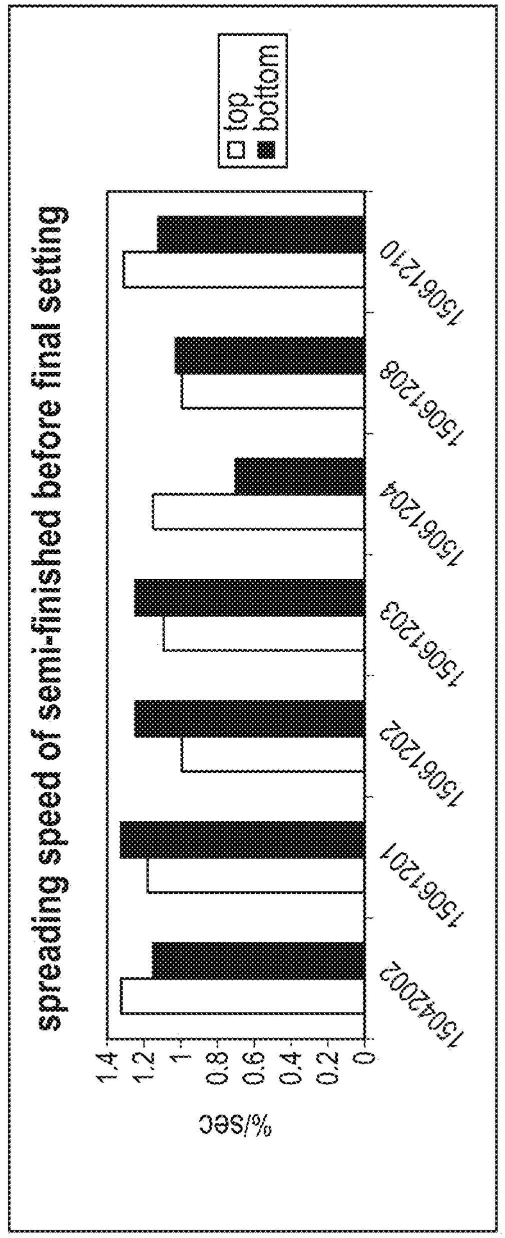
FIG. 69B is a graph illustrating spreading speed of semi-finished before final setting.
Figure 70A:
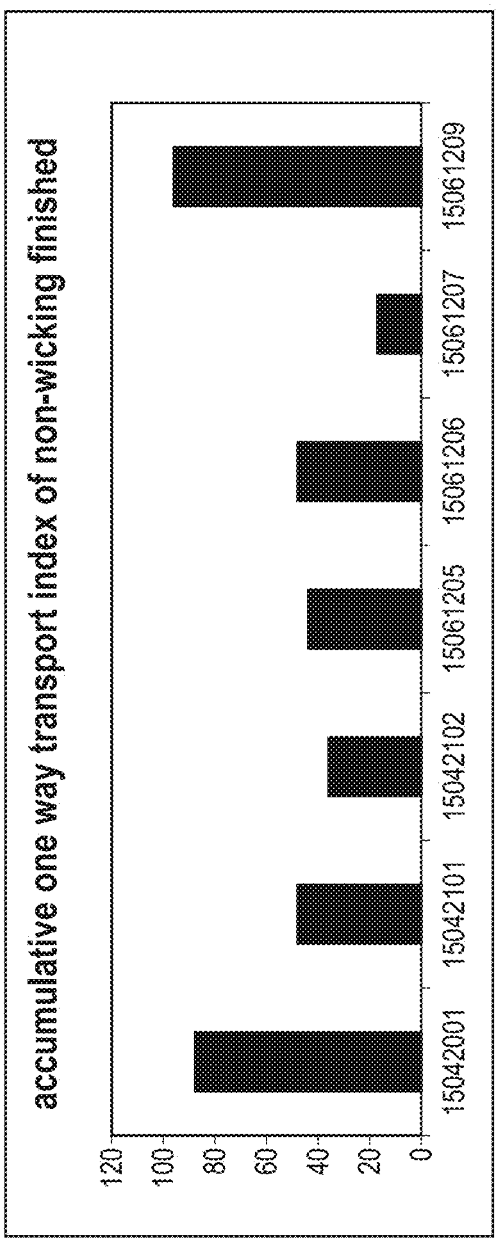
FIG. 70A is a graph illustrating accumulative one way transport index of non-wicking finished.
Figure 70B:
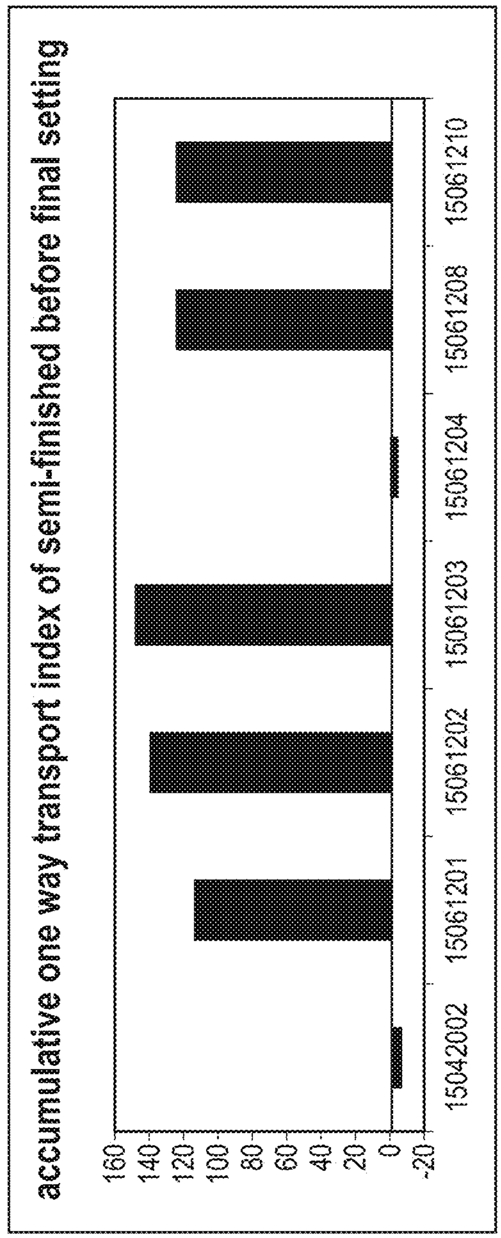
FIG. 70B is a graph illustrating accumulative one way transport index of semi-finished before final setting.
Figure 71A:
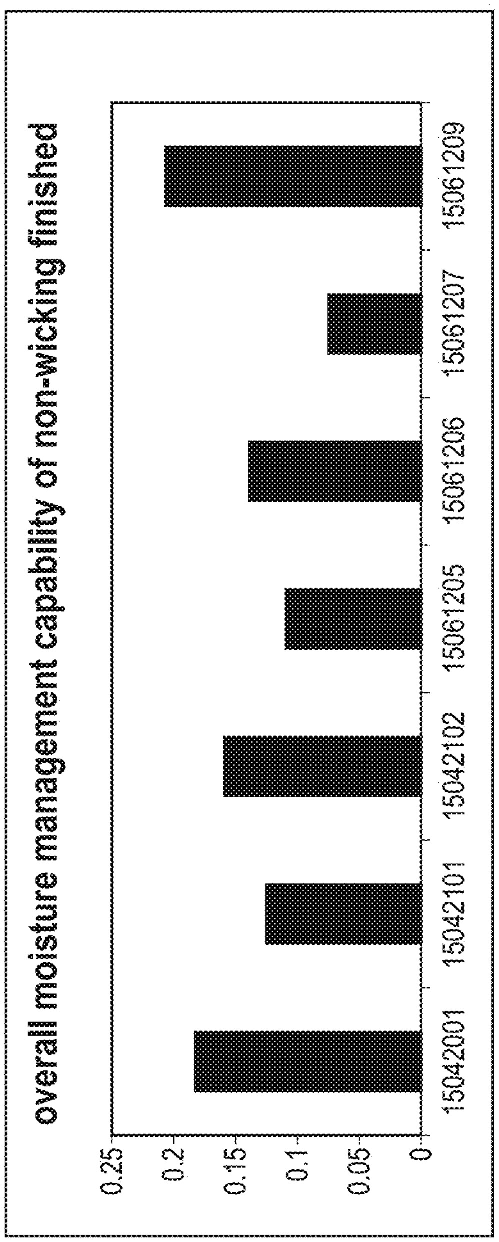
FIG. 71A is a graph illustrating overall moisture management capability of non-wicking finished.
Figure 71B:
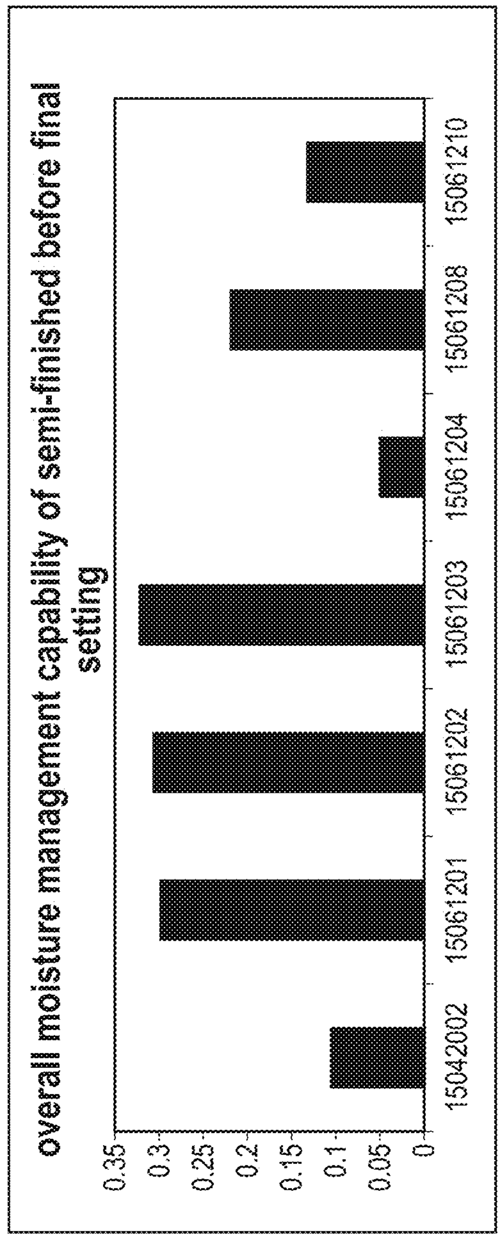
FIG. 71B is a graph illustrating overall moisture management capability of semi-finished before final setting.
Figure 72A:
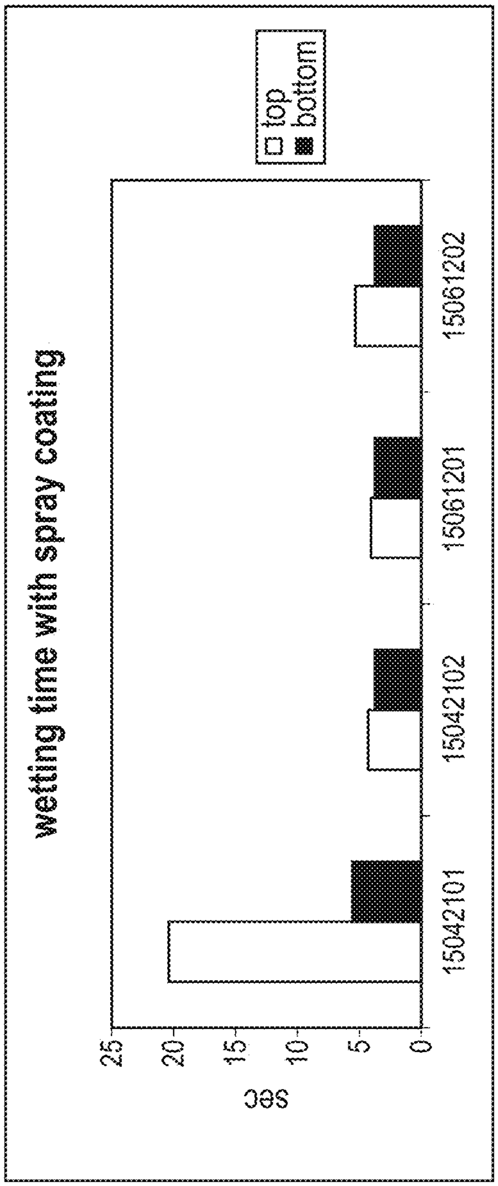
FIG. 72A is a graph illustrating wetting time with spray coating.
Figure 72B:
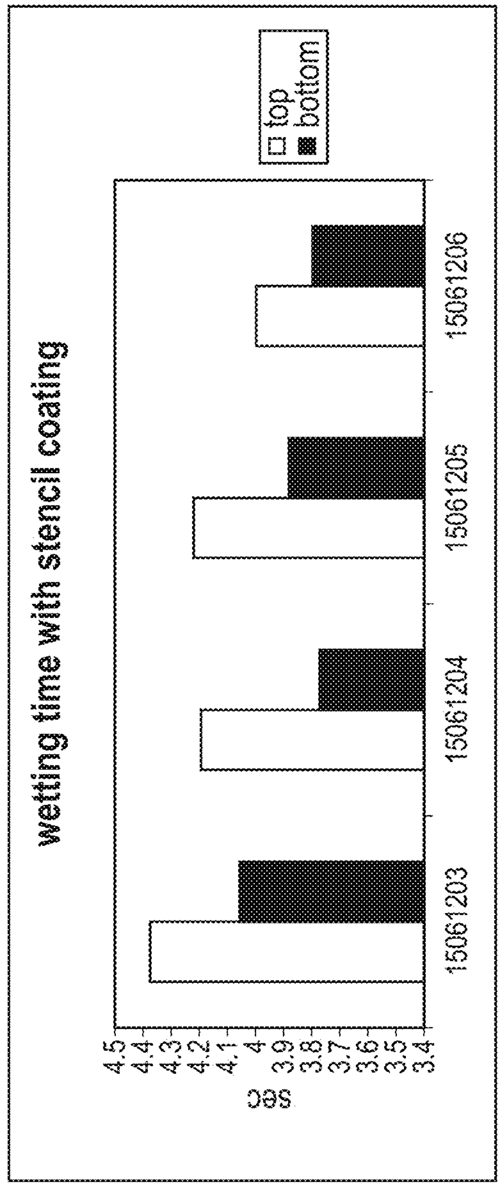
FIG. 72B is a graph illustrating wetting time with stencil coating.
Figure 72C:
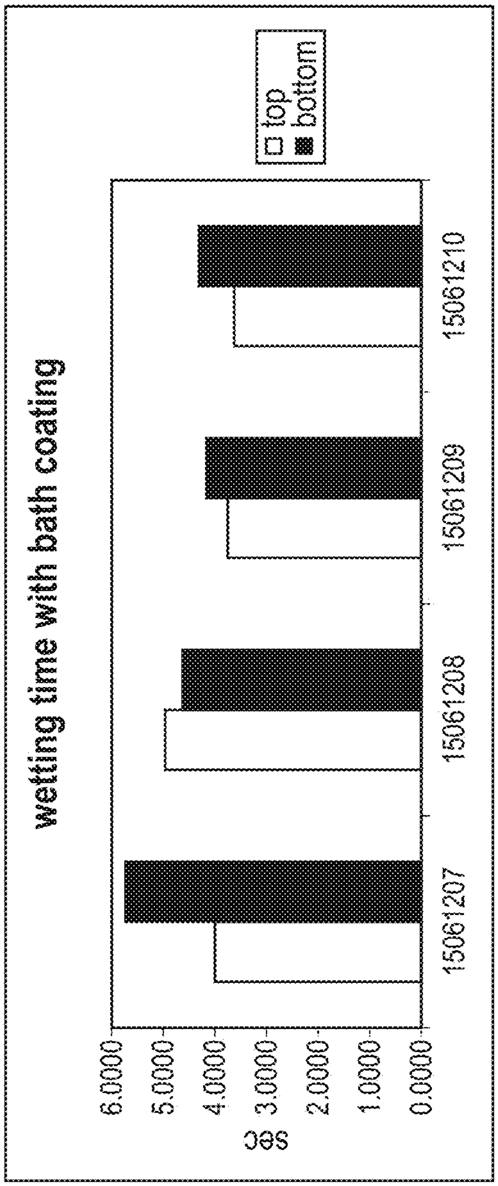
FIG. 72C is a graph illustrating wetting time with bath coating.
Figure 73A:
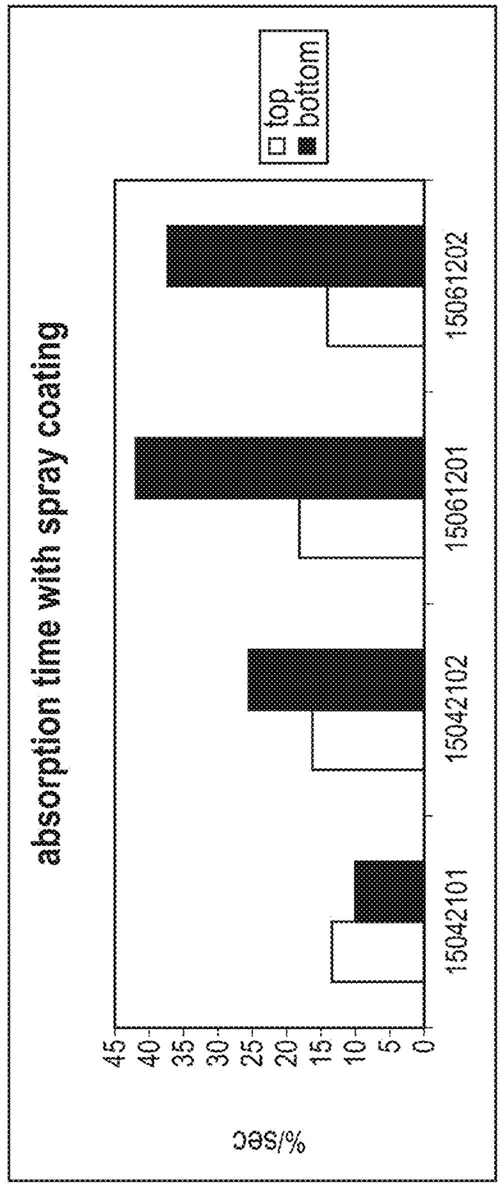
FIG. 73A is a graph illustrating absorption time with spray coating.
Figure 73B:
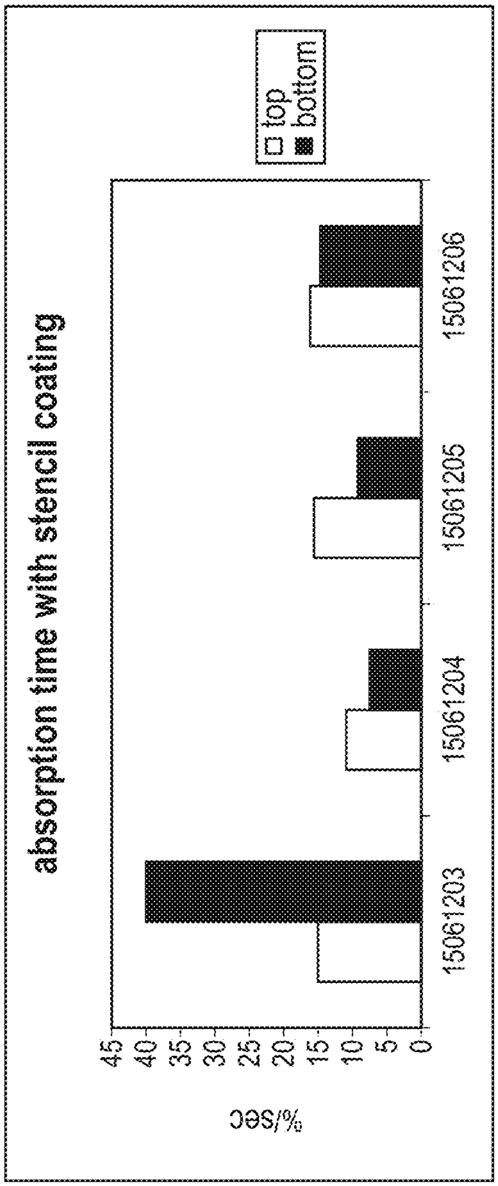
FIG. 73B is a graph illustrating absorption time with stencil coating.
Figure 73C:
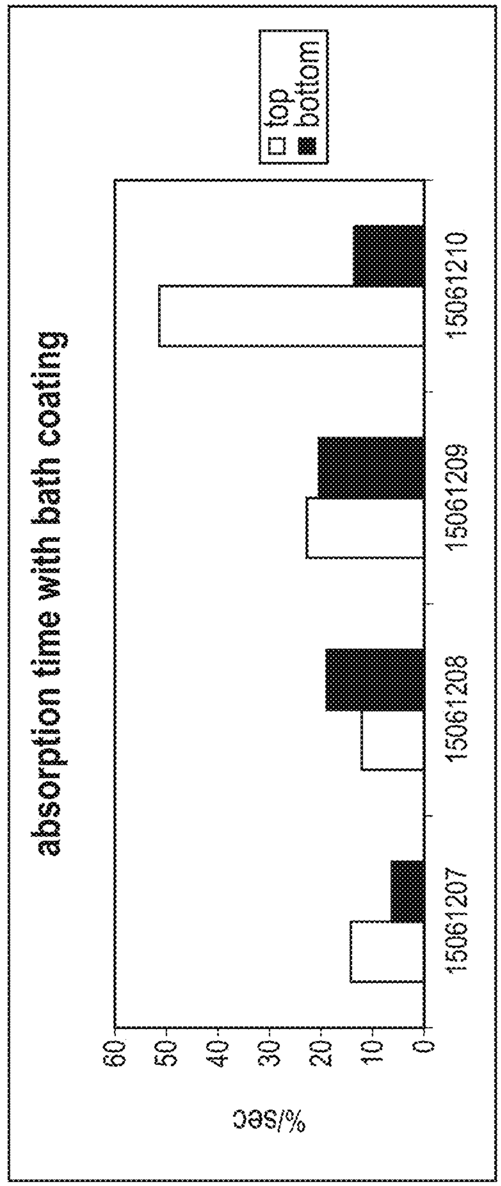
FIG. 73C is a graph illustrating absorption time with bath coating.
Figure 74A:
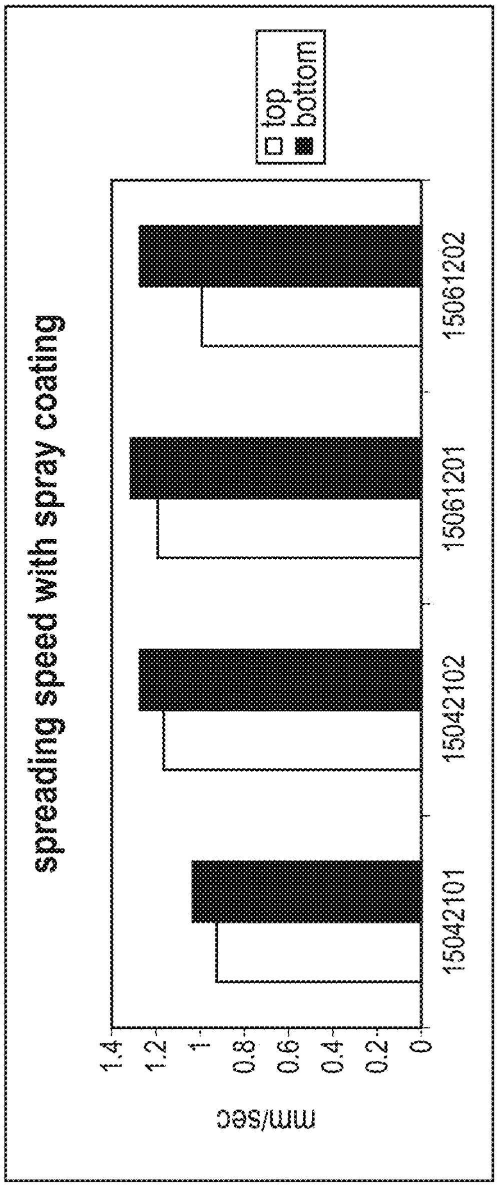
FIG. 74A is a graph illustrating spreading speed with spray coating.
Figure 74B:
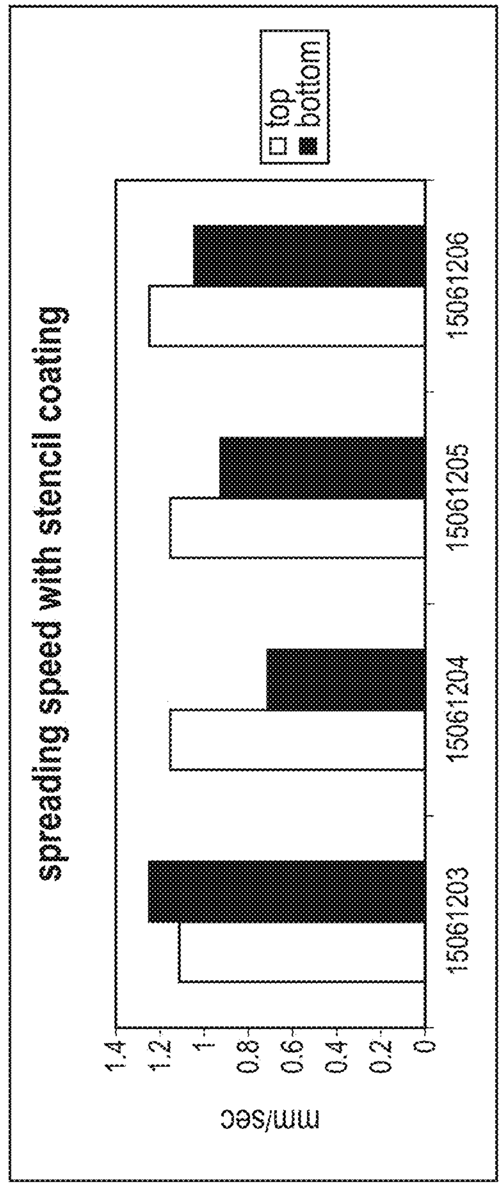
FIG. 74B is a graph illustrating spreading speed with stencil coating.
Figure 74C:
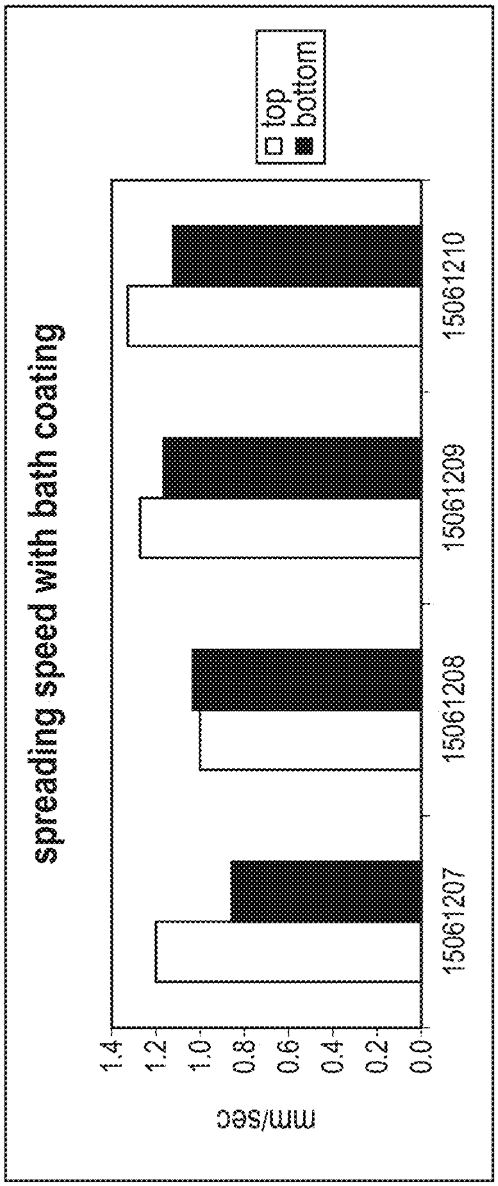
FIG. 74C is a graph illustrating spreading speed with bath coating.
Figure 75A:
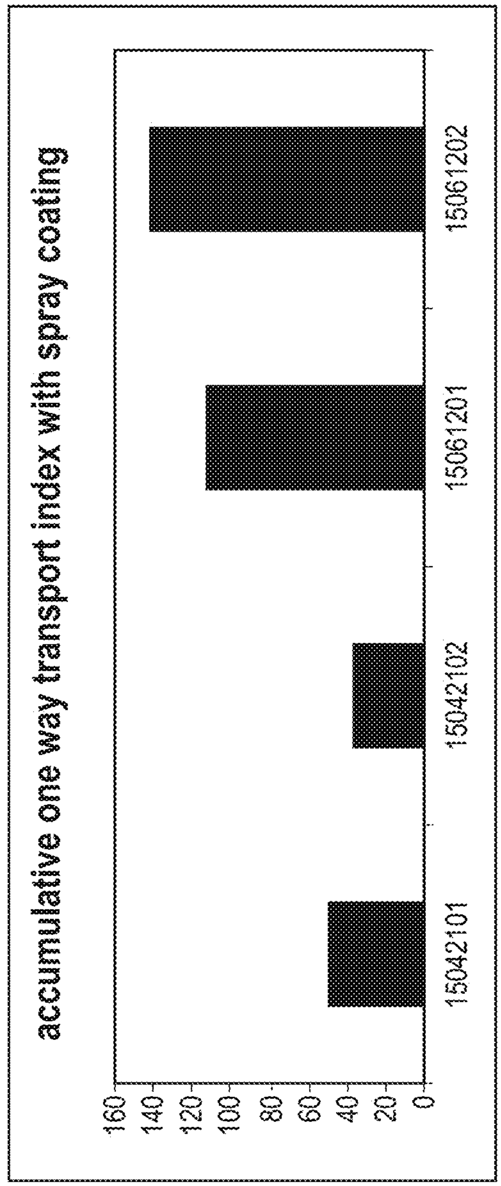
FIG. 75A is a graph illustrating accumulative one way transport index with spray coating.
Figure 75B:
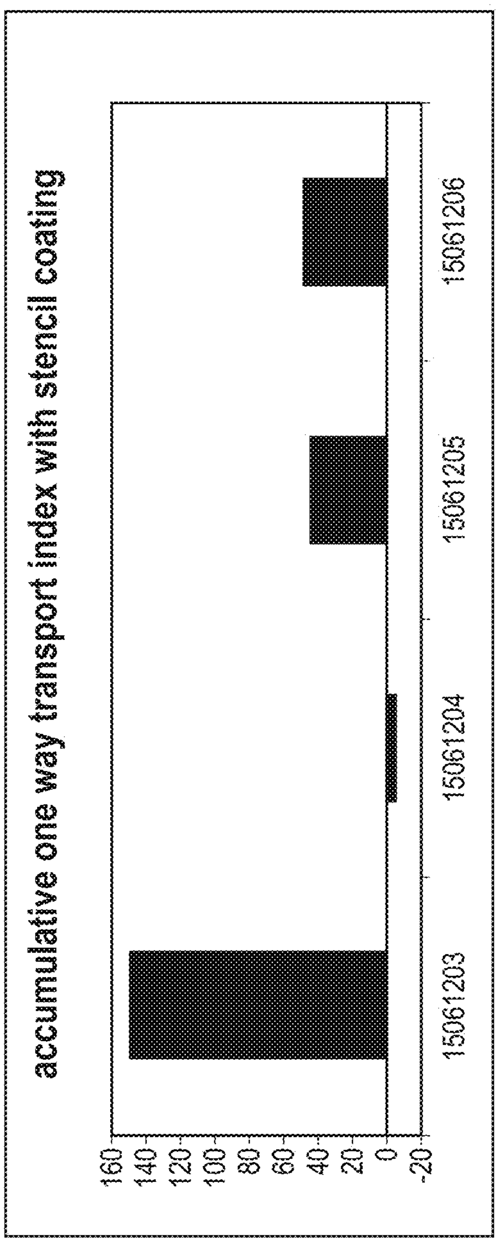
FIG. 75B is a graph illustrating accumulative one way transport index with stencil coating.
Figure 75C:
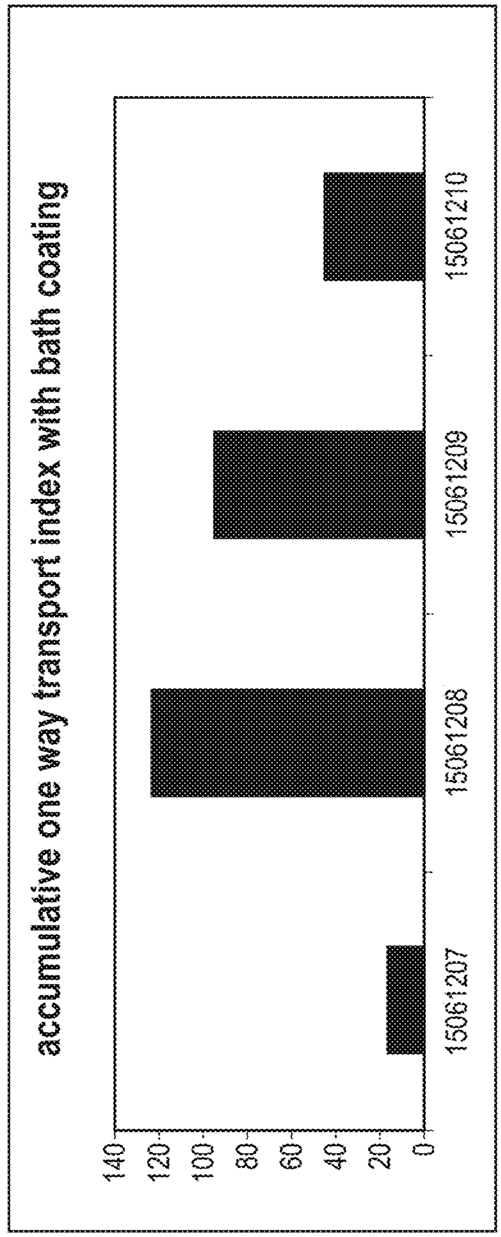
FIG. 75C is a graph illustrating accumulative one way transport index with bath coating.
Figure 76A:
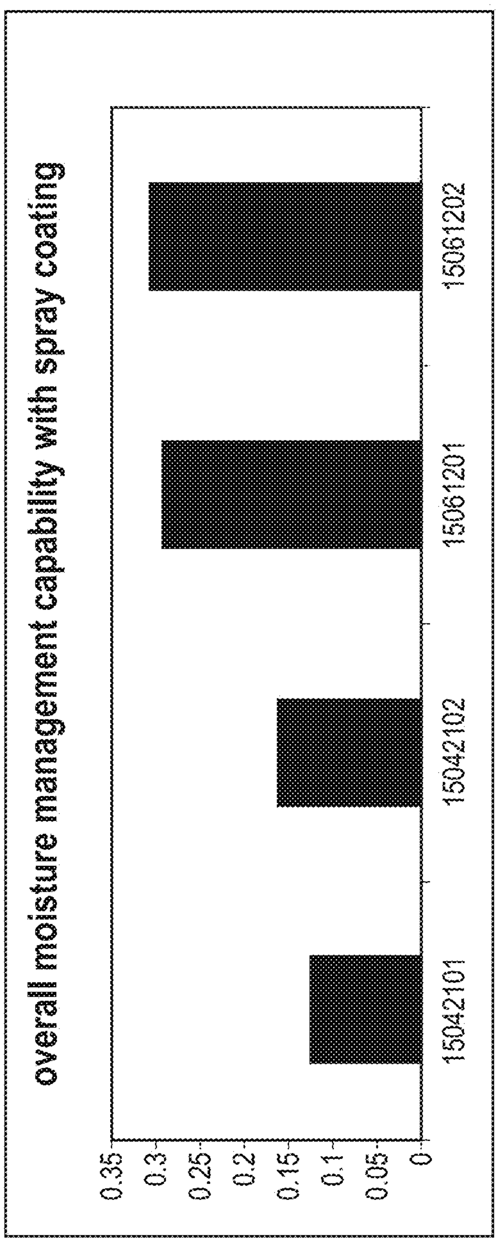
FIG. 76A is a graph illustrating overall moisture management capability with spray coating.
Figure 76B:
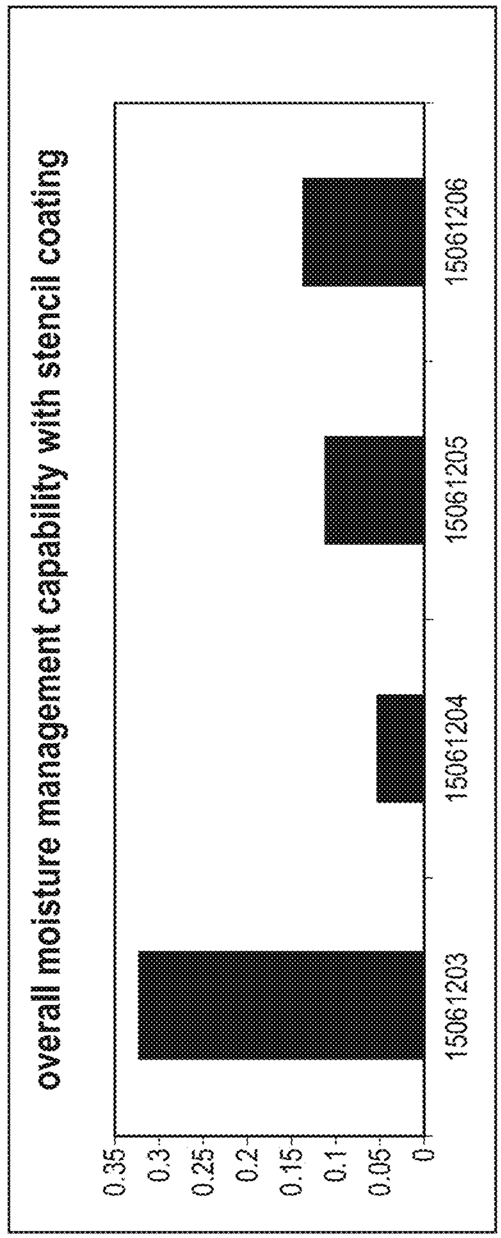
FIG. 76B is a graph illustrating overall moisture management capability with stencil coating.
Figure 76C:
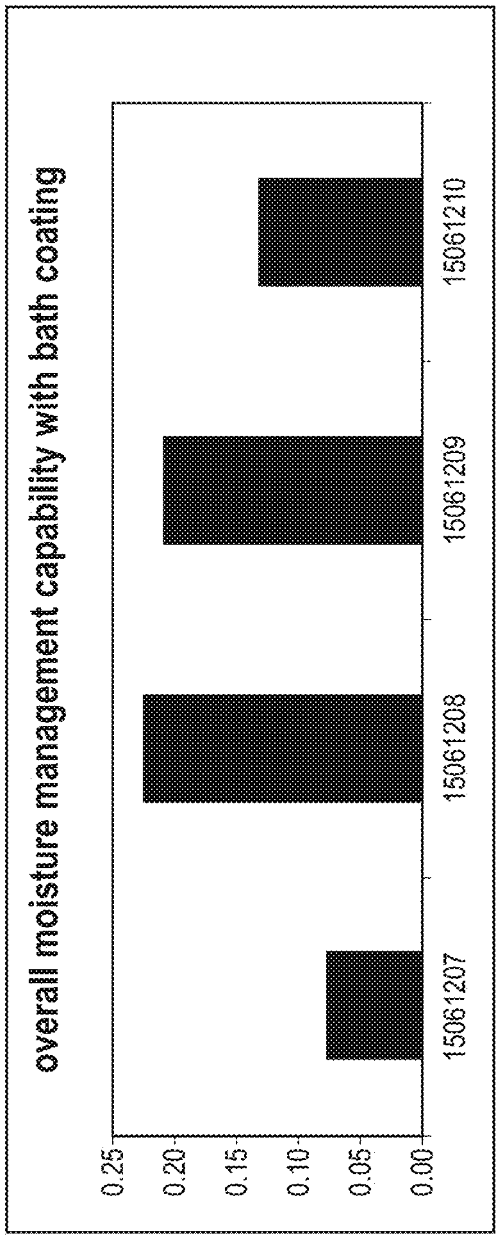
FIG. 76C is a graph illustrating overall moisture management capability with bath coating.
Figure 77A:
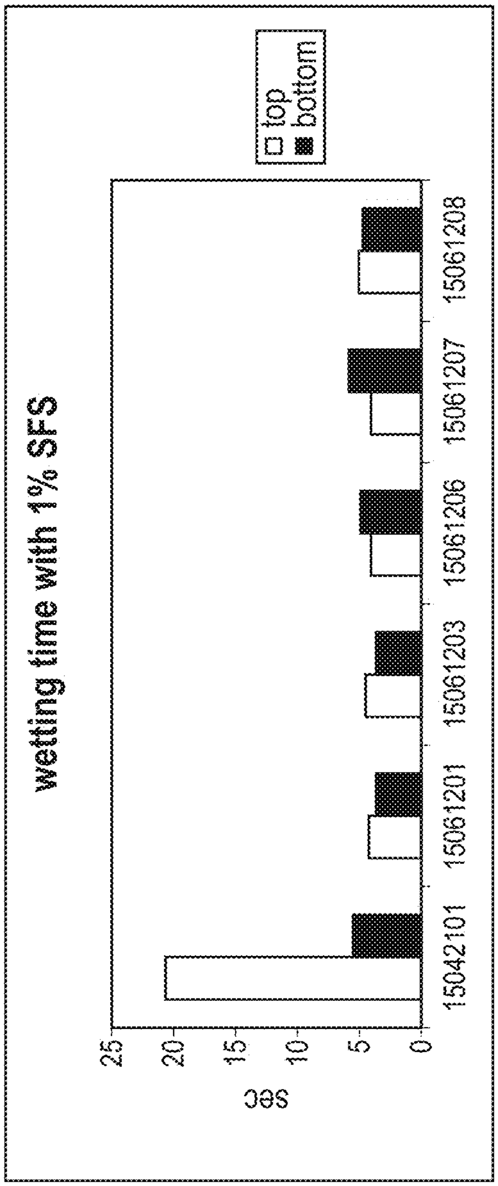
FIG. 77A is a graph illustrating wetting time with 1% SFS.
Figure 77B:
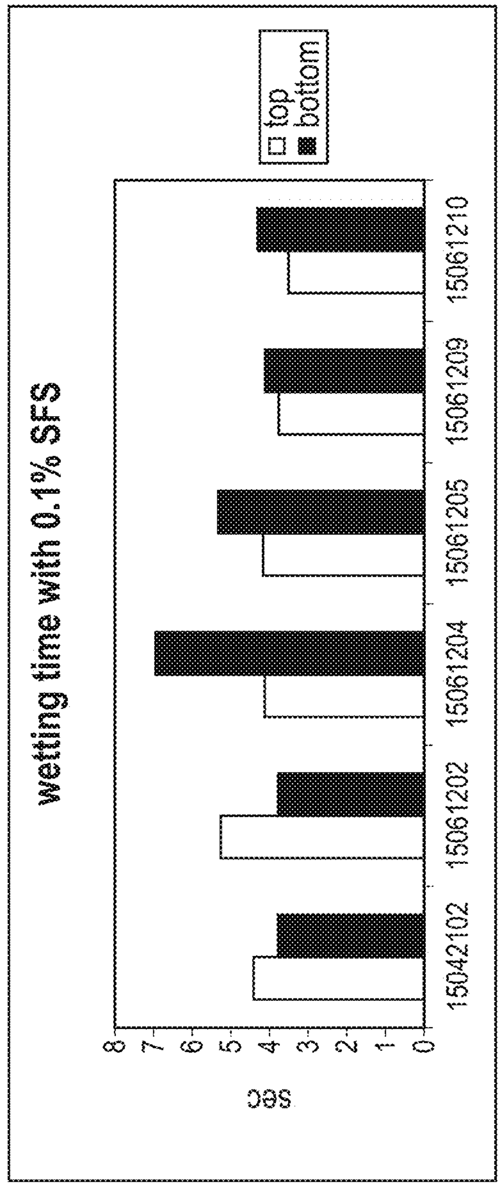
FIG. 77B is a graph illustrating wetting time with 0.1% SFS.
Figure 78A:
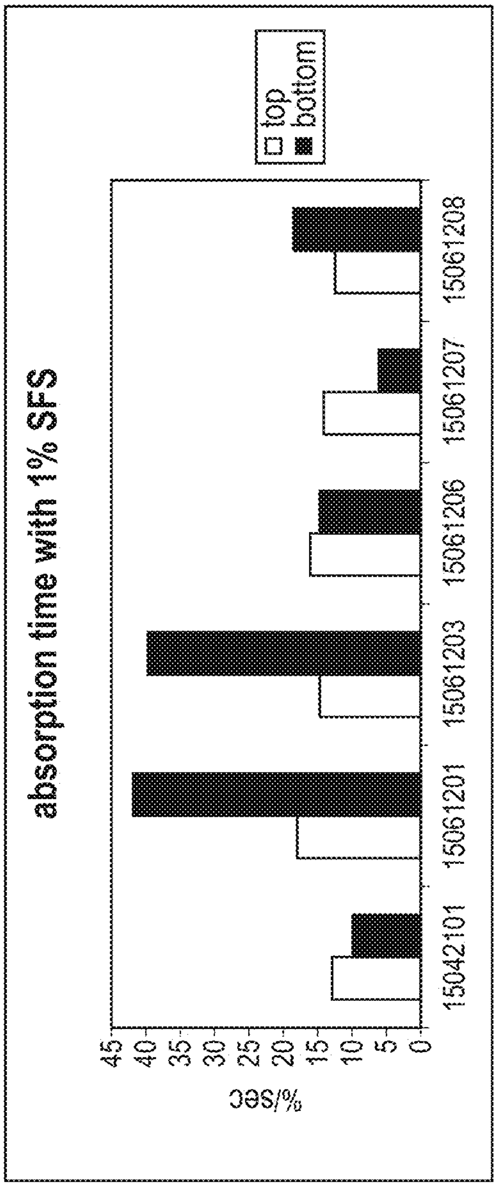
FIG. 78A is a graph illustrating absorption time with 1% SFS.
Figure 78B:
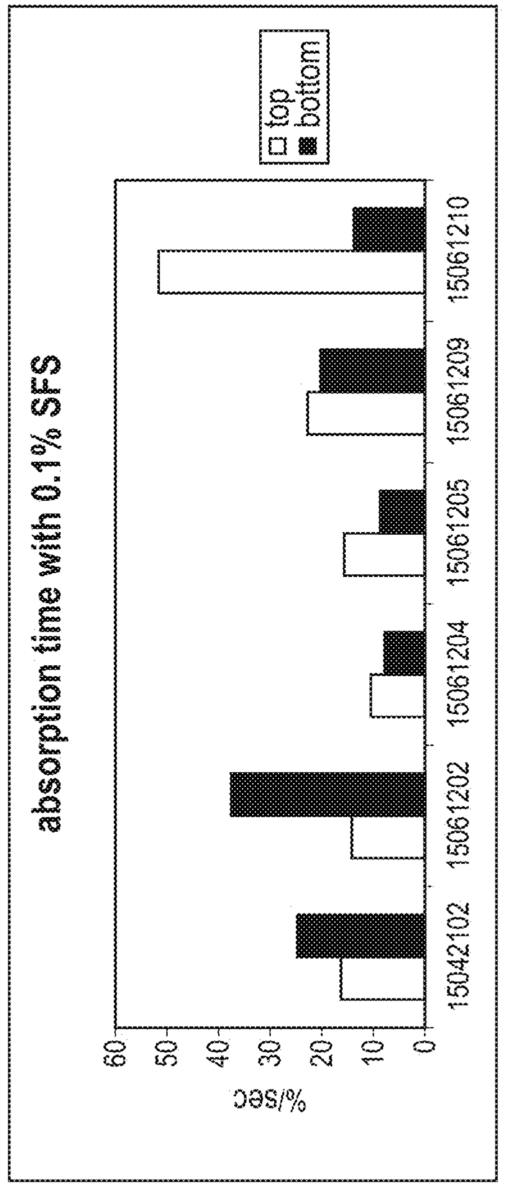
FIG. 78B is a graph illustrating absorption time with 0.1% SFS.
Figure 79A:
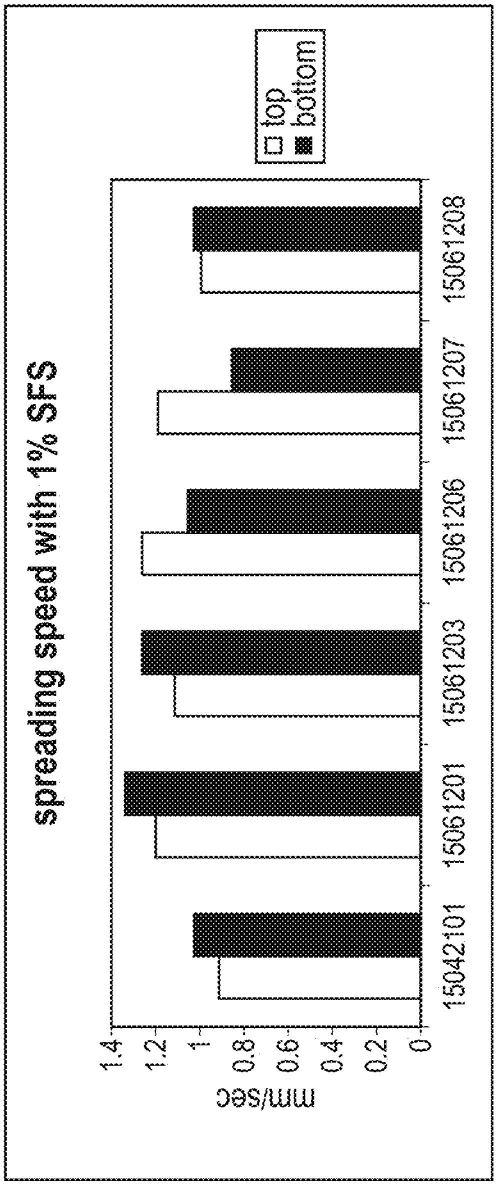
FIG. 79A is a graph illustrating spreading speed with 1% SFS.
Figure 79B:
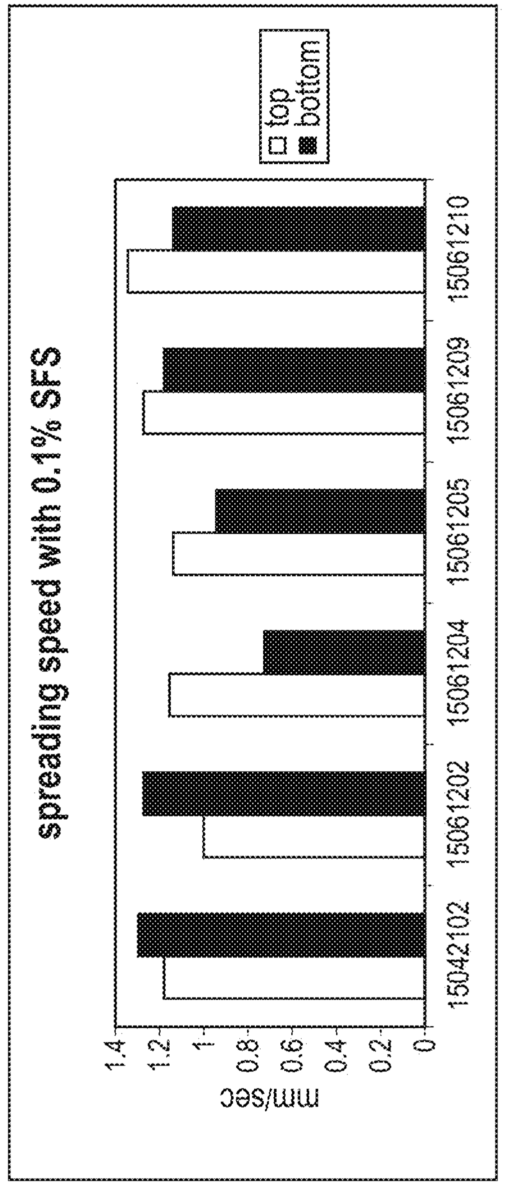
FIG. 79B is a graph illustrating spreading speed with 0.1% SFS.
Figure 80A:
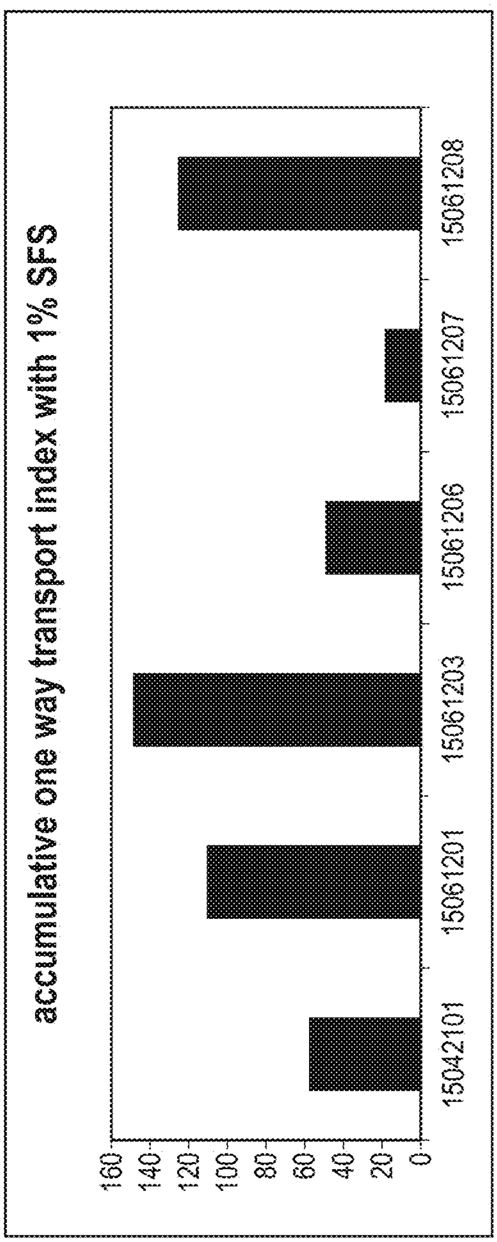
FIG. 80A is a graph illustrating accumulative one way transport index with 1% SFS.
Figure 80B:
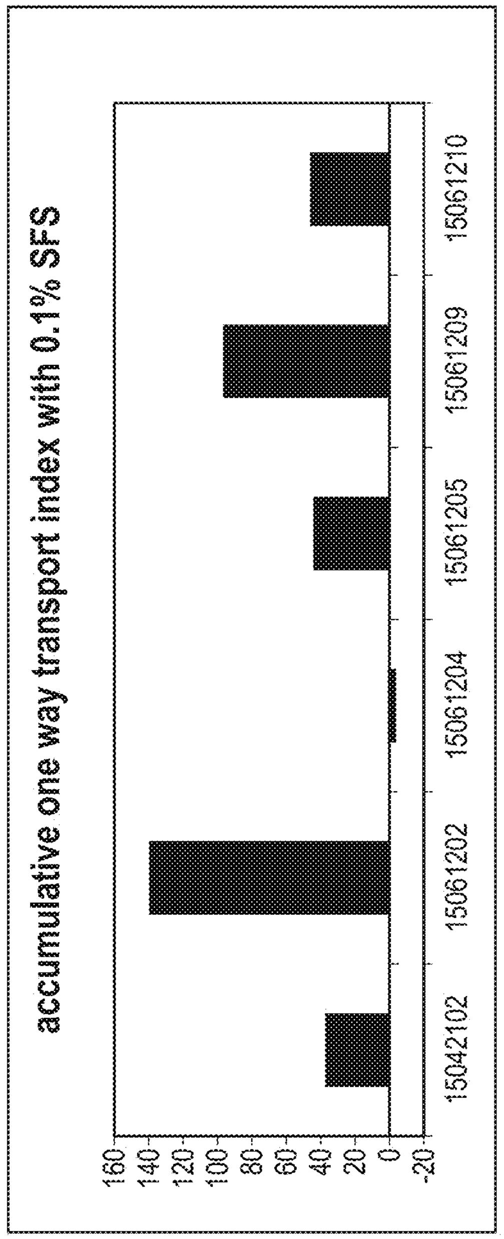
Figure 81A:
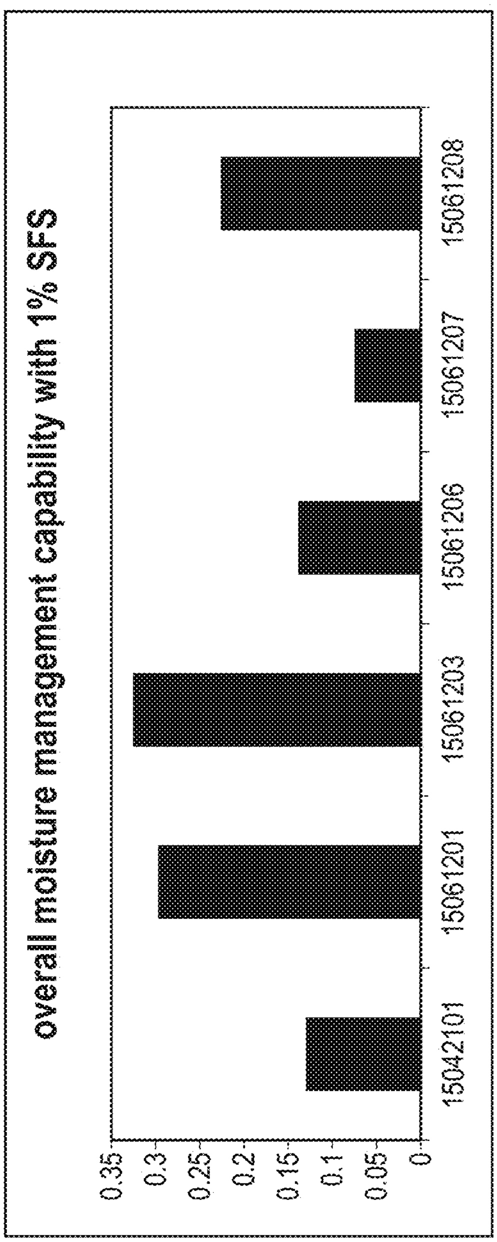
Figure 81B:
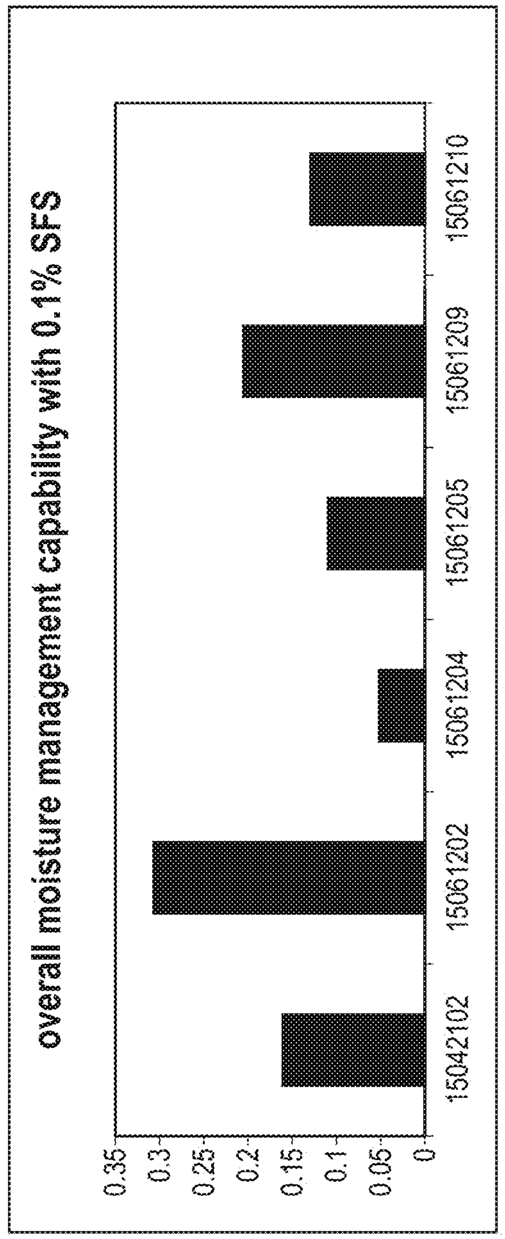
Figure 82A:
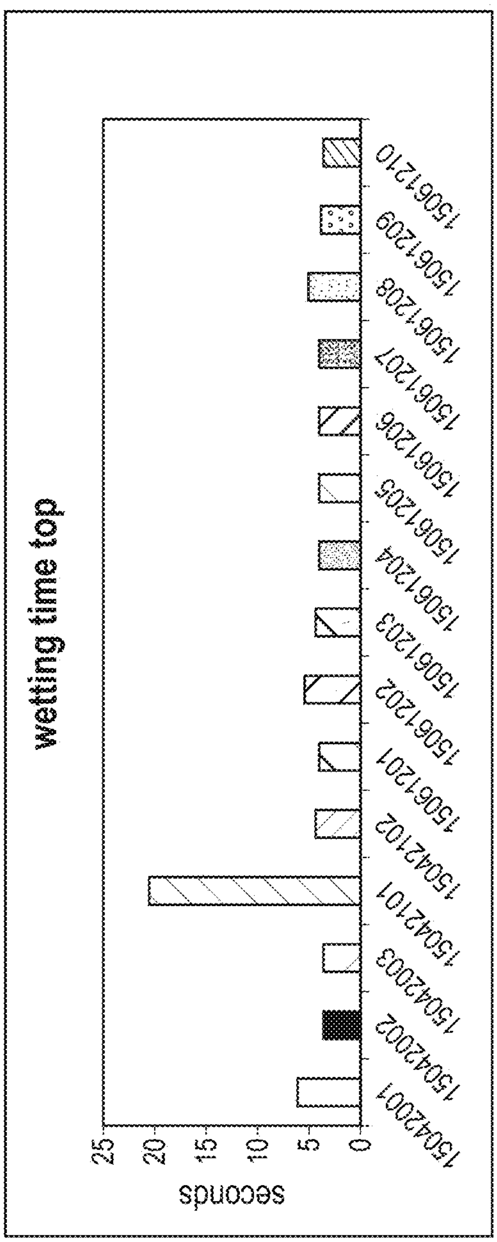
Figure 82B:
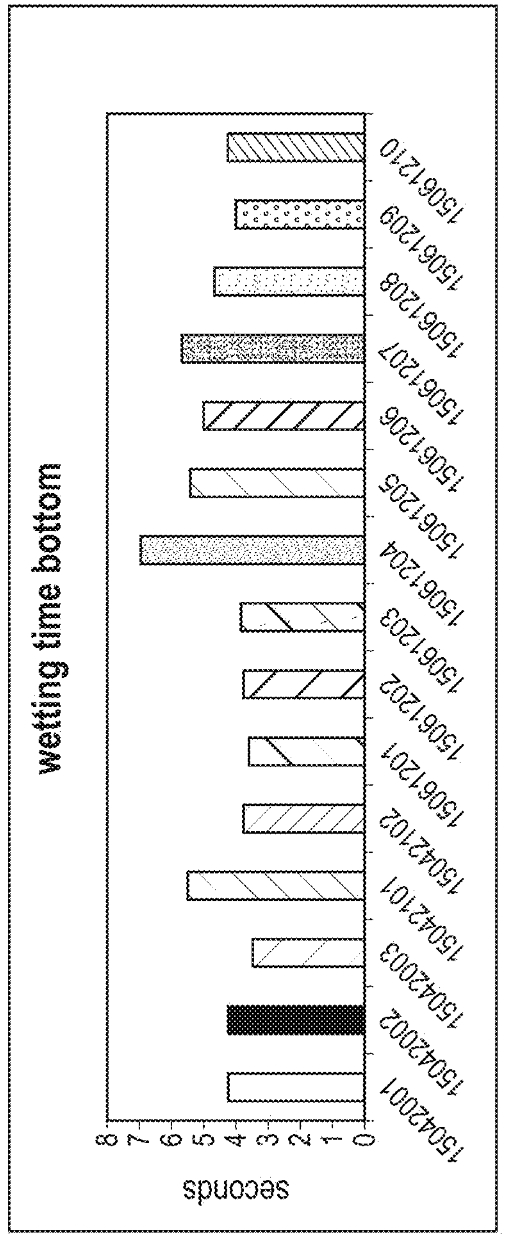
Figure 83A:
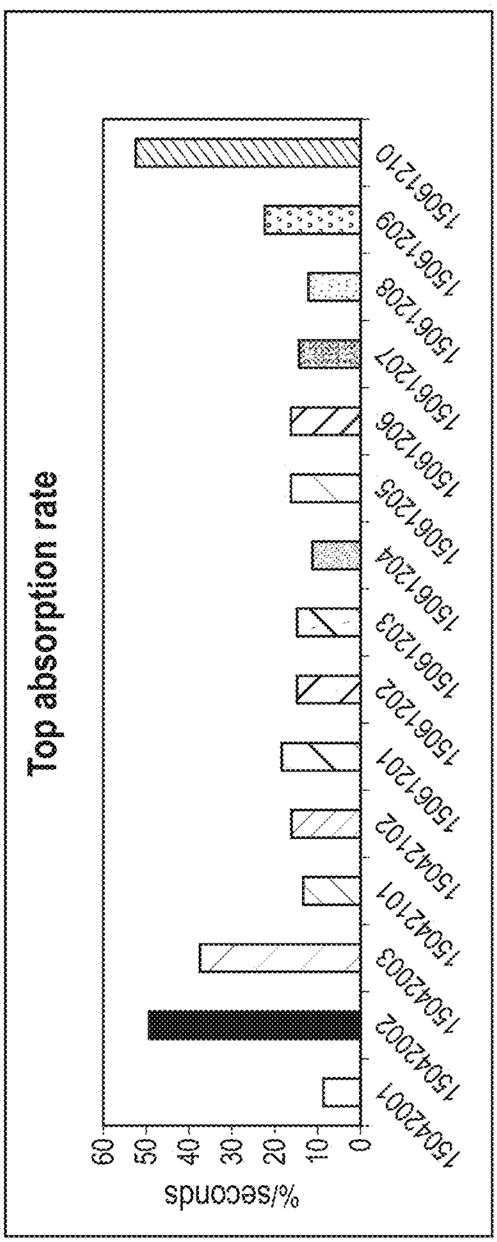
Figure 83B:
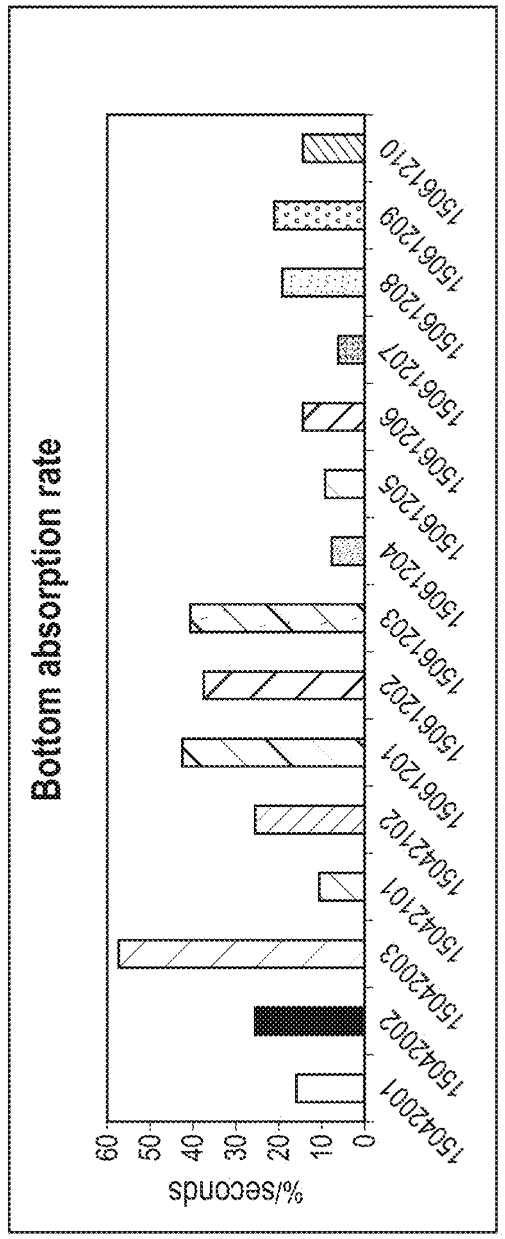
Figure 84A:
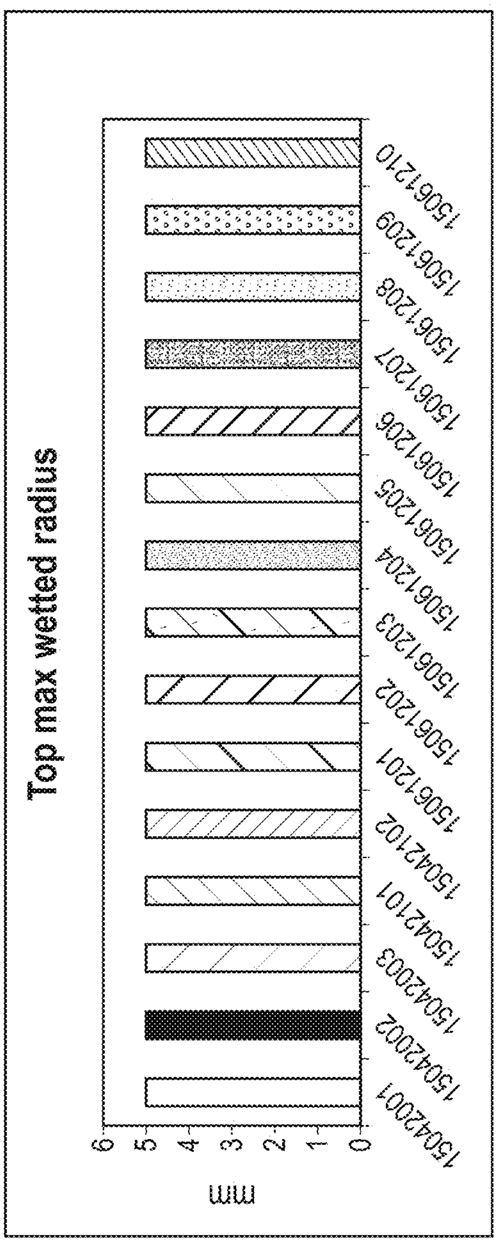
Figure 84B:
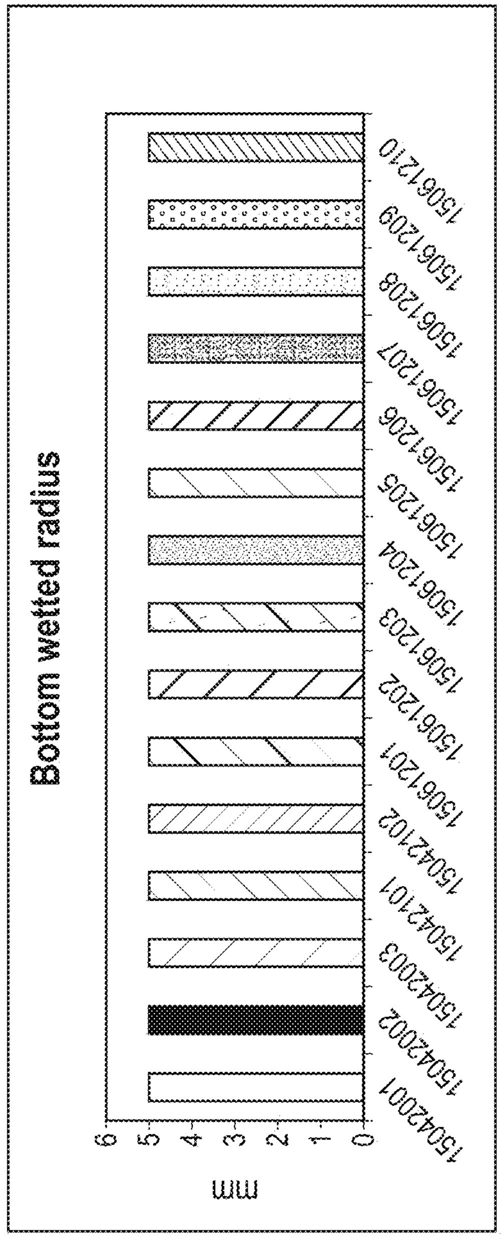
Figure 85A:
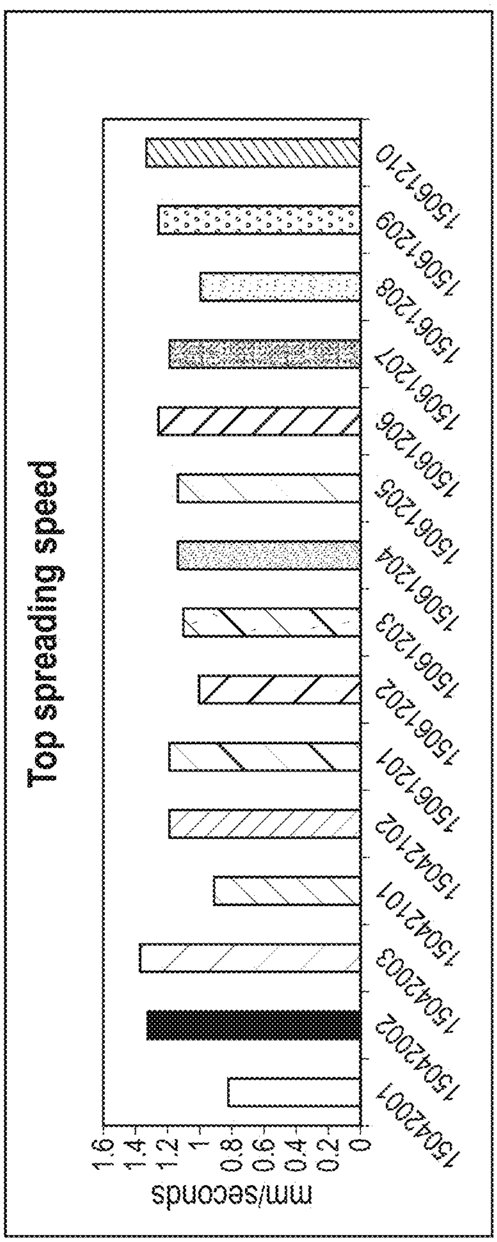
Figure 85B:
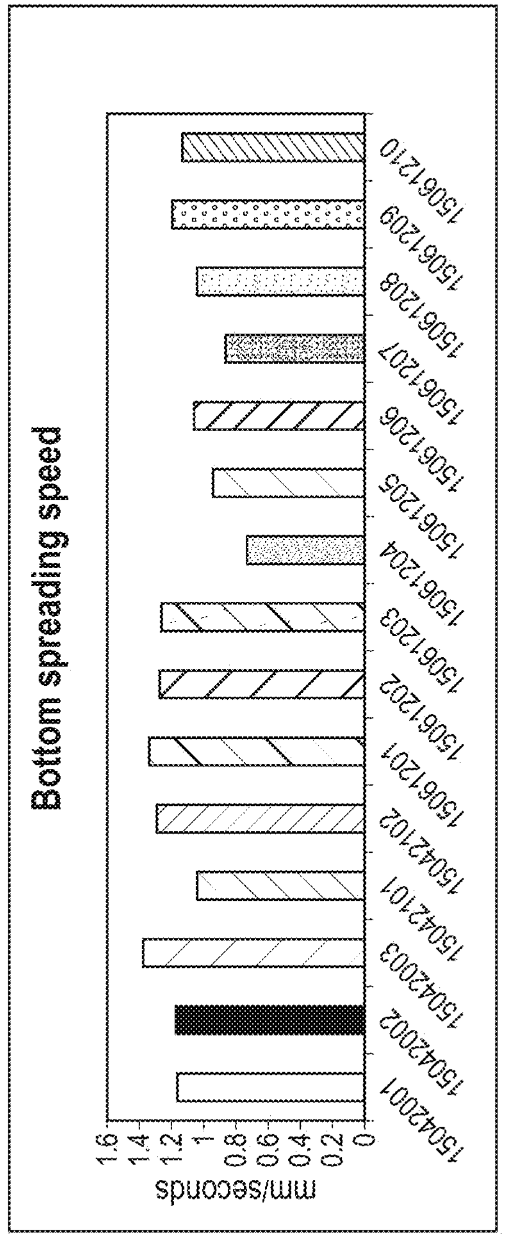

Experiments were carried out to determine the effect of varying the Lithium Bromide (LiBr) temperature when added to silk. FIGS. 48-49 are graphs showing these results, and Tables 10-11 summarize the results. Below is a summary:

No impact on MW or confidence interval (all CI ~10500-6500 Da)

Studies illustrated that the temperature of LiBr-silk dissolution, as LiBr is added and begins dissolving, rapidly drops below the original LiBr temperature due to the majority of the mass being silk at room temp

TABLE 10

The effect of Lithium Bromide (LiBr) temperature on molecular weight of silk processed under the conditions of 60 min. Extraction Time., 100° C. Extraction Temperature and 60° C. Oven Dissolution (Oven/Dissolution Time was varied).

| Sample | LiBr Temp (° C.) | Oven Time | Average Mw | Std dev | Confidence Interval | | PD |
|---|---|---|---|---|---|---|---|
| 60° C. LiBr, 1 hr | 60 | 1 | 31700 | | 11931 | 84223 | 2.66 |
| 100° C. LiBr, 1 hr | 100 | 1 | 27907 | 200 | 10735 | 72552 | 2.60 |
| RT LiBr, 4 hr | RT | 4 | 29217 | 1082 | 10789 | 79119 | 2.71 |
| 60° C. LiBr, 4 hr | 60 | 4 | 25578 | 2445 | 9978 | 65564 | 2.56 |
| 80° C. LiBr, 4 hr | 80 | 4 | 26312 | 637 | 10265 | 67441 | 2.56 |
| 100° C. LiBr, 4 hr | 100 | 4 | 27681 | 1729 | 11279 | 67931 | 2.45 |
| Boil LiBr, 4 hr | Boil | 4 | 30042 | 1535 | 11183 | 80704 | 2.69 |
| RT LiBr, 6 hr | RT | 6 | 26543 | 1893 | 10783 | 65332 | 2.46 |
| 80° C. LiBr, 6 hr | 80 | 6 | 26353 | | 10167 | 68301 | 2.59 |
| 100° C. LiBr, 6 hr | 100 | 6 | 27150 | 916 | 11020 | 66889 | 2.46 |

TABLE 11

The effect of Lithium Bromide (LiBr) temperature on molecular weight of silk processed under the conditions of 30 min. Extraction Time, 100° C. Extraction Temperature and 60° C. Oven Dissolution (Oven/Dissolution Time was varied).

| Sample | LiBr Temp (° C.) | Oven Time | Average Mw | Std dev | Confidence Interval | | PD |
|---|---|---|---|---|---|---|---|
| 60° C. LiBr, 4 hr | 60 | 4 | 61956 | 13336 | 21463 | 178847 | 2.89 |
| 80° C. LiBr, 4 hr | 80 | 4 | 59202 | 14027 | 19073 | 183760 | 3.10 |
| 100° C. LiBr, 4 hr | 100 | 4 | 47853 | | 19757 | 115899 | 2.42 |
| 80° C. LiBr, 6 hr | 80 | 6 | 46824 | | 18075 | 121292 | 2.59 |
| 100° C. LiBr, 6 hr | 100 | 6 | 55421 | 8991 | 19152 | 160366 | 2.89 |

Experiments were carried out to determine the effect of varying the oven/dissolution temperature. FIGS. 50-54 are graphs showing these results, and Tables 12-16 summarize the results. Below is a summary:

- Oven temperature has less of an effect on 60 min extracted silk than 30 min extracted silk. Without wishing to be bound by theory, it is believed that the 30 min silk is less degraded during extraction and therefore the oven temperature has more of an effect on the larger MW, less degraded portion of the silk.
- For 60° C. vs. 140° C. oven the 30 min extracted silk showed a very significant effect of lower MW at higher oven temp, while 60 min extracted silk had an effect but much less
- The 140° C. oven resulted in a low end in the confidence interval at ~6000 Da

TABLE 12

The effect of oven/dissolution temperature on molecular weight of silk processed under the conditions of 100° C. Extraction Temperature, 30 min. Extraction Time, and 100° C. Lithium Bromide (LiBr) (Oven/Dissolution Time was varied)

| Boil Time | Oven Temp (° C.) | Oven Time | Average Mw | Std dev | Confidence Interval | | PD |
|---|---|---|---|---|---|---|---|
| 30 | 60 | 4 | 47853 | | 19758 | 115900 | 2.42 |
| 30 | 100 | 4 | 40973 | 2632 | 14268 | 117658 | 2.87 |
| 30 | 60 | 6 | 55421 | 8992 | 19153 | 160366 | 2.89 |
| 30 | 100 | 6 | 25604 | 1405 | 10252 | 63943 | 2.50 |

TABLE 13

The effect of oven/dissolution temperature on molecular weight of silk processed under the conditions of 100° C. Extraction Temperature, 60 min. Extraction Time, and 100° C. Lithium Bromide (LiBr) (Oven/Dissolution Time was varied).

| Boil Time | Oven Temp (° C.) | Oven Time | Average Mw | Std dev | Confidence Interval | | PD |
|---|---|---|---|---|---|---|---|
| 60 | 60 | 1 | 27908 | 200 | 10735 | 72552 | 2.60 |
| 60 | 100 | 1 | 31520 | 1387 | 11633 | 85407 | 2.71 |
| 60 | 60 | 4 | 27681 | 1730 | 11279 | 72552 | 2.62 |
| 60 | 100 | 4 | 25082 | 1248 | 10520 | 59803 | 2.38 |
| 60 | 60 | 6 | 27150 | 916 | 11020 | 66889 | 2.46 |
| 60 | 100 | 6 | 20980 | 1262 | 10073 | 43695 | 2.08 |

TABLE 14

The effect of oven/dissolution temperature on molecular weight of silk processed under the conditions of 100° C. Extraction Temperature, 60 min. Extraction Time, and 140° C. Lithium Bromide (LiBr) (Oven/Dissolution Time was varied).

| Boil Time | Oven Temp (° C.) | Oven Time | Average Mw | Std dev | Confidence Interval | | PD |
|---|---|---|---|---|---|---|---|
| 60 | 60 | 4 | 30042 | 1536 | 11183 | 80705 | 2.69 |
| 60 | 140 | 4 | 15548 | | 7255 | 33322 | 2.14 |

TABLE 15

The effect of oven/dissolution temperature on molecular weight of silk processed under the conditions of 100° C. Extraction Temperature, 30 min. Extraction Time, and 140° C. Lithium Bromide (LiBr) (Oven/Dissolution Time was varied).

| Boil Time | Oven Temp (° C.) | Oven Time | Average Mw | Std dev | Confidence Interval | | PD |
|---|---|---|---|---|---|---|---|
| 30 | 60 | 4 | 49656 | 4580 | 17306 | 142478 | 2.87 |
| 30 | 140 | 4 | 9025 | 1102 | 4493 | 18127 | 2.01 |
| 30 | 60 | 6 | 59383 | 11640 | 17641 | 199889 | 3.37 |
| 30 | 140 | 6 | 13021 | | 5987 | 28319 | 2.17 |

TABLE 16

The effect of oven/dissolution temperature on molecular weight of silk processed under the conditions of 100° C. Extraction Temperature, 60 min. Extraction Time, and 80° C. Lithium Bromide (LiBr) (Oven/Dissolution Time was varied).

| Boil Time | Oven Temp (° C.) | Oven Time | Average Mw | Std dev | Confidence Interval | | PD |
|---|---|---|---|---|---|---|---|
| 60 | 60 | 4 | 26313 | 637 | 10266 | 67442 | 2.56 |
| 60 | 80 | 4 | 30308 | 4293 | 12279 | 74806 | 2.47 |

TABLE 16-continued

The effect of oven/dissolution temperature on molecular weight of silk processed under the conditions of 100° C. Extraction Temperature, 60 min. Extraction Time, and 80° C. Lithium Bromide (LiBr) (Oven/Dissolution Time was varied).

| Boil Time | Oven Temp (° C.) | Oven Time | Average Mw | Std dev | Confidence Interval | | PD |
|---|---|---|---|---|---|---|---|
| 60 | 60 | 6 | 26353 | | 10168 | 68302 | 2.59 |
| 60 | 80 | 6 | 25164 | 238 | 9637 | 65706 | 2.61 |

In an embodiment, when producing a silk gel, an acid is used to help facilitate gelation. In an embodiment, when producing a silk gel that includes a neutral or a basic molecule and/or therapeutic agent, an acid can be added to facilitate gelation. In an embodiment, when producing a silk gel, increasing the pH (making the gel more basic) increases the shelf stability of the gel. In an embodiment, when producing a silk gel, increasing the pH (making the gel more basic) allows for a greater quantity of an acidic molecule to be loaded into the gel.

In an embodiment, natural additives may be added to the silk gel to further stabilize additives. For example, trace elements such as selenium or magnesium or L-methoinine can be used. Further, light-block containers can be added to further increase stability.

In an embodiment, the methods disclosed herein result in a solution with characteristics that can be controlled during manufacturing, including, but not limited to: MW—may be varied by changing extraction and/or dissolution time and temp (e.g., LiBr temperature), pressure, and filtration (e.g., size exclusion chromatography); Structure—removal or cleavage of heavy or light chain of the fibroin protein polymer; Purity—hot water rinse temperature for improved sericin removal or filter capability for improved particulate removal that adversely affects shelf stability of the silk fragment protein mixture solution; Color—the color of the solution can be controlled with, for example, LiBr temp and time; Viscosity; Clarity; and Stability of solution. The resultant pH of the solution is typically about 7 and can be altered using an acid or base as appropriate to storage requirements.

In an embodiment, the above-described SPF mixture solutions may be utilized to coat at least a portion of a fabric which can be used to create a textile. In an embodiment, the above-described SPF mixture solutions may be weaved into yarn that can be used as a fabric in a textile.

Figure 33:
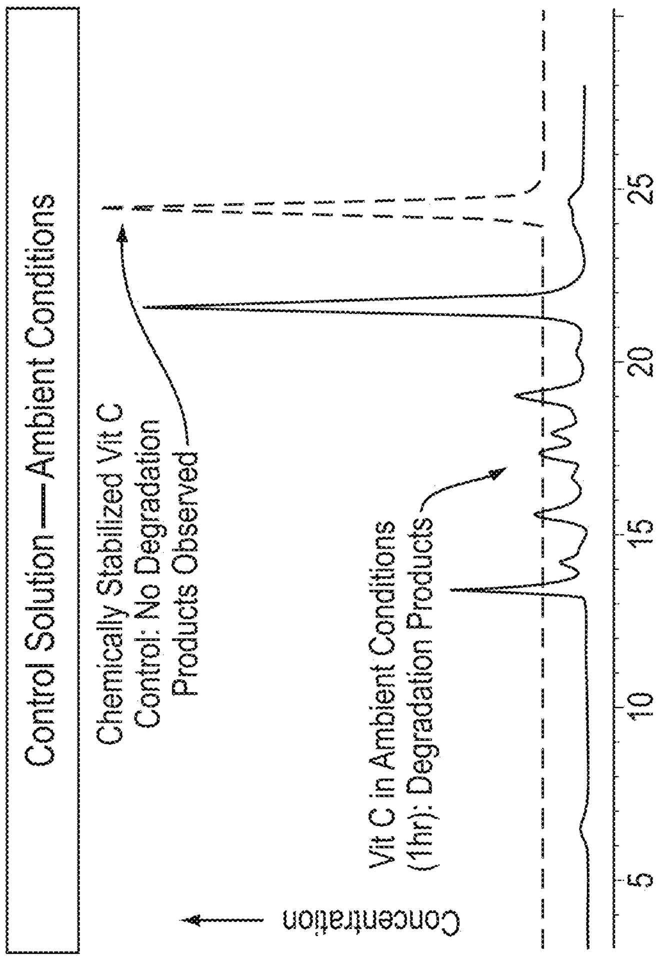
FIG. 33 shows HPLC chromatograms from samples comprising vitamin C.

FIG. 33 shows two HPLC chromatograms from samples comprising vitamin C. The chromatogram shows peaks from (1) a chemically stabilized sample of vitamin C at ambient conditions and (2) a sample of vitamin C taken after 1 hour at ambient conditions without chemical stabilization to prevent oxidation, where degradation products are visible. FIG. 36 is a table summarizing the stability of vitamin C in chemically stabilized solutions.

In some embodiments, a composition of the present disclosure can further include skin penetration enhancers, including, but not limited to, sulfoxides (such as dimethylsulfoxide), pyrrolidones (such as 2-pyrrolidone), alcohols (such as ethanol or decanol), azones (such as laurocapram and 1-dodecylazacycloheptan-2-one), surfactants (including alkyl carboxylates and their corresponding acids such as oleic acid, fluoroalkylcarboxylates and their corresponding acids, alkyl sulfates, alkyl ether sulfates, docusates such as dioctyl sodium sulfosuccinate, alkyl benzene sulfonates, alkyl ether phosphates, and alkyl aryl ether phosphates), glycols (such as propylene glycol), terpenes (such as limonene, p-cymene, geraniol, farnesol, eugenol, menthol, terpineol, carveol, carvone, fenchone, and verbenone), and dimethyl isosorbide.

Following are non-limiting examples of suitable ranges for various parameters in and for preparation of the silk solutions of the present disclosure. The silk solutions of the present disclosure may include one or more, but not necessarily all, of these parameters and may be prepared using various combinations of ranges of such parameters.

In an embodiment, the percent silk in the solution is less than 30%. In an embodiment, the percent silk in the solution is less than 25%. In an embodiment, the percent silk in the solution is less than 20%. In an embodiment, the percent silk in the solution is less than 19%. In an embodiment, the percent silk in the solution is less than 18%. In an embodiment, the percent silk in the solution is less than 17%. In an embodiment, the percent silk in the solution is less than 16%. In an embodiment, the percent silk in the solution is less than 15%. In an embodiment, the percent silk in the solution is less than 14%. In an embodiment, the percent silk in the solution is less than 13%. In an embodiment, the percent silk in the solution is less than 12%. In an embodiment, the percent silk in the solution is less than 11%. In an embodiment, the percent silk in the solution is less than 10%. In an embodiment, the percent silk in the solution is less than 9%. In an embodiment, the percent silk in the solution is less than 8%. In an embodiment, the percent silk in the solution is less than 7%. In an embodiment, the percent silk in the solution is less than 6%. In an embodiment, the percent silk in the solution is less than 5%. In an embodiment, the percent silk in the solution is less than 4%. In an embodiment, the percent silk in the solution is less than 3%. In an embodiment, the percent silk in the solution is less than 2%. In an embodiment, the percent silk in the solution is less than 1%. In an embodiment, the percent silk in the solution is less than 0.9%. In an embodiment, the percent silk in the solution is less than 0.8%. In an embodiment, the percent silk in the solution is less than 0.7%. In an embodiment, the percent silk in the solution is less than 0.6%. In an embodiment, the percent silk in the solution is less than 0.5%. In an embodiment, the percent silk in the solution is less than 0.4%. In an embodiment, the percent silk in the solution is less than 0.3%. In an embodiment, the percent silk in the solution is less than 0.2%. In an embodiment, the percent silk in the solution is less than 0.1%. In an embodiment, the percent silk in the solution is greater than 0.1%. In an embodiment, the percent silk in the solution is greater than 0.2%. In an embodiment, the percent silk in the solution is greater than 0.3%. In an embodiment, the percent silk in the solution is greater than 0.4%. In an embodiment, the percent silk in the solution is greater than 0.5%. In an embodiment, the percent silk in the solution is greater than 0.6%. In an embodiment, the percent silk in the solution is greater than 0.7%. In an embodiment, the percent silk in the solution is greater than 0.8%. In an embodiment, the percent silk in the solution is greater than 0.9%. In an embodiment, the percent silk in the solution is greater than 1%. In an embodiment, the percent silk in the solution is greater than 2%. In an embodiment, the percent silk in the solution is greater than 3%. In an embodiment, the percent silk in the solution is greater than 4%. In an embodiment, the percent silk in the solution is greater than 5%. In an embodiment, the percent silk in the solution is greater than 6%. In an embodiment, the percent silk in the solution is greater than 7%. In an embodiment, the percent silk in the solution is greater than 8%. In an embodiment, the percent silk in the solution is greater than 9%. In an embodiment, the percent silk in the solution is greater than 10%. In an embodiment, the percent silk in the solution is greater than 11%. In an embodiment, the percent silk in the solution is greater than 12%. In an embodiment, the percent silk in the solution is greater than 13%. In an embodiment, the percent silk in the solution is greater than 14%. In an embodiment, the percent silk in the solution is greater than 15%. In an embodiment, the percent silk in the solution is greater than 16%. In an embodiment, the percent silk in the solution is greater than 17%. In an embodiment, the percent silk in the solution is greater than 18%. In an embodiment, the percent silk in the solution is greater than 19%. In an embodiment, the percent silk in the solution is greater than 20%. In an embodiment, the percent silk in the solution is greater than 25%. In an embodiment, the percent silk in the solution is between 0.1% and 30%. In an embodiment, the percent silk in the solution is between 0.1% and 25%. In an embodiment, the percent silk in the solution is between 0.1% and 20%. In an embodiment, the percent silk in the solution is between 0.1% and 15%. In an embodiment, the percent silk in the solution is between 0.1% and 10%. In an embodiment, the percent silk in the solution is between 0.1% and 9%. In an embodiment, the percent silk in the solution is between 0.1% and 8%. In an embodiment, the percent silk in the solution is between 0.1% and 7%. In an embodiment, the percent silk in the solution is between 0.1% and 6.5%. In an embodiment, the percent silk in the solution is between 0.1% and 6%. In an embodiment, the percent silk in the solution is between 0.1% and 5.5%. In an embodiment, the percent silk in the solution is between 0.1% and 5%. In an embodiment, the percent silk in the solution is between 0.1% and 4.5%. In an embodiment, the percent silk in the solution is between 0.1% and 4%. In an embodiment, the percent silk in the solution is between 0.1% and 3.5%. In an embodiment, the percent silk in the solution is between 0.1% and 3%. In an embodiment, the percent silk in the solution is between 0.1% and 2.5%. In an embodiment, the percent silk in the solution is between 0.1% and 2.0%. In an embodiment, the percent silk in the solution is between 0.1% and 2.4%. In an embodiment, the percent silk in the solution is between 0.5% and 5%. In an embodiment, the percent silk in the solution is between 0.5% and 4.5%. In an embodiment, the percent silk in the solution is between 0.5% and 4%. In an embodiment, the percent silk in the solution is between 0.5% and 3.5%. In an embodiment, the percent silk in the solution is between 0.5% and 3%. In an embodiment, the percent silk in the solution is between 0.5% and 2.5%. In an embodiment, the percent silk in the solution is between 1 and 4%. In an embodiment, the percent silk in the solution is between 1 and 3.5%. In an embodiment, the percent silk in the solution is between 1 and 3%. In an embodiment, the percent silk in the solution is between 1 and 2.5%. In an embodiment, the percent silk in the solution is between 1 and 2.4%. In an embodiment, the percent silk in the solution is between 1 and 2%. In an embodiment, the percent silk in the solution is between 20% and 30%. In an embodiment, the percent silk in the solution is between 0.1% and 6%. In an embodiment, the percent silk in the solution is between 6% and 10%. In an embodiment, the percent silk in the solution is between 6% and 8%. In an embodiment, the percent silk in the solution is between 6% and 9%. In an embodiment, the percent silk in the solution is between 10% and 20%. In an embodiment, the percent silk in the solution is between 11% and 19%. In an embodiment, the percent silk in the solution is between 12% and 18%. In an embodiment, the percent silk in the solution is between 13% and 17%. In an embodiment, the percent silk in the solution is between 14% and 16%. In an embodiment, the percent silk in the solution is 2.4%. In an embodiment, the percent silk in the solution is 2.0%.

In an embodiment, the percent sericin in the solution is non-detectable to 30%. In an embodiment, the percent sericin in the solution is non-detectable to 5%. In an embodiment, the percent sericin in the solution is 1%. In an embodiment, the percent sericin in the solution is 2%. In an embodiment, the percent sericin in the solution is 3%. In an embodiment, the percent sericin in the solution is 4%. In an embodiment, the percent sericin in the solution is 5%. In an embodiment, the percent sericin in the solution is 10%. In an embodiment, the percent sericin in the solution is 30%.

In an embodiment, the stability of the LiBr-silk fragment solution is 0 to 1 year. In an embodiment, the stability of the LiBr-silk fragment solution is 0 to 2 years. In an embodiment, the stability of the LiBr-silk fragment solution is 0 to 3 years. In an embodiment, the stability of the LiBr-silk fragment solution is 0 to 4 years. In an embodiment, the stability of the LiBr-silk fragment solution is 0 to 5 years. In an embodiment, the stability of the LiBr-silk fragment solution is 1 to 2 years. In an embodiment, the stability of the LiBr-silk fragment solution is 1 to 3 years. In an embodiment, the stability of the LiBr-silk fragment solution is 1 to 4 years. In an embodiment, the stability of the LiBr-silk fragment solution is 1 to 5 years. In an embodiment, the stability of the LiBr-silk fragment solution is 2 to 3 years. In an embodiment, the stability of the LiBr-silk fragment solution is 2 to 4 years. In an embodiment, the stability of the LiBr-silk fragment solution is 2 to 5 years. In an embodiment, the stability of the LiBr-silk fragment solution is 3 to 4 years. In an embodiment, the stability of the LiBr-silk fragment solution is 3 to 5 years. In an embodiment, the stability of the LiBr-silk fragment solution is 4 to 5 years.

In an embodiment, the stability of a composition of the present disclosure is 10 days to 6 months. In an embodiment, the stability of a composition of the present disclosure is 6 months to 12 months. In an embodiment, the stability of a composition of the present disclosure is 12 months to 18 months. In an embodiment, the stability of a composition of the present disclosure is 18 months to 24 months. In an embodiment, the stability of a composition of the present disclosure is 24 months to 30 months. In an embodiment, the stability of a composition of the present disclosure is 30 months to 36 months. In an embodiment, the stability of a composition of the present disclosure is 36 months to 48 months. In an embodiment, the stability of a composition of the present disclosure is 48 months to 60 months.

In an embodiment, a composition of the present disclosure includes pure silk fibroin-based protein fragments having an average weight average molecular weight ranging from 6 kDa to 16 kDa. In an embodiment, a composition of the present disclosure includes pure silk fibroin-based protein fragments having an average weight average molecular weight ranging from 17 kDa to 38 kDa. In an embodiment, a composition of the present disclosure includes pure silk fibroin-based protein fragments having an average weight average molecular weight ranging from 39 kDa to 80 kDa. In an embodiment, a composition of the present disclosure includes pure silk fibroin-based protein fragments having an average weight average molecular weight ranging from 1 to 5 kDa. In an embodiment, a composition of the present disclosure includes pure silk fibroin-based protein fragments having an average weight average molecular weight ranging from 5 to 10 kDa. In an embodiment, a composition of the present disclosure includes pure silk fibroin-based protein fragments having an average weight average molecular weight ranging from 10 to 15 kDa. In an embodiment, a composition of the present disclosure includes pure silk fibroin-based protein fragments having an average weight average molecular weight ranging from 15 to 20 kDa. In an embodiment, a composition of the present disclosure includes pure silk fibroin-based protein fragments having an average weight average molecular weight ranging from 20 to 25 kDa. In an embodiment, a composition of the present disclosure includes pure silk fibroin-based protein fragments having an average weight average molecular weight ranging from 25 to 30 kDa. In an embodiment, a composition of the present disclosure includes pure silk fibroin-based protein fragments having an average weight average molecular weight ranging from 30 to 35 kDa. In an embodiment, a composition of the present disclosure includes pure silk fibroin-based protein fragments having an average weight average molecular weight ranging from 35 to 40 kDa. In an embodiment, a composition of the present disclosure includes pure silk fibroin-based protein fragments having an average weight average molecular weight ranging from 40 to 45 kDa. In an embodiment, a composition of the present disclosure includes pure silk fibroin-based protein fragments having an average weight average molecular weight ranging from 45 to 50 kDa. In an embodiment, a composition of the present disclosure includes pure silk fibroin-based protein fragments having an average weight average molecular weight ranging from 50 to 55 kDa. In an embodiment, a composition of the present disclosure includes pure silk fibroin-based protein fragments having an average weight average molecular weight ranging from 55 to 60 kDa. In an embodiment, a composition of the present disclosure includes pure silk fibroin-based protein fragments having an average weight average molecular weight ranging from 60 to 65 kDa. In an embodiment, a composition of the present disclosure includes pure silk fibroin-based protein fragments having an average weight average molecular weight ranging from 65 to 70 kDa. In an embodiment, a composition of the present disclosure includes pure silk fibroin-based protein fragments having an average weight average molecular weight ranging from 70 to 75 kDa. In an embodiment, a composition of the present disclosure includes pure silk fibroin-based protein fragments having an average weight average molecular weight ranging from 75 to 80 kDa. In an embodiment, a composition of the present disclosure includes pure silk fibroin-based protein fragments having an average weight average molecular weight ranging from 80 to 85 kDa. In an embodiment, a composition of the present disclosure includes pure silk fibroin-based protein fragments having an average weight average molecular weight ranging from 85 to 90 kDa. In an embodiment, a composition of the present disclosure includes pure silk fibroin-based protein fragments having an average weight average molecular weight ranging from 90 to 95 kDa. In an embodiment, a composition of the present disclosure includes pure silk fibroin-based protein fragments having an average weight average molecular weight ranging from 95 to 100 kDa. In an embodiment, a composition of the present disclosure includes pure silk fibroin-based protein fragments having an average weight average molecular weight ranging from 100 to 105 kDa. In an embodiment, a composition of the present disclosure includes pure silk fibroin-based protein fragments having an average weight average molecular weight ranging from 105 to 110 kDa. In an embodiment, a composition of the present disclosure includes pure silk fibroin-based protein fragments having an average weight average molecular weight ranging from 110 to 115 kDa. In an embodiment, a composition of the present disclosure includes pure silk fibroin-based protein fragments having an average weight average molecular weight ranging from 115 to 120 kDa. In an embodiment, a composition of the present disclosure includes pure silk fibroin-based protein fragments having an average weight average molecular weight ranging from 120 to 125 kDa. In an embodiment, a composition of the present disclosure includes pure silk fibroin-based protein fragments having an average weight average molecular weight ranging from 125 to 130 kDa. In an embodiment, a composition of the present disclosure includes pure silk fibroin-based protein fragments having an average weight average molecular weight ranging from 130 to 135 kDa. In an embodiment, a composition of the present disclosure includes pure silk fibroin-based protein fragments having an average weight average molecular weight ranging from 135 to 140 kDa. In an embodiment, a composition of the present disclosure includes pure silk fibroin-based protein fragments having an average weight average molecular weight ranging from 140 to 145 kDa. In an embodiment, a composition of the present disclosure includes pure silk fibroin-based protein fragments having an average weight average molecular weight ranging from 145 to 150 kDa. In an embodiment, a composition of the present disclosure includes pure silk fibroin-based protein fragments having an average weight average molecular weight ranging from 150 to 155 kDa. In an embodiment, a composition of the present disclosure includes pure silk fibroin-based protein fragments having an average weight average molecular weight ranging from 155 to 160 kDa. In an embodiment, a composition of the present disclosure includes pure silk fibroin-based protein fragments having an average weight average molecular weight ranging from 160 to 165 kDa. In an embodiment, a composition of the present disclosure includes pure silk fibroin-based protein fragments having an average weight average molecular weight ranging from 165 to 170 kDa. In an embodiment, a composition of the present disclosure includes pure silk fibroin-based protein fragments having an average weight average molecular weight ranging from 170 to 175 kDa. In an embodiment, a composition of the present disclosure includes pure silk fibroin-based protein fragments having an average weight average molecular weight ranging from 175 to 180 kDa. In an embodiment, a composition of the present disclosure includes pure silk fibroin-based protein fragments having an average weight average molecular weight ranging from 180 to 185 kDa. In an embodiment, a composition of the present disclosure includes pure silk fibroin-based protein fragments having an average weight average molecular weight ranging from 185 to 190 kDa. In an embodiment, a composition of the present disclosure includes pure silk fibroin-based protein fragments having an average weight average molecular weight ranging from 190 to 195 kDa. In an embodiment, a composition of the present disclosure includes pure silk fibroin-based protein fragments having an average weight average molecular weight ranging from 195 to 200 kDa. In an embodiment, a composition of the present disclosure includes pure silk fibroin-based protein fragments having an average weight average molecular weight ranging from 200 to 205 kDa. In an embodiment, a composition of the present disclosure includes pure silk fibroin-based protein fragments having an average weight average molecular weight ranging from 205 to 210 kDa. In an embodiment, a composition of the present disclosure includes pure silk fibroin-based protein fragments having an average weight average molecular weight ranging from 210 to 215 kDa. In an embodiment, a composition of the present disclosure includes pure silk fibroin-based protein fragments having an average weight average molecular weight ranging from 215 to 220 kDa. In an embodiment, a composition of the present disclosure includes pure silk fibroin-based protein fragments having an average weight average molecular weight ranging from 220 to 225 kDa. In an embodiment, a composition of the present disclosure includes pure silk fibroin-based protein fragments having an average weight average molecular weight ranging from 225 to 230 kDa. In an embodiment, a composition of the present disclosure includes pure silk fibroin-based protein fragments having an average weight average molecular weight ranging from 230 to 235 kDa. In an embodiment, a composition of the present disclosure includes pure silk fibroin-based protein fragments having an average weight average molecular weight ranging from 235 to 240 kDa. In an embodiment, a composition of the present disclosure includes pure silk fibroin-based protein fragments having an average weight average molecular weight ranging from 240 to 245 kDa. In an embodiment, a composition of the present disclosure includes pure silk fibroin-based protein fragments having an average weight average molecular weight ranging from 245 to 250 kDa. In an embodiment, a composition of the present disclosure includes pure silk fibroin-based protein fragments having an average weight average molecular weight ranging from 250 to 255 kDa. In an embodiment, a composition of the present disclosure includes pure silk fibroin-based protein fragments having an average weight average molecular weight ranging from 255 to 260 kDa. In an embodiment, a composition of the present disclosure includes pure silk fibroin-based protein fragments having an average weight average molecular weight ranging from 260 to 265 kDa. In an embodiment, a composition of the present disclosure includes pure silk fibroin-based protein fragments having an average weight average molecular weight ranging from 265 to 270 kDa. In an embodiment, a composition of the present disclosure includes pure silk fibroin-based protein fragments having an average weight average molecular weight ranging from 270 to 275 kDa. In an embodiment, a composition of the present disclosure includes pure silk fibroin-based protein fragments having an average weight average molecular weight ranging from 275 to 280 kDa. In an embodiment, a composition of the present disclosure includes pure silk fibroin-based protein fragments having an average weight average molecular weight ranging from 280 to 285 kDa. In an embodiment, a composition of the present disclosure includes pure silk fibroin-based protein fragments having an average weight average molecular weight ranging from 285 to 290 kDa. In an embodiment, a composition of the present disclosure includes pure silk fibroin-based protein fragments having an average weight average molecular weight ranging from 290 to 295 kDa. In an embodiment, a composition of the present disclosure includes pure silk fibroin-based protein fragments having an average weight average molecular weight ranging from 295 to 300 kDa. In an embodiment, a composition of the present disclosure includes pure silk fibroin-based protein fragments having an average weight average molecular weight ranging from 300 to 305 kDa. In an embodiment, a composition of the present disclosure includes pure silk fibroin-based protein fragments having an average weight average molecular weight ranging from 305 to 310 kDa. In an embodiment, a composition of the present disclosure includes pure silk fibroin-based protein fragments having an average weight average molecular weight ranging from 310 to 315 kDa. In an embodiment, a composition of the present disclosure includes pure silk fibroin-based protein fragments having an average weight average molecular weight ranging from 315 to 320 kDa. In an embodiment, a composition of the present disclosure includes pure silk fibroin-based protein fragments having an average weight average molecular weight ranging from 320 to 325 kDa. In an embodiment, a composition of the present disclosure includes pure silk fibroin-based protein fragments having an average weight average molecular weight ranging from 325 to 330 kDa. In an embodiment, a composition of the present disclosure includes pure silk fibroin-based protein fragments having an average weight average molecular weight ranging from 330 to 335 kDa. In an embodiment, a composition of the present disclosure includes pure silk fibroin-based protein fragments having an average weight average molecular weight ranging from 35 to 340 kDa. In an embodiment, a composition of the present disclosure includes pure silk fibroin-based protein fragments having an average weight average molecular weight ranging from 340 to 345 kDa. In an embodiment, a composition of the present disclosure includes pure silk fibroin-based protein fragments having an average weight average molecular weight ranging from 345 to 350 kDa.

In an embodiment, a composition of the present disclosure having pure silk fibroin-based protein fragments has a polydispersity ranging from about 1 to about 5.0. In an embodiment, a composition of the present disclosure having pure silk fibroin-based protein fragments has a polydispersity ranging from about 1.5 to about 3.0. In an embodiment, a composition of the present disclosure having pure silk fibroin-based protein fragments has a polydispersity ranging from about 1 to about 1.5. In an embodiment, a composition of the present disclosure having pure silk fibroin-based protein fragments has a polydispersity ranging from about 1.5 to about 2.0. In an embodiment, a composition of the present disclosure having pure silk fibroin-based protein fragments has a polydispersity ranging from about 2.0 to about 2.5. In an embodiment, a composition of the present disclosure having pure silk fibroin-based protein fragments, has a polydispersity ranging from about is 2.0 to about 3.0. In an embodiment, a composition of the present disclosure having pure silk fibroin-based protein fragments, has a polydispersity ranging from about is 2.5 to about 3.0.

In an embodiment, a composition of the present disclosure having pure silk fibroin-based protein fragments has non-detectable levels of LiBr residuals. In an embodiment, the amount of the LiBr residuals in a composition of the present disclosure is between 10 ppm and 1000 ppm. In an embodiment, the amount of the LiBr residuals in a composition of the present disclosure is between 10 ppm and 300 ppm. In an embodiment, the amount of the LiBr residuals in a composition of the present disclosure is less than 25 ppm. In an embodiment, the amount of the LiBr residuals in a composition of the present disclosure is less than 50 ppm. In an embodiment, the amount of the LiBr residuals in a composition of the present disclosure is less than 75 ppm. In an embodiment, the amount of the LiBr residuals in a composition of the present disclosure is less than 100 ppm. In an embodiment, the amount of the LiBr residuals in a composition of the present disclosure is less than 200 ppm. In an embodiment, the amount of the LiBr residuals in a composition of the present disclosure is less than 300 ppm. In an embodiment, the amount of the LiBr residuals in a composition of the present disclosure is less than 400 ppm. In an embodiment, the amount of the LiBr residuals in a composition of the present disclosure is less than 500 ppm. In an embodiment, the amount of the LiBr residuals in a composition of the present disclosure is less than 600 ppm. In an embodiment, the amount of the LiBr residuals in a composition of the present disclosure is less than 700 ppm. In an embodiment, the amount of the LiBr residuals in a composition of the present disclosure is less than 800 ppm. In an embodiment, the amount of the LiBr residuals in a composition of the present disclosure is less than 900 ppm. In an embodiment, the amount of the LiBr residuals in a composition of the present disclosure is less than 1000 ppm. In an embodiment, the amount of the LiBr residuals in a composition of the present disclosure is non-detectable to 500 ppm. In an embodiment, the amount of the LiBr residuals in a composition of the present disclosure is non-detectable to 450 ppm. In an embodiment, the amount of the LiBr residuals in a composition of the present disclosure is non-detectable to 400 ppm. In an embodiment, the amount of the LiBr residuals in a composition of the present disclosure is non-detectable to 350 ppm. In an embodiment, the amount of the LiBr residuals in a composition of the present disclosure is non-detectable to 300 ppm. In an embodiment, the amount of the LiBr residuals in a composition of the present disclosure is non-detectable to 250 ppm. In an embodiment, the amount of the LiBr residuals in a composition of the present disclosure is non-detectable to 200 ppm. In an embodiment, the amount of the LiBr residuals in a composition of the present disclosure is non-detectable to 150 ppm. In an embodiment, the amount of the LiBr residuals in a composition of the present disclosure is non-detectable to 100 ppm. In an embodiment, the amount of the LiBr residuals in a composition of the present disclosure is 100 ppm to 200 ppm. In an embodiment, the amount of the LiBr residuals in a composition of the present disclosure is 200 ppm to 300 ppm. In an embodiment, the amount of the LiBr residuals in a composition of the present disclosure is 300 ppm to 400 ppm. In an embodiment, the amount of the LiBr residuals in a composition of the present disclosure is 400 ppm to 500 ppm.

In an embodiment, a composition of the present disclosure having pure silk fibroin-based protein fragments, has non-detectable levels of $Na_2CO_3$ residuals. In an embodiment, the amount of the $Na_2CO_3$ residuals in a composition of the present disclosure is less than 100 ppm. In an embodiment, the amount of the $Na_2CO_3$ residuals in a composition of the present disclosure is less than 200 ppm. In an embodiment, the amount of the $Na_2CO_3$ residuals in a composition of the present disclosure is less than 300 ppm. In an embodiment, the amount of the $Na_2CO_3$ residuals in a composition of the present disclosure is less than 400 ppm. In an embodiment, the amount of the $Na_2CO_3$ residuals in a composition of the present disclosure is less than 500 ppm. In an embodiment, the amount of the $Na_2CO_3$ residuals in a composition of the present disclosure is less than 600 ppm. In an embodiment, the amount of the $Na_2CO_3$ residuals in a composition of the present disclosure is less than 700 ppm. In an embodiment, the amount of the $Na_2CO_3$ residuals in a composition of the present disclosure is less than 800 ppm. In an embodiment, the amount of the $Na_2CO_3$ residuals in a composition of the present disclosure is less than 900 ppm. In an embodiment, the amount of the $Na_2CO_3$ residuals in a composition of the present disclosure is less than 1000 ppm. In an embodiment, the amount of the $Na_2CO_3$ residuals in a composition of the present disclosure is non-detectable to 500 ppm. In an embodiment, the amount of the $Na_2CO_3$ residuals in a composition of the present disclosure is non-detectable to 450 ppm. In an embodiment, the amount of the $Na_2CO_3$ residuals in a composition of the present disclosure is non-detectable to 400 ppm. In an embodiment, the amount of the $Na_2CO_3$ residuals in a composition of the present disclosure is non-detectable to 350 ppm. In an embodiment, the amount of the $Na_2CO_3$ residuals in a composition of the present disclosure is non-detectable to 300 ppm. In an embodiment, the amount of the $Na_2CO_3$ residuals in a composition of the present disclosure is non-detectable to 250 ppm. In an embodiment, the amount of the $Na_2CO_3$ residuals in a composition of the present disclosure is non-detectable to 200 ppm. In an embodiment, the amount of the $Na_2CO_3$ residuals in a composition of the present disclosure is non-detectable to 150 ppm. In an embodiment, the amount of the $Na_2CO_3$ residuals in a composition of the present disclosure is non-detectable to 100 ppm. In an embodiment, the amount of the $Na_2CO_3$ residuals in a composition of the present disclosure is 100 ppm to 200 ppm. In an embodiment, the amount of the $Na_2CO_3$ residuals in a composition of the present disclosure is 200 ppm to 300 ppm. In an embodiment, the amount of the $Na_2CO_3$ residuals in a composition of the present disclosure is 300 ppm to 400 ppm. In an embodiment, the amount of the $Na_2CO_3$ residuals in a composition of the present disclosure is 400 ppm to 500 ppm.

In an embodiment, the water solubility of pure silk fibroin-based protein fragments of the present disclosure is 50 to 100%. In an embodiment, the water solubility of pure silk fibroin-based protein fragments of the present disclosure is 60 to 100%. In an embodiment, the water solubility of pure silk fibroin-based protein fragments of the present disclosure is 70 to 100%. In an embodiment, the water solubility of pure silk fibroin-based protein fragments of the present disclosure is 80 to 100%. In an embodiment, the water solubility is 90 to 100%. In an embodiment, the silk fibroin-based fragments of the present disclosure are non-soluble in aqueous solutions.

In an embodiment, the solubility of pure silk fibroin-based protein fragments of the present disclosure in organic solutions is 50 to 100%. In an embodiment, the solubility of pure silk fibroin-based protein fragments of the present disclosure in organic solutions is 60 to 100%. In an embodiment, the solubility of pure silk fibroin-based protein fragments of the present disclosure in organic solutions is 70 to 100%. In an embodiment, the solubility of pure silk fibroin-based protein fragments of the present disclosure in organic solutions is 80 to 100%. In an embodiment, the solubility of pure silk fibroin-based protein fragments of the present disclosure in organic solutions is 90 to 100%. In an embodiment, the silk fibroin-based fragments of the present disclosure are non-soluble in organic solutions.

In an embodiment, the extraction temperature during a method of preparing a composition of the present disclosure is greater than 84° C. In an embodiment, the extraction temperature during a method of preparing a composition of the present disclosure is less than 100° C. In an embodiment, the extraction temperature during a method of preparing a composition of the present disclosure is 84° C. to 100° C. In an embodiment, the extraction temperature during a method of preparing a composition of the present disclosure is 84° C. to 94° C. In an embodiment, the extraction temperature during a method of preparing a composition of the present disclosure is 94° C. to 100° C.

Compositions and Processes Including Silk Fibroin-Based Coatings

In an embodiment, the invention may include textiles, such as fibers, yarns, fabrics, or other materials and combinations thereof, that may be coated with an SPF mixture solution (i.e., silk fibroin solution (SFS)) as described herein to produce a coated article. In an embodiment, the coated articles described herein may be treated with additional chemical agents that may enhance the properties of the coated article. In an embodiment, the SFS may include one or more chemical agents that may enhance the properties of the coated article.

In an embodiment, textiles may be flexible materials (woven or non-woven) that include a network of natural and/or man-made fibers, thread, yarn, or a combination thereof. SFS may be applied at any stage of textile processing from individual fibers, to yarn, to fabric, to thread, or a combination thereof.

In an embodiment, fibers may be natural fibers that may include a natural fiber cellulose base, wherein the natural fiber cellulose base may include one or more of: (1) a baste such as flax, hemp, kenaf, jute, linen, and/or ramie; (2) a leaf such as flax, hemp, sisal, abaca, banana, henequen, ramie, sunn, and/or coir; and (3) seed hair such as cotton and/or kapok. In an embodiment, fibers may be natural fibers that may include a natural fiber protein base, wherein the natural fiber protein base may include one or more of: (1) hair such as alpaca, camel, cashmere, llama, mohair, and/or vicuna; (2) wool such as sheep; (3) filament such as silk. In an embodiment, fibers may be natural fibers that may include a natural fiber mineral base, including asbestos. In an embodiment, fibers may be man-made fibers that may include a man-made fiber organic natural polymer base, which may include one or more of: (1) a cellulose base such as bamboo, rayon, lyocell, acetate, and/or triacetate; (2) a protein base such as azlon; (3) an alginate; and (4) rubber. In an embodiment, fibers may be man-made fibers that may include a man-made fiber organic synthetic base, which may include one or more of acrylic, anidex, aramid, fluorocarbon, modacrylic, novoloid, nylon, nytril, olefin, PBI, polycarbonate, polyester, rubber, saran, spandex, vinal vinvon. In an embodiment, fibers may be man-made fibers that may include a man-made fiber inorganic base, which may include one or more of a glass material, metallic material, and carbon material.

In an embodiment, yarn may include natural fibers that may include a natural fiber cellulose base, wherein the natural fiber cellulose base may be from: (1) a baste such as flax, hemp, kenaf, jute, linen, and/or ramie; (2) a leaf such as flax, hemp, sisal, abaca, banana, henequen, ramie, sunn, and/or coir; or (3) seed hair such as cotton and/or kapok. In an embodiment, yarn may include natural fibers that may include a natural fiber protein base, wherein the natural fiber protein base may be from: (1) hair such as alpaca, camel, cashmere, llama, mohair, and/or vicuna; (2) wool such as sheep; or (3) filament such as silk. In an embodiment, yarn may include natural fibers that may include a natural fiber mineral base, including asbestos. In an embodiment, yarn may include man-made fibers that may include a man-made fiber organic natural polymer base, which may include: (1) a cellulose base such as bamboo, rayon, lyocell, acetate, and/or triacetate; (2) a protein base such as azlon; (3) an alginate; or (4) rubber. In an embodiment, yarn may include man-made fibers that may include a man-made fiber organic synthetic base, which may include acrylic, anidex, aramid, fluorocarbon, modacrylic, novoloid, nylon, nytril, olefin, PBI, polycarbonate, polyester, rubber, saran, spandex, vinal and/or vinvon. In an embodiment, yarn may include man-made fibers that may include a man-made fiber inorganic base, which may include a glass material, metallic material, carbon material, and/or specialty material.

In an embodiment, fabrics may include natural fibers and/or yarn that may include a natural fiber cellulose base, wherein the natural fiber cellulose base may be from: (1) a baste such as flax, hemp, kenaf, jute, linen, and/or ramie; (2) a leaf such as flax, hemp, sisal, abaca, banana, henequen, ramie, sunn, and/or coir; or (3) seed hair such as cotton and/or kapok. In an embodiment, fabric may include natural fibers and/or yarn that may include a natural fiber protein base, wherein the natural fiber protein base may be from: (1) hair such as alpaca, camel, cashmere, llama, mohair, and/or vicuna; (2) wool such as sheep; or (3) filament such as silk. In an embodiment, fabric may include natural fibers and/or yarn that may include a natural fiber mineral base, including asbestos. In an embodiment, fabric may include man-made fibers and/or yarn that may include a man-made fiber organic natural polymer base, which may include: (1) a cellulose base such as bamboo, rayon, lyocell, acetate, and/or triacetate; (2) a protein base such as azlon; (3) an alginate; or (4) rubber. In an embodiment, fabric may include man-made fibers and/or yarn that may include a man-made fiber organic synthetic base, which may include acrylic, anidex, aramid, fluorocarbon, modacrylic, novoloid, nylon, nytril, olefin, PBI, polycarbonate, polyester, rubber, saran, spandex, vinal and/or vinvon. In an embodiment, fabric may include man-made fibers and/or yarn that may include a man-made fiber inorganic base, which may include a glass material, metallic material, carbon material, and/or specialty material.

In an embodiment, textiles may be manufactured via one or more of the following processes weaving processes, knitting processes, and non-woven processes. In an embodiment, weaving processes may include plain weaving, twill weaving, and/or satin weaving. In an embodiment, knitting processes may include weft knitting (e.g., circular, flat bed, and/or full fashioned) and/or warp knitting (e.g., tricot, Raschel, and/or crochet). In an embodiment, non-woven processes may include stable fiber (e.g., dry laid and/or wet laid) and/or continuous filament (e.g., spun laid and/or melt blown).

In some embodiments, SFS may be applied to fibers and/or yarn having a diameter of less than about 100 nm, or less than about 200 nm, or less than about 300 nm, or less than about 400 nm, or less than about 500 nm, or less than about 600 nm, or less than about 700 nm, or less than about 800 nm, or less than about 900 nm, or less than about 1000 nm, or less than about 2 μm, or less than about 5 μm, or less than about 10 μm, or less than about 20 μm, or less than about 30 μm, or less than about 40 μm, or less than about 50 μm, or less than about 60 μm, or less than about 70 μm, or less than about 80 μm, or less than about 90 μm, or less than about 100 μm, or less than about 200 μm, or less than about 300 μm, or less than about 400 μm, or less than about 500 μm, or less than about 600 μm, or less than about 700 μm, or less than about 800 μm, or less than about 900 μm, or less than about 1000 μm, or less than about 2 mm, or less than about 3 mm, or less than about 4 mm, or less than about 5 mm, 6 mm, or less than about 7 mm, or less than about 8 mm, or less than about 9 mm, or less than about 10 mm, or less than about 20 mm, or less than about 30 mm, or less than about 40 mm, or less than about 50 mm, or less than about 60 mm, or less than about 70 mm, or less than about 80 mm, or less than about 90 mm, or less than about 100 mm, or less than about 200 mm, or less than about 300 mm, or less than about 400 mm, or less than about 500 mm, or less than about 600 mm, or less than about 700 mm, or less than about 800 mm, or less than about 900 mm, or less than about 1000 mm.

In some embodiments, SFS may be applied to fibers and/or yarn having a diameter of greater than about 100 nm, or greater than about 200 nm, or greater than about 300 nm, or greater than about 400 nm, or greater than about 500 nm, or greater than about 600 nm, or greater than about 700 nm, or greater than about 800 nm, or greater than about 900 nm, or greater than about 1000 nm, or greater than about 2 μm, or greater than about 5 μm, or greater than about 10 μm, or greater than about 20 μm, or greater than about 30 μm, or greater than about 40 μm, or greater than about 50 μm, or greater than about 60 μm, or greater than about 70 μm, or greater than about 80 μm, or greater than about 90 μm, or greater than about 100 μm, or greater than about 200 μm, or greater than about 300 μm, or greater than about 400 μm, or greater than about 500 μm, or greater than about 600 μm, or greater than about 700 μm, or greater than about 800 μm, or greater than about 900 μm, or greater than about 1000 μm, or greater than about 2 mm, or greater than about 3 mm, or greater than about 4 mm, or greater than about 5 mm, 6 mm, or greater than about 7 mm, or greater than about 8 mm, or greater than about 9 mm, or greater than about 10 mm, or greater than about 20 mm, or greater than about 30 mm, or greater than about 40 mm, or greater than about 50 mm, or greater than about 60 mm, or greater than about 70 mm, or greater than about 80 mm, or greater than about 90 mm, or greater than about 100 mm, or greater than about 200 mm, or greater than about 300 mm, or greater than about 400 mm, or greater than about 500 mm, or greater than about 600 mm, or greater than about 700 mm, or greater than about 800 mm, or greater than about 900 mm, or greater than about 1000 mm.

In some embodiments, SFS may be applied to fibers and/or yarn having a length of less than about 100 nm, or less than about 200 nm, or less than about 300 nm, or less than about 400 nm, or less than about 500 nm, or less than about 600 nm, or less than about 700 nm, or less than about 800 nm, or less than about 900 nm, or less than about 1000 nm, or less than about 2 μm, or less than about 5 μm, or less than about 10 μm, or less than about 20 μm, or less than about 30 μm, or less than about 40 μm, or less than about 50 μm, or less than about 60 μm, or less than about 70 μm, or less than about 80 μm, or less than about 90 μm, or less than about 100 μm, or less than about 200 μm, or less than about 300 μm, or less than about 400 μm, or less than about 500 μm, or less than about 600 μm, or less than about 700 μm, or less than about 800 μm, or less than about 900 μm, or less than about 1000 μm, or less than about 2 mm, or less than about 3 mm, or less than about 4 mm, or less than about 5 mm, 6 mm, or less than about 7 mm, or less than about 8 mm, or less than about 9 mm, or less than about 10 mm, or less than about 20 mm, or less than about 30 mm, or less than about 40 mm, or less than about 50 mm, or less than about 60 mm, or less than about 70 mm, or less than about 80 mm, or less than about 90 mm, or less than about 100 mm, or less than about 200 mm, or less than about 300 mm, or less than about 400 mm, or less than about 500 mm, or less than about 600 mm, or less than about 700 mm, or less than about 800 mm, or less than about 900 mm, or less than about 1000 mm.

In some embodiments, SFS may be applied to fibers and/or yarn having a length of greater than about 100 nm, or greater than about 200 nm, or greater than about 300 nm, or greater than about 400 nm, or greater than about 500 nm, or greater than about 600 nm, or greater than about 700 nm, or greater than about 800 nm, or greater than about 900 nm, or greater than about 1000 nm, or greater than about 2 μm, or greater than about 5 μm, or greater than about 10 μm, or greater than about 20 μm, or greater than about 30 μm, or greater than about 40 μm, or greater than about 50 μm, or greater than about 60 μm, or greater than about 70 μm, or greater than about 80 μm, or greater than about 90 μm, or greater than about 100 μm, or greater than about 200 μm, or greater than about 300 μm, or greater than about 400 μm, or greater than about 500 μm, or greater than about 600 μm, or greater than about 700 μm, or greater than about 800 μm, or greater than about 900 μm, or greater than about 1000 μm, or greater than about 2 mm, or greater than about 3 mm, or greater than about 4 mm, or greater than about 5 mm, 6 mm, or greater than about 7 mm, or greater than about 8 mm, or greater than about 9 mm, or greater than about 10 mm, or greater than about 20 mm, or greater than about 30 mm, or greater than about 40 mm, or greater than about 50 mm, or greater than about 60 mm, or greater than about 70 mm, or greater than about 80 mm, or greater than about 90 mm, or greater than about 100 mm, or greater than about 200 mm, or greater than about 300 mm, or greater than about 400 mm, or greater than about 500 mm, or greater than about 600 mm, or greater than about 700 mm, or greater than about 800 mm, or greater than about 900 mm, or greater than about 1000 mm.

In some embodiments, SFS may be applied to fibers and/or yarn having a weight ($g/m^2$) of less than about 1 $g/m^2$, or less than about 2 $g/m^2$, or less than about 3 $g/m^2$, or less than about 4 $g/m^2$, or less than about 5 $g/m^2$, or less than about 6 $g/m^2$, or less than about 7 $g/m^2$, or less than about 8 $g/m^2$, or less than about 9 $g/m^2$, or less than about 10 $g/m^2$, or less than about 20 $g/m^2$, or less than about 30 $g/m^2$, or less than about 40 $g/m^2$, or less than about 50 $g/m^2$, or less than about 60 $g/m^2$, or less than about 70 $g/m^2$, or less than about 80 $g/m^2$, or less than about 90 $g/m^2$, or less than about 100 $g/m^2$, or less than about 200 $g/m^2$, or less than about 300 $g/m^2$, or less than about 400 $g/m^2$, or less than about 500 $g/m^2$.

In some embodiments, SFS may be applied to fibers and/or yarn having a weight ($g/m^2$) of at greater than about 1 $g/m^2$, or greater than about 2 $g/m^2$, or greater than about 3 $g/m^2$, or greater than about 4 $g/m^2$, or greater than about 5 $g/m^2$, or greater than about 6 $g/m^2$, or greater than about 7 $g/m^2$, or greater than about 8 $g/m^2$, or greater than about 9 $g/m^2$, or greater than about 10 $g/m^2$, or greater than about 20 $g/m^2$, or greater than about 30 $g/m^2$, or greater than about 40 $g/m^2$, or greater than about 50 $g/m^2$, or greater than about 60 $g/m^2$, or greater than about 70 $g/m^2$, or greater than about 80 $g/m^2$, or greater than about 90 $g/m^2$, or greater than about 100 $g/m^2$, or greater than about 200 $g/m^2$, or greater than about 300 $g/m^2$, or greater than about 400 $g/m^2$, or greater than about 500 $g/m^2$.

In some embodiments, SFS may be applied to fabric having a thickness of less than about 100 nm, or less than about 200 nm, or less than about 300 nm, or less than about 400 nm, or less than about 500 nm, or less than about 600 nm, or less than about 700 nm, or less than about 800 nm, or less than about 900 nm, or less than about 1000 nm, or less than about 2 μm, or less than about 5 μm, or less than about 10 μm, or less than about 20 μm, or less than about 30 μm, or less than about 40 μm, or less than about 50 μm, or less than about 60 μm, or less than about 70 μm, or less than about 80 μm, or less than about 90 μm, or less than about 100 μm, or less than about 200 μm, or less than about 300 μm, or less than about 400 μm, or less than about 500 μm, or less than about 600 μm, or less than about 700 μm, or less than about 800 μm, or less than about 900 μm, or less than about 1000 μm, or less than about 2 mm, or less than about 3 mm, or less than about 4 mm, or less than about 5 mm, 6 mm, or less than about 7 mm, or less than about 8 mm, or less than about 9 mm, or less than about 10 mm.

In some embodiments, SFS may be applied to fabric having a thickness of greater than about 100 nm, or greater than about 200 nm, or greater than about 300 nm, or greater than about 400 nm, or greater than about 500 nm, or greater than about 600 nm, or greater than about 700 nm, or greater than about 800 nm, or greater than about 900 nm, or greater than about 1000 nm, or greater than about 2 μm, or greater than about 5 μm, or greater than about 10 μm, or greater than about 20 μm, or greater than about 30 μm, or greater than about 40 μm, or greater than about 50 μm, or greater than about 60 μm, or greater than about 70 μm, or greater than about 80 μm, or greater than about 90 μm, or greater than about 100 μm, or greater than about 200 μm, or greater than about 300 μm, or greater than about 400 μm, or greater than about 500 μm, or greater than about 600 μm, or greater than about 700 μm, or greater than about 800 μm, or greater than about 900 μm, or greater than about 1000 μm, or greater than about 2 mm, or greater than about 3 mm, or greater than about 4 mm, or greater than about 5 mm, 6 mm, or greater than about 7 mm, or greater than about 8 mm, or greater than about 9 mm, or greater than about 10 mm.

In some embodiments, SFS may be applied to fabric having a width of less than about 100 nm, or less than about 200 nm, or less than about 300 nm, or less than about 400 nm, or less than about 500 nm, or less than about 600 nm, or less than about 700 nm, or less than about 800 nm, or less than about 900 nm, or less than about 1000 nm, or less than about 2 μm, or less than about 5 μm, or less than about 10 μm, or less than about 20 μm, or less than about 30 μm, or less than about 40 μm, or less than about 50 μm, or less than about 60 μm, or less than about 70 μm, or less than about 80 μm, or less than about 90 μm, or less than about 100 μm, or less than about 200 μm, or less than about 300 μm, or less than about 400 μm, or less than about 500 μm, or less than about 600 μm, or less than about 700 μm, or less than about 800 μm, or less than about 900 μm, or less than about 1000 μmm, or less than about 2 mm, or less than about 3 mm, or less than about 4 mm, or less than about 5 mm, 6 mm, or less than about 7 mm, or less than about 8 mm, or less than about 9 mm, or less than about 10 mm, or less than about 20 mm, or less than about 30 mm, or less than about 40 mm, or less than about 50 mm, or less than about 60 mm, or less than about 70 mm, or less than about 80 mm, or less than about 90 mm, or less than about 100 mm, or less than about 200 mm, or less than about 300 mm, or less than about 400 mm, or less than about 500 mm, or less than about 600 mm, or less than about 700 mm, or less than about 800 mm, or less than about 900 mm, or less than about 1000 mm, or less than about 2 m, or less than about 3 m, or less than about 4 m, or less than about 5 m.

In some embodiments, SFS may be applied to fabric having a width of greater than about 100 nm, or greater than about 200 nm, or greater than about 300 nm, or greater than about 400 nm, or greater than about 500 nm, or greater than about 600 nm, or greater than about 700 nm, or greater than about 800 nm, or greater than about 900 nm, or greater than about 1000 nm, or greater than about 2 μm, or greater than about 5 μm, or greater than about 10 μm, or greater than about 20 μm, or greater than about 30 μm, or greater than about 40 μm, or greater than about 50 μm, or greater than about 60 μm, or greater than about 70 μm, or greater than about 80 μm, or greater than about 90 μm, or greater than about 100 μm, or greater than about 200 μm, or greater than about 300 μm, or greater than about 400 μm, or greater than about 500 μm, or greater than about 600 μm, or greater than about 700 μm, or greater than about 800 μm, or greater than about 900 μm, or greater than about 1000 μm, or greater than about 2 mm, or greater than about 3 mm, or greater than about 4 mm, or greater than about 5 mm, 6 mm, or greater than about 7 mm, or greater than about 8 mm, or greater than about 9 mm, or greater than about 10 mm, or greater than about 20 mm, or greater than about 30 mm, or greater than about 40 mm, or greater than about 50 mm, or greater than about 60 mm, or greater than about 70 mm, or greater than about 80 mm, or greater than about 90 mm, or greater than about 100 mm, or greater than about 200 mm, or greater than about 300 mm, or greater than about 400 mm, or greater than about 500 mm, or greater than about 600 mm, or greater than about 700 mm, or greater than about 800 mm, or greater than about 900 mm, or greater than about 1000 mm, or greater than about 2 m, or greater than about 3 m, or greater than about 4 m, or greater than about 5 m.

In some embodiments, SFS may be applied to fabric having a length of less than about 100 nm, or less than about 200 nm, or less than about 300 nm, or less than about 400 nm, or less than about 500 nm, or less than about 600 nm, or less than about 700 nm, or less than about 800 nm, or less than about 900 nm, or less than about 1000 nm, or less than about 2 μm, or less than about 5 μm, or less than about 10 μm, or less than about 20 μm, or less than about 30 μm, or less than about 40 μm, or less than about 50 μm, or less than about 60 μm, or less than about 70 μm, or less than about 80 μm, or less than about 90 μm, or less than about 100 μm, or less than about 200 μm, or less than about 300 μm, or less than about 400 μm, or less than about 500 μm, or less than about 600 μm, or less than about 700 μm, or less than about 800 μm, or less than about 900 μm, or less than about 1000 μm, or less than about 2 mm, or less than about 3 mm, or less than about 4 mm, or less than about 5 mm, 6 mm, or less than about 7 mm, or less than about 8 mm, or less than about 9 mm, or less than about 10 mm, or less than about 20 mm, or less than about 30 mm, or less than about 40 mm, or less than about 50 mm, or less than about 60 mm, or less than about 70 mm, or less than about 80 mm, or less than about 90 mm, or less than about 100 mm, or less than about 200 mm, or less than about 300 mm, or less than about 400 mm, or less than about 500 mm, or less than about 600 mm, or less than about 700 mm, or less than about 800 mm, or less than about 900 mm, or less than about 1000 mm.

In some embodiments, SFS may be applied to fabric having a length of greater than about 100 nm, or greater than about 200 nm, or greater than about 300 nm, or greater than about 400 nm, or greater than about 500 nm, or greater than about 600 nm, or greater than about 700 nm, or greater than about 800 nm, or greater than about 900 nm, or greater than about 1000 nm, or greater than about 2 μm, or greater than about 5 μm, or greater than about 10 μm, or greater than about 20 μm, or greater than about 30 μm, or greater than about 40 μm, or greater than about 50 μm, or greater than about 60 μm, or greater than about 70 μm, or greater than about 80 μm, or greater than about 90 μm, or greater than about 100 μm, or greater than about 200 μm, or greater than about 300 μm, or greater than about 400 μm, or greater than about 500 μm, or greater than about 600 μm, or greater than about 700 μmm, or greater than about 800 μmm, or greater than about 900 μmm, or greater than about 1000 μmm, or greater than about 2 mm, or greater than about 3 mm, or greater than about 4 mm, or greater than about 5 mm, 6 mm, or greater than about 7 mm, or greater than about 8 mm, or greater than about 9 mm, or greater than about 10 mm, or greater than about 20 mm, or greater than about 30 mm, or greater than about 40 mm, or greater than about 50 mm, or greater than about 60 mm, or greater than about 70 mm, or greater than about 80 mm, or greater than about 90 mm, or greater than about 100 mm, or greater than about 200 mm, or greater than about 300 mm, or greater than about 400 mm, or greater than about 500 mm, or greater than about 600 mm, or greater than about 700 mm, or greater than about 800 mm, or greater than about 900 mm, or greater than about 1000 mm.

In some embodiments, SFS may be applied to fabric having a stretch percentage of less than about 1%, or less than about 2%, or less than about 3%, or less than about 4%, or less than about 5%, or less than about 6%, or less than about 7%, or less than about 8%, or less than about 9%, or less than about 10%, or less than about 20%, or less than about 30%, or less than about 40%, or less than about 50%, or less than about 60%, or less than about 70%, or less than about 80%, or less than about 90%, or less than about 100, or less than about 110%, or less than about 120%, or less than about 130%, or less than about 140%, or less than about 150%, or less than about 160%, or less than about 170%, or less than about 180%, or less than about 190%, or less than about 200%. Stretch percentage may be determined for a fabric having an unstretched width and stretching the fabric to a stretched width, then subtracting the unstretched width from the stretched width to yield the net stretched width, then dividing the net stretched width and multiplying the quotient by 100 to find the stretch percentage (%)

$$\left(.\text{Stretch Percentage} = \frac{(\text{Stretched Width} - \text{Unstretched Width})}{\text{Unstretched Width}} * 100\right).$$

In some embodiments, SFS may be applied to fabric having a stretch percentage of greater than about 1%, or greater than about 2%, or greater than about 3%, or greater than about 4%, or greater than about 5%, or greater than about 6%, or greater than about 7%, or greater than about 8%, or greater than about 9%, or greater than about 10%, or greater than about 20%, or greater than about 30%, or greater than about 40%, or greater than about 50%, or greater than about 60%, or greater than about 70%, or greater than about 80%, or greater than about 90%, or greater than about 100, or greater than about 110%, or greater than about 120%, or greater than about 130%, or greater than about 140%, or greater than about 150%, or greater than about 160%, or greater than about 170%, or greater than about 180%, or greater than about 190%, or greater than about 200%

In some embodiments, SFS may be applied to fabric having a tensile energy (N/cm$^2$) of less than about 1 cN/cm$^2$, or less than about 2 cN/cm$^2$, or less than about 3 cN/cm$^2$, or less than about 4 cN/cm$^2$, or less than about 5 cN/cm$^2$, or less than about 5 cN/cm$^2$, or less than about 6 cN/cm$^2$, or less than about 7 cN/cm$^2$, or less than about 8 cN/cm$^2$, or less than about 9 cN/cm$^2$, or less than about 10 cN/cm$^2$, or less than about 20 cN/cm$^2$, or less than about 30 cN/cm$^2$, or less than about 40 cN/cm$^2$, or less than about 50 cN/cm$^2$, or less than about 60 cN/cm$^2$, or less than about 70 cN/cm$^2$, or less than about 80 cN/cm$^2$, or less than about 90 cN/cm$^2$, or less than about 100 cN/cm$^2$, or less than about 2 N/cm$^2$, or less than about 3 N/cm$^2$, or less than about 4 N/cm$^2$, or less than about 5 N/cm$^2$, or less than about 6 N/cm$^2$, or less than about 7 N/cm$^2$, or less than about 8 N/cm$^2$, or less than about 9 N/cm$^2$, or less than about 10 N/cm$^2$, or less than about 20 N/cm$^2$, or less than about 30 N/cm$^2$, or less than about 40 N/cm$^2$, or less than about 50 N/cm$^2$, or less than about 60 N/cm$^2$, or less than about 70 N/cm$^2$, or less than about 80 N/cm$^2$, or less than about 90 N/cm$^2$, or less than about 100 N/cm$^2$, or less than about 150 N/cm$^2$, or less than about 200 N/cm$^2$.

In some embodiments, SFS may be applied to fabric having a tensile energy (N/cm$^2$) of greater than about 1 cN/cm$^2$, or greater than about 2 cN/cm$^2$, or greater than about 3 cN/cm$^2$, or greater than about 4 cN/cm$^2$, or greater than about 5 cN/cm$^2$, or greater than about 5 cN/cm$^2$, or greater than about 6 cN/cm$^2$, or greater than about 7 cN/cm$^2$, or greater than about 8 cN/cm$^2$, or greater than about 9 cN/cm$^2$, or greater than about 10 cN/cm$^2$, or greater than about 20 cN/cm$^2$, or greater than about 30 cN/cm$^2$, or greater than about 40 cN/cm$^2$, or greater than about 50 cN/cm$^2$, or greater than about 60 cN/cm$^2$, or greater than about 70 cN/cm$^2$, or greater than about 80 cN/cm$^2$, or greater than about 90 cN/cm$^2$, or greater than about 100 cN/cm$^2$, or greater than about 2 N/cm$^2$, or greater than about 3 N/cm$^2$, or greater than about 4 N/cm$^2$, or greater than about 5 N/cm$^2$, or greater than about 6 N/cm$^2$, or greater than about 7 N/cm$^2$, or greater than about 8 N/cm$^2$, or greater than about 9 N/cm$^2$, or greater than about 10 N/cm$^2$, or greater than about 20 N/cm$^2$, or greater than about 30 N/cm$^2$, or greater than about 40 N/cm$^2$, or greater than about 50 N/cm$^2$, or greater than about 60 N/cm$^2$, or greater than about 70 N/cm$^2$, or greater than about 80 N/cm$^2$, or greater than about 90 N/cm$^2$, or greater than about 100 N/cm$^2$, or greater than about 150 N/cm$^2$, or greater than about 200 N/cm$^2$.

In some embodiments, SFS may be applied to fabric having a shear rigidity (N/cm-degree) of less than about 1 cN/cm-degree, or less than about 2 cN/cm-degree, or less than about 3 cN/cm-degree, or less than about 4 cN/cm-degree, or less than about 5 cN/cm-degree, or less than about 5 cN/cm-degree, or less than about 6 cN/cm-degree, or less than about 7 cN/cm-degree, or less than about 8 cN/cm-degree, or less than about 9 cN/cm-degree, or less than about 10 cN/cm-degree, or less than about 20 cN/cm-degree, or less than about 30 cN/cm-degree, or less than about 40 cN/cm-degree, or less than about 50 cN/cm-degree, or less than about 60 cN/cm-degree, or less than about 70 cN/cm-degree, or less than about 80 cN/cm-degree, or less than about 90 cN/cm-degree, or less than about 100 cN/cm-degree, or less than about 2 N/cm-degree, or less than about 3 N/cm-degree, or less than about 4 N/cm-degree, or less than about 5 N/cm-degree, or less than about 6 N/cm-degree, or less than about 7 N/cm-degree, or less than about 8 N/cm-degree, or less than about 9 N/cm-degree, or less than about 10 N/cm-degree, or less than about 20 N/cm-degree, or less than about 30 N/cm-degree, or less than about 40 N/cm-degree, or less than about 50 N/cm-degree, or less than about 60 N/cm-degree, or less than about 70 N/cm-degree, or less than about 80 N/cm-degree, or less than about 90 N/cm-degree, or less than about 100 N/cm-degree, or less than about 150 N/cm-degree, or less than about 200 N/cm-degree.

In some embodiments, SFS may be applied to fabric having a shear rigidity (N/cm-degree) of greater than about 1 cN/cm-degree, or greater than about 2 cN/cm-degree, or greater than about 3 cN/cm-degree, or greater than about 4 cN/cm-degree, or greater than about 5 cN/cm-degree, or greater than about 5 cN/cm-degree, or greater than about 6 cN/cm-degree, or greater than about 7 cN/cm-degree, or greater than about 8 cN/cm-degree, or greater than about 9 cN/cm-degree, or greater than about 10 cN/cm-degree, or greater than about 20 cN/cm-degree, or greater than about 30 cN/cm-degree, or greater than about 40 cN/cm-degree, or greater than about 50 cN/cm-degree, or greater than about 60 cN/cm-degree, or greater than about 70 cN/cm-degree, or greater than about 80 cN/cm-degree, or greater than about 90 cN/cm-degree, or greater than about 100 cN/cm-degree, or greater than about 2 N/cm-degree, or greater than about 3 N/cm-degree, or greater than about 4 N/cm-degree, or greater than about 5 N/cm-degree, or greater than about 6 N/cm-degree, or greater than about 7 N/cm-degree, or greater than about 8 N/cm-degree, or greater than about 9 N/cm-degree, or greater than about 10 N/cm-degree, or greater than about 20 N/cm-degree, or greater than about 30 N/cm-degree, or greater than about 40 N/cm-degree, or greater than about 50 N/cm-degree, or greater than about 60 N/cm-degree, or greater than about 70 N/cm-degree, or greater than about 80 N/cm-degree, or greater than about 90 N/cm-degree, or greater than about 100 N/cm-degree, or greater than about 150 N/cm-degree, or greater than about 200 N/cm-degree.

In some embodiments, SFS may be applied to fabric having a bending rigidity (N·cm$^2$/cm) of less than about 1 cN·cm$^2$/cm, or less than about 2 cN·cm$^2$/cm, or less than about 3 cN·cm$^2$/cm, or less than about 4 cN·cm$^2$/cm, or less than about 5 cN·cm$^2$/cm, or less than about 5 cN·cm$^2$/cm, or less than about 6 cN·cm$^2$/cm, or less than about 7 cN·cm$^2$/cm, or less than about 8 cN·cm$^2$/cm, or less than about 9 cN·cm$^2$/cm, or less than about 10 cN·cm$^2$/cm, or less than about 20 cN·cm$^2$/cm, or less than about 30 cN·cm$^2$/cm, or less than about 40 cN·cm$^2$/cm, or less than about 50 cN·cm$^2$/cm, or less than about 60 cN·cm$^2$/cm, or less than about 70 cN·cm$^2$/cm, or less than about 80 cN·cm$^2$/cm, or less than about 90 cN·cm$^2$/cm, or less than about 100 cN·cm$^2$/cm, or less than about 2 N·cm$^2$/cm, or less than about 3 N·cm$^2$/cm, or less than about 4 N·cm$^2$/cm, or less than about 5 N·cm$^2$/cm, or less than about 6 N·cm$^2$/cm, or less than about 7 N·cm$^2$/cm, or less than about 8 N·cm$^2$/cm, or less than about 9 N·cm$^2$/cm, or less than about 10 N·cm$^2$/cm, or less than about 20 N·cm$^2$/cm, or less than about 30 N·cm$^2$/cm, or less than about 40 N·cm$^2$/cm, or less than about 50 N·cm$^2$/cm, or less than about 60 N·cm$^2$/cm, or less than about 70 N·cm$^2$/cm, or less than about 80 N·cm$^2$/cm, or less than about 90 N·cm$^2$/cm, or less than about 100 N·cm$^2$/cm, or less than about 150 N·cm$^2$/cm, or less than about 200 N·cm$^2$/cm.

In some embodiments, SFS may be applied to fabric having a bending rigidity (N·cm$^2$/cm) of greater than about 1 cN·cm$^2$/cm, or greater than about 2 cN·cm$^2$/cm, or greater than about 3 cN·cm$^2$/cm, or greater than about 4 cN·cm$^2$/cm, or greater than about 5 cN·cm$^2$/cm, or greater than about 5 cN·cm$^2$/cm, or greater than about 6 cN·cm$^2$/cm, or greater than about 7 cN·cm$^2$/cm, or greater than about 8 cN·cm$^2$/cm, or greater than about 9 cN·cm$^2$/cm, or greater than about 10 cN·cm$^2$/cm, or greater than about 20 cN·cm$^2$/cm, or greater than about 30 cN·cm$^2$/cm, or greater than about 40 cN·cm$^2$/cm, or greater than about 50 cN·cm$^2$/cm, or greater than about 60 cN·cm$^2$/cm, or greater than about 70 cN·cm$^2$/cm, or greater than about 80 cN·cm$^2$/cm, or greater than about 90 cN·cm$^2$/cm, or greater than about 100 cN·cm$^2$/cm, or greater than about 2 N·cm$^2$/cm, or greater than about 3 N·cm$^2$/cm, or greater than about 4 N·cm$^2$/cm, or greater than about 5 N·cm$^2$/cm, or greater than about 6 N·cm$^2$/cm, or greater than about 7 N·cm$^2$/cm, or greater than about 8 N·cm$^2$/cm, or greater than about 9 N·cm$^2$/cm, or greater than about 10 N·cm$^2$/cm, or greater than about 20 N·cm$^2$/cm, or greater than about 30 N·cm$^2$/cm, or greater than about 40 N·cm$^2$/cm, or greater than about 50 N·cm$^2$/cm, or greater than about 60 N·cm$^2$/cm, or greater than about 70 N·cm$^2$/cm, or greater than about 80 N·cm$^2$/cm, or greater than about 90 N·cm$^2$/cm, or greater than about 100 N·cm$^2$/cm, or greater than about 150 N·cm$^2$/cm, or greater than about 200 N·cm$^2$/cm.

In some embodiments, SFS may be applied to fabric having a compression energy (N·cm/cm$^2$) of less than about 1 cN·cm/cm$^2$, or less than about 2 cN·cm/cm$^2$, or less than about 3 cN·cm/cm$^2$, or less than about 4 cN·cm/cm$^2$, or less than about 5 cN·cm/cm$^2$, or less than about 5 cN·cm/cm$^2$, or less than about 6 cN·cm/cm$^2$, or less than about 7 cN·cm/cm$^2$, or less than about 8 cN·cm/cm$^2$, or less than about 9 cN·cm/cm$^2$, or less than about 10 cN·cm/cm$^2$, or less than about 20 cN·cm/cm$^2$, or less than about 30 cN·cm/cm$^2$, or less than about 40 cN·cm/cm$^2$, or less than about 50 cN·cm/cm$^2$, or less than about 60 cN·cm/cm$^2$, or less than about 70 cN·cm/cm$^2$, or less than about 80 cN·cm/cm$^2$, or less than about 90 cN·cm/cm$^2$, or less than about 100 cN·cm/cm$^2$, or less than about 2 N·cm/cm$^2$, or less than about 3 N·cm/cm$^2$, or less than about 4 N·cm/cm$^2$, or less than about 5 N·cm/cm$^2$, or less than about 6 N·cm/cm$^2$, or less than about 7 N·cm/cm$^2$, or less than about 8 N·cm/cm$^2$, or less than about 9 N·cm/cm$^2$, or less than about 10 N·cm/cm$^2$, or less than about 20 N·cm/cm$^2$, or less than about 30 N·cm/cm$^2$, or less than about 40 N·cm/cm$^2$, or less than about 50 N·cm/cm$^2$, or less than about 60 N·cm/cm$^2$, or less than about 70 N·cm/cm$^2$, or less than about 80 N·cm/cm$^2$, or less than about 90 N·cm/cm$^2$, or less than about 100 N·cm/cm$^2$, or less than about 150 N·cm/cm$^2$, or less than about 200 N·cm/cm$^2$.

In some embodiments, SFS may be applied to fabric having a compression energy (N·cm/cm$^2$) of greater than about 1 cN·cm/cm$^2$, or greater than about 2 cN·cm/cm$^2$, or greater than about 3 cN·cm/cm$^2$, or greater than about 4 cN·cm/cm$^2$, or greater than about 5 cN·cm/cm$^2$, or greater than about 5 cN·cm/cm$^2$, or greater than about 6 cN·cm/cm$^2$, or greater than about 7 cN·cm/cm$^2$, or greater than about 8 cN·cm/cm$^2$, or greater than about 9 cN·cm/cm$^2$, or greater than about 10 cN·cm/cm$^2$, or greater than about 20 cN·cm/cm$^2$, or greater than about 30 cN·cm/cm$^2$, or greater than about 40 cN·cm/cm$^2$, or greater than about 50 cN·cm/cm$^2$, or greater than about 60 cN·cm/cm$^2$, or greater than about 70 cN·cm/cm$^2$, or greater than about 80 cN·cm/cm$^2$, or greater than about 90 cN·cm/cm$^2$, or greater than about 100 cN·cm/cm$^2$, or greater than about 2 N·cm/cm$^2$, or greater than about 3 N·cm/cm$^2$, or greater than about 4 N·cm/cm$^2$, or greater than about 5 N·cm/cm$^2$, or greater than about 6 N·cm/cm$^2$, or greater than about 7 N·cm/cm$^2$, or greater than about 8 N·cm/cm$^2$, or greater than about 9 N·cm/cm$^2$, or greater than about 10 N·cm/cm$^2$, or greater than about 20 N·cm/cm$^2$, or greater than about 30 N·cm/cm$^2$, or greater than about 40 N·cm/cm$^2$, or greater than about 50 N·cm/cm$^2$, or greater than about 60 N·cm/cm$^2$, or greater than about 70 N·cm/cm$^2$, or greater than about 80 N·cm/cm$^2$, or greater than about 90 N·cm/cm$^2$, or greater than about 100 N·cm/cm$^2$, or greater than about 150 N·cm/cm$^2$, or greater than about 200 N·cm/cm$^2$.

In some embodiments, SFS may be applied to fabric having a coefficient of friction of less than about 0.04, or less than about 0.05, or less than about 0.06, or less than about 0.07, or less than about 0.08, or less than about 0.09, or less than about 0.10, or less than about 0.10, or less than about 0.15, or less than about 0.20, or less than about 0.25, or less than about 0.30, or less than about 0.35, or less than about 0.40, or less than about 0.45, or less than about 0.50, or less than about 0.55, or less than about 0.60, or less than about 0.65, or less than about 0.70, or less than about 0.75, or less than about 0.80, or less than about 0.85, or less than about 0.90, or less than about 0.95, or less than about 1.00, or less than about 1.05.

In some embodiments, SFS may be applied to fabric having a coefficient of friction of greater than about 0.04, or greater than about 0.05, or greater than about 0.06, or greater than about 0.07, or greater than about 0.08, or greater than about 0.09, or greater than about 0.10, or greater than about 0.10, or greater than about 0.15, or greater than about 0.20, or greater than about 0.25, or greater than about 0.30, or greater than about 0.35, or greater than about 0.40, or greater than about 0.45, or greater than about 0.50, or greater than about 0.55, or greater than about 0.60, or greater than about 0.65, or greater than about 0.70, or greater than about 0.75, or greater than about 0.80, or greater than about 0.85, or greater than about 0.90, or greater than about 0.95, or greater than about 1.00, or greater than about 1.05.

In some embodiments, chemical finishes may be applied to textiles before or after such textiles are coated with SFS. In an embodiment, chemical finishing may be intended as the application of chemical agents and/or SFS to textiles, including fibers, yarn, and fabric, or to garments that are prepared by such fibers, yarn, and fabric to modify the original textile's or garment's properties and achieve properties in the textile or garment that would be otherwise absent. With chemical finishes, textiles treated with such chemical finishes may act as surface treatments and/or the treatments may modify the elemental analysis of treated textile base polymers.

In an embodiment, a type of chemical finishing may include the application of certain silk-fibroin based solutions to textiles. For example, SFS may be applied to a fabric after it is dyed, but there are also scenarios that may require the application of SFS during processing, during dyeing, or after a garment is assembled from a selected textile or fabric, thread, or yarn. In some embodiments, after its application, SFS may be dried with the use of heat. SFS may then be fixed to the surface of the textile in a processing step called curing.

In some embodiments, SFS may be supplied in a concentrated form suspended in water. In some embodiments, SFS may have a concentration by weight (% w/w or w/v) or by volume (v/v) of less than about 50%, or less than about 45%, or less than about 40%, or less than about 35%, or less than about 30%, or less than about 25%, or less than about 20%, or less than about 15%, or less than about 10%, or less than about 5%, or less than about 4%, or less than about 3%, or less than about 2%, or less than about 1%, or less than about 0.1%, or less than about 0.01%, or less than about 0.001%, or less than about 0.0001%, or less than about 0.00001%. In some embodiments, SFS may have a concentration by weight (% w/w or % w/v) or by volume (v/v) of greater than about 50%, or greater than about 45%, or greater than about 40%, or greater than about 35%, or greater than about 30%, or greater than about 25%, or greater than about 20%, or greater than about 15%, or greater than about 10%, or greater than about 5%, or greater than about 4%, or greater than about 3%, or greater than about 2%, or greater than about 1%, or greater than about 0.1%, or greater than about 0.01%, or greater than about 0.001%, or greater than about 0.0001%, or greater than about 0.00001%.

In some embodiments, the solution concentration and the wet pick of the material determines the amount of silk fibroin solution (SFS), which may include silk-based proteins or fragments thereof, that may be fixed or otherwise adhered to the textile being coated. The wet pick up may be expressed by the following formula:

$$\text{wet pick up (\%)} = \frac{\text{weight of } SFS \text{ applied} \times 100}{\text{weight of dry textile material}}.$$

The total amount of SFS added to the textile material may be expressed by the following formula:

$$SFS \text{ added (\%)} = \frac{\text{weight of dry } SFS \text{ coated textile material} \times 100}{\text{weight of dry textile material before coating}}.$$

Regarding methods for applying SFS to textiles more broadly, SFS may be applied to textiles through a pad or roller application on process, a saturation and removal process, and/or a topical application process. Moreover, the methods of silk application (i.e., SFS application or coating) may include bath coating, kiss rolling, spray coating, and/or two-sided rolling. In some embodiments, the coating processes (e.g., bath coating, kiss rolling, spray coating, two-sided rolling, roller application, saturation and removal application, and/or topical application), drying processes, and curing processes may be varied as described herein to modify one or more selected textile (e.g., fabric) properties of the resulting coated textile wherein such properties include, but are not limited to wetting time, absorption rate, spreading speed, accumulative one-way transport, and/or overall moisture management capability. In some embodiments, the aforementioned selected properties may be enhanced by varying one or more of the coating processes, drying processes, and curing processes as described herein.

In an embodiment, the padder application may be used on dry or wet textile. For example, it may be applied on fabric after the dyeing process. The fabric may be fed into a water bath solution and may reach saturation. The fabric to be coated may then pass through a set of rollers that, based on multiple variables, extract the bath solution in excess to the desired wet pick up %. The variables that affect the wet pick up % are the roller pressure and materials, the fabric composition and construction, and the SFS viscosity. An exemplary padder roller configuration is shown in FIG. 317.

In an embodiment, the padder application on wet textile may be used to reduce the cost of drying the fabric post dyeing. The fabric exiting the pad rollers may maintain a higher weight % than the incoming fabric to maintain a SFS deposit on the fabric; and the SFS solution may need to account for any dilution taking place due to water present on the incoming fabric.

In an embodiment, the saturation and removal application is a low wet pick up method that may, for example, solve some of the issues associated with removing large amounts of water during drying processes. Since fabric may dry in an oven from the outside surface towards the inside, water may move from the inside to the outside resulting in a higher coating concentration on the outside surface. With less water content, migration may be reduced due to a higher viscosity in the solution. However, decreased wet pick up may result in an uneven solution deposit.

In an embodiment, vacuum extraction may be used as a method for low wet pick up. Saturated fabric may be subject to a vacuum that pulls solution out of the fabric and returns it to an application loop. Air jet ejection may be a method for providing low wet pick up. The saturated fabric may be subjected to high pressure steam that removes solution out of the fabric and returns it to an application loop.

In an embodiment, a porous bowl method may be used for low wet pick up. Solid pad rollers may be substituted with rubber coated fiber rollers. Saturated fabric may be subjected to the pressure of the roller since the porosity of the rollers may allow for more solution to be squeezed from the fabric.

In an embodiment, a transfer padding method may be used for low wet pick up. Saturated fabric may be passed through two continuous dry non-woven fabrics and may be pressed at low pressure. The non-woven fabrics may extract excess solution from the fabric being treated.

In an embodiment, topical application may be used as a low wet pick up method of application that deposits the desired amount of SFS to the fabric without removing any excess material. The methods described above may be used for one-sided coating applications, but there are variations that may allow for two-sided coating.

In an embodiment, kiss rolling may be used as a topical method of application that transfers the SFS from a roller (i.e., a kiss roller) to one side of the fabric. The solution viscosity, roller surface finish, speed of the roller, speed of the fabric, contact angle of the fabric on the roller and properties of the fabric are parameters that control the amount of solution deposited on the fabric. An exemplary kiss roller is depicted in FIG. 318.

In an embodiment, a variation to the kiss roller technique may be the Triatex MA system that uses two moisture content sensors to determine the solution pick up at the kiss roller and adjust the kiss roller controllable variable to maintain consistent the solution deposit onto the fabric.

In an embodiment, a loop transfer application may be used as a topical method of application that transfers the SFS from a saturated loop fabric to the fabric to be coated between low pressure pad rollers. There is a two rollers version that may allow for minimum contact with the fabric and a three rollers version that allows for greater contact with the fabric.

In an embodiment, an engrave roller application may be used as a topical method of application that may transfer a metered amount of SFS onto the fabric. This may be achieved by engraving a pattern on the surface of the roller with precise depth and design that contains a controlled amount of SFS. A blade may be used to remove any solution that is deposited on the surface of the roller in order to maintain a consistent transfer of solution to the fabric to be coated.

In an embodiment, rotary screen printing may be used as a topical method of application that may deposit SFS onto the fabric by seeping the solution through a roller screen. The solution may be contained in the screen print roller core at a set level while a blade may be used to remove any excess solution from the interior roller wall, providing a clean surface for the next revolution of the screen printer roller.

In an embodiment, magnetic roller coating may be used as a topical method of application that may deposit SFS from a kiss roller onto the fabric to be coated. The kiss roller is semi-submersed in a bath solution while a magnetic field created in the fabric driving roller determines the amount of pressure applied by the kiss roller, controlling the solution pick up rate.

In an embodiment, spraying may be used as a topical method of application that may transfer SFS onto the fabric by nebulizing the solution. The spray pattern may be controlled by the nozzle pattern, size, and the air flow. Spray application may be used for one side application or also two sided application.

In an embodiment, foam application may be used a topical method of application that may transfer SFS onto the fabric. Foam may be made by substituting part of the water in the solution with air therefore reducing the amount of water to be applied to the fabric. Foam application may be used for one-sided application or two-sided application where the same foam may be deposited through a squeeze roller or different foam solutions may be provided through transfer rolls or through a slot applicator.

In an embodiment, the application of SFS may take place after a garment is assembled. In an embodiment, the process may take place in a washing and dyeing machine or in a spray booth. For example, a washing and dyeing machine may be similar in shape to a household front loader washing machine, it allows the process to take place at exhaustion post dyeing or with an independent processing cycle. In an embodiment, a spray booth machine may include a manual or a fully automated process. For example, a garment may be held by a mannequin while an operator or an anthropomorphic robot may spray the solution onto the fabric.

In an embodiment, SFS may be a water based solution that, after its application to the textile, may require thermal vaporization to infuse the SFS onto the textile. Thermal vaporization may be applied by heat transfer through radiation with equipment such as infrared or radio frequency dryer.

In an embodiment, thermal vaporization may be applied by convection through heated air circulating in an oven to the required temperature, while the fabric is clamped and is transported by a conveyor. This allows full control on fabric width dimension.

In an embodiment, thermal vaporization may be applied by conduction through contacting the textile with heated cylinder or calendar cylinder. Since the fabric is not clamp there is minimal control on fabric width.

In an embodiment, curing of the SFS on the textile may be completed with the same equipment used for the thermal vaporization in a continuous cycle or in a separate cycle.

In an embodiment, curing time temperature may be dependent the textile polymer content and the binding method of preference for the SFS with the specific polymer. The curing process may not start until the thermal vaporization is completed.

In some embodiments, sensor may be used to monitor SFS deposition on the textile and the drying and curing steps.

In some embodiments, for monitoring the deposition of SFS, a contactless sensor, like the one supplied by Pleva model AF120 based on microwave absorption of water, may be used. Measurement of the material moisture may be based on microwave absorption by water. A semiconductor oscillator transmits microwave energy through the web. The non-absorbed part of the energy may be received on the opposite side by a microwave receiver. The amount of absorption is a measurement of the absolute moisture content. The microwave sensor is capable of detecting and measuring water content from a minimum of 0 up to 2000 $gH_2O/m^2$.

In some embodiments, for wide fabric processing multiple sensor may be paired side by side, delivering the data analysis to a centralized control system loop capable to add more solution in the area of the fabric that is low.

In some embodiments, another sensor may be used that is based on microwave technology, such as Aqualot by Mahlo. The sensor may evaluate the shift in the resonant frequency of the two standing waves with respect to each other rather than the attenuation of the microwaves by the quantity of water molecules in the measuring gap.

In some embodiments, another contactless sensor for SFS may be the IR-3000 by MoistTech based on near infrared sensing technology. The sensor measures the amount of near infrared energy reflected at a given wavelength that is inversely proportional to the quantity of absorbing molecules in the fabric.

In some embodiments, the residual moister at the end of the curing process may be measured to further confirm the drying and curing process. In addition to the above sensor, a contact sensor such as the Textometer RMS by Mahlo may be used for measuring moister through conductivity.

In some embodiments, monitoring the end of the drying process phase may be achieved by measuring the fabric temperature with a contactless temperature sensor. When wet product enters the dryer, it first heats up to the cooling limit temperature. In some embodiments, when the water content drops to residual moisture levels, the product temperature may begin to rise again. The closer the product temperature approaches the circulation air temperature in the dryer, the slower the temperature continues to rise. In some embodiments, at a certain temperature threshold (called the fixing temperature) the temperature necessary for processing, fixing, or condensing is reached.

In some embodiments, to determine the dwell time for a desired product temperature, the surface temperature of the product may be measured without contact at several locations in the dryer using high-temperature resistant infrared pyrometers. Mahlo Permaset VMT is an infrarem Pyrometer that may be assembled in multiple units to monitors temperature through the dryer. Setex is another manufacturer offering fabric temperature sensors for use in dryers and oven like the models WTM V11, V21, and V41.

In some embodiments, SFS may be applied to a textile during exhaust dyeing. In some embodiments, the process may involve loading fabric into a bath, originally known as a batch, and allowing it to come into equilibrium with the solution. Exhaust dyeing may be the ability of the silk fibroin molecules to move from the solution onto the fibers or thread of a textile (substantivity). The substantivity of the silk fibroin may be influenced by temperature or additives, such as salt.

In some embodiments, an exhaust dyeing process may take anywhere from a few minutes to a few hours. When the fabric has been absorbed, or fixed, as much silk fibroin as it can, the bath may be emptied and the fabric may be rinsed to remove any excess solution.

In some embodiments, an important parameter in exhaust dyeing may be what is known as the specific liquor ratio. This describes the ratio of the mass of the fabric to the volume of the SFS bath and determines the amount of silk fibroin deposited on a textile.

In some embodiments, SFS can be applied to a textile during jet dyeing processes. A jet dyeing machine may formed by closed tubular system where the fabric is placed. For transporting the fabric through the tube, a jet of dye liquor is supplied through a venturi. The jet may create turbulence. This may help in SFS penetration along with preventing the fabric from touching the walls of the tube. For example, as the fabric is often exposed to comparatively higher concentrations of liquor within the transport tube, a small SFS bath is needed in the bottom of the vessel. This arrangement may be enough for the smooth movement from rear to front of the vessel.

In some embodiments, SFS may be applied during Paddle dyeing. Paddle dyeing machines may be generally used to many forms of textiles but the method best suits to garments. Heat may be generated through steam injection directly into the coating bath. In an embodiment, a paddle dyeing machine operates through a paddle that circulates both the bath and garments in a perforated central island. It is here that the SFS, water, and steam for heat are added. The overhead paddle machine may be described as a vat with a paddle that has blades of full width. The blades may generally dip a few centimeters into the vat. This action may stir the bath and push garments to be died down, thus keeping them submerged in the dye liquor.

In some embodiments, the processing methods set forth herein may be used to apply SFS to textiles with one or more of the following parameters including, but not limited to, fabric speed, solution viscosity, solution added to fabric, fabric range width, drying temperature, drying time, curing time, fabric tension, padder pressure, padder roller shore hardness, stenter temperature, and common drying and curing temperatures. In an embodiment, the processing method parameters may also include a condensation temperature, which may vary depending upon the chemical recipe used to apply the SFS to the textiles.

In an embodiment, the fabric speed for the processes of the invention may be less than about 0.1 m/min, or less than about 0.2 m/min, or less than about 0.3 m/min, or less than about 0.4 m/min, or less than about 0.5 m/min, or less than about 0.6 m/min, or less than about 0.7 m/min, or less than about 0.8 m/min, or less than about 0.9 m/min, or less than about 1 m/min, or less than about 2 m/min, or less than about 3 m/min, or less than about 4 m/min, or less than about 5 m/min, or less than about 6 m/min, or less than about 7 m/min, or less than about 8 m/min, or less than about 9 m/min, or less than about 10 m/min, or less than about 20 m/min, or less than about 30 m/min, or less than about 40 m/min, or less than about 50 m/min, or less than about 60 m/min.

In an embodiment, the fabric speed for the processes of the invention may be greater than about 0.1 m/min, or greater than about 0.2 m/min, or greater than about 0.3 m/min, or greater than about 0.4 m/min, or greater than about 0.5 m/min, or greater than about 0.6 m/min, or greater than about 0.7 m/min, or greater than about 0.8 m/min, or greater than about 0.9 m/min, or greater than about 1 m/min, or greater than about 2 m/min, or greater than about 3 m/min, or greater than about 4 m/min, or greater than about 5 m/min, or greater than about 6 m/min, or greater than about 7 m/min, or greater than about 8 m/min, or greater than about 9 m/min, or greater than about 10 m/min, or greater than about 20 m/min, or greater than about 30 m/min, or greater than about 40 m/min, or greater than about 50 m/min, or greater than about 60 m/min.

In an embodiment, the solution viscosity for the processes of the invention may be less than about 1000 mPas, or less than about 1500 mPas, or less than about 2000 mPas, or less than about 2500, or less than about 3000 mPas, or less than about 4000 mPas, or less than about 4500 mPas, or less than about 5000 mPas, or less than about 5500 mPas, or less than about 6000 mPas, or less than about 6500 mPas, or less than about 7000 mPas, or less than about 7500 mPas, or less than about 8000 mPas, or less than about 8500 mPas, or less than about 9000 mPas, or less than about 9500 mPas, or less than about 10000 mPas, or less than about 10500 mPas, or less than about 11000 mPas, or less than about 11500 mPas, or less than about 12000 mPas.

In an embodiment, the solution viscosity for the processes of the invention may be greater than about 1000 mPas, or greater than about 1500 mPas, or greater than about 2000 mPas, or greater than about 2500, or greater than about 3000 mPas, or greater than about 4000 mPas, or greater than about 4500 mPas, or greater than about 5000 mPas, or greater than about 5500 mPas, or greater than about 6000 mPas, or greater than about 6500 mPas, or greater than about 7000 mPas, or greater than about 7500 mPas, or greater than about 8000 mPas, or greater than about 8500 mPas, or greater than about 9000 mPas, or greater than about 9500 mPas, or greater than about 10000 mPas, or greater than about 10500 mPas, or greater than about 11000 mPas, or greater than about 11500 mPas, or greater than about 12000 mPas.

In an embodiment, the solution may be added to a textile (e.g., fabric) for the processes of the invention in less than about 0.01 $g/m^2$, or less than about 0.02 $g/m^2$, or less than about 0.03 $g/m^2$, or less than about 0.04 $g/m^2$, or less than about 0.05 $g/m^2$, or less than about 0.06 $g/m^2$, or less than about 0.07 $g/m^2$, or less than about 0.08 $g/m^2$, or less than about 0.09 $g/m^2$, or less than about 0.10 $g/m^2$, or less than about 0.2 $g/m^2$, or less than about 0.3 $g/m^2$, or less than about 0.4 $g/m^2$, or less than about 0.5 $g/m^2$, or less than about 0.6 $g/m^2$, or less than about 0.7 $g/m^2$, or less than about 0.8 $g/m^2$, or less than about 0.9 $g/m^2$, or less than about 1 $g/m^2$, or less than about 2 $g/m^2$, or less than about 3 $g/m^2$, or less than about 4 $g/m^2$, or less than about 5 $g/m^2$, or less than about 6 $g/m^2$, or less than about 7 $g/m^2$, or less than about 8 $g/m^2$, or less than about 9 $g/m^2$, or less than about 10 $g/m^2$, or less than about 20 $g/m^2$, or less than about 30 $g/m^2$, or less than about 40 $g/m^2$, or less than about 50 $g/m^2$, or less than about 60 $g/m^2$, or less than about 70 $g/m^2$, or less than about 80 $g/m^2$, or less than about 90 $g/m^2$, or less than about 100 $g/m^2$.

In an embodiment, the solution may be added to a textile (e.g., fabric) for the processes of the invention in greater than about 0.01 $g/m^2$, or greater than about 0.02 $g/m^2$, or greater than about 0.03 $g/m^2$, or greater than about 0.04 $g/m^2$, or greater than about 0.05 $g/m^2$, or greater than about 0.06 $g/m^2$, or greater than about 0.07 $g/m^2$, or greater than about 0.08 $g/m^2$, or greater than about 0.09 $g/m^2$, or greater than about 0.10 $g/m^2$, or greater than about 0.2 $g/m^2$, or greater than about 0.3 $g/m^2$, or greater than about 0.4 $g/m^2$, or greater than about 0.5 $g/m^2$, or greater than about 0.6 $g/m^2$, or greater than about 0.7 $g/m^2$, or greater than about 0.8 $g/m^2$, or greater than about 0.9 $g/m^2$, or greater than about 1 $g/m^2$, or greater than about 2 $g/m^2$, or greater than about 3 $g/m^2$, or greater than about 4 $g/m^2$, or greater than about 5 $g/m^2$, or greater than about 6 $g/m^2$, or greater than about 7 $g/m^2$, or greater than about 8 $g/m^2$, or greater than about 9 $g/m^2$, or greater than about 10 $g/m^2$, or greater than about 20 $g/m^2$, or greater than about 30 $g/m^2$, or greater than about 40 $g/m^2$, or greater than about 50 $g/m^2$, or greater than about 60 $g/m^2$, or greater than about 70 $g/m^2$, or greater than about 80 $g/m^2$, or greater than about 90 $g/m^2$, or greater than about 100 $g/m^2$.

In an embodiment, the fabric range width for the processes of the invention may be less than about 1 mm, or less than about 2 mm, or less than about 3 mm, or less than about 4 mm, or less than about 5 mm, or less than about 6 mm, or less than about 7 mm, or less than about 8 mm, or less than about 9, or less than about 10 mm, or less than about 20 mm, or less than about 30 mm, or less than about 40 mm, or less than about 50 mm, or less than about 60 mm, or less than about 70 mm, or less than about 80 mm, or less than about 90 mm, or less than about 100 mm, or less than about 200, or less than about 300 mm, or less than about 400 mm, or less than about 500 mm, or less than about 600 mm, or less than about 700 mm, or less than about 800 mm, or less than about 900 mm, or less than about 1000 mm, or less than about 2000 mm, or less than about 2000 mm, or less than about 3000 mm, or less than about 4000 mm, or less than about 5000 mm.

In an embodiment, the fabric range width for the processes of the invention may be greater than about 1 mm, or greater than about 2 mm, or greater than about 3 mm, or greater than about 4 mm, or greater than about 5 mm, or greater than about 6 mm, or greater than about 7 mm, or greater than about 8 mm, or greater than about 9, or greater than about 10 mm, or greater than about 20 mm, or greater than about 30 mm, or greater than about 40 mm, or greater than about 50 mm, or greater than about 60 mm, or greater than about 70 mm, or greater than about 80 mm, or greater than about 90 mm, or greater than about 100 mm, or greater than about 200, or greater than about 300 mm, or greater than about 400 mm, or greater than about 500 mm, or greater than about 600 mm, or greater than about 700 mm, or greater than about 800 mm, or greater than about 900 mm, or greater than about 1000 mm, or greater than about 2000 mm, or greater than about 2000 mm, or greater than about 3000 mm, or greater than about 4000 mm, or greater than about 5000 mm.

In an embodiment, the drying and/or curing temperature for the processes of the invention may be less than about 70° C., or less than about 75° C., or less than about 80° C., or less than about 85° C., or less than about 90° C., or less than about 95° C., or less than about 100° C., or less than about 110° C., or less than about 120° C., or less than about 130° C., or less than about 140° C., or less than about 150° C., or less than about 160° C., or less than about 170° C., or less than about 180° C., or less than about 190° C., or less than about 200° C., or less than about 210° C., or less than about 220° C., or less than about 230° C.

In an embodiment, the drying and/or curing temperature for the processes of the invention may be greater than about 70° C., or greater than about 75° C., or greater than about 80° C., or greater than about 85° C., or greater than about 90° C., or greater than about 95° C., or greater than about 100° C., or greater than about 110° C., or greater than about 120° C., or greater than about 130° C., or greater than about 140° C., or greater than about 150° C., or greater than about 160° C., or greater than about 170° C., or greater than about 180° C., or greater than about 190° C., or greater than about 200° C., or greater than about 210° C., or greater than about 220° C., or greater than about 230° C.

In an embodiment, the drying time for the processes of the invention may be less than about 10 seconds, or less than about 20 seconds, or less than about 30 seconds, or less than about 40 seconds, or less than about 50 seconds, or less than about 60 seconds, or less than about 2 minutes, or less than about, 3 minutes, or less than about 4 minutes, or less than about 5 minutes, or less than about 6 minutes, or less than about 7 minutes, or less than about 8 minutes, or less than about 9 minutes, or less than about 10 minutes, or less than about 20 minutes, or less than about 30 minutes, or less than about 40 minutes, or less than about 50 minutes, or less than about 60 minutes.

In an embodiment, the drying time for the processes of the invention may be greater than about 10 seconds, or greater than about 20 seconds, or greater than about 30 seconds, or greater than about 40 seconds, or greater than about 50 seconds, or greater than about 60 seconds, or greater than about 2 minutes, or greater than about, 3 minutes, or greater than about 4 minutes, or greater than about 5 minutes, or greater than about 6 minutes, or greater than about 7 minutes, or greater than about 8 minutes, or greater than about 9 minutes, or greater than about 10 minutes, or greater than about 20 minutes, or greater than about 30 minutes, or greater than about 40 minutes, or greater than about 50 minutes, or greater than about 60 minutes.

In an embodiment, the curing time for the processes of the invention may be less than about 1 second, or less than about 2 seconds, or less than about 3 seconds, or less than about 4 seconds, or less than about 5 seconds, or less than about 6 seconds, or less than about 7 seconds, or less than about 8 seconds, or less than about 9 seconds, or less than about 10 seconds, or less than about 20 seconds, or less than about 30 seconds, or less than about 40 seconds, or less than about 50 seconds, or less than about 60 seconds, or less than about 2 minutes, or less than about 3 minutes, or less than about 4 minutes, or less than about 5 minutes, or less than about 6 minutes, or less than about 7 minutes, or less than about 8 minutes, or less than about 9 minutes, or less than about 10 minutes, or less than about 20 minutes, or less than about 30 minutes, or less than about 40 minutes, or less than about 50 minutes, or less than about 60 minutes.

In an embodiment, the curing time for the processes of the invention may be greater than about 1 second, or greater than about 2 seconds, or greater than about 3 seconds, or greater than about 4 seconds, or greater than about 5 seconds, or greater than about 6 seconds, or greater than about 7 seconds, or greater than about 8 seconds, or greater than about 9 seconds, or greater than about 10 seconds, or greater than about 20 seconds, or greater than about 30 seconds, or greater than about 40 seconds, or greater than about 50 seconds, or greater than about 60 seconds, or greater than about 2 minutes, or greater than about 3 minutes, or greater than about 4 minutes, or greater than about 5 minutes, or greater than about 6 minutes, or greater than about 7 minutes, or greater than about 8 minutes, or greater than about 9 minutes, or greater than about 10 minutes, or greater than about 20 minutes, or greater than about 30 minutes, or greater than about 40 minutes, or greater than about 50 minutes, or greater than about 60 minutes.

In an embodiment, the fabric tension for the processes of the invention may be less than about 1 N, or less than about 2 N, or less than about 3 N, or less than about 4 N, or less than about 5 N, or less than about 6 N, or less than about 7 N, or less than about 8 N, or less than about 9 N, or less than about 10 N, or less than about 20 N, or less than about 30 N, or less than about 40 N, or less than about 50 N, or less than about 60 N, or less than about 70 N, or less than about 80 N, or less than about 90 N, or less than about 100 N, or less than about 150 N, or less than about 200 N, or less than about 250 N, or less than about 300 N.

In an embodiment, the fabric tension for the processes of the invention may be greater than about 1 N, or greater than about 2 N, or greater than about 3 N, or greater than about 4 N, or greater than about 5 N, or greater than about 6 N, or greater than about 7 N, or greater than about 8 N, or greater than about 9 N, or greater than about 10 N, or greater than about 20 N, or greater than about 30 N, or greater than about 40 N, or greater than about 50 N, or greater than about 60 N, or greater than about 70 N, or greater than about 80 N, or greater than about 90 N, or greater than about 100 N, or greater than about 150 N, or greater than about 200 N, or greater than about 250 N, or greater than about 300 N.

In an embodiment, the padder pressure for the processes of the invention may be less than about 1 N/mm, or less than about 2 N/mm, or less than about 3 N/mm, or less than about 4 N/mm, or less than about 4 N/mm, or less than about 5 N/mm, or less than about 6 N/mm, or less than about 7 N/mm, or less than about 8 N/mm, or less than about 9 N/mm, or less than about 10 N/mm, or less than about 20 N/mm, or less than about 30 N/mm, or less than about 40 N/mm, or less than about 50 N/mm, or less than about 60 N/mm, or less than about 70 N/mm, or less than about 80 N/mm, or less than about 90 N/mm.

In an embodiment, the padder pressure for the processes of the invention may be greater than about 1 N/mm, or greater than about 2 N/mm, or greater than about 3 N/mm, or greater than about 4 N/mm, or greater than about 4 N/mm, or greater than about 5 N/mm, or greater than about 6 N/mm, or greater than about 7 N/mm, or greater than about 8 N/mm, or greater than about 9 N/mm, or greater than about 10 N/mm, or greater than about 20 N/mm, or greater than about 30 N/mm, or greater than about 40 N/mm, or greater than about 50 N/mm, or greater than about 60 N/mm, or greater than about 70 N/mm, or greater than about 80 N/mm, or greater than about 90 N/mm.

In an embodiment, the padder roller shore hardness for the processes of the invention may be less than about 70 shore A, or less than about 75 shore A, or less than about 80 shore A, or less than about 85 shore A, or less than about 90 shore A, or less than about 95 shore A, or less than about 100 shore A.

In an embodiment, the padder roller shore hardness for the processes of the invention may be greater than about 70 shore A, or greater than about 75 shore A, or greater than about 80 shore A, or greater than about 85 shore A, or greater than about 90 shore A, or greater than about 95 shore A, or greater than about 100 shore A.

In an embodiment, the stenter temperature for the processes of the invention may be less than about 70° C., or less than about 75° C., or less than about 80° C., or less than about 85° C., or less than about 90° C., or less than about 95° C., or less than about 100° C., or less than about 110° C., or less than about 120° C., or less than about 130° C., or less than about 140° C., or less than about 150° C., or less than about 160° C., or less than about 170° C., or less than about 180° C., or less than about 190° C., or less than about 200° C., or less than about 210° C., or less than about 220° C., or less than about 230° C.

In an embodiment, the stenter temperature for the processes of the invention may be greater than about 70° C., or greater than about 75° C., or greater than about 80° C., or greater than about 85° C., or greater than about 90° C., or greater than about 95° C., or greater than about 100° C., or greater than about 110° C., or greater than about 120° C., or greater than about 130° C., or greater than about 140° C., or greater than about 150° C., or greater than about 160° C., or greater than about 170° C., or greater than about 180° C., or greater than about 190° C., or greater than about 200° C., or greater than about 210° C., or greater than about 220° C., or greater than about 230° C.

In an embodiment, the common drying temperatures for the processes of the invention may be less than about 110° C., or less than about 115° C., or less than about 120° C., or less than about 125° C., or less than about 130° C., or less than about 135° C., or less than about 140° C., or less than about 145° C., or less than about 150° C.

In an embodiment, the common drying temperatures for the processes of the invention may be greater than about 110° C., or greater than about 115° C., or greater than about 120° C., or greater than about 125° C., or greater than about 130° C., or greater than about 135° C., or greater than about 140° C., or greater than about 145° C., or greater than about 150° C.

In some embodiments, a silk fibroin coated material (e.g., fabric) may be heat resistant to a selected temperature where the selected temperature is chosen for drying, curing, and/or heat setting a dye that may be applied to the material (e.g., LYCRA). As used herein, a "heat resistant" may refer to a property of the silk fibroin coating deposited on the material where the silk fibroin coating and/or silk fibroin protein does not exhibit a substantial modification (i.e., "substantially modifying") in silk fibroin coating performance as compared to a control material having a comparable silk fibroin coating that was not subjected to the selected temperature for drying, curing, wash cycling, and/or heat setting purposes. In some embodiments, the selected temperature is the glass transition temperature (Tg) for the material upon which the silk fibroin coating is applied. In some embodiments, the selected temperature is greater than about 65°, or greater than about 70° C., or greater than about 80° C., or greater than about 90° C., or greater than about 100° C., or greater than about 110° C., or greater than about 120° C., or greater than about 130° C., or greater than about 140° C., or greater than about 150° C., or greater than about 160° C., or greater than about 170° C., or greater than about 180° C., or greater than about 190° C., or greater than about 200° C., or greater than about 210° C., or greater than about 220° C. In some embodiments, the selected temperature is less than about 65° C., or less than about 70° C., or less than about 80° C., or less than about 90° C., or less than about 100° C., or less than about 110° C., or less than about 120° C., or less than about 130° C., or less than about 140° C., or less than about 150° C., or less than about 160° C., or less than about 170° C., or less than about 180° C., or less than about 190° C., or less than about 200° C., or less than about 210° C., or less than about 220° C.

In an embodiment, "substantially modifying" silk fibroin coating performance may be a decrease in a selected property of silk fibroin coating, such as wetting time, absorption rate, spreading speed, accumulative one-way transport, or overall moisture management capability as compared to a control silk fibroin coating that was not subjected to the selected temperature for drying, curing, wash cycling, and/or heat setting purposes, where such decrease is less than about a 1% decrease, or less than about a 2% decrease, or less than about a 3% decrease, or less than about a 4% decrease, or less than about a 5% decrease, or less than about a 6% decrease, or less than about a 7% decrease, or less than about an 8% decrease, or less than about a 9% decrease, or less than about a 10% decrease, or less than about a 15% decrease, or less than about a 20% decrease, or less than about a 25% decrease, or less than about a 30% decrease, or less than about a 35% decrease, or less than about a 40% decrease, or less than about a 45% decrease, or less than about a 50% decrease, or less than about a 60% decrease, or less than about a 70% decrease, or less than about a 80% decrease, or less than about a 90% decrease, or less than about 100% decrease in wetting time, absorption rate, spreading speed, accumulative one-way transport, or overall moisture management capability as compared to a control silk fibroin coating that was not subjected to the selected temperature for drying, curing, wash cycling, and/or heat setting purposes. In some embodiments, "wash cycling" may refer to at least one wash cycle, or at least two wash cycles, or at least three wash cycles, or at least four wash cycles, or at least five wash cycles.

In an embodiment, "substantially modifying" silk fibroin coating performance may be an increase in a selected property of silk fibroin coating, such as wetting time, absorption rate, spreading speed, accumulative one-way transport, or overall moisture management capability as compared to a control silk fibroin coating that was not subjected to the selected temperature for drying, curing, wash cycling, and/or heat setting purposes, where such increase is less than about a 1% increase, or less than about a 2% increase, or less than about a 3% increase, or less than about a 4% increase, or less than about a 5% increase, or less than about a 6% increase, or less than about a 7% increase, or less than about an 8% increase, or less than about a 9% increase, or less than about a 10% increase, or less than about a 15% increase, or less than about a 20% increase, or less than about a 25% increase, or less than about a 30% increase, or less than about a 35% increase, or less than about a 40% increase, or less than about a 45% increase, or less than about a 50% increase, or less than about a 60% increase, or less than about a 70% increase, or less than about a 80% increase, or less than about a 90% increase, or less than about 100% increase in wetting time, absorption rate, spreading speed, accumulative one-way transport, or overall moisture management capability as compared to a control silk fibroin coating that was not subjected to the selected temperature for drying, curing, wash cycling, and/or heat setting purposes. In some embodiments, "wash cycling" may refer to at least one wash cycle, or at least two wash cycles, or at least three wash cycles, or at least four wash cycles, or at least five wash cycles.

In some embodiments, the SFS coated article may be subjected to heat setting in order to set one or more dyes that may be applied to the SFS coated article in order to permanently set the one or more dyes on the SFS coated article. In some embodiments, the SFS coated article may be heat setting resistant, wherein the SFS coating on the SFS coated article may resist a heat setting temperature of greater than about 100° C., or greater than about 110° C., or greater than about 120° C., or greater than about 130° C., or greater than about 140° C., or greater than about 150° C., or greater than about 160° C., or greater than about 170° C., or greater than about 180° C., or greater than about 190° C., or greater than about 200° C., or greater than about 210° C., or greater than about 220° C. In some embodiments, the selected temperature is less than about 100° C., or less than about 110° C., or less than about 120° C., or less than about 130° C., or less than about 140° C., or less than about 150° C., or less than about 160° C., or less than about 170° C., or less than about 180° C., or less than about 190° C., or less than about 200° C., or less than about 210° C., or less than about 220° C.

In an embodiment, a material coated by the silk fibroin coating as described herein may partially dissolved or otherwise partially incorporated within a portion of the material after the silk fibroin coated material is subjected to heating and/or curing as described herein. Without being limited to any one theory of the invention, where the silk fibroin coated material is heated to greater than about the glass transition temperature (Tg) for the material that is coated, the silk fibroin coating may become partially dissolved or otherwise partially incorporated within a portion of the material.

In some embodiments, a material coated by the silk fibroin coating as described herein may be sterile or may be sterilized to provide a sterilized silk fibroin coated material. Alternatively, or in addition thereto, the methods described herein may include a sterile SFS prepared from sterile silk fibroin.

In some embodiments, the fabric constructions that are compatible with the processes of the invention include woven fabrics, knitted fabrics, and non-woven fabrics.

In some embodiments, the coating pattern provided by the processes of the invention include one side coating, two side coating, and/or throughout coating.

In some embodiments, the equipment manufacturers that are capable of producing equipment configured to continuously coat SFS on textiles include, but are not limited to, Aigle, Amba Projex, Bombi, Bruckner, Cavitec, Crosta, Dienes Apparatebau, Eastsign, Europlasma, Fermor, Fontanet, Gaston Systems, Hansa Mixer, Harish, Has Group, Icomatex, Idealtech, Interspare, Isotex, Klieverik, KTP, M P, Mageba, Mahr Feinpruef, Matex, Mathis, Menzel LP, Meyer, Monforts, Morrison Textile, Mtex, Muller Frick, Muratex Textile, Reliant Machinery, Rollmac, Salvade, Sandvik Tps, Santex, Chmitt-Machinen, Schott & Meissner, Sellers, Sicam, Siltex, Starlinger, Swatik Group India, Techfull, TMT Manenti, Unitech Textile Machinery, Weko, Willy, Wumag Texroll, Yamuna, Zappa, and Zimmer Austria.

In some embodiments, the equipment manufactures that are capable of producing equipment configured to dry SFS coated on textiles include, but are not limited to, Alea, Alkan Makina, Anglada, Atac Makina, Bianco, Bruckner, Campen, CHTC, CTMTC, Dilmenler, Elteksmak, Erbatech, Fontanet, Harish, Icomatex, Ilsung, Inspiron, Interspare, Master, Mathis, Monfongs, Monforts, Salvade, Schmitt-Maschinen, Sellers, Sicam, Siltex, Swastik Group India, Tacome, Tubetex, Turbang, Unitech Textile Machinery, and Yamuna.

In some embodiments, SFS may be used in combination with chemical agents. In some embodiments, SFS may include a chemical agent. In some embodiments, a chemical agent may be applied to a textile to be coated prior to providing an SFS coating. In some embodiments, a chemical agent may be applied to a textile after such textile has been coated with an SFS coating. One or more chemical agents may be applied, as set forth above, and may include a first chemical agent, second chemical agent, third chemical agent, and the like, where the chemical agents may be the same or a combination of two or more of the chemical agents described herein. In some embodiments, chemical agents may provide selected properties to coated textile (e.g., fabric) including, but not limited to, an antimicrobial property, a water repellant property, an oil repellant property, a coloring property, a flame retardant property, a fabric softening property, a pH adjusting property, an anticrocking property, an antipilling property, and/or an antifelting property. In some embodiments, chemical agents may include, but are not limited to, an antimicrobial agent, acidic agents (e.g., Bronsted acids, citric acid, acetic acid, etc.), a softener, a water repellant agent, an oil repellant agent, a dye, a flame retardant, a fabric softener, a pH adjusting agent (e.g., an acidic agent), an anticrocking agent, an antipilling agent, and/or an antifelting agent. Such chemical agents may include, but are not limited to, softeners (e.g., chemical fabric softeners), acidic agents, antimicrobials, dyes, finishing agents including monomers (e.g., melted polyester), and combinations thereof.

In some embodiments, SFS may be used in an SFS coating, where such coating includes one or more chemical agents (e.g., a silicone). SFS may be provided in such an SFS coating at a concentration by weight (% w/w or % w/v) or by volume (v/v) of less than about 25%, or less than about 20%, or less than about 15%, or less than about 10%, or less than about 9%, or less than about 8%, or less than about 7%, or less than about 6%, or less than about 5%, or less than about 4%, or less than about 3%, or less than about 2%, or less than about 1%, or less than about 0.9%, or less than about 0.8%, or less than about 0.7%, or less than about 0.6%, or less than about 0.5%, or less than about 0.4%, or less than about 0.3%, or less than about 0.2%, or less than about 0.1%, or less than about 0.01%, or less than about 0.001%. In some embodiments, SFS may be provided in such an SFS coating at a concentration by weight (% w/w or % w/v) or by volume (v/v) of greater than about 25%, or greater than about 20%, or greater than about 15%, or greater than about 10%, or greater than about 9%, or greater than about 8%, or greater than about 7%, or greater than about 6%, or greater than about 5%, or greater than about 4%, or greater than about 3%, or greater than about 2%, or greater than about 1%, or greater than about 0.9%, or greater than about 0.8%, or greater than about 0.7%, or greater than about 0.6%, or greater than about 0.5%, or greater than about 0.4%, or greater than about 0.3%, or greater than about 0.2%, or greater than about 0.1%, or greater than about 0.01%, or greater than about 0.001%.

In some embodiments, chemical fabric softeners may include silicones as described herein.

In some embodiments, the chemical agents may include the following, which are supplied by CHT Bezema and are associated with certain selected textile (e.g., fabric) properties, which may be used to strengthan SFS binding on coated surfaces and/or SFS may be used for enhancing the following chemical agents' properties:

ALPAPRINT CLEAR
- Silicone printing and coating
- Component B is mentioned in the technical leaflet
- Dry handle
- Good rubbing fastness
- Good washfastness ALPAPRINT ELASTIC ADD
- Silicone printing and coating
- Component B is mentioned in the technical leaflet
- Good rubbing fastness
- Good washfastness
- Suited for yardage printing ALPAPRINT WHITE
- Silicone printing and coating
- Component B is mentioned in the technical leaflet
- Dry handle
- Good rubbing fastness
- Good washfastness ALPATEC 30142 A
- Textile finishing
- Coating
- Silicone printing and coating
- Component B is mentioned in the technical leaflet
- Suitable for narrow ribbon coating
- Good rubbing fastness
- Good washfastness ALPATEC 30143 A
- Silicone printing and coating
- Component B is mentioned in the technical leaflet
- Good rubbing fastness
- Good washfastness
- Suited for yardage printing ALPATEC 30191 A
- Silicone printing and coating
- Component B is mentioned in the technical leaflet
- Suitable for narrow ribbon coating
- High transparency
- Coating ALPATEC 30203 A
- Silicone printing and coating
- Component B is mentioned in the technical leaflet
- Suitable for narrow ribbon coating
- High transparency
- Coating ALPATEC 3040 LSR KOMP. A
- Functional coatings, Silicone printing and coating
- Component B is mentioned in the technical leaflet
- High abrasion resistance
- High transparency
- Coating ALPATEC 3060 LSR KOMP. A
- Functional coatings, Silicone printing and coating
- Component B is mentioned in the technical leaflet
- High abrasion resistance
- High transparency
- Coating ALPATEC 530
- Silicone printing and coating
- Suitable for narrow ribbon coating
- High transparency
- Coating
- One component system ALPATEC 540
- Silicone printing and coating
- Suitable for narrow ribbon coating
- High transparency
- Coating
- One component system ALPATEC 545
- Silicone printing and coating
- Suitable for narrow ribbon coating
- High transparency
- Coating
- One component system ALPATEC 550
- Silicone printing and coating
- Suitable for narrow ribbon coating
- High transparency
- Coating
- One component system ALPATEC 730
- Silicone printing and coating
- Suitable for narrow ribbon coating
- Good washfastness
- High abrasion resistance
- High transparency ALPATEC 740
- Silicone printing and coating
- Suitable for narrow ribbon coating
- Good washfastness
- High abrasion resistance
- High transparency ALPATEC 745
- Silicone printing and coating
- Suitable for narrow ribbon coating
- Good washfastness
- High abrasion resistance
- High transparency ALPATEC 750
- Silicone printing and coating
- Suitable for narrow ribbon coating
- Good washfastness
- High abrasion resistance
- High transparency ALPATEC BANDAGE A
- Silicone printing and coating
- Component B is mentioned in the technical leaflet
- Suitable for narrow ribbon coating
- Coating
- Two component system APYROL BASE2 E
- Flame retardants
- Liquid
- Soft handle
- For BS 5852/1+2
- Suited for paste coating APYROL FCR-2
- Water repellency/oil repellency
- Cationic
- High effectiveness
- Water-based
- Liquid APYROL FFD E
- Flame retardants
- Liquid
- Suited for polyester
- Suited for polyamide
- Flame inhibiting filler APYROL FR CONC E
- Flame retardants, Functional coatings
- Liquid
- Suited for polyester
- Suited for polyamide
- Flame inhibiting filler APYROL GBO-E
- Flame retardants, Functional coatings
- Suited for polyester
- Black-out coating
- For DIN 4102/B1
- Containing halogen APYROL LV 21
- Flame retardants, Functional coatings
- For DIN 4102/B1
- Suited for paste coating
- Suited for backcoating of black-out vertical blinds and roller blinds
- Containing halogen APYROL PP 31
- Flame retardants
- Liquid
- Free from antimony
- Flame inhibiting filler
- For BS 5852/1+2

APYROL PP 46
- Flame retardants
- Powder
- Free from antimony
- Flame inhibiting filler
- Suited for paste coating APYROL PREM E
- Flame retardants
- Soft handle
- For BS 5852/1+2
- Containing halogen
- Semi-permanent APYROL PREM2 E
- Flame retardants
- Soft handle
- For BS 5852/1+2
- Containing halogen
- Semi-permanent COLORDUR 005 WHITE
- Flock adhesives, Functional coatings, Silicone printing and coating
- Based on silicone
- Dyestuff pigment suspension COLORDUR 105 LEMON
- Flock adhesives, Functional coatings, Silicone printing and coating
- Based on silicone
- Dyestuff pigment suspension COLORDUR 115 GOLDEN YELLOW
- Flock adhesives, Functional coatings, Silicone printing and coating
- Based on silicone
- Dyestuff pigment suspension COLORDUR 185 ORANGE
- Flock adhesives, Functional coatings, Silicone printing and coating
- Based on silicone
- Dyestuff pigment suspension COLORDUR 215 RED
- Flock adhesives, Functional coatings, Silicone printing and coating
- Based on silicone
- Dyestuff pigment suspension COLORDUR 225 DARK RED
- Flock adhesives, Functional coatings, Silicone printing and coating
- Based on silicone
- Dyestuff pigment suspension COLORDUR 285 VIOLET
- Flock adhesives, Functional coatings, Silicone printing and coating
- Based on silicone
- Dyestuff pigment suspension COLORDUR 305 BLUE
- Flock adhesives, Functional coatings, Silicone printing and coating
- Based on silicone
- Dyestuff pigment suspension COLORDUR 355 MARINE
- Flock adhesives, Functional coatings, Silicone printing and coating
- Based on silicone
- Dyestuff pigment suspension COLORDUR 405 GREEN
- Flock adhesives, Functional coatings, Silicone printing and coating
- Based on silicone
- Dyestuff pigment suspension COLORDUR 465 OLIVE GREEN
- Flock adhesives, Functional coatings, Silicone printing and coating
- Based on silicone
- Dyestuff pigment suspension COLORDUR 705 BLACK
- Flock adhesives, Functional coatings, Silicone printing and coating
- Based on silicone
- Dyestuff pigment suspension COLORDUR AM ADDITIVE
- Flock adhesives, Silicone printing and coating
- Based on silicone
- Migration prevention
- Dyestuff pigment suspension COLORDUR FL 1015 YELLOW
- Flock adhesives, Functional coatings, Silicone printing and coating
- Based on silicone
- Dyestuff pigment suspension COLORDUR FL 1815 ORANGE
- Flock adhesives, Functional coatings, Silicone printing and coating
- Based on silicone
- Dyestuff pigment suspension COLORDUR FL 2415 PINK
- Flock adhesives, Functional coatings, Silicone printing and coating
- Based on silicone
- Dyestuff pigment suspension COLORDUR FL 4015 GREEN
- Flock adhesives, Functional coatings, Silicone printing and coating
- Based on silicone
- Dyestuff pigment suspension ECOPERL 1
- Water repellency/oil repellency
- Washfast
- Sprayable
- Based on special functionalised polymers/waxes
- Cationic ECOPERL ACTIVE
- Water repellency/oil repellency
- Washfast
- Based on special functionalised polymers/waxes
- Cationic
- High effectiveness LAMETHAN 1 ET 25 BR 160
- Functional coatings, Lamination
- Washfast
- Transparent
- 25 μm strong
- Film based on polyester urethane LAMETHAN ADH-1
- Functional coatings, Lamination
- Breathable
- Suited for dry laminating
- Good stability to washing at 40° C.
- Stable foam adhesive LAMETHAN ADH-L
- Functional coatings, Lamination
- Washfast
- Transparent
- Suited for paste coating
- Suited for wet laminating LAMETHAN ALF-K
- Functional coatings, Lamination
- Adhesive additive for bondings
- Suited for dry laminating
- Stable foam adhesive
- Suited for stable foam coating LAMETHAN LB 15-T BR 152DK
- Functional coatings, Lamination
- Transparent
- 15 μm strong
- Breathable
- Suited for dry laminating LAMETHAN LB 25 BR 155
- Functional coatings, Lamination
- Transparent
- 25 μm strong
- Suited for dry laminating
- Good stability to washing at 40° C.

LAMETHAN LB 25 W BR 152
- Lamination
- 25 μm strong
- Breathable
- Suited for dry laminating
- Good stability to washing at 40° C.

LAMETHAN TAPE DE 80
- Functional coatings, Lamination
- Polymer base: polyurethane
- Transparent
- Good stability to washing at 40° C.
- Tape for seam sealing LAMETHAN TAPE ME 160
- Functional coatings, Lamination
- Polymer base: polyurethane
- Transparent
- Good stability to washing at 40° C.
- Tape for seam sealing LAMETHAN VL-H920 0 BR150
- Functional coatings, Lamination
- Two coats with membrane and PES charmeuse
- Breathable
- Suited for dry laminating
- Good stability to washing at 40° C.

LAMETHAN VL-H920 S BR 150
- Functional coatings, Lamination
- Two coats with membrane and PES charmeuse
- Breathable
- Suited for dry laminating
- Good stability to washing at 40° C.

LAMETHAN VL-H920 W BR150
- Functional coatings, Lamination
- Two coats with membrane and PES charmeuse
- Breathable
- Suited for dry laminating
- Good stability to washing at 40° C.

TUBICOAT A 12 E
- Binders, Functional coatings
- Anionic
- Liquid
- Formaldehyde-free
- Polymer base: polyacrylate TUBICOAT A 17
- Binders, Functional coatings
- Suitable for tablecloth coating
- Anionic
- Liquid
- Self-crosslinking TUBICOAT A 19
- Binders, Functional coatings
- Washfast
- Anionic
- Formaldehyde-free
- Good stability to washing TUBICOAT A 22
- Binders, Functional coatings
- Washfast
- Medium-hard film
- Anionic
- Liquid TUBICOAT A 23
- Binders
- Medium-hard film
- Anionic
- Liquid
- Application for varying the handle TUBICOAT A 28
- Binders, Functional coatings
- Anionic
- Liquid
- Formaldehyde-free
- Good stability to washing TUBICOAT A 36
- Binders, Functional coatings
- Washfast
- Anionic
- Liquid
- Low formaldehyde TUBICOAT A 37
- Binders, Functional coatings
- Washfast
- Suitable for tablecloth coating
- Anionic
- Liquid TUBICOAT A 41
- Binders, Functional coatings
- Anionic
- Liquid
- Self-crosslinking
- Good fastnesses TUBICOAT A 61
- Binders, Functional coatings
- Suitable for tablecloth coating
- Liquid
- Non-ionic
- Self-crosslinking TUBICOAT A 94
- Binders, Functional coatings
- Anionic
- Liquid
- Self-crosslinking
- Good fastnesses TUBICOAT AIB 20
- Fashion coatings
- Transparent
- Suited for foam coating
- Pearl Gloss Finish TUBICOAT AOS
- Foaming auxiliaries
- Non-ionic
- Foaming
- Suited for the fluorocarbon finishing TUBICOAT ASK
- Functional coatings, Lamination
- Adhesive additive for bondings
- Transparent
- Suited for paste coating
- Suited for dry laminating TUBICOAT B-H
- Binders, Functional coatings
- Polymer base: Styrene butadiene
- Anionic
- Liquid
- Formaldehyde-free TUBICOAT B 45
- Binders, Functional coatings
- Washfast
- Polymer base: Styrene butadiene
- Anionic
- Liquid TUBICOAT BO-NB
- Functional coatings
- Medium hard
- Suited for black-out coating
- Good flexibility at low temperatures
- Suited for stable foam coating TUBICOAT BO-W
- Functional coatings
- Suited for black-out coating
- Impermeable for light
- Suited for stable foam coating
- Water vapour permeable TUBICOAT BOS
- Foaming auxiliaries
- Anionic
- Foaming
- Foam stabilizer TUBICOAT DW-FI
- Functional coatings, Special products
- Anionic
- Suited for coating pastes
- Suited for stable foam
- Foamable TUBICOAT E 4
- Binders
- Anionic
- Self-crosslinking
- Low formaldehyde
- Polymer base: polyethylene vinyl acetate TUBICOAT ELC
- Functional coatings
- Suited for paste coating
- Black
- Electrically conductive
- Soft TUBICOAT EMULGATOR HF
- Functional coatings, Special products
- Anionic
- Dispersing
- Suited for coating pastes
- Suited for stable foam TUBICOAT ENTSCHÄUMER N
- Defoamers and deaerators
- Liquid
- Non-ionic
- Silicone-free
- Suited for coating pastes TUBICOAT FIX FC
- Fixing agents
- Cationic
- Water-based
- Liquid
- Formaldehyde-free TUBICOAT FIX ICB CONC.
- Fixing agents
- Liquid
- Non-ionic
- Formaldehyde-free
- Suited for crosslinking TUBICOAT FIXIERER AZ
- Fixing agents
- Liquid
- Suited for crosslinking
- Based on polyaziridin
- Unblocked TUBICOAT FIXIERER FA
- Fixing agents
- Anionic
- Water-based
- Liquid
- Low formaldehyde TUBICOAT FIXIERER H 24
- Fixing agents
- Anionic
- Water-based
- Liquid
- Formaldehyde-free TUBICOAT FIXIERER HT
- Fixing agents
- Water-based
- Liquid
- Non-ionic
- Suited for crosslinking TUBICOAT FOAMER NY
- Foaming auxiliaries
- Non-ionic
- Foaming
- Suited for the fluorocarbon finishing
- Non-yellowing TUBICOAT GC PU
- Fashion coatings
- Washfast
- Soft handle
- Polymer base: polyurethane
- Transparent TUBICOAT GRIP
- Functional coatings
- Slip resistant
- Suited for stable foam coating
- Soft TUBICOAT HEC
- Thickeners
- Powder
- Non-ionic
- Stable to electrolytes
- Stable to shear forces TUBICOAT HOP-S
- Special products
- Anionic
- Suited for coating pastes
- Coating
- Adhesion promoter TUBICOAT HS 8
- Binders
- Anionic
- Liquid
- Formaldehyde-free
- Hard film TUBICOAT HWS-1
- Functional coatings
- Suited for paste coating
- Water-proof
- Suited for giant umbrellas and tents TUBICOAT KL-TOP F
- Fashion coatings, Functional coatings
- Washfast
- Polymer base: polyurethane
- Transparent
- Suited for paste coating TUBICOAT KLS-M
- Fashion coatings, Functional coatings
- Washfast
- Soft handle
- Polymer base: polyurethane
- Breathable TUBICOAT MAF
- Fashion coatings
- Washfast
- Matrix effect
- Improves the rubbing fastnesses
- Soft handle TUBICOAT MD TC 70
- Fashion coatings
- Vintage wax
- Suited for foam coating
- Suited for topcoats TUBICOAT MEA
- Functional coatings
- Washfast
- Polymer base: polyurethane
- Suited for paste coating
- Suited for topcoat coatings TUBICOAT MG-R
- Fashion coatings
- Washfast
- Soft handle
- Suited for paste coating
- Duo Leather Finish TUBICOAT MOP NEU
- Functional coatings, Special products
- Washfast
- Anionic
- Foamable
- Finish TUBICOAT MP-D
- Fashion coatings, Functional coatings
- Washfast
- Soft handle
- Medium hard
- Breathable TUBICOAT MP-W
- Functional coatings
- Washfast
- Polymer base: polyurethane
- Breathable
- Water-proof TUBICOAT NTC-SG
- Functional coatings
- Washfast
- Transparent
- Suited for paste coating
- Medium hard TUBICOAT PERL A22-20
- Fashion coatings
- Suited for paste coating
- Suited for foam coating
- Pearl Gloss Finish TUBICOAT PERL HS-1
- Functional coatings
- Suited for paste coating
- Suited for black-out coating
- Suited for pearlescent coating
- Suited for topcoat coatings TUBICOAT PERL PU SOFT
- Fashion coatings
- Washfast
- Scarabaeus effect
- Soft handle
- Polymer base: polyurethane TUBICOAT PERL VC CONC.
- Fashion coatings, Functional coatings
- Soft handle
- Polymer base: polyurethane
- Suited for paste coating
- Suited for black-out coating TUBICOAT PHV
- Functional coatings
- Medium hard
- Suited for three-dimensional dot coating TUBICOAT PSA 1731
- Functional coatings, Lamination
- Transparent
- Suited for paste coating
- Suited for dry laminating
- Non-breathable TUBICOAT PU-UV
- Binders
- Anionic
- Liquid
- Formaldehyde-free
- Good fastnesses TUBICOAT PU 60
- Binders
- Anionic
- Liquid
- Application for varying the handle
- Formaldehyde-free TUBICOAT PU 80
- Binders, Functional coatings
- Washfast
- Anionic
- Liquid
- Can be washed off TUBICOAT PUH-BI
- Binders
- Anionic
- Liquid
- Formaldehyde-free
- Hard film TUBICOAT PUL
- Functional coatings
- Polymer base: polyurethane
- Suited for paste coating
- Suited for three-dimensional dot coating
- Slip resistant TUBICOAT PUS
- Binders, Functional coatings
- Anionic
- Liquid
- Formaldehyde-free
- Polymer base: polyurethane TUBICOAT PUW-M
- Binders
- Medium-hard film
- Anionic
- Liquid
- Formaldehyde-free TUBICOAT PUW-S
- Binders
- Anionic
- Liquid
- Formaldehyde-free
- Good stability to washing TUBICOAT PW 14
- Binders, Functional coatings
- Anionic
- Formaldehyde-free
- Heat-sealable
- Not wetting TUBICOAT SA-M
- Functional coatings
- Washfast
- Suited for paste coating
- Suited for three-dimensional dot coating TUBICOAT SCHÄUMER HP
- Foaming auxiliaries, Functional coatings
- Non-ionic
- Foaming
- Suited for the fluorocarbon finishing TUBICOAT SF-BASE
- Fashion coatings
- Washfast
- Soft handle
- Suited for foam coating
- Silk gloss effect TUBICOAT SHM
- Foaming auxiliaries
- Anionic
- Foam stabilizer TUBICOAT SI 55
- Special products
- Pseudo-cationic
- Suited for coating pastes
- Foamable
- Coating TUBICOAT STABILISATOR RP
- Foaming auxiliaries
- Anionic
- Foam stabilizer TUBICOAT STC 100
- Fashion coatings, Functional coatings
- Transparent
- Breathable
- Suited for stable foam coating TUBICOAT STC 150
- Fashion coatings, Functional coatings
- Washfast
- Soft handle
- Transparent
- Breathable TUBICOAT STL
- Functional coatings
- Washfast
- Slip resistant
- Suited for stable foam coating
- Soft TUBICOAT TCT
- Fashion coatings, Functional coatings
- Washfast
- Polymer base: polyurethane
- Transparent
- Suited for paste coating TUBICOAT VA 10
- Binders
- Anionic
- Liquid
- Formaldehyde-free
- Hard film TUBICOAT VCP
- Functional coatings
- Suited for paste coating
- Medium hard
- Suited for black-out coating TUBICOAT VERDICKER 17
- Thickeners
- Anionic
- High efficiency
- Synthetic TUBICOAT VERDICKER ASD
- Thickeners
- Anionic
- Quick swelling
- Stable to shear forces
- Pseudoplastic TUBICOAT VERDICKER LP
- Thickeners
- Anionic
- Stable to shear forces
- Pseudoplastic
- Dispersible TUBICOAT VERDICKER PRA
- Thickeners
- Anionic
- Liquid
- Stable to electrolytes
- Rheological additive TUBICOAT WBH 36
- Special products
- Finish
- Application for preventing roller deposits TUBICOAT WBV
- Special products
- Non-ionic
- Finish
- Application for preventing roller deposits TUBICOAT WEISS EU
- Functional coatings, Special products
- Suited for coating pastes
- Suited for stable foam
- Suited for topcoat coatings
- Titanium dioxide paste TUBICOAT WLI-LT KONZ
- Functional coatings
- Washfast
- Suited for paste coating
- Slip resistant
- Soft TUBICOAT WLI
- Fashion coatings, Functional coatings
- Washfast
- Scarabaeus effect
- Soft handle
- Suited for paste coating TUBICOAT WOT
- Fashion coatings
- Washfast
- Soft handle
- Suited for paste coating
- Wash-out effect TUBICOAT WX-TCA 70
- Fashion coatings, Functional coatings
- Vintage wax
- Suited for paste coating
- Suited for topcoat coatings TUBICOAT WX BASE
- Fashion coatings
- Vintage wax
- Soft handle
- Suited for paste coating
- Application in the prime coat TUBICOAT ZP NEU
- Water repellency/oil repellency
- Zircon-paraffine base
- Suited for aqueous systems
- Cationic
- Foamable TUBIGUARD 10-F
- Water repellency/oil repellency
- Washfast
- Sprayable
- Cationic
- Liquid TUBIGUARD 21
- Water repellency/oil repellency
- Washfast
- Cationic
- High effectiveness
- Water-based TUBIGUARD 25-F
- Water repellency/oil repellency
- Washfast
- Sprayable
- Cationic
- High effectiveness TUBIGUARD 270
- Functional coatings, Water repellency/oil repellency
- Washfast
- Cationic
- High effectiveness
- Liquid TUBIGUARD 30-F
- Water repellency/oil repellency
- Washfast
- Sprayable
- Cationic
- High effectiveness TUBIGUARD 44 N
- Water repellency/oil repellency
- Washfast
- Sprayable
- Suited for aqueous systems
- Liquid TUBIGUARD 44N-F
- Water repellency/oil repellency
- Suited for aqueous systems
- Non-ionic
- Suited for polyester
- Foamable TUBIGUARD 66
- Water repellency/oil repellency
- Washfast
- Sprayable
- High effectiveness
- Liquid TUBIGUARD 90-F
- Water repellency/oil repellency
- Washfast
- Cationic
- High effectiveness
- Liquid TUBIGUARD AN-F
- Water repellency/oil repellency
- Washfast
- Sprayable
- Cationic
- High effectiveness TUBIGUARD FA2-F
- Water repellency/oil repellency
- Sprayable
- Cationic
- Suited for polyester
- Foamable TUBIGUARD PC3-F
- Functional coatings, Water repellency/oil repellency
- Washfast
- Cationic
- Liquid
- Paste TUBIGUARD SR 2010-F W
- Water repellency/oil repellency
- Cationic
- High effectiveness
- Foamable
- Based on C6 fluorocarbon In some embodiments, the chemical agents may include the following, which are supplied by CHT Bezema and are associated with certain selected textile (e.g., fabric) properties, which may be used to strengthan SFS binding to inkjet printing dye:

CHT-ALGINAT MVU
- Ink jet printing preparation, Thickeners
- Cationic
- Powder
- Anionic
- High colour brilliance PRISULON CR-F 50
- Ink jet printing preparation, Thickeners
- Liquid
- Good outlines
- High surface levelness
- Good penetration TUBIJET DU 01
- Ink jet printing preparation
- Antimigrant
- Anionic
- Liquid
- Formaldehyde-free TUBIJET NWA
- Ink jet printing preparation
- Liquid
- Non-ionic
- Without impact on the handle
- Formaldehyde-free TUBIJET PUS
- Ink jet printing preparation
- Film forming
- Anionic
- Liquid
- Formaldehyde-free TUBIJET VDK
- Ink jet printing preparation
- Liquid
- Formaldehyde-free
- Halogen-free
- Flame protection effect TUBIJET WET
- Ink jet printing preparation
- Anionic
- Liquid
- Without impact on the handle
- Formaldehyde-free In some embodiments, the chemical agents of the invention may include the following inkjet printing dyes, which are supplied by CHT Bezema and are associated with certain selected textile (e.g., fabric) properties, which may be used in combination with SFS:

BEZAFLUOR BLUE BB
- Pigments
- High Performance
- BEZAFLUOR (fluorescent pigments)

BEZAFLUOR GREEN BT
- Pigments
- High Performance
- BEZAFLUOR (fluorescent pigments)

BEZAFLUOR ORANGE R
- Pigments
- High Performance
- BEZAFLUOR (fluorescent pigments)

BEZAFLUOR PINK BB
- Pigments
- High Performance
- BEZAFLUOR (fluorescent pigments)

BEZAFLUOR RED R
- Pigments
- High Performance
- BEZAFLUOR (fluorescent pigments)

BEZAFLUOR VIOLET BR
- Pigments
- High Performance
- BEZAFLUOR (fluorescent pigments)

BEZAFLUOR YELLOW BA
- Pigments
- High Performance
- BEZAFLUOR (fluorescent pigments)

BEZAPRINT BLACK BDC
- Pigments
- Advanced
- BEZAPRINT (classic pigments)

BEZAPRINT BLACK DT
- Pigments
- Advanced
- BEZAPRINT (classic pigments)

BEZAPRINT BLACK DW
- Pigments
- Advanced
- BEZAPRINT (classic pigments)

BEZAPRINT BLACK GOT
- Pigments
- High Performance
- BEZAKTIV GOT (GOTS)

BEZAPRINT BLUE BN
- Pigments
- Advanced
- BEZAPRINT (classic pigments)

BEZAPRINT BLUE BT
- Pigments
- Advanced
- BEZAPRINT (classic pigments)

BEZAPRINT BLUE GOT
- Pigments
- High Performance
- BEZAKTIV GOT (GOTS)

BEZAPRINT BLUE RR
- Pigments
- Advanced
- BEZAPRINT (classic pigments)

BEZAPRINT BLUE RT
- Pigments
- Advanced
- BEZAPRINT (classic pigments)

BEZAPRINT BLUE™
- Pigments
- Advanced
- BEZAPRINT (classic pigments)

BEZAPRINT BLUE TB
- Pigments
- Advanced
- BEZAPRINT (classic pigments)

BEZAPRINT BORDEAUX K2R
- Pigments
- Advanced
- BEZAPRINT (classic pigments)

BEZAPRINT BROWN RP
- Pigments
- Advanced
- BEZAPRINT (classic pigments)

BEZAPRINT BROWN™
- Pigments
- Advanced
- BEZAPRINT (classic pigments)

BEZAPRINT CITRON 10G
- Pigments
- Advanced
- BEZAPRINT (classic pigments)

BEZAPRINT CITRON GOT
- Pigments
- High Performance
- BEZAKTIV GOT (GOTS)

BEZAPRINT GREEN 2B
- Pigments
- Advanced
- BEZAPRINT (classic pigments)

BEZAPRINT GREEN BS
- Pigments
- Advanced
- BEZAPRINT (classic pigments)

BEZAPRINT GREEN BT
- Pigments
- Advanced
- BEZAPRINT (classic pigments)

BEZAPRINT GREY BB
- Pigments
- Advanced
- BEZAPRINT (classic pigments)

BEZAPRINT NAVY GOT
- Pigments
- High Performance
- BEZAKTIV GOT (GOTS)

BEZAPRINT NAVY RRM
- Pigments
- Advanced
- BEZAPRINT (classic pigments)

BEZAPRINT NAVY TR
- Pigments
- Advanced
- BEZAPRINT (classic pigments)

BEZAPRINT OLIVE GREEN BT
- Pigments
- Advanced
- BEZAPRINT (classic pigments)

BEZAPRINT ORANGE 2G
- Pigments
- Advanced
- BEZAPRINT (classic pigments)

BEZAPRINT ORANGE GOT
- Pigments
- High Performance
- BEZAKTIV GOT (GOTS)

BEZAPRINT ORANGE GT
Pigments
Advanced
BEZAPRINT (classic pigments)
BEZAPRINT ORANGE RG
Pigments
Advanced
BEZAPRINT (classic pigments)
BEZAPRINT PINK BW
Pigments
Advanced
BEZAPRINT (classic pigments)
BEZAPRINT RED 2BN
Pigments
Advanced
BEZAPRINT (classic pigments)
BEZAPRINT RED GOT
Pigments
High Performance
BEZAKTIV GOT (GOTS)
BEZAPRINT RED KF
Pigments
Advanced
BEZAPRINT (classic pigments)
BEZAPRINT RED KGC
Pigments
Advanced
BEZAPRINT (classic pigments)
BEZAPRINT SCARLET GRL
Pigments
Advanced
BEZAPRINT (classic pigments)
BEZAPRINT SCARLET RR
Pigments
Advanced
BEZAPRINT (classic pigments)
BEZAPRINT TURQUOISE GT
Pigments
Advanced
BEZAPRINT (classic pigments)
BEZAPRINT VIOLET FB
Pigments
Advanced
BEZAPRINT (classic pigments)
BEZAPRINT VIOLET KB
Pigments
Advanced
BEZAPRINT (classic pigments)
BEZAPRINT VIOLET R
Pigments
Advanced
BEZAPRINT (classic pigments)
BEZAPRINT VIOLET TN
Pigments
Advanced
BEZAPRINT (classic pigments)
BEZAPRINT YELLOW 2GN
Pigments
Advanced
BEZAPRINT (classic pigments)
BEZAPRINT YELLOW 3GT
Pigments
Advanced
BEZAPRINT (classic pigments)
BEZAPRINT YELLOW 4RM
Pigments
Advanced
BEZAPRINT (classic pigments)
BEZAPRINT YELLOW GOT
Pigments
High Performance
BEZAKTIV GOT (GOTS)
BEZAPRINT YELLOW RR
Pigments
Advanced
BEZAPRINT (classic pigments)

In some embodiments, the chemical agents of the invention may include the following, which are supplied by Lamberti SPA and are associated with certain selected textile (e.g., fabric) properties, which may be used to strengthan SFS binding on coated surfaces or SFS may be used for enhancing such chemical agent properties:

Pre Treatment:

Waterborne Polyurethanes Dispersions

Rolflex AFP.

Aliphatic polyether polyurethane dispersion in water. The product has high hydrolysis resistance, good breaking load resistance and excellent tear resistance.

Rolflex ACF.

Aliphatic polycarbonate polyurethane dispersion in water. The product shows good PU and PVC bonding properties, excellent abrasion resistance as well as chemical resistance, included alcohol.

Rolflex V 13.

Aliphatic polyether/acrylic copolymer polyurethane dispersion in water. The product has good thermoadhesive properties and good adhesion properties on PVC.

Rolflex K 80.

Aliphatic polyether/acrylic copolymer polyurethane dispersion in water. ROLFLEX K 80 is specifically designed as a high performing adhesive for textile lamination. The product has excellent perchloroethylene and water fastness.

Rolflex ABC.

Aliphatic polyether polyurethane dispersion in water. Particularly, the product presents very high water column, excellent electrolytes resistance, high LOI index, high resistance to multiple bending.

Rolflex ADH.

Aliphatic polyether polyurethane dispersion in water. The product has a very high water column resistance.

Rolflex W4.

Aliphatic waterborned PU dispersion particularly suggested for the formulation of textile coatings for clothing, outwear where a full, soft and non sticky touch is required.

Rolflex ZB7.

Aliphatic waterborned PU dispersion particularly suggested for the formulation of textile coatings for clothing, outwear, sportswear, fashion and technical articles for industrial applications. The product has a very high charge digestion properties, electrolites stability and excellent mechanical and tear resistance. Can be also suitable for foam coating and printing application.

Rolflex BZ 78.

Aliphatic waterborned PU dispersion particularly suggested for the formulation of textile coatings for clothing, outwear, sportswear, fashion and technical articles for industrial applications. The product has an excellent hydrolysis resistance, a very high charge digestion and electrolites stability and an excellent mechanical and tear resistance. Can be also suitable for foam coating and printing application.

Rolflex PU 147.

Aliphatic polyether polyurethane dispersion in water. This product shows good film forming properties at room temperature. It has high fastness to light and ultraviolet radiation and good resistance to water, solvent and chemical agents, as well as mechanical resistance.

Rolflex SG.

Aliphatic polyether polyurethane dispersion in water. Due to its thermoplastic properties it is suggested to formulate heat activated adhesives at low temperatures.

Elafix PV 4.

Aliphatic blocked isocyanate Nano-dispersion used in order to give antifelting and antipilling properties to pure wool fabrics and his blend.

Rolflex C 86.

Aliphatic cationic waterborned PU dispersion particularly suggested for the formulation of textile coatings for clothing, outwear, fashion where medium-soft and pleasant full touch is required. Fabrics treated with the product can be dyed with a selection of dyes, to get double-color effects of different intensity.

Rolflex CN 29.

Aliphatic cationic waterborned PU dispersion particularly suggested for the formulation of textile coatings for clothing, outwear, fashion where soft and pleasant full touch is required. Fabrics treated with the product can be dyed with a selection of dyes, to get double-color effects of different intensity.

Oil and Water Repellents

Lamgard FT 60.

General purpose fluorocarbon resin for water and oil repellency; by padding application.

Lamgard 48.

High performance fluorocarbon resin for water and oil repellency; by padding application. High rubbing fastness.

Imbitex NRW3

Wetting agent for water- and oil repellent finishing.

Lamgard EXT.

Crosslinker for fluorocarbon resins to improve washing fastness.

Flame Retardants

Piroflam 712.

Non-permanent flame retardant compound for padding and spray application.

Piroflam ECO.

Alogen free flame retardant compound for back coating application for all kind of fibers.

Piroflam UBC.

Flame retardant compound for back coating application for all kind of fibers.

Crosslinkers

Rolflex BK8.

Aromatic blocked polyisocyanate in water dispersion. It is suggested as a cross-linking agent in coating pastes based of polyurethane resins to improve washing fastness.

Fissativo 05.

Water dispersible aliphatic polyisocyanate suitable as crosslinking agent for acrylic and polyurethane dispersions to improve adhesion and wet and dry scrub resistance.

Resina MEL.

Melammine-formaldheyde resin.

Cellofix VLF.

Low formaldheyde malammine resin.

Thickeners

Lambicol CL 60.

Fully neutralised synthetic thickener for pigment printing in oil/water emulsion; medium viscosity type Viscolam PU conc.

Nonionic polyurethane based thickener with pseudoplastic behavior

Viscolam 115 new.

Acrylic thickener not neutralised

Viscolam PS 202.

Nonionic polyurethane based thickener with newtonian behavior

Viscolam 1022.

Nonionic polyurethane based thickener with moderate pseudoplastic behavior.

Dyeing

Dispersing Agents

Lamegal BO.

Liquid dispersing agent non ionic, suitable for direct, reactive, disperse dyeing and PES stripping Lamegal DSP.

Dispersing/anti back-staining agent in preparation, dyeing and soaping of dyed and printed materials. Antioligomer agent.

Lamegal 619.

Effective low foam dispersing leveling agent for dyeing of PES

Lamegal TLS.

Multi-purpose sequestring and dispersing agent for all kind of textile process

Levelling Agents

Lamegal A 12.

Leveling agent for dyeing on wool, polyamide and its blends with acid or metalcomplex dyes Fixing Agents Lamfix L.

Fixing agent for direct and reactive dyestuffs, containing formaldheyde

Lamfix LU conc.

Formaldehyde free cationic fixing agent for direct and reactive dyes. It does not affect the shade and light fastness.

Lamfix PA/TR.

Fixing agent to improve the wet fastness of acid dyes on polyamide fabrics, dyed or printed and polyamide yarns. Retarding agent in dyeing of Polyamide/cellulosic blends with direct dyes.

Special Resins

Denifast TC.

Special resin for cationization of cellulose fibers to obtain special effects ("DENIFAST system" and "DENISOL system").

Cobral DD/50.

Special resin for cationization of cellulose fibers to obtain special effect ("DENIFAST system" and "DENISOL system").

Antireducing Agents

Lamberti Redox L2S gra.

Anti-reducing agent in grain form. 100% active content

Lamberti Redox L2S liq.

Anti-reducing agent in liquid form for automatic dosage.

Anticreasing Agent

Lubisol AM.

Lubricating and anti creasing agent for rope wet operation on all kind of fibers and machines.

Pigment Dye

Antimigrating Agent

Neopat Compound 96/m conc.

Compound, developed as migration inhibitor for continuous dyeing process with pigments (pad-dry process).

Binding Agent

Neopat Binder PM/S conc.

Concentrated version of a specific binder used to prepare pad-liquor for dyeing with pigments (pad-dry process).

All in One Agent

Neopat Compound PK1.

High concentrated compound specifically developed as migration inhibitor with specific binder for continuous dyeing process with pigments (pad-dry process) all in one Delavè Agent Neopat compound FTN.

High concentrated compound of surfactants and polymers specifically developed for pigment dyeing and pigment-reactive dyeing process; especially for medium/dark shades for wash off effect Traditional Finishing Agents Wrinkle Free Treatment Cellofix ULF conc.

Anti-crease modified glyoxalic resin for finishing of cottons, cellulosics and blend with synthetics fibers.

Poliflex PO 40.

Polyethilenic resin for waxy, full and slippy handle by foulard applications.

Rolflex WF.

Aliphatic waterborned Nano-PU dispersion used as extender for wrinkle free treatments.

Softeners

Texamina C/FPN.

Cationic softening agent with a very soft handle particularly recommended for application by exhaustion for all kind of fabrics. Suitable also for cone application.

Texamina C SAL flakes.

100% cationic softening agent in flakes form for all type of fabrics. Dispersible at room temperature.

Texamina CL LIQ.

Anphoteric softening agent for all types of fabrics. Not yellowing.

Texamina HVO.

Anphoteric softening agent for woven and knitted fabrics of cotton, other cellulosics and blends. Gives a soft, smooth and dry handle. Applied by padding.

Texamina SIL.

Nonionic silicon dispersion in water. Excellent softening, lubricating and anti-static properties for all fibre types by padding.

Texamina SILK.

Special cationic softener with silk protein inside. Gives a "swollen touch" particularly suitable for cellulosic, wool, silk.

Lamfinish LW.

All-in compound based on special polymeric hydrophilic softeners; by coating, foulard, and exhaustion.

Elastolam E50.

General purpose mono-component silicone elastomeric softener for textile finishing.

Elastolam EC 100.

Modified polysiloxane micro-emulsion which gives a permanent finishing, with extremely soft and silky handle.

Handle Modifier

Poliflex CSW.

Cationic anti-slipping agent.

Poliflex R 75.

Parafine finishing agent to give waxy handle.

Poliflex s.

Compound specifically developed for special writing effects.

Poliflex m.

Compound for special dry-waxy handle.

Lamsoft SW 24.

Compound for special slippy handle specifically developed for coating application.

Lamfinish SLIPPY.

All-in compound to get a slippy touch; by coating.

Lamfinish GUMMY.

All-in compound to get a gummy touch; by coating.

Lamfinish OLDRY.

All-in compound to get dry-sandy touch especially suitable for vintage effects; by coating Waterborne Polyurethanes Dispersions Rolflex LB 2.

Aliphatic waterborned PU dispersion particularly suggested for the formulation of textile coatings where bright and rigid top finish is required. It is particularly suitable as a finishing agent for organza touch on silk fabrics. Transparent and shiny.

Rolflex HP 51.

Aliphatic waterborned PU dispersion particularly suggested for the formulation of textile coatings for outwear, luggage, technical articles especially where hard and flexible touch is required. Transparent and shiny.

Rolflex PU 879.

Aliphatic waterborned PU dispersion particularly suggested for the formulation of textile coatings for outwear, luggage, technical articles where a medium-hard and flexible touch is required.

Rolflex ALM.

Aliphatic waterborned PU dispersion particularly suggested for the formulation of textile coatings for outwear, luggage, technical articles where a soft and flexible touch is required. Can be also suitable for printing application.

Rolflex AP.

Aliphatic waterborned PU dispersion particularly suggested for the formulation of textile coatings for outwear, fashion where a soft and gummy touch is required.

Rolflex W4.

Aliphatic waterborned PU dispersion particularly suggested for the formulation of textile coatings for clothing, outwear where a full, soft and non sticky touch is required.

Rolflex ZB7.

Aliphatic waterborned PU dispersion particularly suggested for the formulation of textile coatings for clothing, outwear, sportswear, fashion and technical articles for industrial applications. The product has a very high charge digestion properties, electrolites stability and excellent mechanical and tear resistance. Can be also suitable for foam coating and printing application.

Rolflex BZ 78.

Aliphatic waterborned PU dispersion particularly suggested for the formulation of textile coatings for clothing, outwear, sportswear, fashion and technical articles for industrial applications. The product has an excellent hydrolysis resistance, a very high charge digestion and electrolites stability and an excellent mechanical and tear resistance. Can be also suitable for foam coating and printing application.

Rolflex K 110.

Gives to the coated fabric a full, soft, and slightly sticky handle with excellent fastness on all types of fabrics.

Rolflex OP 80.

Aliphatic waterborned PU dispersion particularly suggested for the formulation of textile coatings for outwear, luggage and fashion finishes where an opaque non writing effect is desired.

Rolflex NBC.

Aliphatic waterborned PU dispersion generally used by padding application as a filling and zero formaldheyde sizing agent. Can be used for outwear and fashion finishings where a full, elastic and non sticky touch is required.

Rolflex PAD.

Aliphatic waterborned PU dispersion specifically designed for padding application for outwear, sportswear and fashion applications where a full, elastic and non sticky touch is required. Excellent washing and dry cleaning fastness as well as good bath stability.

Rolflex PN.

Aliphatic waterborned PU dispersion generally applied by padding application for outerwear and fashion high quality applications where strong, elastic non sticky finishes are required.

Elafix PV 4.

Aliphatic blocked isocyanate Nano-dispersion used in order to give antifelting and antipilling properties to pure wool fabrics and his blend.

Rolflex SW3.

Aliphatic waterborned PU dispersion particularly suggested to be used by padding application for the finishing of outwear, sportswear and fashion where a slippery and elastic touch is required. It is also a good antipilling agent. Excellent in wool application.

Rolflex C 86.

Aliphatic cationic waterborned PU dispersion particularly suggested for the formulation of textile coatings for clothing, outwear, fashion where medium-soft and pleasant full touch is required. Fabrics treated with the product can be dyed with a selection of dyes, to get double-color effects of different intensity.

Rolflex CN 29.

Aliphatic cationic waterborned PU dispersion particularly suggested for the formulation of textile coatings for clothing, outwear, fashion where soft and pleasant full touch is required. Fabrics treated with the product can be dyed with a selection of dyes, to get double-color effects of different intensity.

Other Resins

Textol 110.

Handle modifier with very soft handle for coating finishes

Textol RGD.

Water emulsion of acrylic copolymer for textile coating, with very rigid handle.

Textol SB 21.

Butadienic resin for finishing and binder for textile printing

Appretto PV/CC.

Vinylacetate water dispersion for rigid stiffening

Amisolo B.

CMS water dispersion for textile finishing as stiffening agent

Lamovil RP.

PVOH stabilized solution as stiffening agent

Technical Finishing Agents

Waterborne Polyurethanes Dispersions

Rolflex AFP.

Aliphatic polyether polyurethane dispersion in water. The product has high hydrolysis resistance, good breaking load resistance and excellent tear resistance.

Rolflex ACF.

Aliphatic polycarbonate polyurethane dispersion in water. The product shows good PU and PVC bonding properties, excellent abrasion resistance as well as chemical resistance, included alcohol.

Rolflex V 13.

Aliphatic polyether/acrylic copolymer polyurethane dispersion in water. The product has good thermoadhesive properties and good adhesion properties on PVC.

Rolflex K 80.

Aliphatic polyether/acrylic copolymer polyurethane dispersion in water. ROLFLEX K 80 is specifically designed as a high performing adhesive for textile lamination. The product has excellent perchloroethylene and water fastness.

Rolflex ABC.

Aliphatic polyether polyurethane dispersion in water. Particularly, the product presents very high water column, excellent electrolytes resistance, high LOI index, high resistance to multiple bending.

Rolflex ADH.

Aliphatic polyether polyurethane dispersion in water. The product has a very high water column resistance.

Rolflex W4.

Aliphatic waterborned PU dispersion particularly suggested for the formulation of textile coatings for clothing, outwear where a full, soft and non sticky touch is required.

Rolflex ZB7.

Aliphatic waterborned PU dispersion particularly suggested for the formulation of textile coatings for clothing, outwear, sportswear, fashion and technical articles for industrial applications. The product has a very high charge digestion properties, electrolites stability and excellent mechanical and tear resistance. Can be also suitable for foam coating and printing application.

Rolflex BZ 78.

Aliphatic waterborned PU dispersion particularly suggested for the formulation of textile coatings for clothing, outwear, sportswear, fashion and technical articles for industrial applications. The product has an excellent hydrolysis resistance, a very high charge digestion and electrolites stability and an excellent mechanical and tear resistance. Can be also suitable for foam coating and printing application.

Rolflex PU 147.

Aliphatic polyether polyurethane dispersion in water. This product shows good film forming properties at room temperature. It has high fastness to light and ultraviolet radiation and good resistance to water, solvent and chemical agents, as well as mechanical resistance.

Rolflex SG.

Aliphatic polyether polyurethane dispersion in water. Due to its thermoplastic properties it is suggested to formulate heat activated adhesives at low temperatures.

Elafix PV 4.

Aliphatic blocked isocyanate Nano-dispersion used in order to give antifelting and antipilling properties to pure wool fabrics and his blend.

Rolflex C 86.

Aliphatic cationic waterborned PU dispersion particularly suggested for the formulation of textile coatings for clothing, outwear, fashion where medium-soft and pleasant full touch is required. Fabrics treated with the product can be dyed with a selection of dyes, to get double-color effects of different intensity.

Rolflex CN 29.

Aliphatic cationic waterborned PU dispersion particularly suggested for the formulation of textile coatings for clothing, outwear, fashion where soft and pleasant full touch is required. Fabrics treated with the product can be dyed with a selection of dyes, to get double-color effects of different intensity.

Oil and Water Repellents

Lamgard FT 60.

General purpose fluorocarbon resin for water and oil repellency; by padding application.

Lamgard 48.

High performance fluorocarbon resin for water and oil repellency; by padding application. High rubbing fastness.

Imbitex NRW3.

Wetting agent for water- and oil repellent finishing.

Lamgard EXT.

Crosslinker for fluorocarbon resins to improve washing fastness.

Flame Retardants

Piroflam 712.

Non-permanent flame retardant compound for padding and spray application.

Piroflam ECO.

Alogen free flame retardant compound for back coating application for all kind of fibers.

Piroflam UBC.

Flame retardant compound for back coating application for all kind of fibers.

Crosslinkers

Rolflex BK8.

Aromatic blocked polyisocyanate in water dispersion. It is suggested as a cross-linking agent in coating pastes based of polyurethane resins to improve washing fastness.

Fissativo 05.

Water dispersible aliphatic polyisocyanate suitable as crosslinking agent for acrylic and polyurethane dispersions to improve adhesion and wet and dry scrub resistance.

Resina MEL.

Melammine-formaldheyde resin.

Cellofix VLF.

Low formaldheyde malammine resin.

Thickeners

Lambicol CL 60.

Fully neutralised synthetic thickener for pigment printing in oil/water emulsion; medium viscosity type Viscolam PU conc.

Nonionic polyurethane based thickener with pseudoplastic behavior

Viscolam 115 new.

Acrylic thickener not neutralised

Viscolam PS 202.

Nonionic polyurethane based thickener with newtonian behavior

Viscolam 1022.

Nonionic polyurethane based thickener with moderate pseudoplastic behavior.

In some embodiments, the chemical agent may include one or more of a silicone, an acidic agent, a dyeing agent, a pigment dye, a traditional finishing agent, and a technical finishing agent. The dyeing agent may include one or more of a dispersing agent, a levelling agent, a fixing agent, a special resin, an antireducing agent, and an anticreasing agent. The pigment dye may include one or more of an antimigrating agent, a binding agent, an all in one agent, and a delave agent. The traditional finishing agent may include one or more of a wrinkle free treatment, a softener, a handle modifier, a waterborne polyurethanes dispersion, and other resins. The technical finishing agent may include one or more of a waterborne polyurethanes dispersion, an oil repellant, a water repellant, a crosslinker, and a thickener.

In some embodiments, certain chemical agents of the invention may be provided by one or more of the following chemical suppliers: Adrasa, AcHitex Minerva, Akkim, Archroma, Asutex, Avocet dyes, BCC India, Bozzetto group, CHT, Clearity, Dilube, Dystar, Eksoy, Erca group, Genkim, Giovannelli e Figli, Graf Chemie, Huntsman, KDN Bio, Lamberti, LJ Specialties, Marlateks, Montegauno, Protex, Pulcra Chemicals, Ran Chemicals, Fratelli Ricci, Ronkimya, Sarex, Setas, Silitex, Soko Chimica, Tanatex Chemicals, Zaitex, Zetaesseti, and Z Schimmer.

In some embodiments, the chemical agent may include an acidic agent. Accordingly, in some embodiments, SFS may include an acidic agent. In some embodiments, an acidic agent may be a Bronsted acid. In an embodiment, the acidic agent includes one or more of citric acid and acetic acid. In an embodiment, the acidic agent aids the deposition and coating of SPF mixtures (i.e., SFS coating) on the textile to be coated as compared to the absence of such acidic agent. In an embodiment, the acidic agent improves crystallization of the SPF mixtures at the textile to be coated.

In an embodiment, the acidic agent is added at a concentration by weight (% w/w or % w/v) or by volume (v/v) of greater than about 0.001%, or greater than about 0.002%, or greater than about 0.003%, or greater than about 0.004%, or greater than about 0.005%, or greater than about 0.006%, or greater than about 0.007%, or greater than about 0.008%, or greater than about 0.009%, or greater than about 0.01%, or greater than about 0.02%, or greater than about 0.03%, or greater than about 0.04%, or greater than about 0.05%, or greater than about 0.06%, or greater than about 0.07%, or greater than about 0.08%, or greater than about 0.09%, or greater than about 0.1%, or greater than about 0.2%, or greater than about 0.3%, or greater than about 0.4%, or greater than about 0.5%, or greater than about 0.6%, or greater than about 0.7%, or greater than about 0.8%, or greater than about 0.9%, or greater than about 1.0% or greater than about 2.0%, or greater than about 3.0%, or greater than about 4.0%, or greater than about 5.0%.

In an embodiment, the acidic agent is added at a concentration by weight (% w/w or % w/v) or by volume (v/v) of less than about 0.001%, or less than about 0.002%, or less than about 0.003%, or less than about 0.004%, or less than about 0.005%, or less than about 0.006%, or less than about 0.007%, or less than about 0.008%, or less than about 0.009%, or less than about 0.01%, or less than about 0.02%, or less than about 0.03%, or less than about 0.04%, or less than about 0.05%, or less than about 0.06%, or less than about 0.07%, or less than about 0.08%, or less than about 0.09%, or less than about 0.1%, or less than about 0.2%, or less than about 0.3%, or less than about 0.4%, or less than about 0.5%, or less than about 0.6%, or less than about 0.7%, or less than about 0.8%, or less than about 0.9%, or less than about 1.0% or less than about 2.0%, or less than about 3.0%, or less than about 4.0%, or less than about 5.0%.

In some embodiments, SFS may have a pH of less than about 9, or less than about 8.5, or less than about 8, or less than about 7.5, or less than about 7, or less than about 6.5, or less than about 6, or less than about 5.5, or less than about 5, or less than about 4.5, or less than about 4, or greater than about 3.5, or greater than about 4, or greater than about 4.5, or greater than about 5, or greater than about 5.5, or greater than about 6, or greater than about 6.5, or greater than about 7, or greater than about 7.5, or greater than about 8, or greater than about 8.5.

In some embodiments, SFS may include an acidic agent, and may have a pH of less than about 9, or less than about 8.5, or less than about 8, or less than about 7.5, or less than about 7, or less than about 6.5, or less than about 6, or less than about 5.5, or less than about 5, or less than about 4.5, or less than about 4, or greater than about 3.5, or greater than about 4, or greater than about 4.5, or greater than about 5, or greater than about 5.5, or greater than about 6, or greater than about 6.5, or greater than about 7, or greater than about 7.5, or greater than about 8, or greater than about 8.5.

In an embodiment, the chemical agent may include silicone. In some embodiments, a SFS may include silicone. In some embodiments, silicone may include a silicone emulsion. The term "silicone," may generally refer to a broad family of synthetic polymers, mixtures of polymers, and/or emulsions thereof, that have a repeating silicon-oxygen backbone including, but not limited to, polysiloxanes. For example, a silicone may include ULTRATEX® CSP, which is a commercially available (Huntsman International LLC) silicone emulsion that may be used as a softening agent and which may also increase fabric resilience, elasticity of knitted fabrics, and fiber lubrication and also improve sewability. A silicone may also include ULTRATEX® CI, which is a commercially available silicone composition (Huntsman International LLC) that may be used as a fabric softening agent. In some embodiments, a silicone may include any silicone species disclosed herein.

Describing the compositions and coatings more broadly, silicone may be used, for example to improve fabric hand, but may also increase the water repellency (or reduce water transport properties) of a fabric coated with silicone. Silicone may be used in combination with SFS to counteract the water repellant (water transport) properties of silicone.

In some embodiments, SFS may include silicone in a concentration by weight (% w/w or % w/v) or by volume (v/v) of less than about 25%, or less than about 20%, or less than about 15%, or less than about 10%, or less than about 9%, or less than about 8%, or less than about 7%, or less than about 6%, or less than about 5%, or less than about 4%, or less than about 3%, or less than about 2%, or less than about 1%, or less than about 0.9%, or less than about 0.8%, or less than about 0.7%, or less than about 0.6%, or less than about 0.5%, or less than about 0.4%, or less than about 0.3%, or less than about 0.2%, or less than about 0.1%, or less than about 0.01%, or less than about 0.001%.

In some embodiments, SFS may include silicone in a concentration by weight (% w/w or % w/v) or by volume (v/v) of greater than about 25%, or greater than about 20%, or greater than about 15%, or greater than about 10%, or greater than about 9%, or greater than about 8%, or greater than about 7%, or greater than about 6%, or greater than about 5%, or greater than about 4%, or greater than about 3%, or greater than about 2%, or greater than about 1%, or greater than about 0.9%, or greater than about 0.8%, or greater than about 0.7%, or greater than about 0.6%, or greater than about 0.5%, or greater than about 0.4%, or greater than about 0.3%, or greater than about 0.2%, or greater than about 0.1%, or greater than about 0.01%, or greater than about 0.001%.

In some embodiments, SFS may be supplied in a concentrated form suspended in water. In some embodiments, SFS may have a concentration by weight (% w/w or w/v) or by volume (v/v) of less than about 50%, or less than about 45%, or less than about 40%, or less than about 35%, or less than about 30%, or less than about 25%, or less than about 20%, or less than about 15%, or less than about 10%, or less than about 5%, or less than about 4%, or less than about 3%, or less than about 2%, or less than about 1%, or less than about 0.1%, or less than about 0.01%, or less than about 0.001%, or less than about 0.0001%, or less than about 0.00001%. In some embodiments, SFS may have a concentration by weight (% w/w or % w/v) or by volume (v/v) of greater than about 50%, or greater than about 45%, or greater than about 40%, or greater than about 35%, or greater than about 30%, or greater than about 25%, or greater than about 20%, or greater than about 15%, or greater than about 10%, or greater than about 5%, or greater than about 4%, or greater than about 3%, or greater than about 2%, or greater than about 1%, or greater than about 0.1%, or greater than about 0.01%, or greater than about 0.001%, or greater than about 0.0001%, or greater than about 0.00001%.

In some embodiments, an SFS coating may include SFS, as described herein. In some embodiments, SFS may include a silicone and/or an acidic agent. In some embodiments, SFS may include a silicone and an acidic agent. In some embodiments, the SFS may include a silicone, an acidic agent, and/or an additional chemical agent, wherein the additional chemical agent may be one or more of the chemical agents described herein. In some embodiments, SFS may include a silicone emulsion and an acidic agent, such as acetic acid or citric acid.

In some embodiments, the coating processes of the invention may include a finishing step for the resulting coated textiles. In some embodiments, the finishing or final finishing of the textiles (e.g., fabrics) that are coated with SFS under the processes of the invention may include sueding, steaming, brushing, polishing, compacting, raising, tigering, shearing, heatsetting, waxing, air jet, calendaring, pressing, shrinking, treatment with polymerizer, coating, lamination, and/or laser etching. In some embodiments, finishing of the SFS coated textiles may include treatment of the textiles with an AIRO® 24 dryer that may be used for continuous and open-width tumbling treatments of woven, non-woven, and knitted fabrics.

In some embodiments, a coated textile (e.g., a fabric) may be prepared by unrollng a fabric roll (FIG. 319) to prepare a piece of fabric. The perimeter of such fabric may be processed. For example, fabric (FIG. 320) may have dimensions of 35 cm×35 cm (13.5 inch×13.5 inch) with a tolerance of +/−1 cm (+/−0.4 inch). In some embodiments, every fabric sample may be massed on analytical balance by folding the fabric sample multiple times until it may be contained by a weighing boat on a balance. Each measurement may be recorded. In some embodiments, a coating process may be initiated by preparing a curing oven by setting a selected temperature therein. A padder laboratory unit may be turned on and the speed of said padder unit may be set to a selected velocity and the roller pressure may be adjusted to a selected pressure by operating a cam lever system and locking it in place once the desired pressure is achieved. A silk solution (i.e., SFS) may be poured into a bath (e.g., a stainless steel bath) (FIG. 321). After a fabric sample is submerged in the bath, it may be allowed to reach saturation, and the fabric sample may then be removed from the bath and laid between two rollers of the padder unit (FIG. 322). The fabric sample as it is transported through the rollers it may be squeezed of excessive fluid as determined by the rollers' pressure. The fabric sample may then exit to the opposite side of the rollers. The resulting fabric sample may then be placed on top of the curing frame and may then be gently pushed one edge at a time to engage the fabric edges with frame pins (see FIGS. 323 and 324). The frame may be placed in the drying and curing oven, with the door of said oven secured and kept closed for the drying and curing time (FIG. 325). A timer may be started to alert when the drying and curing time has elapsed. When the timer signals completion of the curing process, the oven door is opened and a temperature sensor (e.g., an IR temperature sensor) may be used to measure the fabric sample surface temperature. The frame bearing the fabric sample may then be removed from the oven and placed on a cooling rack (FIG. 326). The sample fabric may then be removed from the frame and weighed.

In some embodiments, the SFS coated textiles (e.g., fabrics) described herein may meet or exceed requirements established by the following Test Methods:

| Test Description | Test Method | Requirements |
|---|---|---|
| Dimensional Stability to Laundering | AATCC 135 | Maximum, Length: −3% Width: −3%<br>Maximum, Length: −3%, Width: −5%, for twoway Stretch Fabrics<br>Maximum, Length: −5%, Width: −5%, for fourway Stretch Fabrics<br>No Growth |
| Dimensional Stability to Dry Cleaning | AATCC 158 | Maximum, Length: −3%, Width: −3%<br>Maximum, Length: −3%, Width: −5%, for twoway Stretch Fabrics<br>Maximum, Length: −5%, Width: −5%, for four-way Stretch Fabrics<br>No Growth |

-continued

| Test Description | Test Method | Requirements |
|---|---|---|
| Pilling Resistance | ASTM D 3512 | Minimum 3.0 |
| Abrasion Resistance | ASTM D 4966 | No rupture to 10,000 cycles (plain fabrics up to 7.5 oz/yd$^2$: or no rupture to 15,000 cycles (plain fabrics over 7.5 oz/yd$^2$) |
| Tearing Strength | ASTM D 1424 | Shorts, Pants, Jeans, Jackets, All Plus Size Styles: 2.5 Lbs Minimum; or<br>Blouse, Skirt Dress, Lining, excluding plus size styles: 1.5 Lbs Minimum; or<br>Intimate:<br><3 oz/yd$^2$: Minimum 1.5 lbs;<br>3-6 oz/yd$^2$: Minimum 2.0 lbs<br>>6 oz/yd$^2$: Minimum 2.5 lbs |
| Colorfastness to Laundering/Colorfastness to Washing | AATCC 61, 2A | Color Change: Minimum 4.0<br>Staining: Minimum 3.0 |
| Colorfastness to Dry Cleaning | AATCC 132 | Color Change: Minimum 4.0<br>Staining: Minimum 3.0 |
| Colorfastness to Crocking/Colorfastness to Rubbing | AATCC 8 | All except below—Dry: Minimum 4.0; Wet: Minimum 3.0; or<br>Dark Shades (black, red, navy)—Dry: Minimum 4.0; Wet; Minimum 2.5; or<br>Indigos—Dry: Minimum 3.0; Wet: Minimum 2.0; or<br>Pigments—Dry: Minimum 3.5; Wet: Minimum 2.5. |
| Colorfastness to Water | AATCC 107 | Color Change: Minimum 4.0; Staining: Minimum 3.0 |
| Colorfastness to Perspiration | AATCC 15 | Color Change: Minimum 4.0; Staining: Minimum 3 |
| Colorfastness to Light | AATCC 16/20 AFU<br>AATCC 16/5 AFU | Color Change: Minimum 4.0 |
| pH Value | AATCC 81 | 4.0~8.5 or 4.0~7.5 (children <36 months) |
| Antimicrobial | AATCC 147 | Original: 0% Bacterial Growth 20 Washes: 0% Bacterial Growth |
| | AATCC 100 | Minimum 99.9% Reduction |
| | ASTM E 2149 | Original: Minimum 99.9% Reduction<br>20 Washes: Minimum 80% Reduction |
| Wicking | AATCC 79 | 1.0 second or less |
| Water Repellency—Spray Test | AATCC 22 | Original: 100 Rating<br>After 3× Washes: Minimum 70 Rating |
| Water Resistance—Rain Test | AATCC 35 | Maximum 1 gram on original and after 3× washes |
| Dimensional Stability to Laundering (Yoga Garment) | AATCC 150 | Maximum, Length = −3%, Width = −3%<br>Maximum, Length = −3%, Width = −5% for two-way Stretch Fabrics<br>Maximum, Length = −5%, Width = −5% for four-way Stretch fabrics<br>No Distortion Between Components<br>No Growth |

-continued

| Test Description | Test Method | Requirements |
|---|---|---|
| Dimensional Stability to Dry Cleaning (Yoga Garment) | AATCC 158 | Maximum, Length = −3%, Width = −3%<br>Maximum, Length = −3%, Width = −5%, for two-way Stretch Fabrics<br>Maximum, Length = −5%, Width = −5%, for four-way Stretch Fabrics<br>No Distortion Between Components<br>No Growth |
| Pilling Resistance (Yoga Garment) | ASM D 3512 | Minimum 3.0 |
| Colorfastness to Laundering/Colorfastness to Washing (Yoga Garment) | AATCC 61, 2A | Color Change: Minimum 4.0<br>Staining: Minimum 3.0 |
| Colorfastness Crocking/Colorfastness to Rubbing (Yoga Garment) | AATCC 8 | General: Dry: Minimum 4.0; Wet: Minimum 3.0;<br>For Dark Colors (Black, Red, Navy): Wet: Minimum 2.5<br>Pigment: Dry: Minimum 3.5; Wet: Minimum 2.5<br>Indigos: Dry: Minimum 3.0; Wet: Minimum 2.0 |
| Colorfastness to Water (Yoga Garment) | AATCC 107 | Color Change: Minimum 4.0<br>Staining: Minimum 3.0 |
| Colorfastness to Perspiration (Yoga Garment) | AATCC 15 | Color Change: 4.0 or better<br>Staining: 3.0 or better |
| Colorfastness to Light (Yoga Garment) | AATCC 16, 20 AFU/5 AFU | Minimum 4.0, All, Except Silk/Minimum 4.0, Silk |
| pH Value (Yoga Garment) | AATCC 81 | Children (>36 months) & Adults: 4.0~8.5<br>Children <36 months): 4.0~7.5 |

In some embodiments, the SFS coated textiles (e.g., fabrics) described herein may meet requirements established by the foregoing Test Methods. In some embodiments, the SFS coated textiles (e.g., fabrics) described herein may exceed the requirements established by the foregoing Test Methods.

In some embodiments, the SFS coated textiles (e.g., fabrics) may have antimicrobial activity (e.g., antifungal and/or antibacterial activity) due to the SFS coating. In an embodiment, antibacterial activity may be determined by the ability of bacteria on the SFS coated textile's surface to be washed away from the SFS coated textile surface following one or more wash cycles, or two or more wash cycles, or three or more wash cycles, or four or more wash cycles, or five or more wash cycles, where the bacteria do not adhere to the surface of the SFS coated textile. In an embodiment, antibacterial activity may be determined by the ability of the SFS coating to reduce the quantity of the bacteria deposited on a surface of the SFS coated textile, wherein the SFS coating may reduce the quantity of the bacteria by greater than about 1%, or greater than about 2%, or greater than about 3%, or greater than about 4%, or greater than about 5%, or greater than about 10%, or greater than about 20%, or greater than about 30%, or greater than about 40%, or greater than about 50%, or greater than about 60%, or greater than about 70%, or greater than about 80%, or greater than about 90%, or greater than about 95%, or greater than about 96%, or greater than about 97%, or greater than about 98%, or greater than about 99%, or by about 100%. In an embodiment, antibacterial activity of the SFS coating on the coated textile may be determined by fluorescent activity (see, e.g., U.S. Pat. Nos. 5,089,395 and 5,968,762, the entirety of which are incorporated herein by reference). In an embodiment, antibacterial activity for an SFS coating may be determined by the ability of the SFS coating on a coated textile to break up colonies of bacteria that may be deposited on a surface of the coated textile. In an embodiment, antibacterial activity for an SFS coating may be determined by the ability of the SFS coating on a coated textile to: (a) prevent the formation of a bacterial biofilm on the coated textile; and/or (b) reduce the size of a bacterial biofilm on the coated textile.

In some embodiments, SFS may be coated upon a textile or other material having antimicrobial (e.g., antibacterial and/or antifungal) properties without interfering with such properties or otherwise inhibiting such properties.

In an embodiment, a textile may be coated with SFS to provide an SFS coated article. In some embodiments, the textile may include one or more of polyester, polyamide, polyaramid, polytetrafluorethylene, polyethylene, polypropylene, polyurethane, silicone, mixtures of polyurethane and polyethylenglycol, ultrahigh molecular weight polyethylene, high-performance polyethylene, nylon, and LYCRA (polyester-polyurethane copolymer, also known as SPANDEX and elastomer). In some embodiments, the textile may include LYCRA.

In some embodiments, the SFS coated article may have a crocking value of greater than 4 as determined by AATCC 8. In some embodiments, the SFS coated article may have a crocking value of greater than 4 as determined by AATCC 8, wherein the SFS coated article includes one or more of a silicone and an acidic agent. In some embodiments, the SFS coated article may have a crocking value of greater than 4 as determined by AATCC 8, wherein the SFS coated article includes a silicone.

In some embodiments, the SFS coated article may have an overall moisture management capability (OMMC) of greater than 0.3. In some embodiments, the SFS coated article may have an overall moisture management capability (OMMC) of greater than 0.3, wherein the SFS coated article includes one or more of a silicone and an acidic agent. In some embodiments, the SFS coated article may have an overall moisture management capability (OMMC) of greater than 0.3, wherein the SFS coated article includes a silicone.

In some embodiments, the SFS coated article may contain no sites for bacterial adhesion. In some embodiments, the SFS coated article may contain no sites for bacterial adhesion after heat treatment. In some embodiments, the SFS coated article may contain no sites for bacterial adhesion following a wash cycle with non-chlorinated bleach. In some embodiments, the SFS coated article may contain no bacteria after washing.

EXAMPLES

The following examples are put forth so as to provide those of ordinary skill in the art with a complete disclosure and description of how to make and use the described embodiments, and are not intended to limit the scope of what the inventors regard as their invention nor are they intended to represent that the experiments below are all or the only experiments performed. Efforts have been made to ensure accuracy with respect to numbers used (e.g., amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1. Tangential Flow Filtration (TFF) to Remove Solvent from Dissolved Silk Solutions A variety of % silk concentrations have been produced through the use of Tangential Flow Filtration (TFF). In all cases a 1% silk solution was used as the input feed. A range of 750-18,000 mL of 1% silk solution was used as the starting volume. Solution is diafiltered in the TFF to remove lithium bromide. Once below a specified level of residual LiBr, solution undergoes ultrafiltration to increase the concentration through removal of water. See examples below.

7.30% Silk Solution: A 7.30% silk solution was produced beginning with 30 minute extraction batches of 100 g silk cocoons per batch. Extracted silk fibers were then dissolved using 100° C. 9.3 M LiBr in a 100° C. oven for 1 hour. 100 g of silk fibers were dissolved per batch to create 20% silk in LiBr. Dissolved silk in LiBr was then diluted to 1% silk and filtered through a 5 um filter to remove large debris. 15,500 mL of 1%, filtered silk solution was used as the starting volume/diafiltration volume for TFF. Once LiBr was removed, the solution was ultrafiltered to a volume around 1300 mL. 1262 mL of 7.30% silk was then collected. Water was added to the feed to help remove the remaining solution and 547 mL of 3.91% silk was then collected.

6.44% Silk Solution: A 6.44% silk solution was produced beginning with 60 minute extraction batches of a mix of 25, 33, 50, 75 and 100 g silk cocoons per batch. Extracted silk fibers were then dissolved using 100° C. 9.3M LiBr in a 100° C. oven for 1 hour. 35, 42, 50 and 71 g per batch of silk fibers were dissolved to create 20% silk in LiBr and combined. Dissolved silk in LiBr was then diluted to 1% silk and filtered through a 5 um filter to remove large debris. 17,000 mL of 1%, filtered silk solution was used as the starting volume/diafiltration volume for TFF. Once LiBr was removed, the solution was ultrafiltered to a volume around 3000 mL. 1490 mL of 6.44% silk was then collected. Water was added to the feed to help remove the remaining solution and 1454 mL of 4.88% silk was then collected 2.70% Silk Solution: A 2.70% silk solution was produced beginning with 60 minute extraction batches of 25 g silk cocoons per batch. Extracted silk fibers were then dissolved using 100° C. 9.3 M LiBr in a 100° C. oven for 1 hour. 35.48 g of silk fibers were dissolved per batch to create 20% silk in LiBr. Dissolved silk in LiBr was then diluted to 1% silk and filtered through a 5 um filter to remove large debris. 1000 mL of 1%, filtered silk solution was used as the starting volume/diafiltration volume for TFF. Once LiBr was removed, the solution was ultrafiltered to a volume around 300 mL. 312 mL of 2.7% silk was then collected.

Example 2. Preparation of Silk Gels

TABLE 17

Gel Samples - Silk gel formulations including additives, concentration of silk and additive, gelation conditions and gelation times.

| Sample Name | mL 2% silk solution | Mass Vit C (g) | Ratio silk:VitC | Additive | Amount of additive | Temp/ Treatment | Days to Gelation |
|---|---|---|---|---|---|---|---|
| 1 | 10 | 0.04 | 5:01 | None | None | RT | 8 |
| 2 | 10 | 0.08 | 2.5:1 | None | None | RT | 8 |
| 3 | 10 | 0.2 | 1:01 | None | None | RT | 8 |
| 4 | 10 | 0.4 | 1:02 | None | None | RT | 14 |
| 5 | 10 | 0.8 | 1:04 | None | None | RT | None |
| 6 | 10 | 0.04 | 5:01 | None | None | Fridge | ~39 |
| 7 | 10 | 0.08 | 2.5:1 | None | None | Fridge | ~39 |
| 8 | 10 | 0.2 | 1:01 | None | None | Fridge | ~39 |
| 9 | 10 | 0.4 | 1:02 | None | None | Fridge | None |
| 10 | 10 | 0.8 | 1:04 | None | None | Fridge | None |
| 11 | 10 | 0.2 | 1:01 | None | None | RT/Shake vigorously | 8 |
| O-1 | 10 | 0.04 | 5:01 | None | None | 37 C. Oven | 3 |
| O-2 | 10 | 0.04 | 5:01 | None | None | 50° C. Oven | 2 |
| O-3 | 10 | 0.2 | 1:01 | None | None | 37 C. Oven | 4 |
| O-4 | 10 | 0.2 | 1:01 | None | None | 50° C., Oven | 3 |
| M | 40 | 0.16 | 5:01 | None | None | RT | 5 |
| D | 40 | 0.16 | 5:01 | None | None | RT | 5 |
| E1 | 10 | 0.04 | 5:01 | Vit E | 1 drop | RT | 7 |
| E2 | 10 | 0.04 | 5:01 | Vit E | 3 drops | RT | 7 |
| E3 | 10 | 0 | None | Vit E | 1 drop | RT | None |
| E4 | 10 | 0 | None | Vit E | 3 drops | RT | None |
| L1 | 10 | 0.04 | 5:01 | Lemon | 300 μL | RT | 6 |
| L2 | 10 | 0.04 | 5:01 | Lemon Juice | 300 μL | RT | 6 |
| L3 | 10 | 0.04 | 5:01 | Lemon Juice | 1000 μL | RT | 5 |
| L4 | 10 | 0 | None | Lemon | 300 μL | RT | 6 |
| L5 | 10 | 0 | None | Lemon Juice | 300 μL | RT | 7 |
| Jar 1 | 20 | 0.08 | 5:01 | Lemon Juice | 2000 μL | RT | 5-7 |
| Jar 2 | 5 | 0.02 | 5:01 | Lemongrass Oil | 1 drop | RT | 2-3 |
| R-1 | 10 | 0.04 | 5:01 | Rosemary Oil | 1 drop | RT | 7 |
| T-1 | 10 | 0.04 | 5:01 | None | None | RT/Tube | 7 |
| RO-1 | 10 | 0.04 | 5:01 | Rose Oil | 1 drop | RT | 6 |
| RO-2 | 10 | None | None | Rose Oil | 1 drop | RT | None |

Ratio of Silk to Vitamin C

Samples 1-10 were used to examine the effect of silk to vitamin C ratio on serum gelation. Samples 1-3 with less vitamin C gelled quicker than samples 4 and 5. All other conditions were kept constant. Samples 6-8 with less vitamin C gelled quicker than samples 9 and 10. All other conditions were kept constant. It is concluded that decreasing the ratio of silk to vitamin C (increasing the amount of vitamin C), will lengthen the time to gel creation. At ratios with small amounts of vitamin C, days to gel creation did not vary greatly.

Physical Stimulation

Samples 3 and 11 were used to examine the effect of physical stimulation on serum gelation. Each sample was prepared under the same conditions. Sample 11 was vigorously shaken for about 3 minutes after addition of vitamin C. Treatment of 3 and 11 was otherwise the same. The shaking resulted in bubbles but did not significantly change gel creation time.

Temperature Treatment

Samples 1, 3, 6, 8, O-1, O-2, O-3, and O-4 were used to examine the effect of temperature treatment on serum gelation time. Samples 1, 6, O-1, and O-2 were identical other than temperature treatment. Samples 3, 8, O-3, and O-4 were identical other than temperature treatment. The two groups differed in silk to vitamin C ratio. Time to serum gelation was directly related to temperature treatment with a higher temperature resulting in quicker serum gelation.

Solution Volume

Samples 1, M and D were used to examine the effect of solution volume on serum gelation time. Samples M and D varied from sample 1 only by an increased solution volume. Samples M and D gelled in 5 days while sample 1 gelled in 8 days. Samples M and D were definitively noticed to be gelled on the day of gelling while sample 1 gelled over a weekend.

Additives

Samples E1, E2, E3, E4, L1, L2, L3, L4, L5, Jar 2, R1, RO-1 and RO-2 were used to examine the effect of additives on serum gelation time. Samples E1-4 contained Vitamin E. Only samples E1 and E2 contained vitamin C and only these two samples gelled. Vitamin E can be added to a solution to become a gel but it appears that another additive may be needed to create a gel. Samples L1-5 contained a form of lemon juice. Samples L1 and L4 had juice directly from a lemon while samples L2, L3 and L5 contained lemon juice from a plastic lemon container. Samples L4 and L5 did not have vitamin C while all others did. All samples gelled showing that lemon juice can create gel on its own. Amount of lemon juice and type of lemon juice had little effect on gelation time. Sample Jar 2 contained lemon grass oil which formed an albumen like substance when initially added. This sample also had vitamin C but gelation time was significantly quicker than with other vitamin C samples. Sample R1 contained rosemary oil, which seemed to be soluble, as well as vitamin C. The sample gelled in a similar time frame to other samples with only vitamin C. Samples RO-1 and RO-2 contained rose oil while only RO-1 had vitamin C. Only RO-1 gelled showing that rose oil will not create a gel quickly on its own. In both cases the rose oil was immiscible and visible as yellow bubbles.

Aqueous silk fibroin-based fragment solution and essential oils are immiscible liquids. In an embodiment, to increase the fragrance of the silk fibroin-based fragment solution, without entrapping oils within the solution, the solution is mixed with the essential oil with the use of a stir bar. The stir bar is rotated at a speed such that some turbulence is observed in the mixture, thus causing contact between the fragrant essential oil and the molecules in solution, adding a scent to the solution. Before casting of product from the solution, mixing may be stopped and the oil allowed to separate to the top of the solution. Dispensing from the bottom fraction of the solution into the final product allows for fragrance without visible essential oil within the final product.

Alternatively, the silk fibroin-based solution and essential oil can be combined with or without additional ingredients and/or an emulsifier to create a composition containing both ingredients.

In an embodiment, mixing of the solution as described above can reduce gelation time if the solution is used to create a gel formulation.

Vessel

Samples T1 and Jar 1 were used to examine the effect of casting vessel on serum gelation time. Jar 1 was cast in a glass jar while T1 was cast in an aluminum tube. Both samples gelled and did not affect serum gel time.

Summary

All treatments of silk solution for gel solution were in a conical tube at room temperature unless otherwise stated. The ratio of silk to vitamin C did affect the ability of a solution to gel as ratios above 1:2 did not gel and a 1:2 ratio took twice as long as other lower ratios (5:1, 2.5:1, 1:1). Temperature affected gel creation time with higher temperatures resulting in quicker gel times. 50° C. treatment gelled in as quick as 2 days, 37° C. treatment gelled in as quick as 3 days, room temperature treatment gelled in 5-8 days and storage in a refrigerator took at least 39 days to gel. The effects of additives on gel creation were dependent on the additive. Vitamin E, Rosemary Oil and Rose Oil all had no effect on gel creation. Each of these additives did not prevent gelation or affect the time to gelation. Each also required the presence of vitamin C to gel. Lemon juice from a fresh lemon, pre-squeezed lemon juice from a plastic lemon container and lemon grass oil did affect gel creation. Without wishing to be bound by theory, it is believed that the lower pH as a result of these additives is the reason the additives had an impact on decreasing gelation time. Both lemon juice types were able to cause gelation without the presence of vitamin C. This occurred in the same number of days as with vitamin C. The lemongrass oil was able to decrease the number of days to gelation to 2-3 days. All additives appeared soluble other than lemongrass oil and rose oil. Rose oil remained in yellow bubbles while the lemongrass oil was partially soluble and formed an albumen like chunk. In an embodiment, oils that are not fully soluble, can still be suspended within the gel as an additive. Physical stimulation by shaking, vessel the solution was cast into and solution volume did not affect gelation time.

TABLE 18

Concentration of vitamin C in various gel formulations.

| Sample Info | Sample Weight (mg) | Concentration of Vitamin C (mg/g) In Sample | Average |
|---|---|---|---|
| Rosemary | 685.7 | 3.2511 | 3.2657 |
| (Room | | 3.2804 | |
| Temperature | 638 | 3.3336 | 3.3334 |
| storage) | | 3.3132 | |
| Lemongrass | 646 | 2.8672 | 2.877 |
| (Room | | 2.8868 | |

TABLE 18-continued

| Concentration of vitamin C in various gel formulations. | | | |
|---|---|---|---|
| | Sample Weight | Concentration of Vitamin C (mg/g) | |
| Sample Info | (mg) | In Sample | Average |
| Temperature storage) | 645.5 | 2.9051<br>2.9052 | 2.9051 |
| Rosemary (Room | 645.2 | 3.9063<br>3.923 | 3.9147 |
| Temperature; Foil Covered storage) | 649 | 3.9443<br>3.9305 | 3.9374 |
| Lemongrass (Room | 630.1 | 3.8253<br>3.8295 | 3.8274 |
| Temperature; Foil Covered storage) | 660.4 | 3.8283<br>3.8222 | 3.8253 |
| Rosemary (Fridge, Foil | 672.4 | 5.1616<br>5.1352 | 5.1484 |
| Covered storage) | 616.5 | 5.1984<br>5.2036 | 5.201 |
| Lemongrass (Fridge, Foil | 640.5 | 5.1871<br>5.1776 | 5.1824 |
| Covered storage) | 627.7 | 5.2098<br>5.2154 | 5.2126 |

Example 3. Preparation of Silk Gels

Additional gels may be prepared according to Table 19, Table 20, Table 21, and Table 22.

TABLE 19

| Lemongrass Gel | |
|---|---|
| % Silk Solution | 2% |
| Quantity Vitamin C | 100 mg/15 mL solution |
| Quantity Lemongrass Oil | 20 μL/15 mL solution |

TABLE 20

| Rosemary Gel | |
|---|---|
| % Silk Solution | 2% |
| Quantity Vitamin C | 100 mg/15 mL solution |
| Quantity Rosemary Oil | 20 μL/50 mL solution |

TABLE 21

| Lemongrass Gel (50 mL) | |
|---|---|
| % Silk Solution (60 minute boil, 25 kDa) | 2% |
| Quantity Vitamin C (ascorbyl glucoside) | 12.82 mg/mL solution (641 mg total) |
| Quantity Lemongrass Oil | 1.33 μL/mL solution |
| pH | 4 |

TABLE 22

| Rosemary Gel (50 mL) | |
|---|---|
| % Silk Solution (60 minute boil, 25 kDa) | 2% |
| Quantity Vitamin C (ascorbyl glucoside) | 12.82 mg/mL solution (641 mg total) |
| Quantity Rosemary Oil | 0.8 μL/mL solution |
| pH | 4 |

Gels of the present disclosure can be made with about 0.5% to about 8% silk solutions. Gels of the present disclosure can be made with ascorbyl glucoside at concentrations of about 0.67% to about 15% w/v. Gels of the present disclosure be clear/white in color. Gels of the present disclosure can have a consistency that is easily spread and absorbed by the skin. Gels of the present disclosure can produce no visual residue or oily feel after application. Gels of the present disclosure do not brown over time.

Silk gels with essential oils were prepared by diluting a silk solution of the present disclosure to 2%. Vitamin C was added to the solution and allowed to dissolve. The essential oil was added, stirred and dissolved. The solution was aliquot into jars.

Example 4. Coating Fabrics with Aqueous Silk Solutions

TABLE 23

| Silk Solution Characteristics | | | | |
|---|---|---|---|---|
| Molecular Weight: | 57 kDa | | | |
| Polydispersity: | 1.6 | | | |
| % Silk | 5.0% | 3.0% | 1.0% | 0.5% |
| **Process Parameters** | | | | |
| Extraction | | | | |
| Boil Time: | 30 minutes | | | |
| Boil Temperature: | 100 ° C. | | | |
| Rinse Temperature: | 60 ° C. | | | |
| Dissolution | | | | |
| LiBr Temperature: | 100 ° C. | | | |
| Oven Temperature: | 100 ° C. | | | |
| Oven Time: | 60 minutes | | | |

TABLE 23-continued

| Silk Solution Characteristics | | | | | |
|---|---|---|---|---|---|
| | Molecular Weight: | 25 kDa | | | |
| | Polydispersity: | 2.4 | | | |
| | % Silk | 5.0% | 3.0% | 1.0% | 0.5% |
| Process Parameters | | | | | |
| | Extraction | | | | |
| | Boil Time: | 60 minutes | | | |
| | Boil Temperature: | 100 ° C. | | | |
| | Rinse Temperature: | 60 ° C. | | | |
| | Dissolution | | | | |
| | LiBr Temperature: | 100 ° C. | | | |
| | Oven Temperature: | 100 ° C. | | | |
| | Oven Time: | 60 minutes | | | |

Silk Solution and Silk Gel Application to Fabric and Yarn Samples

Three 50 mm diameter fabric samples from each of three different fabric materials, cotton, polyester, and nylon/LYCRA®, were placed in plastic containers. about 0.3 mL of about 5.8% silk fibroin solution was deposited using a 1 mL syringe and 18 gauge needle on two samples of each material, and allowed to sit for about 1 minute. About 0.3 mL of denatured alcohol (containing methanol and ethanol) was then deposited using a 1 mL syringe and 30 gauge needle on one of the silk-coated samples of each material.

In an additional experiment, silk gel with Rosemary Essential Oil (water, silk, ascorbyl glucoside, rosemary essential oil) was collected on a tip and applied to half the length of 2 pieces of 400 μm tencel yarn. One sample was then wetted with about 0.3 mL alcohol.

Silk Solution Dip Test

Polyester fabric samples were dipped in silk fibroin solutions of varying concentration. Samples were placed in incubator with air flow on foil and allowed to dry at about 22.5° C. for about 15.5 hours. Change in mass before and after silk coating was measured.

TABLE 25

Polyester Fabric Samples with Silk Coatings of the Present Disclosure

| Silk Fibroin Concentration (%) | Starting Mass (g) | Mass after coating (g) | Change (%) | Average Change (%) |
|---|---|---|---|---|
| 1 | 0.25 | 0.26 | +4 | −3% |
| | 0.30 | 0.27 | −10 | |
| | 0.24 | 0.24 | 0 | |
| | 0.22 | 0.21 | −5 | |

TABLE 25-continued

Polyester Fabric Samples with Silk Coatings of the Present Disclosure

| Silk Fibroin Concentration (%) | Starting Mass (g) | Mass after coating (g) | Change (%) | Average Change (%) |
|---|---|---|---|---|
| 3 | 0.30 | 0.36 | +20 | 15% |
| | 0.28 | 0.31 | +11 | |
| | 0.29 | 0.33 | +14 | |
| | 0.29 | 0.34 | +15 | |
| 5 | 0.25 | 0.29 | +16 | 16% |
| | 0.28 | 0.33 | +18 | |
| | 0.31 | 0.35 | +13 | |
| | 0.27 | 0.31 | +15 | |

Silk Solution Spray Test

A spray test was performed to verify the handle impact of silk fibroin solution sprayed on polyester fabric. About 0.5% silk fibroin solution was applied to a 4 inch by 4 inch square of polyester fabric using a spray gun from a distance of about 10 inches. Three passes were completed from left to right and from right to left (six passes total). Samples were placed in a 50° C. oven on aluminum foil over a water bath for about 1.5 hours. Methods were repeated with a second polyester fabric sample with an about 5.8% silk fibroin solution spray application. No change in material hand was observed in samples sprayed with either 0.5% or 5.8% solutions. Perceived increase in materials smoothness was observed for samples sprayed with either the 0.5% and 5.8% solutions.

Example 5. Optimized Fabric Coating Processes

The coating processes described in Table 26 were used to produce multiple fabric samples for performance testing, as described in more detail below.

TABLE 26

Coating Processes.

1 Spray
- 1.1 Material for coating
  - 1.1.1 cork board 24" × 36" Hobby Lobby part 132894
  - 1.1.2 Covered the cork board with polyester interlock fabric
  - 1.1.3 Saw horse for support
  - 1.1.4 Several clamps for holding cork panel to saw horse
  - 1.1.5 Double filter to remove oil residue from compressor and dehumidificaton salt
  - 1.1.6 Iwata eclipse MP-CS airbrush
  - 1.1.7 Husky 30.3 liter tank compression system
  - 1.1.8 Push pin to hold fabric on cork panel Hobby Lobby part #523456

TABLE 26-continued

| Coating Processes. |
|---|
| 1.2 Material for preparation |
| 1.2.1 Scissor |
| 1.2.2 Ruler |
| 1.2.3 Balance AWS model Pnx-203 |
| 1.3 Material for drying |
| 1.3.1 Wolf stove set up at 150° F. maintaining 71-78° C. with fan system. |
| 1.3.2 Flat baking sheet |
| 1.3.3 Aluminum foil |
| 1.3.4 SC 307T thermometer with probe |
| 1.4 Execution |
| 1.1.1 lay fabric to be coated on top of cork panel covered with polyester fabric |
| 1.1.2 secure fabric with pin to the cork panel |
| 1.1.3 set compressor with oil and humidity filters |
| 1.1.4 set air pressure supply to 55 psi |
| 1.1.5 load solution to airbrush gun |
| 1.1.6 position airbrush gun approximately 10 inches from board |
| 1.1.7 pull the airbrush gun trigger and over spray 2 inches side to side the fabric to be coated |
| 1.1.8 remove pin from cork panel and place coated fabric on aluminum foil |
| 1.1.9 place coated fabric in oven for 30-60 min at 150° C. |
| 2. Stencil/Spray |
| 2.1 Material for coating |
| 2.1.1 cork board 24" × 36" Hobby Lobby part 132894 |
| 2.1.2 Covered the cork board with polyester interlock fabric |
| 2.1.3 Saw horse for support |
| 2.1.4 Several clamps for holding cork panel to saw horse |
| 2.1.5 Double filter to remove oil residue front compressor and dehumidificaton salt |
| 2.1.6 Iwata eclipse MP-CS airbrush |
| 2.1.7 Husky 30.3 liter tank compression system |
| 2.1.8 Push pin to hold fabric on cork panel Hobby Lobby part #523456 |
| 2.1.9 Stencil pattern SKU#75244 Lincaine 12" × 24" × 0.020" Hobby Lobby |
| 2.2 Material for preparation |
| 2.2.1 Scissor |
| 2.2.2 Ruler |
| 2.2.3 Balance AWS model Pnx-203 |
| 2.3 Material for drying |
| 2.3.1 Wolf stove set up at 150° F. maintaining 71-78° C. with fan system. |
| 2.3.2 Flat baking sheet |
| 2.3.3 Aluminum foil |
| 2.3.4 SC 307T thermometer with probe |
| 2.4 Execution |
| 2.4.1 lay fabric to be coated on top of cork panel covered with polyester fabric |
| 2.4.2 lay stencil pattern on top of fabric |
| 2.4.3 secure stencil with pin to the cork panel |
| 2.4.4 set compressor with oil and humidity filters |
| 2.4.5 set air pressure supply to 55 psi |
| 2.4.6 load solution to airbrush gun |
| 2.4.7 position airbrush gun approximately 10 inches from board |
| 2.4.8 pull the airbrush gun trigger and over spray 2 inches side to side the fabric to be coated |
| 2.4.9 remove pin from cork panel and place coated fabric on aluminum foil |
| 2.4.10 place coated fabric in oven for 30-60 min at 150° C. |
| 3 Screen print |
| 3.1 Material for coating |
| 3.1.1 cork board 24" × 36" Hobby Lobby part 132894 |
| 3.1.2 Covered the cork board with polyester interlock fabric |
| 3.1.3 Saw horse for support |
| 3.1.4 Several clamps for holding cork panel to saw horse |
| 3.1.5 screen print frame 12" × 18" part#4710 made by Speed Ball |
| 3.1.6 silicon spatula |
| 3.2 Material for preparation |
| 3.2.1 Scissor |
| 3.2.2 Ruler |
| 3.2.3 Balance AWS model Prix-203 |
| 3.3 Material for drying |
| 3.3.1 Wolf stove set up at 150° F. maintaining 71-78° C. with fan system. |
| 3.3.2 Flat baking sheet |
| 3.3.3 Aluminum foil |
| 3.3.4 SC 307T thermometer with probe |

TABLE 26-continued

| Coating Processes. |
|---|
| 3.4 Execution |
| 3.4.1 lay fabric to be coated on top of cork panel covered with polyester fabric |
| 3.4.2 lay screen print frame on top of fabric |
| 3.4.3 load solution to one edge of the screen print frame |
| 3.4.4 with a silicon spatula move solution across the screen print frame until the entire fabric to be coated surface is covered |
| 3.4.5 remove screen print frame and place coated fabric on aluminum foil |
| 3.4.6 place coated fabric in oven for 30-60 min at 150° C. |
| 4 Bath |
| 4.1 Material for coating |
| 4.1.1 cork board 24" × 36" Hobby Lobby part 132894 |
| 4.1.2 Covered the cork board with polyester interlock fabric |
| 4.1.3 Saw horse for support |
| 4.1.4 Several clamps for holding cork panel to saw horse |
| 4.1.5 Paint tray liner Item #: 170418 Model #: LOWES0-PK170418 at Lowes Hardware |
| 4.1.6 Noodle making machine Imperia model #15-4590 |
| 4.2 Material for preparation |
| 4.2.1 Scissor |
| 4.2.2 Ruler |
| 4.2.3 Balance AWS model Pnx-203 |
| 4.3 Material for drying |
| 4.3.1 Wolf stove set up at 150° F. maintaining 71-78° C. with fan system. |
| 4.3.2 Flat baking sheet |
| 4.3.3 Aluminum foil |
| 4.3.4 SC 3071 thermometer with probe |
| 4.4 Execution |
| 4.4.1 load silk solution inside the paint tray liner well |
| 4.4.2 immerse the fabric sample to be coated inside the silk solution until it is all saturated |
| 4.4.3 pass the saturated fabric between pressure roller (noodle making machine) to remove any excess solution |
| 4.4.4 place coated fabric on aluminum foil |
| 4.4.5 place coated fabric in oven for 30-60 min at 150° C. |

The products produced using the coating processes described above were tested for accumulative one way transport capability (or index) and other properties using Association of Textile, Apparel & Materials Professionals (AATCC) test method 195-2012 for the measurement, evaluation, and classification of liquid moisture management properties of textile fabrics. The details of the test methods are available from AATCC, and a synopsis of the methods and calculations is provided here. The absorption rate (ART) (top surface) and (ARB) (bottom surface) is defined as the average speed of liquid moisture absorption for the top and bottom surfaces of the specimen during the initial change of water content during a test. The accumulative one-way transport capability (R) is defined as the difference between the area of the liquid moisture content curves of the top and bottom surfaces of a specimen with respect to time. The bottom surface (B) is defined for testing purposes as the side of the specimen placed down against the lower electrical sensor which is the side of the fabric that would be the outer exposed surface of a garment when it is worn or product when it is used. The top surface (T) for testing purposes is defined as the side of a specimen that, when the specimen is placed on the lower electrical sensor, is facing the upper sensor. This is the side of the fabric that would come in contact with the skin when a garment is worn or when a product is used. The maximum wetted radius (MWRT) and (MWRB) (mm) is defined as the greatest ring radius measured on the top and bottom surfaces. Moisture management is defined, for liquid moisture management testing, as the engineered or inherent transport of aqueous liquids such as perspiration or water (relates to comfort) and includes both liquid and vapor forms of water. The overall (liquid) moisture management capability (OMMC), an index of the overall capability of a fabric to transport liquid moisture as calculated by combining three measured attributes of performance: the liquid moisture absorption rate on the bottom surface (ARB), the one way liquid transport capability (R), and the maximum liquid moisture spreading speed on the bottom surface ($SS_B$). The spreading speed ($SS_i$) is defined as the accumulated rate of surface wetting from the center of the specimen where the test solution is dropped to the maximum wetted radius. The total water content (U) (%) is defined as the sum of the percent water content of the top and bottom surfaces. The wetting time (WTT) (top surface) and (WTB) (bottom surface) is defined as the time in seconds when the top and bottom surfaces of the specimen begin to be wetted after the test is started.

A moisture management tester (MMT) is used to perform the test. The accumulative one way liquid transport capability (R) is calculated as: [Area ($U_B$)—Area ($U_T$)]/total testing time. The OMMC is calculated as: $OMMC=C_1*AR_{B\_ndv}+C_2R_{nvd}+C_3*SS_{B\_ndv}$, where $C_1$, $C_2$, and $C_3$ are the weighting values * for $AR_{B\_ndv}$, $R_{ndv}$ and $SS_{B\_ndv}$; (ARB)=absorption rate; (R)=one-way transport capability, and ($SS_B$)=spreading speed. Detailed calculations of these parameters, and other parameters of interest, are provided in AATCC test method 195-2012.

A description of the samples used is given in Table 27.

TABLE 27

| Description of samples. | |
|---|---|
| Sample ID | Description |
| 15051201 | no coating (polyester) |
| 15051301 | 1% silk solution stray coating on 15051201 |
| 15051302 | 0.1% silk solution spray coating on 15051201 |
| 15051303 | 0.05% silk solution spray coating on 15051201 |
| 15051304 | 1% silk solution spray stencil coating on 15051201 |
| 15051305 | 0.1% silk solution spray stencil coating on 15051201 |
| 15051306 | 0.05% silk solution spray stencil coating on 15051201 |
| 15051401 | 1% silk solution bath coating on 15051201 |
| 15051402 | 0.1% silk solution bath coating on 15051201 |
| 15051403 | 0.05% silk solution bath coating on 15051201 |
| 15051404 | PureProC screen print on 15051201 |
| 15042001 | non wicking finished |
| 15042002 | semifinished before final setting |
| 15042003 | with wicking finished |
| 15042101 | non wicking finished (15042001) 1% silk solution spray coating |
| 15042102 | non wicking finished (15042001) 0.1% silk solution spray coating |
| 15061206 | non wicking finished (15042001) 1% silk solution stencil coating |
| 15061207 | non wicking finished 5042001) 1% silk solution bath coating |
| 15061205 | non wicking finished (15042001) 0.1% silk solution stencil coating |
| 15061209 | non wicking finished (15042001) 0.1% silk solution bath coating |
| 15061201 | semifinished before final setting (15042002) 1% silk solution spray coating |
| 15061203 | semifinished before final setting (15042002) 1% silk solution stencil coating |
| 15061208 | semifinished before final setting (15042002 1% silk solution bath coating |
| 15061202 | semifinished before final setting (15042002) 0.1% silk solution spray coating |
| 15061204 | semifinished before final setting (15042002) 0.1% silk solution stencil coating |
| 15061210 | semifinished before final setting (15042002) 0.1% silk solution bath coating |

The results of the tests are depicted in FIG. 57A through FIG. 86B and illustrate the superior performance of silk coated fabric, including superior performance with respect to accumulative one way transport capability (index) and overall moisture management capability.

Example 6. Antimicrobial Properties of Silk Coatings on Fabrics

The antimicrobial properties of silk coatings were testing on four materials: a cotton/LYCRA jersey (15051201), a cotton/LYCRA jersey with 1% silk fibroin solution (sfs) bath coating (15070701), a polyester/LYCRA finish after final setting (15042003), and a polyester/LYCRA semi-finished 1% sfs bath coating (15070702) (wherein LYCRA is the trade name of a polyester-polyurethane copolymer). AATCC test method 100-2012 for the assessment of antibacterial finishes on textile materials was used. The details of the test method are available from AATCC. Briefly, the tests were performed using tryptic soy broth as a growth medium, a sample size of 4 layers, autoclave sterilization, 100 mL Letheen broth with Tween for neutralization, a target inoculation level of 1-2×$10^5$ CFU/mL, 5% nutrient broth as an inoculent carrier and dilution medium, a contact time of 18 to 24 hours, and a temperature of 37 +/−2° C.

The results of the tests are summarized in Table 28 and are depicted in FIG. 87 to FIG. 92, and illustrate the superior antimicrobial performance of the silk-coated fabrics.

TABLE 28

| Antimicrobial test results. | | | | |
|---|---|---|---|---|
| | | Results: cfu/sample | | |
| sample # | bacteria | Zero Contact Time | 24 hr Contact Time | Percent Reduction |
| 15051201 | *Staphylococcus aureus* ATCC 6538 | 1.23E+05 | 4.90E+06 | −3883.74% |
| | *Klebsiella pneumoniae* ATCC 4352 | 1.65E+05 | 4.90E+06 | −2869.70% |
| 15070701 | *Staphylococcus aureus* ATCC 6538 | 1.23E+05 | 4.90E+06 | −3883.74% |
| | *Klebsiella pneumoniae* ATCC 4352 | 1.65E+05 | 4.90E+06 | −2869.70% |

TABLE 28-continued

| Antimicrobial test results. | | | | |
|---|---|---|---|---|
| | | Results: cfu/sample | | |
| sample # | bacteria | Zero Contact Time | 24 hr Contact Time | Percent Reduction |
| 15042003 | *Staphylococcus aureus* ATCC 6538 | 1.23E+05 | 4.90E+06 | −3883.74% |
| | *Klebsiella pneumoniae* ATCC 4352 | 1.65E+05 | 4.90E+06 | −2869.70% |
| 15070702 | *Staphylococcus aureus* ATCC 6538 | 1.23E+05 | 1.03E+04 | 91.63% |
| | *Klebsiella pneumoniae* ATCC 4352 | 1.65E+05 | 2.33E+05 | −40.91% |

Example 7. Methods of Preparing Fabrics with Silk Coatings

A method for preparing an aqueous solution of pure silk fibroin-based protein fragments having an average weight average molecular weight ranging from about 6 kDa to about 16 kDa includes the steps of: degumming a silk source by adding the silk source to a boiling (100° C.) aqueous solution of sodium carbonate for a treatment time of between about 30 minutes to about 60 minutes; removing sericin from the solution to produce a silk fibroin extract comprising non-detectable levels of sericin; draining the solution from the silk fibroin extract; dissolving the silk fibroin extract in a solution of lithium bromide having a starting temperature upon placement of the silk fibroin extract in the lithium bromide solution that ranges from about 60° C. to about 140° C.; maintaining the solution of silk fibroin-lithium bromide in an oven having a temperature of about 140° C. for a period of at least 1 hour; removing the lithium bromide from the silk fibroin extract; and producing an aqueous solution of silk protein fragments, the aqueous solution comprising: fragments having an average weight average molecular weight ranging from about 6 kDa to about 16 kDa, and wherein the aqueous solution of pure silk fibroin-based protein fragments comprises a polydispersity of between about 1.5 and about 3.0. The method may further comprise drying the silk fibroin extract prior to the dissolving step. The aqueous solution of pure silk fibroin-based protein fragments may comprise lithium bromide residuals of less than 300 ppm as measured using a high-performance liquid chromatography lithium bromide assay. The aqueous solution of pure silk fibroin-based protein fragments may comprise sodium carbonate residuals of less than 100 ppm as measured using a high-performance liquid chromatography sodium carbonate assay. The method may further comprise adding a therapeutic agent to the aqueous solution of pure silk fibroin-based protein fragments. The method may further comprise adding a molecule selected from one of an antioxidant or an enzyme to the aqueous solution of pure silk fibroin-based protein fragments. The method may further comprise adding a vitamin to the aqueous solution of pure silk fibroin-based protein fragments. The vitamin may be vitamin C or a derivative thereof. The method may further comprise adding an alpha hydroxy acid to the aqueous solution of pure silk fibroin-based protein fragments. The alpha hydroxy acid may be selected from the group consisting of glycolic acid, lactic acid, tartaric acid and citric acid. The method may further comprise adding hyaluronic acid or its salt form at a concentration of about 0.5% to about 10.0% to the aqueous solution of pure silk fibroin-based protein fragments. The method may further comprise adding at least one of zinc oxide or titanium dioxide.

A method for preparing an aqueous solution of pure silk fibroin-based protein fragments having an average weight average molecular weight ranging from about 17 kDa to about 38 kDa includes the steps of: adding a silk source to a boiling (100° C.) aqueous solution of sodium carbonate for a treatment time of between about 30 minutes to about 60 minutes so as to result in degumming; removing sericin from the solution to produce a silk fibroin extract comprising non-detectable levels of sericin; draining the solution from the silk fibroin extract; dissolving the silk fibroin extract in a solution of lithium bromide having a starting temperature upon placement of the silk fibroin extract in the lithium bromide solution that ranges from about 80° C. to about 140° C.; maintaining the solution of silk fibroin-lithium bromide in a dry oven having a temperature in the range between about 60° C. to about 100° C. for a period of at least 1 hour; removing the lithium bromide from the silk fibroin extract; and producing an aqueous solution of pure silk fibroin-based protein fragments, wherein the aqueous solution of pure silk fibroin-based protein fragments comprises lithium bromide residuals of between about 10 ppm and about 300 ppm, wherein the aqueous solution of silk protein fragments comprises sodium carbonate residuals of between about 10 ppm and about 100 ppm, wherein the aqueous solution of pure silk fibroin-based protein fragments comprises fragments having an average weight average molecular weight ranging from about 17 kDa to about 38 kDa, and wherein the aqueous solution of pure silk fibroin-based protein fragments comprises a polydispersity of between about 1.5 and about 3.0. The method may further comprise drying the silk fibroin extract prior to the dissolving step. The aqueous solution of pure silk fibroin-based protein fragments may comprise lithium bromide residuals of less than 300 ppm as measured using a high-performance liquid chromatography lithium bromide assay. The aqueous solution of pure silk fibroin-based protein fragments may comprise sodium carbonate residuals of less than 100 ppm as measured using a high-performance liquid chromatography sodium carbonate assay. The method may further comprise adding a therapeutic agent to the aqueous solution of pure silk fibroin-based protein fragments. The method may further comprise adding a molecule selected from one of an antioxidant or an enzyme to the aqueous solution of pure silk fibroin-based protein fragments. The method may further comprise adding a vitamin to the aqueous solution of pure silk fibroin-based protein fragments. The vitamin may be vitamin C or a derivative thereof. The method may further comprise adding an alpha hydroxy acid to the aqueous solution of pure silk fibroin-based protein fragments. The alpha hydroxy acid may be selected from the group consisting of glycolic acid, lactic acid, tartaric acid and citric acid. The method may further comprise adding hyaluronic acid or its salt form at a concentration of about 0.5% to about 10.0% to the aqueous solution of pure silk fibroin-based protein fragments. The method may further comprise adding at least one of zinc oxide or titanium dioxide.

A method for preparing an aqueous solution of pure silk fibroin-based protein fragments having an average weight average molecular weight ranging from about 39 kDa to about 80 kDa, includes the steps of: adding a silk source to a boiling (100° C.) aqueous solution of sodium carbonate for a treatment time of about 30 minutes so as to result in degumming; removing sericin from the solution to produce a silk fibroin extract comprising non-detectable levels of sericin; draining the solution from the silk fibroin extract; dissolving the silk fibroin extract in a solution of lithium bromide having a starting temperature upon placement of the silk fibroin extract in the lithium bromide solution that ranges from about 80° C. to about 140° C.; maintaining the solution of silk fibroin-lithium bromide in a dry oven having a temperature in the range between about 60° C. to about 100° C. for a period of at least 1 hour; removing the lithium bromide from the silk fibroin extract; and producing an aqueous solution of pure silk fibroin-based protein fragments, wherein the aqueous solution of pure silk fibroin-based protein fragments comprises lithium bromide residuals of between about 10 ppm and about 300 ppm, sodium carbonate residuals of between about 10 ppm and about 100 ppm, fragments having an average weight average molecular weight ranging from about 40 kDa to about 65 kDa, and wherein the aqueous solution of pure silk fibroin-based protein fragments comprises a polydispersity of between about 1.5 and about 3.0. The method may further comprise drying the silk fibroin extract prior to the dissolving step. The aqueous solution of pure silk fibroin-based protein fragments may comprise lithium bromide residuals of less than 300 ppm as measured using a high-performance liquid chromatography lithium bromide assay. The aqueous solution of pure silk fibroin-based protein fragments may comprise sodium carbonate residuals of less than 100 ppm as measured using a high-performance liquid chromatography sodium carbonate assay. The method may further comprise adding a therapeutic agent to the aqueous solution of pure silk fibroin-based protein fragments. The method may further comprise adding a molecule selected from one of an antioxidant or an enzyme to the aqueous solution of pure silk fibroin-based protein fragments. The method may further comprise adding a vitamin to the aqueous solution of pure silk fibroin-based protein fragments. The vitamin may be vitamin C or a derivative thereof. The method may further comprise adding an alpha hydroxy acid to the aqueous solution of pure silk fibroin-based protein fragments. The alpha hydroxy acid may be selected from the group consisting of glycolic acid, lactic acid, tartaric acid and citric acid. The method may further comprise adding hyaluronic acid or its salt form at a concentration of about 0.5% to about 10.0% to the aqueous solution of pure silk fibroin-based protein fragments. The method may further comprise adding at least one of zinc oxide or titanium dioxide.

Example 8. Characterization of Silk Coatings on Polyester

A summary of the results from studies of silk coatings on polyester are given in Table 29 and Table 30. The results shown in FIG. 93 and FIG. 94 illustrate that the accumulative one way transport index and OMMC performance is maintained even at 50 wash cycles. Additional test results are shown in FIG. 95 to FIG. 102. The antimicrobial performance of the silk coated polyester fabrics are maintained to 25 to 50 washing cycles, as shown in FIG. 103 to FIG. 104. The results illustrate the surprising improvement in moisture management properties, as well as the surprising result that the improved properties survive many wash cycles.

TABLE 29

Test results for semifinished polyester with 1% silk solution coating.
Testing Results: Semifinished polyester with 1% silk solution coating

| Number of Washes | Raw Data: | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index (%) | Overall Moisture Management Capability OMMC |
|---|---|---|---|---|---|---|---|---|---|---|---|
| 0 Cycles | Mean | 5.63 | 3.95 | 7.24 | 28.73 | 5 | 5 | 0.90 | 1.22 | 133.26 | 0.27 |
| | S. Deviation | 1.20 | 0.38 | 1.46 | 8.62 | 0 | 0 | 0.20 | 0.12 | 34.81 | 0.06 |
| | CV | 0.21 | 0.10 | 0.20 | 0.30 | 0 | 0 | 0.22 | 0.09 | 0.26 | 0.21 |
| 10 Cycles | Mean | 23.87 | 7.96 | 4.82 | 8.55 | 5 | 5 | 0.46 | 0.68 | 144.84 | 0.22 |
| | S. Deviation | 31.51 | 3.30 | 0.84 | 2.94 | 0 | 0 | 0.28 | 0.23 | 27.71 | 0.03 |
| | CV | 1.32 | 0.41 | 0.17 | 0.34 | 0 | 0 | 0.61 | 0.33 | 0.19 | 0.14 |
| 25 Cycles | Mean | 6.09 | 4.59 | 7.36 | 17.22 | 5 | 5 | 0.83 | 1.05 | 124.05 | 0.22 |
| | S. Deviation | 1.61 | 0.44 | 2.98 | 3.28 | 0 | 0 | 0.17 | 0.09 | 11.70 | 0.02 |
| | CV | 0.26 | 0.10 | 0.40 | 0.19 | 0 | 0 | 0.20 | 0.09 | 0.09 | 0.09 |
| 50 Cycles | Mean | 25.20 | 11.64 | 6.84 | 7.80 | 5 | 5 | 0.39 | 0.53 | 58.81 | 0.13 |
| | S. Deviation | 28.06 | 6.36 | 3.38 | 5.70 | 0 | 0 | 0.30 | 0.27 | 26.56 | 0.03 |
| | CV | 1.11 | 0.55 | 0.49 | 0.73 | 0 | 0 | 0.77 | 0.51 | 0.45 | 0.25 |

TABLE 30

Test results for wicking finished polyester without silk coating.
Testing Results: Wicking Finished Polyester

| Number of Washes | Raw Data: | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index (%) | Over all Moisture Management Capability OMMC |
|---|---|---|---|---|---|---|---|---|---|---|---|
| 0 Cycles | Mean | 3.46 | 3.48 | 37.30 | 56.90 | 5 | 5 | 1.37 | 1.36 | 62.37 | 0.29 |
| | S. Deviation | 0.07 | 0.04 | 12.89 | 10.24 | 0 | 0 | 0.02 | 0.02 | 9.74 | 0.03 |
| | CV | 0.02 | 0.01 | 0.35 | 0.18 | 0 | 0 | 0.02 | 0.01 | 0.16 | 0.12 |
| 25 Cycles | Mean | 6.69 | 6.71 | 7.23 | 6.89 | 5 | 5 | 0.75 | 0.76 | 30.40 | 0.09 |
| | S. Deviation | 1.48 | 1.92 | 1.27 | 2.74 | 0 | 0 | 0.13 | 0.19 | 16.22 | 0.02 |
| | CV | 0.22 | 0.29 | 0.18 | 0.40 | 0 | 0 | 0.17 | 0.25 | 0.53 | 0.20 |
| 50 Cycles | Mean | 11.27 | 8.46 | 6.70 | 9.35 | 5 | 5 | 0.54 | 0.65 | 31.21 | 0.09 |
| | S. Deviation | 6.57 | 3.53 | 1.45 | 5.21 | 0 | 0 | 0.23 | 0.25 | 18.26 | 0.03 |
| | CV | 0.58 | 0.42 | 0.22 | 0.56 | 0 | 0 | 0.44 | 0.38 | 0.59 | 0.30 |

Example 9. Characterization of Silk Coatings on Polyester Fabrics

Scanning electron microscopy (SEM) analysis was performed using a Hitachi S-4800 field-emission SEM (FE-SEM) operated at 2 kV accelerating voltage. Pieces from each sample were sectioned using a razor blade and placed on carbon adhesive tape mounted on aluminum SEM stubs. A coating of iridium approximately 2 nm thick was applied via sputter deposition in order to minimize the buildup of surface charge.

The samples used in the SEM study are described in Table 31. SEM micrographs for fabric samples are shown in FIG. 105 to FIG. 167.

TABLE 31

Fabric samples tested by scanning electron microscopy and optical profilometry.

| Sample ID | Fabric | Silk solution for coating/treatment (average molecular weight, Da) | Silk coating/treatment method using silk fibroin solution (sfs) |
|---|---|---|---|
| FAB-10-SPRAY-B | 15042002 | 41,576 | spray with 1% sfs |
| FAB-01-SPRAY-B | 15042002 | 41,576 | spray with 0.1% sfs |
| FAB-10-STEN-B | 15042002 | 41,576 | stencil spray with 1% sfs |
| FAB-10-BATH-B | 15042002 | 41,576 | bath with 1% sfs |
| FAB-01-BATH-B | 15042002 | 41,576 | bath with 0.1% sfs |
| FAB-01-SPRAY-C | 15042002 | 10,939 | spray with 0.1% sfs |
| FAB-01-STEN-C | 15042002 | 10,939 | stencil spray with 0.1% sfs |
| FAB-10-BATH-C | 15042002 | 10,939 | bath with 1% sfs |

The fabric SEM results show that the silk solution has very clearly been deposited along and between individual polyester fibers. The use of 0.1% silk solution results in less coating than 1.0% silk solution. The use of a bath for 0.1% silk solution, with an average molecular weight of 41 kDa, results in uniform coating along fibers with large, smooth features. The use of a spray with a 0.1% silk solution, with an average molecular weight of 41 kDa, in coating along fibers as well as connected, webbed coating between fibers. The use of a spray for 0.1% silk solution, with an average molecular weight of 11 kDa, results in uniform coating along fibers with small, spotted/ribbed features. The use of a stencil for 0.1% silk solution, with an average molecular weight of 11 kDa, results in coating along fibers that has clear edges and delineation between coated and non coated sides. The use of a bath for 1.0% silk solution, with an average molecular weight of 41 kDa, results in thick coating along fibers as well as thick connected, webbed coating between fibers. The use of a bath for 1.0% silk solution, with an average molecular weight of 11 kDa, results in coating along all sides of individual fibers. Coating appears uniform on surface with many single point extrusions. The use of a spray for 1.0% silk solution, with an average molecular weight of 41 kDa, results in coating along fibers as well as connected, webbed coating between fibers, which was thicker than that observed using 0.1% silk solution. The use of a stencil for 1.0% silk solution, with an average molecular weight of 41 kDa, results in coating along fibers and between fibers, and the coating appears well organized.

The SEM results demonstrate that the silk coating has been applied as an even, thin, uniform coating to the fibers of the fabric. This illustrates the surprising result that the silk coating was applied to the fibers without the use of any additives or cross-linking, using a water based delivery system.

Example 10. Characterization of Silk Coatings on Polyester Films

The film samples are described in Table 32. The SEM images from these films are shown in FIG. 168 to FIG. 237.

TABLE 32

Film samples tested scanning electron microscopy and optical profilometry.

| Sample identifier | Polyester substrate material | Silk solution for coating/treatment (average molecular weight, Da) | Silk coating/treatment method using silk fibroin solution (sfs) |
|---|---|---|---|
| FIL-10-SPRAY-B-01MYL | 0.01 Mylar | 41,576 | spray with 1% sfs |
| FIL-01-SPRAY-B-01MYL | 0.01 Mylar | 41,576 | spray with 0.1% sfs |

TABLE 32-continued

| Film samples tested scanning electron microscopy and optical profilometry. | | | |
|---|---|---|---|
| Sample identifier | Polyester substrate material | Silk solution for coating/treatment (average molecular weight, Da) | Silk coating/treatment method using silk fibroin solution (sfs) |
| FIL-01-SPRAY-B-007MEL | 0.007 Melinex | 41,576 | spray with 0.1% sfs |
| FIL-01-SPRAY-C-01MYL | 0.01 Mylar | 10,939 | spray with 0.1% sfs |
| FIL-01-STEN-B-01MYL | 0.01 Mylar | 41,576 | stencil spray with 0.1% sfs |
| FIL-01-STEN-C-01MYL | 0.01 Mylar | 10,939 | stencil spray with 0.1% sfs |
| FIL-10-BATH-B-01MYL | 0.01 Mylar | 41,576 | bath with 1% sfs |
| FIL-10-BATH-B-007MEL | 0.007 Melinex | 41,576 | bath with 1% sfs |
| FIL-10-BATH-C-01MYL | 0.01 Mylar | 10,939 | bath with 1% sfs |
| FIL-01-BATH-B-01MYL | 0.01 Mylar | 41,576 | bath with 0.1% sis |

The results show that the silk coatings are applied uniformly. Little to no variation is observed in the characteristics or topology of the coated polyester films. Surprisingly, the coating is even, uniform, and thin. Furthermore, surprising, the silk coated the fibers without any additives or cross-linking using a water-based system.

Optical profiling was carried out using a Zygo New View 6200 optical profilometer. Two locations on each sample were randomly selected and measured with 10× magnification. The results are shown in FIG. 241 to FIG. 264. The results indicate that the silk-coated samples have a homogeneous deposition of silk fibroin. Surface roughness features observed in the control are visible after silk coating on Mylar films, which is consistent with the presence of a relatively thin silk film that is forming a conformal coating on Mylar. The results substantiate the uniformity of the coating, and demonstrate that silk can be stenciled into discrete locations.

Contact profilometry was performed and the cross-sectioned samples were examined by SEM. Results are shown in FIG. 265 to FIG. 268. For sample FIL-10-SPRAY-B-10MYL, the thickness ranged from approximately 260 nm to 850 nm in 4 locations analyzed. For sample FIL-10-BATH-B-01MYL, the coating ranged from approximately 140 nm to 400 nm in 4 locations. SEM images from cross-sections show similar trends, with one location on sample FIL-10-SPRAY-B-10MYL having a cross-section that measures approximately 500 nm and one on FIL-10-BATH-B-01MYL measuring approximately 180 nm.

Example 11. Preparation of Silk Fibroin Solutions with Higher Molecular Weights The preparation of silk fibroin solutions with higher molecular weights is given in Table 33.

TABLE 33

| Preparation and properties of silk fibroin solutions. | | | | | | |
|---|---|---|---|---|---|---|
| Sample Name | Extraction Time (mins) | Extraction Temp (° C.) | LiBr Temp (° C.) | Oven/Sol'n Temp | Average weight average molecular weight (kDa) | Average polydispersity |
| Group A TFF | 60 | 100 | 100 | 100° C. oven | 34.7 | 2.94 |
| Group A DIS | 60 | 100 | 100 | 100° C. oven | 44.7 | 3.17 |
| Group B TFF | 60 | 100 | 100 | 100° C. sol'n | 41.6 | 3.07 |
| Group B DIS | 60 | 100 | 100 | 100° C. sol'n | 44.0 | 3.12 |
| Group C TFF | 60 | 100 | 140 | 140° C. sol'n | 10.9 | 3.19 |
| Group C DIS | 60 | 100 | 140 | 140° C. sol'n | | |
| Group D DIS | 30 | 90 | 60 | 60° C. sol'n | 129.7 | 2.56 |
| Group D FIL | 30 | 90 | 60 | 60° C. sol'n | 144.2 | 2.73 |
| Group E DIS | 15 | 100 | RT | 60° C. sol'n | 108.8 | 2.78 |
| Group E FIL | 15 | 100 | RT | 60° C. sol'n | 94.8 | 2.62 |

Example 12. Silk Coatings on Natural Fabrics

The coating of natural fabric with silk fibroin-based protein fragment solutions and the resulting properties are illustrated in Table 34, Table 35, FIG. 269, and FIG. 270. The results demonstrate that silk fibroin solutions can coat cotton-Lycra natural fabrics including LUON and POWER LUXTREME.

TABLE 34

| Silk fibroin coated fabrics. | |
|---|---|
| Legend | Fabric |
| 15072201 | Power Luxtreme RT1211362 |
| 15072202 | Luon RT20602020 |
| 15072301 | Power Luxtreme RT1211362 (15072201) 1% silk solution spray coating |
| 15072302 | Luon RT20602020 (15072202) 1% silk solution spray coating |
| 15072303 | Power Luxtreme RT 211362 (15072201) 0.1% silk solution spray coating |
| 15072304 | Luon RT20602020 (15072202) 0.1% silk solution spray coating |
| 15072305 | Power Luxtreme RT1211362 (15072201) 1% silk solution stencil coating |
| 15072306 | Luon RT20602020 (15072202) 1% silk solution stencil coating |
| 15072307 | Power Luxtreme RT1211362 (15072201) 0.1% silk solution stencil coating |
| 15072308 | Luon RT20602020 (15072202) 0.1% silk solution stencil coating |
| 15072309 | Power Luxtreme RT1211362 (5072201) 1% silk solution bath coating |
| 15072310 | Luon RT20602020 (15072202) 1% silk solution bath coating |
| 15072311 | Power Luxtreme RT1211362 (15072201) 0.1% silk solution bath coating |
| 15072312 | Luon RT20602020 (15072202) 0.1% silk solution bath coating |

TABLE 35

Test results for silk fibroin coated fabrics.

| | Raw Data: | Wetting Time Top (sec) | Wetting Time Bottom (sec) | Top Absorption Rate (%/sec) | Bottom Absorption Rate (%/sec) | Top Max Wetted Radius (mm) | Bottom Max Wetted Radius (mm) | Top Spreading Speed (mm/sec) | Bottom Spreading Speed (mm/sec) | Accumulative One-Way Transport index (%) | Over all Mosture Management Capability OMMC |
|---|---|---|---|---|---|---|---|---|---|---|---|
| 15072201 | Mean | 64.3786 | 3.4072 | 8.8123 | 8.60494 | 5 | 5 | 0.15038 | 1.41686 | 151.65248 | 0.25898 |
| 15072202 | Mean | 25.1766 | 28.1922 | 5.4636 | 6.195 | 5 | 5 | 0.216 | 0.4244 | 80.9572 | 0.1529 |
| 15072301 | Mean | 16.7172 | 12.2604 | 21.9859 | 33.6196 | 5 | 5 | 0.4304 | 0.4906 | 143.6659 | 0.2808 |
| 15072302 | Mean | 25.8898 | 41.5026 | 6.16512 | 8.70282 | 5 | 5 | 0.23336 | 0.1791 | 14.06124 | 0.10704 |
| 15072303 | Mean | 42.152 | 4.7268 | 7.9114 | 19.3725 | 4 | 5 | 0.3261 | 1.364 | 370.2757 | 0.5297 |
| 15072304 | Mean | 78.4746 | 34.3138 | 5.01486 | 6.63212 | 5 | 5 | 0.0661 | 0.38728 | 94.97976 | 0.16848 |
| 15072305 | Mean | 36.1954 | 17.2038 | 6.27158 | 6.25526 | 5 | 5 | 0.18872 | 0.89046 | 139.73478 | 0.23052 |
| 15072306 | Mean | 78.4746 | 34.3138 | 5.01486 | 6.63212 | 5 | 5 | 0.0661 | 0.38728 | 94.97976 | 0.16848 |
| 15072307 | Mean | 36.195 | 17.2038 | 6.2716 | 6.2553 | 5 | 5 | 0.1887 | 0.8905 | 139.7348 | 0.2305 |
| 15072308 | Mean | 57.335 | 25.7588 | 5.6432 | 6.4437 | 5 | 5 | 0.1274 | 0.6389 | 117.3573 | 0.1995 |
| 15072309 | Mean | 54.1384 | 9.2662 | 4.01594 | 9.11064 | 5 | 5 | 0.09398 | 0.85306 | 267.0755 | 0.36724 |
| 15072310 | Mean | 28.4544 | 13.6658 | 6.8844 | 7.8956 | 5 | 5 | 0.3059 | 0.5111 | 104.5035 | 0.1794 |
| 15072311 | Mean | 5.1292 | 4.4738 | 8.8047 | 13.0277 | 5 | 5 | 0.9486 | 1.1702 | 246.6729 | 0.3597 |
| 15072312 | Mean | 6.8516 | 9.4722 | 11.0684 | 11.7268 | 5 | 5 | 0.7394 | 0.5794 | 73.4005 | 0.1461 |

Example 13. Manufacturing Processes for Silk Coated Textiles and Leathers

Silk coated textiles and leathers may be manufactured on larger scales according to the methods provided herein using standard textile and leather manufacturing equipment with the addition of silk fibroin-based protein fragment coating steps (e.g., via bath, stencil, or spray methods). For example, a tentering and stentering frame, representing a typical process for applying the silk solution in a continuous process, may include the following units:

- An unwinding device used to unroll the fabric supply in a roll configuration;
- A feeding system used to control the feed rate of fabric;
- A material compensator used to maintain consistent the fabric tension;
- A coating machine used to apply the silk solution (i.e., silk fibroin-based protein fragments) in different state (liquid or foam) to the fabric;
- A measuring system used to control the amount of silk solution applied;
- A dryer used to cure or dry the silk solution on the fabric;
- A cooling station used to bring the fabric temperature close to room value;
- A steering frame used to guide the fabric to the rewinding device and maintain straight edges; and
- A rewinding used to collect the coated fabric in roll.

Frames may also include rollers and sprayers for application of silk fibroin-based protein fragment coating, UV irradiators for curing of silk and/or other fabric additives (e.g., in a chemical cross-linking step), and RF irradiators (e.g., using microwave irradiation) for drying and chemical cross-linking.

Tentering and stentering equipment and other equipment capable of coating silk solutions onto continuous flat fabric or textile material, including leather, according to the above process, is available from the following suppliers: Aigle, Amba Projex, Bombi, Bruckner, Cavitec, Crosta, Dienes Apparatebau, Eastsign, Europlasma, Fermor, Fontanet, Gaston Systems, Hansa Mixer, Harish, Has Group, Icomatex, Idealtech, Interspare, Isotex, Klieverik, KTP, MP, Mageba, Mahr Feinpruef, Matex, Mathis, Menzel LP, Meyer, Monforts, Morrison Textile, Mtex, Muller Frick, Muratex Textile, Reliant Machinery, Rollmac, Salvade, Sandvik Tps, Santex, Chmitt-Machinen, Schott & Meissner, Sellers, Sicam, Siltex, Starlinger, Swatik Group India, Techfull, TMT Manenti, Unitech Textile Machinery, Weko, Willy, Wumag Texroll, Yamuna, Zappa, and Zimmer Austria.

Equipment capable of drying silk solution coatings on fabric or other textile materials, including leather, is available from the following suppliers: Alea, Alkan Makina, Anglada, Atac Makina, Bianco, Bruckner, Campen, CHTC, CTMTC, Dilmenler, Elteksmak, Erbatech, Fontanet, Harish, Icomatex, Ilsung, Inspiron, Interspare, Master, Mathis, Monfongs, Monforts, Salvade, Schmitt-Maschinen, Sellers, Sicam, Siltex, Swastik Group India, Tacome, Tubetex, Turbang, Unitech Textile Machinery, and Yamuna.

Example 14. Flammability Testing for Silk Coated Textiles

Flame resistant testing of textiles and other products of the invention, coated with silk fibroin-based protein fragments prepared using any of the methods disclosed herein may be performed using methods known to those of skill in the art, and may provide results that demonstrate flame resistant property for textiles and other products coated with silk fibroin-based protein fragments relative to uncoated textiles. Flame resistant testing of fabrics coated with silk fibroin-based protein fragments may be determined, for example, using 16 C.F.R. 1615 or 16 C.F.R. 1616 or other suitable versions of flame resistant testing standards known to those of skill in the art. Briefly, a piece of textile coated with silk fibroin-based protein fragments prepared using any of the methods disclosed herein, after 25 washing cycles, is cut into 3.5 inches wide×10 inches long rectangle specimen. One specimen is suspended in a test chamber through a specimen holder. The test chamber should be a steel chamber and at least with dimensions 32.9 cm. (1215/16 in.) wide, 32.9 cm. (12 15/16 in.) deep, and 76.2 cm. (30 in.) long. The specimen is suspended in the test chamber vertically along the length of the specimen, and is lit up by a burner. Then the char length is measured. The testing is repeated for 5 times and average char length is calculated based on the individual result. The same testing is performed with a textile without a silk coating as a control. The specimen after 5, 10, 15, 20, 30, 35, 40, 45, and 50 washing cycles are also tested. The average char length needs to be less than 7 inches (177.8 mm) to be determined as flame resistant. The char length is the value used to evaluate passing grade for sleepwear flammability.

Two representative fabrics were used in the flammability tests. A cotton interlock fabric coated with 1% silk fibroin solution (16021103) was compared to the same fabric without (16021101) coating. A polyester double knit fabric coated with 1% silk fibroin solution (16021104) was compared to the same fabric without coating (16021102) with 1% silk fibroin solution. The SFS used to coat the fabrics in these experiments had a weight average molecular weight range of about 32-44 kDa.

Results for a cotton interlock fabric are shown in FIG. 271 and FIG. 272. The coating with silk fibroin-based protein fragments does not adversely affect the flammability of the fabric. Similarly, the results for a polyester double-knit fabric, shown in FIG. 273 and FIG. 274, also indicate that coating with silk fibroin-based protein fragments does not adversely affect the flammability of the fabric. No significant differences between samples made from same material (cotton or polyester) were observed. The differences between fabric made with the same material for afterglow and after flame time were not significant. Cotton, as expected, was flammable and none of the samples were left after the test.

Example 15. Abrasion Testing for Silk Coated Textiles

Abrasion testing of textiles and other products coated with silk fibroin-based protein fragments prepared using any of the methods disclosed herein may be performed using methods known to those of skill in the art, and may provide results that demonstrate improved resistance to abrasion for textiles and other products coated with silk fibroin-based protein fragments relative to uncoated textiles. Improved resistance to abrasion is useful in applications such as upholstery, including upholstery designed for home, automotive, aircraft, or other uses. Abrasion testing of fabrics coated with silk fibroin-based protein fragments may be determined, for example, using ASTM Method D4966-12 (Standard Test Method for Abrasion Resistance of Textile Fabrics (Martindale Abrasion Tester Method), ASTM, 2013) or other suitable versions of ASTM Method D4966. Briefly, abrasion resistance is measured by subjecting a textile specimen to a rubbing motion that takes the form of a geometric figure, beginning with a straight line, which becomes a gradually widening ellipse until it forms another straight line in the opposite direction, after which the motion reverses repeatedly. The rubbing occurs under known conditions of pressure and abrasive action. A Martindale Abrasion Tester (commercially available from James H. Heal Co., Ltd.) is used for testing. Resistance to abrasion is evaluated.

Four samples were testing using ASTM Method D4966-12. Sample 16021101 was a 100% cotton interlock fabric. Sample 16021102 was a 100% polyester double knit. Sample 16021501 was the 100% cotton interlock fabric after bath coating (as described herein) with 1% silk fibroin solution (SFS). Sample 16021502 was the 100% polyester double knit fabric after bath coating (as described herein) with 1% SFS. The SFS used to coat the fabrics in these experiments had a weight average molecular weight range of about 11 kDa.

| Testing Results: | 160211011 | Testing Results: | 160211012 |
|---|---|---|---|
| Specimen 1 | 943 rubs | Specimen 1 | 2,000 rubs |
| Specimen 2 | 1,253 rubs | Specimen 2 | 1,862 rubs |
| Specimen 3 | 737 rubs | Specimen 3 | 2,637 rubs |
| Average | 978 rubs | Average | 2,166 rubs |
| standard deviation | 260 | standard deviation | 413 |

| Testing Results: | 16021501 | Testing Results: | 16021502 |
|---|---|---|---|
| Specimen 1 | 805 rubs | Specimen 1 | 4,910 rubs |
| Specimen 2 | 897 rubs | Specimen 2 | 3,090 rubs |
| Specimen 3 | 797 rubs | Specimen 3 | 6,000 rubs |
| Average | 833 rubs | Average | 4,667 rubs |
| standard deviation | 56 | standard deviation | 1,470 |

The foregoing results are illustrated in FIG. 275 and FIG. 276, which show the improved abrasion resistance of polyester after coating with a silk fibroin-based solution.

Example 16: Surface Analysis of Coated Fabrics to Demonstrate the Applied Coatings SEM images of the back side of certain coated fabrics disclosed in Table 36 were obtained at various magnifications as shown in FIGS. 277 to 316.

TABLE 36

| Sample No. | Associated SEM Images | Coating Properties |
|---|---|---|
| 16041301 | FIGS. 277 to 281 | no coating, 150 C., 5 min |
| 16041302 | FIGS. 282 to 286 | 1%, low mw silk, 150 C., 5 min |
| 16041303 | FIGS. 287 to 291 | 1%, low mw silk, 200 C., 3 min |
| 16041304 | FIGS. 292 to 296 | no coating, 200 C., 3 min |
| 16041305 | FIGS. 297 to 301 | 1%, medium mw silk, 200 C., 3 min |
| 16041306 | FIGS. 302 to 306 | 1%, medium mw silk, 150 C., 5 min |
| 16040803 | FIGS. 307 to 311 | 0.075%, medium mw silk, 150 C., 5 min |
| 16040808 | FIGS. 312 to 316 | 0.01%, low mw silk, 150 C., 5 min |

Upon examination of the figures, there are some formations visible on top of controls 16041301 and 16041304, they can be identified as cyclic trimer, which may be a polyester byproduct, salt, or excess dye. The low molecular weight coated fibers present broken bridges between fibers. It may be noted that at low concentration the low molecular weight conglomerates in globs; more than at equivalent concentrations with the medium molecular weight. The medium molecular weight fibers have excellent polyester fibers at any concentration and temperature and a network of bridging fibers may be more visible at higher concentrations.

Example 17: Examination of the Effect of Various Parameters on SFS Coatings

This experiment tested the impact of SFS molecular weight with a 1% concentration at 3 different drying and curing temperature with different drying and curing temperature time. The fabrics were characterized by mass and Liquid Moisture Management Properties of Textile Fabrics (MMT) following AATCC Test Method 195-2012 (Tables 37-39).

TABLE 37

| Experimental parameters | Variables | | |
|---|---|---|---|
| silk solution concentration | 1% | | |
| silk solution molecular weight | medium | low | |
| Wet pickup | at 50 setting on padder | | |
| Temperature @ heat setting (C.) | 65 | 150 | 200 |
| Curing time (min) | 10 | 5 | 3 |

This experiment tested the impact of temperature on silk coated fabric.

Material 15042001—Non-wicking finish—fabric having a composition of 82% polyester and 18% elastane.

Material TFF-01-0012/TFF-01-0010—6% silk solution, medium molecular weight.

Material TFF-01-0013—6% silk solution, low molecular weight.

TABLE 38

| Sample | Sample Preparation |
|---|---|
| 16040101 (Sample 1) | TFF-01-0012 @ 1% silk solution, 50 setting on padders, 65° C. drying temperature, 10 min curing time, temperature on fabric surface at end of curing was 51.6° C. |
| 16040102 (Sample 2) | TFF-01-0012 @ 1% silk solution, 50 setting on padders, 150° C. drying temperature; 5 min curing tie, temperature on fabric surface at end of curing was 125.3° C. |
| 16040103 (Sample 3) | TFF-01-0012 @ 1% silk solution, 50 setting on padders, 200° C. drying temperature, 3 min drying time, temperature on fabric surface at the end of curing was 165.8° C. |
| 16040104 (Sample 4) | TFF-01-0013 @ 1% silk solution, 50 setting on padders, 200° C. drying temperature, 3 min drying time, temperature on fabric surface at the end of curing was 144° C. |
| 106040105 (Sample 5) | TFF-01-0013 @ 1% silk solution, 50 setting on padders, 150° C. drying temperature, 5 min drying time, temperature on fabric at the end of curing was 130.7° C. |
| 106040106 (Sample 6) | TFF-01-0013 @ 1% silk solution, 50 setting on padders, 65° C. drying temperature, 10 min drying time, temperature on fabric surface at the end of curing was 64° C. |

The samples mass recording is reported in the following table for each variable tested.

TABLE 39

| Sample # | Variables | Mass Before Coating | Mass Post Coating | Coating Mass % |
|---|---|---|---|---|
| 16040101 | 1%, medium 65 C., 10 min | 28.357 | 28.6268 | 0.95% |
| 16040102 | 1%, medium, 150 C., min. | 28.2137 | 28.4231 | 0.74% |
| 16040103 | 1%, medium, 200 C., 3 min | 28.2459 | 28.4365 | 0.67% |
| 16040104 | 1% low, 200 C., 3 min | 28.0225 | 28.1442 | 0.43% |
| 16040105 | 1% low, 150 C., 5 min | 27.9803 | 28.1203 | 0.50% |
| 16040106 | 1% low, 65 C., 10 min | 28.5204 | 28.7611 | 0.84% |

The collective results are provided in FIG. 327 for each tested material. However, sample 16040102 did not produce acceptable results and 15042001 is provided as a reference, which is not coated.

The results of these analyses are provided in table form in FIG. 338. Specifically, FIG. 338 describes the grading for each tested sample (medium and low molecular weight samples) in terms of wetting (top and bottom), absorption rate (top and bottom), wetted radius (top max and bottom max), spreading speed (top and bottom), accumulative one-way transport, and overall moisture management capability (OMMC).

From the presented results the SFS coated fabric has an impact on the MMT grading of fabric, significantly improving the accumulative one way transport index from the non-coated standard of grade 2 to the SFS coated grades of 4-5 depending on molecular weight and curing time and temperature. While with the OMMC index the non-coated standard has a grade of 1 compared to the SFS coated grades of 3 independent of tested variables.

Example 18: Impact of SFS Concentration at Low and Medium Molecular Weight Samples This experiment tested the impact of SFS concentration at 2 molecular weights using the same drying and curing temperature time. The fabrics were characterized by mass and Liquid Moisture Management Properties of Textile Fabrics (MMT) following AATCC Test Method 195-2012.

The experimental parameters are provided in Table 40.

TABLE 40

| Experimental parameters | Variables | | | | | | | |
|---|---|---|---|---|---|---|---|---|
| silk solution concentration | 0.750% | 0.500% | 0.250% | 0.100% | 0.075% | 0.050% | 0.025% | 0.010% |
| silk solution molecular weight | medium | low | medium | low | medium | low | medium | low |
| Wet pick up | at 50 setting on padder | | | | | | | |
| Temperature @ heat setting ° C. | 150 | | | | | | | |
| Curing time (min) | 5 | | | | | | | |
| Padder speed (m/min) | 3 | | | | | | | |

The samples mass recording is reported in the following table for each variable tested (Table 41).

TABLE 41

| Sample # | Variables | Mass Before Coating | Mass Post Coating | Mass Post 24 hrs Coating | Coating Mass % |
|---|---|---|---|---|---|
| 16040801 | 0.75%, medium mw silk, 150 C., 5 min | 27.7229 | 27.8157 | 27.8731 | 0.54% |
| 16040802 | 0.25%, medium mw silk, 150 C., 5 min | 27.5821 | 27.5660 | 27.6011 | 0.07% |
| 16040803 | 0.075%, medium mw silk, 150 C., 5 min | 27.5871 | 27.5154 | 27.5582 | −0.10% |
| 16040804 | 0.025%, medium mw silk, 150 C., 5 min | 27.7265 | 27.6364 | 27.6771 | −0.18% |
| 16040805 | 0.50%, low mw silk, 150 C., 5 min | 27.9121 | 27.9367 | 27.9646 | 0.19% |
| 16040806 | 0.10%, low mw silk, 150 C., 5 min | 27.6692 | 27.5963 | 27.6298 | −0.14% |
| 16040807 | 0.05%, low mw silk, 150 C., 5 min | 27.8840 | 27.8040 | 27.8389 | −0.16% |
| 16040808 | 0.01%, low mw silk, 150 C., 5 min | 28.1490 | 28.0500 | 28.0755 | −0.26% |

Sample test results for each variable tested are reported in the table set forth in FIG. 329, where sample 15042001 is a non-coated control. Sample test grading for each variable tested are reported in the table provided in FIG. 340.

From the presented results the SFS coated fabric has an impact on the MNIT grading of fabric, significantly improving the accumulative one way transport index from the non-coated standard of grade 2 to the SFS coated grades of 5 depending on molecular weight (low vs. medium) and SFS concentration. While with the OMIVIC index the non-coated standard has a grade of 1 compared to the SFS coated grades of 3 independent of tested variables.

Example 19: Tested Impact of Curing Time on Coatings at Two Molecular Weights

This experiment tested the impact of curing time at 150° C. and 200° C. with SFS at 1% concentration at two molecular weights. The fabrics were characterized by mass and Liquid Moisture Management Properties of Textile Fabrics (MMT) following AATCC Test Method 195-2012.

The experimental parameters are provided in Table 42.

TABLE 42

| Experimental Parameters | Variables | | |
|---|---|---|---|
| silk solution concentration | 1.000% | | |
| silk solution molecular weight | medium | low | |
| Wet pick up | at 50 setting on padder | | |
| Temperature @ heat setting° C. | 150 | 200 | |
| Curing time (min) | 3 | 5 | 10 |
| Padder speed (m/min) | 3 | 3 | |

The samples mass recording is reported in the following table for each variable tested (Table 43).

TABLE 43

| Sample # | Variables | Mass Before Coating | Mass Post Coating | Mass Post 24 hrs Coating | Coaling Mass % |
|---|---|---|---|---|---|
| 16041201 | 1% low mw silk, 150 C., 10 min | 28.2130 | 28.2708 | 28.3311 | 0.42% |
| 16041202 | 1% low mw silk, 200 C., 10 min | 28.0331 | 28.0221 | 28.0575 | 0.09% |
| 16041302 | 1%, low mw silk, 150 C., 5 min | 27.7916 | 27.8905 | 27.9608 | 0.61% |
| 16041303 | 1%, low mw silk, 200 C., 3 min | 27.7066 | 27.7484 | 27.7973 | 0.33% |
| 16041903 | 1% medium mw silk, 200 C., 10 min | 77.8510 | 27.8545 | 27.9256 | 0.27% |
| 16041204 | 1% medium mw silk, 150 C., 10 min | 27.0315 | 271104 | 27.1567 | 0.46% |
| 16041305 | 1%, medium mw silk, 200 C., 3 min | 28.1509 | 28.2656 | 28.3306 | 0.64% |

TABLE 43-continued

| Sample # | Variables | Mass Before Coating | Mass Post Coating | Mass Post 24 hrs Coating | Coaling Mass % |
|---|---|---|---|---|---|
| 16041306 | 1% medium mw silk, 150 C., 5 min | 27.3574 | 27.5165 | 27.5715 | 0.78% |
| 16041301 | no coating, 150 C., 5 min | 26.7848 | 26.6993 | 26.7412 | −0.16% |
| 16041304 | no coating, 200 C., 3 min | 27.8559 | 27.7539 | 27.7896 | −0.24% |

Sample test results for each variable tested are reported in the table set forth in FIG. 341, where samples 16041301 and 16041304 are non-coated fabrics for reference. Sample test grading for each variable tested are reported in the table provided in FIG. 342.

From the presented results the curing temperature time may reduce the MMT grading when 1% SFS coated fabric is exposed between 5-10 minutes at 150° C. or 200° C. At the other curing time tested 3 and 5 minutes at 150° C. or 200° C. there is no apparent impact on accumulative one way transport or OMMC grades.

Example 20

This experiment tested the impact of temperatures of 65° C., 150° C., and 200° C. at the minimum drying and curing time with 1% SFS at two molecular weights. The fabrics were characterized by mass and Liquid Moisture Management Properties of Textile Fabrics (MMT) following AATCC Test Method 195-2012.

The experimental parameters are provided in Table 44.

TABLE 44

| Experimental Parameters | Variables | |
|---|---|---|
| silk solution concentration | 1% | no solution |
| silk solution molecular weight | medium | low |
| Wet pick up | at 50 setting on padder | |
| Temperature @ heat setting (C.) | 150 | 200 |
| Curing time (min) | 5 | 3 |
| Padder speed | 3 | 3 |

The samples mass recording is reported in the following table for each variable tested (Table 45).

TABLE 45

| Sample # | Variables | Mass Before Coating | Mass Post Coating | Mass Post 24 hrs Coating | Coating Mass % |
|---|---|---|---|---|---|
| 16041301 | no coating, 150 C., 5 min | 26.7848 | 26.6993 | 26.7412 | −0.16% |
| 16041302 | 1%, low mw silk, 150 C., 5 min | 27.7916 | 27.8905 | 27.9608 | 0.61% |
| 16041303 | 1%, low mw silk, 20 C., 3 min | 27,7066 | 27.7484 | 27.7973 | 0.33% |
| 16041304 | no coating, 200 C., 3 min | 27.8559 | 27.7539 | 27,7896 | −0.24% |
| 16041305 | 1%, medium mw silk, 200 C., 3 min | 28.1509 | 28.2656 | 28.3306 | 0.64% |
| 16041306 | 1%, medium mw silk, 150 C., 5 min | 27.3574 | 27.5165 | 27.5715 | 0.78% |

TABLE 45-continued

| Sample # | Variables | Mass Before Coating | Mass Post Coating | Mass Post 24 hrs Coating | Coating Mass % |
|---|---|---|---|---|---|
| 15042001 | no coating | | | | |
| 16040101 | 1%, medium mw silk, 65 C., 10 min. | 28.357 | 28.6268 | | |
| 16040106 | 1%, low mw silk, 65 C., 10 min | 28.5204 | 28.7611 | | |

Sample test results for each variable tested are reported in the table set forth in FIG. 333, where samples 16041301, 16041304, and 15042001 are non-coated fabrics for reference. Sample test grading for each variable tested is reported in the table provided in FIG. 334.

From the presented results the curing temperature of 65° C., 150° C., and 200° C. has limited to no impact on the MMT grading when 1% SFS coated fabric is exposed for respectively 3, 5, and 10 minutes. Medium molecular weight coated fabrics have faster wetting time than low molecular weight coated fabrics or non-coated control fabrics. Low molecular weight coated fabrics exhibit a faster spreading time than medium molecular weight coated fabrics or non-coated control fabrics. Medium molecular weight coated fabrics or low molecular weight coated fabrics perform equal to or better than non-coated control fabrics in terms of Accumulative One Way Transport and OMMC.

Example 21: Listing of Specific Fabrics

Table 46 includes a listing of coated and non-coated fabrics tested in the present Examples and their associated coating process variables.

TABLE 46

| Sample ID | Variables |
|---|---|
| 16040101 | 1% SFS, medium, 65 C., 10 min |
| 16040102 | 1% SFS, medium, 150 C., 5 min |
| 16040103 | 1% SFS, medium, 200 C., 3 min |
| 16040104 | 1% SFS, low, 200 C., 3 min |
| 16040105 | 1% SFS, low, 150 C., 5 min |
| 16040106 | 1% SFS, low, 65 C., 10 min |
| 16040801 | 0.75% SFS, medium mw silk, 150 C., 5 min |
| 16040802 | 0.25% SFS, medium mw silk, 150 C., 5 min |
| 16040803 | 0.075% SFS, medium mw silk, 150 C., 5 min |
| 16040804 | 0.025% SFS, medium mw silk, 150 C., 5 min |
| 16040805 | 0.50% SFS, low mw silk, 150 C., 5 mm |
| 16040806 | 0.10% SFS, low mw silk, 150 C., 5 min |
| 16040807 | 0.05% SFS, low mw silk, 150 C., 5 min |
| 16040808 | 0.01% SFS, low mw silk, 150 C., 5 min |
| 16041201 | 1% SFS, low mw silk, 150 C., 10 min |
| 16041202 | 1% SFS, low mw silk, 200 C., 10 min |
| 16041203 | 1% SFS, medium mw silk, 200 C., 10 min |
| 16041204 | 1% SFS, medium mw silk, 150 C., 10 min |
| 16041301 | no coating, 150 C., 5 min |
| 16041302 | 1% SFS, low mw silk, 150 C., 5 min |
| 16041303 | 1% SFS, low mw silk, 200 C., 3 min |
| 16041304 | no coating, 200 C., 3 min |
| 16041305 | 1% SFS, medium mw silk, 200 C., 3 min |
| 16041306 | 1% SFS, medium mw silk, 150 C., 5 min |
| 16042501 | 0.075% SFS, medium mw silk skin side up |
| 16042502 | 0.075% SFS, medium mw silk skin side down |
| 16042503 | 0.1% SFS, low mw silk skin side up |
| 16042504 | 0.01% SFS, low mw silk skin side down |
| 16050301 | 1% SFS, low mw silk, 200 C. 3 min |
| 16050302 | 0.1% SFS, low mw silk, .200 C., 3 min |
| 16050303 | 1% SFS, medium mw silk, 200 C. 3 min |
| 16050304 | 1% SFS, medium mw silk, 200 C. 3 min |
| 16050305 | 1% SFS, medium mw silk, 200 C. 3 min |
| 16050306 | 0.1% SFS, medium mw silk, 200 C., 3 min |

TABLE 46-continued

| Sample ID | Variables |
|---|---|
| 16050307/ 15042001 | non wicking finished, 200 C., 3 min |
| 16050308/ 15042001 | non wicking finished, 200 C., 3 min |
| 16050309/ 15042001 | non wicking finished, 200 C., 3 min |
| 16050310/ 15042001 | non wicking finished, 150 C., 5 min |
| 16050311/ 15042001 | non wicking finished, 150 C., 5 min |
| 16050312/ 15042001 | non wicking finished, 150C. 5 min |
| 16050401 | 0.1% SFS, medium mw silk, 65 C. 10 min |
| 16050402 | 0.1% SFS, medium mw silk, 150 C. 5 min |
| 16050403 | 0.1% SFS, medium mw silk, 200 C. 3 min |
| 16050404 | 0.25% SFS, medium mw silk, 65 C. 10 min |
| 16050405 | 0.25% SFS, medium mw silk, 150 C. 5 min |
| 16050406 | 0.25% SFS, medium mw silk, 200 C. 3 min |
| 16050407 | 0.1% SFS, low mw silk, 65 C. 10 min |
| 16050408 | 0.1% SFS, low mw silk, 150 C. 5 min |
| 16050409 | 0.1% SFS, low mw silk, 200 C. 3 min |
| 16050410 | 0.25% SFS, low mw silk, 65 C. 10 min |
| 16050411 | 0.25% SFS, low mw silk, 150 C. 5 tnin |
| 16050412 | 0.25% SFS, low mw silk. 200 C. 3 min |

Example 22: A Map of the Fabric Samples Tested

A number of the coated and non-coated fabrics described herein were tested for anti-microbial activity. Those fabrics, and their identities and process variables, are set forth in Table 47.

TABLE 47

| | | curing | | | | | | | | | |
|---|---|---|---|---|---|---|---|---|---|---|---|
| molecular | concentration | 65 | | | 150 | | | 200 (385 F. = 196 C.) | | | temperature (*C.) |
| weight | (%) | 3 | 5 | 10 | 3 | 5 | 10 | 3 | 5 | 10 | time (min) |
| silk | | | | | | | | | | | |
| medium | 1.000 | | | 16040101 | | 16040102<br>16041306 | 16041204 | 16040103<br>16041305<br>16050303<br>16050304<br>16050305 | | 16041203 | antimicrobial |
| | 0.750 | | | | | 16040801 | | | | | |
| | 0.500 | | | | | | | | | | |
| | 0.250 | | | 16050404 | | 16040802<br>16040802<br>16050405 | | 16050406 | | | |
| | 0.100 | | | 16050401 | | 16050402 | | 16050403<br>16050306 | | | |
| | 0.075 | | | | | 16040803<br>16042503<br>16042504 | | | | | |
| | 0.050 | | | | | | | | | | |
| | 0.025 | | | | | 16040804 | | | | | |
| | 0.001 | | | | | | | | | | |
| low | 1.000 | | | 16040106 | | 16040105<br>16041302<br>16040105 | 16041201 | 16040104<br>16041303<br>16050301 | | 16041202 | |
| | 0.750 | | | | | | | | | | |
| | 0.500 | | | | | 16040805 | | | | | |
| | 0.250 | | | 16050410 | | 16050411 | | 16050412 | | | |
| | 0.100 | | | 16050407 | | 16040806<br>16042501<br>16042502<br>16040806<br>16050408 | | 16050409<br>16050302 | | | |
| | 0.075 | | | | | | | | | | |
| | 0.050 | | | | | 16040807 | | | | | |
| | 0.025 | | | | | | | | | | |
| | 0.001 | | | | | 16040808 | | | | | |
| control | | | | | | | | | | | |
| non-finished | 15042001 | | | | | 16041301<br>16050310<br>16050311<br>16050312 | | 16041304<br>16050307<br>16050308<br>16050309 | | | antimicrobial |
| semi-finished | 15042002<br>15042002 | | | | | | | | | | |
| finished | 15042003<br>16042003 | | | | | | | | | | |

Example 23: Results of Liquid Moisture Management Tests

FIG. 335 provides a map of Liquid Moisture Management Test results for various coated fabrics described herein.

Example 24: Silk Fibroin Solution with Silicone Softener

The objective of this study will be to evaluate the impact to the hand of the fabric of two types of silicon softeners in conjunction with silk fibroin solution. In addition, Liquid Moisture Management testing (MMT) according to AATCC 195-2012 will be completed on the samples, and a drapability test according to the drape elevator method modified to accommodate samples dimension.

This study will be performed to evaluate the changes in hand characteristics of a fabric when commercially available silicon softeners are mixed with different percentage and molecular weight of silk fibroin solution followed by a drying and curing process. The fabrics will be characterized for Moisture Management properties and drapability.

Materials and equipment for the study include Silk Therapeutics medium molecular weight solution at 6%, Silk Therapeutics low molecular weight solution at 6%, Huntsman Ultratex CSP, Huntsman Ultratex SI, Acetic acid, Citric acid, RODI water, Fabric sample 15042001 non-wicking finish, a permanent marker, Werner Mathis MA0881 padder/coater, curing frame, Across International Oven FO-19140, Balance Veritas M314-AI, Universal plastic PH test strip, Drape elevator test fixture, and an LG Nexus 5× phone camera.

Silk coated fabric will be prepared following SOP-TEMP-001. Silk solution concentration will be prepared at the desired concentration as reported in the table below and is mixed to the desired concentration of silicon softener as reported in Table 48. The coating solution is applied to the fabric with bath immersion and pad roller pressure setting at 50. After coating the fabric is dry/cure in the oven at 200 C for 3 minutes.

TABLE 48

| Experiment Variables | | | | |
|---|---|---|---|---|
| Silk solution medium mw silk | Ultratex SI | Ultratex CSP | Acetic acid | Citric acid |
| 1% | 22 gr/liter | | | |
| 1% | | 50 gr/liter | | |
| 1% | 22 gr/liter | | 0.5 gr/liter | |
| 1% | | 50 gr/liter | 1 gr/liter | |
| 1% | | | | 1 gr/liter |
| 1% | | | | 0.5 gr/liter |
| No Silk | 22 gr/liter | | | |
| No Silk | | 50 gr/liter | | |
| No Silk | 22 gr/liter | | 0.5 gr/liter | |
| No Silk | | 50 gr/liter | 1 gr/liter | |

Post curing the fabric is left to condition at room temperature for 24 hr.

Samples are cut to 8 cm by 8 cm square and delivered to MSC lab for MMT testing.

After conditioning the fabric is tested for drapability using the drape elevator test modified to accommodate the MMT sample size dimension. After placing the sample on the testing jig an image is recorded with a camera; the elevator is lowered until no more contact is made with the fabric by the elevator table and a second image is recorded. Image analysis of the fabric area is performed through photoshop. A drape coefficient is calculated with the following formula:

$$\text{Drape Coefficient} = \frac{Ad - S1}{S2 - S1} * 100,$$

where Ad is the vertical projection of the draping sample, S1 the area of the round sample holder, and S2 is the area of the sample.

Example 25: Antibacterial Study

An experiment is devised for evaluating the antibacterial proliferation on SFS coated fabrics through multiple washing cycles. Specifically, the study will examine whether bacteria will adhere to silk-coated fabric following wash.

The study will mimic the bacterial deposition on textile material during regular exercise and home laundering.

The antibacterial testing will be at 0, 1, 10, and 25 minute cycles using a front loading washer with water at less than 30° C. The fabrics will be air or tumble dried at less than 50° C.

A 13.5×13.5 inch fabric swatch will spotted with eight (8) inoculation sites and tested following washing at the disclosed intervals to determine the presence and quantity of bacteria.

Example 26: Drapability of Exemplary Silk Coated Fabrics

The following coated fabrics were prepared according to the processes described herein and tested for drapability according to the method described in Mizutani, et al., "A New Apparatus for the Study of Fabric Drape." *Textile Research Journal* (2005) 75: 81-87.

The materials in the method include a sample and camera holding fixture, sample holding fixture of 5 cm in diameter, an elevator plane, and a camera. The fabric specimens were 8×8 $cm^2$. The procedure included: (1) cutting the sample to 8×8 cm square (8 cm diameter may be used); (2) placing the specimen at the center of a fixture; (3) elevating the fixture to examine the draping of the specimen; and (4) capture an image of the specimen.

The images were opened in Adobe Photoshop CS5.1 and the lazo function was used to delmit the perimeter of the specimen. The measurement function was then used to count all the pixels within the selected area and such data was saved. This process was repeated for each specimen. A drape coefficient was calculated based on the following formula:

$$\text{Drape Coefficient} = \frac{Ad - S1}{S2 - S1} * 100,$$

where Ad is the vertical projection of the draping sample, S1 is the area of the round sample holder, and S2 is the area of the sample. The data for such analysis is set forth in Table 49 and associated FIG. 336.

TABLE 49

| Sample No. | Sample Properties | Avg. Drapability Coefficient | STDev |
|---|---|---|---|
| 16052001 | 1% medium mw silk solution, + 2.2% ULTRATEX ® SI ("SI") | 80.0 | 1.9 |

TABLE 49-continued

| Sample No. | Sample Properties | Avg. Drapability Coefficient | STDev |
|---|---|---|---|
| 16052002 | 1% medium mw silk, + 2.2% SI + acetic acid 0.5% | 88.2 | 2.1 |
| 16052003 | 1% medium mw silk solution, + 5% ULTRATEX ® CSP ("CSP") | 81.8 | 3.1 |
| 16052004 | 1% medium mw silk solution, + 5% CSP + acetic acid 1% | 88.2 | 2.9 |
| 16052005 | 1% medium mw silk solution, + 0.1% citric acid | 92.7 | 0.7 |
| 16052006 | 1% medium mw silk solution, + 0.05% citric acid | 89.9 | 0.4 |
| 16051103 | no coating, 200 C., 3 min | 83.2 | 1.4 |
| 16051109 | 0.25%, medium mw silk solution, 200 C. 3 min | 85.7 | 1.7 |
| 16051115 | 0.25%, low mw silk solution, 200 C. 3 min | 89.9 | 2.4 |
| 16052501 | 2.2% SI | 69.1 | 4.4 |
| 16052502 | 2.2% SI acetic acid 0.5% | 61.7 | 1.9 |
| 16052503 | 5% CSP | 61.6 | 4.8 |
| 16052504 | 5% CSP + acetic acid 1% | 59.5 | 3.5 |

According to the foregoing study, silk solution, drying parameters, and silicone compositions were used to adjust the drapability for a variety of coated fabrics.

Example 27: Effect of Mechanical and Steam Finishing on a Silk Coated Fabric

A sample was prepared according to the method set forth in Example 26, wherein the sample was a polyester/LYCRA non-finished fabric coated with a 1% SFS (medium molecular weight) that was dried at 200° C. for 3 minutes. In addition, the same fabric was subjected to a 41 minutes dryer cycle at normal setting on medium temperature (mechanical finishing) and to steaming on a steam table for 5 seconds (steam finishing). The resulting samples, after finishing, were examined for drapability as shown in Table 50 and in FIG. 337.

TABLE 50

| Sample No. | Sample Properties | Avg. Drapability Coefficient | STDev |
|---|---|---|---|
| 16041305 | 1% medium mw silk, 200 C. 3 min | 82.1 | 1.2176 |
| 16041305 | post mechanical finish | 80.0 | 2.3692 |
| 16041305 | post steam finish | 91.4 | 2.7572 |

While the mechanical finishing with the dryer reduced the drapability coefficient (i.e., less stiff fabric), the steam finishing increased the drapability coefficient (i.e., stiffer fabric).

Results of experiments measuring solution depletion calculation during coating are shown in FIG. 338, and illustrate the amount of silk fibroin deposited on fabrics.

Additional results of moisture management testing of coated fabrics are given in FIG. 339 to FIG. 344.

Additional results from antimicrobial testing of coated fabrics are given in FIG. 345 and FIG. 346.

Example 28: Effectiveness of Diluting Silk with Tap Water

The silk compositions described herein are stable and effective when prepared with tap water.

A 1:1 ratio between the silicone and silk gave a softer hand to a resulting fabric with a 20:1 ratio between silk/silicone and citric acid.

The parameters for the study between tap water and reverse-osmosis/deionized (RODI) water are set forth in Table 51.

TABLE 51

| Silk Solution | Water | Softener | pH Correction |
|---|---|---|---|
| 0.25% med mw silk | RODI | | |
| 0.25% med mw silk | RODI | 0.25% Ultratex CSP | 0.02% citric acid (50%) |
| 0.25% low mw silk | RODI | | |
| 0.25% low mw silk | RODI | 0.25% Ultratex CSP | 0.02% citric acid (50%) |
| 0.25% med mw silk | Unfiltered tap | | |
| 0.25% med mw silk | Unfiltered tap | 0.25% Ultratex CSP | 0.02% citric acid (50%) |
| 0.25% low mw silk | Unfiltered tap | | |
| 0.25% low mw silk | Unfiltered tap | 0.25% Ultratex CSP | 0.02% citric acid (50%) |

The parameters for a second study are set forth in Tables 56 and 57. The results of this study are illustrated in FIG. 373. The second study relates to a water drop test on polyester/lycra knitted fabric treated with RODI water and tap water.

TABLE 56

| Experimental Parameters | Variables | | |
|---|---|---|---|
| silk solution concentration | 0.25% | | |
| silk solution molecular weight | medium | low | — |
| water | RODI | tap water | — |
| Wet pick up | at 50 setting on padder | | |
| Temperature @ heat setting (C.) | 200 | | |
| Curing time (min) | 3 | | |
| silicon softener Ultratex CSP | 0.25% | — | — |
| citric acid | 0.0200% | — | — |

TABLE 57

| Sample Number | Description | Time to absorb (sec) |
|---|---|---|
| 16070601 | 0.25% medium mw silk (RODI) | |
| 16070602 | 0.25% medium mw silk, 0.25% Ultratex CSP, 0.02% citric acid (50%) | 25 |
| 16070603 | 0.25% low mw silk | 1 |
| 16070604 | 0.25% low raw silk, 0,25% Ultratex CSP, 0.02% citric acid (50%) | 10 |
| 16070605 | 0.25% medium mw silk (tap water) | 2 |
| 16070606 | 0.25% medium mw silk, 0.25% Ultratex CSP, 0.02% citric acid (50%) | 30 |
| 16070607 | 0.25% low mw silk | |
| 16070608 | 0.25% low mw silk, 0.25% Ultratex CSP, 0.02% citric acid (50%) | 22 |

The results of the foregoing study indicated that there was no difference in the resulting properties of those silk solutions prepared in RODI water as compared to unfiltered tap water. Moreover, the silk solutions did not precipitate with the use of tap water.

Example 29: A Study of Silk Solution as a Wicking Agent

Silk solutions as disclosed herein can be adopted as a wicking agent in common finishing recipes to balance the water repellency of silicone softeners.

The present test is a modification to AATCC-79-2014 that was prepared to accommodate the dimensions of the tested samples (8×8 cm samples), where the AATCC test is designed for a sample of 150 cm in diameter. Here, the samples are cut in 8 cm by 8 cm and placed in a drapability jig suspended on a 7 cm diameter round metal hoop so the back of the fabric has no surface contact. An RODI water drop is dispensed with an eye dropper from approximately 3 cm above the fabric. A video imaging recording captures the time from the water drop contacting the fabric until its full absorption or up to 30 seconds.

Without silk, the water drop stays on the fabric surface up to the test end of 30 seconds; while in the presence of silk the water drop is absorbed in as long as 4 seconds or as fast as 1 second depending on the tested variables.

The parameters for this study are set forth in Table 52 with the results set forth in FIGS. 347 and 348.

TABLE 52

| Sample Number | Description | Time to absorb (sec) |
|---|---|---|
| 16062901 | 0.22% Ultratex SI | 30 |
| 16062902 | 0.5% Ultratex CSP | 30 |
| 16062905 | 0.22% Ultratex SI, 0.025% citric acid | 30 |
| 16062906 | 0.5% Ultratex CSP, 0.025% citric acid | 30 |
| 16062105 | 0.5% medium mw silk, 0.22 gr/liter Ultatex SI | 3 |
| 16062106 | 0.5% low mw silk, 0.5 gr/liter Ultatex. CSP | |
| 16062107 | 0.5% low mw silk, 2.2 gr/liter Ultratex SI, 0.025 gr/liter citric acid | 1 |
| 16062108 | 0.5% medium mw silk, 5 gr/liter Ultratex CSP, 0.025 gr/liter citric acid | 4 |

Example 30: A Study of Dyeing Polyester and Nylon Fabrics Followed by the Application of Silicone and Silk Solution through Exhaust The objective of this study is to evaluate the application of silk fibroin solution on fabrics made with polyester/spandex and nylon/spandex. The application will take place after dyeing the fabrics at exhaust. In addition, silicon softeners will be added to the silk solution to improve the hand of the fabrics. Liquid Moisture Management testing (MMT) according to AATCC 195-2012, a drapability test according to the drape elevator method modified to accommodate samples dimension, and a water drop test will be used to characterize the fabrics.

This study was performed for research and development purposes to evaluate the feasibility to apply silk fibroin solution at exhaust post dyeing. In addition, commercially available silicon softeners were mixed with different percentage and molecular weight of silk fibroin solution to improve hand and drapability of the fabric.

Materials:

- Silk Therapeutics medium molecular weight solution at 6%;
- Silk Therapeutics low molecular weight solution at 6%;
- Huntsman Ultratex CSP;
- Huntsman Ultratex SI;
- Acetic acid;
- Fabric sample polyester/spandex; and
- Fabric sample nylon/spandex.

Equipment:

- 5 pounds paddle dyer by Rome Machine Foundry Co. SN #640115;
- 5 pounds pressure dyer by Optidye RS Basic Plus;
- Hydroextractor;
- Balance Veritas M314-AI;
- Universal plastic PH test strip;
- Drape elevator test fixture; and
- 5× phone camera.

Methods:

Nylon

The fabric sample is placed in the 5-pound paddle dryer along with enough dunnage to total 3-pound load. The tub is filled with water. The following wetting and scouring agent are added:

- 1.0% wetter D.75 OWG;
- 1.0% scour SKB OWG;
- 4.0% black 2RSLD OWG;
- acetic acid 56% to reach PH 5.5;
- 2.0% softener RWS Hydrophilic OWG; and
- 3% fix agent ED 73% OWG.

The dyer is run at 100 F for 5 minutes. Dye is added and run for 10 minutes. The sample is heated at a rate of 4 F/minute up to 200 F. Acetic acid is added to a pH of 5.5. The sample is allowed to run for 45 more minutes.

A sample color shade is prepared and, if acceptable, the sample is allowed to cool to 160 F.

The solution is dropped and refilled than refilled and run for 5 times, with the entire process repeated 4 times.

Softener is then added (i.e., silicon and silk solution at the concentration reported in Table 53) heat to 160 F and run for 10 minutes. Drop solution and remove fabric from the machine.

TABLE 53

| Silk solution | Ultratex SI | Ultratex CSP |
|---|---|---|
| 0.1% low mw silk | 1 gr/liter | |
| 0.1% low mw silk | | 2.5 gr/liter |
| 0.5% low mw silk | 1 gr/liter | |
| 0.5% low mw silk | | 2.5 gr/liter |
| 0.1% medium mw silk | 1 gr/liter | |
| 0.1% medium mw silk | | 2.5 gr/liter |
| 0.5% medium mw silk | 1 gr/liter | |
| 0.5% medium mw silk | | 2.5 gr/liter |
| | 1 gr/liter | |
| | | 2.5 gr/liter |
| 0.5% medium mw silk | | |
| 0.5% low mw silk | | |
| Control (only dye) | Control only dye) | Control (only dye) |

Polyester

The fabric sample is placed in the 5-pound pressure dryer along with enough dunnage to total 3-pound load. The tub is filled with water. The following wetting and scouring agent are added for pre-scouring process: 1.0% wetter and 2.0% scour.

The solution was heated to 180 F for 20 minutes. The solution was dropped and rinsed. To the solution was added 1% wetter, acetic acid to PH 5.0, with a leveler used as desired, and heated to 110 F. Dissolved dyes were added and heated to 180 F, with the temperature held for 10 minutes. The solution was then heated to 265 F at 3 F/minute and held at 265 F for 90 minutes.

The solution was then cooled to 180 F and the color shade was sampled. Upon acceptance, the solution was dropped and rinsed three times. The solution was further cooled to 140 F and hydro was added for 15 minutes. The solution was again dropped and rinsed 2-3 times until clean. The solution was then cooled to 110 F and softener was added (silicone and silk solution at the concentration reported in Table 53) for 10 minutes. The solution was dropped and the fabric was removed from the machine.

The fabric is dried by first removing excess fluid with Hydroextractor followed by a dryer cycle at normal setting with low temperature. Samples are cut to 8 cm by 8 cm square and delivered to MSC lab for MMT testing. Samples cut in 8 cm by 8 cm that are not tested for MMT are placed in the drapability jig suspended on a 7 cm diameter round metal hoop. A RODI water drop is dispensed with an eye dropper from approximately 3 cm above the fabric. A video image recording captured the time from the water drop contacting the fabric until its full absorption or up to 60 seconds.

After conditioning, the fabric is tested for drapability using the drape elevator test modified to accommodate the MMT sample size dimension. After placing the sample on the testing jig an image is recorded with a camera; the elevator is lowered until no more contact is made with the fabric by the elevator table and a second image is recorded. Image analysis of the fabric area is performed through photoshop. A drape coefficient is calculated with the following formula:

$$\text{Drape Coefficient} = \frac{Ad - S1}{S2 - S1} * 100,$$

where Ad is the vertical projection of the draping sample, S1 the area of the round sample holder, and S2 is the area of the sample. The fabrics with a water drop test<3 seconds and a drapability of <90 were submitted for MMT testing.

Example 31: Bacterial Wash Adherence Study through Washing Machine Cycle

The objective of this study was to evaluate the bacterial proliferation through multiple washing cycles in the laboratory while duplicating the bacterial deposition on textile materials that take place during regular exercise.

Materials. The following list of materials were used for fabric sample preparation and study execution:

- Polyester/lycra fabric 15042201;
- Deionized water;
- 6% Mid-MW silk provided by Silk Therapeutics, Inc.;
- 6% Low-MW Silk provided by Silk Therapeutics, Inc.;
- Launtry Permanent Marker;
- Front loader washing machine LG model WM3370HWA;
- AATCC detergent without optical brightener liquid H/E;
- *Satphylococcus aureus* subsp. *aureus* RosenbachATCC® 6538;
- Inoculum carrier to be 5% Nu-broth;
- Letheen broth with tween as neutralizer for enumeration;
- BD Difco Leethen broth #268110; and
- Concentrated Clorox regular bleach.

Equipment. The following is a list of equipment used from the fabric sample preparation and study execution:

- Werner Mathis MA-881 padder/coater;
- Curing frame;
- Across International Oven FO-19140;
- Balance Veritas M314-AI;
- Universal plastic PH test strip; and
- Tempo Filler and Reader from BioMerieux for enumeration.

Methods.

Fabric Sample Preparation. Silk coated fabric is prepared following SOP-TEMP-001. Silk solution concentration at 0.05% is applied to the fabric with bath immersion with the padder's roller pressure setting at 50 and 200 C curing time for 3 minutes. Fabric sample with 13.5 inches by 13.5 inches are divided with a permanent marker to delimit 8 equivalent areas.

Bacteria Inoculation. At the center for each of the 8 areas $2\times10^7$ cfu of bacteria solution was inoculated. The total load per washing cycle was expected to be 1-$2\times10^8$ CFU. The inoculated fabric was allowed to air dry for 60 minutes.

Washing Cycle. The inoculated fabric was placed in the washing machine with 1.8 kg of cotton towel as dunnage with 50 mL of detergent. A washing machine cycle at gentle setting with warm water at less than 30 C was completed. The inoculated fabric was removed from the washing machine and allowed to air dry for 120 minutes. After each washing cycle the dunnage was bleached with 120 mL concentrated Clorox regular bleach to eliminate any bacteria transfers from the tested specimen to the dunnage.

Bacteria Enumeration. At the preset interval reported in FIG. 349, from the dried inoculated fabric 2 square samples were cut out and the bacteria count was enumerated following, as a guideline, the enumeration method of AATCC 100.

Tested Variables. FIG. 349 reports the variables tested with this study.

Study Execution. For the fabric to be inoculated, multiple bacteria inoculation washing cycles and testing for bacteria enumeration at different intervals were executed on each tested fabric as reported in FIG. 350. For the fabric with no inoculation, the same washing cycle and testing for bacteria enumeration at the same intervals reported in FIG. 350. Since at enumeration swatches of fabric were removed from the fabric, to maintain the total bacteria load per washing cycle, an additional piece of control fabric was added to the dunnage. The additional fabric was inoculated with the balance of bacteria load. For example, after 1 washing cycle the additional fabric received $4\times10^7$ of bacteria load. FIG. 350 reports the additional load required.

Methods of Analysis. Analysis was performed to determine antibacterial properties of the fabric following, as guidelines, the enumeration method of AATCC 100: Antibacterial Finishes. The fabric sample is placed in a polypropylene container with 100 mL of Letheem broth and shaken for 60 seconds. The bacteria count as then enumerated with Tempo filler reader. At each tested interval two side by side tested samples are cut out from the fabric as reported in FIG. 349 and tested with duplicates. After each enumeration the fabric was tested for any odor intensity and for any changes between T=0 and the enumerated tested sample. Odor is evaluated on the following scale: 0=no odor; 1=very weak (odor threshold); 2=weak; 3=distinct; 4=strong; 5=very strong; and 6=intolerable. After each enumeration, high resolution image recording was taken for each sample so enumerated.

FIG. 350 describes the bacterial counts and various wash conditions for samples tested in accordance with the foregoing.

FIGS. 354 to 356 illustrate bacterial colony formation in the Letheen broth for coated samples 16060901 and 16060903 and non-coated samples 16060902 and 16060904.

FIGS. 357 and 358 illustrate control colony formation in Letheen broths.

The fabric surfaces were also examined during the study for both the coated and non-coated fabrics. FIGS. 359A-359C to 362A-362C illustrate microscopic images of the coated (Samples 16060901 and 16060903) and non-coated samples (Samples 16060902 and 16060904) prior to washing. FIGS. 363A-363C to 366A-366C illustrate microscopic images of the coated (Samples 16060901 and 16060903) and non-coated samples (Samples 16060902 and 16060904)

after one washing. FIGS. 367A-367C to 370A-370C illustrate microscopic images of the coated (Samples 16060901 and 16060903) and non-coated samples (Samples 16060902 and 16060904) after 10 washings. A qualitative analysis of the foregoing microscopic images was performed to observe the % foreign matter coverage area on the observable fibers in FIGS. 359A-359C to FIGS. 370A-370C (See FIG. 371). As shown in FIG. 371, the coated innoculated fibers displayed little or no foreign matter on their observable surfaces as compared to the non-coated innoculated fibers.

FIG. 352A demonstrates how the bacteria enumeration at time 0 without any bacteria load is maintained by all fabric study variables that are inoculated with bacteria and non inoculated with bacteria subject to the same 1 washing cycle and 10 washing cycles.

In addition, FIG. 352B demonstrates that through all the bacteria loading and washing cycles no odor is noticeable on the fabric surfaces except for a weak detergent scent in all the tested variables.

The presence of silk does not contribute to increased bacteria adherence on the fabric surface, while any bacteria that may be deposited on the surface it can be removed through a standard home laundering cycle.

As described by the foregoing data, bacteria did not appear to adhere to the coated materials after washing.

Example 32. A Water Drop Study with Silk and Silicone Coated Fabrics

A study was performed to determine the effect of water wicking on fabrics coated with silk and silicone that have been treated with citric acid.

As shown herein, citric acid does not function as a wicking agent. However, with a 1:1 ratio of silk/silicone at 0.25%, the water took a longer time to absorb than that observed with previously described water drop studies.

The parameters for a first study are set forth in Table 54 and 55. The results of this study are illustrated in FIGS. 373 and 374.

TABLE 54

| Experimental Parameters | Variables | |
|---|---|---|
| silk solution concentration | | |
| silk solution molecular weight | | |
| Wet pick up | at 50 setting on padder | |
| Temperature @ heat setting (C.) | 200 | |
| Curing time (min) | 3 | |
| silicon softener Ultratex SI | 0.22% | 0.02% |
| silicon softener Ultratex CSP | 0.50% | 0.05% |
| citric acid | 0.0250% | |

TABLE 55

| Sample Number | Description | Time to Absorb (sec) |
|---|---|---|
| 16062901 | 0.22% Ultratex SI | 30 |
| 16062902 | 0.5% Ultratex CSP | 30 |
| 16062905 | 0.22% Ultratex SI, 0.025% citric acid | 30 |
| 16062906 | 0.5% Ultratex CSP, 0.025% citric acid | 30 |
| 16062105 | 0.5% medium mw silk, 0.22 gr/liter Ultratex SI | |
| 16062106 | 0.5% low mw silk, 0.5 gr/liter Ultatex CSP | |
| 16062107 | 0.5% low mw silk, 2.2 gr/liter Ultratex SI, 0.025 gr/liter citric acid | 1 |

TABLE 55-continued

| Sample Number | Description | Time to Absorb (sec) |
|---|---|---|
| 16062108 | 0.5% medium mw silk, 5 gr/liter Ultratex CSP, 0.025 gr/liter citric acid | 4 |
| 16051103 | no coating, 200 C., 3 min | 1 |
| 16070701 | 0.025% citric acid | 1 |

All patents, patent applications, and published references cited herein are hereby incorporated by reference in their entirety. While the methods of the present disclosure have been described in connection with the specific embodiments thereof, it will be understood that it is capable of further modification. Further, this application is intended to cover any variations, uses, or adaptations of the methods of the present disclosure, including such departures from the present disclosure as come within known or customary practice in the art to which the methods of the present disclosure pertain.

We claim:

1. An article comprising leather having a coating, wherein the coating comprises silk fibroin fragments having an average weight average molecular weight selected from between about 5 kDa and about 144 kDa, between about 5 and about 10 kDa, between about 6 kDa and about 16 kDa, between about 17 kDa and about 38 kDa, between about 39 kDa and about 80 kDa, between about 60 and about 100 kDa, or between about 80 kDa and about 144 kDa, wherein the silk fibroin fragments have a polydispersity of between 1 and about 5.0, and wherein the silk fibroin fragments, prior to coating the leather, do not spontaneously or gradually gelate and do not visibly change in color or turbidity when in a solution for at least 10 days.

2. The article of claim 1, wherein the silk fibroin fragments have an average weight average molecular weight selected from between about 5 kDa and about 10 kDa, between about 6 kDa and about 16 kDa, between about 17 kDa and about 38 kDa, between about 10 kDa and about 80 kDa, between about 39 kDa and about 80 kDa, between about 60 kDa and about 100 kDa, or between about 80 kDa and about 144 kDa.

3. The article of claim 1, further comprising about 0.01% (w/w) to about 10% (w/w) sericin relative to the silk fibroin fragments.

4. The article of claim 1, wherein the silk fibroin is selected from natural silk fibroin and recombinant silk fibroin.

5. The article of claim 1, wherein the silk fibroin is selected from spider silk fibroin and silkworm silk fibroin.

6. The article of claim 5, wherein the silkworm silk fibroin is *Bombyx mori* silk fibroin.

7. The article of claim 1, wherein the coating comprises a copolymer.

8. The article of claim 1, wherein the leather is natural leather.

9. The article of claim 8, wherein the natural leather is selected from chrome-tanned leather, vegetable-tanned leather, aldehyde-tanned leather, brain-tanned leather, formaldehyde-tanned leather, Chamois leather, rose-tanned leather, synthetic-tanned leather, alum-tanned leather, patent leather, Vachetta leather, nubuck leather, rawhide leather, split leather, full-grain leather, top-grain leather, and corrected-grain leather.

10. The article of claim 1, wherein the leather is synthetic leather.

11. The article of claim 10, wherein the synthetic leather is selected from poromeric imitation leather, vinyl and polyamide felt fibers, polyurethane, polyvinyl chloride, polyethylene (PE), polypropylene (PP), vinyl acetate copolymer (EVA), polyamide, polyester, textile-polymer composite microfibers, corfan, koskin, leatherette, BIOTHANE®, BIRKIBUC®, BIRKO-FLOR®, CLARINOR, ECOLORICAR, KYDEX®, LORICAR, NAUGAHYDER, REXINER, VEGETAN®, FABRIKOID®, or combinations thereof.

12. The article of claim 1, wherein the coating is applied to the leather prior to forming the article.

13. The article of claim 1, wherein the coating is applied to at least one side of the leather using a method selected from a bath coating process, a spray coating process, a stencil process, a silk-foam based process, and a roller-based process.

14. The article of claim 1, wherein the coating has a thickness selected from the group consisting of about 5 nm, about 10 nm, about 15 nm, about 20 nm, about 25 nm, about 50 nm, about 100 nm, about 200 nm, about 500 nm, about 1 m, about 5 μm, about 10 μm, and about 20 μm.

15. The article of claim 1, wherein the coating is adsorbed on the leather.

16. The article of claim 1, wherein the coating is attached to the leather through chemical cross-linking, enzymatic cross-linking, thermal cross-linking, or irradiative cross-linking.

17. The article of claim 1, wherein the hand of the coated leather is improved relative to an uncoated leather.

* * * * *